US011968510B2

(12) United States Patent
Palmer et al.

(10) Patent No.: US 11,968,510 B2
(45) Date of Patent: Apr. 23, 2024

(54) AUDIO TRANSDUCERS

(71) Applicant: WING ACOUSTICS LIMITED, Auckland (NZ)

(72) Inventors: David John Palmer, Auckland (NZ); Michael Ian Palmer, Auckland (NZ)

(73) Assignee: WING ACOUSTICS LIMITED, Auckland (NZ)

( * ) Notice: Subject to any disclaimer, the term of this patent is extended or adjusted under 35 U.S.C. 154(b) by 0 days.

(21) Appl. No.: 18/316,762

(22) Filed: May 12, 2023

(65) Prior Publication Data

US 2023/0412986 A1 Dec. 21, 2023

Related U.S. Application Data

(63) Continuation of application No. 17/937,044, filed on Sep. 30, 2022, now Pat. No. 11,716,571, which is a (Continued)

(30) Foreign Application Priority Data

Sep. 14, 2015 (NZ) ........................................ 712255
Sep. 14, 2015 (NZ) ........................................ 712256

(51) Int. Cl.

*H04R 7/24* (2006.01)
*H04R 1/10* (2006.01)

(Continued)

(52) U.S. Cl.

CPC ............... *H04R 7/24* (2013.01); *H04R 9/025* (2013.01); *H04R 9/06* (2013.01); *H04R 31/003* (2013.01);

(Continued)

(58) Field of Classification Search

CPC . H04R 7/24; H04R 9/025; H04R 9/06; H04R 31/003; H04R 1/1008;

(Continued)

(56) References Cited

U.S. PATENT DOCUMENTS 1,035,577 A 8/1912 Grace
1,536,116 A 5/1925 Martin (Continued)

FOREIGN PATENT DOCUMENTS

CA 2 600 015 A1 9/2006
DE 3378456 12/1988

(Continued)

OTHER PUBLICATIONS

U.S. Appl. No. 17/937,044, U.S. Pat. No. 11,716,571, filed Sep. 30, 2022.

(Continued)

*Primary Examiner* — Sean H Nguyen
(74) *Attorney, Agent, or Firm* — ALSTON & BIRD LLP

(57) ABSTRACT

The invention relates to audio transducers, such as loudspeaker, microphones and the like, and includes improvements in or relating to: audio transducer diaphragm structures and assemblies, audio transducer mounting systems; audio transducer diaphragm suspension systems, personal audio devices incorporating the same and any combination thereof. The embodiments of the invention include linear action and rotational action transducers. For both types of transducer, rigid and composite diaphragm constructions and unsupported diaphragm periphery designs are described. Systems and methods for mounting the transducer to a housing, such as an enclosure or baffle are also described. Furthermore, hinge systems including: rigid contact hinge systems and flexible hinge systems are also disclosed for various rotational action transducer embodiments. Various (Continued)

applications and implementations are described and envisaged for the audio transducer embodiments including, for example, personal audio devices such as headphones, earphones and the like.

24 Claims, 158 Drawing Sheets

Related U.S. Application Data continuation of application No. 17/085,792, filed on Oct. 30, 2020, now Pat. No. 11,490,205, which is a continuation of application No. 16/815,689, filed on Mar. 11, 2020, now Pat. No. 10,887,701, which is a continuation of application No. 15/759,605, filed as application No. PCT/IB2016/055472 on Sep. 14, 2016, now Pat. No. 10,701,490.

(51) Int. Cl.

| | |
|---|---|
| ***H04R 9/02*** | (2006.01) |
| ***H04R 9/06*** | (2006.01) |
| ***H04R 15/00*** | (2006.01) |
| ***H04R 17/00*** | (2006.01) |
| ***H04R 19/01*** | (2006.01) |
| ***H04R 31/00*** | (2006.01) |

(52) U.S. Cl.

CPC .......... *H04R 1/1008* (2013.01); *H04R 1/1075* (2013.01); *H04R 15/00* (2013.01); *H04R 17/00* (2013.01); *H04R 19/013* (2013.01); *H04R 2307/023* (2013.01); *H04R 2307/027* (2013.01)

(58) Field of Classification Search

CPC ...... H04R 1/1075; H04R 15/00; H04R 17/00; H04R 19/013; H04R 2307/023; H04R 2307/027; H04R 7/04

See application file for complete search history.

(56) References Cited

U.S. PATENT DOCUMENTS

| | | | |
|---|---|---|---|
| 1,562,165 | A | 11/1925 | Harrison |
| 1,579,864 | A | 4/1926 | Hobart, Jr. |
| 1,614,327 | A | 1/1927 | Thomas |
| 1,633,170 | A | 6/1927 | Fischer |
| 1,683,946 | A | 9/1928 | Baldwin |
| 1,693,223 | A | 11/1928 | Danziger et al. |
| 1,786,465 | A | 12/1930 | Wagenen |
| 1,821,547 | A | 9/1931 | Hartley |
| 2,035,104 | A | 3/1936 | Thomas |
| 2,049,784 | A | 8/1936 | Thomas |
| 2,075,774 | A | 3/1937 | Allen |
| 2,077,170 | A | 4/1937 | Harrison |
| 2,078,469 | A | 4/1937 | Thomas |
| 2,085,198 | A | 6/1937 | Lindsay |
| 2,239,837 | A | 4/1941 | Bottorff |
| 2,278,966 | A | 4/1942 | Williams |
| 2,304,022 | A | 12/1942 | Sanders, Jr. |
| 3,578,921 | A | 5/1971 | Knauert |
| 3,761,956 | A | 9/1973 | Takahashi et al. |
| 4,182,937 | A | 1/1980 | Greenwood |
| 4,239,090 | A | 12/1980 | Dahlquist |
| 4,313,040 | A | 1/1982 | Tsukamoto |
| 4,385,210 | A | 5/1983 | Marquiss |
| 4,426,552 | A | 1/1984 | Cowans et al. |
| 4,430,529 | A | 2/1984 | Nakagawa et al. |
| 4,593,160 | A | 6/1986 | Nakamura |
| 4,628,907 | A | 12/1986 | Epley |
| 4,763,358 | A | 8/1988 | Danley |
| 5,140,641 | A | 8/1992 | Danley et al. |
| 5,191,618 | A | 3/1993 | Hisey |
| 5,255,328 | A | 10/1993 | Akiniwa et al. |
| 5,313,127 | A | 5/1994 | Danley et al. |
| 5,317,642 | A | 5/1994 | Danley et al. |
| 5,633,552 | A | 5/1997 | Lee et al. |
| 5,660,397 | A | 8/1997 | Holtkamp |
| 5,668,886 | A | 9/1997 | Sakamoto et al. |
| 5,694,476 | A | 12/1997 | Klippel |
| 5,704,613 | A | 1/1998 | Holtkamp |
| 5,802,189 | A | 9/1998 | Blodget |
| 5,825,901 | A | 10/1998 | Hisey |
| 5,848,173 | A | 12/1998 | Sato et al. |
| 5,872,853 | A | 2/1999 | Marquiss |
| 6,097,829 | A | 8/2000 | Guenther et al. |
| 6,151,402 | A | 11/2000 | Azima et al. |
| 6,160,898 | A | 12/2000 | Bachmann et al. |
| 6,192,136 | B1 | 2/2001 | Azima et al. |
| 6,347,149 | B1 | 2/2002 | Bachmann et al. |
| 6,384,550 | B1 | 5/2002 | Mikyakawa et al. |
| 6,466,682 | B2 | 10/2002 | An |
| 6,560,348 | B1 | 5/2003 | Bachmann et al. |
| 6,567,525 | B1 | 5/2003 | Sapiejewski |
| 6,748,090 | B1 | 6/2004 | Bachmann et al. |
| 6,985,596 | B2 | 1/2006 | Bank et al. |
| 7,088,839 | B2 | 8/2006 | Geschiere et al. |
| 7,206,428 | B2 | 4/2007 | Geschiere et al. |
| 7,302,068 | B2 | 11/2007 | Longbottom et al. |
| 7,369,674 | B2 | 5/2008 | Miura |
| 7,403,632 | B2 | 7/2008 | Goldberg |
| 7,471,805 | B2 | 12/2008 | Goldberg |
| 7,729,504 | B2 | 6/2010 | Tsuda et al. |
| 7,747,035 | B1 | 6/2010 | Heavner |
| 7,860,265 | B2 | 12/2010 | Gaudreault |
| 8,014,556 | B2 | 9/2011 | Goldberg |
| 8,023,668 | B2 | 9/2011 | Pfaffinger |
| 8,064,630 | B2 | 11/2011 | Goldberg |
| 8,073,181 | B2 | 12/2011 | Bakalos et al. |
| 8,073,187 | B2 | 12/2011 | Hashimoto et al. |
| 8,085,955 | B2 | 12/2011 | Henry |
| 8,116,508 | B2 | 2/2012 | Xu et al. |
| 8,131,005 | B2 | 3/2012 | Lemarquand et al. |
| 8,139,813 | B2 | 3/2012 | Kobayashi et al. |
| 8,144,380 | B2 | 3/2012 | Takeuchi |
| 8,280,096 | B2 | 10/2012 | Milot |
| 8,295,536 | B2 | 10/2012 | Carlmark et al. |
| 8,295,537 | B2 | 10/2012 | Carlmark et al. |
| 8,457,344 | B2 | 6/2013 | Kobayashi et al. |
| 8,659,211 | B1 | 2/2014 | Butler et al. |
| 8,705,774 | B2 | 4/2014 | Jilani et al. |
| 8,965,024 | B2 | 2/2015 | Graham |
| 9,247,365 | B1 | 1/2016 | Ellis et al. |
| 10,244,325 | B2 | 3/2019 | Palmer et al. |
| 2002/0122560 | A1 | 9/2002 | An |
| 2002/0146141 | A1 | 10/2002 | Geschiere et al. |
| 2004/0062404 | A1 | 4/2004 | Negishi et al. |
| 2004/0202338 | A1 | 10/2004 | Longbottom et al. |
| 2005/0180592 | A1 | 8/2005 | Miura |
| 2005/0269906 | A1 | 12/2005 | Allan et al. |
| 2006/0028751 | A1 | 2/2006 | Takeuchi |
| 2006/0198541 | A1 | 9/2006 | Henry |
| 2006/0239488 | A1 | 10/2006 | Geschiere et al. |
| 2007/0258617 | A1 | 11/2007 | Henry |
| 2007/0263886 | A1 | 11/2007 | Starnes et al. |
| 2008/0025533 | A1 * | 1/2008 | Livingstone .......... H04R 17/00 381/190 |
| 2008/0069385 | A1 | 3/2008 | Revit |
| 2008/0232636 | A1 | 9/2008 | Thurber et al. |
| 2008/0247595 | A1 | 10/2008 | Henry |
| 2009/0028374 | A1 | 1/2009 | Hashimoto et al. |
| 2009/0034780 | A1 | 2/2009 | Gaudreault |
| 2009/0226028 | A1 | 9/2009 | Suganuma |
| 2011/0069859 | A1 | 3/2011 | Kobayashi et al. |
| 2011/0243365 | A1 | 10/2011 | Carlmark et al. |
| 2011/0243366 | A1 | 10/2011 | Carlmark et al. |
| 2011/0261979 | A1 | 10/2011 | Yang et al. |
| 2011/0299716 | A1 | 12/2011 | Reckert |
| 2012/0033818 | A1 | 2/2012 | De Poortere |
| 2012/0045073 | A1 | 2/2012 | Kobayashi et al. |
| 2012/0053393 | A1 | 3/2012 | Kaltenbacher et al. |
| 2012/0257778 | A1 | 10/2012 | Hall et al. |
| 2014/0003624 | A1 | 1/2014 | Stromback |

(56) References Cited

U.S. PATENT DOCUMENTS

| | | | | |
|---|---|---|---|---|
| 2014/0049983 | A1 | 2/2014 | Nichol et al. | |
| 2014/0140559 | A1 | 5/2014 | Graham | |
| 2014/0254805 | A1 | 9/2014 | Su et al. | |
| 2014/0321668 | A1 | 10/2014 | Kimura et al. | |
| 2014/0348369 | A1* | 11/2014 | Nevill | H04R 15/00 381/345 |
| 2014/0369519 | A1 | 12/2014 | Leschka et al. | |
| 2015/0281830 | A1 | 10/2015 | Gauger, Jr. et al. | |
| 2016/0337747 | A1 | 11/2016 | Litovsky et al. | |
| 2016/0373858 | A1 | 12/2016 | Lawrence et al. | |
| 2017/0078798 | A1 | 3/2017 | Palmer et al. | |
| 2018/0014115 | A1 | 1/2018 | Crosby et al. | |
| 2021/0195339 | A1 | 6/2021 | Palmer et al. | |

FOREIGN PATENT DOCUMENTS

| | | | |
|---|---|---|---|
| DE | 3908402 | A1 | 9/1990 |
| EP | 0 114 910 | A1 | 8/1984 |
| EP | 0 114 910 | B1 | 11/1988 |
| EP | 0 609 873 | A2 | 8/1994 |
| EP | 0 609 873 | A3 | 8/1994 |
| EP | 0 701 386 | A2 | 3/1996 |
| EP | 0 720 810 | A1 | 7/1996 |
| EP | 0 735 795 | A2 | 10/1996 |
| EP | 1 248 496 | A2 | 10/2002 |
| EP | 0 735 795 | A3 | 7/2003 |
| EP | 1 248 496 | A3 | 11/2005 |
| EP | 1 752 016 | A1 | 2/2007 |
| EP | 1 854 332 | A2 | 11/2007 |
| EP | 1 940 199 | A1 | 7/2008 |
| EP | 2 023 657 | A2 | 2/2009 |
| EP | 1 752 016 | B1 | 2/2010 |
| EP | 2 124 480 | B1 | 3/2012 |
| EP | 2 023 657 | A3 | 6/2013 |
| GB | 325543 | A | 2/1930 |
| JP | S 54-103340 | A | 8/1979 |
| JP | S54147028 | A | 11/1979 |
| JP | S5553996 | A | 4/1980 |
| JP | S5555696 | A | 4/1980 |
| JP | S 56-131298 | A | 10/1981 |
| JP | S 58-151200 | A | 9/1983 |
| JP | S59161996 | A | 9/1984 |
| JP | S59191998 | A | 10/1984 |
| JP | S60259086 | A | 12/1985 |
| JP | S60259087 | A | 12/1985 |
| JP | S60259089 | A | 12/1985 |
| JP | S60259090 | A | 12/1985 |
| JP | S60259095 | A | 12/1985 |
| JP | S619098 | A | 1/1986 |
| JP | S61103393 | A | 5/1986 |
| JP | S 61-157000 | A | 7/1986 |
| JP | S61144200 | A | 7/1986 |
| JP | S 61-214897 | A | 9/1986 |
| JP | S6253099 | A | 3/1987 |
| JP | 64-29098 | A | 1/1989 |
| JP | H01264098 | A | 10/1989 |
| JP | H04357799 | A | 12/1992 |
| JP | H 05-236595 | A | 9/1993 |
| JP | H06217390 | A | 8/1994 |
| JP | 62-53099 | A | 9/1994 |
| JP | H09084179 | A | 3/1997 |
| JP | H09084181 | A | 3/1997 |
| JP | H09084182 | A | 3/1997 |
| JP | H09084186 | A | 3/1997 |
| JP | H0998496 | A | 4/1997 |
| JP | H09098497 | A | 4/1997 |
| JP | H09233582 | A | 9/1997 |
| JP | H09275289 | A | 10/1997 |
| JP | H10066194 | A | 3/1998 |
| JP | H 11-355876 | A | 12/1999 |
| JP | H11355876 | A | 12/1999 |
| JP | 2002-354853 | A | 12/2002 |
| JP | 2004-200745 | A | 7/2004 |
| JP | 2004-274206 | A | 9/2004 |
| JP | 2005-260510 | A | 9/2005 |
| JP | 2005-311951 | A | 11/2005 |
| JP | 2005-328209 | A | 11/2005 |
| JP | 2006-013671 | A | 1/2006 |
| JP | 38-63884 | B2 | 12/2006 |
| JP | 2008-532422 | A | 8/2008 |
| JP | 2009-098496 | A | 5/2009 |
| JP | 2009-219067 | A | 9/2009 |
| JP | 2010-050764 | A | 3/2010 |
| JP | 2010-263362 | A | 11/2010 |
| JP | 2010-263363 | A | 11/2010 |
| JP | 2011-228863 | A | 11/2011 |
| JP | 2013-090309 | A | 5/2013 |
| JP | 2013-232872 | A | 11/2013 |
| WO | WO 1994/019914 | A1 | 9/1994 |
| WO | WO 2003/001841 | A2 | 1/2003 |
| WO | WO 2004/030407 | A2 | 4/2004 |
| WO | WO 2005/104614 | A1 | 11/2005 |
| WO | WO 2005/104617 | A1 | 11/2005 |
| WO | WO 2006/069056 | A2 | 6/2006 |
| WO | WO 2006/093876 | A2 | 9/2006 |
| WO | WO 2007/034781 | A1 | 3/2007 |
| WO | WO 2011/123265 | A1 | 10/2011 |
| WO | WO 2011/123266 | A1 | 10/2011 |
| WO | WO 2011/123266 | A9 | 3/2013 |
| WO | WO 2014/041613 | A1 | 3/2014 |
| WO | WO 2015/128237 | A1 | 9/2015 |
| WO | WO 2017/046716 | A1 | 3/2017 |
| WO | WO 2018/167538 | A1 | 9/2018 |

OTHER PUBLICATIONS

U.S. Appl. No. 17/085,792, U.S. Pat. No. 11,490,205, filed Oct. 30, 2020.

U.S. Appl. No. 16/815,689, U.S. Pat. No. 10,887,701, filed Mar. 11, 2020.

U.S. Appl. No. 15/759,605, U.S. Pat. No. 10,701,490, filed Mar. 13, 2018.

Borwick, J., Loudspeaker and Headphone Handbook, 3rd Revised Edition (Mar. 27, 2001), 733 pages.

Extended European Search Report for European Application No. 16845811.5 dated Apr. 5, 2019.

Fern Acoustics [online] [retrieved Jan. 29, 2018]. Retrieved from the Internet: <URL: http://www.fertinacoustics.com/en_tecnology.html>. 3 pages.

Georg Neumann GmbH, The Dummy Head-Theory and Practice, Brochure, Berlin, 28 pages (undated).

Hammershoi, D et al., Determination of Noise Emission From Sound Sources Close to the Ears, Acta Acustica, vol. 94, No. 1 (Jan. 2008) 114-129.

International Search Report and Written Opinion for Application No. PCT/IB2016/055472 dated Jan. 3, 2017.

International Search Report and Written Opinion for Application No. PCT/IB2017/051519 dated Jun. 21, 2017, 20 pages.

International Search Report and Written Opinion for Application No. PCT/IB2018/051881 dated Jul. 3, 2018, 11 pages.

Olive, S. E. et al., Factors That Influence Listeners' Preferred Base and Treble Balance in Headphones, AES Convention Paper 9382 Presented at the 139th Convention (Oct.-Nov. 2015) 12 pages.

* cited by examiner

DETAIL A

SECTION A-A

SECTION B-B

SECTION C-C

SECTION A-A

SECTION B-B

SECTION A-A

SECTION B-B

SECTION A-A

SECTION A-A

SECTION B-B

SECTION A-A

SECTION A-A

SECTION A-A

SECTION A-A

SECTION B-B

SECTION A-A

SECTION B-B

SECTION A-A

SECTION B-B

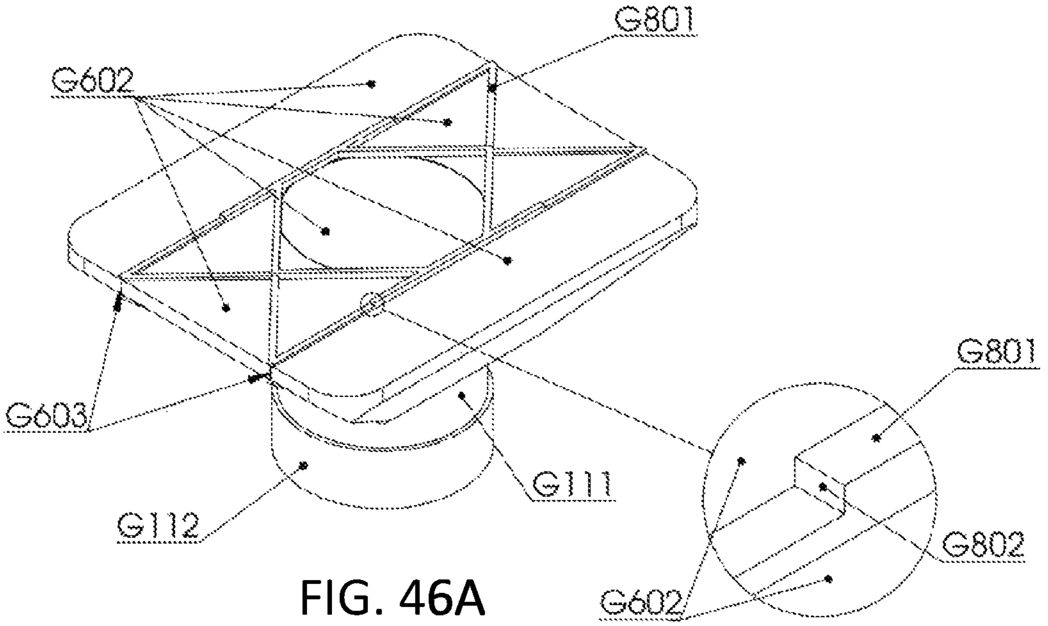
FIG. 46A
FIG. 46B
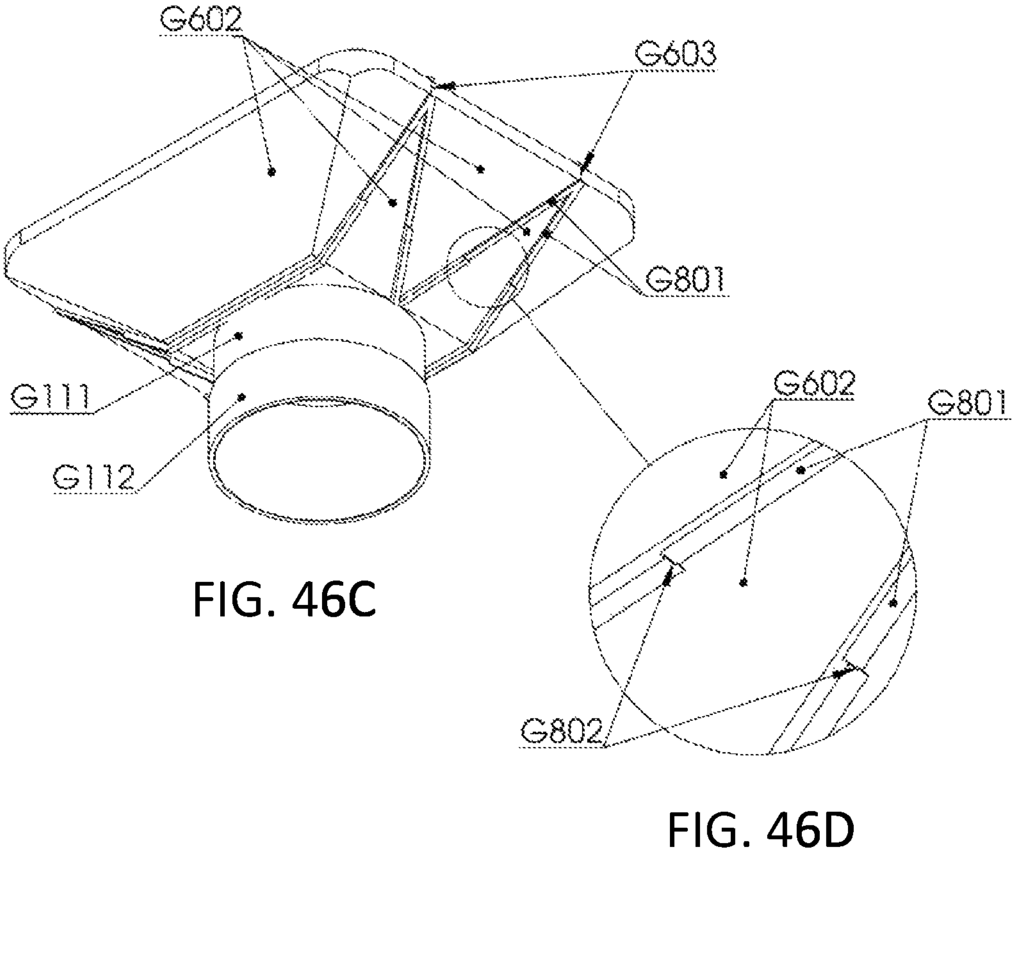
FIG. 46C
FIG. 46D

SECTION A-A

SECTION B-B

SECTION C-C

SECTION D-D

SECTION E-E

SECTION F-F

AUDIO TRANSDUCERS

CROSS-REFERENCE TO RELATED APPLICATIONS

This application is a continuation of and claims priority to U.S. patent application Ser. No. 17/937,044, filed on Sep. 30, 2022, which is a continuation of and claims priority to U.S. patent application Ser. No. 17/085,792, filed on Oct. 30, 2020, which is a continuation of U.S. patent application Ser. No. 16/815,689, filed on Mar. 11, 2020, which is a continuation of and claims priority to U.S. patent application Ser. No. 15/759,605, filed on Mar. 13, 2018, which claims priority to and is a national stage entry of Patent Cooperation Treaty application serial no. PCT/IB2016/055472, filed on Sep. 14, 2016, which claims priority to New Zealand patent application serial nos. NZ 712255 and NZ 712256, both filed on Sep. 14, 2015. The contents of each of these references is herein incorporated by reference in its entirety.

FIELD OF THE INVENTION

The present invention relates to audio transducer technologies, such as loudspeaker, microphones and the like, and includes improvements in or relating to: audio transducer diaphragm structures and assemblies, audio transducer mounting systems; audio transducer diaphragm suspension systems, and/or personal audio devices incorporating the same.

BACKGROUND TO THE INVENTION

Loudspeaker drivers are a type of audio transducer that generate sound by oscillating a diaphragm using an actuating mechanism that may be electromagnetic, electrostatic, piezoelectric or any other suitable moveable assembly known in the art. The driver is generally contained within a housing. In conventional drivers, the diaphragm is a flexible membrane component coupled to a rigid housing. Loudspeaker drivers therefore form resonant systems where the diaphragm is susceptible to unwanted mechanical resonance (also known as diaphragm breakup) at certain frequencies during operation. This affects the driver performance.

An example of a conventional loudspeaker driver is shown in FIGS. 55A-55B. The driver comprises a diaphragm assembly mounted by a diaphragm suspension system to a transducer base structure. The transducer base structure comprises a basket J113, magnet J116, top pole piece J118, and T-yoke J117. The diaphragm assembly comprises a thin-membrane diaphragm, a coil former J114 and a coil winding J115. The diaphragm comprises of cone J101 and cap J120. The diaphragm suspension system comprises of a flexible rubber surround J105 and a spider J119. The transducing mechanism comprises a force generation component being the coil winding held within a magnetic circuit. The transducing mechanism also comprises the magnet J116, top pole piece J118, and T-yoke J117 that directs the magnetic circuit through the coil. When an electrical audio signal is applied to the coil, a force is generated in the coil, and a reaction force, is applied to the base structure.

The driver is mounted to a housing J102 via a mounting system consisting of multiple washers J111 and bushes J107 made of flexible natural rubber. Multiple steel bolts 3106, nuts J109 and washers J108 are used to fasten the driver. There is a separation J112 between the basket J113 and the housing J102 and the configuration is such that the mounting system is the only connection between the housing J102 and the driver. In this example, the diaphragm moves in a substantially linear manner, back and forth in the direction of the axis of the cone shaped diaphragm, and without significant rotational component.

As mentioned, the flexible diaphragm coupled to the rigid housing J102, via the suspension and mounting system, forms a resonant system, where the diaphragm is susceptible to unwanted resonances over the driver's frequency range of operation. Also, other parts of the driver including the diaphragm suspension and mounting systems and even the housing can suffer from mechanical resonances which can detrimentally affect the sound quality of the driver. Prior art driver systems have thus attempted to minimize the effects of mechanical resonance by employing one or more damping techniques within the driver system. Such techniques comprise for example impedance matching of the diaphragm to a rubber diaphragm surround and/or modifying diaphragm design, including diaphragm shape, material and/or construction.

Many microphones have the same basic construction as loudspeakers. They operate in reverse transducing sound waves into an electrical signal. To do this, microphones use sound pressure in the air to move a diaphragm, and convert that motion into an electrical audio signal. Microphones therefore have similar constructions to loudspeaker drivers and suffer some equivalent design issues including mechanical resonances of the diaphragm, diaphragm surround and other parts of the transducer and even the housing within which the transducer is mounted. These resonances can detrimentally affect the transducing quality.

Passive radiators also have the same basic construction as loudspeakers, except they do not have a transducing mechanism. They therefore suffer from some equivalent design issues creating mechanical resonances which can all detrimentally affect operation.

It is an object of the present invention to provide improvements in or relating to audio transducers which work in some way towards addressing some of the resonance issues mentioned above or to at least provide the public with a useful choice.

SUMMARY OF THE INVENTION

In one aspect the invention may broadly be said to consist of an audio transducer diaphragm, comprising:

- a diaphragm body having one or more major faces,
- normal stress reinforcement coupled to the body, the normal stress reinforcement being coupled adjacent at least one of said major faces for resisting compression-tension stresses experienced at or adjacent the face of the body during operation, and
- at least one inner reinforcement member embedded within the body and oriented at an angle relative to at least one of said major faces for resisting and/or substantially mitigating shear deformation experienced by the body during operation.

Preferably each of the at least one inner reinforcement members is separate to and coupled to the diaphragm body to provide resistance to shear deformation in the plane of the stress reinforcement separate from any resistance to shear provided by the body.

Preferably each inner reinforcement member extends within the diaphragm body substantially orthogonal to a coronal plane of the diaphragm body.

Preferably each inner reinforcement member extends substantially towards and within one or more peripheral regions of the diaphragm body that are most distal from a center of mass location of the diaphragm.

Preferably the diaphragm comprises a plurality of inner reinforcement members. Preferably each inner reinforcement member is formed from a material having a specific modulus of at least approximately 8 MPa/(kg/m^3). Preferably each inner reinforcement member is formed from a material having a specific modulus of at least approximately 20 MPa/(kg/m^3).

Each inner reinforcement member or both may be formed from an aluminum or a carbon fiber reinforced plastic, for example.

In another aspect the invention may broadly be said to consist of an audio transducer comprising:

- a diaphragm as defined in the previous aspect and its related features that is configured to move during operation;
- a transducing mechanism operatively coupled to the diaphragm and operative in association with movement of the diaphragm;
- a housing comprising an enclosure or baffle for accommodating the diaphragm therein or therebetween; and
- wherein the diaphragm comprises an outer periphery having one or more peripheral regions that are free from physical connection with the housing.

Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

In another aspect the invention may broadly be said to consist of an audio transducer comprising:

- a diaphragm as defined in any one of the previous aspects and its related features, that is configured to move during operation; and
- a housing comprising an enclosure or baffle for accommodating the diaphragm therein or therebetween.

In another aspect the invention may broadly be said to consist of an audio transducer comprising:

- a diaphragm having:
  - a diaphragm body having one or more major faces, and
  - normal stress reinforcement coupled to the body, the normal stress reinforcement being coupled adjacent at least one of said major faces for resisting compression-tension stresses experienced by the body during operation; and
  - a distribution of mass of associated with the diaphragm body or a distribution of mass associated with the normal stress reinforcement, or both, is such that the diaphragm comprises a relatively lower mass at one or more low mass regions of the diaphragm relative to the mass at one or more relatively high mass regions of the diaphragm; and
- a housing comprising an enclosure and/or baffle for accommodating the diaphragm therein or therebetween; and
- wherein the diaphragm comprises a periphery that is at least partially free from physical connection with an interior of the housing.

The following statements apply to any one of the previous aspects.

Preferably the diaphragm comprises one or more peripheral regions that are free from physical connection with the interior of the housing. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

In some embodiments a relatively small air gap separates the one or more peripheral regions of the diaphragm from the interior of the housing.

In some embodiments the transducer contains ferromagnetic fluid between the one or more peripheral regions of the diaphragm and the interior of the housing.

Preferably the ferromagnetic fluid provides significant support to the diaphragm in direction of the coronal plane of the diaphragm.

Preferably the transducer further comprises a transducing mechanism operatively coupled to the diaphragm and operative in association with movement of the diaphragm.

The following statements apply to any one or more of the previous aspects.

Preferably the diaphragm body is formed from a core material. Preferably the core material comprises an interconnected structure that varies in three dimensions. The core material may be a foam or an ordered three-dimensional lattice structured material. The core material may comprise a composite material. Preferably the core material is expanded polystyrene foam. Alternative materials include polymethyl methacrylamide foam, polyvinylchloride foam, polyurethane foam, polyethylene foam, Aerogel foam, corrugated cardboard, balsa wood, syntactic foams, metal micro lattices and honeycombs.

Preferably the diaphragm body in isolation of the reinforcement has a relatively low density, less than 100 $kg/m^3$. More preferably the density is less than 50 $kg/m^3$, even more preferably the density is less than 35 $kg/m^3$, and most preferably the density is less than 20 $kg/m^3$.

Preferably the diaphragm body in isolation of the reinforcement has a relatively high specific modulus, higher than 0.2 MPa/(kg/m^3). Most preferably the specific modulus is higher than 0.4 MPa/(kg/m^3).

Preferably normal stress reinforcement comprises one or more normal stress reinforcement members each coupled adjacent one of said major faces of the body.

Preferably each normal stress reinforcement member comprises one or more elongate struts coupled along a corresponding major face of the diaphragm body.

More preferably each strut comprises a thickness greater than $1/60^{th}$ of its width.

Preferably the struts are interconnected and extend across a substantial portion of the associated face of the diaphragm body.

Preferably the one or more normal stress reinforcement members is (are) anisotropic and exhibit a stiffness in some direction that is at least double the stiffness in other substantially orthogonal directions.

Preferably the diaphragm comprises at least two normal stress reinforcement members coupled at or adjacent opposing major faces of the diaphragm body.

Preferably the diaphragm comprises first and second reinforcement members on opposing major faces of the diaphragm body and wherein the first and second reinforcement members form a triangular reinforcement that supports the diaphragm body against displacements in a direction substantially perpendicular to a coronal plane of the diaphragm body.

Preferably each normal stress reinforcement member is formed from a material having a specific modulus of at least approximately 8 MPa/(kg/m^3). Preferably each normal stress reinforcement member is formed from a material having a specific modulus of at least approximately 20 MPa/(kg/m^3. Preferably each normal stress reinforcement member is formed from a material having a specific modulus of at least approximately 100 MPa/(kg/m^3).

The normal stress reinforcement may be formed from an aluminum or a carbon fiber reinforced plastic, for example.

Preferably the diaphragm body is substantially thick.

For example, the diaphragm body may comprise a maximum thickness that is at least about 11% of a maximum length dimension of the body. More preferably the maximum thickness is at least about 14% of the maximum length dimension of the body.

Preferably, relative to a diaphragm radius from the centre of mass exhibited by the diaphragm to a most distal periphery of the diaphragm body, the diaphragm thickness is at least 15% of the diaphragm radius, or more preferably is at least about 20% of the radius.

Preferably a distribution of mass of associated with the diaphragm body or a distribution of mass associated with the normal stress reinforcement, or both, is such that the diaphragm comprises a relatively lower mass at one or more low mass regions of the diaphragm relative to the mass at one or more relatively high mass regions of the diaphragm.

Preferably the one or more low mass regions are peripheral regions distal from a center of mass location of the diaphragm and the one or more high mass regions are at or proximal to the center of mass location.

Preferably the one or more low mass regions are peripheral regions most distal from the center of mass location.

In some embodiments the low mass regions are at one end of the diaphragm and the high mass regions are at an opposing end.

In alternative embodiments the low mass regions are distributed substantially about an entire outer periphery of the diaphragm and the high mass regions are a central region of the diaphragm.

In some embodiments a distribution of mass of the normal stress reinforcement is such that a relatively lower amount of mass is located at the one or more low mass regions.

Preferably the low mass regions are devoid of any normal stress reinforcement.

Preferably at least 10 percent of a total surface area of one more peripheral regions are devoid of normal stress reinforcement.

Preferably the normal stress reinforcement comprises a reinforcement plate associated with each major face of the body, and wherein each reinforcement plate comprises one or more recesses at the one or more low mass regions.

In some embodiments a distribution of mass of the diaphragm body is such that the diaphragm body comprises a relatively lower mass at the one or more low mass regions.

Preferably a thickness of the diaphragm body is reduced by tapering toward the one or more low mass regions, preferably from the center of mass location.

Preferably the one or more low mass regions are located at or beyond a radius centered around the center of mass location of the diaphragm that is 50 percent of a total distance from the center of mass location to a most distal periphery of the diaphragm.

Preferably the one or more low mass regions are located at or beyond a radius centred around the centre of mass location of the diaphragm that is 80 percent of a total distance from the centre of mass location to a most distal periphery of the diaphragm.

Preferably a thickness of the diaphragm body reduces from the axis of rotation to the opposing terminal end of the diaphragm body.

Preferably there is no support and/or no similar normal reinforcement attached to the outside of the sides of the diaphragm body.

Preferably there is no support and/or similar normal reinforcement attached at a terminal face of the diaphragm body.

In some embodiments the normal stress reinforcement members extend substantially longitudinally along a substantial portion of an entire length of the diaphragm body at or directly adjacent each major face of the diaphragm body.

Preferably the normal stress reinforcement on one face extends to the terminal end of the diaphragm body and connects to the normal stress reinforcement on an opposing major face of the diaphragm body.

The normal stress reinforcement may be coupled external to the body and on at least one major face, or alternatively within the body, directly adjacent and substantially proximal the at least one major face so to sufficiently resist compression-tension stresses during operation.

Preferably the normal stress reinforcement is oriented approximately parallel relative the at least one major face.

Preferably normal stress reinforcement is composed of a material that is of substantially higher density than the density of the body. Preferably normal stress reinforcement material is at least 5 times the density of the body. More preferably normal stress reinforcement material is at least 10 times the density of the body. Even more preferably normal stress reinforcement material is at least 15 times the density of the body. Even more preferably normal stress reinforcement material is at least 50 times the density of the body. Most preferably normal stress reinforcement material is at least 75 times the density of the body.

Preferably the diaphragm body comprises at least one substantially smooth major face, and the normal stress reinforcement comprises at least one reinforcement member extending along one of said substantially smooth major faces. Preferably the at least one reinforcement member extends along a substantial or entire portion of the corresponding major face(s). The smooth major face may be a planar face or alternatively a curved smooth face (extending in three dimensions).

In some embodiment each normal stress reinforcement member comprise one or more substantially smooth reinforcement plates having a profile corresponding to the associated major face and configured to couple over or directly adjacent to the associated major face of the diaphragm body.

In the same or in alternative embodiments each normal stress reinforcement member comprises one or more elongate struts coupled along a corresponding major face of the diaphragm body. Preferably one or more struts extend substantially longitudinally along the major face. Preferably each normal stress reinforcement member comprises a plurality of spaced struts extending substantially longitudinally along the corresponding major face. Alternatively or in addition each normal stress reinforcement member comprises one or more struts extending at an angle relative to the longitudinal axis of the corresponding major face. The normal stress reinforcement member may comprise a network of relatively angled struts extending along a substantial portion of the corresponding major face.

Preferably the normal stress reinforcement comprises a pair of reinforcement members respectively coupled to or directly adjacent a pair of opposing major faces of the diaphragm body.

Preferably each of the at least one inner reinforcement member is separate to and coupled to the core material of the diaphragm body to provide resistance to shear deformation in the plane of the stress reinforcement separate from any resistance to shear provided by the core material.

Preferably each of the at least one inner reinforcement member extends within the core material at an angle relative to at least one of said major faces sufficient to resist shear deformation in use. Preferably the angle is between 40 degrees and 140 degrees, or more preferably between 60 and 120 degrees, or even more preferably between 80 and 100 degrees, or most preferably approximately 90 degrees relative to the major faces.

Preferably each of the at least one inner reinforcement members is embedded within and between a pair of opposing major faces of the body. Preferably each inner reinforcement member extends substantially orthogonally to the pair of opposing major faces and/or extends substantially parallel to a sagittal plane of the diaphragm body.

Preferably each inner reinforcement member is coupled at either side to either one of the opposing normal stress reinforcement members. Alternatively each inner reinforcement member extends adjacent to but separate from the opposing normal stress reinforcement members.

Preferably each inner reinforcement member extends within the core material substantially orthogonal to a coronal plane of the diaphragm body. Preferably each inner reinforcement member extends substantially towards one or more peripheral edge regions most of the associated major face distal from the center of mass location of the diaphragm.

Preferably each inner reinforcement member is a solid plate. Alternatively each inner reinforcement member comprises a network of coplanar struts. The plates and/or struts may be planar or three-dimensional.

Preferably each normal stress reinforcement member is formed from a material having a relatively high specific modulus compared to plastics material, for example a metal such as aluminum, a ceramic such as aluminium oxide, or a high modulus fiber such as in carbon fiber reinforced plastic.

Preferably each normal stress reinforcement member is formed from a material having a specific modulus of at least approximately 8 MPa/(kg/m^3), or even more preferably at least 20 MPa/(kg/m^3), or most preferably at least 100 MPa/(kg/m^3).

Preferably each inner reinforcement member is formed from a material having a relatively high maximum specific modulus compared to a non-composite plastics material, for example a metal such as aluminium, a ceramic such as aluminium oxide, or a high modulus fiber such as in carbon fiber reinforced plastic. Preferably each inner reinforcement member has a high modulus in directions approximately +45 degrees and −45 degrees relative to a coronal plane of the diaphragm body.

Preferably each inner reinforcement member is formed from a material having a specific modulus of at least approximately 8 MPa/(kg/m^3), or most preferably at least 20 MPa/(kg/m^3). For example an inner reinforcement member may be formed from aluminum or carbon fiber reinforced plastic.

Preferably the diaphragm body is substantially thick. For example, the diaphragm body may comprise a maximum thickness that is at least about 11% of a maximum length dimension of the body. More preferably the maximum thickness is at least about 14% of the maximum length dimension of the body. Alternatively or in addition the diaphragm body may comprise a maximum thickness that is at least about 15% of a length of the body, or more preferably at least about 20% of the length of the body.

Alternatively or in addition the diaphragm body may comprise a thickness greater than approximately 8% of a shortest length along a major face of the diaphragm body, or greater than approximately 12%, or greater than approximately 18% of the shortest length.

Preferably each normal stress reinforcement member is bonded to the corresponding major face of the diaphragm body via relatively thin layers of adhesive, such as epoxy adhesive for example. Preferably each inner reinforcement member is bonded to the core material and to corresponding normal stress reinforcement member(s) via relatively thin layers of epoxy adhesive. Preferably the adhesive is less than approximately 70% of a weight of the corresponding inner reinforcement member. More preferably it is less than 60%, or less than 50% or less than 40%, or less than 30%, or most preferably less than 25% of a weight of the corresponding inner reinforcement member.

In one embodiment the diaphragm body comprises a substantially triangular cross-section along a sagittal plane of the diaphragm body.

Preferably the diaphragm body comprises a wedge-shaped form.

In an alternative embodiment the diaphragm body comprises a substantially rectangular cross-section along the sagittal plane of the diaphragm body.

Preferably each inner reinforcement member comprises of an average thickness of less than a value "x" (measured in mm), as determined by the formula $$x = \frac{\sqrt{a}}{c}$$

where "a" is an area of air (measured in mm^2) capable of being pushed by the diaphragm body in use, and where "c" is a constant that preferably equals 100. More preferably c=200, or even more preferably c=400 or most preferably c=800.

In some embodiments each inner reinforcement may be made from a material less than 0.4 mm, or more preferably less than 0.2 mm, or more preferably 0.1 mm, or more preferably less than 0.02 mm thick.

In some embodiments a distribution of mass of the normal stress reinforcement is such that a relatively lower amount of mass is at a lower mass region adjacent one end of the associated major face. In some forms, the diaphragm is devoid of any normal stress reinforcement at the lower mass region. In other forms, the normal stress reinforcement comprises a reduced thickness, or reduced width, or both in the lower mass region, relative to other regions.

In some embodiment a distribution of mass of the normal stress reinforcement is such that a relatively lower amount of mass is at one or more peripheral edge regions of the associated major face. In some forms, the diaphragm is devoid of any normal stress reinforcement at the one or more peripheral regions. In other forms, the normal stress reinforcement comprises a reduced thickness, or reduced width, or both in the one or more peripheral regions, relative to other regions.

In some embodiments the diaphragm body comprises a relatively lower mass at or adjacent one end. Preferably the diaphragm body comprises a relatively lower thickness at the one end. In some embodiments the thickness of the diaphragm body is tapered to reduce the thickness towards the one end. In other embodiments the thickness of the diaphragm body is stepped to reduce the thickness towards the one. In some embodiments a thickness envelope or profile between both ends is angled at at least 4 degrees relative to a coronal plane of the diaphragm body or more preferably at least approximately 5 degrees relative to a coronal plane of the diaphragm body.

In some embodiments the diaphragm body comprises a relatively lower mass at or adjacent one end. Preferably the diaphragm body comprises a relatively lower thickness at the one end. In some embodiments the thickness of the diaphragm body is tapered to reduce the thickness towards the one end. In other embodiments the thickness of the diaphragm body is stepped to reduce the thickness towards the one. In some embodiments a thickness envelope or profile between both ends is angled at at least 4 degrees relative to a coronal plane of the diaphragm body or more preferably at least approximately 5 degrees relative to a coronal plane of the diaphragm body.

The following applies to each of the audio transducer aspects mentioned above.

Preferably the audio transducer further comprises:

(a) a transducer base structure, wherein the diaphragm is rotatably coupled relative to the transducer base structure to rotate during operation; and.

(b) a transducing mechanism operatively coupled to the diaphragm and operative in association with rotation of the diaphragm Preferably the audio transducer further comprises a hinge system rotatably coupling the diaphragm to the transducer base structure.

In some embodiments the hinge system comprises one or more parts configured to facilitate movement of the diaphragm and which contribute significantly to resisting translational displacement of the diaphragm with respect to the transducer base structure, and which has a Young's modulus of greater than approximately 8 GPa, or more preferably higher than approximately 20 GPa.

Preferably all parts of the hinge assembly that operatively support the diaphragm in use have a Young's modulus greater than approximately 8 GPa, or more preferably higher than approximately 20 GPa.

Preferably all parts of the hinge assembly that are configured to facilitate movement of the diaphragm and contribute significantly to resisting translational displacement of the diaphragm with respect to the transducer base structure, have a Young's modulus greater than approximately 8 GPa, or more preferably higher than approximately 20 GPa.

In some embodiment, the hinge system comprises a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface.

Preferably, hinge assembly further comprises a biasing mechanism and wherein the hinge element is biased towards the contact surface by a biasing mechanism.

Preferably the biasing mechanism is substantially compliant.

Preferably the biasing mechanism is substantially compliant in a direction substantially perpendicular to the contact surface at the region of contact between each hinge element and the associated contact member during operation.

In some other embodiments, the hinge system comprises at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation.

An audio device including any one of the above audio transducers and further comprising a decoupling mounting system located between the diaphragm of the audio transducer and at least one other part of the audio device for at least partially alleviating mechanical transmission of vibration between the diaphragm and the at least one other part of the audio device, the decoupling mounting system flexibly mounting a first component to a second component of the audio device Preferably the at least one other part of the audio device is not another part of the diaphragm of an audio transducer of the device. Preferably the decoupling mounting system is coupled between the transducer base structure and one other part. Preferably the one other part is the transducer housing.

In a first embodiment the audio transducer is an electro-acoustic loudspeaker and further comprises a force transferring component acting on the diaphragm for causing the diaphragm to move in use.

Preferably the transducing mechanism comprises an electromagnetic mechanism. Preferably the electromagnetic mechanism comprises a magnetic structure and an electrically conductive element.

Preferably force transferring component is attached rigidly to the diaphragm

In another aspect the invention may consist of an audio device comprising two or more electro-acoustic loudspeakers incorporating any one or more of the audio transducers of the above aspects and providing two or more different audio channels through capable of reproduction of independent audio signals. Preferably the audio device is personal audio device adapted for audio use within approximately 10 cm of the user's ear In another aspect the invention may be said to consist of a personal audio device incorporating any combination of one or more of the audio transducers and its related features, configurations and embodiments of any one of the previous audio transducer aspects.

In another aspect the invention may be said to consist of a personal audio device comprising a pair of interface devices configured to be worn by a user at or proximal to each ear, wherein each interface device comprises any combination of one or more of the audio transducers and its related features, configurations and embodiments of any one of the previous audio transducer aspects.

In another aspect the invention may be said to consist of a headphone apparatus comprising a pair of headphone interface devices configured to be worn on or about each ear, wherein each interface device comprises any combination of one or more of the audio transducers and its related features, configurations and embodiments of any one of the previous audio transducer aspects.

In another aspect the invention may be said to consist of an earphone apparatus comprising a pair of earphone interfaces configured to be worn within an ear canal or concha of a user's ear, wherein each earphone interface comprises any combination of one or more of the audio transducers and its related features, configurations and embodiments of any one of the previous audio transducer aspects.

In another aspect the invention may be said to consist of an audio transducer of any one of the above aspects and related features, configurations and embodiments, wherein the audio transducer is an acoustoelectric transducer.

In another aspect, the invention may broadly be said to consist of a diaphragm having:

- a diaphragm body having one or more major faces,
- normal stress reinforcement coupled to the body, the normal stress reinforcement being coupled adjacent at least one of said major faces for resisting compression-tension stresses experienced by the diaphragm body during operation, and
- at least one inner reinforcement member embedded within the core material and oriented at an angle relative to the normal stress reinforcement for resisting and/or substantially mitigating shear deformation experienced by the body during operation; and
- wherein a distribution of mass of the normal stress reinforcement is such that a relatively lower amount of mass is at one or more peripheral edge regions of the associated major face distal from an assembled center of mass location the diaphragm.

Preferably the one or more regions distal from the center of mass location are one or more regions most distal from the center of mass location.

In some embodiments one or more regions most distal from the center of mass location are devoid of any normal stress reinforcement.

In some embodiments the normal stress reinforcement comprises a reinforcement plate wherein a region of the plate distal from said center of mass location comprises one or more recesses. Preferably a pair of opposed regions distal from the center of mass location comprise one or more recesses. Preferably a width of each recess increases depending on distance from said center of mass location.

In some embodiments, at least one recess in the normal stress reinforcement is located between a pair of inner reinforcement members.

In some embodiments the normal stress reinforcement comprises a reinforcement plate wherein a region of the plate distal from said center of mass location comprises a reduced thickness relative to a region at or proximal the center of mass location.

The thickness of the plate may be stepped or tapered between the proximal region and the distal region.

In a third aspect the invention may broadly be said to consist of a diaphragm having:

- a diaphragm body having one or more major faces,
- normal stress reinforcement coupled to the body, the normal stress reinforcement being coupled adjacent at least one of said major faces for resisting compression-tension stresses experienced by the body during operation, and
- at least one inner reinforcement member embedded within the body and oriented at an angle relative to the normal stress reinforcement for resisting and/or mitigating shear deformation experienced by the body during operation; and
- wherein the diaphragm body comprises a relatively lower mass at one or more regions distal from a center of mass location of the diaphragm.

Preferably the diaphragm body comprises a relatively lower thickness at one or more regions distal from the center of mass location.

Preferably the one or more regions distal from the center of mass location are a most distal region(s) from the center of mass location.

In some embodiments the thickness of the diaphragm body is tapered to reduce the thickness towards the distal region. In other embodiments the thickness of the diaphragm body is stepped to reduce the thickness towards the distal region.

In some embodiments the diaphragm body comprises a relatively lower mass at the one or more regions distal from a center of mass location of the diaphragm.

Preferably one or more peripheral regions most distal from the center of mass are substantially linearly apexed.

In a fourth aspect the invention may broadly be said to consist of an audio transducer diaphragm having:

- a diaphragm body composed of a core material having one or more major faces,
- normal stress reinforcement coupled to the body, the normal stress reinforcement being coupled adjacent at least one of said major faces for resisting compression-tension stresses experienced by the body during operation, and
- at least one inner reinforcement member embedded within the body and oriented at an angle relative to the normal stress reinforcement for resisting and/or mitigating shear deformation experienced by the body during operation; and
- wherein the diaphragm comprises a relatively lower mass at one or more regions distal from a center of mass location of the diaphragm.

Preferably the one or more regions distal from the center of mass location are one or more regions most distal from the center of mass location.

Preferably a distribution of mass of the normal stress reinforcement is such that a relatively lower amount of mass is at one or more peripheral edge regions of the associated major face distal from the center of mass location. Alternatively or in addition the diaphragm body comprises a relatively lower mass at the one or more peripheral regions of the diaphragm distal from a center of mass location of the diaphragm.

Preferably the diaphragm body comprises a relatively lower thickness at the one or more distal regions and a distribution of mass of the normal stress reinforcement is such that a relatively lower amount of mass is at or the one or more distal regions.

Preferably the one or more regions distal from the center of mass location are one or more regions most distal from the center of mass location.

In some embodiments one or more regions most distal from the center of mass location are devoid of any normal stress reinforcement.

In some embodiments the normal stress reinforcement comprises a reinforcement plate wherein a region of the plate distal from said center of mass location comprises one or more recesses. Preferably a pair of opposed regions distal from the center of mass location comprise one or more recesses. Preferably a width of each recess increases depending on distance from said center of mass location.

In some embodiments, at least one recess in the normal stress reinforcement is located between a pair of inner reinforcement members.

In some embodiments the normal stress reinforcement comprises a reinforcement plate wherein a region of the plate distal from said center of mass location comprises a reduced thickness relative to a region at or proximal the center of mass location.

In another aspect, the invention may broadly be said to consist of an audio transducer comprising:

- a diaphragm having
  - a diaphragm body having one or more major faces, and
  - normal stress reinforcement coupled to the body, the normal stress reinforcement being coupled adjacent at least one of said major faces for resisting compression-tension stresses experienced by the body during operation; and
  - wherein a distribution of mass of the normal stress reinforcement is such that a relatively lower amount of mass is at one or more regions distal from a centre of mass location of the diaphragm; and
- a housing comprising an enclosure and/or baffle for accommodating the diaphragm; and
- wherein the diaphragm comprises a periphery that is at least partially free from physical connection with an interior of the housing.

Preferably the diaphragm comprises one or more peripheral regions that are free from physical connection with the interior of the housing.

Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

In some embodiment, regions of the outer periphery most distal from a center of mass location of the diaphragm are less supported by an interior of the housing than regions that are proximal to the center of mass location.

Preferably one or more regions most distal from the center of mass location are devoid of any normal stress reinforcement.

Preferably the diaphragm body comprises a relatively lower mass at one or more regions distal from the center of mass location.

Preferably the diaphragm body comprises a relatively lower thickness at the one or more distal regions. The thickness may be tapered towards the one or more distal regions or stepped.

In one embodiment the thickness of the diaphragm body is continually tapered from a region at or proximal the center of mass location to the one or more most distal regions from the center of mass location.

Preferably the one or more distal regions of the diaphragm body are aligned with the one or more distal regions of the normal stress reinforcement.

In another aspect, the invention may broadly be said to consist of an audio transducer comprising:

- a diaphragm having:
  - a diaphragm body having one or more major faces, and
  - normal stress reinforcement coupled to the body, the normal stress reinforcement being coupled adjacent at least one of said major faces for resisting compression-tension stresses experienced by the body during operation; and
  - wherein at least one major face is devoid of any normal stress reinforcement at one or more peripheral edge regions, each peripheral edge region being located at or beyond a radius centred around a centre of mass location of the diaphragm that is 50 percent of a total distance from the centre of mass location to a most distal peripheral edge of the major face; and
- a housing comprising an enclosure and/or baffle for accommodating the diaphragm; and
- wherein the diaphragm comprises an outer periphery that is at least partially free from physical connection with an interior of the housing.

Preferably the diaphragm comprises one or more peripheral regions that are free from physical connection with the interior of the housing. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery. Preferably each one or more peripheral edge regions is located at or beyond 80 percent of the total distance from the centre of mass location to the most distal peripheral edge of the major face.

Preferably the normal stress reinforcement comprises a pair of reinforcement members coupled to opposing major faces of the diaphragm body.

Preferably at least 10 percent of a total surface area of the one or more major faces is devoid of normal stress reinforcement or at least 25%, or at least 50% of the total surface of the one or more major faces is devoid of normal stress reinforcement.

Preferably the diaphragm comprises a relatively lower mass per unit area at one or more of peripheral edge regions distal from the center of mass.

Preferably the diaphragm comprises a relatively lower mass, per unit area with respect to a coronal plane of the diaphragm, or alternatively with respect to a plane of a major face, of the diaphragm body at one or more of the peripheral edge regions of the diaphragm.

Preferably the diaphragm body comprises a relatively lower thickness at the one or more peripheral edge regions of the diaphragm. The thickness may be tapered towards the one or more distal peripheral edge regions or stepped.

In a seventh aspect, the invention may broadly be said to consist of an audio transducer comprising:

- a diaphragm comprising a diaphragm body having one or more major faces, and
- normal stress reinforcement coupled to the body, the normal stress reinforcement being coupled adjacent at least one of said major faces for resisting compression-tension stresses experienced by the body during operation;
- wherein the normal stress reinforcement comprises a reinforcement member on one or more of said major faces, and each reinforcement member comprises a series of struts;
- a housing comprising an enclosure and/or baffle for accommodating the diaphragm; and
- wherein the diaphragm comprises an outer periphery that is at least partially free from physical connection with an interior of the housing.

Preferably the diaphragm comprises one or more peripheral regions that are free from physical connection with the interior of the housing. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

Preferably said struts have reduced thickness in one or more regions distal to a centre of mass location of the diaphragm.

Preferably each strut comprises of a thickness greater than $1/100^{th}$ of its width. More preferably each strut comprises a thickness greater than $1/60^{th}$ of its width. Most preferably each strut comprises a thickness greater than $1/20^{th}$ of its width.

Preferably the one or more normal stress reinforcement members is (are) formed from anisotropic material.

Preferably the anisotropic normal stress reinforcement member is formed from a material having a specific modulus of at least 8 MPa/(kg/m^3), or more preferably at least 20 MPa/(kg/m^3), or most preferably at least 100 MPa/(kg/m^3).

Preferably the anisotropic material is a fiber composite material where fibers are laid in a substantially unidirectional orientation through each strut. Preferably the fibers are laid in substantially the same orientation as a longitudinal axis of the associated strut. Preferably each strut is formed from a unidirectional carbon fiber composite material. Preferably said composite material incorporates carbon fibers which have a Young's modulus of at least approximately 100 GPa, and more preferably higher than 200 GPa and most preferably higher than 400 GPa.

Preferably the normal stress reinforcement comprises a pair of reinforcement members coupled to opposing major faces of the diaphragm body and wherein one or more struts of a first reinforcement member of one major face are connected with one or more struts of a second reinforcement member of the opposing major face, at a periphery of the diaphragm body.

Preferably the first and second reinforcement members form a triangular reinforcement that supports the diaphragm body against displacements in a direction substantially perpendicular to a coronal plane of the diaphragm body.

Preferably each reinforcement member comprises a plurality of struts. Preferably the plurality of struts are intersecting. Preferably regions of intersection between the struts are located at or beyond 50 percent of a total distance from the center of mass location of the diaphragm to a periphery of the diaphragm. Other regions of intersection may also be located within 50 percent of the total distance.

Preferably at least one major face of the diaphragm body is devoid of any normal stress reinforcement at one or more peripheral edge regions of the associated major face, each peripheral edge region being located at or beyond a radius centered around the center of mass location and that is 50 percent of a total distance from the center of mass location to a most distal peripheral edge of the major face.

Preferably the normal stress reinforcement comprises a pair of reinforcement members coupled to opposing major faces of the diaphragm body and wherein the both major faces are devoid of any normal stress reinforcement in the associated peripheral edge regions.

Preferably at least 10 percent of a total surface area of the one or more major faces is devoid of normal stress reinforcement, or at least 25%, or at least 50%, in the one or more peripheral edge regions.

Preferably the diaphragm body comprises a relatively lower mass at one or more regions distal from a center of mass location of the diaphragm.

Preferably the diaphragm body comprises a relatively lower thickness at the one or more distal regions. The thickness may be tapered towards the one or more distal regions or stepped.

In a first embodiment of any one of the previously stated audio transducer aspects and their related features, embodiments, and configurations, the audio transducer is an electroacoustic loudspeaker and further comprises a force transferring component acting on the diaphragm for causing the diaphragm to move in use.

Preferably the audio transducer further comprises:

- a transducer base structure; and
- a transducing mechanism; and wherein the diaphragm is moveably coupled to the transducer base structure and operatively coupled to the transducing mechanism such that during operation, movement of the diaphragm relative to the base structure transduces electrical audio signals received by the transducing mechanism into sound.

Preferably the transducer base structure comprises a substantially thick and squat geometry.

Preferably the transducing mechanism comprises an electromagnetic mechanism. Preferably the electromagnetic mechanism comprises a magnetic structure and an electrically conductive element. Preferably the magnetic structure is coupled to and forms part of the transducer base structure and the electrically conductive element is coupled to and forms part of the diaphragm. Preferably the magnetic structure comprises a permanent magnet, and inner and outer pole pieces separate by a gap and generating a magnetic field therebetween. Preferably the electrically conductive element comprises at least one coil winding. Preferably the diaphragm comprises a diaphragm base frame and the electrically conductive element is rigidly coupled to the diaphragm base frame.

In a first configuration the diaphragm is rotatably coupled relative to the transducer base structure. Preferably the diaphragm base frame is located at one end of the diaphragm and is rigidly coupled thereto. Preferably the audio transducer further comprises a hinge system for rotatably coupling the diaphragm to the transducer base structure.

Preferably the diaphragm oscillates about the axis of rotation during operation.

In one form, the hinge system comprises a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface. Preferably, hinge assembly further comprises a biasing mechanism and wherein the hinge element is biased towards the contact surface by a biasing mechanism. Preferably the biasing mechanism is substantially compliant. Preferably the biasing mechanism is substantially compliant in a direction substantially perpendicular to the contact surface at the region of contact between each hinge element and the associated contact member during operation In another form, the hinge system comprises at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation.

In a second configuration the audio transducer is a linear action transducer where the diaphragm is linearly moveable relative to the transducer base structure. Preferably the diaphragm base frame is coupled to a central region of the diaphragm and extends laterally from a major face of the structure toward the magnetic structure.

Preferably at least one audio transducer comprises a diaphragm suspension connecting the diaphragm only partially about the perimeter of the periphery to a housing or surrounding structure. Preferably the suspension connects the diaphragm along a length that is less than 80% of the perimeter of the periphery. Preferably the suspension connects the diaphragm along a length that is less than 50% of the perimeter of the periphery. Preferably the suspension connects the diaphragm along a length that is less than 20% of the perimeter of the periphery.

In a second embodiment of any one of the previously stated audio transducer aspects and their related features, embodiments, and configurations, the audio transducer is an is an acousto-electric transducer and further comprises a force transferring component configured to be acted upon by the diaphragm in use for creating electrical energy in response to diaphragm movement.

In another aspect, the invention may broadly be said to consist of an audio transducer, comprising:

- a diaphragm comprising:
  - a diaphragm body having one or more major faces, and
  - normal stress reinforcement coupled to the body, the normal stress reinforcement being coupled adjacent at least one of said major faces for resisting compression-tension stresses experienced by the body during operation; and
- a hinge assembly configured to operatively support the diaphragm about an axis of rotation in use;
- and wherein at least one major face is devoid of any normal stress reinforcement at one or more peripheral edge regions of the major face, the peripheral edge region being located at or beyond a radius centred around the axis of rotation and that is 80 percent of a total distance from the axis of rotation to a most distal peripheral edge of the major face.

Preferably the diaphragm body is substantially thick. Preferably the diaphragm body comprises a maximum thickness that is at least 11% of a maximum length of the diaphragm body, or more preferably at least 14% of a maximum length of the diaphragm body.

Preferably the diaphragm body comprises of a maximum thickness that is at least 15% of a total distance from the axis of rotation to a most distal peripheral region of the diaphragm. More preferably the maximum thickness is at least 20% of the total distance.

In another aspect the invention may broadly be said to consist of an audio transducer comprising:

- a diaphragm comprising:
  - a diaphragm body having one or more major faces,
  - normal stress reinforcement coupled to the body, the normal stress reinforcement being coupled adjacent at least one of said major faces for resisting compression-tension stresses experienced at or adjacent the face of the body during operation, and
  - at least one inner reinforcement member embedded within the body and oriented at an angle relative to the normal stress reinforcement for resisting and/or substantially mitigating shear deformation experienced by the body during operation; and
- a hinge assembly coupled to the diaphragm for rotating the diaphragm about an associated axis of rotation in use.

The hinge assembly may be directly coupled to the diaphragm or indirectly coupled via one or more intermediate components.

Preferably the one or more major faces are substantially planar.

Preferably each of the at least one inner reinforcement member is oriented substantially parallel to a sagittal plane of the diaphragm body. Preferably each of the at least one inner reinforcement member comprises a longitudinal axis substantially perpendicular to the axis of rotation of the hinge assembly and/or substantially parallel to a longitudinal axis of the diaphragm body. Preferably each of the at least one inner reinforcement member extends between a region at or proximal the axis of rotation and an opposing end of the diaphragm body.

Preferably each of the at least one inner reinforcement member comprises at least one panel extending transversely across a substantial portion of a thickness of the diaphragm body and longitudinally along a substantial portion of a length of the diaphragm body.

Preferably each of the at least one inner reinforcement member is rigidly coupled to the hinge assembly, either directly or via at least one intermediary components.

The intermediary components may be made from a material with a Young's modulus greater than approximately 8 GPa, or more preferably higher than approximately 20 GPa.

Preferably the intermediary component(s) incorporate a substantially planar section oriented at an angle greater than approximately 30 degrees to a coronal plane of the diaphragm body and substantially parallel to an axis of rotation of the diaphragm to transfer load in direction parallel to the coronal plane, between the hinging mechanism and the inner reinforcement members with minimal compliance.

In one embodiment the electro-acoustic transducer is, or is part of an electro-acoustic loudspeaker comprising an excitation mechanism having a force transferring component acting on the diaphragm for causing the diaphragm to move in use.

Preferably the electro-acoustic loudspeaker is configured in an audio device using two or more different audio channels through a configuration of two or more electro-acoustic loudspeakers.

Preferably each of the at least one inner reinforcement member is rigidly connected to the force transferring component, either directly or via at least one intermediary components.

Preferably the normal stress reinforcement comprises one or more normal stress reinforcement members on either one of a pair of opposing major faces of the diaphragm body.

Preferably the one or more normal stress reinforcement members on either major face are rigidly connected to the force transferring component, either directly or via one or more intermediary components.

Preferably the one or more normal stress reinforcement members on either major face are rigidly connected to the hinge assembly, either directly or via one or more intermediary components.

Preferably any intermediary components facilitating rigid connections between any one or more of: the at least one inner reinforcement member and the hinge assembly, the at least one inner reinforcement member and the force transferring component, the one or more normal stress reinforcement members and the hinge assembly and/or the one or more normal stress reinforcement members and the force transferring component, are formed from a substantially rigid material such as steel, carbon fibre. Preferably the intermediary components are not formed from a plastics material.

Preferably a thickness of the diaphragm body reduces from the axis of rotation to the opposing terminal end of the diaphragm body. Preferably the thickness is tapered between the axis of rotation and an opposing terminal end of the diaphragm body.

Preferably a distribution of mass of the normal stress reinforcement is such that a relatively lower amount of mass is located in one or more regions at or proximal the terminal end of the diaphragm body relative to an amount of mass located in one or more regions proximal the axis of rotation.

Preferably one or more regions on either major face proximal the terminal end of the diaphragm body are devoid of normal stress reinforcement.

Preferably the one or more regions are located between adjacent the at least one inner reinforcement member.

Alternatively or in addition the one or more regions of relatively lower mass normal stress reinforcement comprises normal stress reinforcement of reduced thickness relative to the normal stress reinforcement located in one or more regions proximal to the axis of rotation.

Preferably the diaphragm comprises less than six inner reinforcement members. Preferably the diaphragm comprises four inner reinforcement members.

Preferably the normal stress reinforcement members extend substantially longitudinally along a substantial portion of an entire length of the diaphragm body at or directly adjacent each major face of the diaphragm body.

Preferably there is no support and/or no similar normal reinforcement attached to the outside of the sides of the diaphragm body.

Preferably there is no support and/or similar normal reinforcement attached at a terminal face of the diaphragm body. Preferably there is no skin or paint of any kind. Preferably if there is paint this is substantially thin and lightweight. Preferably if a core material of the diaphragm body is expanded polystyrene foam or similar this is cut mechanically rather than melted, for example with a hot wire, since this typically creates a higher density melt layer.

Preferably the normal stress reinforcement terminates at or prior to the terminal end of the diaphragm body on both major faces.

Alternatively the normal stress reinforcement on one face extends to the terminal end of the diaphragm body and connects to the normal stress reinforcement on an opposing major face of the diaphragm body.

In another aspect the invention may broadly be said to consist of an audio transducer comprising:

- a diaphragm comprising:
  - a diaphragm body having one or more major faces,
  - normal stress reinforcement coupled to the body, the normal stress reinforcement being coupled adjacent at least one of said major faces for resisting compression-tension stresses experienced at or adjacent the face of the body during operation, and
  - at least one inner reinforcement member embedded within the body and oriented at an angle relative to the normal stress reinforcement for resisting and/or substantially mitigating shear deformation experienced by the body during operation; and
- a hinge assembly comprising one or more thin-walled flexible hinge elements that operatively support the diaphragm in use.

Preferably the audio transducer further comprises a transducer base structure and wherein the hinge assembly rotatably couples the diaphragm relative to the transducer base structure.

Preferably the hinge assembly comprises at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation.

In one form, the audio transducer comprises a diaphragm base frame for supporting the diaphragm, the diaphragm base frame being directly attached to one or both hinge elements of each hinge joint.

Preferably the diaphragm base frame facilitates a rigid connection between the diaphragm and each hinge joint.

Preferably the diaphragm is closely associated with each hinge joint. For example, a distance from the diaphragm to each hinge joint, is less than half the maximum distance from the axis of rotation to a most distal periphery of the diaphragm, or more preferably less than ⅓ the maximum distance, or more preferably less than ¼ the maximum distance, or more preferably less than ⅛ the maximum distance, or most preferably less than 1/16 the maximum distance.

In some embodiments, each flexible hinge element of each hinge joint is substantially flexible with bending. Preferably each hinge element is substantially rigid against torsion.

In alternative embodiment, each flexible hinge element of each hinge joint is substantially flexible in torsion. Preferably each flexible hinge element is substantially rigid against bending.

In some embodiments, each hinge element comprises an approximately or substantially planar profile, for example in a flat sheet form.

In some embodiments, the pair of flexible hinge elements of each joint are connected or intersect along a common edge to form an approximately L-shaped cross section. In some other configurations, the pair of flexible hinge elements of each hinge joint intersect along a central region to form the axis of rotation and the hinge elements form an approximately X-shaped cross section, i.e. the hinge elements form a cross spring arrangement. In some other configurations the flexible hinge elements of each hinge joint are separated and extend in different directions.

In one form, the axis of rotation is approximately collinear with the intersection between the hinge elements of each hinge joint.

In some embodiments, each flexible hinge element of each hinge joint comprises a bend in a transverse direction and along the longitudinal length of the element. The hinge elements may be slightly bend such that they flex into a substantially planar state during operation.

In some embodiments, the thickness of one or both of the hinge elements of each hinge joint increases at or proximal to an end of the hinge element most distal from diaphragm or transducer base structure.

In another aspect the invention may broadly be said to consist of an audio transducer comprising:

- a diaphragm having:
  - a diaphragm body having one or more major faces,
  - normal stress reinforcement coupled to the body, the normal stress reinforcement being coupled adjacent at least one of said major faces for resisting compression-tension stresses experienced at or adjacent the face of the body during operation, and
  - at least one inner reinforcement member embedded within the body and oriented at an angle relative to the normal stress reinforcement for resisting and/or substantially mitigating shear deformation experienced by the body during operation;
- a hinge system operatively supporting the diaphragm and having one or more hinge joints, each hinge joint comprising a first hinge element and a contact member, the contact member providing a contact surface,
- when in use, each hinge joint is configured to allow the hinge element to move relative to the contact member.

Preferably for each hinge joint the contact member has a contact surface; and wherein, during operation each hinge joint is configured to allow the hinge element to move relative to the associated contact member while maintaining a substantially consistent physical contact with the contact surface, and the hinge assembly biases the hinge element towards the contact surface.

Preferably the audio transducer further comprises a transducer base structure and the hinge assembly rotatably couples the diaphragm to the transducer base structure to enable the diaphragm to rotate during operation about an axis of rotation or approximately axis of rotation of the hinge assembly. Preferably the diaphragm oscillates about the axis of rotation during operation.

Preferably the substantially consistent physical contact comprises a substantially consistent force.

Preferably the hinge assembly is configured to apply a biasing force to the hinge element of each joint toward the associated contact surface, compliantly.

Preferably, hinge assembly further comprises a biasing mechanism and wherein the hinge element is biased towards the contact surface by a biasing mechanism.

In one form, the biasing mechanism applies a biasing force in a direction with an angle of less than 25 degrees, or less than 10 degrees, or less than 5 degrees to an axis perpendicular to the contact surface in the region of contact between each hinge element and the associated contact member during operation.

Preferably, the biasing mechanism applies a biasing force in a direction substantially perpendicular to the contact surface at the region of contact between each hinge element and the associated contact member during operation.

Preferably the biasing mechanism is substantially compliant. Preferably the biasing mechanism is substantially compliant in a direction substantially perpendicular to the contact surface at the region of contact between each hinge element and the associated contact member during operation.

Preferably the contact between the hinge element and the contact member substantially rigidly restrains the hinge element against translational movements relative to the contact member in a direction perpendicular to the contact surface at the region of contact during operation.

In one embodiment the biasing mechanism is separate to the structure that rigidly restrains the hinge element against translational movements relative to the contact member in a direction perpendicular to the contact surface at the region of contact between each hinge element and the associated contact member.

In another aspect the invention may broadly be said to consist of an audio transducer, comprising:

- a diaphragm having:
  - a diaphragm body having one or more major faces, wherein a maximum thickness of the diaphragm body is greater than 11% of a maximum length of the body; and
- a hinge assembly coupled to the diaphragm for rotating the diaphragm about an associated axis of rotation in use,
- wherein the audio transducer is an electro-acoustic loudspeaker adapted for audio use within approximately 10 cm of the user's ear.

In another aspect the invention may broadly be said to consist of an audio device configured for normal use directly adjacent or in direct association with a user's ears or head, the audio device including at least one audio transducer comprising:

a diaphragm having:

a diaphragm body having one or more major faces, wherein a maximum thickness of the diaphragm body is greater than 11% of a maximum length of the body; and a hinge system coupled to the diaphragm for rotating the diaphragm about an associated axis of rotation in use.

Preferably the audio transducer is an electro-acoustic loudspeaker and the audio device is adapted for audio use within approximately 10 cm of the user's ear.

Preferably the audio device further comprises a housing for accommodating the at least one audio transducer therein.

Preferably the diaphragm body of the audio transducer comprises an outer periphery that is at least partially free from physical connection with an interior of the housing along at least a portion of the periphery.

In another aspect the invention may broadly be said to consist of an audio transducer comprising:

a diaphragm:

a diaphragm body having one or more major faces, wherein a maximum thickness of the diaphragm body is greater than 11% of a maximum length of the body; and normal stress reinforcement coupled to the body, the normal stress reinforcement being coupled adjacent at least one of said major faces for resisting compression-tension stresses experienced at or adjacent the face of the body during operation; and wherein at least one major face is devoid of any normal stress reinforcement at one or more peripheral edge regions, each peripheral edge region being located at or beyond a radius centered around a center of mass location of the diaphragm and that is 50 percent of a total distance from the center of mass location to a most distal peripheral edge of the major face; and a housing comprising an enclosure and/or baffle for accommodating the diaphragm; and wherein the diaphragm comprises an outer periphery that is at least partially free from physical connection with an interior of the housing.

Preferably the diaphragm comprises one or more peripheral regions that are free from physical connection with the interior of the housing. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

Preferably there is a small air gap between the one or more peripheral regions of the diaphragm periphery that are free from physical connection with the interior of the housing, and the interior of the housing.

Preferably a width of the air gap defined by the distance between the peripheral edge regions of the diaphragm and the housing is less than 1/10$^{th}$, and more preferably less than 1/20$^{th}$ of a shortest length along a major face of the diaphragm body.

Preferably the air gap width is less than 1/20$^{th}$ of the diaphragm body length. Preferably the air gap width is less than 1 mm.

In another aspect the invention may broadly be said to consist of an audio transducer, comprising:

a diaphragm having:

a diaphragm body composed of a core material having one or more major faces, wherein a maximum thickness of the diaphragm body is greater than 11% of a maximum length of the body; and at least one inner reinforcement member embedded within the core material and oriented at an angle relative to the one or more major faces for resisting and/or substantially mitigating shear deformation experienced by the core material during operation;

a force transferring component acting on the diaphragm for moving the diaphragm in use; and wherein the audio transducer is an electro-acoustic loudspeaker adapted for audio use within approximately 10 cm of a user's ear.

In another aspect the invention may broadly be said to consist of an audio device configured for normal use directly adjacent or in direct association with a user's ears or head, the audio device including at least one audio transducer comprising:

a diaphragm having:

a diaphragm body composed of a core material having one or more major faces, wherein a maximum thickness of the diaphragm body is greater than 11% of a maximum length of the body; and at least one inner reinforcement member embedded within the core material and oriented at an angle relative to the one or more major faces for resisting and/or substantially mitigating shear deformation experienced by the core material during operation; and a force transferring component acting on the diaphragm for moving the diaphragm in use.

In another aspect the invention may broadly be said to consist of an audio transducer comprising:

a diaphragm having:

a diaphragm body having one or more major faces, normal stress reinforcement coupled to the body, the normal stress reinforcement being coupled adjacent at least one of said major faces for resisting compression-tension stresses experienced at or adjacent the face of the body during operation, and at least one inner reinforcement member embedded within the body and oriented at an angle relative to the normal stress reinforcement for resisting and/or substantially mitigating shear deformation experienced by the body during operation, a transducer base structure, and a hinge assembly, wherein the diaphragm is operatively supported by the hinge assembly to rotate about an approximate axis of rotation relative to the transducer base structure, and wherein the hinge assembly comprises one or more parts configured to facilitate movement of the diaphragm and which contribute significantly to resisting translational displacement of the diaphragm with respect to the transducer base structure, and which has a Young's modulus of greater than approximately 8 GPa, or more preferably higher than approximately 20 GPa.

Preferably all parts of the hinge assembly that operatively support the diaphragm in use have a Young's modulus greater than approximately 8 GPa, or more preferably higher than approximately 20 GPa.

Preferably all parts of the hinge assembly that are configured to facilitate movement of the diaphragm and contribute significantly to resisting translational displacement of the diaphragm with respect to the transducer base structure, have a Young's modulus greater than 0.1 GPa.

In another aspect, the present invention may broadly be said to consist of an audio transducer comprising:

- a diaphragm having a diaphragm body that remains substantially rigid during operation;
- a hinge system configured to operatively support the diaphragm in use, and comprising a hinge assembly having one or more hinge joints, wherein each hinge joint comprises a hinge element and a contact member, the contact member having a contact surface; and
- wherein, during operation each hinge joint is configured to allow the hinge element to move relative to the associated contact member while maintaining a substantially consistent physical contact with the contact surface, and the hinge assembly biases the hinge element towards the contact surface.

Preferably the audio transducer further comprises a transducer base structure and the hinge assembly rotatably couples the diaphragm to the transducer base structure to enable the diaphragm to rotate during operation about an axis of rotation or approximately axis of rotation of the hinge assembly. Preferably the diaphragm oscillates about the axis of rotation during operation.

Preferably the substantially consistent physical contact comprises a substantially consistent force.

Preferably the hinge assembly is configured to apply a biasing force to the hinge element of each joint toward the associated contact surface, compliantly.

Preferably the diaphragm has a substantially rigid diaphragm body.

Preferably, hinge assembly further comprises a biasing mechanism and wherein the hinge element is biased towards the contact surface by a biasing mechanism.

In one form, the biasing mechanism applies a biasing force in a direction with an angle of less than 25 degrees, or less than 10 degrees, or less than 5 degrees to an axis perpendicular to the contact surface in the region of contact between each hinge element and the associated contact member during operation.

Preferably, the biasing mechanism applies a biasing force in a direction substantially perpendicular to the contact surface at the region of contact between each hinge element and the associated contact member during operation.

Preferably the biasing mechanism is substantially compliant. Preferably the biasing mechanism is substantially compliant in a direction substantially perpendicular to the contact surface at the region of contact between each hinge element and the associated contact member during operation.

Preferably the biasing mechanism is substantially compliant. Preferably the biasing mechanism is substantially compliant in terms of that it applies a biasing force as opposed to a biasing displacement, in a direction substantially perpendicular to the contact surface at the region of contact between each hinge element and the associated contact member during operation.

Preferably the biasing mechanism is substantially compliant. Preferably the biasing mechanism is substantially compliant in terms of that the biasing force does not change greatly if, in use, the hinge element shifts slightly in a direction substantially perpendicular to the contact surface at the region of contact between each hinge element and the associated contact member during operation.

Preferably the contact between the hinge element and the contact member substantially rigidly restrains the hinge element against translational movements relative to the contact member in a direction perpendicular to the contact surface at the region of contact during operation.

In one embodiment the biasing mechanism is separate to the structure that rigidly restrains the hinge element against translational movements relative to the contact member in a direction perpendicular to the contact surface at the region of contact between each hinge element and the associated contact member.

In one embodiment the diaphragm comprises the biasing mechanism.

Preferably when additional forces are applied to the hinge element and the vector representing the net force passes through the location of the hinge elements physical contact with the contact surface, and when the net force is small compared to the biasing force, the consistent physical contact between the hinge element and the contact member rigidly restrains the contacting part of the hinge element against translational movements relative to the transducer base structure, where the hinge element contacts the contact member, in a direction perpendicular to the contact surface at the point of contact.

Preferably when additional forces are applied to the hinge element and the vector representing the net force passes through the location of the hinge elements physical contact with the contact surface, and when the net force is small compared to the biasing force, the consistent physical contact between the hinge element and the contact member effectively rigidly restrains the contacting part of the hinge element against all translational movements relative to the transducer base structure at the point of contact.

Preferably the biasing mechanism is sufficiently compliant such that:

- when the diaphragm is at a neutral position during operation; and
- an additional force is applied to the hinge element from the contact member, in a direction through the a region of contact of the hinge element with the contact surface that is perpendicular to the contact surface; and
- the additional force is relatively small compared to the biasing force so that no separation between the hinge element and contact member occurs;
- the resulting change in a reaction force exerted by the contact member on the hinge element is larger than the resulting change in the force exerted by the biasing mechanism.

Preferably the resulting change is at least four times larger, more preferably at least 8 times larger and most preferably at least 20 times larger.

Preferably the biasing structure compliance excludes compliance associated with and in the region of contact between non-joined components within the biasing mechanism, compared to the contact member.

Preferably the diaphragm body maintains a substantially rigid form over the FRO of the transducer, during operation.

Preferably the diaphragm is rigidly connected with the hinge assembly.

Preferably the diaphragm maintains a substantially rigid form over the FRO of the transducer, during operation.

In some embodiments the diaphragm comprises a single diaphragm body. In alternative embodiments the diaphragm comprises a plurality of diaphragm bodies.

Preferably the contact between the hinge element and the contact member rigidly restrains the hinge element against all translational movements relative to the contact member.

Preferably the axis of rotation coincides with the contact region between the hinge element and the contact surface of each hinge joint.

In one configuration one or more components of the hinge assembly is rigidly connected to the transducer base structure.

Preferably the hinge element is rigidly connected as part of the diaphragm.

Preferably, the contact member is rigidly connected as part of the transducer base structure.

Preferably one of either the hinge element or the contact member is rigidly connected as part of the diaphragm and the other is rigidly connected as part of the transducer base structure.

Preferably, in a region of contact between each hinge element and the associated contact surface, one of the hinge element and the contact member is effectively rigidly connected to the diaphragm, and the other is effectively rigidly connected to the transducer base structure.

In one embodiment the substantially consistent physical contact comprises a substantially consistent force and in a region of contact between each hinge element and the associated contact surface, one of the hinge element and the contact member is effectively rigidly connected to the diaphragm, and the other is effectively rigidly connected to the transducer base structure. Preferably the hinge assembly is configured to apply a biasing force to the hinge element of each joint toward the associated contact surface, compliantly. Preferably the hinge assembly is configured to apply a biasing force to the hinge element of each joint toward the associated contact surface, compliantly.

Preferably the diaphragm body comprises a maximum thickness that is greater than 15% of a length from the axis of rotation to an opposing, most distal, terminal end of the diaphragm, or more preferably greater than 20%.

Preferably the diaphragm body is in close proximity to or in contact with the contact surface.

Preferably the distance from the diaphragm body to the contact surface is less than half a total distance from the axis of rotation to a furthest periphery of the diaphragm body, or more preferably less than ¼ of the total distance, or more preferably less than ⅛ the total distance, or most preferably less than 1/16 of the total distance.

Preferably at all times during normal operation a region of the contact member of each hinge joint that is in close proximity to the contact surface is effectively rigidly connected to the transducer base structure.

Preferably at all times during normal operation a region of contact between the contact surface and the hinge element of each hinge joint is effectively substantially immobile relative to both the diaphragm and the transducer base structure in terms of translational displacements.

Preferably one of the diaphragm and transducer base structure is effectively rigidly connected to at least a part of the hinge element of each hinge joint in the immediate vicinity of the contact region, and the other of the diaphragm and transducer base structure is effectively rigidly connected to at least a part of the contact member of each hinge joint in the immediate vicinity of the contact region.

Preferably whichever of the contact member or hinge element of each hinge joint that comprises a smaller contact surface radius, in cross-sectional profile in a plane perpendicular to the axis of rotation, is less than 30%, more preferably less than 20%, and most preferably less than 10% of a greatest length from the contact region, in a direction perpendicular to the axis of rotation, across all components effectively rigidly connected to a localised part of the component which is immediately adjacent to the contact region.

Preferably whichever of the contact member or hinge element of each hinge joint that comprises a smaller contact surface radius, in cross-sectional profile in a plane perpendicular to the axis of rotation, is less than 30%, more preferably less than 20%, and most preferably less than 10% of a distance, in a direction perpendicular to the axis of rotation, across the smaller out of:

The maximum dimension across all components effectively rigidly connected to the part of the contact member immediately adjacent to the point of contact with the hinge assembly, and:

The maximum dimension across all components effectively rigidly connected to the part of the hinge element immediately adjacent to the point of contact with the contact member.

Preferably the hinge element of each hinge joint comprises a radius at the contact surface that is less than 30%, more preferably less than 20%, and most preferably less than 10% of: a length from the contact region, in a direction perpendicular to the axis of rotation to a terminal end of the diaphragm, and/or a length of the diaphragm body. Alternatively the contact member of each hinge joint comprises a radius at the contact surface that is less than 30%, more preferably less than 20%, and most preferably less than 10% of: a length from the contact region, in a direction perpendicular to the axis of rotation to a terminal end of the transducer base structure, and/or a length of the transducer base structure.

In some configurations, the hinge assembly comprises a single hinge joint to rotatably couple the diaphragm to the transducer base structure. In some configurations, the hinge assembly comprises multiple hinge joints, for example two hinge joints located at either side of the diaphragm.

Preferably, the hinge element is embedded in or attached to an end surface of the diaphragm, the hinge element is arranged to rotate or roll on the contact surface while maintaining a consistent physical contact with the contact surface to thereby enable the movement of the diaphragm.

Preferably the hinge joint is configured to allow the hinge element to move in a substantially rotational manner relative to the contact member.

Preferably the hinge element is configured to roll against the contact member with insignificant sliding during operation.

Preferably the hinge element is configured to roll against the contact member with no sliding during operation.

Alternatively the hinge element is configured to rub or twist on the contact surface during operation.

Preferably the hinge assembly is configured such that contact between the hinge element and the contact member rigidly restrains some point in the hinge element, that is located at or else in close proximity to the region of contact, against all translational movements relative to the contact member.

Preferably one of the hinge element or the contact member comprises a convexly curved contact surface, in at least a cross-sectional profile along a plane perpendicular to the axis of rotation, at the region of contact.

Preferably the other of the hinge element or the contact member comprises a concavely curved contact surface, in at least a cross-sectional profile along a plane perpendicular to the axis of rotation, at the region of contact.

Preferably one of the hinge element or the contact member comprises a contact surface having one or more raised portions or projections configured to prevent the other of the hinge element or contact member from moving beyond the raised portion or projection when an external force is exhibited or applied to the audio transducer.

In one form the hinge element comprises the convexly curved contact surface, and the contact member comprises the concavely curved contact surface. In an alternative form the hinge element comprises the concavely curved contact surface, and the contact member comprises the convexly curved contact surface.

In one form, the hinge element comprises at least in part a concave or a convex cross-sectional profile, when viewed in a plane perpendicular to the axis of rotation, where it makes the physical contact with the contact surface.

In one form, the hinge element comprises at least in part a convex cross-sectional profile, when viewed in a plane perpendicular to the axis of rotation, and the contact surface profile is substantially flat in the same plane, or vice versa.

In another form, the hinge element comprises at least in part a concave cross-sectional profile, when viewed in a plane perpendicular to the axis of rotation and the contact surface comprises a convex cross-sectional profile in a plane perpendicular to the axis of rotation where the physical contact is made, wherein the hinge element and the contact surface are arranged to rock or roll relative to each other along the concave and the convex surfaces in use.

In another form, the hinge element comprises at least in part a convex cross-sectional profile, when viewed in a plane perpendicular to the axis of rotation and the contact surface comprises a convex cross-sectional profile in a plane perpendicular to the axis of rotation, to allow the hinge element and the contact surface to rock or roll relative to each other in use along the surfaces.

In another form a first element of the hinge element or the contact member comprises a convexly curved contact in at least across-sectional profile along a plane perpendicular to the axis of rotation, and the other second element of the hinge element and the contact member, comprises a contact surface having a central region that is substantially planar, or that comprises a substantially large radius, and is sufficiently wide such that the first element is centrally located and does not move substantially beyond the substantially planar central region during normal operation, and has, when viewed in cross-sectional profile in a plane perpendicular to the axis of rotation, one or more raised portions configured to recentralize the first element towards the substantially central region when an external force is exhibited.

The raised portions may be raised edge portions.

Alternatively the central region is concave to gradually recentralize the first element during normal operation or when an external force is exhibited.

Preferably the first element is the hinge element and the second element is the contact member.

Preferably whichever out of the hinge element and the contact surface that comprises a convexly curved contact surface with a relatively smaller radius of curvature in a cross-sectional profile along a plane perpendicular to the axis of rotation, has a radius r in metres satisfying the relationship:

$$r > \frac{E \cdot l}{1000{,}000{,}000} \times (2\pi f)^2; \qquad \text{(a)}$$

and/or has a radius r in meters satisfying the relationship:

$$r < \frac{E \cdot l}{1000{,}000{,}000} \times (2\pi f)^2 \qquad \text{(b)}$$

where l is the distance in meters from the axis of rotation of the hinge element relative to the contact member to the most distal part of the diaphragm, f is the fundamental resonance frequency of the diaphragm in Hz, and E is preferably in the range of 50-140, for example E is 140, more preferably is 100, more preferably again is 70, even more preferably is 50, and most preferably is 40.

In one form, the biasing mechanism uses a magnetic mechanism or structure to bias or urge the hinge element towards the contact surface of the contact member.

Preferably the hinge element comprises, or consists of, a magnetic element or body.

Preferably the magnetic element or body is incorporated in the diaphragm.

Preferably the magnetic element or body is a ferromagnetic steel shaft coupled to or otherwise incorporated within the diaphragm at an end surface of the diaphragm body.

Preferably, the shaft has a substantially cylindrical profile.

Preferably, the approximately cylindrical profile of the shaft has a diameter of approximately between 1-10 mm.

In one form, the portion of the shaft that makes the physical contact with the contact surface comprises a convex profile with a radius of approximately between 0.05 mm and 0.15 mm.

In some embodiments, the biasing mechanism may comprise a first magnetic element that contacts or is rigidly connected to the hinge element, and also a second magnetic element, wherein the magnetic forces between the first and the second magnetic elements biases or urges the hinge element towards the contact surface so as to maintain the consistent physical contact between the hinge element and the contact surface in use.

The first magnetic element may be a ferromagnetic fluid.

The first magnetic element may be a ferromagnetic fluid located near an end of the diaphragm body.

The second magnetic element ay be a permanent magnet or an electromagnet.

Alternatively the second magnetic element may be a ferromagnetic steel part that is coupled to or embedded in the contact surface of the contact member.

Preferably, the contact member is located between the first and the second magnetic elements.

In some embodiments, the biasing mechanism comprises a mechanical mechanism to bias or urge the hinge element towards the contact surface of the contact member.

In one form, the biasing mechanism comprises a resilient element or member which biases or urges the hinge element towards the contact surface.

Preferably the resilient element is a steel flat spring.

Alternatively or in addition the biasing mechanism may comprise rubber bands in tension, rubber blocks in compression, and ferromagnetic-fluid attracted by a magnet.

Preferably the hinge joint also comprises a fixing structure for locating the hinge element at a desired operative and physical location relative to the contact member.

In one form, the fixing structure is a mechanical fixing assembly which comprises fixing members such as pins coupled to each end of the hinge element, and one or more strings which each have one end coupled to a fixing member, and then another end coupled to the contact member, wherein the intermediate portion of the string is arranged to curve around a cross section of the hinge element to thereby maintain the hinge element at the desired operative and physical location relative to the contact member.

In one form, the fixing structure is a mechanical fixing assembly which comprises one or more thin, flexible elements having one end fixed, either directly or indirectly, to an end of the hinge element, and then another end coupled to the contact member, wherein the intermediate portion of the string is arranged to curve around a cross section of the hinge element or a component rigidly attached to the hinge element to thereby maintain the hinge element at the desired operative and physical location relative to the contact member.

Preferably the thin flexible element is string, most preferably multi-strand string.

Preferably the thin, flexible element exhibits low creep.

Preferably the thin, flexible element exhibits high resistance to abrasion.

Preferably the thin, flexible element is an aromatic polyester fiber such as Vectran™ fiber.

In one form, the fixing structure is a mechanical fixing assembly which comprises one or more strings having one end fixed, either directly or indirectly, to an end of the hinge element, and then another end coupled to the contact member, wherein the intermediate portion of the string is arranged to curve around a cross section of whichever component out of the hinge element and the contact member is the more convex in side profile at the location at which they are in contact, to thereby maintain the hinge element at the desired operative and physical location relative to the contact member.

Preferably the radius about which the string is curved has substantially the same side profile as the contacting surface of the same component.

Preferably the radius about which the string is curved has a radius which is fractionally smaller at all locations compared to the side profile of the contacting surface of the same component, by half the thickness of the string at the same location.

In one form, the fixing structure is a mechanical fixing assembly which comprises a flexible element which connects one end to the hinge element and another end to the contact member, is located close to and parallel to the axis of rotation of the hinge element with respect to the contact member, is sufficiently thin-walled in order that it is resilient in terms of twisting along the length, and is sufficiently wide in the direction perpendicular to the hinge axis and parallel to the contact surface such that it is relatively non-compliant in terms of translation of one end in the same direction and thereby restricts the hinge element from sliding against the contact surface in the same direction.

Preferably the thin, flexible element is a flat spring.

Preferably the thin, flexible element is a thin, solid strip, for example metal shim.

Preferably the flexible element is made from a material that is resistant to fatigue and creep, for example steel or titanium.

Preferably, the hinge assembly biases the hinge element towards the contact surface of the contact member using a biasing force that remains substantially constant in use.

Preferably, the hinge assembly biases the hinge element towards the contact surface of the contact member using a biasing force that is greater than the force of gravity acting on the diaphragm, or more preferably greater than 1.5 times the force of gravity acting on the diaphragm.

Preferably the biasing force is substantially large relative to the maximum excitation force of the diaphragm.

Preferably the biasing force is greater than 1.5, or more preferably greater than 2.5, or even more preferably greater than 4 times the maximum excitation force experienced during normal operation of the transducer.

Preferably the hinge assembly biases the hinge element towards the contact surface of the contact member using a biasing force that is sufficiently large such that substantially non-sliding contact is maintained between the hinge element and the contact surface when the maximum excitation is applied to the diaphragm during normal operation of the transducer.

Preferably the biasing force in a particular hinge joint is greater than 3 or 6 or times greater than the component of reaction force acting in a direction such as to cause slippage between the hinge element and the contact surface when the maximum excitation is applied to the diaphragm during normal operation of the transducer.

Preferably at least 30%, or more preferably at least 50%, or most preferably at least 70% of contacting force between the hinge element and the contact member is provided by the biasing mechanism.

Preferably the biasing mechanism is sufficiently compliant such that the biasing force it applies does not vary by more than 200%, or more preferably 150% or more preferably 100 of the average force when the transducer is at rest, when the diaphragm traverses its full range of excursion during normal operation.

Preferably the biasing structure is sufficiently compliant such that the hinge joint is significantly asymmetrical in terms of that the biasing mechanism applying the biasing force to the hinge element in one direction is applied compliantly relative to the resulting reaction force.

Preferably said reaction force is applied in the form of a substantially constant displacement.

Preferably said reaction force is provided by parts of the contact member connecting the contact surface to the main body of the contact member which are comparatively non-compliant.

Preferably the hinge element is rigidly connected to the diaphragm body, and the region of the hinge element immediately local to the contact surface, and connections between this region and the rest of the diaphragm, are non-compliant relative to the biasing mechanism.

In some embodiments the overall stiffness k (where "k" is as defined under Hook's law) of the biasing mechanism acting on the hinge element, the rotational inertia of about its axis of rotation of the part of the diaphragm supported via said contacting surfaces, and the fundamental resonance frequency of the diaphragm in Hz (f) satisfy the relationship:

$$k<C\times 10{,}000\times(2\pi f)^2\times I$$

where C is a constant preferably given by 200, or more preferably by 130, or more preferably given by 100, or more preferably given by 60, or more preferably given by 40, or more preferably given by 20, or most preferably given by 10.

In some embodiments the biasing mechanism is sufficiently compliant such that, when the diaphragm is at its equilibrium displacement during normal operation, if two small equal and opposite forces are applied perpendicular to a pair of contacting surfaces, one force to each surface, in directions such as to separate them, the relationship between a small (preferably infinitesimal) increase in force in Newtons (dF), above and beyond the force required to just achieve initial separation, the resulting change in separation at the surfaces in meters (dx) resulting from deformation of the rest of the driver, excluding compliance associated with and in the localised region of contact between non-joined components, the rotational inertia about its axis of rotation of the part of the diaphragm supported via said contacting surfaces ($I_s$), and the fundamental resonance frequency of the diaphragm in Hz (f) satisfy the relationship:

$$\frac{dF}{dx} < C \times 10{,}000 \times (2\pi f)^2 \times I_s$$

where C is a constant preferably given by 200, or more preferably by 130, or more preferably given by 100, or more preferably given by 60, or more preferably given by 40, or more preferably given by 20, or most preferably given by 10.

Preferably part of the biasing mechanism is rigidly connected to the transducer base mechanism.

Alternatively, or in addition the diaphragm comprises the biasing mechanism.

In some embodiments the average ($\Sigma F_n/n$) of all the forces in Newtons ($F_n$) biasing each hinge element towards its associated contact surface within the number n of hinge joints of this type within the hinge assembly consistently satisfies the following relationship while constant excitation force is applied such as to displace the diaphragm to any position within its normal range of movement:

$$\frac{\sum F_n}{n} > D \times \frac{1}{n} \times (2\pi f)^2 \times I$$

where D is a constant preferably equal to 5, or more preferably equal to 15, or more preferably equal to 30, or more preferably equal to 40.

In some embodiments the biasing mechanism applies an average ($\Sigma F_n/n$) of all the forces in Newtons ($F_n$) biasing each hinge element towards its associated contact surface within the number n of hinge joints of this type within the hinge assembly consistently satisfies the following relationship when constant excitation force is applied such as to displace the diaphragm to any position within its normal range of movement:

$$\frac{\sum F_n}{n} > D \times \frac{1}{n} \times (2\pi f)^2 \times I$$

where D is a constant preferably equal to 200, or more preferably equal to 150, or more preferably equal to 100, or most preferably equal to 80.

In some embodiments the biasing mechanism applies a net force F biasing a hinge element to a contact member that satisfies the relationship:

$$F > D \times (2\pi f_l)^2 \times I_s \qquad \text{(a)}$$

where $I_s$ (in kg·m$^2$) is the rotational inertia, about the axis of rotation, of the part of the diaphragm that is supported by the hinge element, $f_l$ (in Hz), is the lower limit of the FRO, and D is a constant preferably equal to 5, or more preferably equal to 15, or more preferably equal to 30, or more preferably equal to 40, or more preferably equal to 50, or more preferably equal to 60, or most preferably equal to 70.

Preferably this relationship is satisfied consistently, at all angles of rotation of the hinge element relative to the contact member during the course of normal operation.

Preferably, the hinge assembly further comprises a restoring mechanism to restore the diaphragm to a desired neutral rotational position when no excitation force is applied to the diaphragm.

In one form, the restoring mechanism comprises a torsion bar attached to an end of the diaphragm body. In this configuration, the torsion bar comprises a middle section that flexes in torsion, and end sections that are coupled to the diaphragm and to the transducer base structure.

Preferably at least one end of the sections provides translational compliance in the direction of the primary axis of the torsion bar.

Preferably one, or more preferably both, of the end sections incorporates rotational flexibility, in directions perpendicular to the length of the middle section.

Preferably the translational and rotational flexibility is provided by one or more substantially planar and thin walls at one or both ends of the torsion bar, the plane of which is/are oriented substantially perpendicular to the primary axis of the torsion bar.

Preferably both end sections are relatively non-compliant in terms of translations in directions perpendicular to the primary axis of the torsion bar.

In some embodiments the audio transducer further comprises an excitation mechanism including a coil and conducting wires connecting to the coil, wherein the conducting wires are attached to the surface of the middle section of the torsion bar.

Preferably the wires are attached close to an axis running parallel to the torsion bar and about which the torsion bar rotates during normal operation of the transducer.

In another form the restoring mechanism comprises a compliant element such as silicon or rubber, located close to the axis of rotation.

Preferably the compliant element comprises a narrow middle section and end sections having increased area to facilitate secure connections.

In another form part or all of the restoring force is provided within the hinge joint through the geometry of the contacting surfaces and through the location, direction and strength of the biasing force is applied by the biasing structure.

In another form some part of the centering force is provided by magnetic elements.

In one form, one or more components of the hinge assembly are made from a material having a Young's modulus higher than 6 GPa, or more preferably higher than 10 GPa.

In another aspect, the present invention may broadly be said to consist of an audio transducer comprising:

a diaphragm having a diaphragm body that remains substantially rigid during operation;

a hinge system configured to operatively support the diaphragm in use, and comprising a hinge assembly having one or more hinge joints, wherein each hinge joint comprises a hinge element and a contact member, the contact member having a contact surface;

wherein, during operation each hinge joint is configured to allow the hinge element to move relative to the associated contact member while maintaining a substantially consistent physical contact with the contact surface, and the hinge assembly biases the hinge element towards the contact surface; and wherein at least parts of both the hinge element and the contact member in the immediate region of the contact surface are made from a rigid material.

In one embodiment the substantially consistent physical contact comprises a substantially consistent force and in a region of contact between each hinge element and the associated contact surface, one of the hinge element and the contact member is effectively rigidly connected to the diaphragm, and the other is effectively rigidly connected to the transducer base structure. Preferably the hinge assembly is configured to apply a biasing force to the hinge element of each joint toward the associated contact surface, compliantly. Preferably the hinge assembly is configured to apply a biasing force to the hinge element of each joint toward the associated contact surface, compliantly.

Preferably in either the thirty seventh or thirty eighth aspect the parts of both the hinge element and the contact member in the immediate region of the contact surface are made from a material having a Young's modulus higher than 6 GPa, more preferably higher than 10 GPa.

Preferably there is at least one pathway connecting the diaphragm body to the base structure comprised of substantially rigid components and whereby, in the immediate vicinity of places where one rigid component contacts another without being rigidly connected, all materials have a Young's modulus higher than 6 GPa, or even more preferably higher than 10 GPa.

More preferably, the hinge element and the contact member are made from a material having a Young's modulus higher than 6 GPa, or even more preferably higher than for example but not limited to aluminum, steel, titanium, tungsten, ceramic and so on.

Preferably the hinge element and/or the contact surface comprises a thin coating, for example a ceramic coating or an anodized coating.

Preferably either or both of the surface of the hinge element at the location of contact and the contact surface comprise a non-metallic material.

Preferably both the hinge element at the location of contact and the contact surface comprise non-metallic materials.

Preferably both the hinge element at the location of contact and the contact surface comprise corrosion-resistant materials.

Preferably both the hinge element at the location of contact and the contact surface comprise materials resistant to fretting-related corrosion.

Preferably the hinge element rolls against the contact surface about an axis that is substantially collinear with an axis of rotation of the diaphragm.

Preferably the hinge assembly is configured to facilitate single degree of freedom motion of the diaphragm.

In one configuration the hinge assembly rigidly restrains the diaphragm against translation in at least 2 directions/along at least two substantially orthogonal axes.

In one configuration the hinge assembly enables diaphragm motion consisting of a combination of translational and rotational movements.

In a preferred configuration the hinge assembly enables diaphragm motion that is substantially rotational about a single axis.

Preferably the wall thickness of the hinge element is thicker than $1/8^{th}$ of, or 1/4 of, or 1/2 of or most preferably thicker than the radius of the contacting surface that is more convex in side profile out of that of the hinge element and the contact member, at the location of contact.

Preferably the wall thickness of the contact member is thicker than $1/8^{th}$ of, or 1/4 of, or 1/2 of or most preferably thicker than the radius of the contacting surface that is more convex in side profile out of that of the hinge element and the contact member, at the location of contact.

Preferably there is at least one substantially non-compliant pathway by which translational loadings may pass from the diaphragm through to the transducer base structure via the hinge joint.

Preferably the diaphragm incorporates and is rigidly coupled to a force transferring component of a transducing mechanism that transduces electricity and movement.

In another aspect, the present invention may broadly be said to consist of an audio transducer comprising:

a diaphragm having a diaphragm body that remains substantially rigid during operation;

a transducing mechanism that transduces electricity and/or movement having a force transferring component, wherein the diaphragm incorporates and is rigidly coupled to the force transferring component;

a hinge system configured to operatively support the diaphragm in use, and comprising a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface.

In one embodiment the substantially consistent physical contact comprises a substantially consistent force and in a region of contact between each hinge element and the associated contact surface, one of the hinge element and the contact member is effectively rigidly connected to the diaphragm, and the other is effectively rigidly connected to the transducer base structure. Preferably the hinge assembly is configured to apply a biasing force to the hinge element of each joint toward the associated contact surface, compliantly. Preferably the hinge assembly is configured to apply a biasing force to the hinge element of each joint toward the associated contact surface, compliantly.

In another aspect, the present invention may broadly be said to consists of an audio transducer comprising:

a diaphragm having a diaphragm body that remains substantially rigid during operation and that comprises a maximum thickness that is greater than approximately 11% of a maximum length of the diaphragm body;

a hinge system configured to operatively support the diaphragm in use, and comprising a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface.

In any one of the above aspects relating to an audio transducer including a hinge system, in one form, the hinge assembly comprises a pair of hinge joints located on either side of a width of the diaphragm.

Alternatively the hinge assembly comprises more than 2 hinge joints with at least a pair of hinge joints located on either side of the width of the diaphragm.

In one form, multiple hinge assemblies are configured to operatively support the diaphragm during operation.

Preferably the audio transducer further comprises a diaphragm suspension having at least one hinge assembly, the diaphragm suspension being configured to operatively support the diaphragm during operation.

Preferably the diaphragm suspension consists of a single hinge assembly to enable the movement of the diaphragm assembly.

Alternatively the diaphragm suspension comprises two or more hinge assemblies.

In one form, the diaphragm suspension comprises a four-bar linkage and a hinge assembly is located at each corner of the four-bar linkage.

Preferably each diaphragm is connected to no more than two hinge joints each having significantly different axes of rotation.

In one configuration the hinge element is biased or urged towards the contact surface by magnetic forces.

In one configuration, the hinge element is a ferromagnetic steel shaft attached to or embedded in or along an end surface of the diaphragm body. The hinge joint comprises a magnet which attracts the hinge element towards the contact surface.

In one configuration the hinge element is biased or urged towards the contact surface by a mechanical biasing mechanism.

In one form configuration, the hinge element is a diaphragm base frame attached to or embedded in or along an end surface of the diaphragm body.

The mechanical biasing structure may comprises a pretensioned spring member.

Preferably the biasing force applied to the hinge element, is applied at an edge that is approximately co-linear with the axis of rotation of the diaphragm relative to the contact surface.

Preferably the biasing force applied between the hinge element and the contact surface is applied at an edge that is substantially parallel to the axis of rotation and substantially co-linear to a line axis passing close to the centre of the contact radius of the contacting surface side that is the more convex, when viewed in cross-sectional profile in a plane perpendicular to the axis of rotation, out of the contacting surface of the hinge element and the contacting surface of the contact surface.

Preferably the biasing force applied between the hinge element and the contact surface is applied at an edge that is co-linear to a line that is parallel to the axis of rotation and passes through the centre of the contact radius of the contacting surface side that is the more convex, when viewed in cross-sectional profile in a plane perpendicular to the axis of rotation, out of the contacting surface of the hinge element and the contacting surface of the contact surface.

Preferably the biasing force applied to the hinge element is applied at a location that lies, approximately, on the axis of rotation of the diaphragm relative to the contact surface.

Preferably the biasing force is applied at an axis that is approximately parallel to the axis of rotation and passes approximately through the centre of the radius of the surface side that is the more convex, when viewed in cross-sectional profile in a plane perpendicular to the axis of rotation, out of the hinge element and the contact surface.

Preferably the biasing force is applied close to this location throughout the full range of diaphragm excursion.

Preferably at all times during normal operation the location and direction of the biasing force is such that it passes through a hypothetical line oriented parallel to the axis of rotation and passing through the point of contact between the hinge element and the contact member.

In another aspect the invention may broadly be said to consist of an audio transducer as per any one of the above aspects that includes a hinge system, and further comprising:

- a housing comprising an enclosure or baffle for accommodating the diaphragm therein or there between; and
- wherein the diaphragm comprises an outer periphery having one or more peripheral regions that are free from physical connection with the housing.

Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

In some embodiments the transducer contains ferromagnetic fluid between the one or more peripheral regions of the diaphragm and the interior of the housing. Preferably the ferromagnetic fluid provides significant support to the diaphragm in direction of the coronal plane of the diaphragm.

Preferably the diaphragm comprises normal stress reinforcement coupled to the body, the normal stress reinforcement being coupled adjacent at least one of said major faces for resisting compression-tension stresses experienced at or adjacent the face of the body during operation In another aspect the invention may broadly be said to consist of an audio transducer as per any one of the above aspects that includes a hinge system, and wherein the diaphragm comprises:

- a diaphragm body having one or more major faces,
- normal stress reinforcement coupled to the body, the normal stress reinforcement being coupled adjacent at least one of said major faces for resisting compression-tension stresses experienced at or adjacent the face of the body during operation, and
- at least one inner reinforcement member embedded within the body and oriented at an angle relative to at least one of said major faces for resisting and/or substantially mitigating shear deformation experienced by the body during operation.

Preferably in either one of the above two aspects a distribution of mass of associated with the diaphragm body or a distribution of mass associated with the normal stress reinforcement, or both, is such that the diaphragm comprises a relatively lower mass at one or more low mass regions of the diaphragm relative to the mass at one or more relatively high mass regions of the diaphragm.

Preferably the diaphragm body comprises a relatively lower mass at one or more regions distal from a centre of mass location of the diaphragm. Preferably the thickness of the diaphragm reduces toward a periphery distal from the centre of mass.

Alternatively or in addition a distribution of mass of the normal stress reinforcement is such that a relatively lower amount of mass is at one or more peripheral edge regions of the associated major face distal from an assembled centre of mass location the diaphragm.

In another aspect the invention may broadly be said to consist of an audio device incorporating any one of the above aspects including a hinge system, and further comprising a decoupling mounting system located between the diaphragm of the audio transducer and at least one other part of the audio device for at least partially alleviating mechanical transmission of vibration between the diaphragm and the at least one other part of the audio device, the decoupling mounting system flexibly mounting a first component to a second component of the audio device.

Preferably the at least one other part of the audio device is not another part of the diaphragm of an audio transducer of the device. Preferably the decoupling mounting system is coupled between the transducer base structure and one other part. Preferably the one other part is the transducer housing.

In another aspect the invention may consist of an audio device comprising two or more electro-acoustic loudspeakers incorporating any one or more of the audio transducers of the above aspects and providing two or more different audio channels through capable of reproduction of independent audio signals. Preferably the audio device is personal audio device adapted for audio use within approximately 10 cm of the user's ear.

In another aspect the invention may be said to consist of a personal audio device incorporating any combination of one or more of the audio transducers and its related features, configurations and embodiments of any one of the previous audio transducer aspects.

In another aspect the invention may be said to consist of a personal audio device comprising a pair of interface devices configured to be worn by a user at or proximal to each ear, wherein each interface device comprises any combination of one or more of the audio transducers and its related features, configurations and embodiments of any one of the previous audio transducer aspects.

In another aspect the invention may be said to consist of a headphone apparatus comprising a pair of headphone interface devices configured to be worn on or about each ear, wherein each interface device comprises any combination of one or more of the audio transducers and its related features, configurations and embodiments of any one of the previous audio transducer aspects.

In another aspect the invention may be said to consist of an earphone apparatus comprising a pair of earphone interfaces configured to be worn within an ear canal or concha of a user's ear, wherein each earphone interface comprises any combination of one or more of the audio transducers and its related features, configurations and embodiments of any one of the previous audio transducer aspects.

In another aspect the invention may be said to consist of an audio transducer of any one of the above aspects and related features, configurations and embodiments, wherein the audio transducer is an acoustoelectric transducer.

In a further aspect, the present invention may broadly be said to consist of an audio transducer comprising:

a diaphragm;

a transducer base structure; and at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation.

Preferably for each hinge joint, each hinge element is relatively thin compared to a length of the element to facilitate rotational movement of the diaphragm about the axis of rotation, compared to their lengths.

In one form, the diaphragm comprises a diaphragm base frame for supporting the diaphragm, the diaphragm being supported by the diaphragm base frame along or near an end of the diaphragm, and the diaphragm base frame being directly attached to one or both hinge elements of each hinge joint.

Preferably the diaphragm base frame facilitates a rigid connection between the diaphragm and each hinge joint.

In one form, the diaphragm base frame comprises one or more coil stiffening panels, one or more side arc stiffener triangles, topside strut plate and an underside base plate.

In some embodiments, the diaphragm does not comprise a diaphragm base frame and the diaphragm is directly attached to one or both hinge elements of each hinge joint.

Preferably the distance from the diaphragm to one or both of the hinge elements of each hinge joint, is less than half the maximum distance from the axis of rotation to a most distal periphery of the diaphragm, or more preferably less than ⅓ the maximum distance, or more preferably less than ¼ the maximum distance, or more preferably less than ⅛ the maximum distance, or most preferably less than 1/16 the maximum distance.

Preferably the one or more hinge joints are connected to at least one surface or periphery of the diaphragm, and at least one overall size dimension of each connection, is greater than ⅙$^{th}$, or more preferably is greater than ¼$^{th}$, or most preferably is greater than ½ of the corresponding dimension of the associated surface or periphery.

In a further aspect, the present invention may broadly be said to consist of an audio transducer comprising:

a diaphragm;

a transducer base structure; and at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation; and wherein a distance from the diaphragm to one or both of the hinge elements of each hinge joint, is less than half the maximum distance from the axis of rotation to a most distal periphery of the diaphragm. More preferably the distance of to one or both of the hinge elements is less than ⅓ the maximum distance, or more preferably less than ¼ the maximum distance, or more preferably less than ⅛ the maximum distance, or most preferably less than 1/16 the maximum distance.

In a further aspect, the present invention may broadly be said to consist of an audio transducer comprising:

a diaphragm;

a transducer base structure; and at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation; and wherein the one or more hinge joints are connected to at least one surface or periphery of the diaphragm, and at least one overall size dimension of each connection, is greater than 1/6$^{th}$ of the corresponding dimension of the associated surface or periphery. More preferably the size dimension of the connection is greater than 1/4$^{th}$, or most preferably is greater than 1/2 of the corresponding size dimension of the associated surface or periphery.

Preferably two substantially orthogonal size dimensions of each connection are greater than 1/16$^{th}$ of the corresponding orthogonal size dimensions of the associated surface or face, more preferably greater than 1/4$^{th}$ and most preferably greater than 1/2.

The following clauses apply to at least the previous three aspects.

Preferably the overall thickness of the connection between the diaphragm and each hinge joint, in a direction perpendicular to a coronal plane of the diaphragm and hinge axis, is greater than 1/6$^{th}$, or more preferably is greater than 1/4$^{th}$, or most preferably is greater than 1/2 of the greatest dimension of the diaphragm in the same direction, at all locations along the connection(s).

In some embodiments, each flexible hinge element of each hinge joint is substantially flexible with bending. Preferably each hinge element is substantially rigid against torsion.

In alternative embodiment, each flexible hinge element of each hinge joint is substantially flexible in torsion. Preferably each flexible hinge element is substantially rigid against bending.

In some embodiments, each hinge element comprises an approximately or substantially planar profile, for example in a flat sheet form.

In some embodiments, the pair of flexible hinge elements of each joint are connected or intersect along a common edge to form an approximately L-shaped cross section. In some other configurations, the pair of flexible hinge elements of each hinge joint intersect along a central region to form the axis of rotation and the hinge elements form an approximately X-shaped cross section, i.e. the hinge elements form a cross spring arrangement. In some other configurations the flexible hinge elements of each hinge joint are separated and extend in different directions.

In one form, the axis of rotation is approximately collinear with the intersection between the hinge elements of each hinge joint.

In some embodiments, each flexible hinge element of each hinge joint comprises a bend in a transverse direction and along the longitudinal length of the element. The hinge elements may be slightly bend such that they flex into a substantially planar state during operation.

In some embodiments, the pair of flexible hinge elements of each hinge joint are angled relative to one another by an angle between about 20 and 160 degrees, or more preferably between about 30 and 150 degrees, or even more preferably between about 50 and 130 degrees, or yet more preferably between about 70 and 110 degrees. Preferably the pair of flexible hinge elements are substantially orthogonal relative to one another.

Preferably one flexible hinge element of each hinge joint extends significantly in a first direction that is substantially perpendicular to the axis of rotation.

Preferably each hinge element of each hinge joint has average width or height dimensions, in terms of a cross-sections in a plane perpendicular to the axis of rotation, that are greater than 3 times, or more preferably greater than 5 times, or most preferably greater than 6 times the square root of the average cross-sectional area, as calculated along parts of the hinge element length that deform significantly during normal operation.

In some embodiments, one or both of the hinge elements of each hinge joint is/are thin sheets, wherein each thin sheet has a thickness, a width and a length, and wherein the thickness of the hinge element is less than about 1/4 of the length, or more preferably less than about 1/8$^{th}$ of the length, or even more preferably less than about 1/16$^{th}$ of the length, or yet more preferably less than about 1/35$^{th}$ of the length, or even more preferably less than about 1/50$^{th}$ of the length, or most preferably less than about 1/70$^{th}$ of the length.

In some embodiment, the thickness of a spring member is less than about 1/4 of the width, or less than about 1/8$^{th}$ of the width or preferably less than about 1/16$^{th}$ of the width, or more preferably less than about 1/24$^{th}$ of the width, or even more preferably less than about 1/45$^{th}$ of the width, or yet more preferably less than about 1/60$^{th}$ of the width, or most preferably about 1/70$^{th}$ of the width.

In some embodiments, each hinge element of each hinge joint has a substantially uniform thickness across at least a majority of its length and width.

In some configurations, a hinge element of each hinge joint comprises a varying thickness, wherein the thickness of the hinge element increases towards an edge proximal to the diaphragm. Alternatively or in addition, a hinge element of each hinge joint comprises a varying thickness, wherein the thickness of the hinge element increases towards an edge proximal to the transducer base structure.

In one form, the thickness of one or both of the hinge elements of each hinge joint increases at or proximal to an end of the hinge element most distal from diaphragm or transducer base structure.

The increase in thickness may be gradual or tapered.

In a further aspect, the present invention may broadly be said to consist of an audio transducer comprising:

a diaphragm;

a transducer base structure; and at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation; and wherein one or both hinge elements of each hinge joint comprises an increased thickness towards an edge or end of the element closely associated with the diaphragm or transducer base structure.

The increase in thickness may be gradual or tapered.

The following clauses apply to at least the previous four aspects.

In some embodiments, each hinge element of each hinge joint is flanged at an end configured to rigidly connect to the diaphragm or the transducer base structure.

The hinge element may have a varying width and the width may be increased at or towards an edge/end closely associated with the diaphragm and/or transducer base structure. The width may also be increased at or toward the end/edge distal from the diaphragm or the transducer base structure.

The increase in width may be gradual or tapered.

In some embodiments the audio transducer comprises a hinge assembly having two of the hinge joints. Preferably each hinge joint is located at either side of the diaphragm.

Preferably each hinge joint is located a distance from a central sagittal plane of the diaphragm that is at least 0.2 times of the width of the diaphragm body.

Preferably a first hinge joint is located proximal to a first corner region of an end face of the diaphragm, and the second hinge joint is located proximal to a second opposing corner region of the end face, and wherein the hinge joints are substantially collinear.

The diaphragm may be connected to each hinge joint by an adhering agent such as epoxy, or by welding, or by clamping using fasteners, or by a number of other methods.

In a preferred embodiment, each hinge element of each joint is made from a material with a Young's modulus higher than 8 GPa for example. This may be a metal or ceramic or any other material having such stiffness.

In some embodiments, each hinge element is made from a material with a Young's modulus higher than 20 GPa.

In one form, each hinge element of each hinge joint is made from a continuous material such as metal or ceramic. For example, the hinge element may be made of a high tensile steel alloy or tungsten alloy or titanium alloy or an amorphous metal alloy such as "Liquidmetal" or "Vitreloy".

In another form, the hinge element is made from a composite material such as plastic reinforced carbon fiber.

In some configurations, the diaphragm body of the diaphragm is substantially thick. Preferably the diaphragm body comprises a maximum thickness that is greater than 11% of a maximum length of the diaphragm body, or more preferably greater than 14% of the maximum length of the diaphragm body.

In a further aspect, the present invention may broadly be said to consist of an audio transducer comprising:

a diaphragm having a diaphragm body;

a transducer base structure; and at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation; wherein the diaphragm body of the diaphragm is substantially thick.

Preferably the diaphragm body comprises a maximum thickness that is greater than 15% of its length from the axis of rotation to an opposing distal periphery of the diaphragm body.

The following clauses apply to at least the previous five aspect.

Preferably, the audio transducer further comprises a transducing mechanism.

In one form the audio transducer is a loudspeaker driver.

In one form the audio transducer is a microphone.

In one form, the transducing mechanism uses an electro dynamic transducing mechanism, or a piezo electric transducing mechanism, or magnetostrictive transducing mechanism, or any other suitable transducing mechanisms.

In one form the transducing mechanism comprises a coil winding. Preferably the coil winding is coupled to the diaphragm. Preferably the coil winding is in close proximity or directly attached to the diaphragm.

Preferably the transducing mechanism is in close proximity or directly coupled to the diaphragm.

In one form a force transferring component of the transducing mechanism is coupled to the diaphragm.

In one form the force transferring component is coupled to the diaphragm via a connecting structure that has a squat geometry.

Preferably the connecting structure has a Young's modulus of greater than 8 GPa.

In one form, the transducing mechanism comprises a magnetic circuit comprising a magnet, outer pole pieces, and inner pole pieces.

In one configuration, the coil winding attached to the diaphragm is situated in a gap in between the outer and inner pole pieces within the magnetic circuit.

In one form, both the outer pole pieces and inner pole pieces are made of steel.

In one form, the magnet is made of neodymium.

In one form, the coil winding is directly attached to the diaphragm base frame using an adhesion agent such as epoxy adhesive.

In one form, the transducer base structure comprises a block to support the diaphragm and the magnetic circuit.

Preferably the transducer base structure has a thick and squat geometry.

Preferably the transducer base structure has a high mass compared to that of the diaphragm.

In some embodiments, the transducer base structure may be made from a material having a high specific modulus such as a metal for example but not limited to aluminium or magnesium, or from a ceramic such as glass, to improve resistance to resonance.

Preferably the transducer base structure comprises components that have a Young's modulus higher than 8 GPa, or higher than 20 GPa.

The transducer base structure may be connected to each hinge joint by an adhering agent such as epoxy or cyanoacrylate, by using fasteners, by soldering, by welding or any number of other methods.

In one configuration, the audio transducer further comprises a diaphragm housing and the transducer base structure is rigidly attached to a diaphragm housing.

In one form, the diaphragm housing comprises grilles in one or more walls of the housing. In one form, the grilles may be made of stamped and pressed aluminium In one form, the diaphragm housing may comprise one or more stiffeners in one or more walls. In one form, the stiffeners may also be made from stamped and pressed aluminium.

In one form, the stiffeners may be located in the walls or portions of the walls which are at the vicinity of the diaphragm after the diaphragm is placed in the housing.

In one form, the transducer base structure is coupled to a floor of the diaphragm housing by an adhesive or an adhesion agent.

In one form, the walls of the diaphragm housing act as a barrier or baffle to reduce cancellation of sound radiation.

In some embodiments, the diaphragm housing may be made from a material having a high specific modulus such as a metal for example but not limited to aluminium or magnesium, or from a ceramic such as glass, to improve resistance to resonance.

In another configuration, the audio transducer does not comprise a transducer base structure that is rigidly attached to a diaphragm housing, and the audio transducer is accommodated in the transducer housing via a decoupling mounting system.

In some embodiments, the audio transducer further comprises a housing for accommodating the diaphragm therein, and wherein an outer periphery of the diaphragm body is substantially free from physical connection with an interior of the housing. Preferably an air gap exists between the periphery of the diaphragm body and the interior of the housing.

Preferably the size of the air gap is less than $1/20^{th}$ of the diaphragm body length.

Preferably the size of the air gap is less than 1 mm.

Preferably the diaphragm body comprises an outer periphery that is free from physical contact or connection with an interior of the housing along at least 20 percent of the length the periphery, or more preferably along at least 50 percent of the length of the periphery, or even more preferably along at least 80 percent of the length of the periphery or most preferably along the entire periphery.

In a further aspect, the present invention may broadly be said to consist of an audio transducer comprising:

a diaphragm having a diaphragm body;

a transducer base structure; and at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation; and wherein an outer periphery of the diaphragm body is substantially free from physical connection with an interior of the housing.

Preferably the diaphragm body comprises an outer periphery that is free from physical contact or connection with an interior of the housing along at least 20 percent of the length the periphery, or more preferably along at least 50 percent of the length of the periphery, or even more preferably along at least 80 percent of the length of the periphery or most preferably along the entire periphery.

In some embodiments an air gap exists between the periphery of the diaphragm body and the interior of the housing.

In some embodiments the size of the air gap is less than $1/20^{th}$ of the diaphragm body length.

Preferably the size of the air gap is less than 1 mm.

In some embodiments the transducer contains ferromagnetic fluid between the one or more peripheral regions of the diaphragm and the interior of the housing. Preferably the ferromagnetic fluid provides significant support to the diaphragm in direction of the coronal plane of the diaphragm.

In a further aspect, the present invention broadly consists in an audio transducer comprising:

a diaphragm having a diaphragm body, a hinge assembly configured to rotatably support the diaphragm body relative to a base of the transducer, said hinge assembly comprising at least one torsional member and providing an axis of rotation for the diaphragm, wherein each torsional member is arranged to extend in parallel and in close proximity to the axis of rotation, the torsional member having a length, a width and a height, wherein the width and the height of the torsional member are greater than 3% of the length of the diaphragm from the axis of rotation to the most distal periphery of the diaphragm.

Preferably the width and/or the length of the torsional member are greater than 4% of the length of the diaphragm from the axis of rotation to the most distal periphery of the diaphragm.

Preferably the torsional spring member has average dimension in the direction perpendicular to the axis of rotation, that is greater than 1.5 times the square root of the average cross-sectional area (excluding glue and wires which do not contribute much strength), as calculated along parts of the torsional spring member length that deform significantly during normal operation, or more preferably greater than 2 times, or more preferably greater than 2.5 times, the square root of the average cross-sectional area, as calculated along parts of the spring length that deform significantly during normal operation.

Preferably at least one or more torsional spring members are mounted at or close to the axis of rotation and, in combination, directly providing at least 50% of restoring force when diaphragm undergoes small pure translations in any direction perpendicular to the axis of rotation.

In a further aspect, the present invention broadly consists in an audio transducer comprising:

a diaphragm having a diaphragm body, a transducer base structure at least one hinge joint operatively and rotatably supporting the diaphragm relative to the transducer base structure in situ, each hinge joint having a resilient member that comprises a thickness that is relatively small compared to either a length and/or a width of the member, the resilient member having a first end rigidly connected to the diaphragm and a second end rigidly connected to the transducer base structure, and either the thickness and/or the width of both the first end and the second end of the member increases as it extends away from middle central region of the resilient member.

Preferably each resilient member of each hinge joint comprises a pair of flexible hinge elements angled relative to one another. Preferably the hinge elements are angled substantially orthogonally relative to one another.

In a preferable configuration one flexible hinge element of each joint extends in a direction substantially perpendicular to the axis of rotation. Alternatively or in addition, one flexible hinge element of each joint extends in a direction substantially parallel to the axis of rotation.

In a further aspect, the present invention broadly consists in an audio transducer comprising:

a diaphragm, a hinge assembly and a transducer base structure, the diaphragm being rotatably supported by the hinge assembly in use about an axis of rotation relative to the transducer base structure, the hinge assembly comprising at least one hinge joint, each hinge joint having a first and a second flexible and resilient element, the first flexible and resilient hinge element being rigidly coupled to the transducer base structure at one end, and rigidly coupled to the diaphragm at an opposing end, the second flexible and resilient hinge element being rigidly coupled to the transducer base structure at one end, and rigidly coupled to the diaphragm at an opposing end, wherein each of the first and second hinge elements have a substantially small thickness compared to a longitudinal length of the element between the transducer base structure and the diaphragm, the thickness being a dimension that is substantially perpendicular to the axis of rotation to facilitate compliant rotational movement of the diaphragm about the axis of rotation, and wherein a first direction, spanned by the first hinge element of each hinge joint, which is perpendicular to the axis of rotation, is at an angle of at least 30 degrees to a second direction, spanned by the second hinge element, which is perpendicular to the axis of rotation, to facilitate improved rigidity in terms of translational displacement of the diaphragm with respect to the transducer base structure in both first and second directions.

Preferably the first direction is an angle of greater than 45, or 60 degrees to the second direction, or most preferably the first direction is approximately orthogonal to the second direction.

Preferably the distance that the first spring member spans in the first direction is sufficiently large compared to the maximum dimension of the diaphragm in a direction perpendicular to the axis of rotation, such that the ratio of these dimensions respectively is greater than 0.05, or greater than 0.06, or greater than 0.07, or greater than 0.08, or most preferably greater than 0.09.

Preferably the distance that the second spring member spans in the second direction is large compared to the maximum dimension of the diaphragm to the axis of rotation, such that the ratio of these dimensions respectively is greater than 0.05, or greater than 0.06, or greater than 0.07, or greater than 0.08, or most preferably greater than 0.09.

In a further aspect, the invention broadly consists in an audio transducer comprising:

a diaphragm a hinge assembly operatively supporting the diaphragm in situ, the hinge assembly comprising at least one torsional member, the torsional member being directly and rigidly attached to the diaphragm, in use, and the torsional member is configured to deform to enable movement of the diaphragm about an axis of rotation provided by the hinge assembly.

Preferably audio transducer further comprises a force transferring component.

Preferably, the torsional member is arranged to deform along its length to enable the rotational movement of the diaphragm.

Preferably, the hinge assembly is configured to allow rotational movement of the diaphragm in use about an axis of rotation.

Preferably, the hinge assembly rigidly supports the diaphragm to constrain translational movements while enabling rotational movement of the diaphragm about the axis of rotation.

In one form, the torsional member is a torsion beam comprising an approximately C shaped cross section.

In a further aspect, the present invention broadly consists in an audio transducer comprising:

a diaphragm, a hinge assembly operatively supporting the diaphragm in situ, said hinge assembly comprising a torsional member and providing an axis of rotation for the diaphragm, wherein the torsional member is arranged to extend substantially in parallel and in close proximity to the axis of rotation, the torsional member having a height in direction perpendicular to the coronal plane of the diaphragm, wherein the height as measured in millimetres is approximately greater than twice the mass of the diaphragm as measured in grams.

Preferably the torsional member has a width, in direction parallel to the diaphragm and perpendicular to the axis, which is when measured in millimetres approximately greater than two times the mass of the diaphragm as measured in grams.

Preferably the torsional member has a width and a height of the as measured in millimetres approximately greater than four times the mass of the diaphragm as measured in grams, or more preferably greater than 6 times, or most preferably greater than 8 times.

In some configurations, one or more of the forty first to the fifty second aspects of the present disclosures is/are used in a near-field audio loudspeaker application where the loudspeaker driver is configured to be located within 10 cm of the ear in use, for example in a headphone or bud earphone.

In a further aspect, the present invention may broadly be said to consist of an audio device that is configured to be located within 10 cm of the user's ear in situ, and comprising:

at least one audio transducer having;

a diaphragm;

a transducer base structure; and at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation; and wherein one or both hinge elements of each hinge joint comprises an increased thickness towards an edge or end of the element closely associated with the diaphragm or transducer base structure.

The following statements relate to any one or more of the above audio device aspects including a hinge system and their related features, embodiments and configurations.

In some embodiments the audio device further a housing in the form of an enclosure or baffle, and wherein the diaphragm is free from physical connection with the housing at one or more peripheral regions of the diaphragm, and the one or more peripheral regions are supported by a ferromagnetic fluid.

Preferably the ferromagnetic fluid seals against or is in direct contact with the one or more peripheral regions supported by ferromagnetic fluid such that it substantially prevents the flow of air there between and/or provides significant support to the diaphragm in one or more directions parallel to the coronal plane.

Preferably the diaphragm comprises normal stress reinforcement coupled to the body, the normal stress reinforcement being coupled adjacent at least one of said major faces for resisting compression-tension stresses experienced at or adjacent the face of the body during operation In another aspect the invention may broadly be said to consist of an audio transducer as per any one of the above aspects that includes a hinge system, and wherein the diaphragm comprises:

a diaphragm body having one or more major faces, normal stress reinforcement coupled to the body, the normal stress reinforcement being coupled adjacent at least one of said major faces for resisting compression-tension stresses experienced at or adjacent the face of the body during operation, and at least one inner reinforcement member embedded within the body and oriented at an angle relative to at least one of said major faces for resisting and/or substantially mitigating shear deformation experienced by the body during operation.

Preferably in either one of the above two aspects a distribution of mass of associated with the diaphragm body or a distribution of mass associated with the normal stress reinforcement, or both, is such that the diaphragm comprises a relatively lower mass at one or more low mass regions of the diaphragm relative to the mass at one or more relatively high mass regions of the diaphragm.

Preferably the diaphragm body comprises a relatively lower mass at one or more regions distal from a centre of mass location of the diaphragm. Preferably the thickness of the diaphragm reduces toward a periphery distal from the centre of mass.

Alternatively or in addition a distribution of mass of the normal stress reinforcement is such that a relatively lower amount of mass is at one or more peripheral edge regions of the associated major face distal from an assembled centre of mass location the diaphragm.

In some embodiments the audio device comprises one or more audio transducers; and at least one decoupling mounting system located between the diaphragm and at least one other part of the audio device for at least partially alleviating mechanical transmission of vibration between the diaphragm of at least one audio transducer and the at least one other part of the audio device, each decoupling mounting system flexibly mounting a first component to a second component of the audio device.

Preferably at least one audio transducer further comprises a transducer base structure and the audio device comprises a housing for accommodating the audio transducer therein, and wherein the decoupling mounting system couples between a transducer base structure of the audio transducer and an interior of the housing.

In some embodiments the audio device is a personal audio device.

In one configuration the personal audio device comprising a pair of interface devices configured to be worn by a user at or proximal to each ear.

The audio device may be a headphone or an earphone. The audio device may comprise a pair of speakers for each ear. Each speaker may comprise one or more audio transducers.

In a further aspect, the present invention broadly consists in an audio transducer comprising:

a diaphragm comprising a coil and a coil stiffening panel, the diaphragm configured to rotate about an approximate axis of rotation during operation to transduce audio, whereby the coil is wound in an approximate four sided configuration consisting of a first long side, a first short side, a second long side and a second short side, and is connected to the coil stiffening panel that extends substantially in a direction perpendicular to the axis of rotation, and connects the first long side of the coil to the second long side of the coil.

Preferably the coil stiffening panel is located close to or in contact with the first short side of the coil.

Preferably the coil stiffening panel extends from approximately the junction between the first long side of the coil and the first short side, to approximately the junction between the first second long side of the coil and the first short side, and also extends in a direction perpendicular to the axis of rotation.

Preferably the coil stiffening panel is made from a material have a Young's modulus higher than 8 GPa, or more preferably higher than 15 GPa, or even more preferably higher than 25 GPa, or yet more preferably higher than 40 GPa, or most preferably higher than 60 GPa.

Preferably there is a second coil stiffening panel located close to or touching the second short side of the coil.

In one configuration there is a third coil stiffening panel located close to the sagittal plane of the diaphragm body.

Preferably the panel extends in a direction towards the axis of rotation rather than away.

Preferably the long sides are at least partially situated inside of a magnetic field.

Preferably the long sides extend in a direction parallel to the axis of rotation.

Preferably the magnetic field extends through the first long side in a direction approximately perpendicular to the axis of rotation.

Preferably the long sides are not connected to a former.

Preferably the diaphragm further comprises a diaphragm base frame which includes the coil stiffening panel, the diaphragm base frame rigidly supporting the coil and the diaphragm and is rigidly connected to a hinge system.

In another aspect the invention may be said to consist of an audio device comprising:

an audio transducer having:

a rotatably mounted diaphragm and a transducing mechanism configured to operatively transduce an electronic audio signal and/or rotational motion of the diaphragm corresponding to sound pressure; and a decoupling mounting system located between the diaphragm of the audio transducer and at least one other part of the audio device for at least partially alleviating mechanical transmission of vibration between the diaphragm and the at least one other part of the audio device, the decoupling mounting system flexibly mounting a first component to a second component of the audio device.

Preferably the at least one other part of the audio device is not another part of the diaphragm of an audio transducer of the device.

In one configuration the audio device comprises at least a first and a second audio transducer. Preferably, the decoupling mounting system at least partially alleviates mechanical transmission of vibration between the diaphragm of the first transducer and the second transducer.

Preferably the diaphragm is supported by a hinge assembly that is rigid in at least one translational direction.

In some embodiment, the hinge system comprises a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface.

Preferably, hinge assembly further comprises a biasing mechanism and wherein the hinge element is biased towards the contact surface by a biasing mechanism.

Preferably the biasing mechanism is substantially compliant.

Preferably the biasing mechanism is substantially compliant in a direction substantially perpendicular to the contact surface at the region of contact between each hinge element and the associated contact member during operation.

Preferably the hinge system further comprises restoring mechanism configured to apply a diaphragm restoring force to the diaphragm at a radius less than 60% of distance from the hinge axis to the periphery of the diaphragm.

In some other embodiments, the hinge system comprises at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation.

Preferably the at least one other part of the audio device supports the diaphragm, either directly or indirectly.

Preferably, the decoupling mounting system at least partially alleviates mechanical transmission of vibration between the diaphragm and the at least one other part of the audio device along at least one translational axis, or more preferably along at least two substantially orthogonal translational axes, or yet more preferably along three substantially orthogonal translational axes.

Preferably, the decoupling mounting system at least partially alleviates mechanical transmission of vibration between the diaphragm and the at least one other part of the audio about at least one rotational axis, or more preferably about at least two substantially orthogonal rotational axes, or yet more preferably about three substantially orthogonal rotational axes.

Preferably, the decoupling mounting system substantially alleviates mechanical transmission of vibration between the diaphragm and the at least one other part of the audio device.

Preferably the audio device further comprises a transducer housing configured to accommodate the audio transducer there within.

Preferably the transducer housing comprises a baffle or enclosure.

Preferably the audio transducer further comprises a transducer base structure.

Preferably the diaphragm is rotatable relative to the transducer base structure.

Preferably the decoupling system comprises at least one node axis mount that is configured to locate at or proximal to a node axis location associated with the first component.

Preferably the decoupling system comprises at least one distal mount configured to locate distal from a node axis location associated with the first component.

Preferably the at least one node axis mount is relatively less compliant and/or relatively less flexible than the at least one distal mount.

In a first embodiment, the decoupling system comprises a pair of node axis mounts located on either side of the first component. Preferably each node axis mount comprises a pin rigidly coupled to the first component and extending laterally from one side thereof along an axis that is substantially aligned with the node axis of the base structure. Preferably each node axis mount further comprises a bush rigidly coupled about the pin and configured to be located within a corresponding recess of the second component. Preferably the corresponding recess of the second component comprises a slug for rigidly receiving and retaining the bush therein. Preferably each node axis mounts further comprises a washer that locates between an outer surface of the first component and an inner surface of the second component. Preferably the washer creates a uniform gap about a substantial portion or entire periphery of the first component between the outer surface of the first component and inner surface of the second component.

Preferably each distal mount comprises a substantially flexible mounting pad. Preferably the decoupling system comprises a pair of mounting pads connected between an outer surface of the first component and an inner surface of the second component. Preferably the mounting pads are coupled at opposing surfaces of the first component. Preferably each mounting pad comprises a substantially tapered width along the depth of the pad with an apexed end and a base end. Preferably the base end is rigidly connected to one of the first or second component and the apexed end is connected to the other of the first or second component.

In some configurations of this embodiment the first component may be a transducer base structure. Alternatively the first component may be a sub-housing extending about the audio transducer. The second component may be a housing or surround for accommodating the audio transducer or the audio transducer sub-housing.

In a second embodiment, the decoupling system comprises a plurality of flexible mounting blocks. Preferably the mounting blocks are distributed about an outer peripheral surface of the first component and rigidly connect on one side to the outer peripheral surface of the first component and on an opposing side to an inner peripheral surface of the second component. Preferably a first set of one or more mounting blocks couple the first component at or near the node axis location of the first component. Preferably a second set of mounting blocks couple the first component at location(s) distal from the node axis location. Preferably the second set of distal mounting blocks locate at or near the diaphragm of the audio transducer. Preferably the first set of mounting blocks locate distal from the diaphragm of the audio transducer. Preferably the plurality of mounting blocks are configured to rigidly connect within a corresponding recess of the second component. Preferably the plurality of mounting blocks comprise a thickness that is greater than the depth of the corresponding recess to thereby form a substantially uniform gap between the first and second components in situ.

In one configuration (in any embodiment) the transducer base structure comprises a magnet assembly.

Preferably the transducer base structure comprises a connection to a diaphragm suspension system.

Preferably the audio device is configured in an audio system using two or more different audio channels through a configuration of two or more audio transducers (i.e. stereo or multi-channel).

Preferably the audio device is intended to be configured in an audio system using two or more different audio channels through a configuration of two or more audio transducers (i.e. stereo or multi-channel).

Preferably the audio device comprises at least two or more audio transducers that are configured to simultaneously reproduce at least two different audio channels (i.e. stereo or multi-channel.)

Preferably said different audio channels are independent of one-another.

Preferably the audio device further comprises a component configured to dispose the audio transducer at or near a user's ear or ears.

In another aspect the invention may broadly be said to consist of an audio device comprising:

- an audio transducer having:
  - a diaphragm, a transducing mechanism configured to operatively transduce an electronic audio signal and/or motion of the diaphragm corresponding to sound pressure, and a base structure assembly; and
- a decoupling mounting system located between the diaphragm and at least one other part of the audio device for at least partially alleviating mechanical transmission of vibration between the diaphragm and the at least one other part of the audio device, wherein the decoupling mounting system flexibly mounts a first component to a second component of the audio device; and
- the base structure assembly having a mass distribution such that it moves with an action having a significant rotational component when the base structure assembly is effectively unconstrained. For example, the base structure assembly is effectively unconstrained when the transducer is operated at sufficiently high frequencies such that the stiffness of the decoupling mounting system is or becomes negligible.

Preferably the diaphragm moves with a significant rotational component relative to the transducer base structure during operation.

Preferably the decoupling mounting system is located between the transducer base structure and the enclosure or baffle In one embodiment the at least one decoupling mounting system is located between the diaphragm and the transducer housing for at least partially alleviating mechanical transmission of vibration between the diaphragm and the transducer housing.

Preferably the audio device comprises a first decoupling mounting system flexibly mounting the diaphragm to the transducer base structure and/or a second decoupling mounting system flexibly mounting the transducer base structure to the transducer housing.

In one embodiment the audio device further comprises a headband component configured to dispose the audio device at or near a user's ear or ears, and a decoupling mounting system flexibly mounting the headband to the transducer housing.

Preferably the diaphragm comprises a diaphragm body.

In one embodiment the diaphragm comprises a diaphragm body having a maximum thickness of at least 11% of a greatest length dimension of the body, or preferably greater than 14%.

Preferably the diaphragm comprises a diaphragm body having a composite construction consisting of a core made from a relatively lightweight material and reinforcement at or near one or more outer surfaces of the core, said reinforcement being formed from a substantially rigid material for resisting and/or substantially mitigating deformations experienced by the body during operation. Preferably the reinforcement is composed of a material or materials having a specific modulus of preferably at least 8 MPa/(kg/m^3), or more preferably at least 20 MPa/(kg/m^3), or most preferably at least 100 MPa/(kg/m^3). For example the reinforcement may be from aluminum or carbon fiber reinforced plastic.

Preferably said reinforcement comprises:

- normal stress reinforcement coupled to the diaphragm body, the normal stress reinforcement being coupled adjacent at least one of said outer surfaces for resisting and/or substantially mitigating compression-tension deformation experienced at or adjacent the face of the body during operation, and
- at least one inner reinforcement member embedded within the body and oriented at an angle relative to the normal stress reinforcement for resisting and/or substantially mitigating shear deformation experienced by the body during operation.

In one preferred embodiment the audio transducer is a loudspeaker driver.

Preferably said diaphragm comprises a substantially rigid diaphragm body and said diaphragm body maintains a substantially rigid form during operation over the FRO of the transducer.

Preferably the transducing mechanism applies an excitation action force that acts on the diaphragm during operation.

Preferably the transducing mechanism also applies an excitation reaction force to the transducer base structure associated with the excitation action force applied to the diaphragm during operation.

Preferably the transducing mechanism comprises a force transferring component that is rigidly connected to the diaphragm.

In one form the force transferring component of the transducing mechanism is directly rigidly connected to the diaphragm.

Alternatively the force transferring component is rigidly connected to the diaphragm via one or more intermediate components and the distance between the force transferring component and the diaphragm body is less than 50% of the maximum dimension of the diaphragm body. More preferably the distance is less than 35% or less than 25% of the maximum dimension of the diaphragm body.

Preferably the force transferring component of the transducing mechanism comprises of a motor coil coupled to the diaphragm.

In one form the force transferring component of the transducing mechanism comprises a magnet coupled to the diaphragm.

Preferably the transducing mechanism comprises a magnet that is part of the transducer base structure for providing a magnetic field to which the motor coil is subjected during operation.

Preferably the audio device comprises a base structure assembly associated with the audio transducer which comprises the transducer base structure of the audio transducer, wherein the base structure assembly may also comprise other components, such as a housing, frame, baffle or enclosure, rigidly connected to the transducer base structure.

Preferably the base structure assembly is rotatable relative to the audio transducer housing about a transducer node axis substantially parallel to the axis of rotation of the diaphragm.

Preferably the base structure assembly of the audio transducer is connected to at least one other part of the audio device via a decoupling mounting system.

Preferably the compliance and/or compliance profile (which can include the overall degree of compliance to relative movement of the decoupling system and/or the relative compliances at different locations of the various decoupling mounts of the decoupling system) of the decoupling mounting system and the location of the decoupling mounting system relative to the associated audio transducer is such that, when the driver is operated with a steady state sine wave having frequency within the transducer's FRO, a shortest distance between a first point and the transducer node axis at the second operative state is less than approximately 25%, or more preferably less than 20%, or even more preferably less than 15% or yet more preferably less than 10% or most preferably less than 5% of a greatest length dimension of the associated transducer base structure, wherein the first point lies on the part of the transducer node axis at the first operative state where it passes within the transducer base structure, and which also lies the greatest orthogonal distance from the transducer node axis at the second operative state.

Preferably when the transducer is in the second operative state, the transducer node axis passes through, or within 25% of a greatest length dimension of the base structure assembly of, the base structure assembly.

Preferably the decoupling mounting system comprises one or more node axis mounts which are located less than a distance of 25%, or 20%, or 15% or most preferably 10% of the largest dimension of the base structure assembly, away from the transducer node axis in the second operative state.

Preferably the decoupling mounting system comprises one or more distal mounts which are located beyond a distance of 25% more preferably 40% of the largest dimension of the base structure assembly, away from the transducer node axis in the second operative state.

Preferably the distal mounts are relatively more flexible or compliant to movement than the one or more node axis mounts.

In one embodiment each node axis mount comprises a pin extending laterally from one side of the transducer base structure, the pin extending approximately parallel to the node axis and being rigidly coupled to the base structure, and wherein the node axis mount further comprises a bush about the pin connected to the housing of the device.

Preferably the decoupling mounting system comprises a flexible material that has a mechanical loss coefficient at approximately 24 degrees Celsius that is greater than or greater than 0.4, or greater than 0.8, or most preferably greater than 1.

Preferably the decoupling mounting system is located, relative to the base structure assembly, and has a level of compliance that causes the transducer node axis location of the first operative state to substantially coincide with the node axis location of the second operative state.

Preferably the diaphragm body comprises of a maximum thickness that is at least 11% of a greatest length dimension of the body. More preferably the maximum thickness is at least 14% of the greatest length dimension of the body.

In some embodiments the thickness of the diaphragm body is tapered to reduce the thickness towards the distal region. In other embodiments the thickness of the diaphragm body is stepped to reduce the thickness towards the region distal to the centre of mass of the diaphragm.

Preferably the rotatable coupling is sufficiently compliant such that diaphragm resonance modes, other than the fundamental mode, which are facilitated by this compliance, and which affect the frequency response by more than 2 dB, occur below the FRO.

Alternatively parts of the hinging mechanism that facilitate movement and which pass translational loadings between the diaphragm and the transducer base structure are made from materials having Young's modulus greater than approximately 8 GPa, or more preferably higher than approximately 20 GPa.

Preferably the hinging mechanism comprises a first substantially rigid component in substantially constant abutment but disconnected with a second substantially rigid component. Alternatively the hinging mechanism incorporates a thin-walled spring component formed from a material having a Young's Modulus of greater than approximately 8 GPa, more preferably greater than approximately 20 GPa.

Preferably the diaphragm body is formed from a core material that comprises an interconnected structure that varies in three dimensions. The core material may be a foam or an ordered three-dimensional lattice structured material. The core material may comprise a composite material. Preferably the core material is expanded polystyrene foam. Alternative materials include polymethyl methacrylamide foam, polyvinylchloride foam, polyurethane foam, polyethylene foam, Aerogel foam, corrugated cardboard, balsa wood, syntactic foams, metal micro lattices and honeycombs.

Preferably the diaphragm incorporates one or more materials that help it to resist bending which have a Young's Modulus greater than approximately 8 GPa, more preferably greater than approximately 20 GPa, and most preferably greater than approximately 100 GPa.

In another aspect the invention may be said to consist of an audio device comprising:

i) an audio transducer having: a rotatably mounted diaphragm and a transducing mechanism configured to operatively transduce an electronic audio signal and rotational motion of the diaphragm corresponding to sound pressure;

ii) a transducer housing comprising a baffle and/or enclosure configured to accommodate the audio transducer there within; and iii) a decoupling mounting system located between the diaphragm of the audio transducer and the associated transducer housing to at least partially alleviate mechanical transmission of vibration between the diaphragm and the enclosure transducer housing, the decoupling mounting system flexibly mounting a first component to a second component of the audio device.

In another aspect the invention may be said to consist of an audio device comprising:

i) an audio transducer having: a rotatably mounted diaphragm and a transducing mechanism configured to operatively transduce an electronic audio signal and rotational motion of the diaphragm corresponding to sound pressure; and ii) a decoupling mounting system located between a first part or assembly incorporating the audio transducer and at least one other part or assembly of the audio device to at least partially alleviate mechanical transmission of vibration between the first part or assembly and the at least one other part or assembly, the decoupling mounting system flexibly mounting the first part or assembly to the second part or assembly of the audio device.

Preferably the first part is a transducer housing comprising a baffle or enclosure for accommodating the audio transducer there within.

In another aspect the invention may be said to consist of an audio device comprising:

an audio transducer having: a rotatably mounted diaphragm and a transducing mechanism configured to operatively transduce an electronic audio signal and rotational motion of the diaphragm corresponding to sound pressure;

a transducer housing comprising a baffle or enclosure configured to accommodate the audio transducer there within; and a decoupling mounting system flexibly mounting the audio transducer to the baffle or enclosure to at least partially alleviate mechanical transmission of vibration between the diaphragm and the transducer housing.

In another aspect the invention may be said to consist of an audio device comprising:

an audio transducer having: a rotatably mounted diaphragm and a transducing mechanism configured to operatively transduce an electronic audio signal and rotational motion of the diaphragm corresponding to sound pressure;

a headband configured to be worn by a user for disposing the audio transducer in close proximity to a user's ear or ears in use; and at least one decoupling mounting system located between the headband and the audio transducer to at least partially alleviate mechanical transmission of vibration between the audio transducer and the headband, each mounting system flexibly mounting a first component to a second component of the audio device.

Preferably the decoupling mounting system comprises a resilient material such as rubber, silicon or viscoelastic urethane polymer.

In one configuration the decoupling mounting system comprises ferromagnetic fluid to provide support between the first and second components.

In one configuration the decoupling mounting system uses magnetic repulsion to provide support between the first and second components.

In one configuration the decoupling mounting system comprises fluid or gel to provide support between the first and second components.

In one configuration the fluid or gel is contained within a capsule comprising a flexible material.

Alternatively or in addition at least one of the mounting systems comprises a metal spring or other metallic resilient member.

Alternatively or in addition at least one of the mounting systems comprises a member formed from a soft plastics material.

In another aspect the invention may be said to consist of an audio device comprising:

an audio transducer having: a rotatably mounted diaphragm and a transducing mechanism configured to operatively transduce an electronic audio signal and rotational motion of the diaphragm corresponding to sound pressure; and a decoupling mounting system located between the diaphragm of the audio transducer and at least one other part of the audio device for at least partially alleviating mechanical transmission of vibration between the diaphragm and the at least one other part of the audio device, the decoupling mounting system flexibly mounting a first component to a second component of the audio device; and wherein the diaphragm comprises a diaphragm body having of a maximum thickness of at least 11% of a greatest length dimension of the body.

In another aspect the invention may be said to consist of an audio device comprising:

an audio transducer having: a moveable diaphragm and a transducing mechanism configured to operatively transduce an electronic audio signal and motion of the diaphragm corresponding to sound pressure; and a decoupling mounting system between a first part incorporating the audio transducer and at least one other part of the audio device to at least partially alleviate mechanical transmission of vibration between the first part and the at least one other part, the decoupling mounting system flexibly mounting a first component to a second component of the audio device; and wherein the diaphragm of the audio transducer comprises a diaphragm body having an outer peripheral edge that is at least partially free from physical connection with an interior of the first part.

Preferably the first part comprises a housing comprising a baffle or enclosure for accommodating the associated audio transducer there within.

In another aspect the invention may be said to consist of an audio device comprising:

an audio transducer having: a moveable diaphragm and a transducing mechanism configured to operatively transduce an electronic audio signal and motion of the diaphragm corresponding to sound pressure;

a transducer housing comprising a baffle or enclosure for accommodating the audio transducer there within; and a decoupling mounting system flexibly mounting the audio transducer to the associated transducer housing to at least partially alleviate mechanical transmission of vibration between the audio transducer and the transducer housing; and wherein the diaphragm of the audio transducer comprises a diaphragm body having an outer periphery that is at least partially free from physical connection with an interior of the transducer housing.

In another aspect the invention may be said to consist of an audio device comprising:

an audio transducer having: a moveable diaphragm and a transducing mechanism configured to operatively transduce an electronic audio signal and motion of the diaphragm corresponding to sound pressure; and

- a decoupling mounting system between a first part incorporating the audio transducer and at least one other part of the audio device to at least partially alleviate mechanical transmission of vibration between the first part and the at least one other part, the decoupling mounting system flexibly mounting a first component to a second component of the audio device; and wherein
- the diaphragm of the audio transducer comprises a diaphragm body having an outer periphery that is at least partially free from connection with an interior of the first part; and
- the diaphragm body comprises a maximum thickness of at least 11% of a greatest length dimension of the body.

Preferably the at least one other part of the audio device has mass greater than at least the same as the mass of the first part, or more preferably at least 60%, or 40% or most preferably at least 20% of the mass of the first part.

In another aspect the invention may be said to consist of an audio device comprising:

- an audio transducer having: a moveable diaphragm and a transducing mechanism configured to operatively transduce an electronic audio signal and motion of the diaphragm corresponding to sound pressure; and
- a decoupling mounting system between a first part incorporating the audio transducer and at least one other part of the audio device to at least partially alleviate mechanical transmission of vibration between the first part and the at least one other part, the decoupling mounting system flexibly mounting a first component to a second component of the audio device; and wherein the diaphragm comprises a diaphragm body having a maximum thickness of at least 11% of a greatest length dimension of the body.

In another aspect the invention may be said to consist of an audio device comprising:

- an audio transducer having: a moveable diaphragm and a transducing mechanism configured to operatively transduce an electronic audio signal and motion of the diaphragm corresponding to sound pressure;
- a transducer housing comprising a baffle or enclosure for accommodating the audio transducer there within; and
- a decoupling mounting system flexibly mounting the audio transducer to the transducer housing to at least partially alleviate mechanical transmission of vibration between the audio transducer and the transducer housing; and wherein the diaphragm comprises a diaphragm body having a maximum thickness of at least 11% of a greatest length dimension of the body.

In some embodiments of any one of aspects seventeen to twenty-eight described above, the audio device may comprise two or more of the audio transducer and/or two or more of the decoupling mounting system defined under that aspect.

In some embodiment in any one of the above aspects comprising of an audio device having a decoupling mounting system, preferably the diaphragm comprises one or more peripheral regions that are free from physical connection with the interior of the first part. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

In one configuration there is a small air gap between the one or more peripheral regions of the diaphragm body periphery that are free from connection with the enclosure interior, and the enclosure interior.

Preferably the size of the air gap is less than $1/20^{th}$ of the diaphragm body length.

Preferably the size of the air gap is less than 1 mm.

In another configuration the diaphragm is supported by a ferromagnetic fluid.

Preferably a substantial proportion of support provided to the diaphragm against translations in a direction substantially parallel to the coronal plane of the diaphragm body, is provided by the ferromagnetic fluid.

Preferably the diaphragm comprises normal stress reinforcement coupled to the body, the normal stress reinforcement being coupled adjacent at least one of said major faces for resisting compression-tension stresses experienced at or adjacent the face of the body during operation In another aspect the invention may broadly be said to consist of an audio device as per any one of the above aspects that includes a decoupling mounting system, and wherein the diaphragm comprises:

- a diaphragm body having one or more major faces,
- normal stress reinforcement coupled to the body, the normal stress reinforcement being coupled adjacent at least one of said major faces for resisting compression-tension stresses experienced at or adjacent the face of the body during operation, and
- at least one inner reinforcement member embedded within the body and oriented at an angle relative to at least one of said major faces for resisting and/or substantially mitigating shear deformation experienced by the body during operation.

Preferably in either one of the above two aspects a distribution of mass of associated with the diaphragm body or a distribution of mass associated with the normal stress reinforcement, or both, is such that the diaphragm comprises a relatively lower mass at one or more low mass regions of the diaphragm relative to the mass at one or more relatively high mass regions of the diaphragm.

Preferably the diaphragm body comprises a relatively lower mass at one or more regions distal from a centre of mass location of the diaphragm. Preferably the thickness of the diaphragm reduces toward a periphery distal from the centre of mass.

Alternatively or in addition a distribution of mass of the normal stress reinforcement is such that a relatively lower amount of mass is at one or more peripheral edge regions of the associated major face distal from an assembled centre of mass location the diaphragm.

In some embodiments of any one of the above audio device aspects, at least one of the audio transducers is a linear action transducer having. Preferably the diaphragm comprises a substantially curved diaphragm body. Preferably the diaphragm body is a substantially domed body. Preferably the body comprises a sufficient thickness and/or depth such that the body is substantially rigid during operation. For example, the body may be relatively thin but the overall depth of the domed body may be at least 15% greater than a greatest length dimension across the body. Preferably the audio transducer further comprises a diaphragm base frame rigidly coupled to and extending longitudinally from an outer periphery of the diaphragm body. Preferably the excitation mechanism comprises one or more force transferring components coupled to the base frame. Preferably the one or more force transferring components comprise one or more coil windings wound about the diaphragm base frame. Preferably ferromagnetic fluid rings extend about the inner periphery of each gap to suspend the diaphragm. Preferably the diaphragm base frame and the diaphragm are free from physical connection about an approximately entire portion of the associated peripheries.

In another aspect the invention may consist of an audio device comprising two or more electro-acoustic loudspeakers incorporating any one or more of the audio transducers of the above aspects and providing two or more different audio channels through capable of reproduction of independent audio signals. Preferably the audio device is personal audio device adapted for audio use within approximately 10 cm of the user's ear.

In another aspect the invention may be said to consist of a personal audio device incorporating any combination of one or more of the audio transducers and its related features, configurations and embodiments of any one of the previous audio transducer aspects.

In another aspect the invention may be said to consist of a personal audio device comprising a pair of interface devices configured to be worn by a user at or proximal to each ear, wherein each interface device comprises any combination of one or more of the audio transducers and its related features, configurations and embodiments of any one of the previous audio transducer aspects.

In another aspect the invention may be said to consist of a headphone apparatus comprising a pair of headphone interface devices configured to be worn on or about each ear, wherein each interface device comprises any combination of one or more of the audio transducers and its related features, configurations and embodiments of any one of the previous audio transducer aspects.

In another aspect the invention may be said to consist of an earphone apparatus comprising a pair of earphone interfaces configured to be worn within an ear canal or concha of a user's ear, wherein each earphone interface comprises any combination of one or more of the audio transducers and its related features, configurations and embodiments of any one of the previous audio transducer aspects.

In another aspect the invention may be said to consist of an audio transducer of any one of the above aspects and related features, configurations and embodiments, wherein the audio transducer is an acoustoelectric transducer.

In another aspect the invention may be said to consist of an audio device comprising:

- at least one audio transducer having: a moveable diaphragm and a transducing mechanism configured to operatively transduce an electronic audio signal and motion of the diaphragm corresponding to sound pressure;
- an enclosure for accommodating the at least one audio transducer therein;
- a decoupling mounting system for flexibly mounting the enclosure to a surrounding support structure to at least partially alleviate mechanical transmission of vibration between the at least one audio transducer and the support structure; and wherein the diaphragm of at least one audio transducer comprises a diaphragm body having an outer periphery that is at least partially free from physical connection with an interior of the transducer housing.

Preferably the device is a computer speaker or the like. For example it may comprise size dimensions of less than about 0.8 m height, less than about 0.4 m width and/or less than about 0.3 m depth.

In another configuration the diaphragm is supported by a ferromagnetic fluid.

Preferably a substantial proportion of support provided to the diaphragm against translations in a direction substantially parallel to the coronal plane of the diaphragm body, is provided by the ferromagnetic fluid.

In another aspect the invention may be said to consist of an audio device comprising:

- at least one audio transducer having: a moveable diaphragm and a transducing mechanism configured to operatively transduce an electronic audio signal and motion of the diaphragm corresponding to sound pressure;
- an enclosure for accommodating the at least one audio transducer therein; and wherein the enclosure is adapted for use with a decoupling mounting system for flexibly mounting the enclosure to a surrounding support structure to at least partially alleviate mechanical transmission of vibration between the at least one audio transducer and the support structure; and wherein the diaphragm of at least one audio transducer comprises a diaphragm body having an outer periphery that is at least partially free from physical connection with an interior of the transducer housing.

In a further aspect the invention may be said to consist of a personal audio device for use in a personal audio application where the device is normally located within approximately 10 centimeters of a user's head in use, the audio device comprising:

- at least one audio transducer having: a diaphragm, and an excitation mechanism configured to act on the diaphragm to move the diaphragm in use in response to an electronic signal to generate sound; and
- at least one housing associated with each audio transducer and comprising an enclosure or baffle for accommodating the audio transducer; and
- wherein the diaphragm of one or more audio transducers comprises an outer periphery that is at least partially free from physical connection with an interior of the associated housing.

Preferably the diaphragm comprises one or more peripheral regions that are free from physical connection with the interior of the housing. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

Preferably all regions of the outer periphery of the diaphragm that move a significant distance during normal operation, are approximately entirely free from physical connection with the interior of the housing.

In some embodiments the one or more peripheral regions of the diaphragm that are free from physical connection with an interior of the housing are supported by a fluid. Preferably the fluid is a ferromagnetic fluid. Preferably the ferromagnetic fluid seals against or is in direct contact with the one or more peripheral regions supported by ferromagnetic fluid such that it substantially prevents the flow of air there between.

Preferably the audio device comprises at least one decoupling mounting system located between the diaphragm of at least one of the audio transducers and at least one other part of the audio device for at least partially alleviating mechanical transmission of vibration between the diaphragm and the at least one other part of the audio device, each decoupling mounting system flexibly mounting a first component to a second component of the audio device.

In some embodiments the diaphragm of one or more audio transducers comprises:

a diaphragm body having one or more major faces, normal stress reinforcement coupled to the body, the normal stress reinforcement being coupled adjacent at least one of said major faces for resisting compression-tension stresses experienced at or adjacent the face of the body during operation, and at least one inner reinforcement member embedded within the body and oriented at an angle relative to at least one of said major faces for resisting and/or substantially mitigating shear deformation experienced by the body during operation.

Preferably the diaphragm is rigidly attached to a force transferring component of the excitation mechanism. Preferably the force transferring component remains substantially rigid in-use.

Preferably the force transferring component comprises an electrically conducting component which receives an electrical current representing an audio signal. Preferably the electrically conducting component works via Lenz's law. Preferably the electrically conducting component is a coil. Preferably the excitation mechanism further comprises a magnetic element or structure that generates a magnetic field and wherein the electrically conducting component is located in the magnetic field in situ. Preferably the magnetic structure or element comprises a permanent magnet.

Preferably the housing comprises one or more openings for transmitting sound generated by movement of the diaphragm into the ear canal of the user in use.

In some embodiments at least one of the audio transducers is a linear action transducer having. Preferably the diaphragm comprises a substantially curved diaphragm body. Preferably the diaphragm body is a substantially domed body. Preferably the body comprises a sufficient thickness and/or depth such that the body is substantially rigid during operation. For example, the body may be relatively thin but the overall depth of the domed body may be at least 15% greater than a greatest length dimension across the body. Preferably the audio transducer further comprises a diaphragm base frame rigidly coupled to and extending longitudinally from an outer periphery of the diaphragm body. Preferably the excitation mechanism comprises one or more force transferring components coupled to the base frame. Preferably the one or more force transferring components comprise one or more coil windings wound about the diaphragm base frame. Preferably a plurality of components are distributed along a length of the diaphragm base frame. Preferably the excitation mechanism further comprises a magnetic structure or assembly generating a magnetic field within a region through which the one or more coil windings locate during operation. Preferably the magnetic structure comprises opposing pole pieces and generates a magnetic field in one or more gaps formed between the pole pieces. Preferably the diaphragm base frame extends within the one or more gaps. Preferably in a neutral position of the diaphragm the one or more coils are aligned with the one or more gaps. Preferably the audio transducer comprises a pair of coils and a pair of associated magnetic field gaps. Preferably diaphragm assembly reciprocates relative to the magnetic structure during operation. Preferably ferromagnetic fluid rings extend about the inner periphery of each gap to suspend the diaphragm. Preferably the diaphragm base frame and the diaphragm are free from physical connection about an approximately entire portion of the associated peripheries.

In some forms the audio device further comprises at least one decoupling mounting system for mounting an audio transducer within the associated housing. Preferably the decoupling mounting system is located between the diaphragm of the audio transducer and at least one other part of the audio device for at least partially alleviating mechanical transmission of vibration between the diaphragm assembly and the at least one other part of the audio device, the decoupling mounting system flexibly mounting a first component to a second component of the audio device, either directly or indirectly. In some forms the decoupling system comprises a plurality of flexible mounting blocks. Preferably the mounting blocks are distributed about an outer peripheral surface of the first component and rigidly connect on one side to the outer peripheral surface of the first component and on an opposing side to an inner peripheral surface of the second component.

In some embodiments one or more regions of the outer periphery of the diaphragm that are free from physical connection with the interior of the housing are separated by an air gap with the interior of the housing. Preferably a relatively small air gap separates the interior of the housing and the one or more peripheral regions of the diaphragm. Preferably a width of the air gap defined by the distance between each peripheral region and the housing is less than $1/10^{th}$, and more preferably less than $1/20^{th}$ of a length of the diaphragm. Preferably a width of the air gap defined by the distance between the one or more peripheral regions of the diaphragm and the housing is less than 1.5 mm, or more preferably is less than 1 mm, or even more preferably is less than 0.5 mm.

In some embodiments a distribution of mass associated with the diaphragm body or a distribution of mass associated with the normal stress reinforcement, or both, is such that the diaphragm comprises a relatively lower mass at one or more low mass regions of the diaphragm relative to the mass at one or more relatively high mass regions of the diaphragm.

Preferably the one or more low mass regions are peripheral regions distal from a center of mass location of the diaphragm and the one or more high mass regions are at or proximal to the center of mass location.

Preferably the low mass regions are at one end of the diaphragm and the high mass regions are at an opposing end. Preferably the low mass regions are distributed substantially about an entire outer periphery of the diaphragm and the high mass regions are a central region of the diaphragm.

Preferably a distribution of mass of the normal stress reinforcement is such that a relatively lower amount of mass is located at the one or more low mass regions.

Alternatively or in addition a distribution of mass of the diaphragm body is such that the diaphragm body comprises a relatively lower mass at the one or more low mass regions. Preferably a thickness of the diaphragm body is reduced by tapering toward the one or more low mass regions, preferably from the centre of mass location.

In some embodiments at least one audio transducer is a rotational action audio transducer. Preferably the audio transducer comprises a transducer base structure and a hinge system for rotatably coupling the diaphragm relative to the transducer base structure. Preferably the diaphragm comprises a substantially rigid structure. Preferably the diaphragm comprises a diaphragm body having outer normal stress reinforcement coupled to one or more major faces. Preferably the diaphragm comprises inner stress reinforcement embedded within the diaphragm body. Preferably the diaphragm comprises a substantially thick diaphragm body. Preferably the diaphragm body is comprises a substantially tapered thickness along a length of the body. Preferably a thick base end of the diaphragm body is rigidly coupled to a diaphragm base frame of the audio transducer. Preferably the excitation mechanism comprises a force transferring component rigidly coupled to the diaphragm base frame. Preferably the force transferring component comprises one or more coils. Preferably the transducer base structure comprises a magnetic structure configured to generate a magnetic field within a channel traversed by the force transferring component during operation. Preferably the channel is formed between outer and inner pole pieces of the magnetic structure. Preferably the channel is substantially curved and a transducer base structure plate to which the coils are rigidly attached is similarly curved.

In one form the hinge system comprises a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface. Preferably the hinge system comprises a biasing mechanism for biasing each hinge element towards the associated contact surface.

In one configuration the biasing mechanism comprises a resilient member, such as a spring held in compression effectively against each hinge element. In another alternative configuration the biasing mechanism comprises a magnetic mechanism comprising a magnetic field generating structure and a ferromagnetic hinge element.

In one configuration each contact surface is substantially concavely curved at least in cross-section and each associated hinge element comprises a substantially convexly curved contact surface at least in cross-section. Preferably the concavely curved contact surface comprises a larger radius of curvature than the convexly curved contact surface. In another configuration each contact surface is substantially planar and the associated hinge element comprises a convexly curved contact surface at least in cross-section.

Preferably the hinge system comprise a pair of hinge joints configured to locate on either side of the diaphragm. Preferably the hinge elements are rigidly coupled to the diaphragm and the contact members are rigidly coupled to and extend from the transducer base structure.

In yet another form the hinge system comprises at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation. In some configurations, each flexible hinge element of each hinge joint is substantially flexible with bending. Preferably each hinge element is substantially rigid against torsion. In alternative configurations, each flexible hinge element of each hinge joint is substantially flexible in torsion. Preferably each flexible hinge element is substantially rigid against bending.

Preferably the audio device further comprises at least one decoupling mounting system for mounting an audio transducer within the associated housing. Preferably the decoupling mounting system is located between the diaphragm of the audio transducer and at least one other part of the audio device for at least partially alleviating mechanical transmission of vibration between the diaphragm and the at least one other part of the audio device, the decoupling mounting system flexibly mounting a first component to a second component of the audio device, either directly or indirectly. Preferably, the decoupling mounting system at least partially alleviates mechanical transmission of vibration between the diaphragm and the at least one other part of the audio device along at least one translational axis, or more preferably along at least two substantially orthogonal translational axes, or yet more preferably along three substantially orthogonal translational axes. Preferably, the decoupling mounting system at least partially alleviates mechanical transmission of vibration between the diaphragm and the at least one other part of the audio about at least one rotational axis, or more preferably about at least two substantially orthogonal rotational axes, or yet more preferably about three substantially orthogonal rotational axes. Preferably the decoupling mounting system couples between the transducer base structure and an interior of the housing. Preferably the decoupling system comprises at least one node axis mount that is configured to locate at or proximal to a node axis location associated with the transducer base structure. Preferably the decoupling system comprises at least one distal mount configured to locate distal from a node axis location associated with the transducer base structure. Preferably the at least one node axis mount is relatively less compliant and/or relatively less flexible than the at least one distal mount.

In some embodiments the audio device comprises at least one interface device, each interface device comprising a housing of the at least one housing and incorporating at least one of the audio transducer(s) therein. Preferably each interface device is configured to engage the user's head to locate the associated audio transducer relative to a user's ear. Preferably the interface is configured to locate the associated audio transducer proximal to or at a user's ear canal.

Preferably the audio device comprises a pair of interface devices for each ear of the user.

In one form each interface device is a headphone cup. Preferably each headphone cup comprises an interface pad configured to locate at or about a user's ear. Preferably the pad comprises a sealing element for creating a substantial seal about the user's ear in use. Preferably audio device further comprises a headband extending between the headphone cups and configured to locate about the crown of the user's head in use.

In another form each interface device is an earphone interface. Preferably each earphone interface comprises an interface plug configured to locate at, adjacent or within the user's ear canal in use. Preferably the interface plug comprises a sealing element for creating a substantial seal at, adjacent or within the user' ear canal.

In one form the earphone interface comprises a substantially longitudinal interface channel audibly coupled to the diaphragm and configured to locate directly adjacent the user's ear canal in situ. Preferably the interface channel comprises a sound damping insert at a throat of the channel, such as a foam or other porous or permeable element.

Preferably the audio device comprises at least one audio transducer having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz.

Preferably each interface device comprises no more than three audio transducers, collectively having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from to 14 kHz.

Preferably each interface device comprises no more than two audio transducers, collectively having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from to 14 kHz.

Preferably each interface device comprises a single audio transducer having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz.

Preferably each interface device is configured to create a sufficient seal between an internal air cavity on one side of the interface configured to locate adjacent a user's ear in use and a volume of air external to the device in situ.

Preferably the housing associated with each interface device comprises at least one fluid passage from the first cavity to a second cavity located on an opposing side of the device to the first cavity, or from the first cavity to a volume of air external to the device, or both Preferably each fluid passage provides a substantially restrictive fluid passage for substantially restricting the flow of gases there through, in situ and during operation. The fluid passage may comprise a reduced diameter or width at the junction with a volume of air on either side and/or may comprise a fluid flow restricting element. The fluid flow restricting element may be a porous or permeable cover or insert located at or within the passage.

In some embodiments, the interface device comprises a first fluid passage extends between a first front cavity on a side of the diaphragm configured to locate adjacent the user's ear in use, and a second rear cavity on an opposing side of the diaphragm. Preferably the first fluid passage comprises a fluid passage of substantially reduced entrance area relative to the cross-sectional areas of the first and second cavities. In some forms the first fluid passage is located directly about the periphery of the diaphragm. In other forms the first cavity is located through an inner wall of the transducer base structure or housing.

In some embodiments, the interface device comprises a first or second fluid passage from the first front cavity to an external volume of air. In some forms the fluid passage comprises a substantially reduced entrance area relative to a cross-section area of an adjacent volume of air. In some other forms the fluid passages comprises a substantially large entrance area relative to a cross-section area of the first front cavity and also incorporates a flow restricting element that is substantially restrictive to the flow of gases there through.

In some embodiments the audio device is a mobile phone.

In some embodiments the audio device is a hearing aid.

In some embodiments the audio device is a microphone.

In another aspect the invention may be said to consist of a headphone apparatus comprising a pair of headphone interface devices configured to locate about each of the user's ears in use, each interface device comprising:

at least one audio transducer having: a diaphragm, and an excitation mechanism configured to act on the diaphragm to move the diaphragm in use in response to an electronic signal to generate sound; and at least one housing associated with each audio transducer and comprising an enclosure or baffle for accommodating the audio transducer; and wherein the diaphragm of one or more audio transducers comprises an outer periphery that is at least partially free from physical connection with an interior of the associated housing.

In another aspect the invention may be said to consist of an earphone apparatus comprising a pair of earphone interface devices, each configured to locate within or adjacent an ear canal of a user in use, and each interface device comprising:

- at least one audio transducer having: a diaphragm, and an excitation mechanism configured to act on the diaphragm to move the diaphragm in use in response to an electronic signal to generate sound; and
- at least one housing associated with each audio transducer and comprising an enclosure or baffle for accommodating the audio transducer; and
- wherein the diaphragm of one or more audio transducers comprises an outer periphery that is at least partially free from physical connection with an interior of the associated housing.

In another aspect the invention may be said to consist of a mobile phone including an audio device, the audio device comprising:

- at least one audio transducer having: a diaphragm, and an excitation mechanism configured to act on the diaphragm to move the diaphragm in use in response to an electronic signal to generate sound; and
- at least one housing associated with each audio transducer and comprising an enclosure or baffle for accommodating the audio transducer; and
- wherein the diaphragm of one or more audio transducers comprises an outer periphery that is at least partially free from physical connection with an interior of the associated housing.

In another aspect the invention may be said to consist of a hearing aid comprising:

- at least one audio transducer having: a diaphragm, and an excitation mechanism configured to act on the diaphragm to move the diaphragm in use in response to an electronic signal to generate sound; and at least one housing associated with each audio transducer and comprising an enclosure or baffle for accommodating the audio transducer; and wherein the diaphragm of one or more audio transducers comprises an outer periphery that is at least partially free from physical connection with an interior of the associated housing.

In another aspect the invention consists in a microphone, comprising:

at least one audio transducer having: a diaphragm, and transducing mechanism configured to transduce movement of the diaphragm generated by sound into an electrical audio signal; and at least one housing associated with each audio transducer and comprising an enclosure or baffle for accommodating the audio transducer; and wherein the diaphragm of one or more audio transducers comprises an outer periphery that is at least partially free from physical connection with an interior of the associated housing.

In another aspect the invention consists of a personal audio device for use in a personal audio application where the device is normally located within approximately 10 centimeters of a user's head in use, the audio device comprising:

at least one audio transducer having: a diaphragm, and an excitation mechanism configured to act on the diaphragm to move the diaphragm in use in response to an electronic signal to generate sound; and at least one housing associated with each audio transducer and comprising an enclosure or baffle for accommodating the audio transducer; and wherein the diaphragm of one or more audio transducers is substantially entirely free from physical connection with an interior of the associated housing.

In another aspect the invention consists of a personal audio device for use in a personal audio application where the device is normally located within approximately 10 centimeters of a user's head in use, the audio device comprising:

at least one audio transducer having: a diaphragm, and an excitation mechanism configured to act on the diaphragm to move the diaphragm in use in response to an electronic signal to generate sound; and at least one housing associated with each audio transducer and comprising an enclosure or baffle for accommodating the audio transducer;

wherein at least one audio transducer associated with at least one housing comprises a suspension connecting an outer periphery of the diaphragm to the housing; and wherein the suspension connects the diaphragm only partially about the perimeter of the periphery.

Preferably the suspension connects the diaphragm along a length that is less than 80% of the perimeter of the periphery. More preferably the suspension connects the diaphragm along a length that is less than 50% of the perimeter of the periphery. Most preferably the suspension connects the diaphragm along a length that is less than 20% of the perimeter of the periphery.

The suspension may be a solid surround or sealing element for example.

In another aspect the invention may also be said to consist of an earphone apparatus comprising at least one earphone interface device configured to be located within the concha of a user's ear in situ, each earphone interface device comprising:

an audio transducer having: a diaphragm and an excitation mechanism configured to act on the diaphragm to move the diaphragm in use in response to an electronic signal to generate sound; and a housing comprising an enclosure or baffle for accommodating the audio transducer and configured to be retained within the concha of the user's ear in use;

wherein the diaphragm of the audio transducer comprises one or more peripheral regions of an outer periphery of the diaphragm that are free from physical connection with an interior of the housing; and wherein a relatively small air gap separates the interior of the housing and the one or more peripheral regions of the diaphragm.

Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

Preferably a width of the air gap defined by the distance between each peripheral region and the housing is less than $1/10^{th}$, and more preferably less than $1/20^{th}$ of a length of the diaphragm.

Preferably a width of the air gap defined by the distance between the one or more peripheral regions of the diaphragm and the housing is less than 1.5 mm, or more preferably is less than 1 mm, or even more preferably is less than 0.5 mm.

Preferably the housing comprises one or more openings for transmitting sound generated by movement of the diaphragm into the ear canal of the user in use.

Preferably the one or more openings are configured to be located inside the user's concha when the device is in situ. Alternatively the one or more openings are configured to be located inside the user's ear canal when the device is in situ.

In some embodiments the housing does not substantially seal off air contained within the ear canal and air outside of said ear canal in situ. Preferably the housing does not provide a substantially continuous seal around the periphery of the user's ear canal in situ. Preferably the housing does not impart a substantially continuous pressure against the periphery of the user's ear canal in situ.

Preferably the housing obstructs an opening into the user's ear canal in situ to a degree that causes passive attenuation of ambient sound at 70 Hertz that is less than 1 decibel (dB), or less than 2 dB, or less than 3 dB or less than 6 dB.

Alternatively or in addition the housing obstructs an opening into the user's ear canal in situ to a degree that causes passive attenuation of ambient sound at 120 Hertz that is less than 1 decibel (dB), or less than 2 dB, or less than 3 dB or less than 6 dB.

Alternatively or in addition the housing obstructs an opening into the user's ear canal in situ to a degree that causes passive attenuation of ambient sound at 400 Hertz that is less than 1 decibel (dB), or less than 2 dB, or less than 3 dB or less than 6 dB.

In one embodiment each earphone interface device comprises one audio transducer having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz.

Preferably the earphone apparatus comprises a pair of earphone interface devices configured to locate within the user's ears to reproduce sound. Preferably the earphone interface devices are configured to reproduce at least two independent audio signals.

Preferably the FRO is reproduced without a sustained drop in sound pressure greater than 20 dB, or more preferably greater than 14 dB, or even more preferably greater than 10 dB, or most preferably greater than 6 dB relative to the 'Diffuse Field' reference suggested by Hammershoi and Moller in 2008.

Preferably the FRO is reproduced without a drop in sound pressure at the extremities of the bandwidth that is greater than 20 dB, or more preferably greater than 14 dB, or even more preferably greater than 10 dB, or most preferably greater than 6 dB relative to the 'Diffuse Field' reference suggested by Hammershoi and Moller in 2008.

In a second embodiment each earphone interface device comprises no more than two audio transducers for collectively having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz.

In a third embodiment each earphone interface device comprises no more than three audio transducers collectively having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz.

In another aspect the invention may also be said to consist of a personal audio device for use in a personal audio application where the device is normally located within approximately 10 centimeters of a user's head in use, the audio device comprising:

- at least one audio transducer having: a diaphragm and a hinge assembly coupled to the diaphragm, and an excitation mechanism imparting a substantially rotational motion on the diaphragm in use in response to an electronic signal; and
- a housing comprising an enclosure or baffle for accommodating the audio transducer;
- wherein the diaphragm of the audio transducer maintains substantial rigidity during operation.

Preferably the diaphragm maintains substantial rigidity during operation over the transducer's FRO.

Preferably the diaphragm comprises one or more peripheral regions that are free from physical connection with the interior of the housing. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

Preferably the diaphragm comprises a diaphragm body that is substantially thick relative to a greatest dimension of the diaphragm body. Preferably a maximum thickness of the diaphragm body is greater than 11% of a maximum length of the diaphragm body, or even more preferably greater than 14% of the maximum length.

In some embodiments the diaphragm of one or more audio transducers comprises:

- a diaphragm body having one or more major faces,
- normal stress reinforcement coupled to the body, the normal stress reinforcement being coupled adjacent at least one of said major faces for resisting compression-tension stresses experienced at or adjacent the face of the body during operation, and
- at least one inner reinforcement member embedded within the body and oriented at an angle relative to at least one of said major faces for resisting and/or substantially mitigating shear deformation experienced by the body during operation.

In one form the hinge system comprises a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface. Preferably the hinge system comprises a biasing mechanism for biasing each hinge element towards the associated contact surface.

In yet another form the hinge system comprises at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation. In some configurations, each flexible hinge element of each hinge joint is substantially flexible with bending. Preferably each hinge element is substantially rigid against torsion. In alternative configurations, each flexible hinge element of each hinge joint is substantially flexible in torsion. Preferably each flexible hinge element is substantially rigid against bending.

In a further aspect the invention may be said to consist of a personal audio device for use in a personal audio application where the device is normally located within approximately 10 centimeters of a user's head in use, the audio device comprising:

- an audio transducer having: a diaphragm, a transducer base structure, a hinge assembly rotatably coupling the diaphragm to the transducer base structure, and an excitation mechanism imparting a substantially rotational motion on the diaphragm body in use in response to an electronic signal; and wherein the hinge system comprises at least one hinge joint, each hinge joint pivotally coupling the diaphragm to the transducer base structure to allow the diaphragm to rotate relative to the transducer base structure about an axis of rotation during operation, the hinge joint being rigidly connected at one side to the transducer base structure and at an opposing side to the diaphragm, and comprising at least two resilient hinge elements angled relative to one another, and wherein each hinge element is closely associated to both the transducer base structure and the diaphragm, and comprises substantial translational rigidity to resist compression, tension and/or shear deformation along and across the element, and substantial flexibility to enable flexing in response to forces normal to the section during operation.

In some embodiments, each flexible hinge element of each hinge joint is substantially flexible with bending. Preferably each hinge element is substantially rigid against torsion.

In alternative embodiment, each flexible hinge element of each hinge joint is substantially flexible in torsion. Preferably each flexible hinge element is substantially rigid against bending.

In a further aspect the invention may be said to consist of a personal audio device for use in a personal audio application where the device is normally located within approximately 10 centimeters of a user's head in use, the audio device comprising:

- an audio transducer having: a diaphragm, a transducer base structure, a hinge system rotatably coupling the diaphragm assembly to the transducer base structure, and an excitation mechanism imparting a substantially rotational motion on the diaphragm in use in response to an electronic signal; wherein the hinge system comprises a hinge assembly having one or more hinge joints, wherein each hinge joint comprises a hinge element and a contact member, the contact member having a contact surface; and wherein, during operation each hinge joint is configured to allow the hinge element to move relative to the associated contact member while maintaining a substantially consistent physical contact with the contact surface, and the hinge assembly biases the hinge element towards the contact surface.

In another aspect the invention may also be said to consist of an earphone interface device configured to be located substantially within or adjacent the concha of a user's ear in situ, the earphone interface device comprising:

- an audio transducer having: a diaphragm comprising a diaphragm body and a hinge assembly coupled to the diaphragm, and an excitation mechanism imparting a substantially rotational motion on the diaphragm body in use about an approximate axis of rotation in response to an electronic signal; and
- a housing comprising an enclosure or baffle for accommodating the audio transducer; and
- wherein the diaphragm body of the audio transducer is substantially rigid during operation; and
- wherein the diaphragm body of the audio transducer comprises a thickness in at least one region that is greater than approximately 15% of a distance from the axis of rotation to a most distal periphery of the diaphragm body. More preferably the thickness is greater than approximately 20% of the total distance.

In another aspect the invention may also be said to consist of an earphone interface device configured to be located within the concha of a user's ear in situ, the earphone interface device comprising:

- an audio transducer having: a diaphragm and a hinge assembly coupled to the diaphragm, and an excitation mechanism imparting a substantially rotational motion on the diaphragm in use in response to an electronic signal; and
- a housing comprising an enclosure or baffle for accommodating the audio transducer; and
- wherein the diaphragm of the audio transducer is substantially rigid during operation of the audio transducer; and
- wherein parts of the excitation mechanism of the audio transducer that are connected to the associated diaphragm are connected rigidly.

In another aspect the invention may also be said to consist of an earphone interface device configured to be located within the concha of a user's ear in situ, the earphone interface device comprising:

- an audio transducer having: a diaphragm and a hinge assembly coupled to the diaphragm, and an excitation mechanism imparting a substantially rotational motion on the diaphragm in use in response to an electronic signal; and
- a housing comprising an enclosure or baffle for housing the audio transducer; and
- wherein the diaphragm of the audio transducer is substantially rigid during operation of the audio transducer; and
- wherein the diaphragm of the audio transducer comprises an outer periphery that is at least partially free from physical connection with an interior of the housing.

In another aspect the invention may be said to consist of a personal audio device for use in a personal audio application where the device is normally located within approximately 10 centimeters of a user's head in use, the audio device comprising:

- an audio transducer having: a diaphragm and an excitation mechanism configured to act on the diaphragm to move the diaphragm body in use in response to an electronic signal to generate sound; and
- a housing comprising an enclosure or baffle for accommodating the audio transducer; and
- wherein the diaphragm of the audio transducer comprises an outer periphery that is at least partially free from physical connection with an interior of the housing;
- wherein the audio device creates a sufficient seal between an internal air cavity on one side of the device configured to locate adjacent a user's ear in use and a volume of air on external to the device in situ; and
- wherein the enclosure or baffle associated with the audio transducer comprises at least one fluid passage from the first cavity to a second cavity located on an opposing side of the device to the first cavity, or from the first cavity to the volume of air external to the device, or both.

Preferably the diaphragm comprises one or more peripheral regions that are free from physical connection with the interior of the housing. Preferably the outer periphery is significantly free from physical connection such that the one or more peripheral regions constitute at least 20%, or more preferably at least 30% of a length or perimeter of the periphery. More preferably the outer periphery is substantially free from physical connection such that the one or more peripheral regions constitute at least 50%, or more preferably at least 80% of a length or perimeter of the periphery. Most preferably the outer periphery is approximately entirely free from physical connection such that the one or more peripheral regions constitute at approximately an entire length or perimeter of the periphery.

Preferably each fluid passage provides a substantially restrictive fluid passage for substantially restricting the flow of gases there through, in situ and during operation. The fluid passage may comprise an aperture of a reduced diameter or width at the junction with a volume of air on either side and/or may comprise a fluid flow restricting element. The fluid flow restricting element may be a porous or permeable cover or insert located at or within the passage.

In some embodiments, the interface device comprises a first fluid passage extends between a first front cavity on a side of the diaphragm configured to locate adjacent the user's ear in use, and a second rear cavity on an opposing side of the diaphragm. Preferably the first fluid passage comprises an aperture of substantially reduced entrance area relative to the cross-sectional areas of the first and second cavities. In some forms the first fluid passage is located directly about the periphery of the diaphragm. In other forms the first cavity is located through an inner wall of the transducer base structure or housing.

In some embodiments, the interface device comprises a first or second fluid passage from the first front cavity to an external volume of air. In some forms the fluid passage comprises a substantially reduced entrance area relative to a cross-section area of an adjacent volume of air. In some other forms the fluid passages comprises a substantially large entrance area relative to a cross-section area of the first front cavity and also incorporates a flow restricting element that is substantially restrictive to the flow of gases therethrough.

In some embodiments, the interface device comprises a first or second fluid passage from a rear cavity to an external volume of air. In some forms the fluid passage comprises a substantially reduced entrance area relative to a cross-section area of an adjacent volume of air. In some other forms the fluid passages comprises a substantially large entrance area relative to a cross-section area of the first front cavity and also incorporates a flow restricting element that is substantially restrictive to the flow of gases there through.

In some embodiments the one or more fluid passages may fluidly connect a first front cavity on an ear canal side of the device, to a second cavity that does not incorporate the diaphragm therein.

Preferably the audio device creates a sufficient seal between a volume of air on an ear canal side of the device and a volume of air on an external side of the device in situ, and wherein the volume of air enclosed within the ear canal side of the device in situ is sufficiently small, such that sound pressure generated inside the ear canal increases by an average of at least 2 dB, or more preferably 4 dB, or most preferably at least 6 dB, during operation of the device \ relative to sound pressure generated when the audio device is not creating a sufficient seal in situ.

Preferably the audio device creates a sufficient seal between a volume of air on an ear canal side of the device and a volume of air on an external side of the device in situ, and wherein the volume of air enclosed within the ear canal side of the device in situ is sufficiently small, such that sound pressure generated inside the ear canal, given a 70 Hz sine wave electrical input, increases by at least 2 dB, or more preferably 4 dB, or most preferably at least 6 dB, relative to sound pressure generated when the same electrical input is applied when the audio device is not creating a sufficient seal in situ.

Preferably said air leaks are formed substantially within a single component. More preferably they are formed completely within a single component.

Preferably the at least one air leak passage comprises a small hole and/or a fine mesh and/or an air gap.

In some embodiments, one of said fluid passages comprises one or more apertures of a diameter that is less than approximately 0.5 mm, or more preferably less than approximately 0.1 mm, or most preferably less than approximately 0.03 mm.

Preferably said fluid passages permit a sufficient flow of gases there through such that they are collectively responsible for at least 10%, or more preferably at least 25%, or more preferably still at least 50%, or most preferably at least 75% of the average reduction in sound pressure level (SPL) during operation of the device over a frequency range of 20 Hz to 80 Hz (average calculated using log-scale weightings in both SPL (i.e. dB) and frequency domain), relative to a sound pressure generated when there is negligible leakage, at least 50% of the time that the audio device is installed in a standard measurement device.

Preferably said air leak passages leak sufficient air such that they are collectively responsible for at least 10%, or more preferably at least 25%, or more preferably still at least 50%, or most preferably at least 75% of reduction in SPL, during operation of the device with a 70 Hz sine wave, relative to a sound pressure generated when there is negligible leakage, at least 50% of the time that the audio device is installed in a standard measurement device.

Preferably, on average when the audio device is installed on a randomly selected listener by the same listener, said air leak passages (within device periphery) leak sufficient air such that they are collectively responsible for at least a 0.5 dB, or more preferably 1 dB, or more preferably still 2 dB, or even more preferably 4 dB, or most preferably 6 dB reduction in SPL during operation of the device over a frequency range of 20 Hz to 80 Hz (average calculated using log-scale weightings in both SPL (i.e. dB) and frequency domain), relative to a sound pressure generated when there is negligible leakage through said air leak passages during operation.

Preferably, on average when the audio device is installed on a randomly selected listener by the same listener, said air leak passages (within device periphery) leak sufficient air such that they are collectively responsible for at least a 0.5 dB, or more preferably at least a 1 dB, or more preferably still at least a 2 dB, or even more preferably at least a 4 dB, or most preferably at least a 6 dB reduction in SPL during operation of the device with a 70 Hz sine wave relative to a sound pressure generated when there is negligible leakage through said air leak passages during operation.

Preferably the fluid passages are distributed across a distance greater than a shortest distance across a major face of the diaphragm, or more preferably across a distance greater than 50% more than the shortest distance across a major face of the diaphragm, or most preferably across a distance greater than double the shortest distance across a major face of the diaphragm.

Preferably the audio device comprises an interface that is configured to apply pressure to one or more parts of the head beyond and/or surrounding the ear, in situ.

Preferably the audio device has a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz.

In some embodiments the audio device comprises a compliant interface where it contacts the ear or parts of the head close to the ear.

Preferably the compliant interface is permeable by air and comprises a plurality of small openings which have the effect of significantly resisting air movement at audio frequencies.

Preferably the compliant interface comprises an open cell foam.

Preferably the small openings are configured such that in situ, a volume of air at the ear-canal side of the device is fluidly connected to the small openings of the compliant interface.

Preferably the compliant interface comprises a permeable fabric covering over one or more parts fluidly connected to a volume of air on the ear canal side of the device, in situ.

Preferably the compliant interface comprises a substantially non-permeable fabric covering one or more parts accessible by the volume of air on the external side of the device.

In some embodiments the audio device may comprise multiple audio transducers.

In a further aspect the invention may be said to consist of a personal audio device for use in a personal audio application where the device is normally located within approximately 10 centimeters of a user's head in use, the audio device comprising:

- at least one audio transducer having: a diaphragm, and an excitation mechanism configured to act on the diaphragm to move the diaphragm in use in response to an electronic signal to generate sound; and
- at least one housing associated with each audio transducer and comprising an enclosure or baffle for accommodating the audio transducer;
- wherein the diaphragm of one or more audio transducers comprises one or more peripheral regions of the outer periphery that are free from physical connection with an interior of the associated housing; and
- wherein the one or more peripheral regions of the diaphragm that are free from physical connection with an interior of the housing are supported by a ferromagnetic fluid.

Preferably the ferromagnetic fluid significantly supports the diaphragm in situ.

In another aspect the invention may be said to consist of a headphone apparatus comprising a pair of headphone interface devices configured to locate about each of the user's ears in use, each interface device comprising:

- at least one audio transducer having: a diaphragm, and an excitation mechanism configured to act on the diaphragm to move the diaphragm in use in response to an electronic signal to generate sound; and
- at least one housing associated with each audio transducer and comprising an enclosure or baffle for accommodating the audio transducer; and
- wherein the diaphragm of one or more audio transducers comprises one or more peripheral regions of the outer periphery that are free from physical connection with an interior of the associated housing; and
- wherein the one or more peripheral regions of the diaphragm that are free from physical connection with an interior of the housing are supported by a ferromagnetic fluid.

In another aspect the invention may be said to consist of an earphone apparatus comprising a pair of earphone interface devices, each configured to locate within or adjacent an ear canal of a user in use, and each interface device comprising:

- at least one audio transducer having: a diaphragm, and an excitation mechanism configured to act on the diaphragm to move the diaphragm in use in response to an electronic signal to generate sound; and
- at least one housing associated with each audio transducer and comprising an enclosure or baffle for accommodating the audio transducer; and
- wherein the diaphragm of one or more audio transducers comprises one or more peripheral regions of the outer periphery that are free from physical connection with an interior of the associated housing; and
- wherein the one or more peripheral regions of the diaphragm that are free from physical connection with an interior of the housing are supported by a ferromagnetic fluid.

Preferably the ferromagnetic fluid seals against or is in direct contact with the one or more peripheral regions supported by ferromagnetic fluid such that it substantially prevents the flow of air there between.

In one form the earphone interface comprises a substantially longitudinal interface channel audibly coupled to the diaphragm and configured to locate directly adjacent the user's ear canal in situ. Preferably the interface channel comprises a sound damping insert at a throat of the channel, such as a foam or other porous or permeable element.

Any one or more of the above embodiments or preferred features can be combined with any one or more of the above aspects.

Other aspects, embodiments, features and advantages of this invention will become apparent from the detailed description and from the accompanying drawings, which illustrate by way of example, principles of this invention.

Definitions

The phrase "audio transducer" as used in this specification and claims is intended to encompass an electroacoustic transducer, such as a loudspeaker, or an acoustoelectric transducer such as a microphone. Although a passive radiator is not technically a transducer, for the purposes of this specification the term "audio transducer" is also intended to include within its definition passive radiators.

The phrase "force transferring component" as used in this specification and claims means a member of an associated transducing mechanism within which:

a force is generated which drives a diaphragm of the transducing mechanism, when the transducing mechanism is configured to convert electrical energy to sound energy; or physical movement of the member results in a change in force applied by the force transferring component to the diaphragm, in the case that the transducing mechanism is configured to convert sound energy to electrical energy.

The phrase "personal audio" as used in this specification and claims in relation to a transducer or a device means a loudspeaker transducer or device operable for audio reproduction and intended and/or dedicated for utilisation within close proximity to a user's ear or head during audio reproduction, such as within approximately 10 cm the user's ear or head. Examples of personal audio transducers or devices include headphones, earphones, hearing aids, mobile phones and the like.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Number Ranges

It is intended that reference to a range of numbers disclosed herein (for example, 1 to 10) also incorporates reference to all rational or irrational numbers within that range (for example, 1, 1.1, 2, 3, 3.9, 4, 5, 6, 6.5, 7, 8, 9 and 10) and also any range of rational or irrational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

Frequency Range of Operation

The phrase "frequency range of operation" (herein also referred to as FRO) as used in this specification and claims in relation to a given audio transducer is intended to mean the audio-related FRO of the transducer as would be determined by persons knowledgeable and/or skilled in the art of acoustic engineering, and optionally includes any application of external hardware or software filtering. The FRO is hence the range of operation that is determined by the construction of the transducer.

As will be appreciated by those knowledgeable and/or skilled in the relevant art, the FRO of a transducer may be determined in accordance with one or more of the following interpretations:

In the context of a complete speaker system or audio reproduction system or personal audio device such as a headphone, earphone or hearing aid etc., the FRO is the frequency range, within the audible bandwidth of 20 Hz to 20 kHz, over which the Sound Pressure Level (SPL) is either greater than, or else is within 9 dB below (excluding any narrow bands where the response drops below 9 dB), the average SPL produced by the entire system over the frequency band 500 Hz-2000 Hz (average calculated using log-scale weightings in both SPL (i.e. dB) and frequency domain), in the case that the device is designed for accurate audio reproduction, or in other cases, such as that the device is designed for another purpose such as hearing enhancement or noise cancellation, the FRO will be as determined by person(s) knowledgeable in the art. If the speaker system etc. is a typical personal audio device then the SPL is to be measured relative to the 'Diffuse Field' target reference of Hammershoi and Moller shown in FIG. 38, for example;

In the context of a loudspeaker driver operationally installed as part of a speaker system or audio reproduction system, the FRO is the frequency range over which the sound that the transducer produces contributes, either directly or indirectly via a port or passive radiator etc., significantly to the overall SPL of audio reproduction of the speaker or audio reproduction system within said systems FRO;

In the context of a passive radiator operationally installed as part of a speaker system or audio reproduction system, the FRO is the frequency range over which the sound that the passive radiator produces contributes significantly to the overall Sound Pressure Level (SPL) of audio reproduction of the speaker or audio reproduction system, within said systems FRO;

In the context of a microphone, the FRO is the frequency range over which the transducer contributes, either directly or indirectly, significantly to the overall level of audio recording, within the bandwidth being recorded by the overall (mono-channel) recording device of which the transducer is a component, as measured with any active and/or passive crossover filtering, that either occurs in real time or else would be intended to occur post-recording, that alters the amount of sound produced by one or more transducers in the system; or In the case that the associated transducer is not operationally installed as part of a speaker system or audio reproduction system or microphone, the FRO is the bandwidth over which the transducer is considered to be suitable for proper operation as judged by those knowledgeable and/or skilled in the relevant art In the context of a mobile phone transducer intended for voice reproduction with the transducer located within approximately 5-10 cm of a user's ear, the FRO is considered to be the audio bandwidth normally applied in this voice reproduction scenario.

For the above set of included interpretations of the phrase FRO, the frequency range referred to in each interpretation is to be determined or measured using a typical industry-accepted method of measuring the related category of speaker or microphone system. As an example, for a typical industry-accepted method of measuring the SPL produced by a typical home audio floor standing loudspeaker system: measurement occurs on the tweeter-axis, and anechoic frequency response is measured with a 2.83 VRMS excitation signal at a distance determined by proper summing of all drivers and any resonators in the system. This distance is determined by successively conducting the windowed measurement described below starting at 3 times the largest dimension of the source and decreasing the measurement distance in steps until one step before response deviations are apparent.

The lower limit of the FRO of a particular driver in the system is either the −6 dB high-pass roll-off frequency produced by a high-pass active and/or passive crossover and/or by any applicable pre-filtering of the source signal and/or by the low frequency roll-off characteristics of the combination of the driver and/or any associated resonator (e.g. port or passive radiator etc., said resonator being associated with said driver), or else is the lower limit of the FRO of the system, whichever is the higher frequency of the two.

Typically the upper limit of the FRO of a particular driver in the system is either the −6 dB low-pass roll-off frequency produced by a low-pass active and/or passive crossover and/or other filtering and/or by any applicable pre-filtering of the source signal and/or by the high frequency roll-off characteristics of the combination of the driver, or else is the upper limit of the FRO of the system, whichever is the lower frequency of the two.

A typical headphone measurement set-up would include the use of a standard head acoustics simulator.

The invention consists in the foregoing and also envisages constructions of which the following gives examples only. Further aspects and advantages of the present invention will become apparent from the ensuing description.

BRIEF DESCRIPTION OF THE DRAWINGS

Preferred embodiments of the invention will be described by way of example only and with reference to the drawings, in which:

FIGS. 1A-1F show an embodiment A, a hinge-action transducer with a composite diaphragm of low rotational inertia, hinged using contact surfaces that roll against each other, a biasing force applied using magnetism, a fixing structure consisting of string used to help locate the diaphragm within the transducer base structure, and also a torsion bar to help locate and centre the diaphragm, with:

FIG. 1A being a 3D isometric view,

FIG. 1B being a plan view,

FIG. 1C being a side elevation view,

FIG. 1D being a front (tip of diaphragm) elevation view,

FIG. 1E being a cross-sectional view (section A-A of FIG. 1B),

FIG. 1F being a detail view of the hinging mechanism shown in FIG. 1E;

FIGS. 2A-2G show the diaphragm of the embodiment A driver illustrated in FIGS. 1A-1F with:

FIG. 2A being a 3D isometric view,

FIG. 2B being a detail view of the struts shown in FIG. 2A,

FIG. 2C being a top (tip of diaphragm) elevation view,

FIG. 2D being a front view,

FIG. 2E being a bottom (coil) elevation view,

FIG. 2F being a side elevation view,

FIG. 2G being an exploded 3D isometric view;

FIGS. 2H-2I show the diaphragm structure of the embodiment A diaphragm assembly shown in FIGS. 2A-2I, with:

FIG. 2H being a 3D isometric view of the diaphragm structure, with the base end showing.

FIG. 2I being a 3D isometric view of the diaphragm structure, with the tip end showing.

FIGS. 3A-3J show the hinge assembly of the embodiment A driver illustrated in FIGS. 1A-1F with:

FIG. 3A being a 3D isometric view,

FIG. 3B being a top view,

FIG. 3C being a front view,

FIG. 3D being a side elevation view,

FIG. 3E being a bottom view,

FIG. 3F being a detail view (detail A of FIG. 3C),

FIG. 3G being a cross-sectional view (section A of FIG. 3F),

FIG. 3H being a cross-sectional view (section B of FIG. 3F),

FIG. 3I being a cross-sectional view (section C of FIG. 3F),

FIG. 3J being a detail view of the hinge joint of FIG. 3G;

FIGS. 4A-4D show the torsion bar component of the embodiment A driver illustrated in FIGS. 1A-1F with:

FIG. 4A being a 3D isometric view,

FIG. 4B being a front view,

FIG. 4C being a side elevation view,

FIG. 4D being a cross-sectional and enlarged view (section A-A of FIG. 4B);

FIGS. 5A-5H show the embodiment A driver, illustrated in FIGS. 1A-1F with decoupling mounts assembled onto it with:

FIG. 5A being a 3D isometric view,

FIG. 5B being a detail view of a decoupling pyramid shown in FIG. 5A,

FIG. 5C being a detail view of both a decoupling washer and a decoupling bush shown in FIG. 5A, FIG. 5D being a front view, FIG. 5E being a side elevation view, FIG. 5F being a detail view of a decoupling pyramid shown in FIG. 5E, FIG. 5G being a bottom view, FIG. 5H being a detail view of a decoupling pyramid shown in FIG. 5G;

FIGS. 6A-6I show the embodiment A driver, illustrated in FIGS. 1A-1F, mounted into a baffle via the decoupling mounts shown in FIGS. 5A-5H, and including stoppers to prevent diaphragm over-excursion with:

FIG. 6A being a 3D isometric view,

FIG. 6B being a front view,

FIG. 6C being a cross-sectional view (section A-A of FIG. 6B),

FIG. 6D being a detail view of a decoupling triangle shown in FIG. 6C,

FIG. 6E being a being a bottom view,

FIG. 6F being a side elevation view,

FIG. 6G being a cross-sectional view (section B-B of FIG. 6F),

FIG. 6H being a detail view of a decoupling bush and washer shown in FIG. 6G, FIG. 6I being a 3D isometric, exploded view;

FIGS. 7A-7F show a slug that clamps to the baffle and holds the bush and washer decoupling mounts shown in FIGS. 6A-6I. The slug comprises a rim that acts as a stopper to prevent the driver moving excessively within the baffle with:

FIG. 7A being a 3D isometric view,

FIG. 7B being a top view,

FIG. 7C being a front view,

FIG. 7D being a side elevation view,

FIG. 7E being a cross-sectional view (section A-A of FIG. 7C),

FIG. 7F being a cross-sectional view (section B-B of FIG. 7D);

FIGS. 8A-8B show a modified version of the diaphragm used in the embodiment A, which is identical to the diaphragm shown in FIGS. 2A-2I except that instead of having carbon fibre struts, the major faces of the diaphragm body are completely covered with foil, with:

FIG. 8A being a 3D isometric view,

FIG. 8B being a front (tip of diaphragm) elevation view;

FIGS. 9A-9B show another a modified version of the diaphragm used in the embodiment A, which is identical to the diaphragm shown in FIGS. 8A-8B except that the foil has three semi-ellipsoid areas omitted from near the tip, and also the side areas omitted, on both sides of the diaphragm, with:

FIG. 9A being a 3D isometric view,

FIG. 9B being a front (tip of diaphragm) elevation view;

FIGS. 10A and 10B show another modified version of the diaphragm used in the embodiment A, which is similar to the diaphragm shown in FIGS. 8A-8B except that there are no anti-shear inner reinforcement members within the diaphragm, and so this diaphragm has just a single wedge of foam. It also differs in that the skin attached to the front and rear faces of the wedge is modified to have one large semi-circle omitted close to the tip, with:

FIG. 10A being a 3D isometric view,

FIG. 10B being a front (tip of diaphragm) elevation view;

FIGS. 11A-11C show another modified version of the diaphragm used in the embodiment A, which is similar to the diaphragm shown in FIGS. 10A and 10B except that the skin is does not have areas omitted, instead the foil covers the entire front and rear faces of the foam, and also has a step reduction in thickness as the skin extends towards the tip of the diaphragm, with:

FIG. 11A being a 3D isometric view,

FIG. 11B being a detail view of the step reduction in thickness of the aluminium skin surface shown in FIG. 11A, FIG. 11C being a front (tip of diaphragm) elevation view;

FIGS. 12A-12D show another modified version of the diaphragm used in the embodiment A, which is similar to the diaphragm shown in FIGS. 10A and 10B except that instead of skin, it has struts on the front and rear faces of the wedge, with a step reduction in thickness as the struts extends towards the tip of the diaphragm, with:

FIG. 12A being a 3D isometric view,

FIG. 12B being a detail view of the step reduction in thickness of the carbon fibre diagonal struts shown in FIG. 11A, FIG. 12C being a detail view of the step reduction in thickness of the carbon fibre parallel struts shown in FIG. 11A, FIG. 12D being a front (tip of diaphragm) elevation view;

FIGS. 13A-13M show a finite element analysis (FEA) computer simulation of a transducer that is similar to that of embodiment A. The transducer is simulated floating in free space with:

FIG. 13A being a front view of a resultant displacement vector plot of the first resonance mode (the fundamental (Wn) of the diaphragm rotating relative to the transducer base structure), FIG. 13B being a view in direction A (indicated in FIG. 13A) of a resultant displacement vector plot of the first resonance mode, FIG. 13C being a detail view of the node axis region of FIG. 13B, FIG. 13D being a 3D isometric view of a resultant displacement vector plot of the first resonance mode, FIG. 13E being a 3D isometric view of a resultant displacement plot of the first resonance mode, FIG. 13F being a 3D isometric view of a resultant displacement vector plot of the second resonance mode, FIG. 13G being a 3D isometric view of a resultant displacement plot of the second resonance mode, FIG. 13H being a 3D isometric view of a resultant displacement vector plot of the third resonance mode, FIG. 13I being a 3D isometric view of a resultant displacement plot of the third resonance mode, FIG. 13J being a 3D isometric view of a resultant displacement vector plot of the fourth resonance mode, FIG. 13K being a 3D isometric view of a resultant displacement plot of the fourth resonance mode, FIG. 13L being a 3D isometric view of a resultant displacement vector plot of the fifth resonance mode, FIG. 13M being a 3D isometric view of a resultant displacement plot of the fifth resonance mode;

FIGS. 14A-14S show the transducer of FIGS. 13A-13M, which is similar to that of embodiment A, mounted in a decoupling system. The transducer is simulated via harmonic and linear dynamic finite element analysis (FEA) with surfaces of the decoupling system that are normally touching the transducer housing, fixed in space and with sine forces and reaction forces applied to the diaphragm and transducer base structure respectively over a frequency range, with:

FIG. 14A being a 3D isometric view of the transducer and the decoupling system, FIG. 14B being another 3D isometric view of the transducer and the decoupling system (with some parts hidden) this time showing the other side of the driver, FIG. 14C being a 3D isometric view of a FEA resultant displacement vector plot of the first resonance mode, FIG. 14D being a 3D isometric view of a FEA resultant displacement plot of the first resonance mode, FIG. 14E being a 3D isometric view of a FEA resultant displacement vector plot of the second resonance mode, FIG. 14F being a 3D isometric view of a FEA resultant displacement plot of the second resonance mode, FIG. 14G being a 3D isometric view of a FEA resultant displacement vector plot of the third resonance mode, FIG. 14H being a 3D isometric view of a FEA resultant displacement plot of the third resonance mode, FIG. 14I being a 3D isometric view of a FEA resultant displacement vector plot of the fourth resonance mode, FIG. 14J being a 3D isometric view of a FEA resultant displacement plot of the fourth resonance mode, FIG. 14K being a 3D isometric view of a FEA resultant displacement vector plot of the fifth resonance mode, FIG. 14L being a 3D isometric view of a FEA resultant displacement plot of the fifth resonance mode, FIG. 14M being a 3D isometric view of a FEA resultant displacement vector plot of the sixth resonance mode, FIG. 14N being a 3D isometric view of a FEA resultant displacement plot of the sixth resonance mode, FIG. 14O being a 3D isometric view of a FEA resultant displacement vector plot of the seventh resonance mode, FIG. 14P being a 3D isometric view of a FEA resultant displacement plot of the seventh resonance mode, FIG. 14Q being a 3D isometric view of a FEA resultant displacement vector plot of the eighth resonance mode, FIG. 14R being a 3D isometric view of a FEA resultant displacement plot of the eighth resonance mode, FIG. 14S being a graph of log displacement vs log frequency of 6 sensor locations position along the side of the diaphragm and transducer base structure, of the linear dynamic FEA simulation. The frequency ranges from 50 Hz to 30 kHz;

FIGS. 15A-15F show embodiment B, a hinge-action driver with a composite diaphragm of low rotational inertia, hinged using thin walled flexures configured to allow high rotational compliance and low translational compliance, with:

FIG. 15A being a 3D isometric view,

FIG. 15B being a top view,

FIG. 15C being a side elevation view,

FIG. 15D being a front view,

FIG. 15E being a cross-sectional view (section A-A of FIG. 15D),

FIG. 15F being a 3D isometric, exploded view;

FIGS. 16A-16G show the diaphragm and flexure components connecting to flexure base blocks of the driver in embodiment B, illustrated in FIGS. 15A-15F, with:

FIG. 16A being a top view,

FIG. 16B being a 3D isometric view,

FIG. 16C being a side elevation view,

FIG. 16D being a front view,

FIG. 16E being a detail view of the flexure shown in FIG. 16C,

FIG. 16F being another front view (the same view as FIG. 16D) with reference planes indicated, FIG. 16G being a bottom view, with reference planes indicated;

FIGS. 17A-17D show a linking component which comprises the base frame of the diaphragm, connected to two base blocks via flexure components, as used in the embodiment B driver, illustrated in FIGS. 15A-15F and 16A-16G, with:

FIG. 17A being a side elevation view,

FIG. 17B being a front view,

FIG. 17C being a bottom view,

FIG. 17D being a 3D isometric view;

FIGS. 18A-18F show the embodiment B driver, illustrated in FIGS. 15A-15F and rigidly attached to a baffle, with:

FIG. 18A being a top view,

FIG. 18B being a 3D isometric view,

FIG. 18C being a side elevation view,

FIG. 18D being a front view,

FIG. 18E being a cross-sectional view (section A-A of FIG. 18D),

FIG. 18F being a cross-sectional view (section B-B of FIG. 18E);

FIGS. 19A-19E show a simplified version of a driver, showing a block representing a diaphragm connected to a base block via a flexure hinge assembly that spans the width of the diaphragm, with:

FIG. 19A being a top view,

FIG. 19B being a 3D isometric view,

FIG. 19C being a side elevation view,

FIG. 19D being a front view,

FIG. 19E being a detail view of the hinge assembly shown in FIG. 19C;

FIGS. 20A-20D show an alternative simplified version of a driver, showing a block representing a diaphragm connected to a diaphragm base, which is connected to a base block via flexure hinge assemblies located at either end of the width of the diaphragm, with:

FIG. 20A being a 3D isometric view,

FIG. 20B being a top view,

FIG. 20C being a side elevation view,

FIG. 20D being a front view;

FIGS. 23A-23E show a simplified version of a driver, showing a wedge representing a diaphragm connected to a diaphragm base frame and some coil windings, and from the diaphragm base frame to a base block via two X-flexure hinge assemblies, with:

FIG. 23A being a 3D isometric view,

FIG. 23B being a top view,

FIG. 23C being a back view,

FIG. 23D being a side elevation view,

FIG. 23E being a cross-sectional view A-A of the back view shown in FIG. 23C;

FIGS. 24A-24D show the same simplified version of a driver as in FIGS. 23A-23E, except without the base block, with:

Figure 24A:
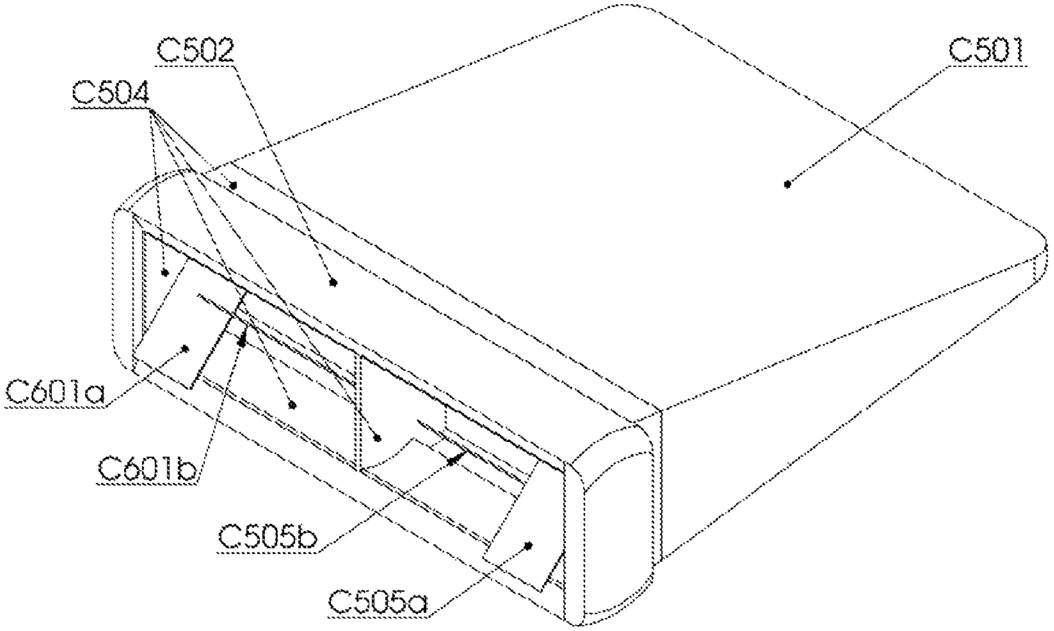
Figure 24B:
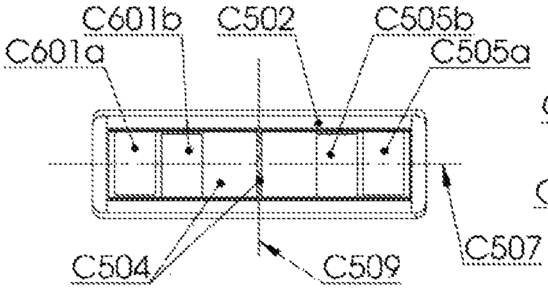
Figure 24C:
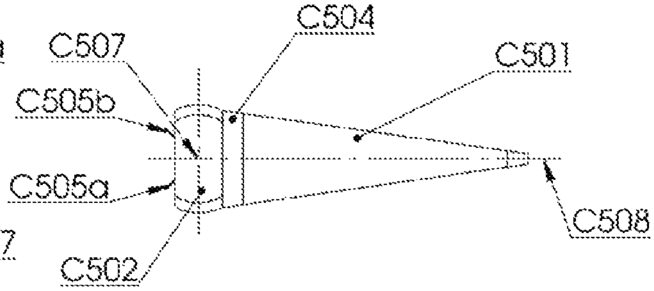
Figure 24D:
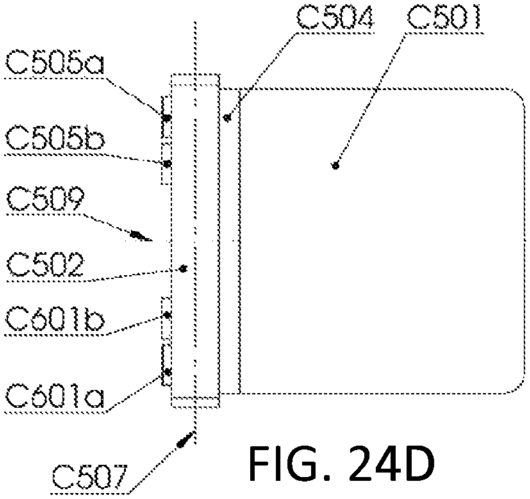
Figure 25A:
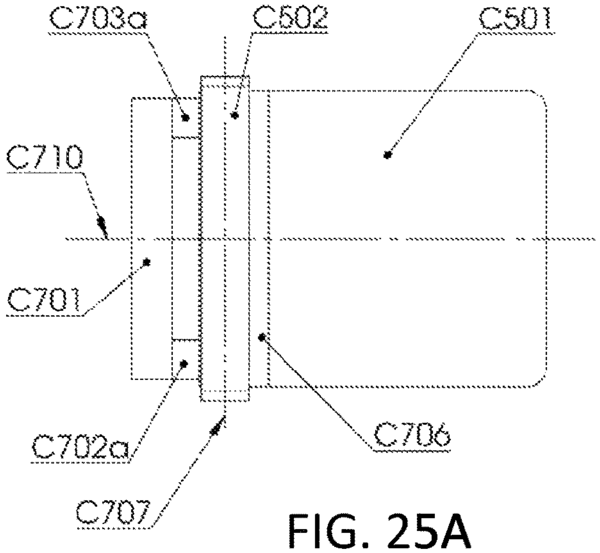
Figure 25B:
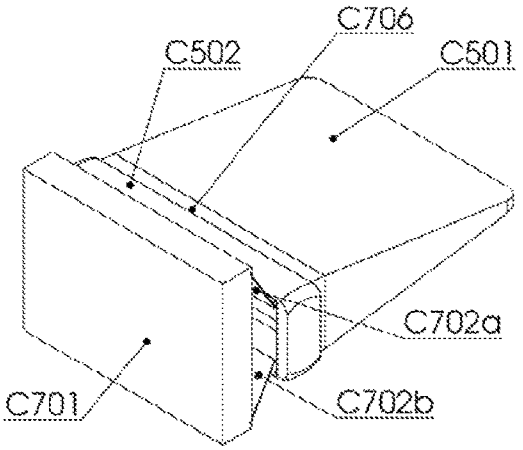
Figure 25C:
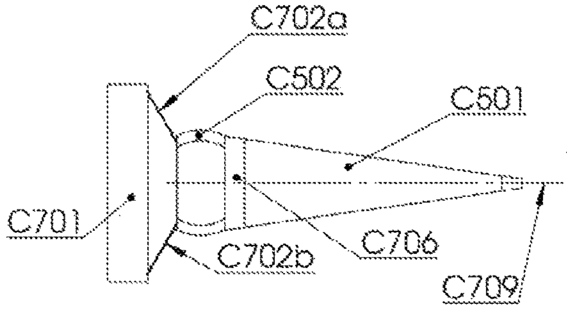
Figure 25D:
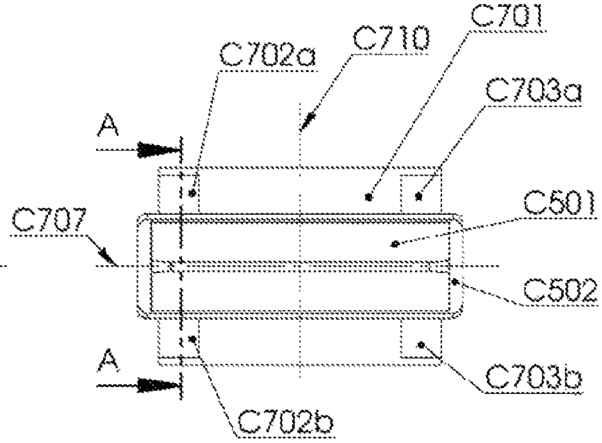
Figure 25E:
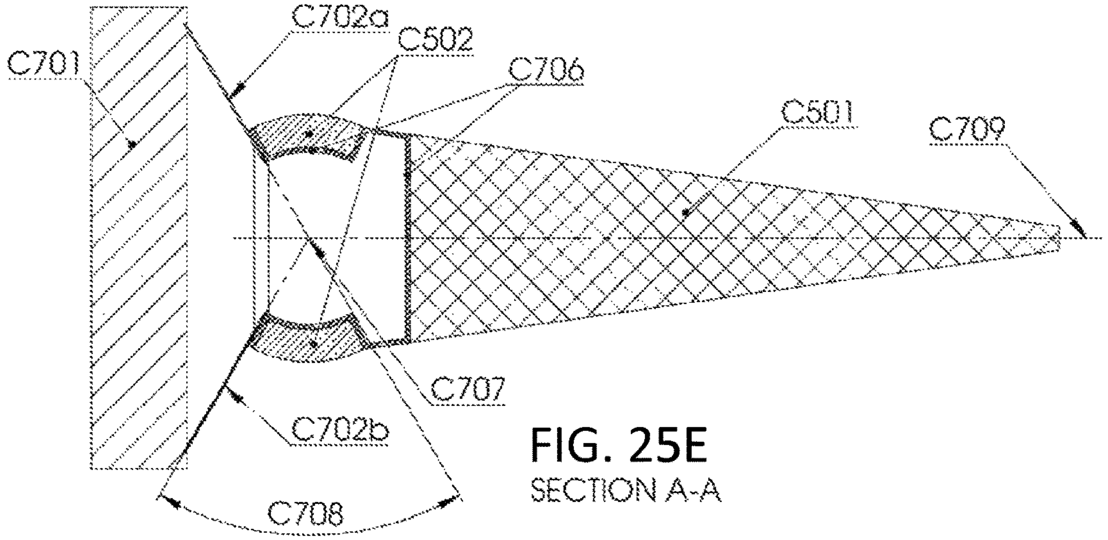
Figure 26A:
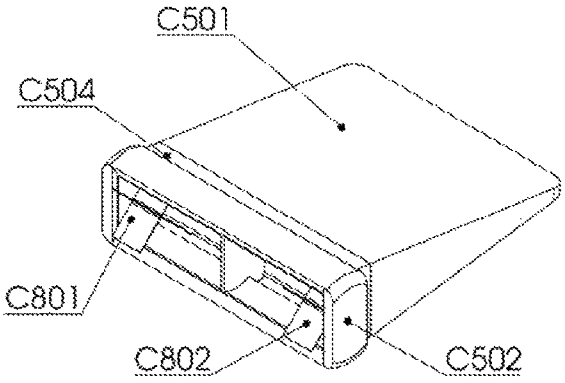
Figure 26B:
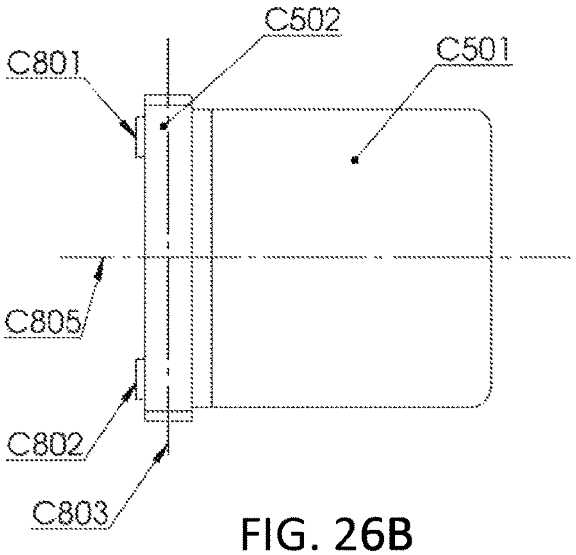
Figure 26C:
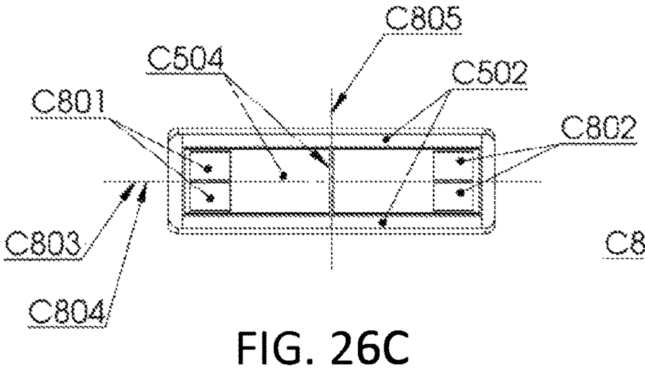
Figure 26D:
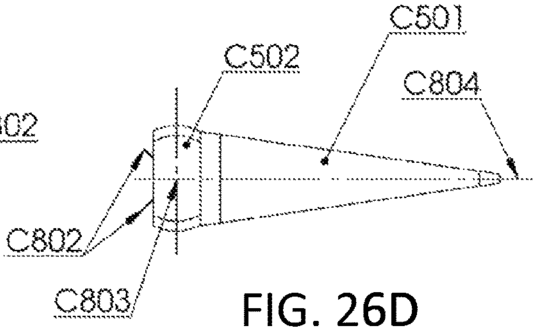
Figure 27A:
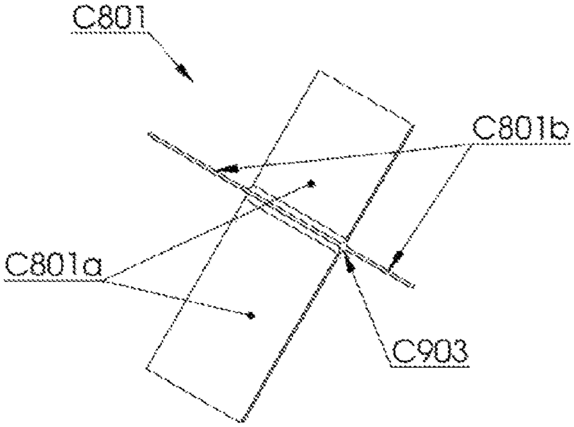
Figure 27B:
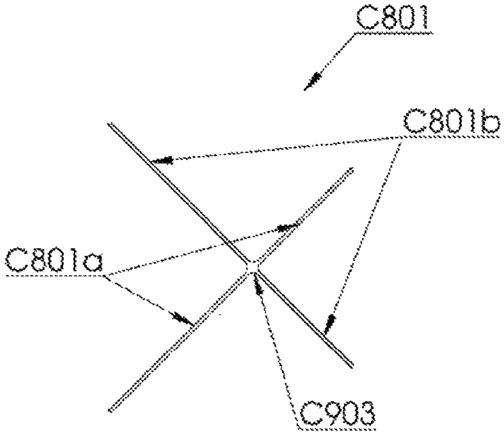
Figure 28A:
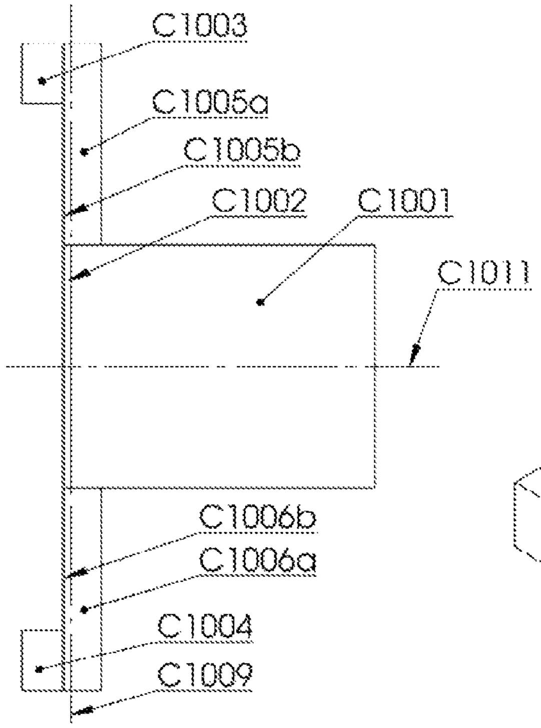
Figure 28B:
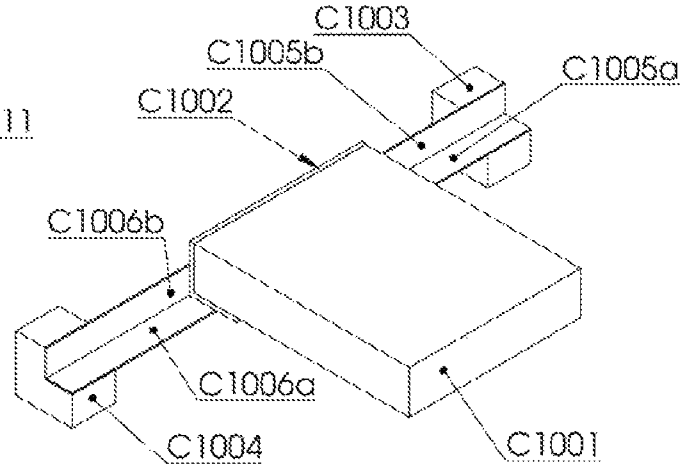
Figure 28C:
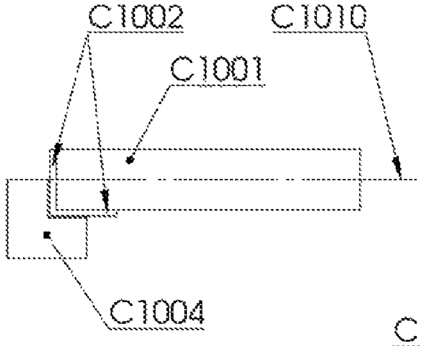
Figure 28D:
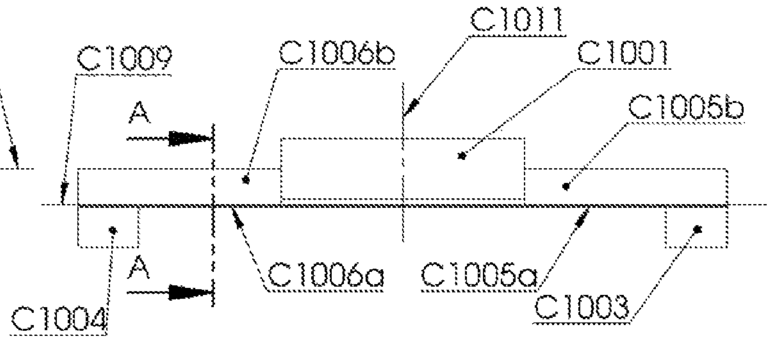
Figure 28E:
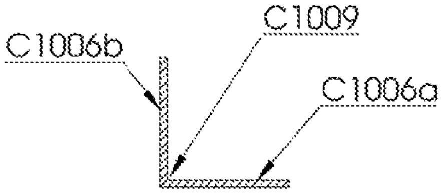
Figure 30:
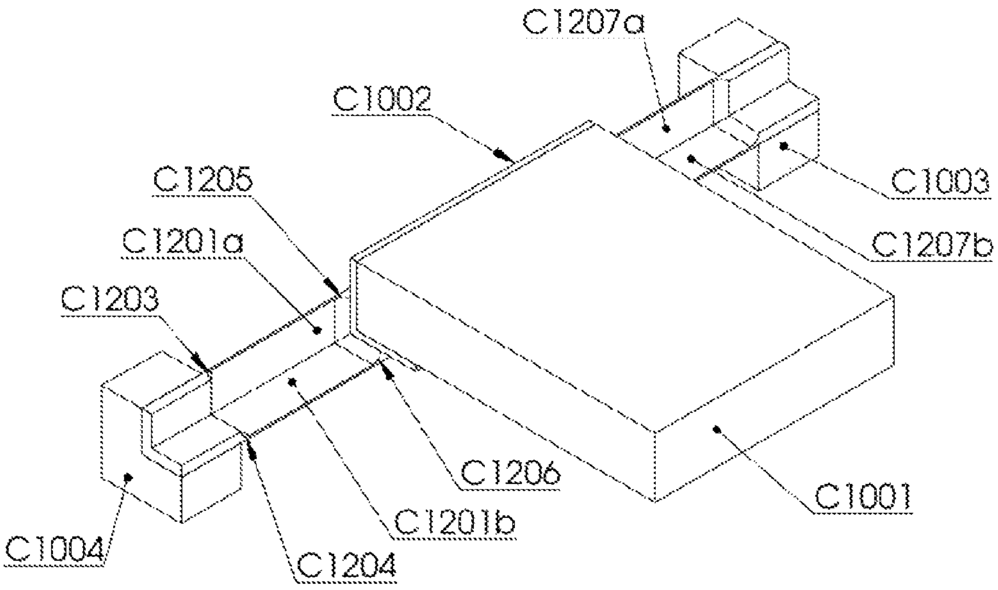
Figure 31:
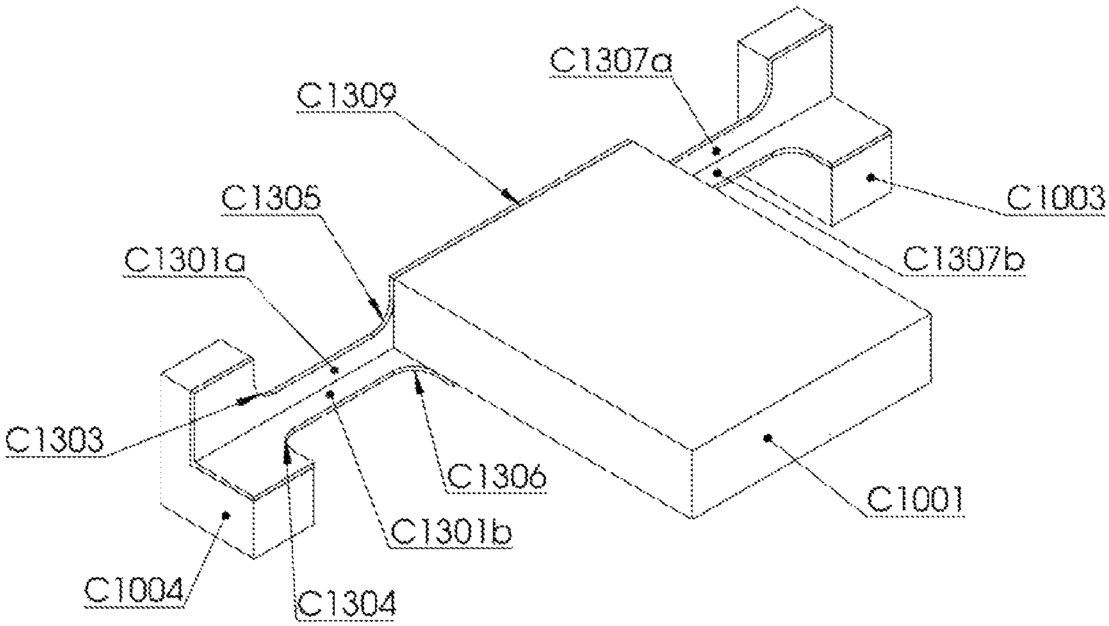
Figure 32A:
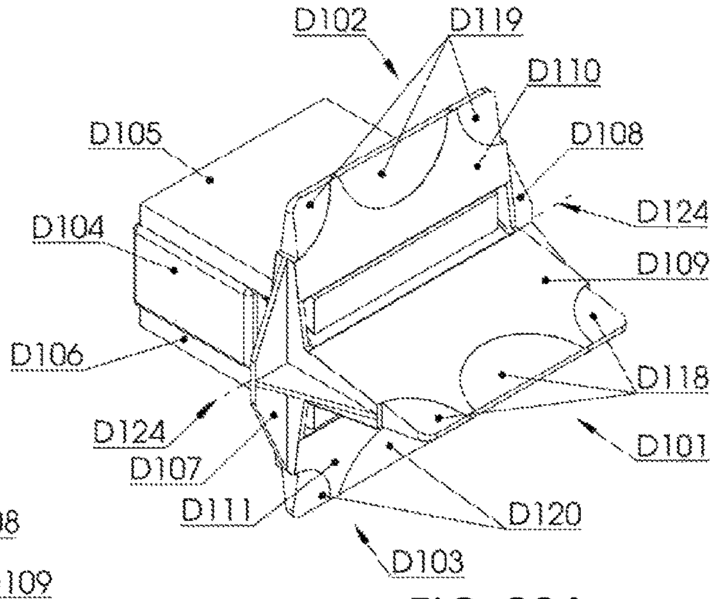
Figure 32B:
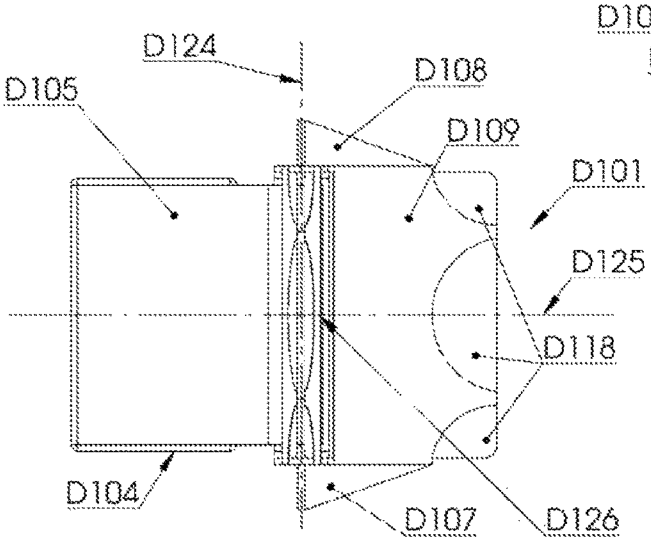
Figure 32C:
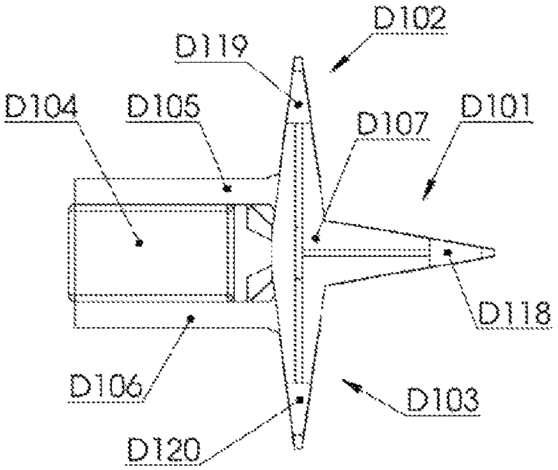
Figure 32D:
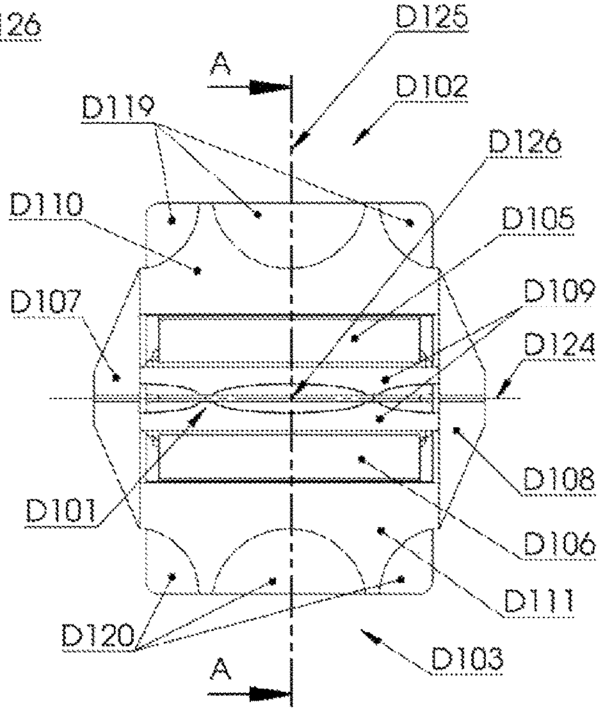
Figure 33A:
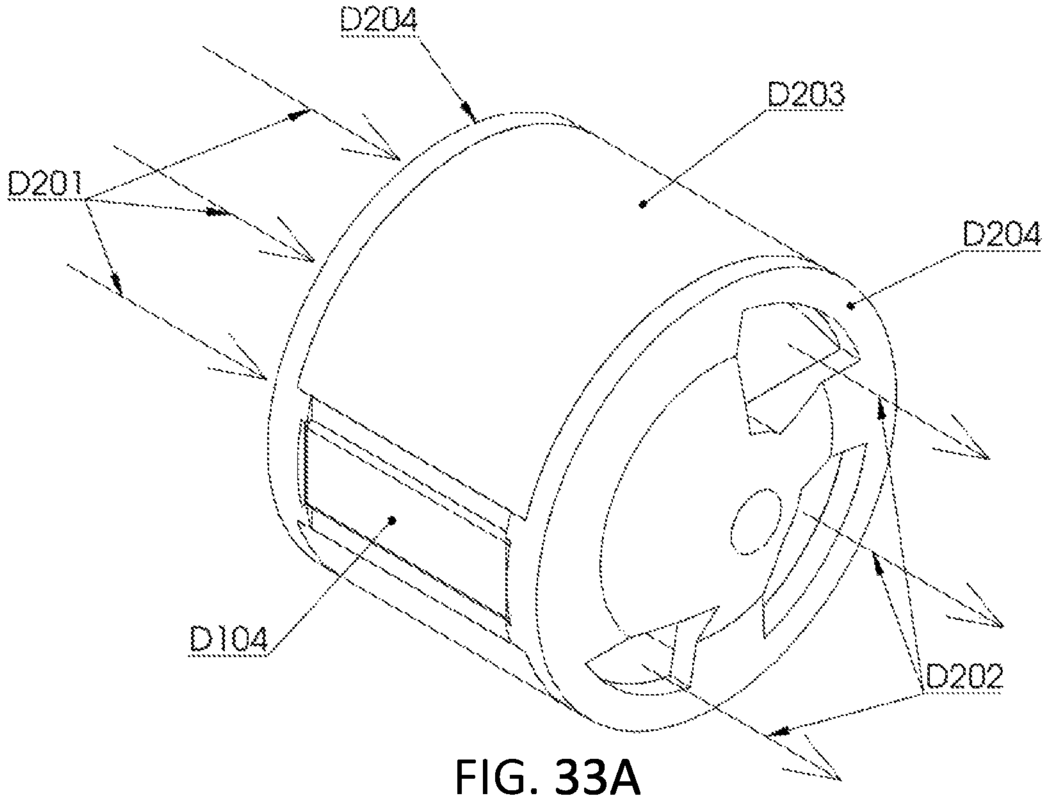
Figure 33B:
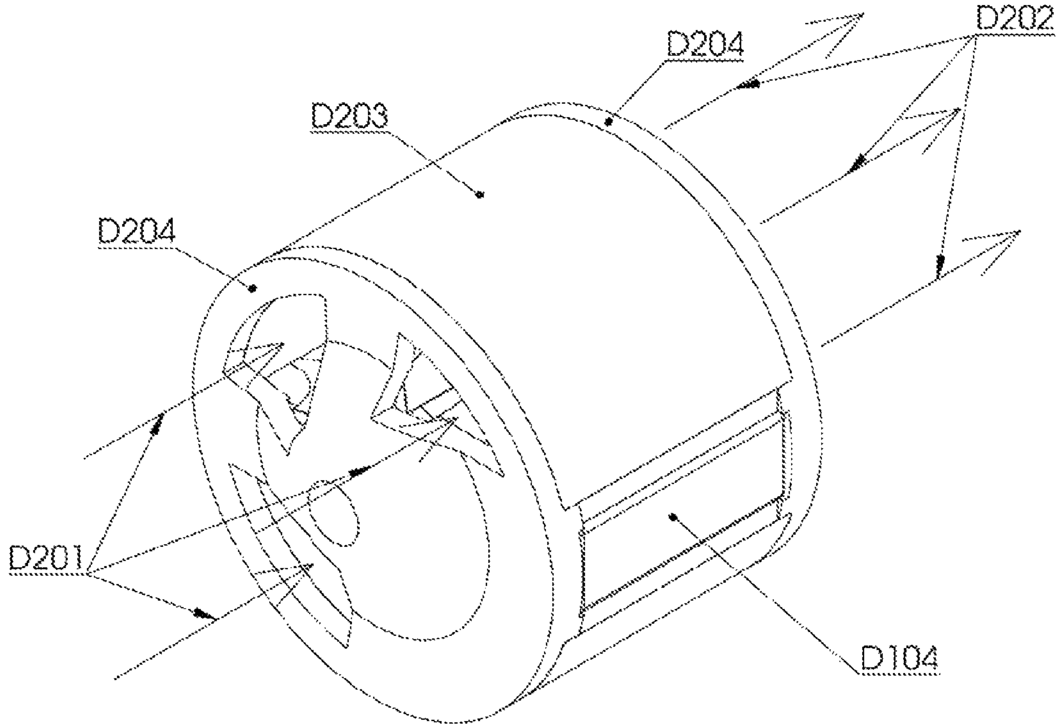
Figure 33C:
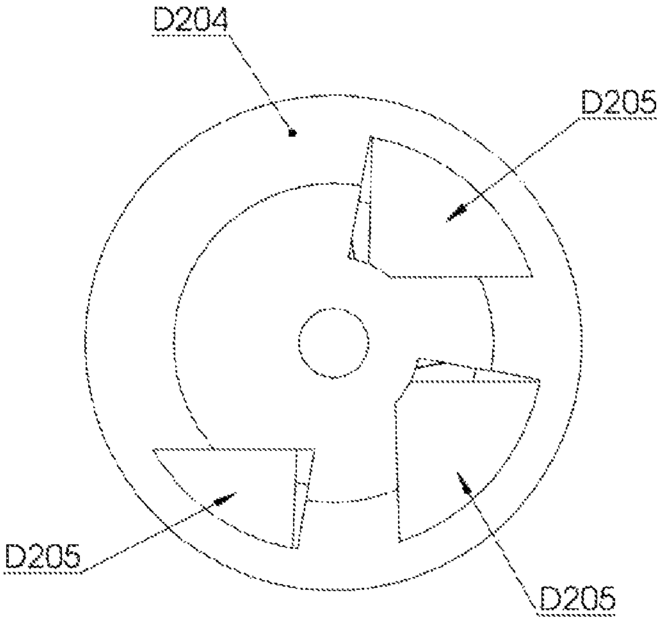
Figure 33D:
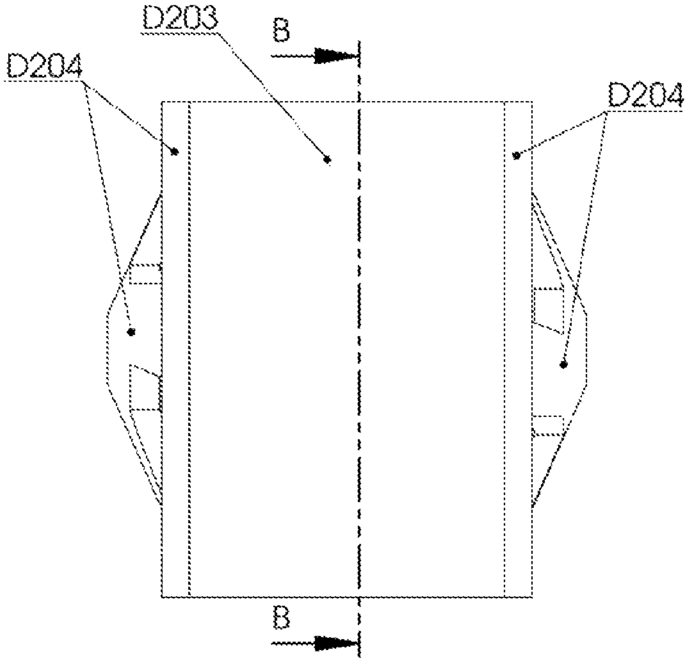
Figure 33E:
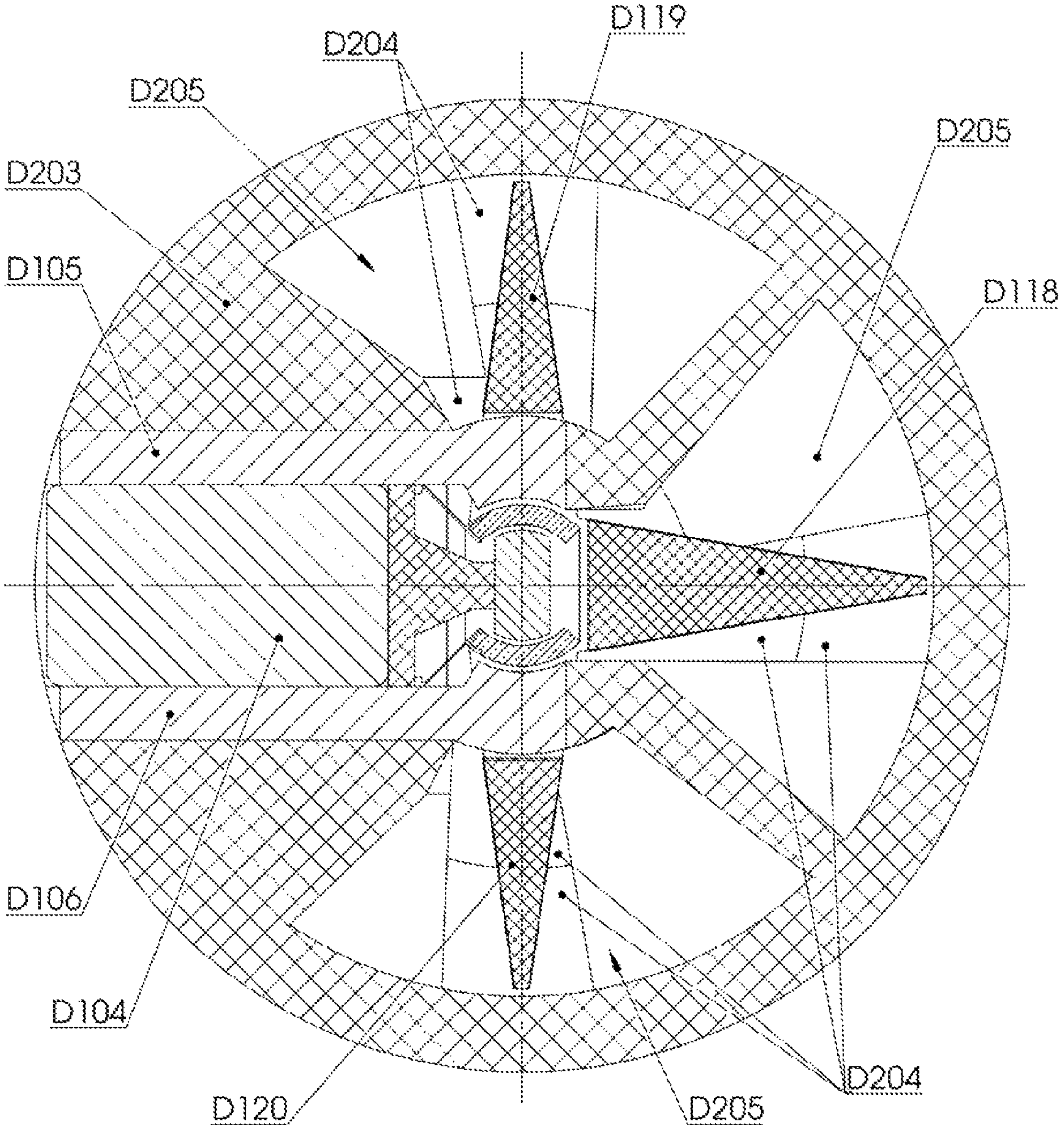
Figure 34A:
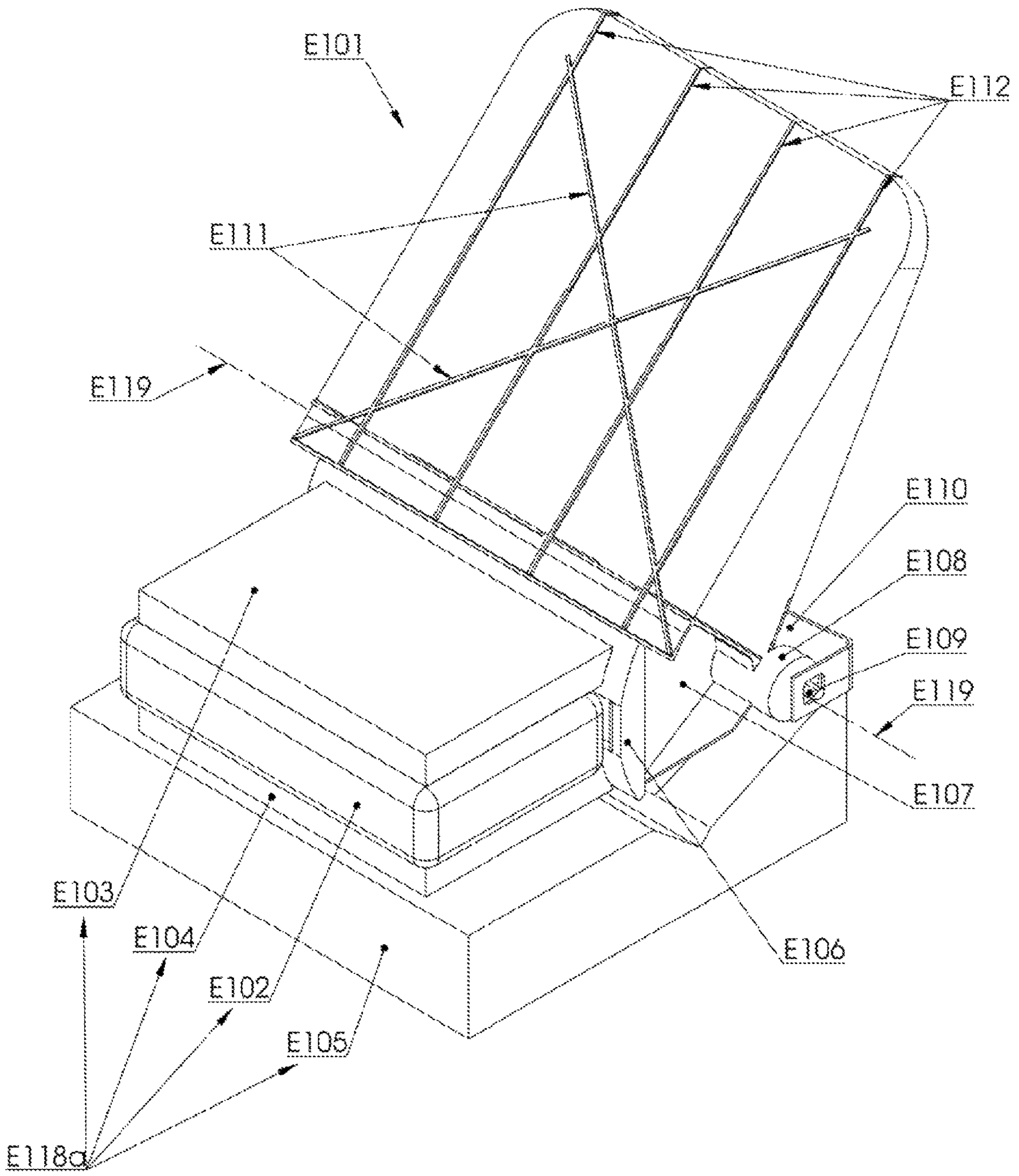
Figure 34B:
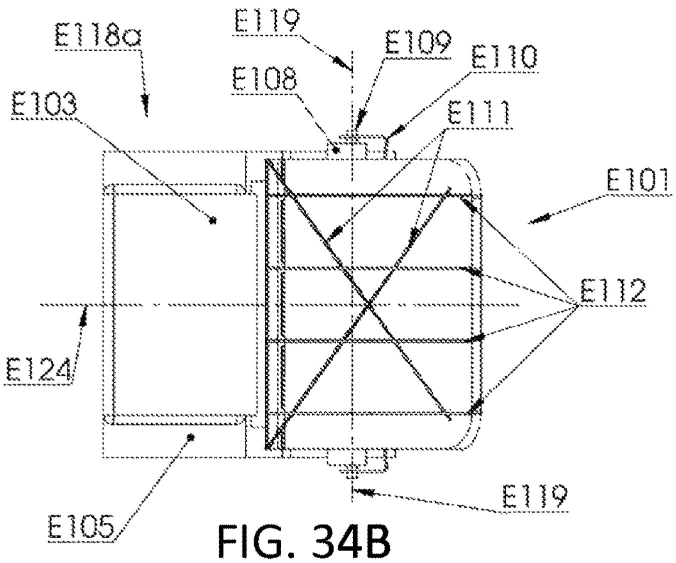
Figure 34C:
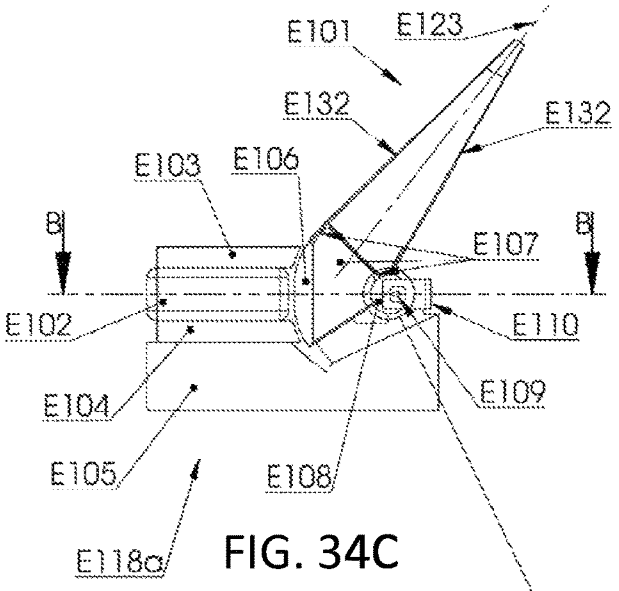
Figure 34D:
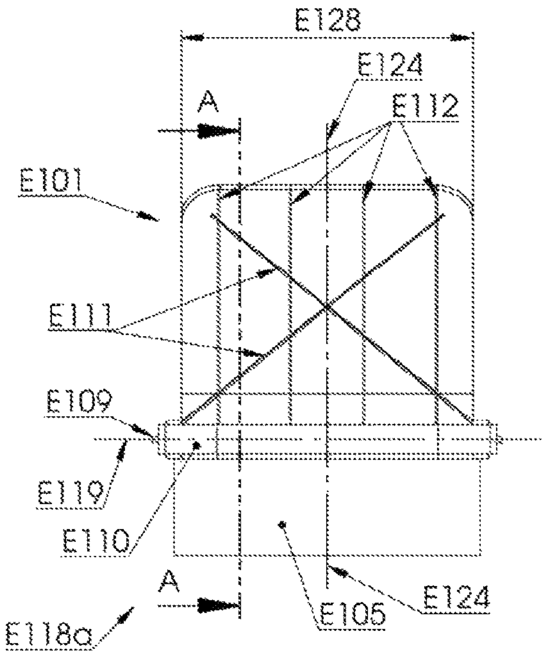
Figure 34E:
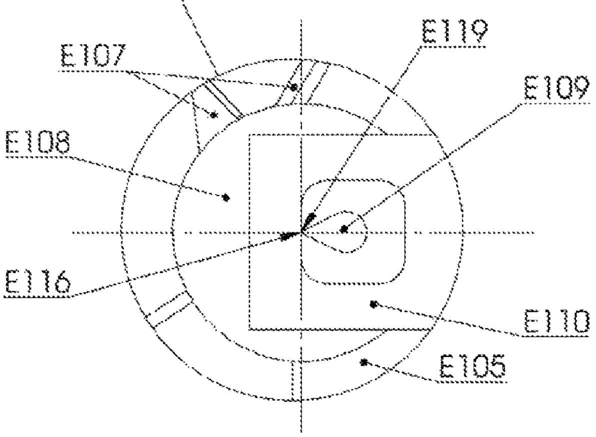
Figure 34F:
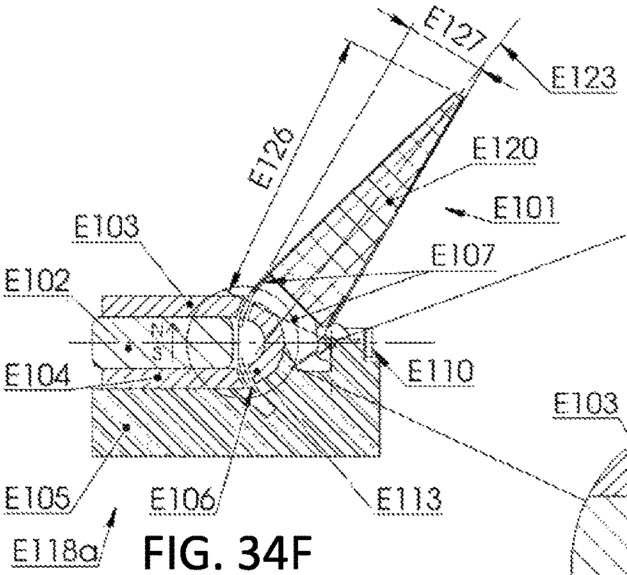
Figure 34G:
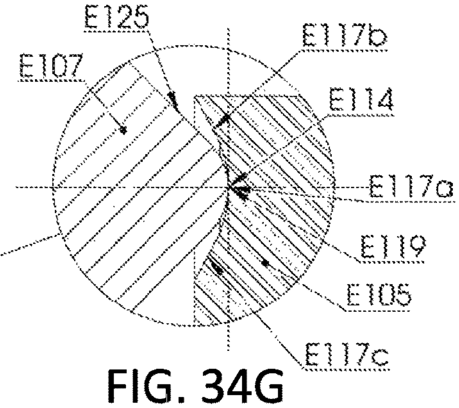
Figure 34H:
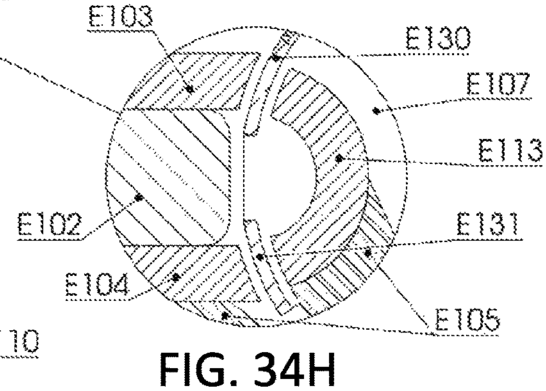
Figure 34I:
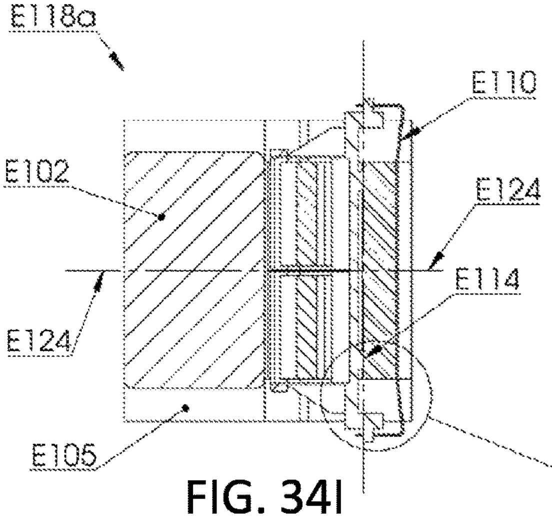
Figure 34J:
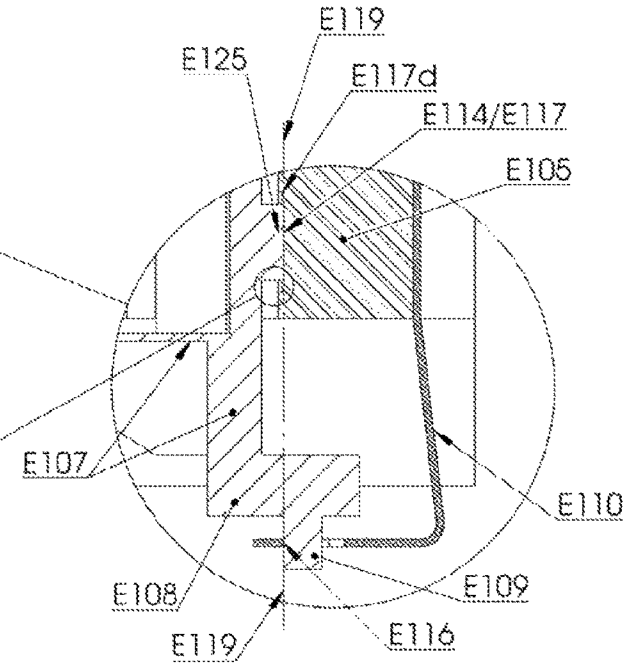
Figure 35A:
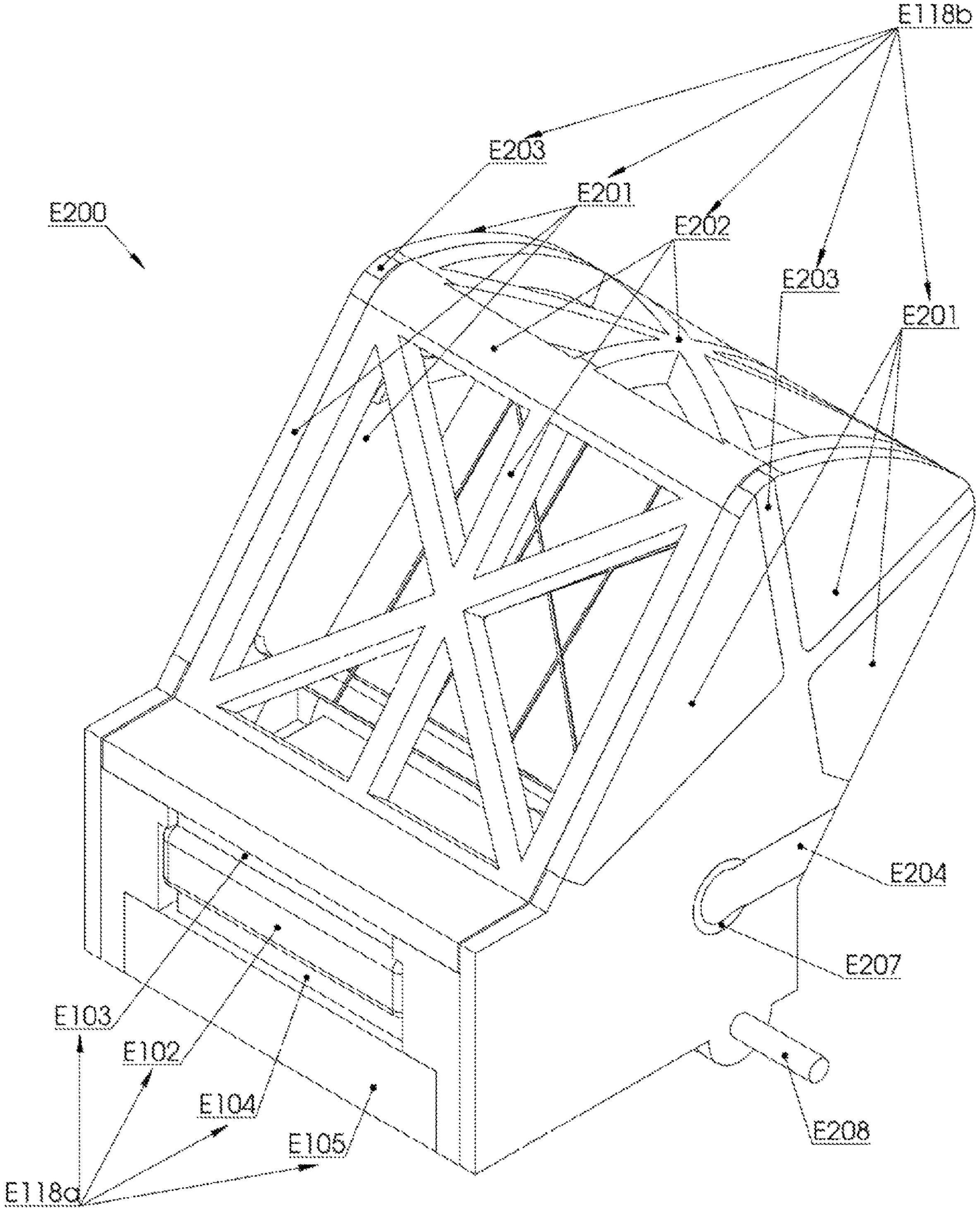
Figure 35B:
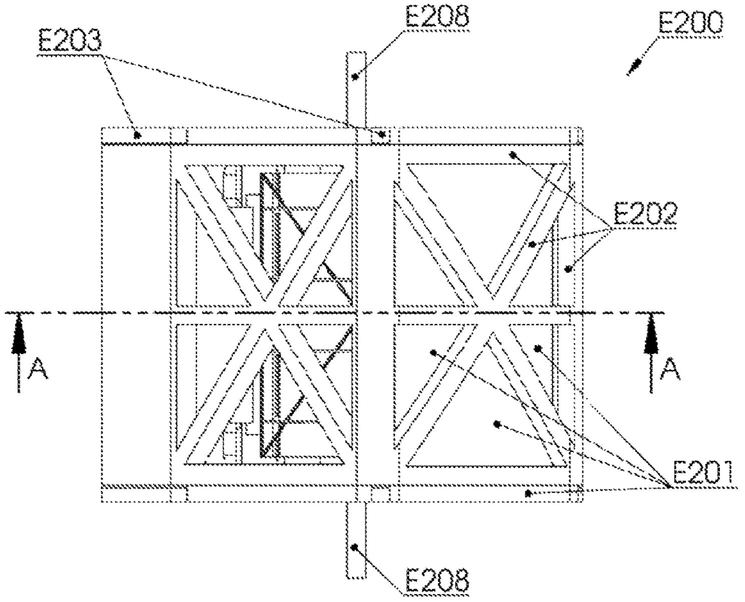
Figure 35C:
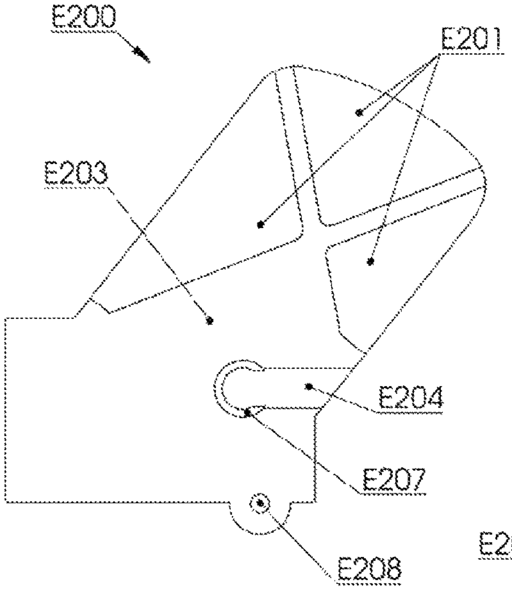
Figure 35D:
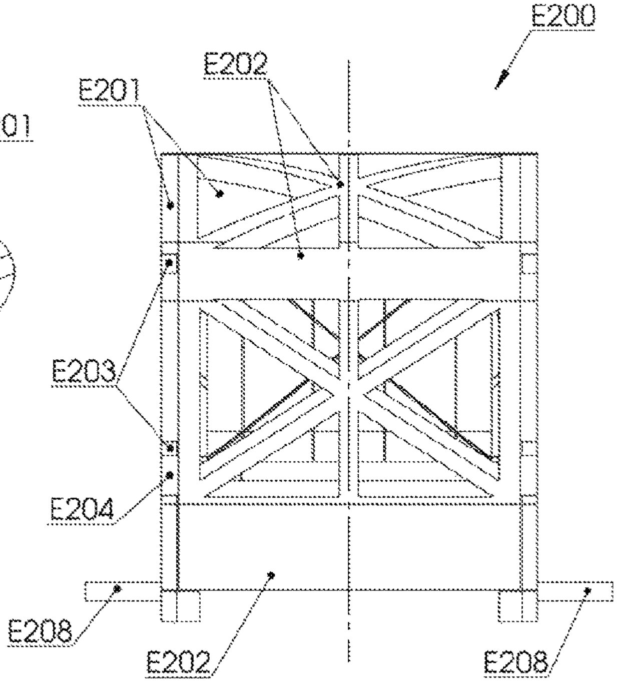
Figure 35E:
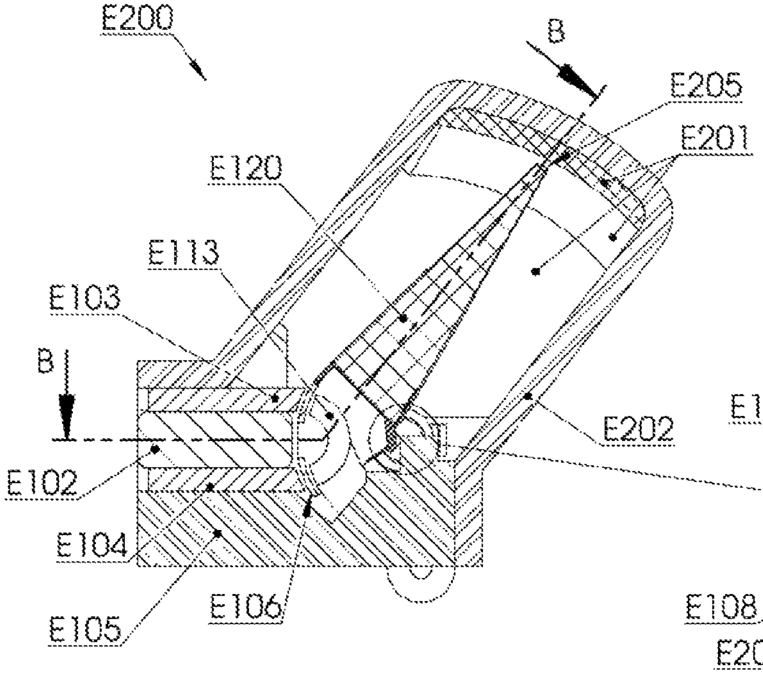
Figure 35F:
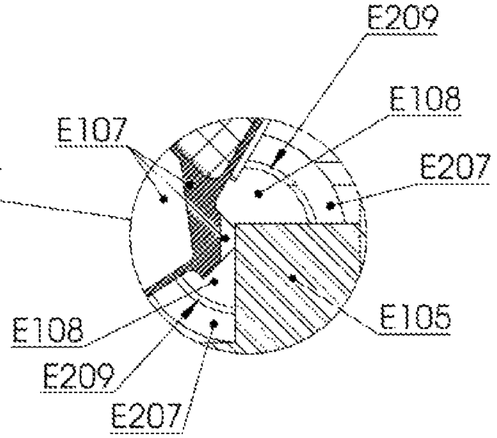
Figure 35G:
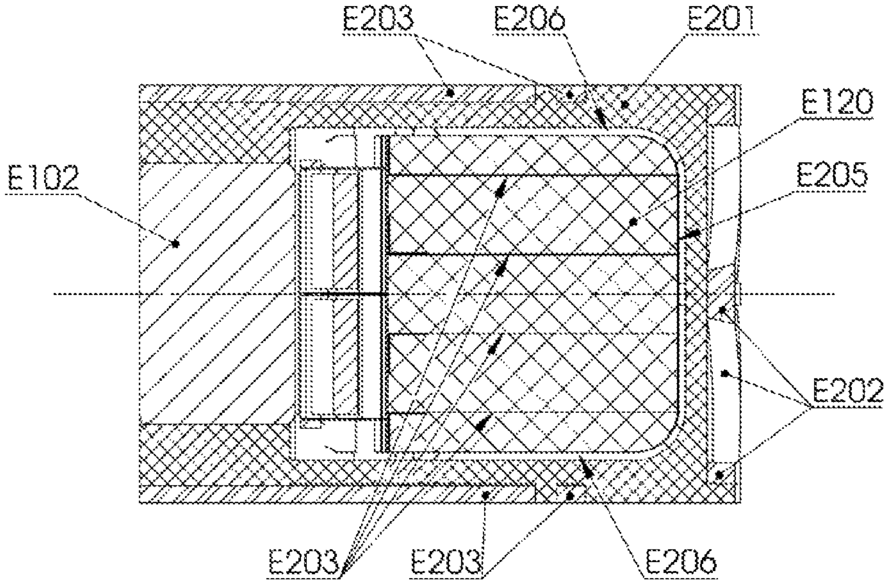
Figure 35H:
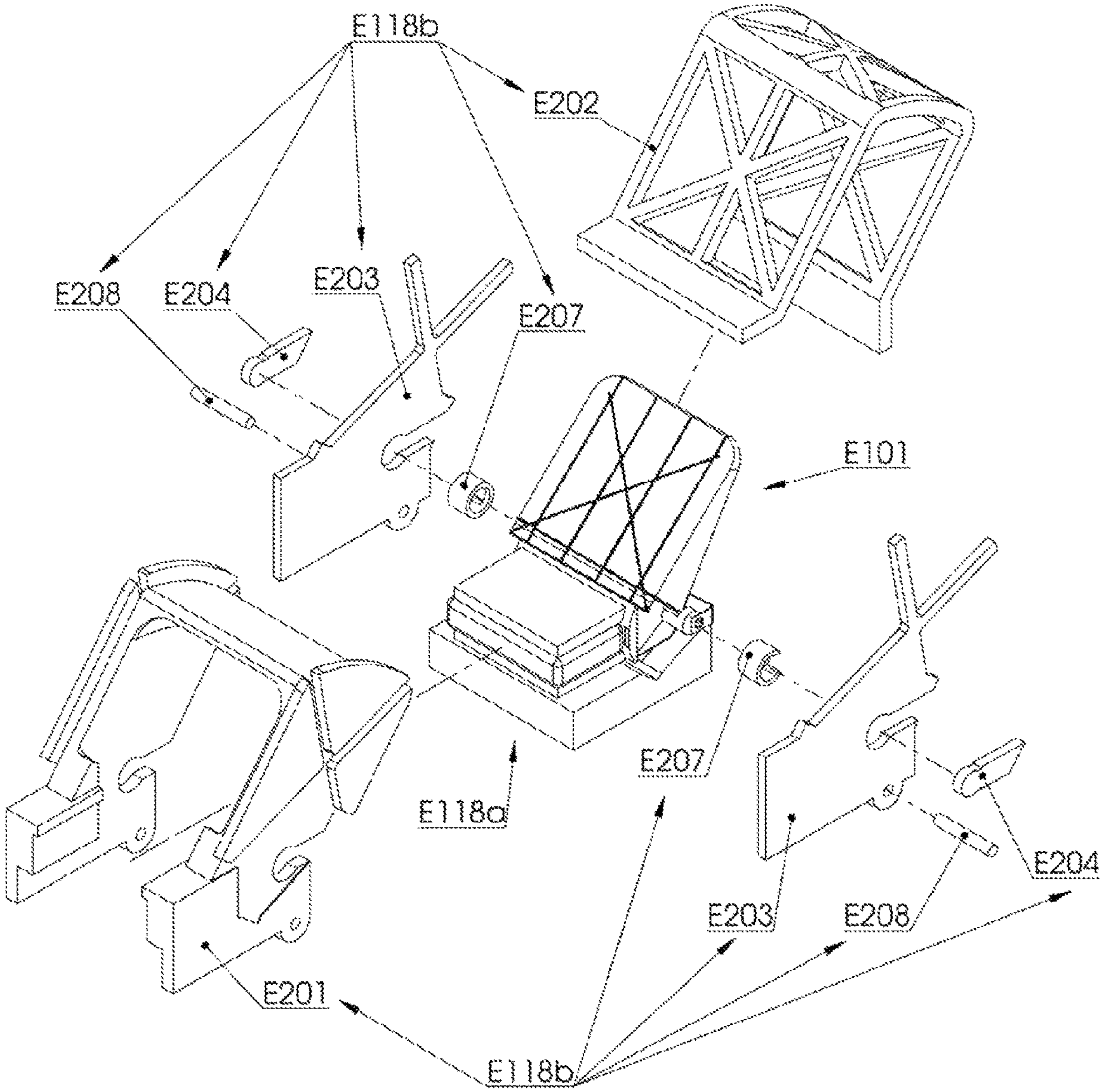
Figure 36:
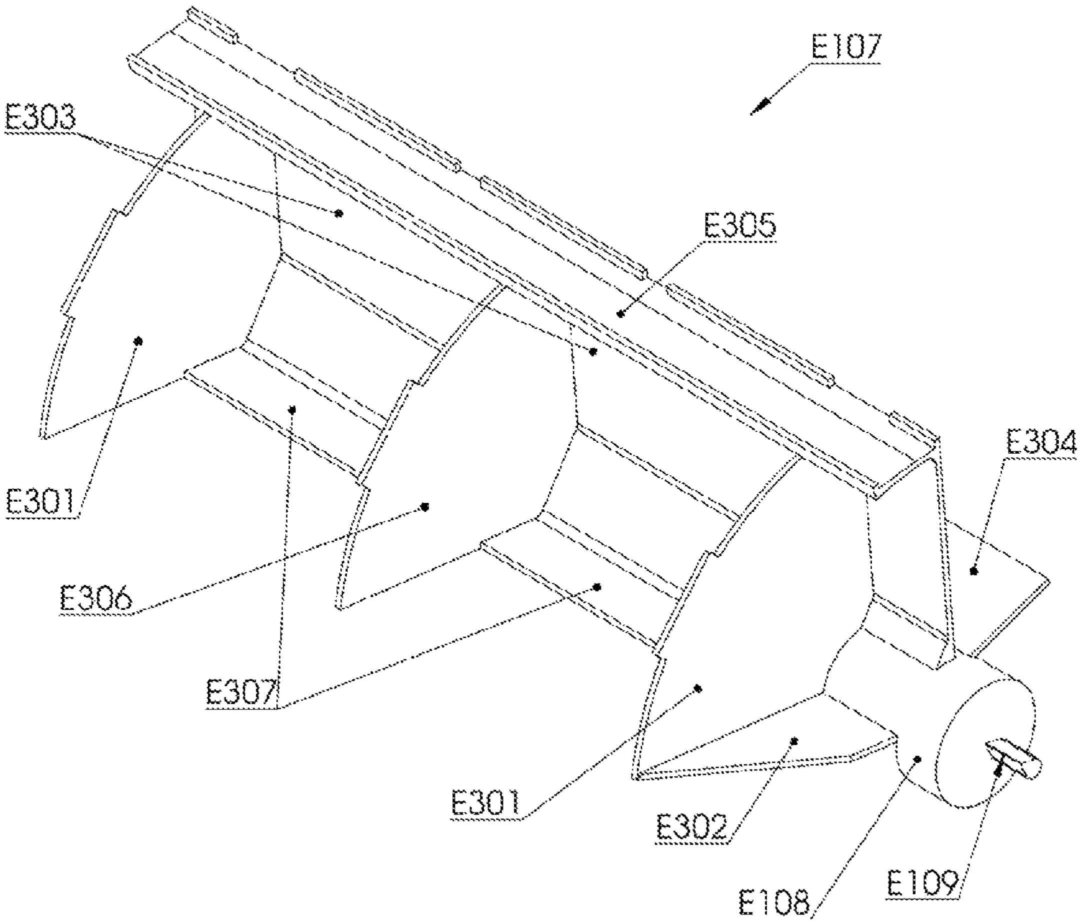
Figure 37A:
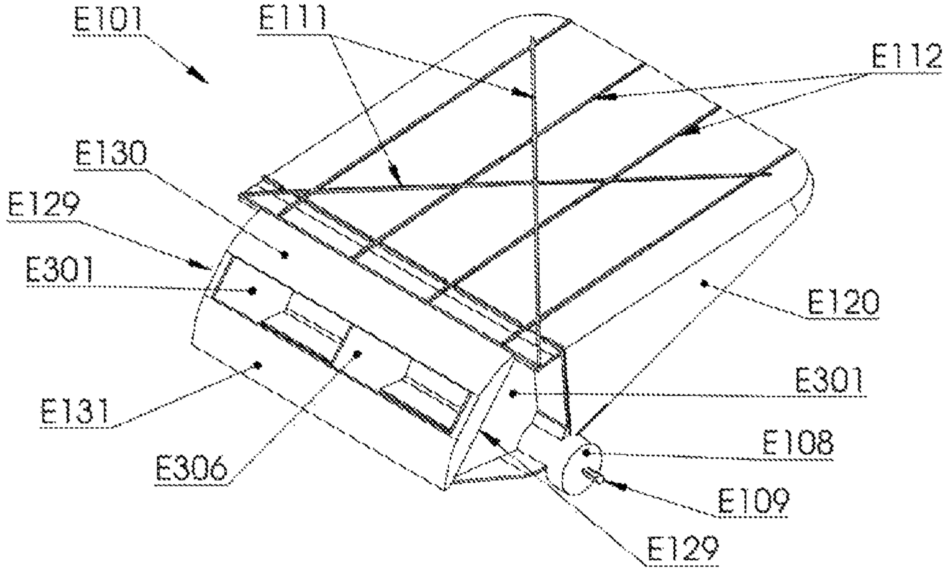
Figure 37B:
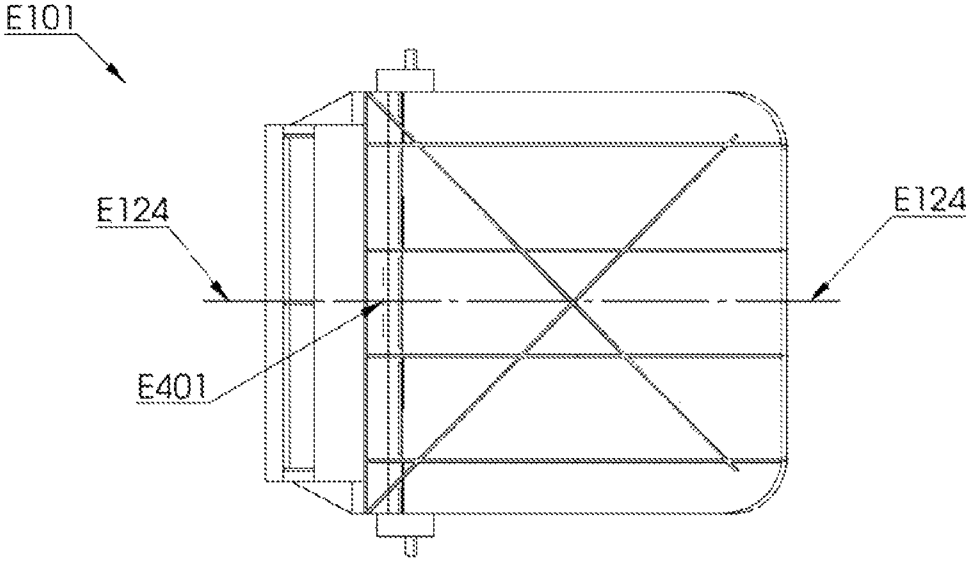
Figure 37C:
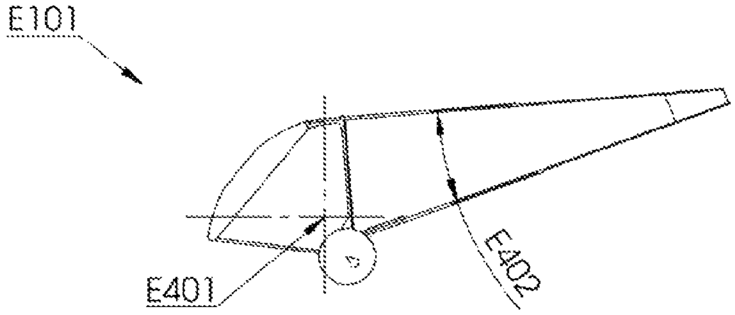
Figure 38:
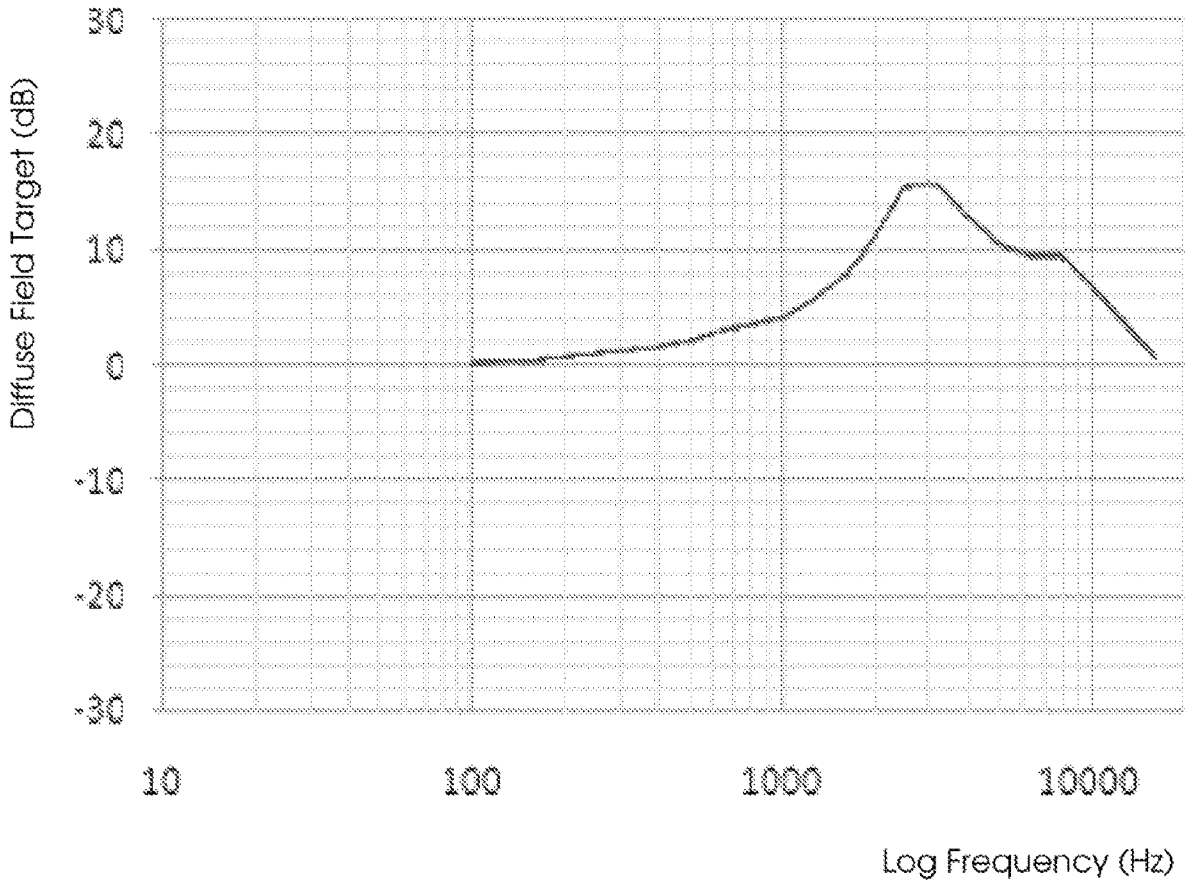
Figure 39A:
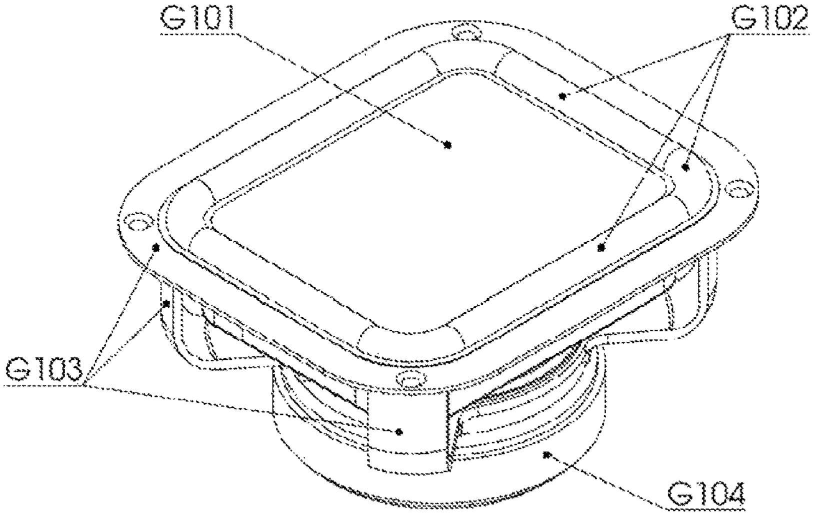
Figure 39B:
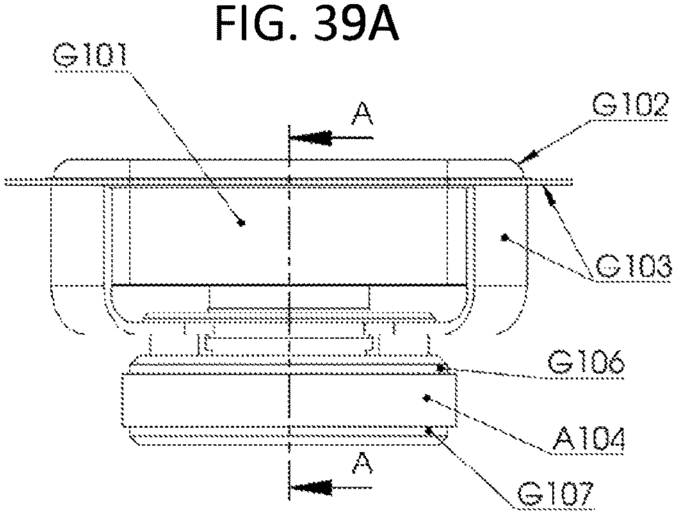
Figure 39C:
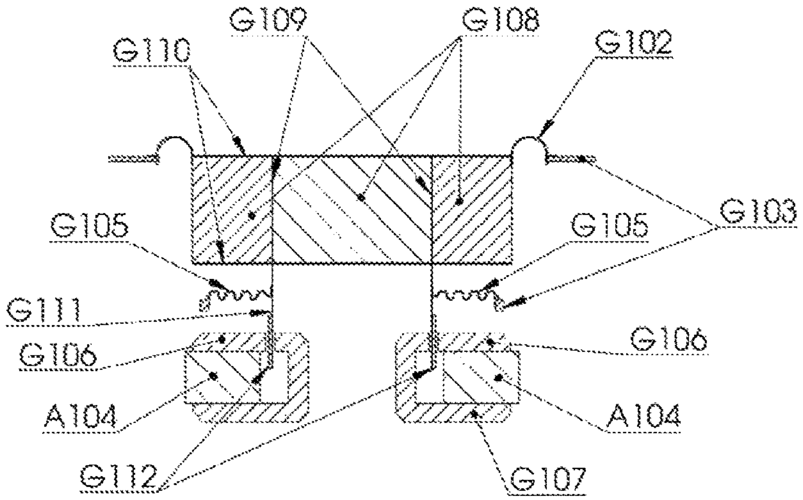
Figure 40A:
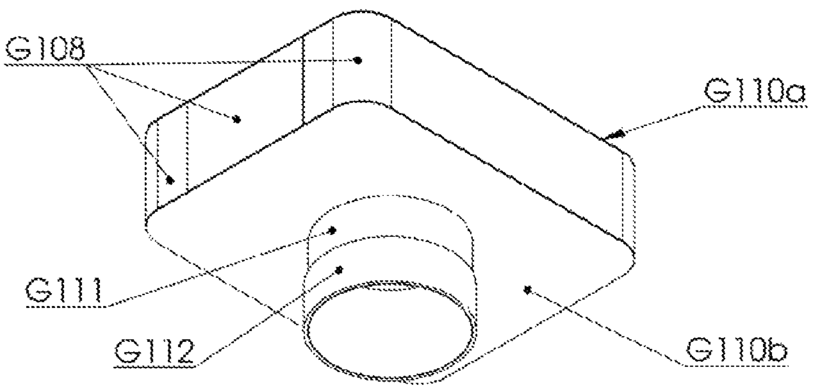
Figure 40B:
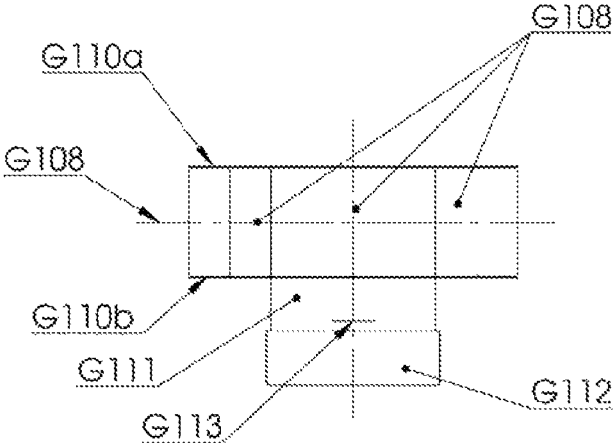
Figure 40C:
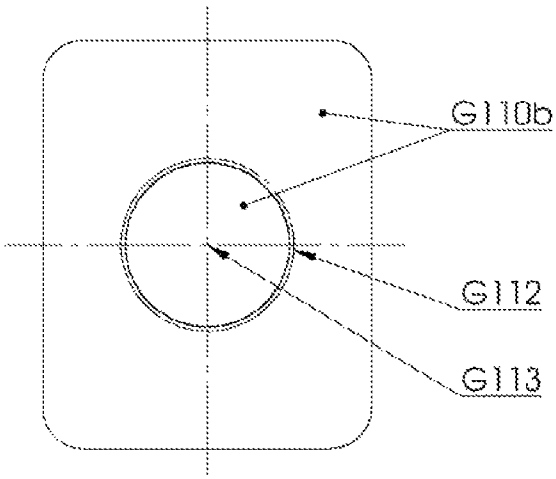
Figure 40D:
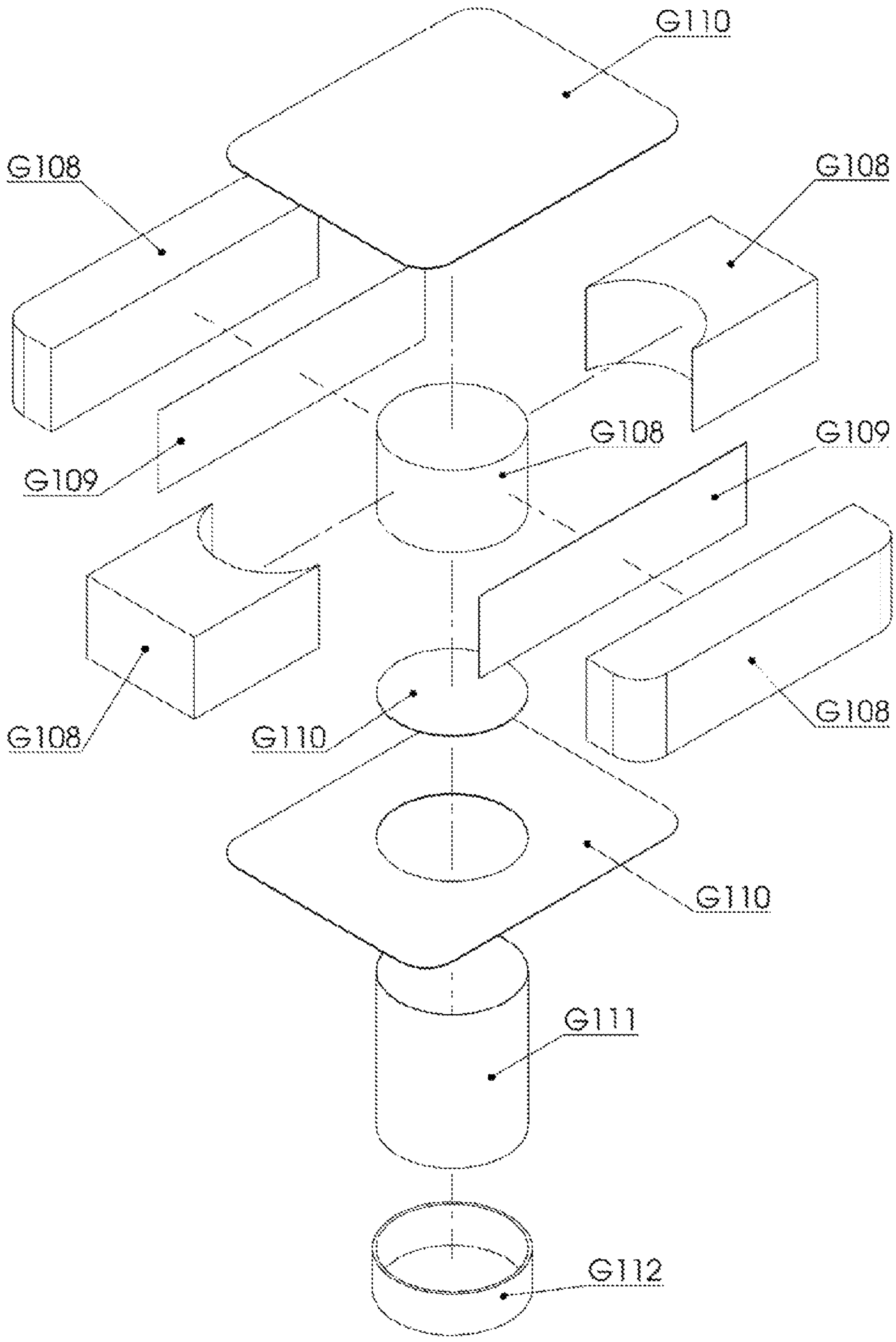
Figure 41A:
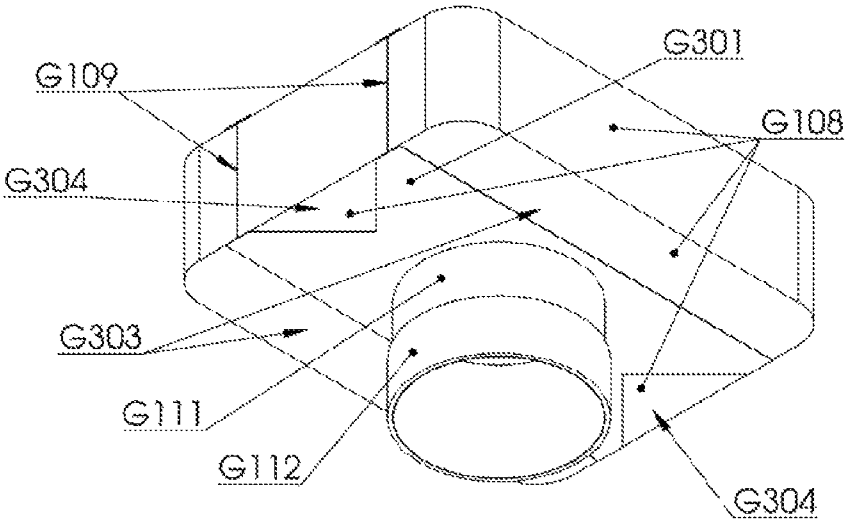
Figure 41B:
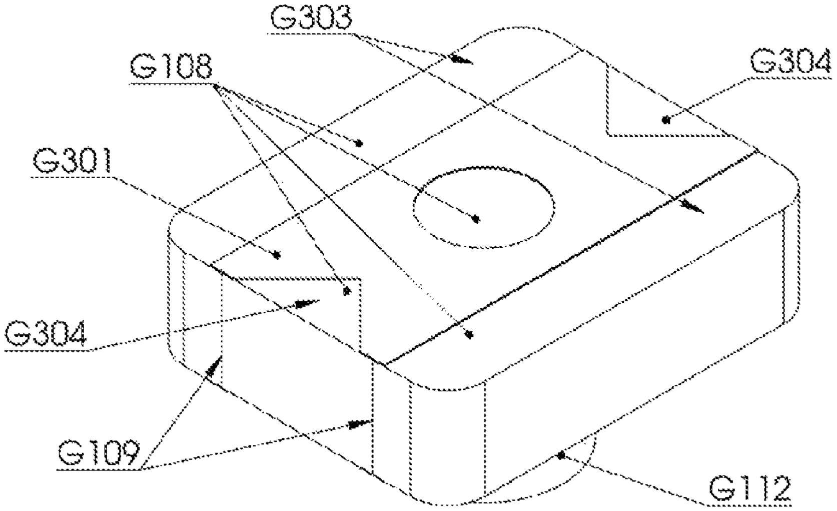
Figure 42A:
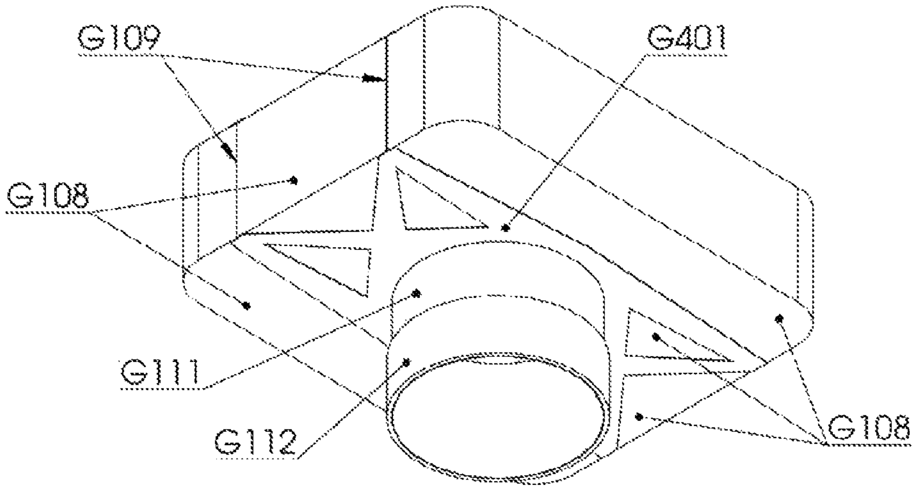
Figure 42B:
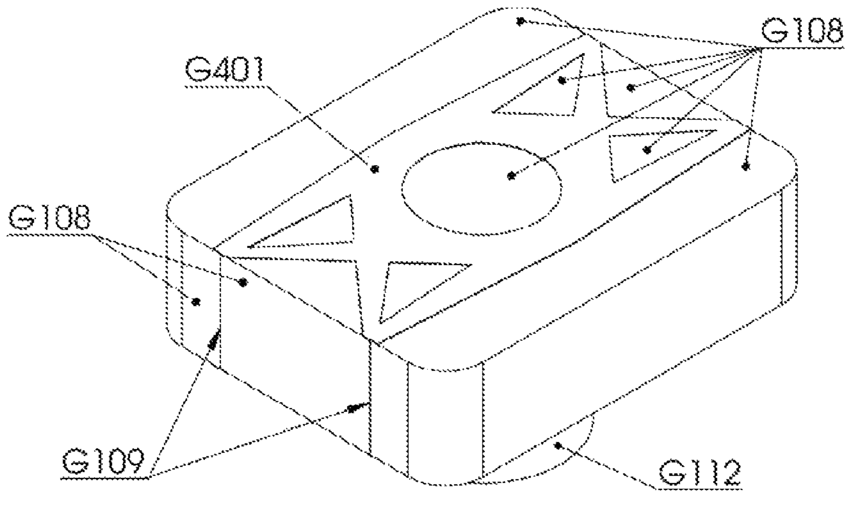
Figure 43A:
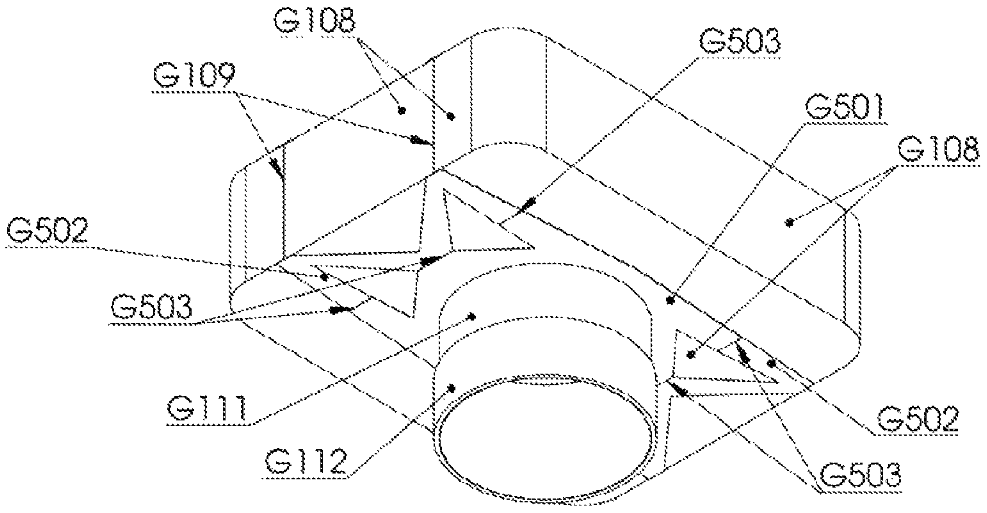
Figure 43B:
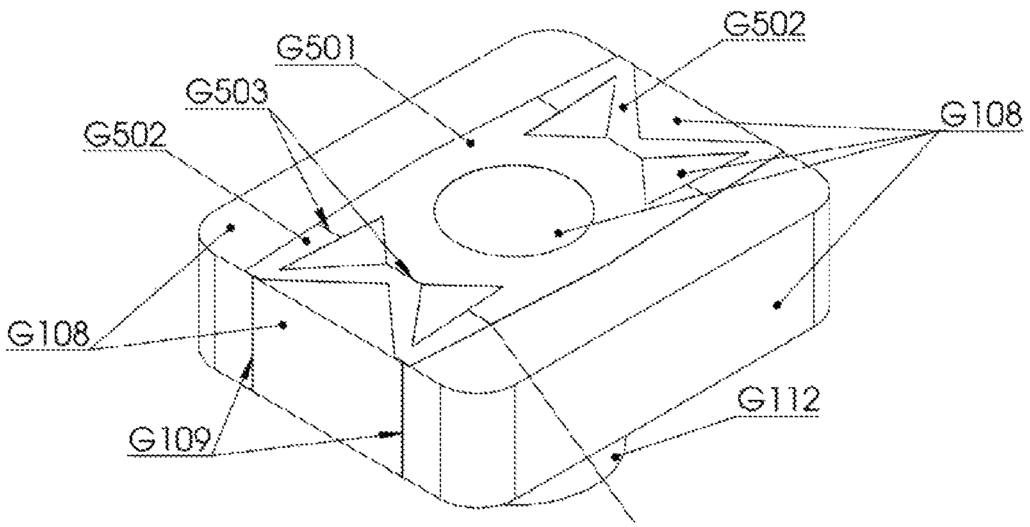
Figure 43C:
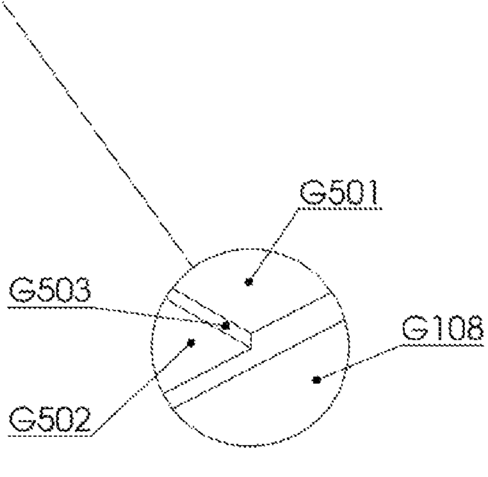
Figure 44A:
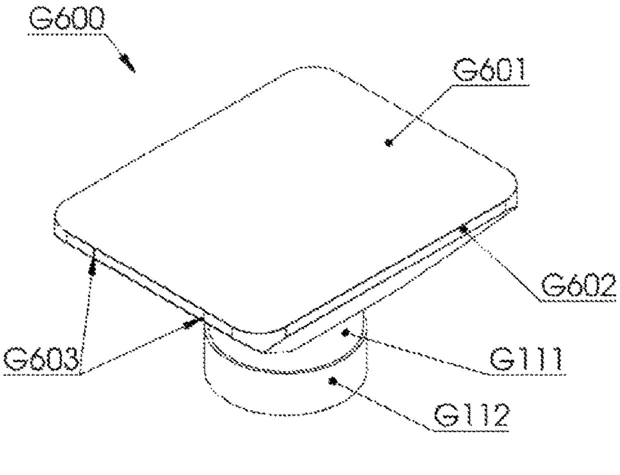
Figure 44B:
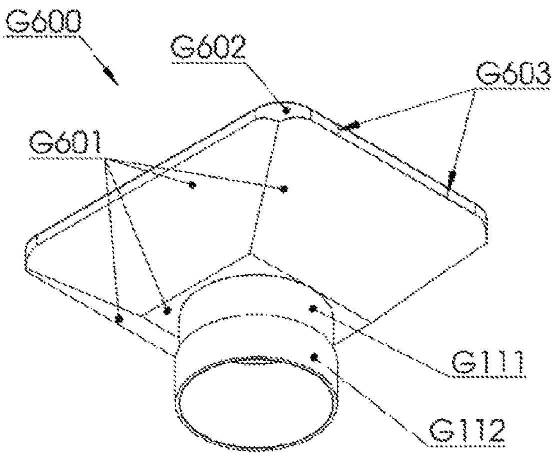
Figure 44C:
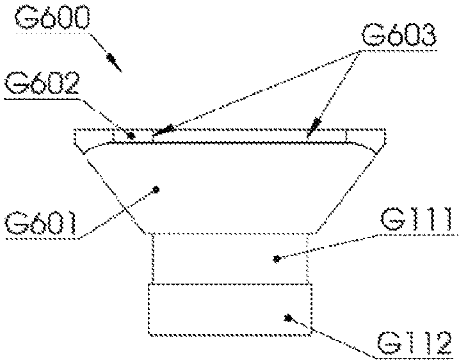
Figure 44D:
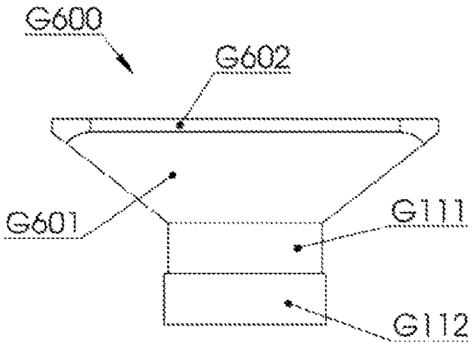
Figure 44E:
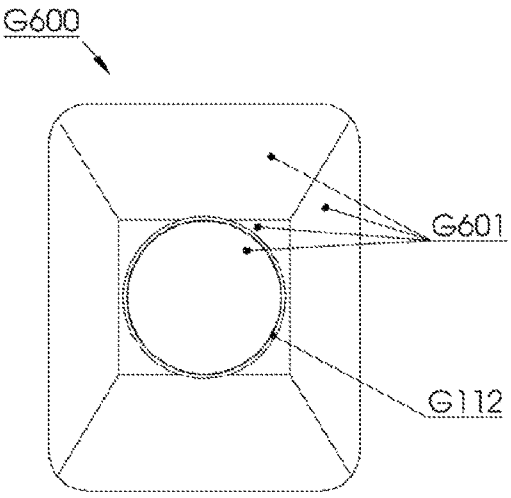
Figure 44F:
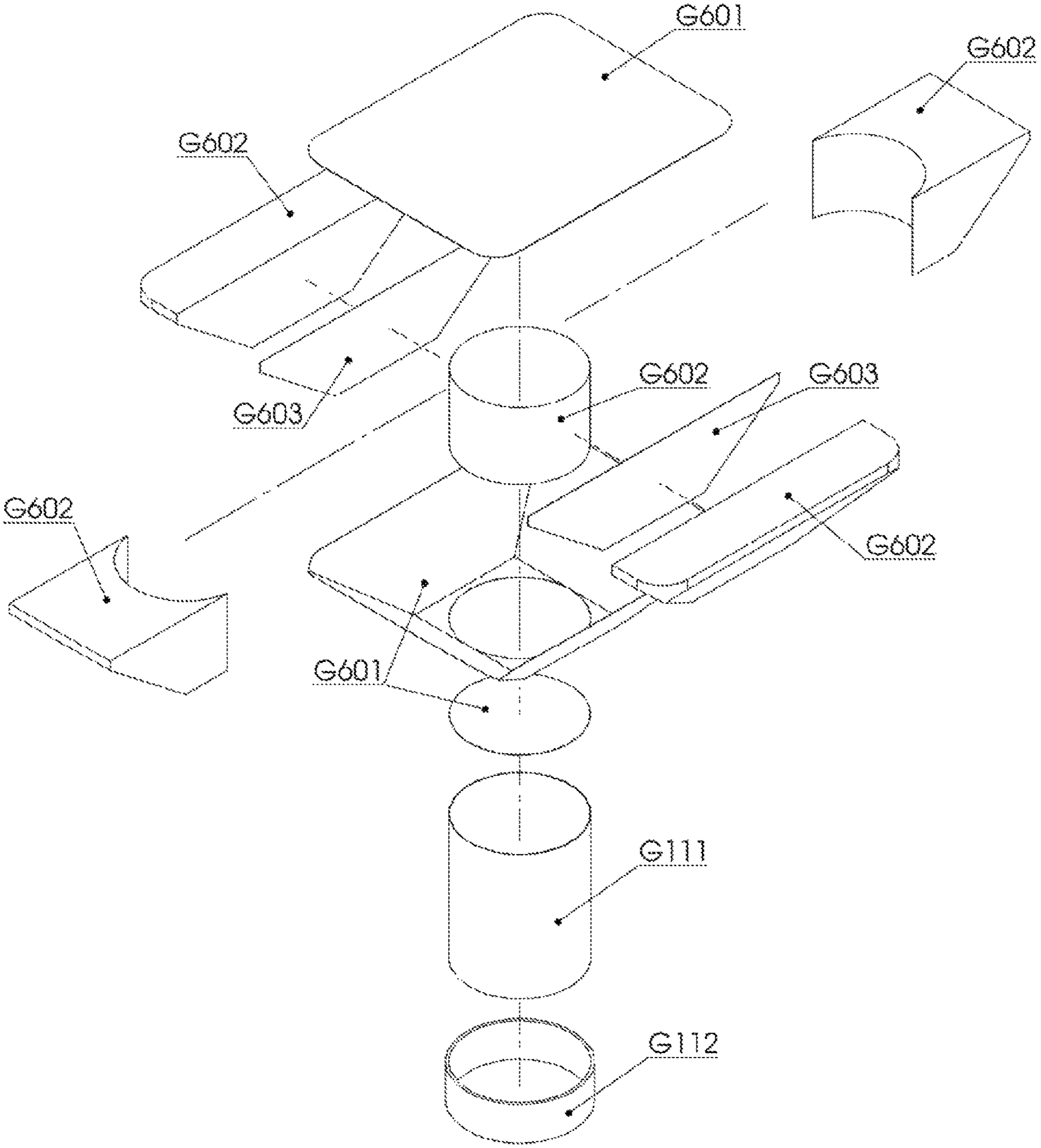
Figure 45A:
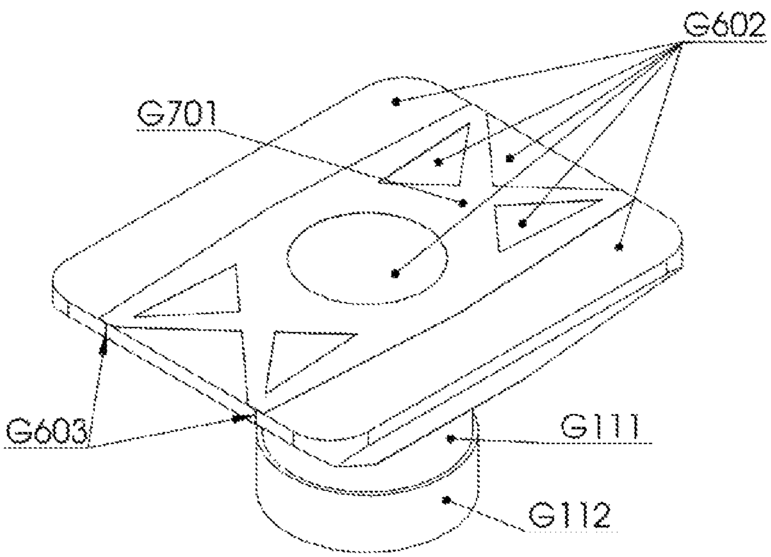
Figure 45B:
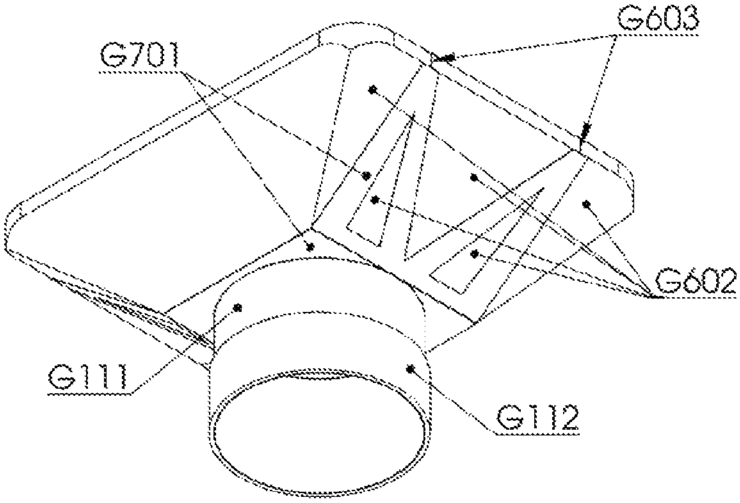
Figure 47B:
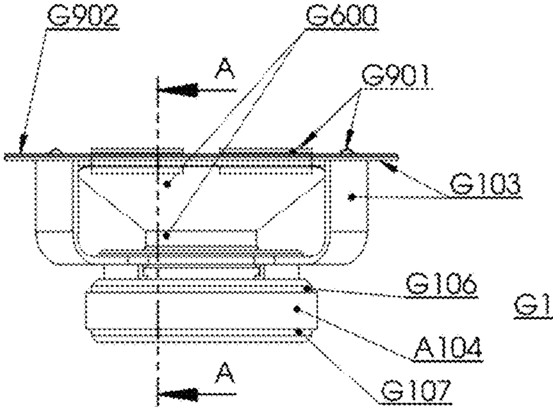
Figure 47A:
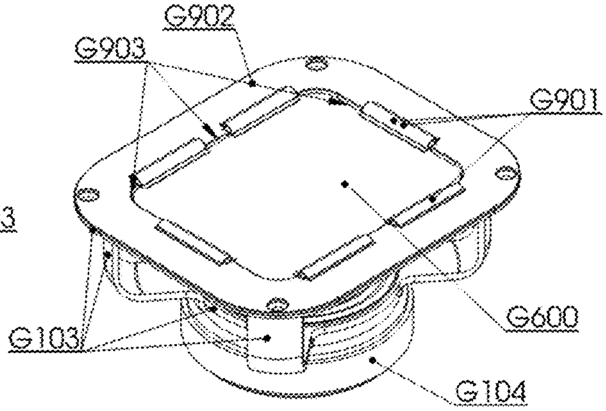
Figure 47C:
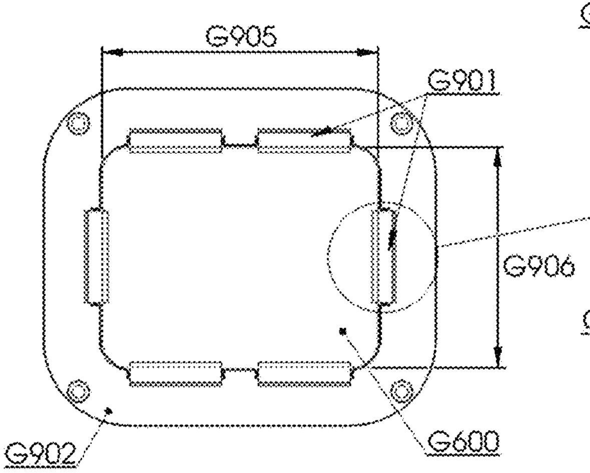
Figure 47D:
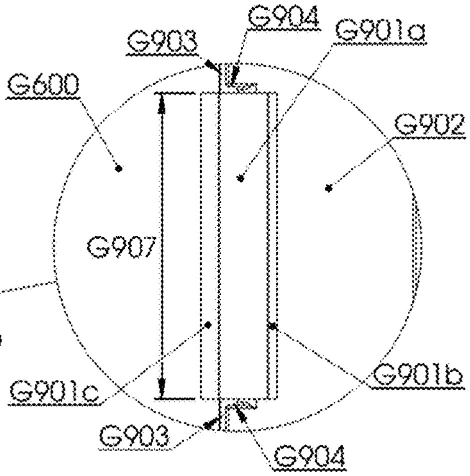
Figure 47E:
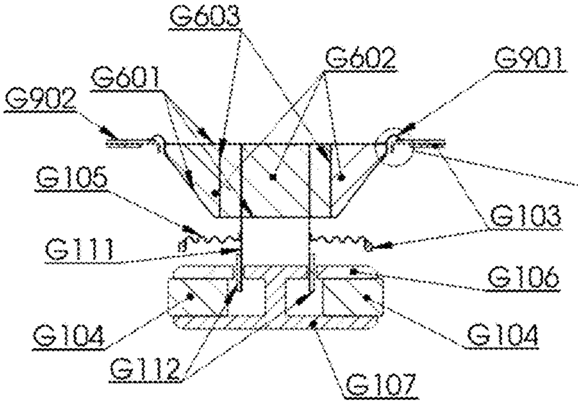
Figure 47F:
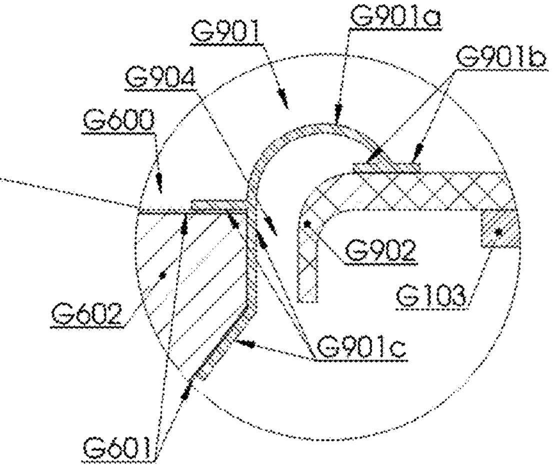
Figure 47G:
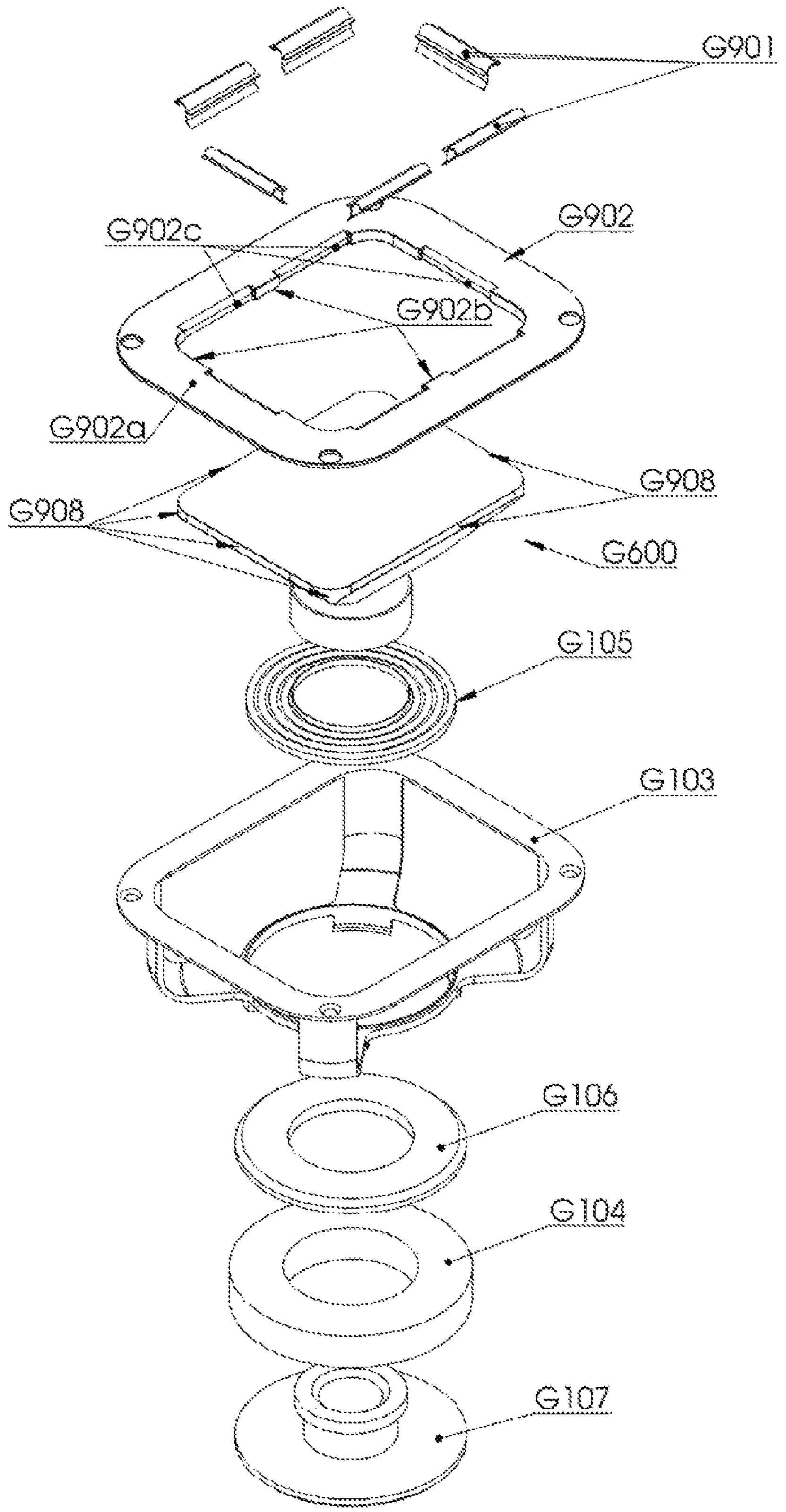
Figure 48A:
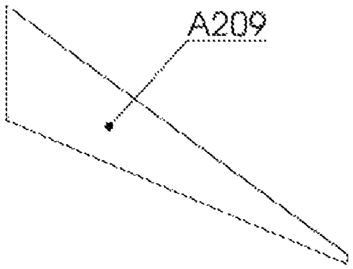
Figure 48B:
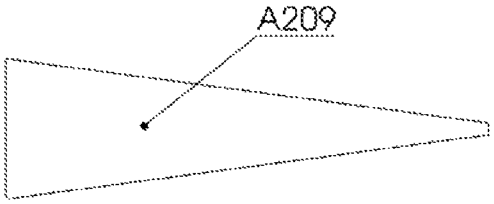
Figure 48C:
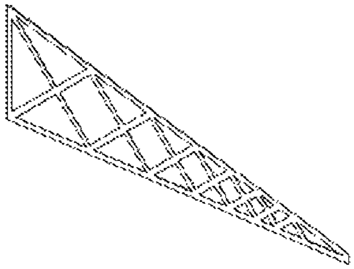
Figure 48D:
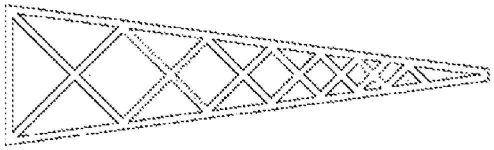
Figure 48E:
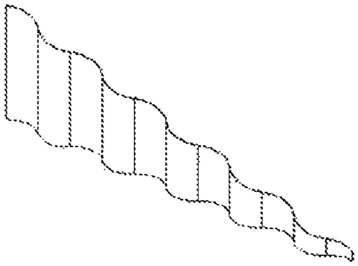
Figure 48F:
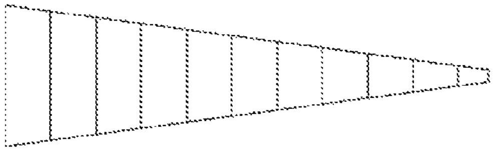
Figure 49:
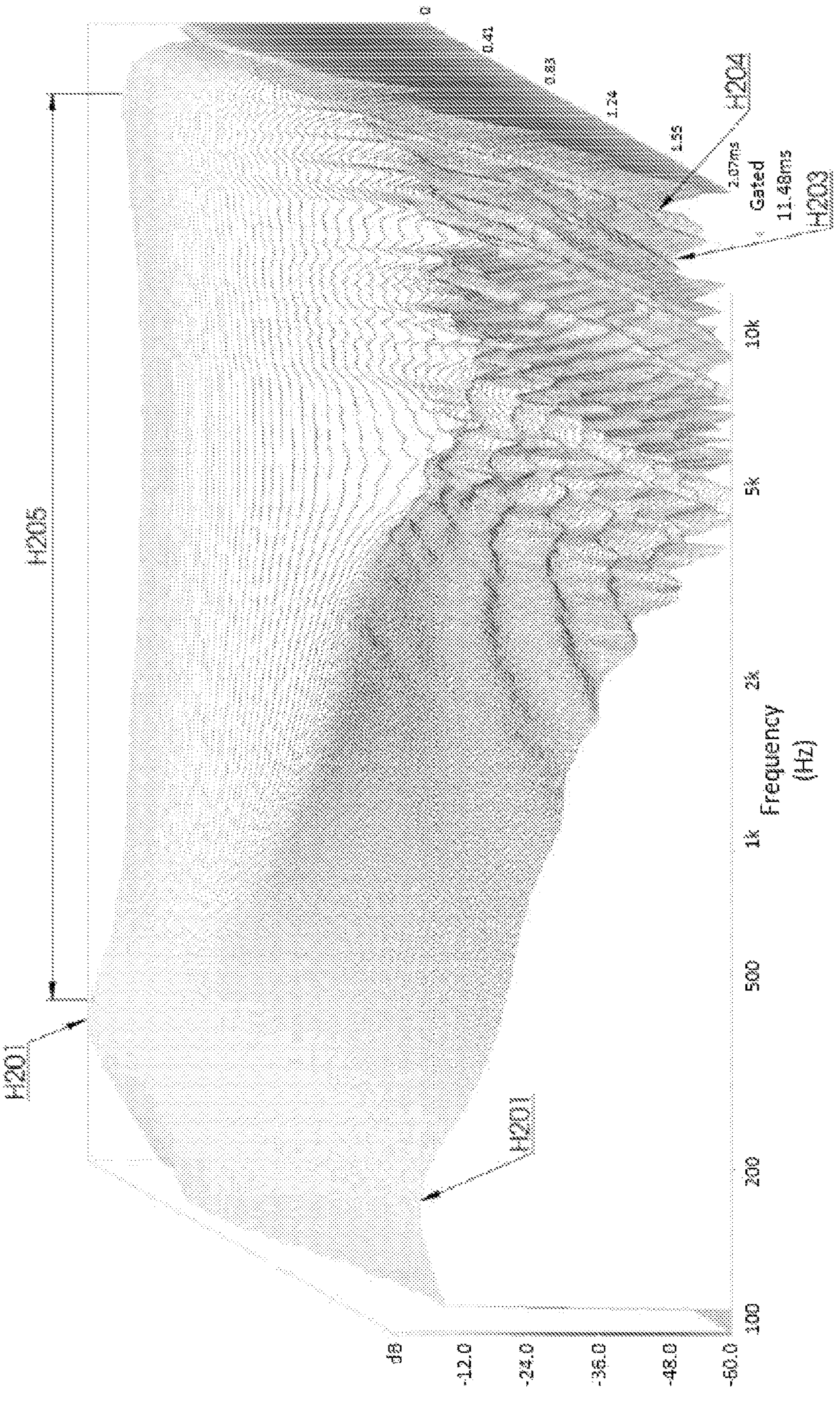
Figure 50A:
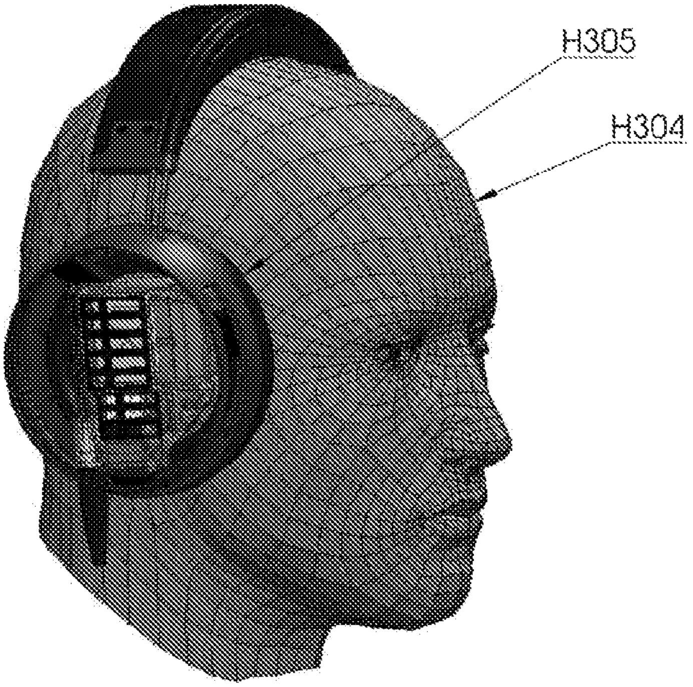
Figure 50B:
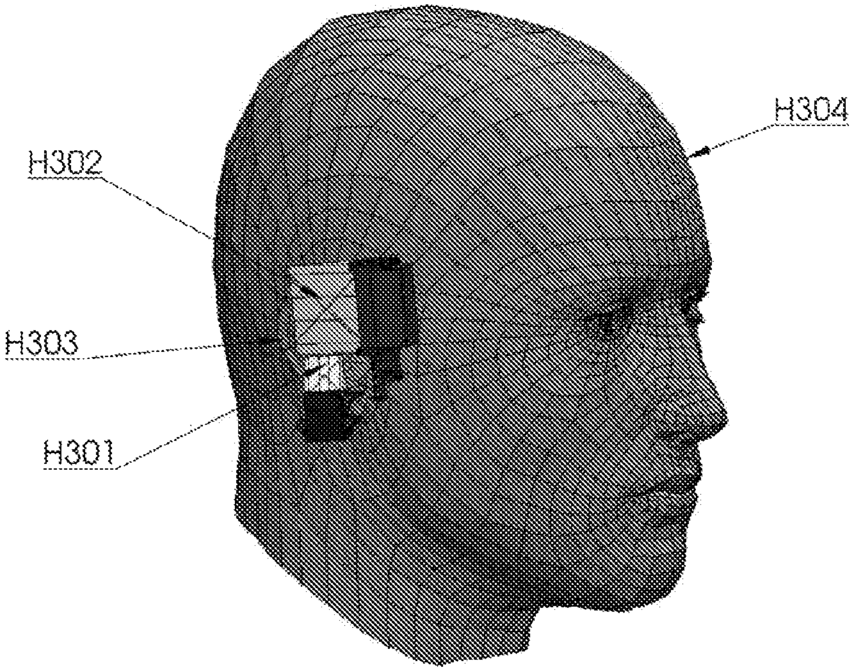
Figure 51A:
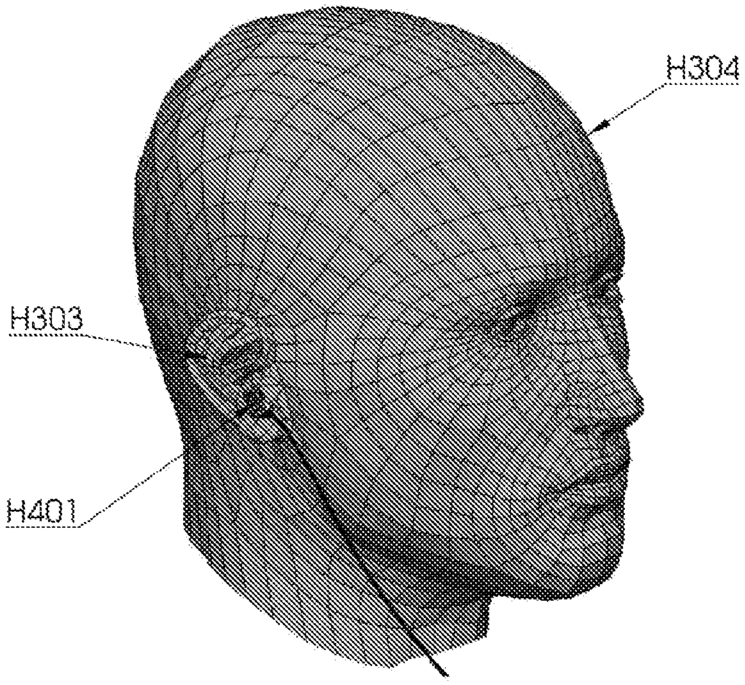
Figure 51B:
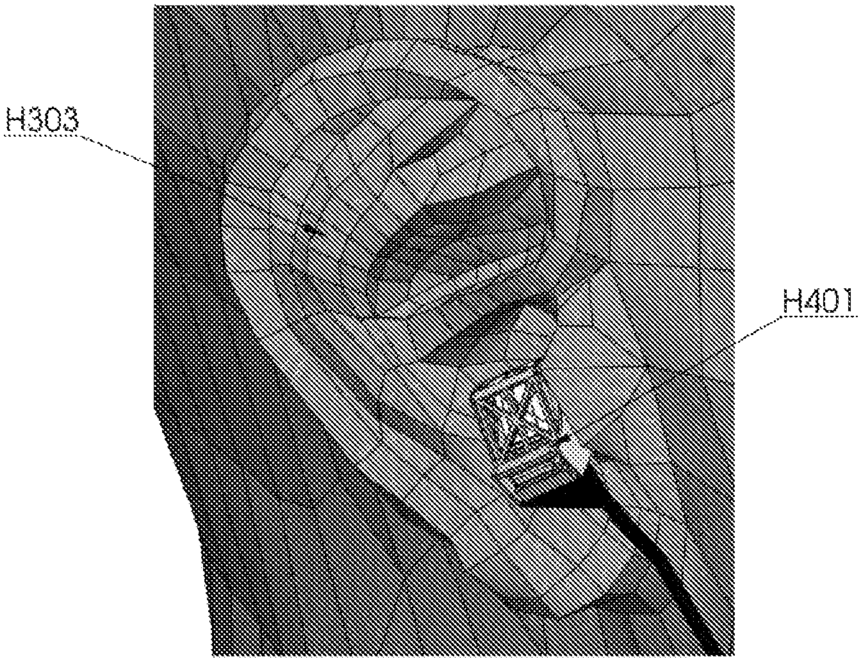
Figure 52:
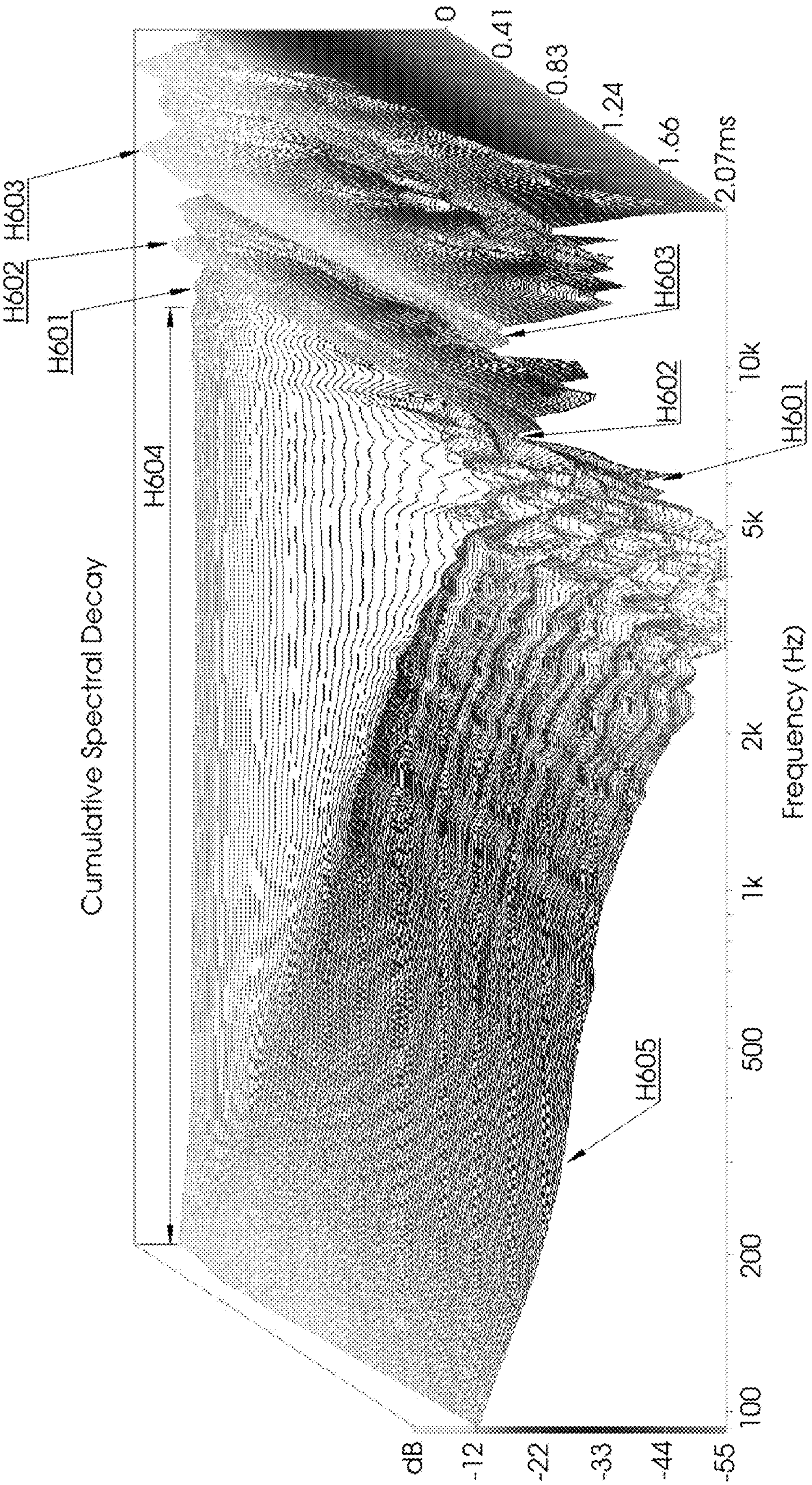
Figure 54A:
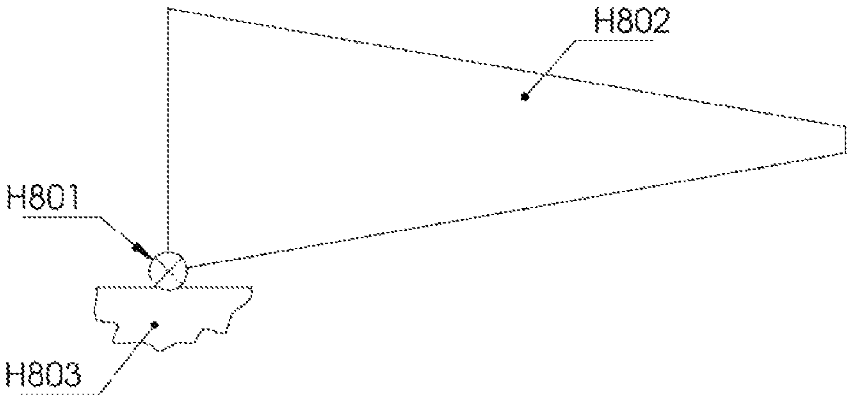
Figure 54B:
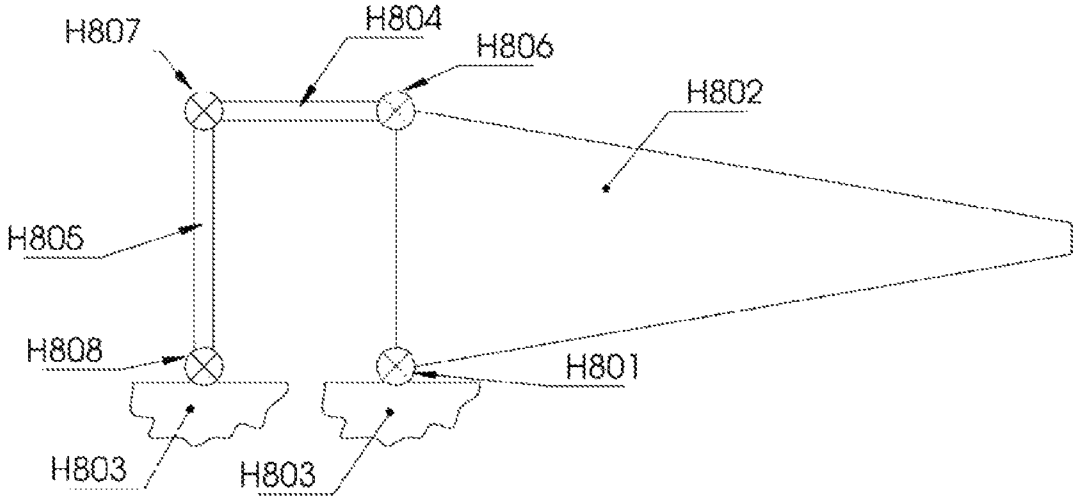
Figure 54C:
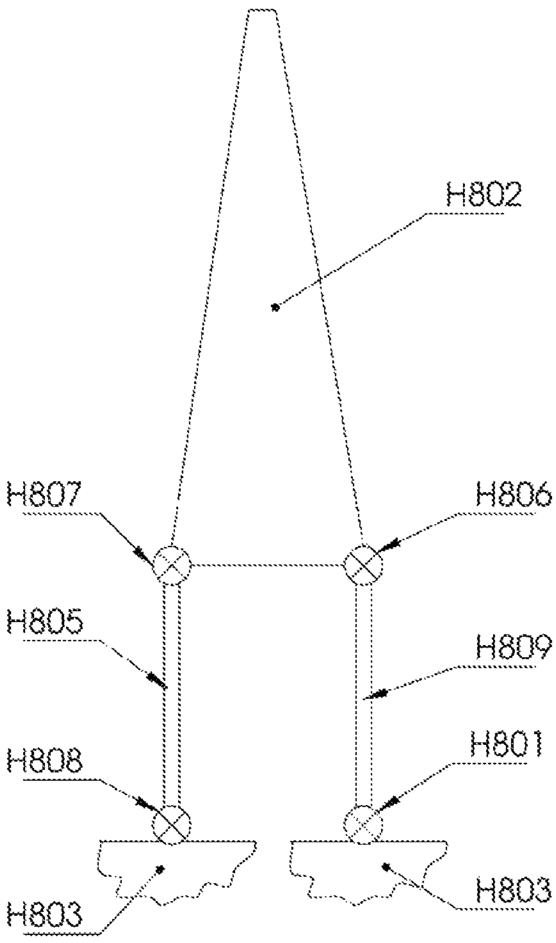
Figure 55A:
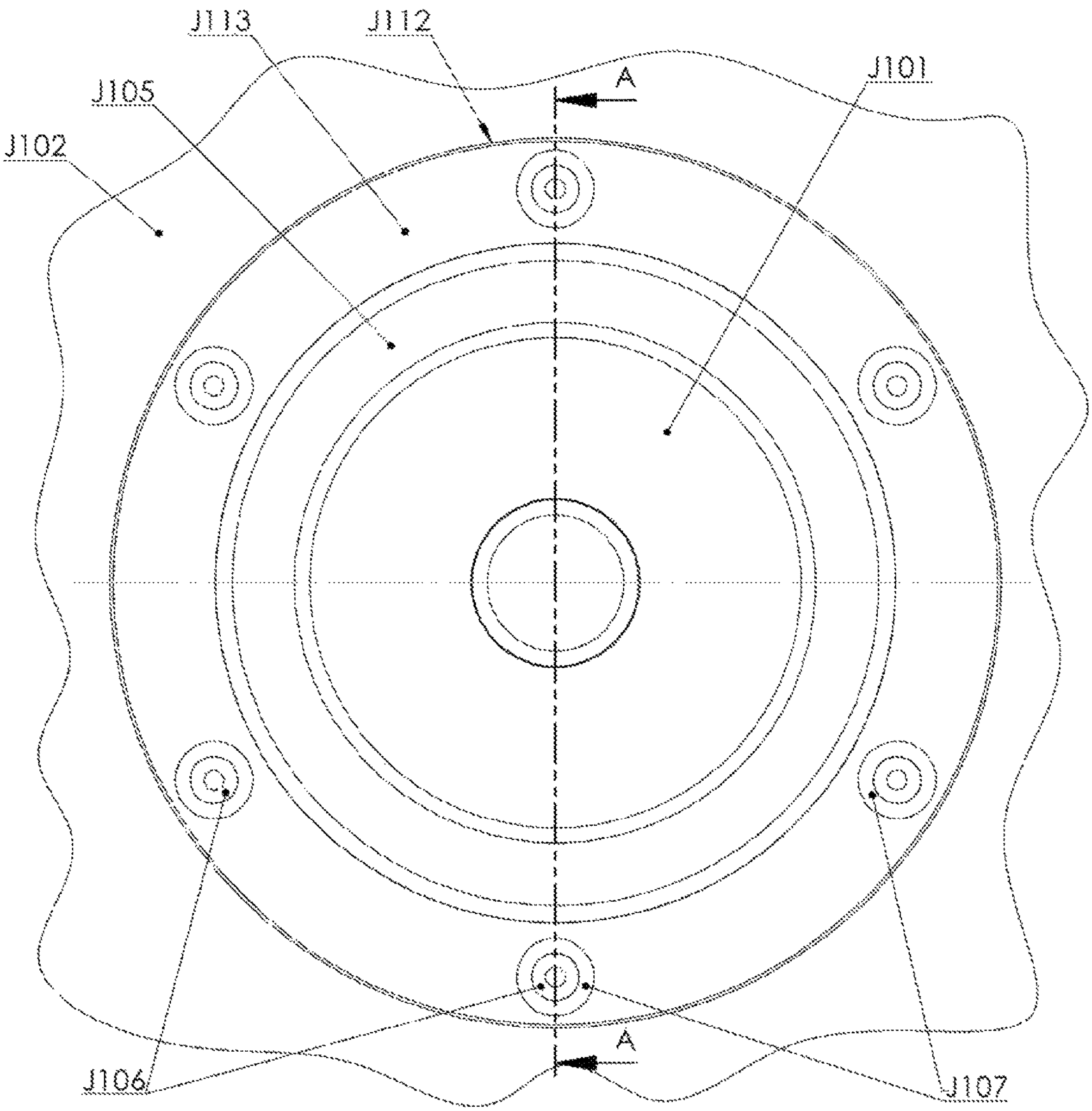
FIG. 55A PRIOR ART
Figure 55B:
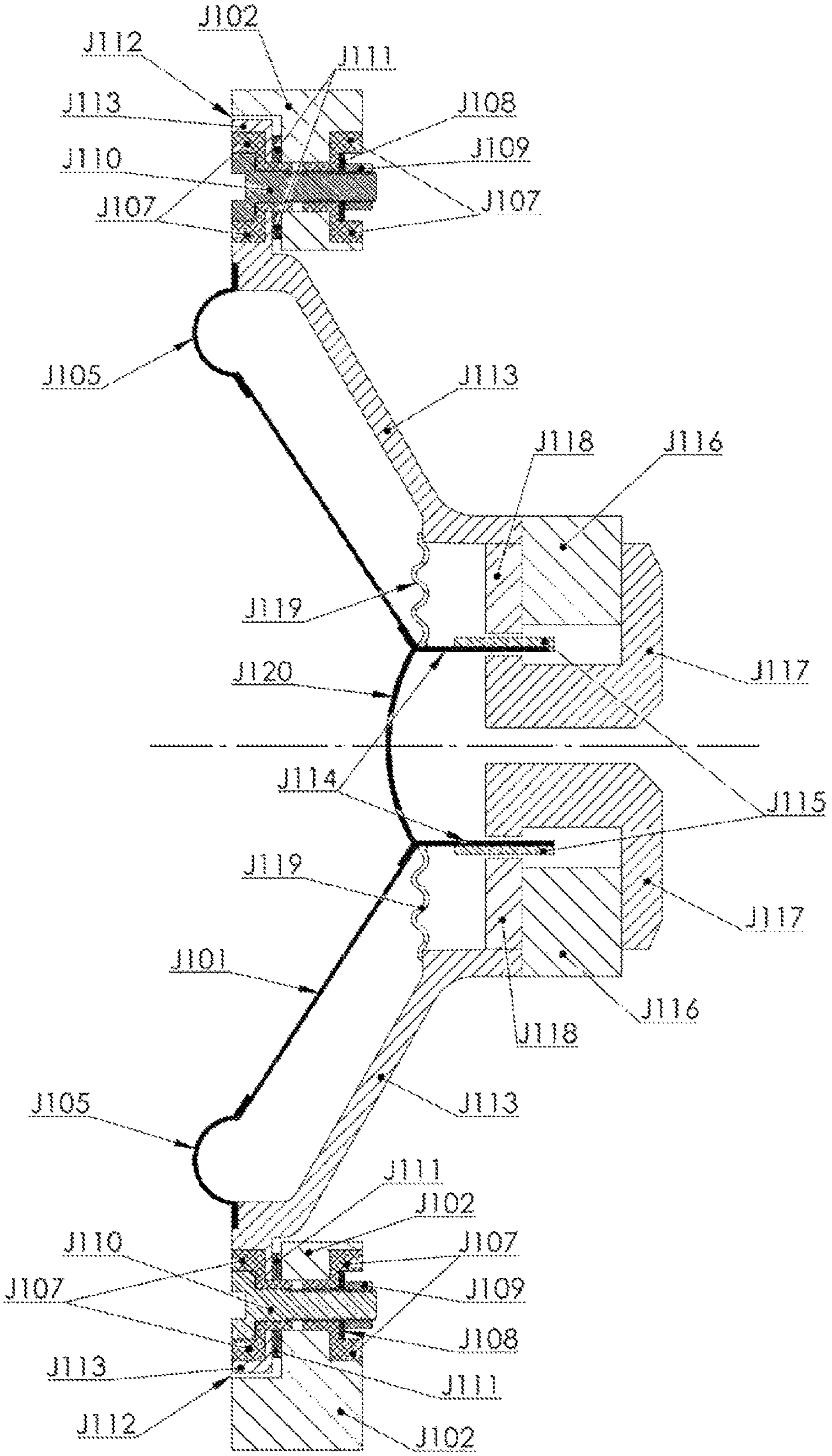
FIG. 55B PRIOR ART
Figure 56B:
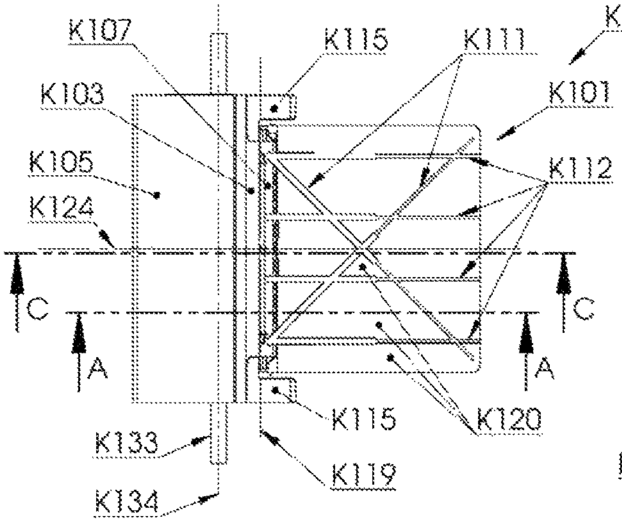
Figure 56A:
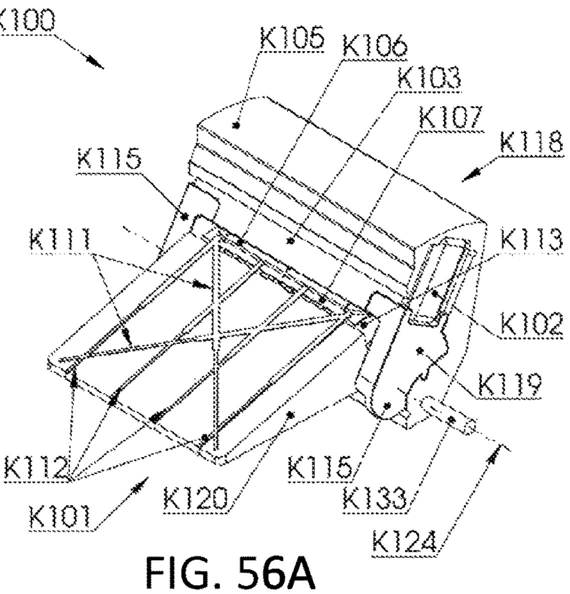
Figure 56C:
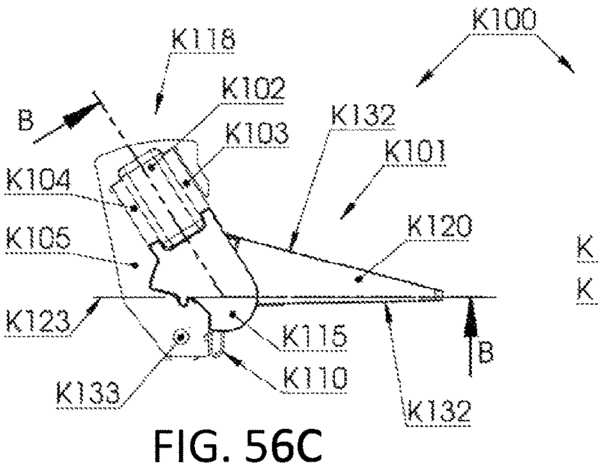
Figure 56D:
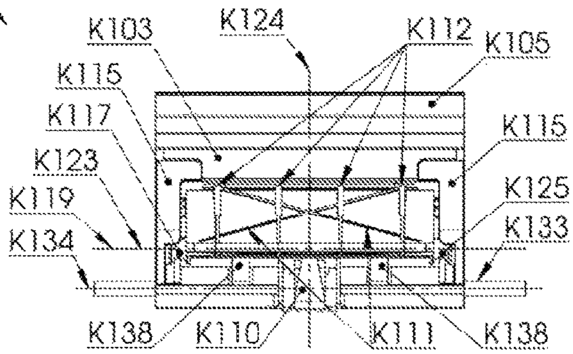
Figure 56E:
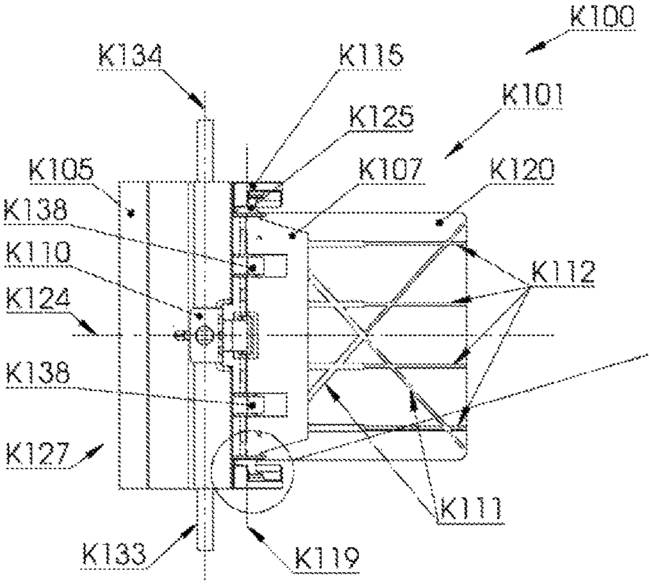
Figure 56F:
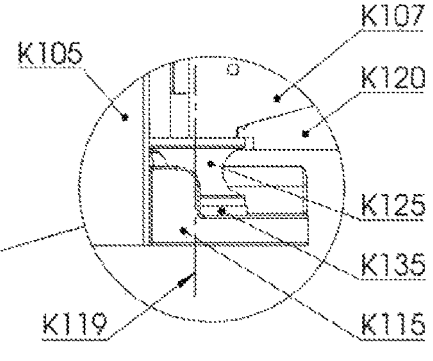
Figure 56H:
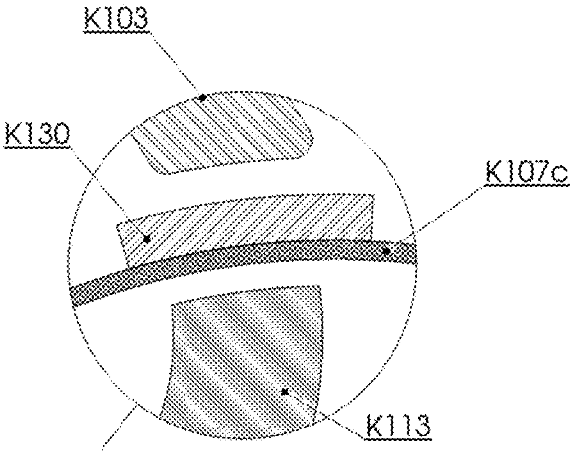
Figure 56G:
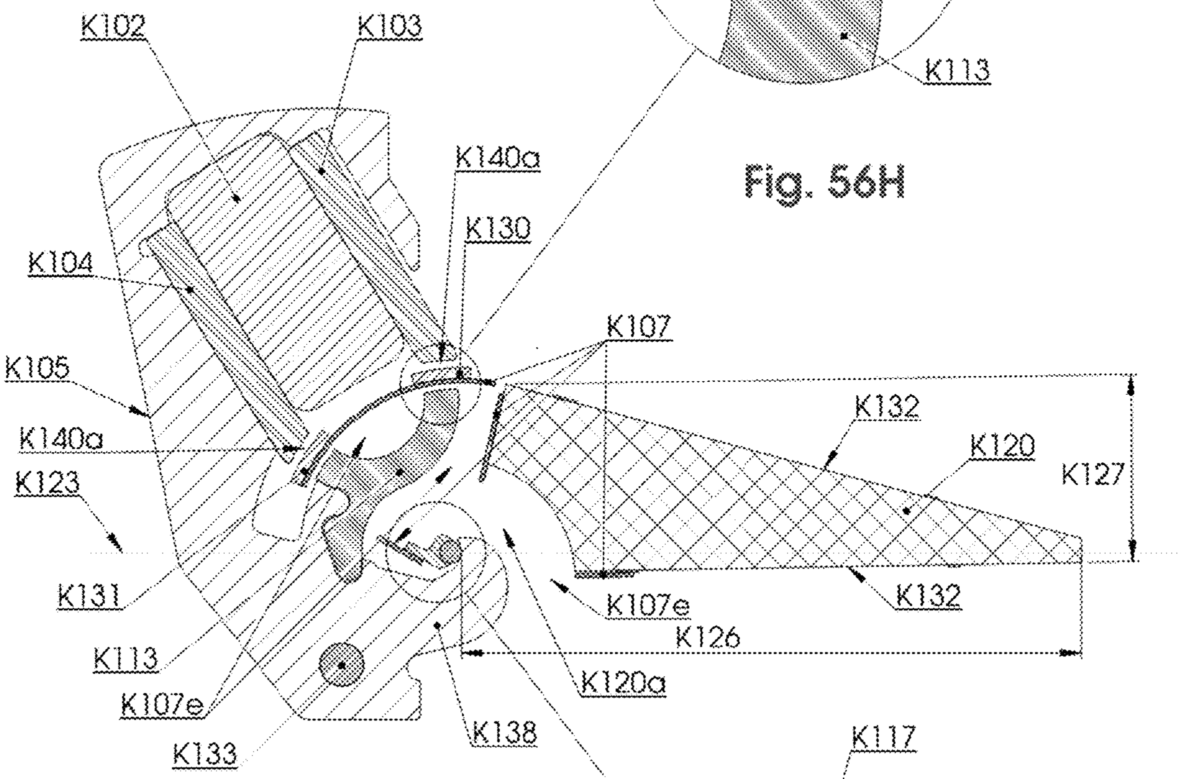
Figure 56I:
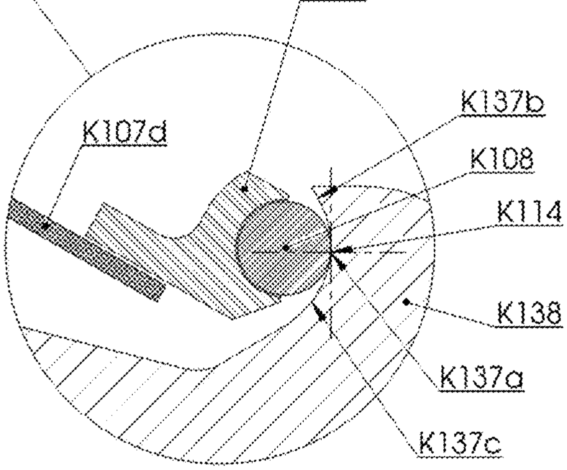
Figure 56J:
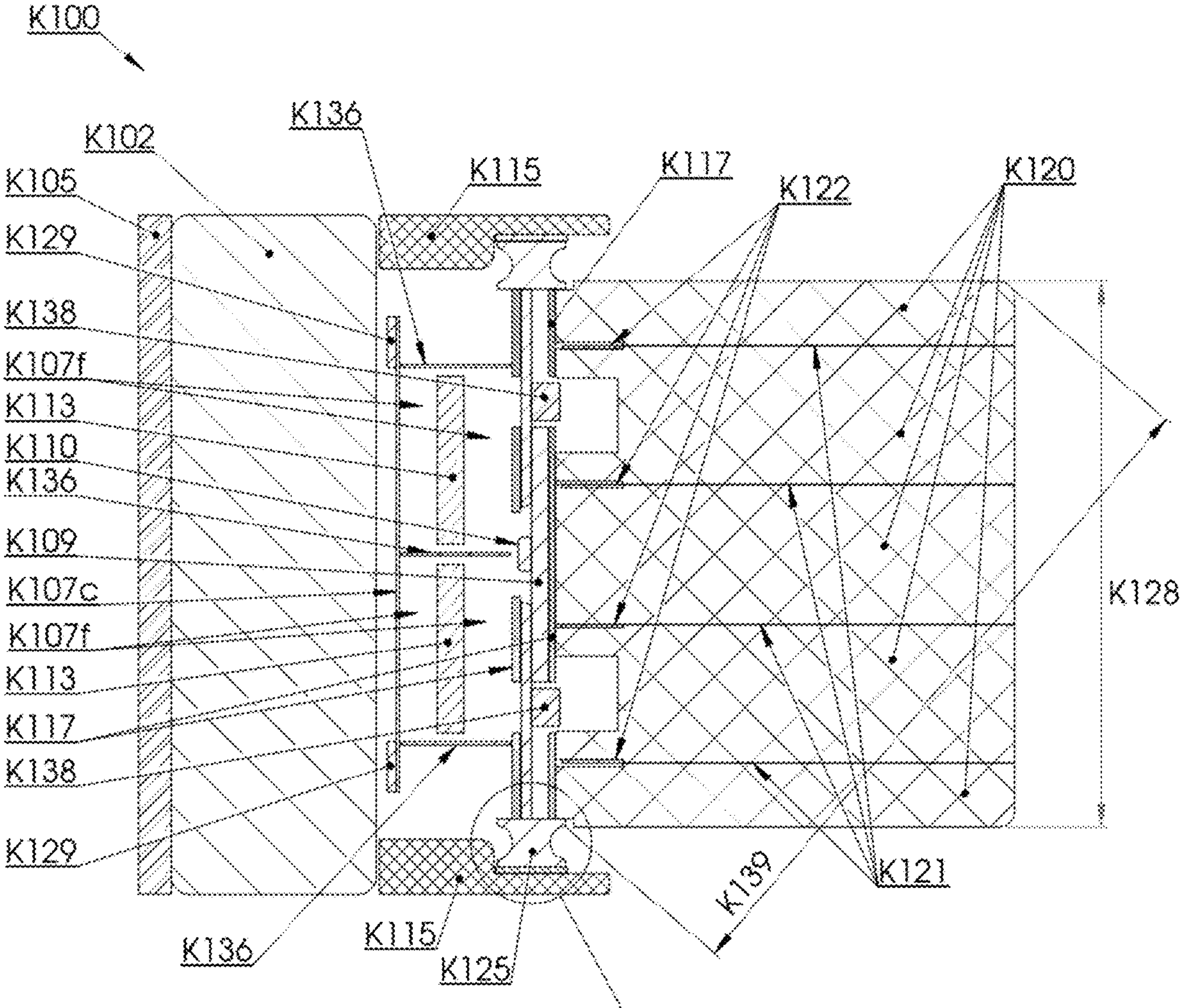
Figure 56K:
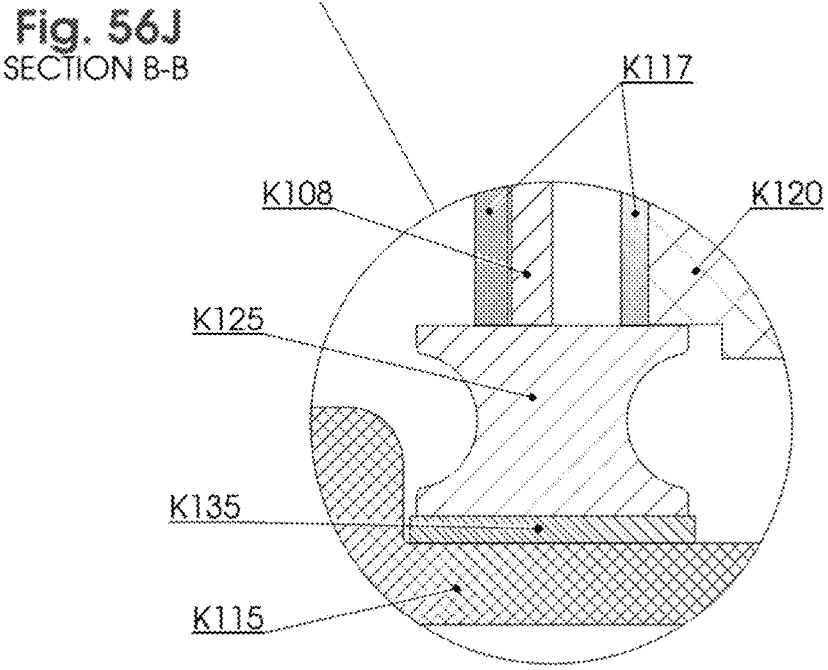
Figure 56L:
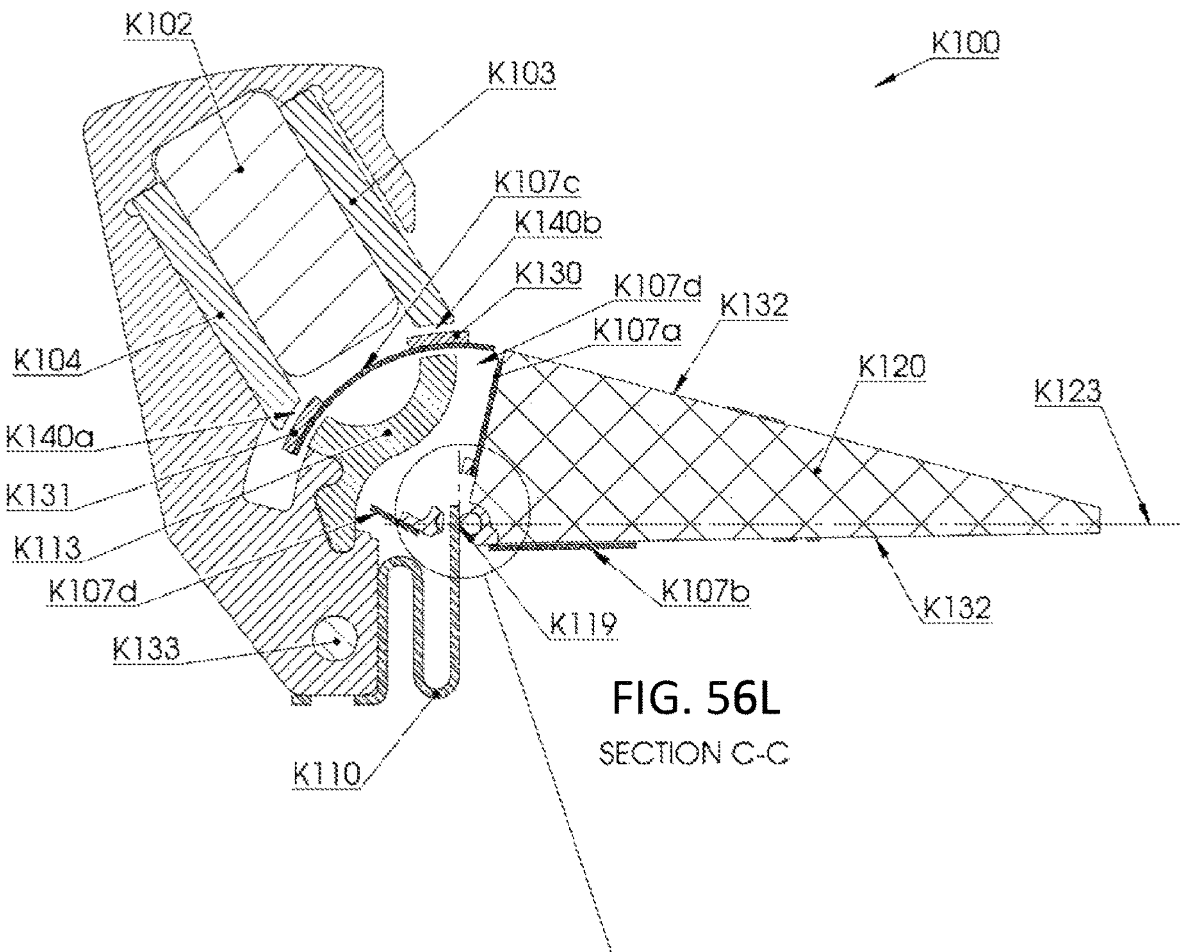
Figure 56M:
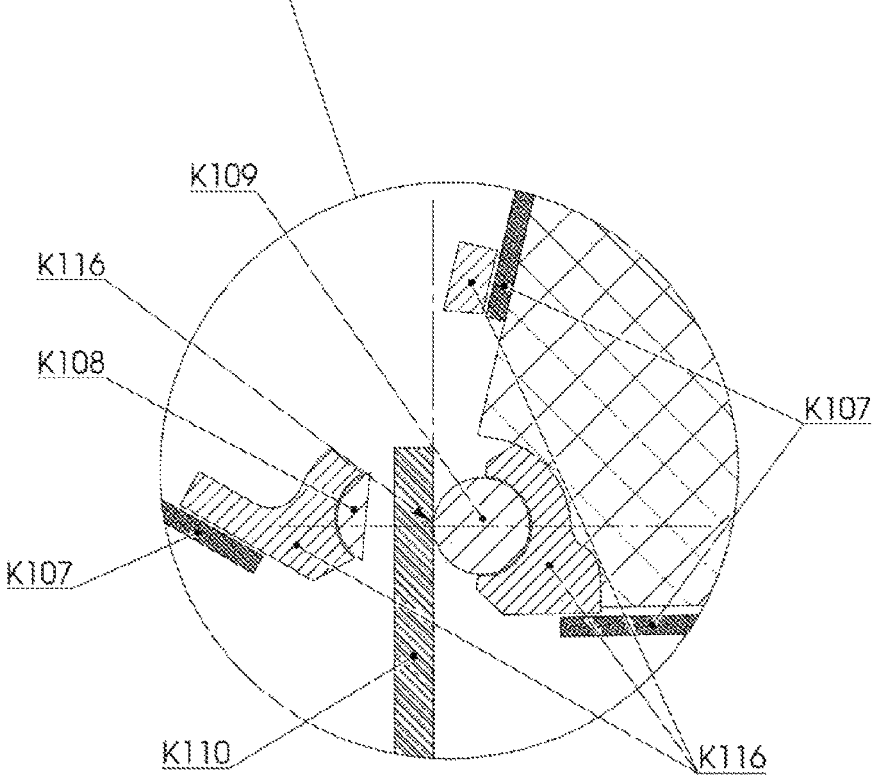
Figure 56N:
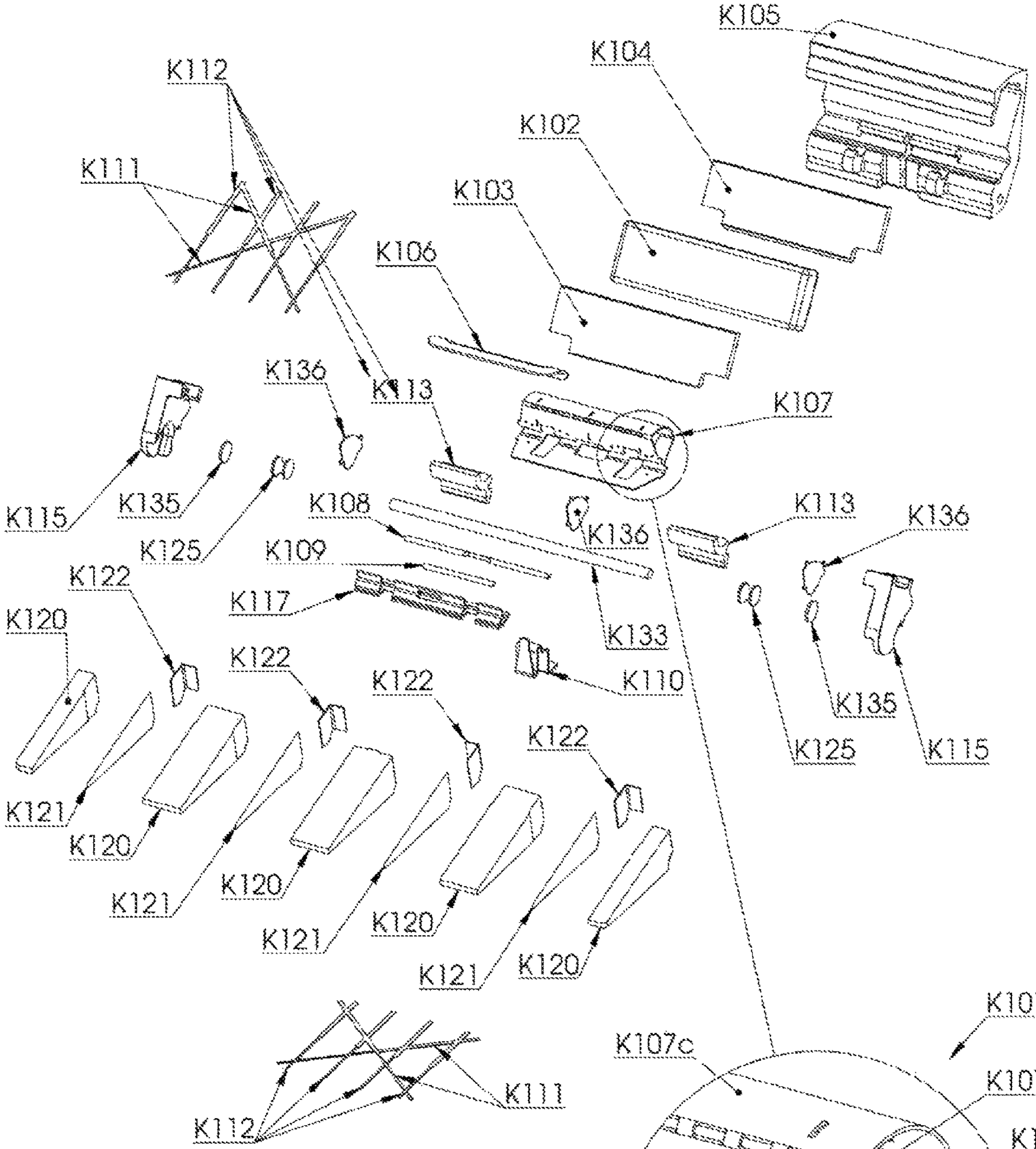
Figure 56O:
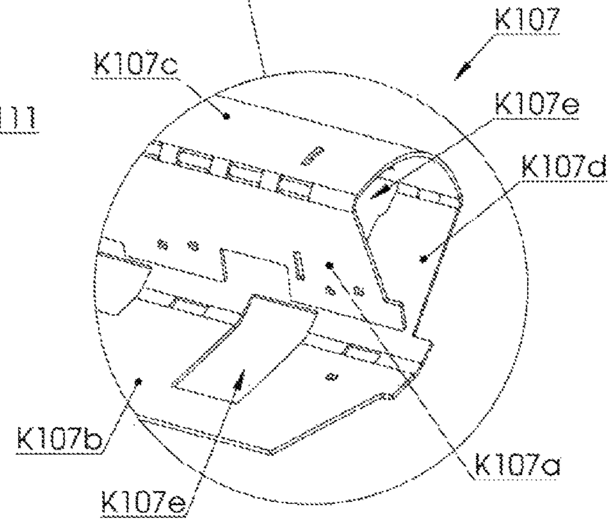

FIG. 24A being a 3D isometric view,

FIG. 24B being a back view,

FIG. 24C being a side elevation view,

FIG. 24D being a bottom view;

FIGS. 25A-25E show a similar simplified version of a driver to that shown in FIG. 23A-23E except using an alternative hinge assembly, with:

FIG. 25A being a top view,

FIG. 25B being a 3D isometric view,

FIG. 25C being a side elevation view,

FIG. 25D being a front (tip of diaphragm) view,

FIG. 25E being a cross-sectional view A-A of the back view shown in FIG. 25D;

FIGS. 26A-26D show a similar simplified version of a driver to that shown in FIGS. 24A-24D (with no base blocks shown) except using an alternative hinge assembly, with:

FIG. 26A being a 3D isometric view,

FIG. 26B being a top view,

FIG. 26C being a back view,

FIG. 26D being a side elevation view;

FIGS. 27A-27B shows an X-flexure, as used in the similar simplified version of a driver shown in FIGS. 26A-26D, with:

FIG. 27A being a 3D isometric view,

FIG. 27B being a side elevation view;

FIGS. 28A-28E show an alternative simplified version of a driver, showing a block representing a diaphragm connected to a diaphragm base, which is connected to two base blocks via flexure hinge joints extending from either end of the width of the diaphragm, with:

FIG. 28A being a top view,

FIG. 28B being a 3D isometric view,

FIG. 28C being a side elevation view,

FIG. 28D being a front view,

FIG. 28E being cross-sectional view A-A of FIG. 28D, with only the face cut by the section line shown;

FIGS. 29A-29F show 6 cross-sectional views (of a similar view to that of FIG. 28E, and again, only the face cut by the section line shown) of several alternative designs of flexure hinge joints;

FIG. 30 shows the simplified version of a driver shown in FIGS. 28A-28E, except with modified version of the flexure component whereby the cross-sectional thickness is thin in areas intended to flex, and gets thicker in areas where it connects to the diaphragm and the two base blocks;

FIG. 31 shows the simplified version of a driver shown in FIGS. 28A-28E, except with a modified version of the flexure component whereby the cross-sectional width thickness is moderately narrow in areas intended to flex, and gets wider in areas where it connects to the diaphragm and the two base blocks;

FIGS. 32A-32E show embodiment D, a hinge-action loudspeaker driver with three composite diaphragms of low rotational inertia, hinged using thin walled flexures configured to allow high rotational compliance and low translational compliance, with:

FIG. 32A being a 3D isometric view,

FIG. 32B being a top view,

FIG. 32C being a side elevation view,

FIG. 33D being an end elevation view,

FIG. 33E being cross-sectional view A-A of FIG. 32D;

FIGS. 33A-33E show the driver in embodiment D, illustrated in FIGS. 32A-32E, mounted into a surround configured to direct the air displaced by the three diaphragms in one set of ports and out another set as the diaphragms rotate in one direction, and vice versa, with:

FIG. 33A being a 3D isometric view, angled to show one set of ports on one side of the surround, FIG. 33B being a 3D isometric view, angled to show a second set of ports on the other side of the surround, FIG. 33C being a side elevation view, FIG. 33D being an end elevation view, FIG. 33E being cross-sectional view A-A of FIG. 33D;

FIGS. 34A-34M show embodiment E, a hinge-action loudspeaker driver with a composite diaphragm of low rotational inertia, hinged using contact surfaces that roll against each other, a biasing force applied using flat springs, with:

FIG. 34A being a 3D isometric view,

FIG. 34B being a top view,

FIG. 34A being a side elevation view,

FIG. 34B being a front view,

FIG. 34C being a detail view of FIG. 34C,

FIG. 34D being a cross-sectional view (section A-A of FIG. 34D),

FIG. 34E being a detail view of the contact point in FIG. 34F,

FIG. 34F being a detail view of the coil winding in FIG. 34F,

FIG. 34G being a cross-sectional view (section B-B of FIG. 34C),

FIG. 34H being a detail view of FIG. 34H,

FIG. 34I being a detail view of the detail view FIG. 34J,

FIG. 34J being a 3D isometric, exploded view, being a detail view of FIG. 34Ie;

FIGS. 35A-35H show the embodiment E driver, illustrated in FIGS. 34A-34M and rigidly attached to a baffle, with:

FIG. 35A being a 3D isometric view,

FIG. 35B being a top view,

FIG. 35C being a side elevation view,

FIG. 35D being a front view,

FIG. 35E being a cross-sectional view (section A-A of FIG. 35B),

FIG. 35F being a detail view of FIG. 35E,

FIG. 35G being a cross-sectional view (section B-B of FIG. 35E),

FIG. 35H being a 3D isometric, exploded view;

FIG. 36 shows a 3D isometric view of the diaphragm base frame E107 of the embodiment E driver illustrated in FIGS. 34A-34M;

FIGS. 37A-37C show the diaphragm assembly E101 of the embodiment E driver illustrated in FIGS. 34A-34M, with:

FIG. 37A being a 3D isometric view,

FIG. 37B being a top view,

FIG. 37C being a side elevation view;

FIG. 38 shows a graph of a target diffuse field frequency response;

FIGS. 39A-39C show embodiment G, a linear-action loudspeaker driver with foam core diaphragm supported by a conventional surround and spider diaphragm suspension system. The diaphragm has tension/compression reinforcing on the major outer surfaces and inner reinforcement members within the core, with:

FIG. 39A being a 3D isometric view,

FIG. 39B being a side elevation view,

FIG. 39C being cross-sectional view A-A of FIG. 39B, with only the face cut by the section line shown;

FIGS. 40A-40D show the diaphragm of the driver in embodiment G, illustrated in FIGS. 39A-39C, with:

FIG. 40A being a 3D isometric view,

FIG. 40B being a side elevation view,

FIG. 40C being a bottom view,

FIG. 40D being a 3D isometric, exploded view;

FIGS. 41A-41B show a modified version of the diaphragm of the driver in embodiment G, illustrated in FIGS. 39A-39C whereby the diaphragm's tension/compression reinforcing on the major outer surfaces is omitted in areas distal to the motor, with:

FIG. 41A being a 3D isometric view, angled to show the coil side of the diaphragm, FIG. 41B being a 3D isometric view, angled to show the top side of the diaphragm;

FIGS. 42A-42B show a modified version of the diaphragm of the driver in embodiment G, illustrated in FIGS. 39A-39C. The modification is similar to the modification shown in FIG. 41A-41B except that a larger amount of material is omitted from the diaphragm's tension/compression reinforcing on the major outer surfaces at areas distal to the motor, with:

FIG. 42A being a 3D isometric view, angled to show the coil side of the diaphragm, FIG. 42B being a 3D isometric view, angled to show the top side of the diaphragm;

FIGS. 43A-43C shows a modified version of the diaphragm of the driver in embodiment G, illustrated in FIGS. 39A-39C including a modification identical to that shown in FIGS. 42A-42B except that additionally the thickness of the diaphragm's tension/compression reinforcing reduces in areas distal to the motor, with:

FIG. 43A being a 3D isometric view, angled to show the coil side of the diaphragm, FIG. 43B being a 3D isometric view, angled to show the top side of the diaphragm, FIG. 43C being a detail view of FIG. 43B;

FIGS. 44A-44F show a modified version of the diaphragm of the driver in embodiment G, illustrated in FIGS. 39A-39C with a similar diaphragm, except that the thickness of the body of the diaphragm reduces as it extends away from the coil, with:

FIG. 44A being a 3D isometric view, angled to show the top side of the diaphragm, FIG. 44B being a 3D isometric view, angled to show the coil side of the diaphragm, FIG. 44C being an end elevation view, FIG. 44D being a side elevation view, FIG. 44E being a bottom view, FIG. 44F being a 3D isometric, exploded view;

FIGS. 45A-45B show a modified version of the diaphragm of the driver in embodiment G, illustrated in FIGS. 39A-39C where the modification is similar to that shown in FIGS. 44A-44F except that the diaphragm's tension/compression reinforcing on the major outer surfaces is omitted in areas distal to the motor, with:

FIG. 45A being a 3D isometric view, angled to show the top side of the diaphragm, FIG. 45B being a 3D isometric view, angled to show the coil side of the diaphragm;

FIGS. 46A-46D show a modified version of the diaphragm of the driver in embodiment G, illustrated in FIGS. 39A-39C where the modification is similar to that shown in FIGS. 45A-45B except that the diaphragm's tension/compression reinforcing on the major outer surfaces comprises thin carbon fibre struts, that step down in thickness in areas distal to the motor, with:

FIG. 46A being a 3D isometric view, angled to show the top side of the diaphragm, FIG. 46B being a detail view of FIG. 46A, showing a step reduction in strut thickness, FIG. 46C being a 3D isometric view, angled to show the coil side of the diaphragm, FIG. 46D being a detail view of FIG. 46C, showing a step reduction in strut thickness;

FIGS. 47A-47G show a partially free periphery implementation of a linear action transducer similar to that shown FIGS. 39A-39C, with the diaphragm assembly of FIGS. 44A-44F, with:

FIG. 47A being a 3D isometric view, angled to show the top side of the diaphragm, FIG. 47B being a front view, FIG. 47C being a top view, FIG. 47D being a detail view of FIG. 47C suspension member, FIG. 47E being a cross-sectional view A-A of FIG. 47B, with only the face cut by the section line shown, FIG. 47F being a detail view of FIG. 47F suspension member, FIG. 47G being an exploded view;

FIG. 48A shows a 3D isometric view of an inner reinforcement member that is used embedded within embodiment A diaphragm body;

FIG. 48B shows a side elevation view of the component in FIG. 48A;

FIG. 48C shows a 3D isometric view of an inner reinforcement member similar to A209 that is embedded within the embodiment A diaphragm body, except it comprises a network of struts;

FIG. 48D shows a side elevation view of the component in FIG. 48C;

FIG. 48E shows a 3D isometric view of an inner reinforcement member similar to A209 that is embedded within the embodiment A diaphragm body, except it comprises a corrugated panel;

FIG. 48F shows a side elevation view of the component in FIG. 48E;

FIG. 49 shows a cumulative spectral decay plot of the embodiment A driver;

FIG. 50A shows a 3D view human head wearing a circumaural headphone consisting of four drivers, with two on each ear. Two drivers are shown on the right ear including, one treble unit which is identical to the embodiment A driver, and one bass unit which is similar to the embodiment A driver, but is bigger and suitable for reproducing low bass;

FIG. 50B shows a similar image as in FIG. 50A, except with all parts of the headphone hidden, but for the two loudspeaker drivers;

FIG. 51A shows a 3D view of a human head wearing a bud earphone including a single full range driver on the right ear. The loudspeaker driver used is similar to the one shown in FIGS. 34A-37C;

FIG. 51B shows the same image as in H4a, except it is a close-up view of the ear with the loudspeaker driver inside it;

FIG. 52 shows a cumulative spectral decay plot of the bass driver shown in FIG. 50A;

FIGS. 53A-53D show schematic side views of four variations of a basic hinge joint which could be used in a contact hinge assembly;

FIG. 54A shows a side view illustration of the concept of a simple rotational diaphragm connected to a transducer base structure;

FIG. 54B shows a side view illustration of the concept of a simple rotational diaphragm connected to a transducer base structure and including a four-bar linkage mechanism;

FIG. 54C shows a side view illustration of the concept of a simple diaphragm suspension mechanism including a four-bar linkage mechanism;

FIGS. 55A-55B show a prior art cone loudspeaker driver that is semi-decoupled to a baffle, with:

FIG. 55A being a front view,

FIG. 55B being a cross-sectional view (section A-A of FIG. 55A);

FIGS. 56A-56O show embodiment K, a hinge-action loudspeaker driver with a composite diaphragm of low rotational inertia, hinged using contact surfaces that roll against each other and a biasing force applied using a flat spring, with:

FIG. 56A being a 3D isometric view,

FIG. 56B being a plan view,

FIG. 56C being a side elevation view,

FIG. 56D being a front (tip of diaphragm) elevation view,

FIG. 56E being a bottom view,

FIG. 56F detail view of a side member shown in FIG. 56E,

FIG. 56G being a cross-sectional view (section A-A of FIG. 56B),

FIG. 56H being a detail view of the magnetic flux gap shown in FIG. 56G, FIG. 56I being a detail view of the hinging joint shown in FIG. 56G, FIG. 56J being a cross-sectional view (section B-B of FIG. 56J), FIG. 56K being a detail view of the side member shown in FIG. 56J, FIG. 56L being a cross-sectional view (section C-C of FIG. 56B), FIG. 56M being a detail view of the biasing spring shown in FIG. 56L, FIG. 56N being an exploded 3D isometric view, FIG. 56O being a detail view of the diaphragm base frame shown in FIG. 56N.

Figure 57:
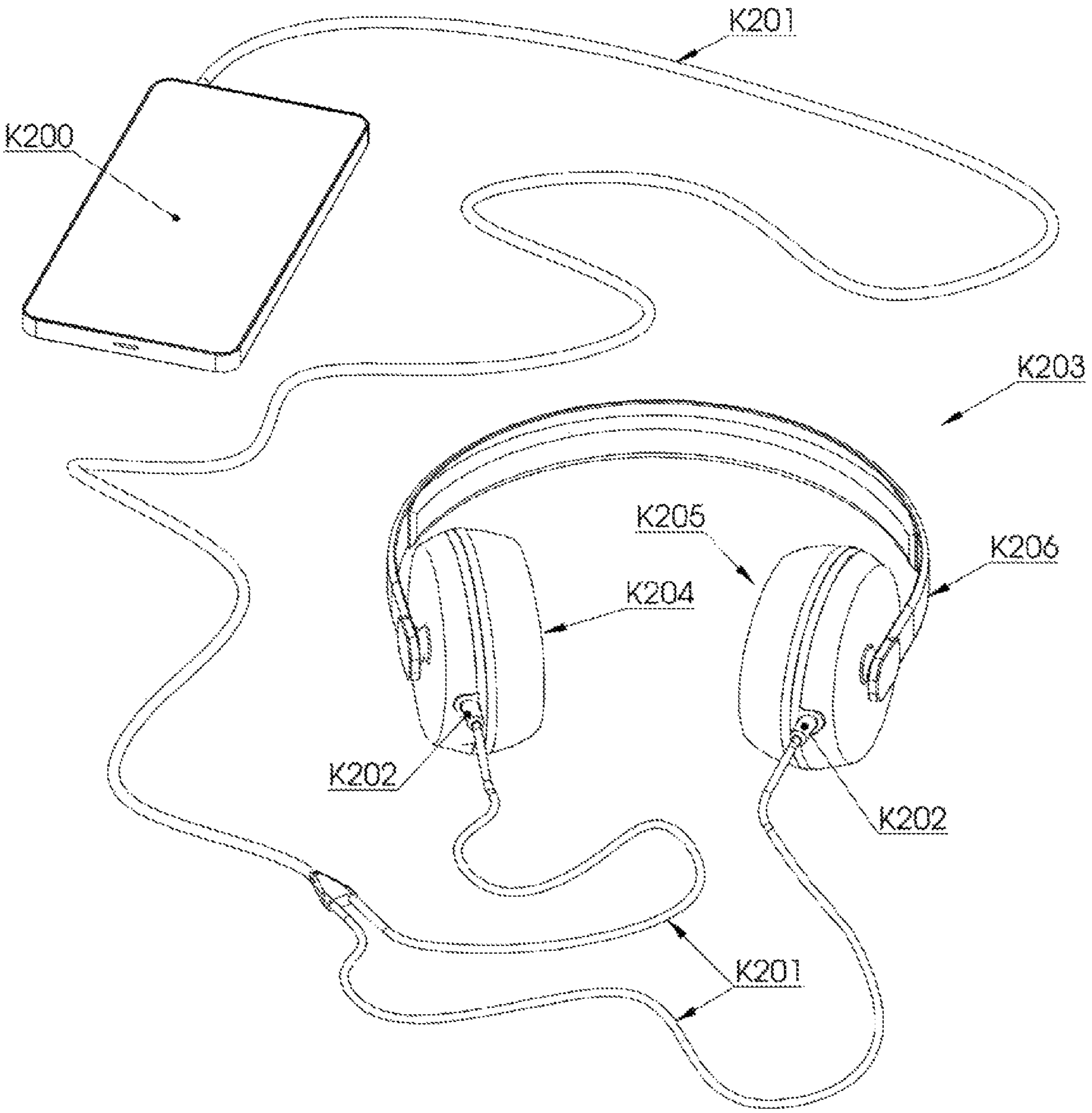
Figure 58A:
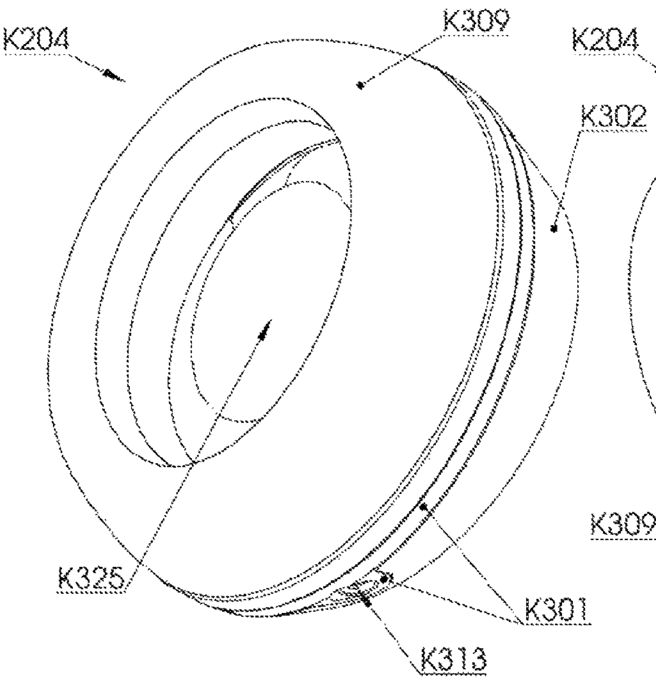
Figure 58B:
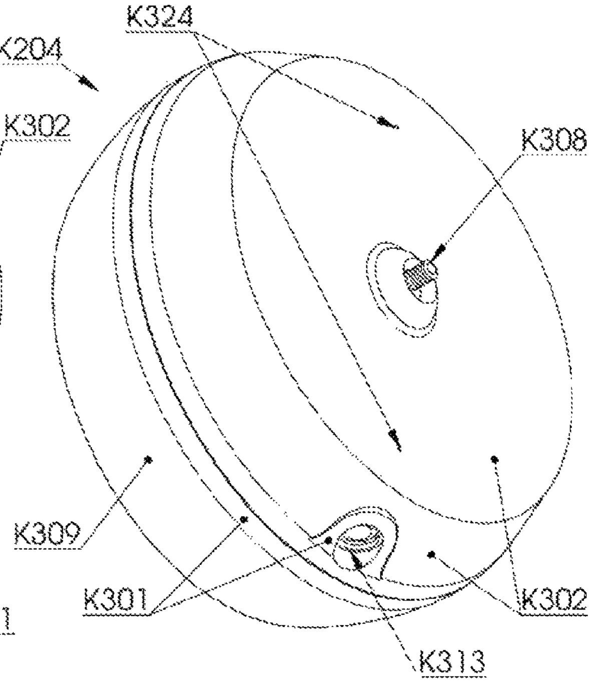
Figure 58C:
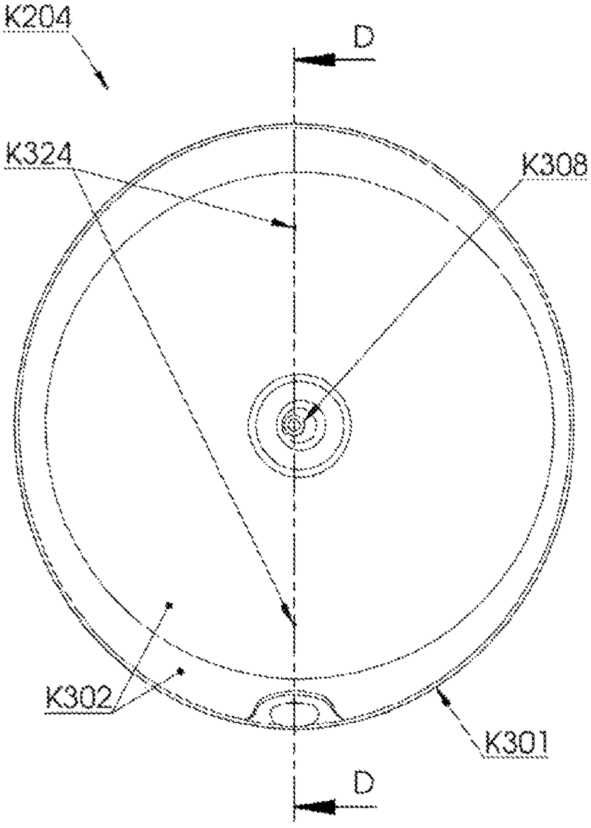
Figure 58D:
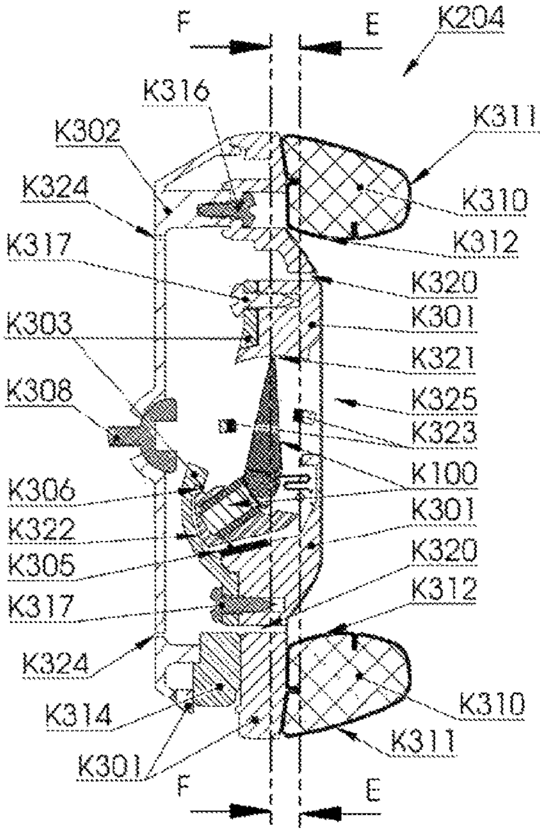
Figure 58E:
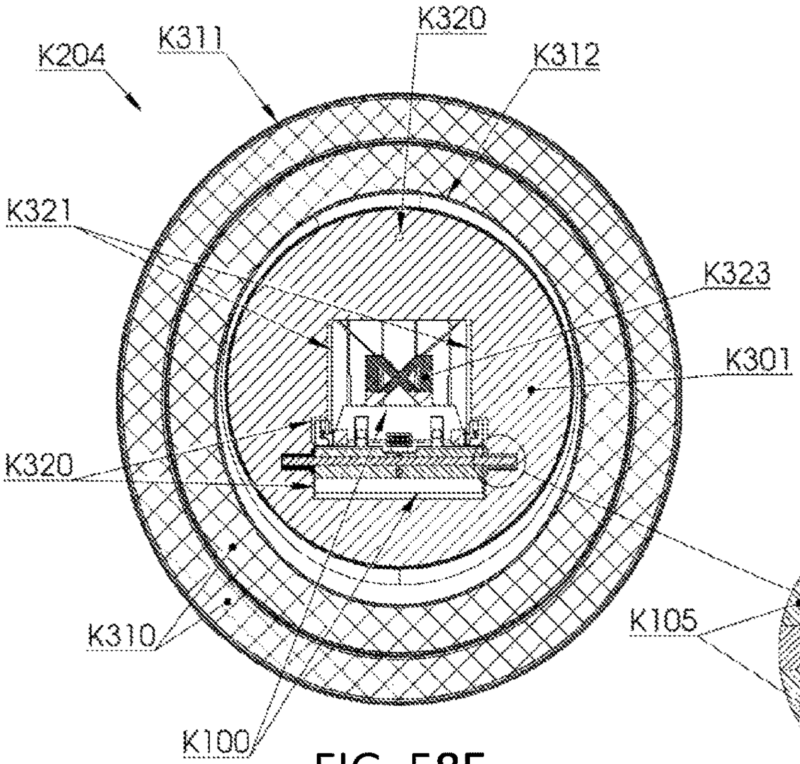
Figure 58F:
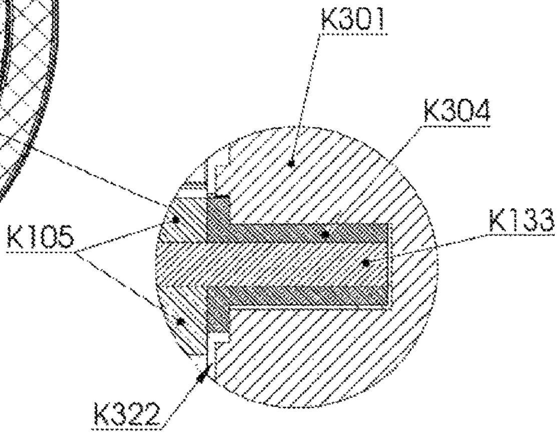
Figure 58G:
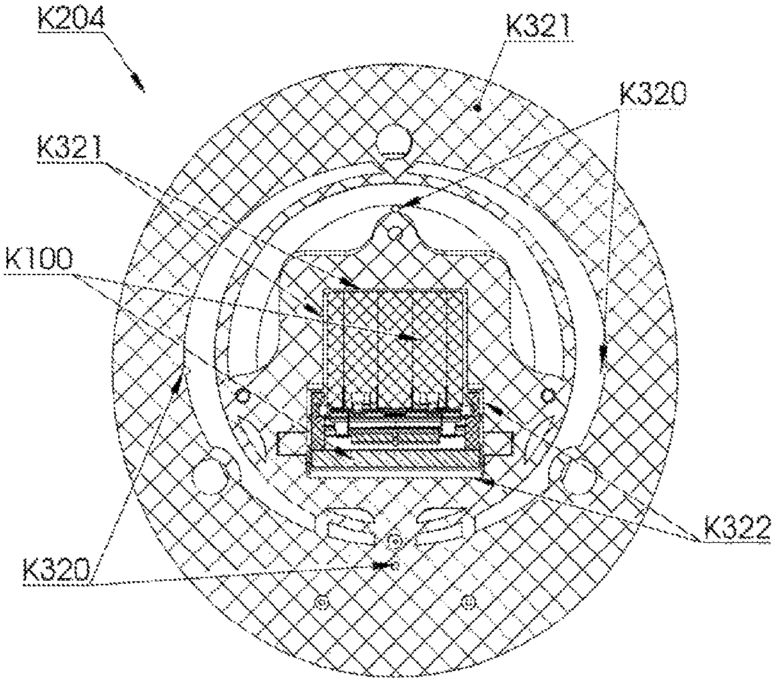
Figure 58H:
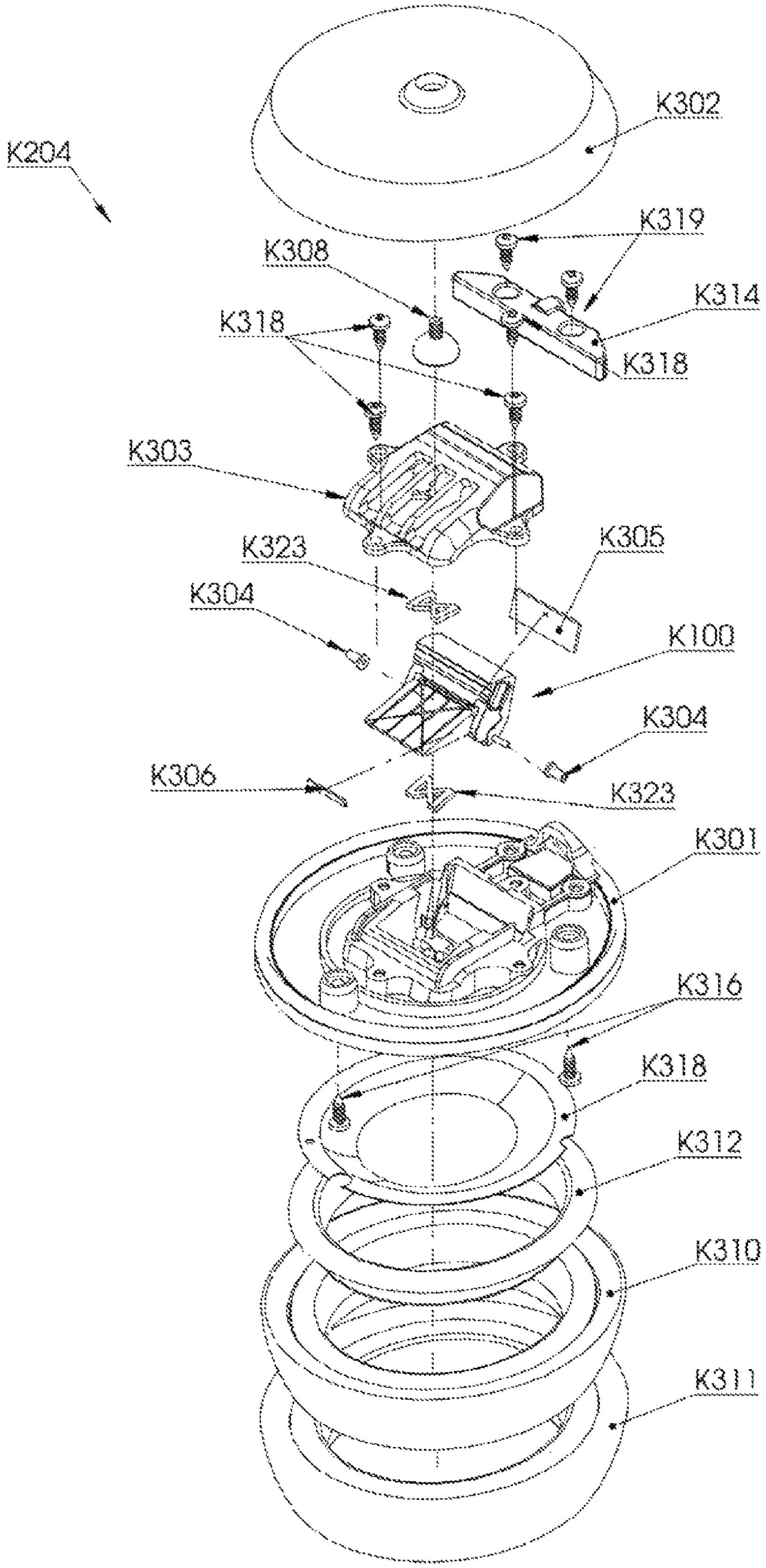
Figure 59:
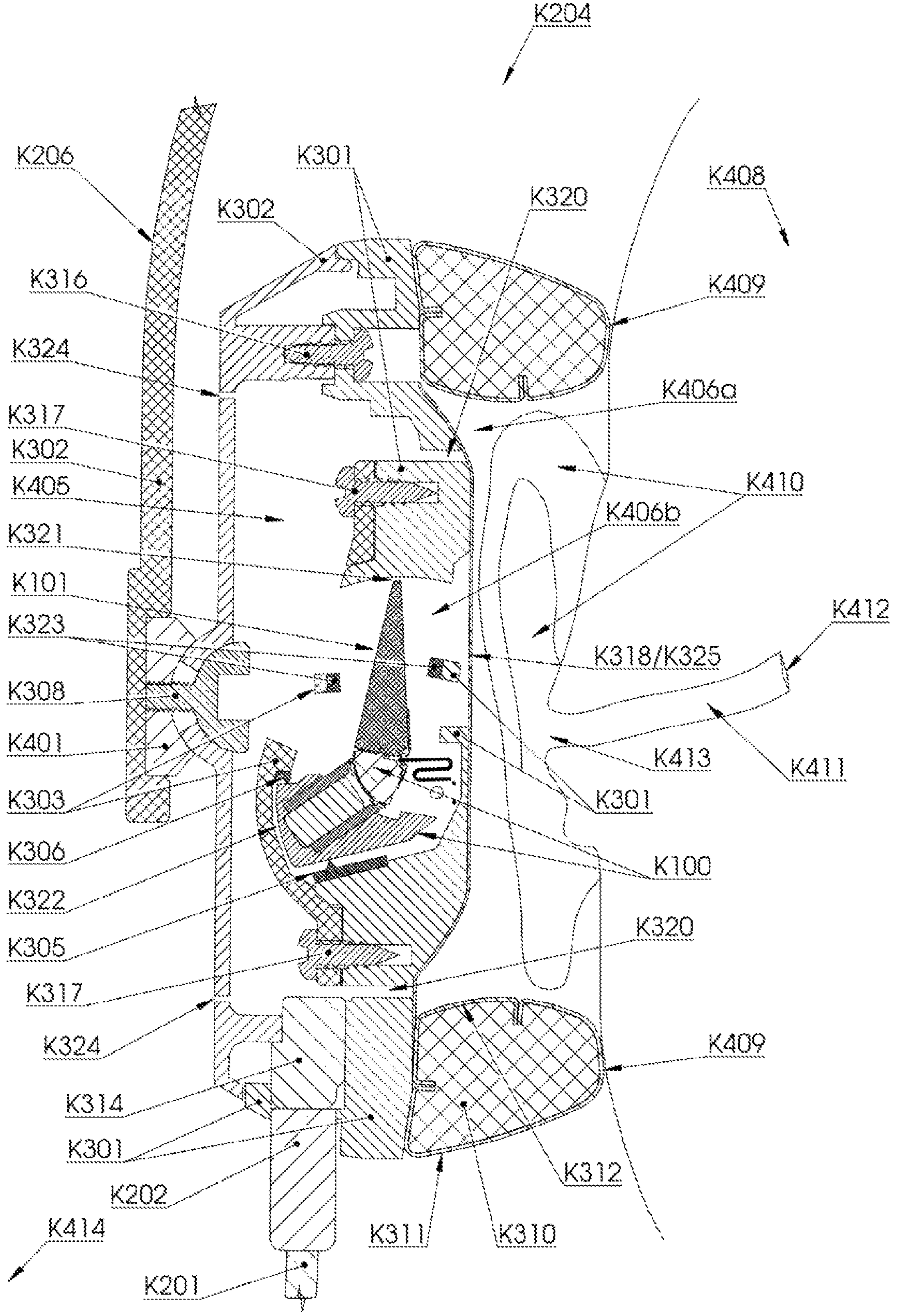
Figure 60A:
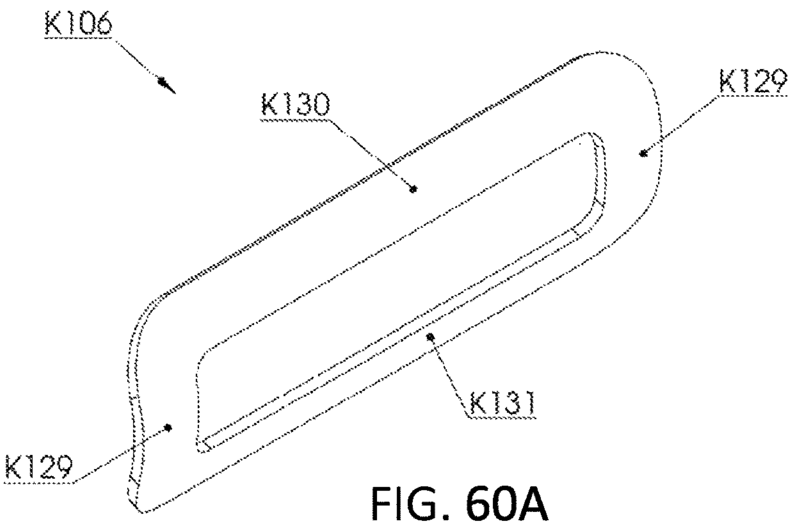
Figure 60B:
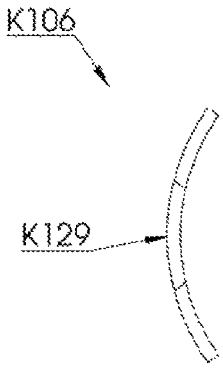
Figure 60C:
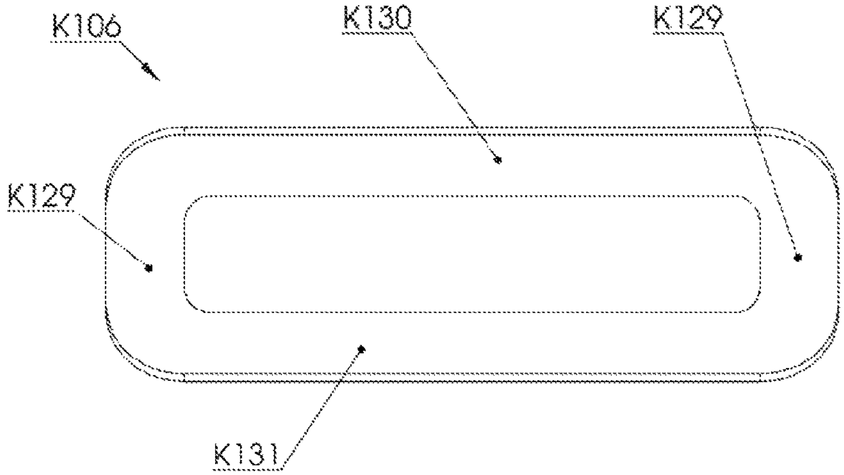
Figure 60D:
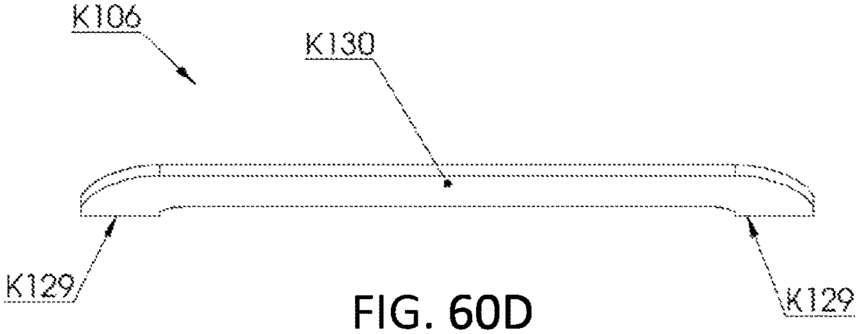
Figure 61A:
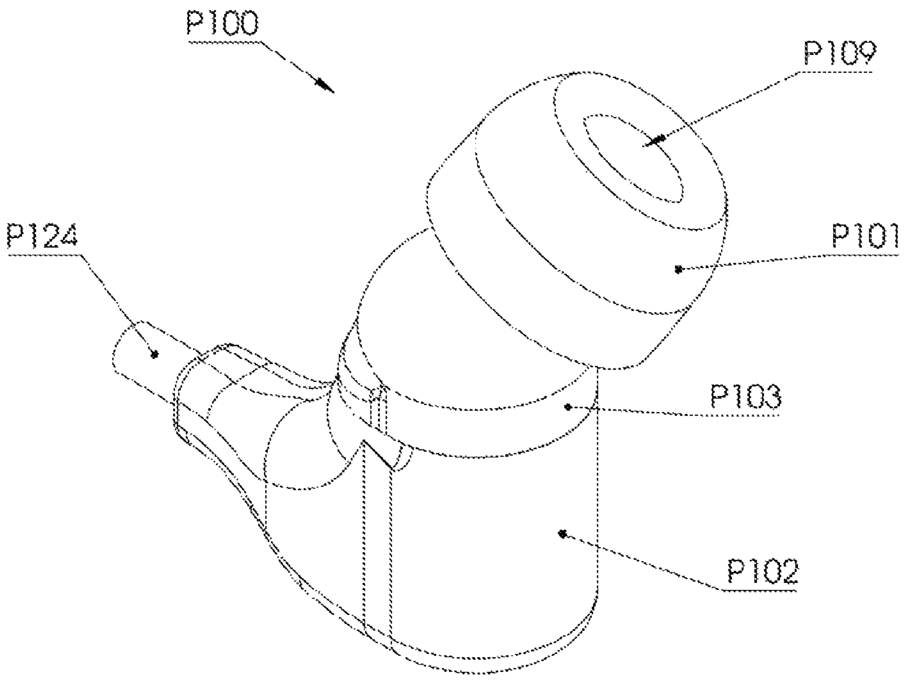
Figure 61B:
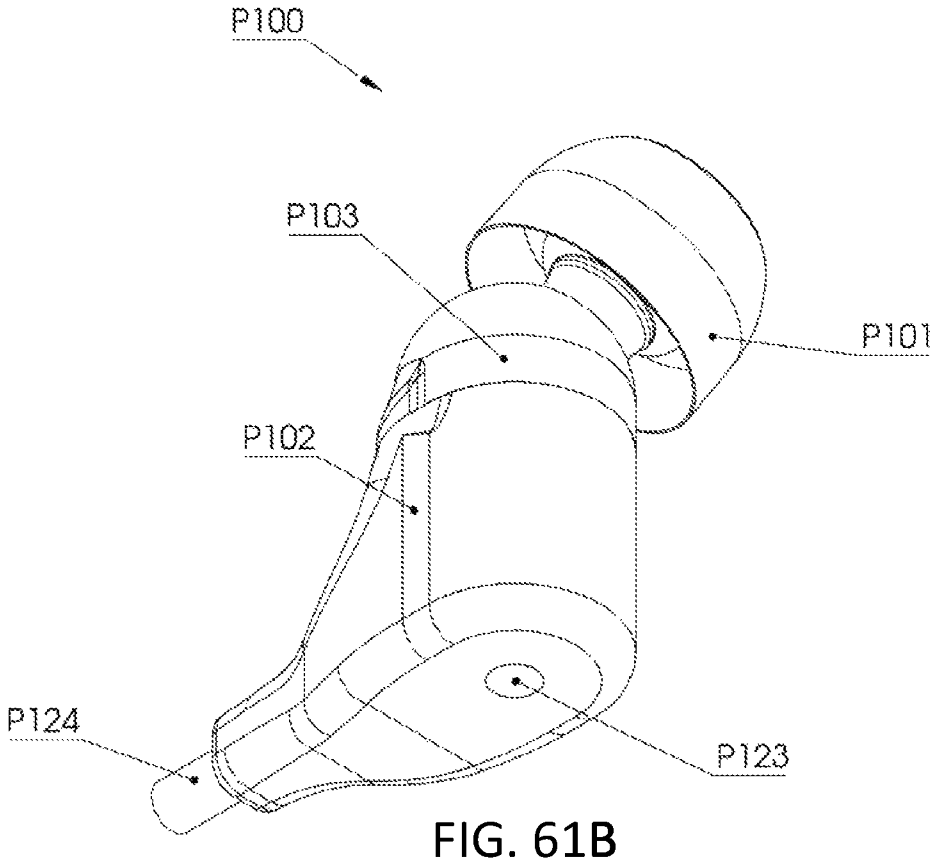
Figure 61C:
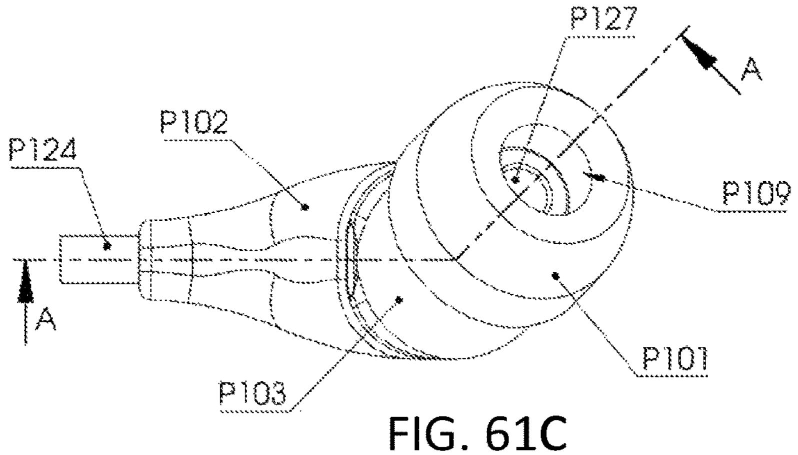
Figure 61D:
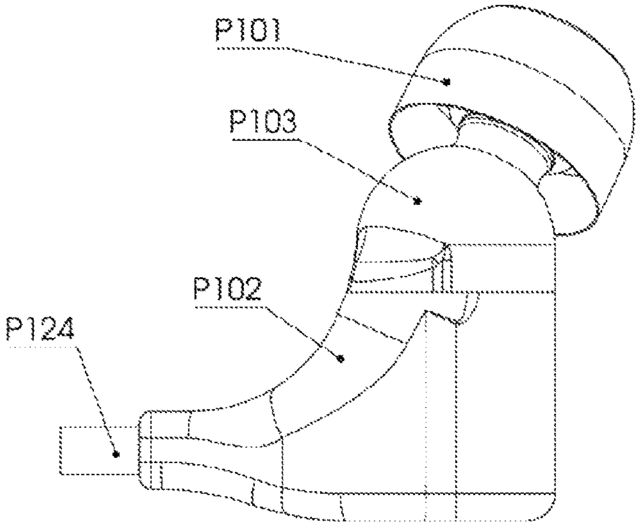
Figure 61E:
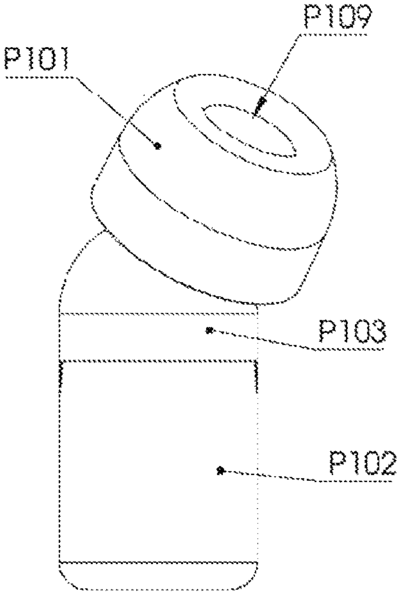
Figure 61F:
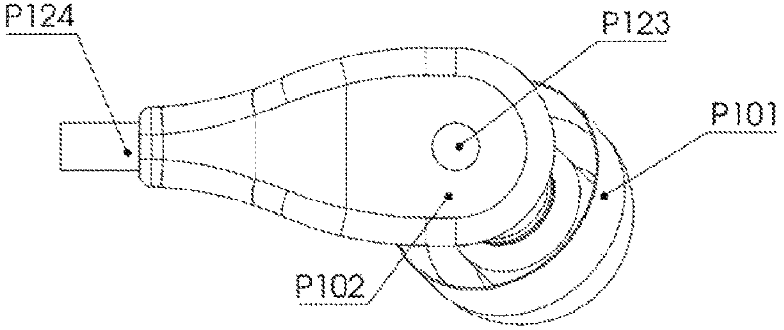
Figure 61G:
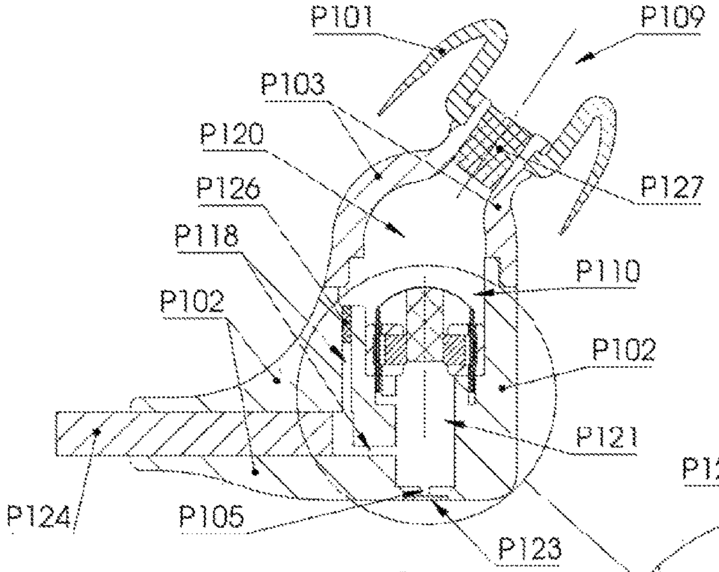
Figure 61H:
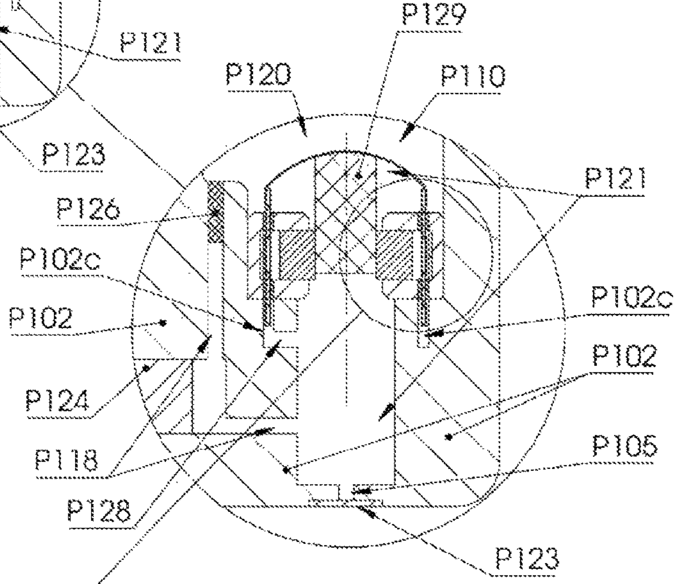
Figure 61I:
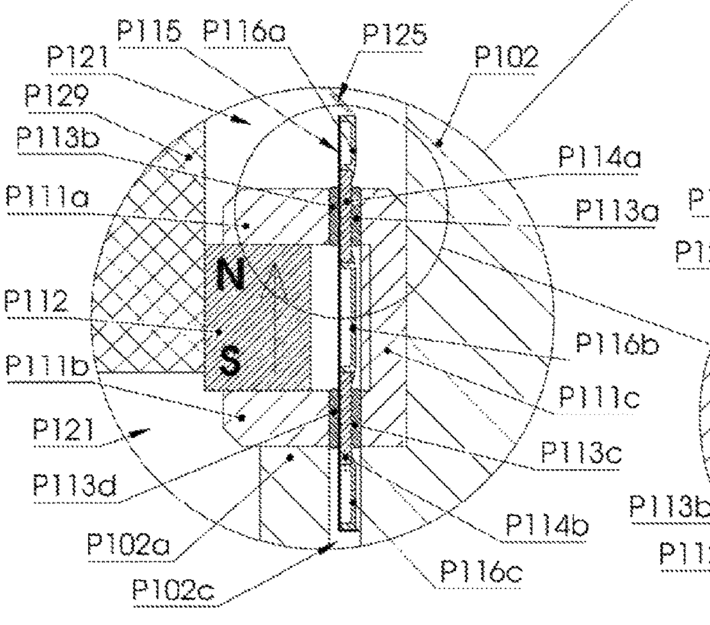
Figure 61J:
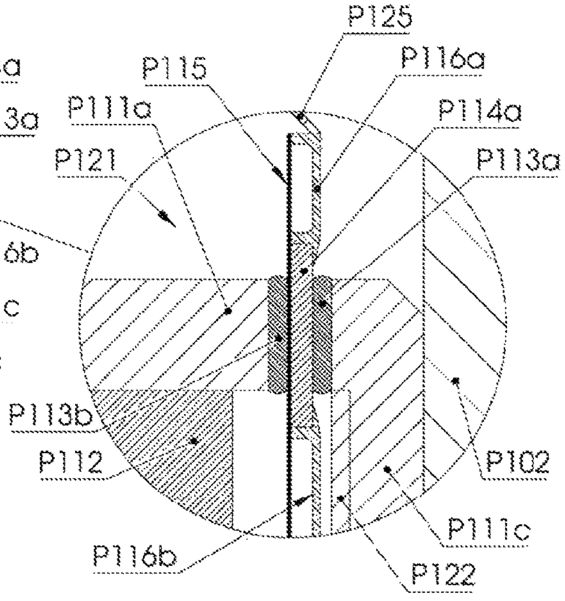
Figure 61K:
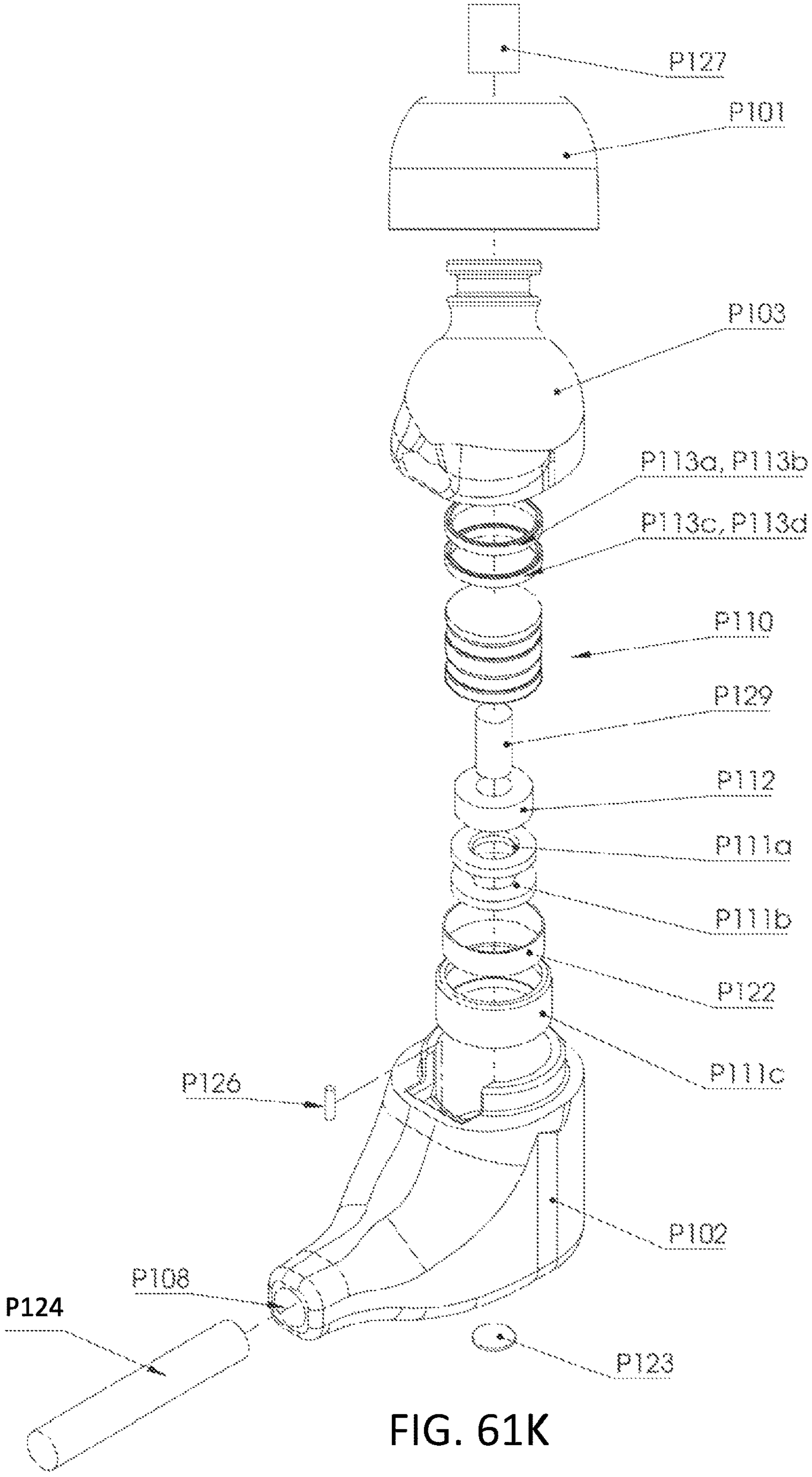
Figure 62A:
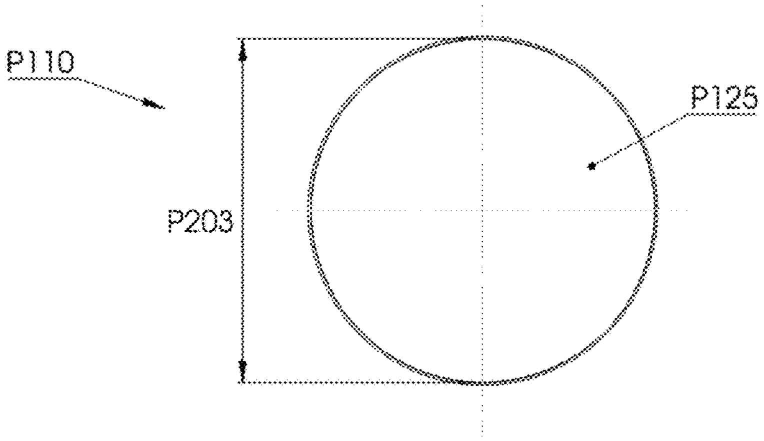
Figure 62B:
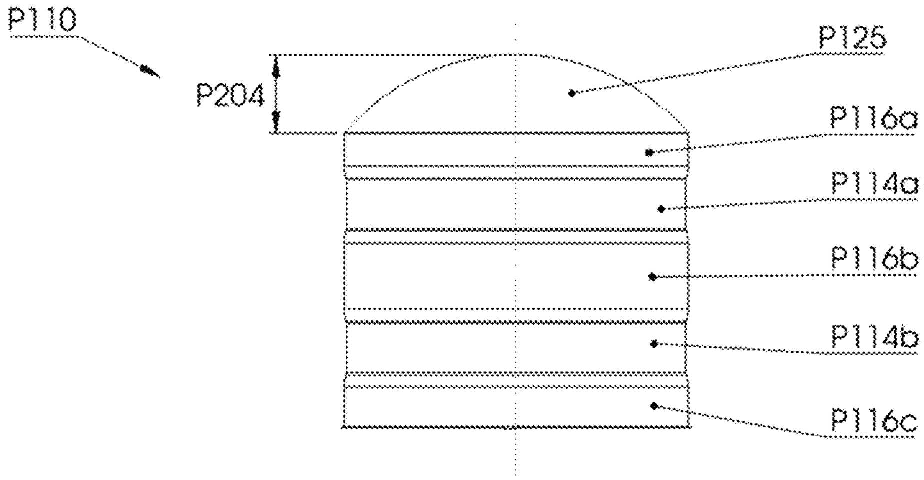
Figure 62C:
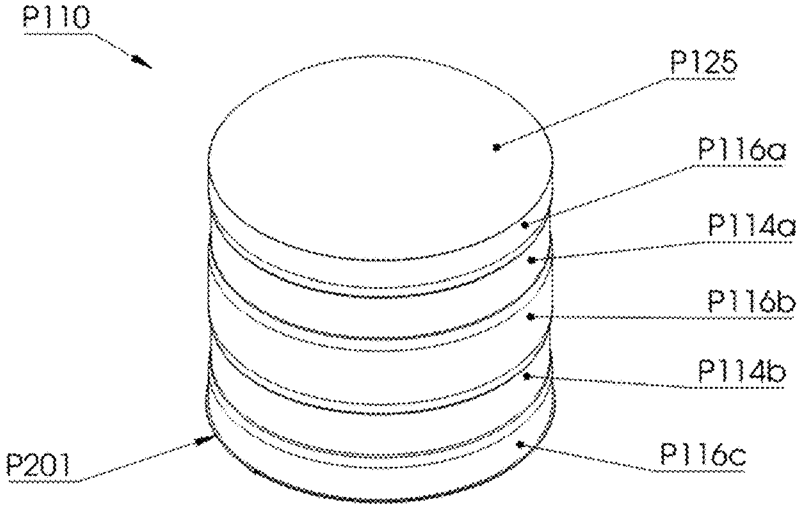
Figure 62D:
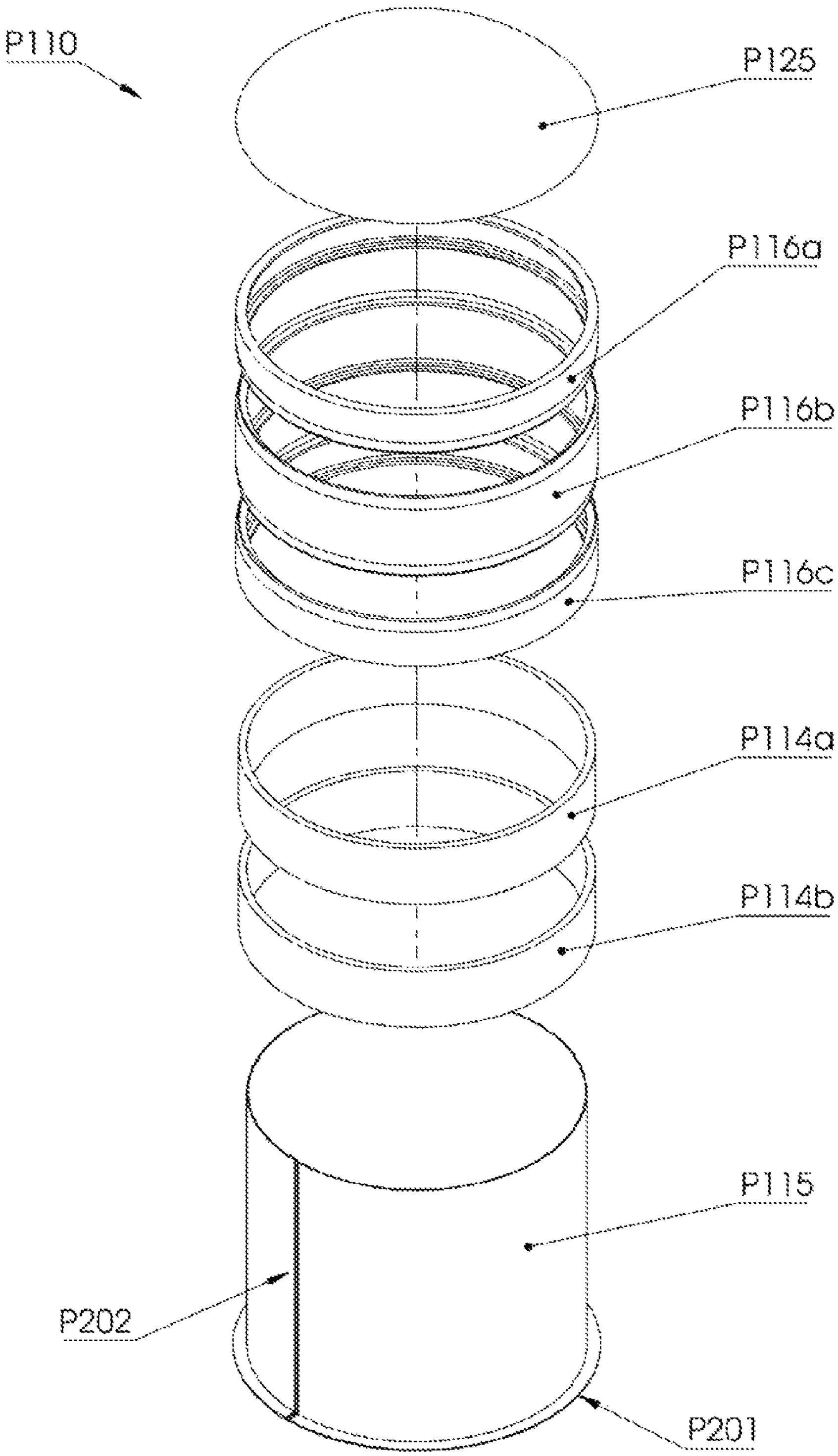
Figure 63:
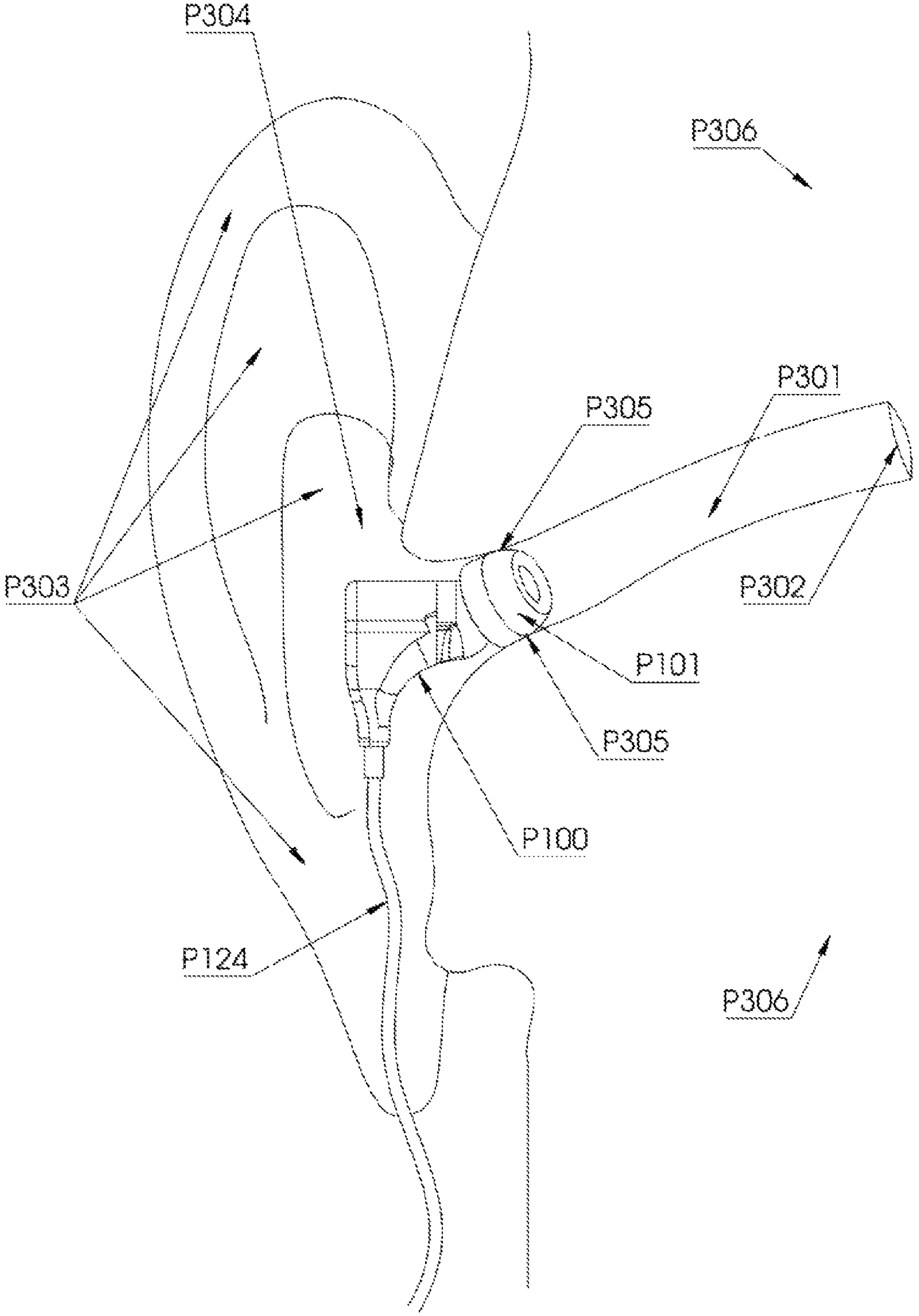
Figure 64A:
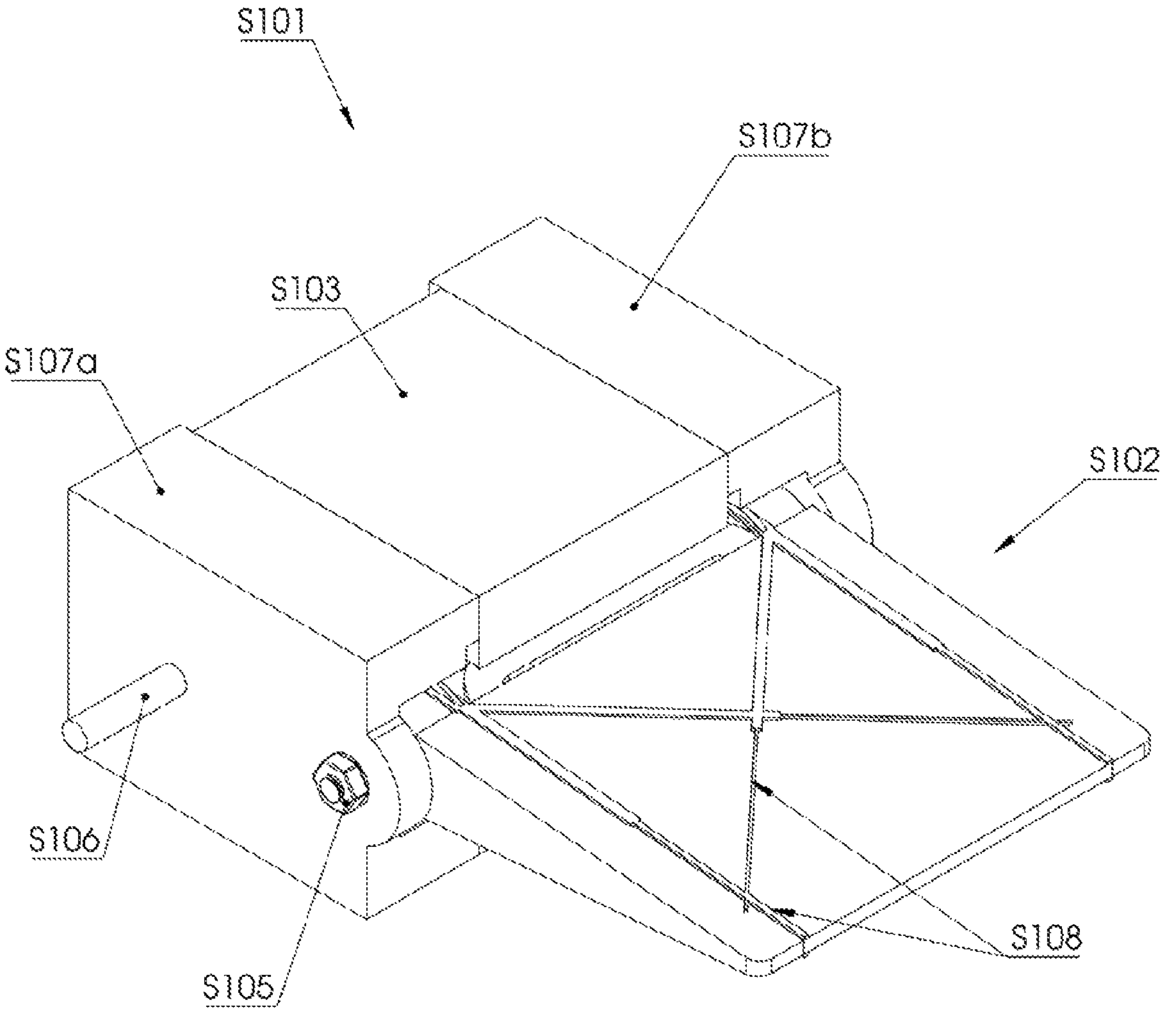
Figure 64B:
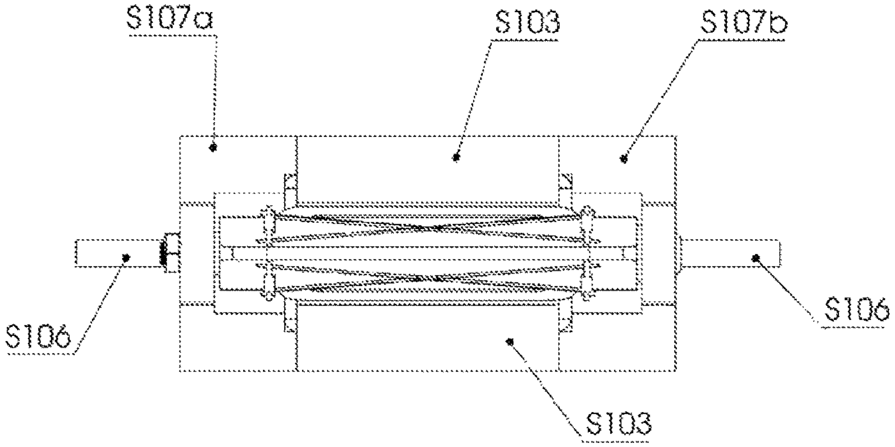
Figure 64C:
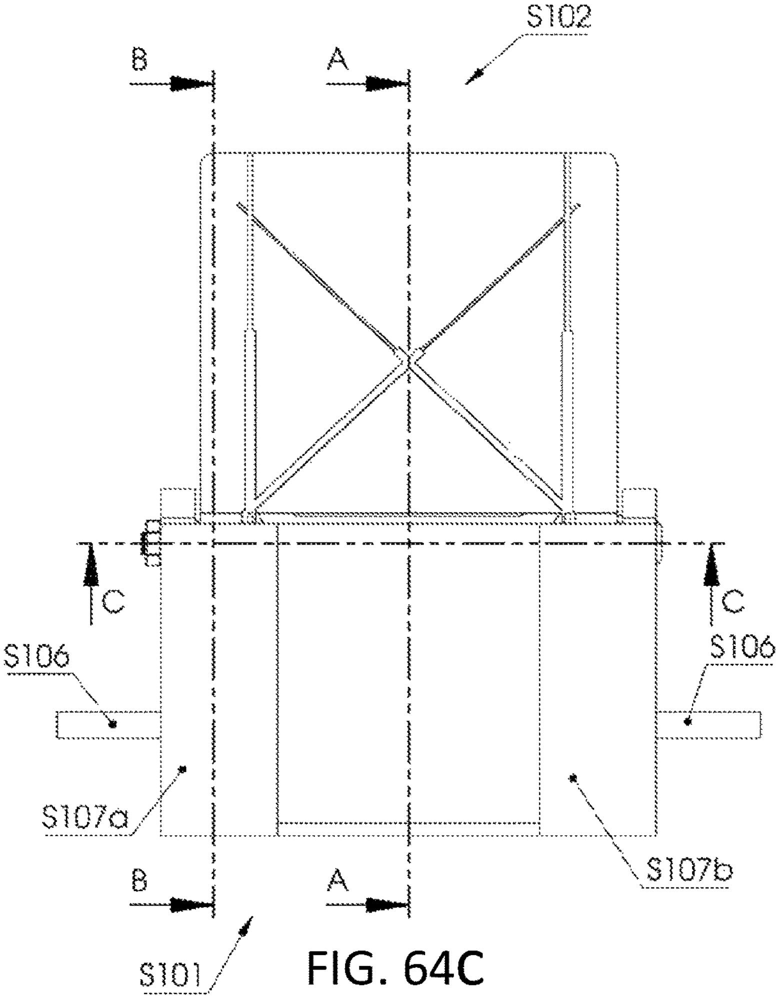
Figure 64D:
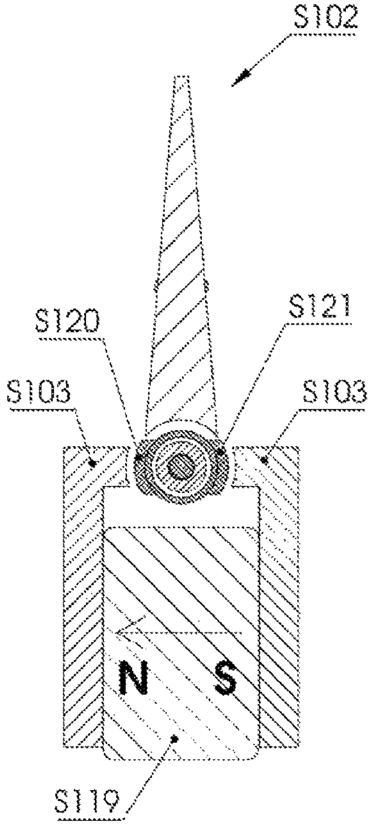
Figure 64E:
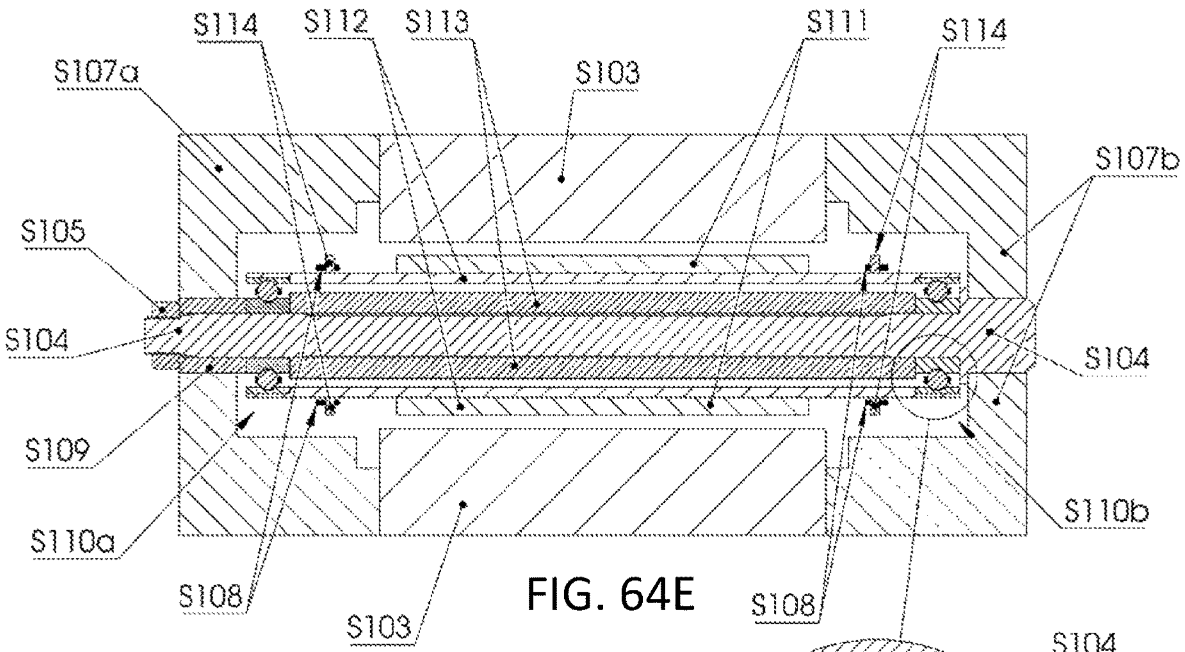
Figure 64F:
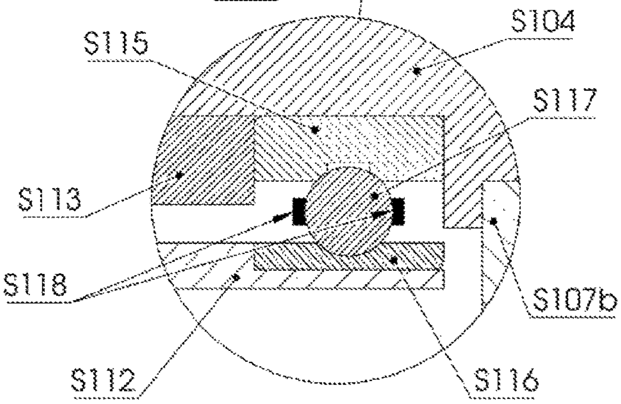
Figure 64G:
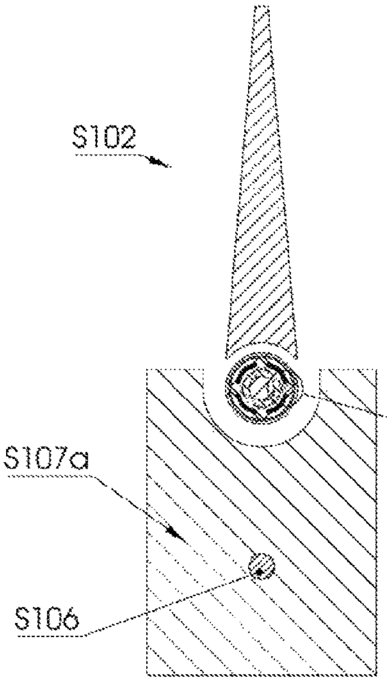
Figure 64H:
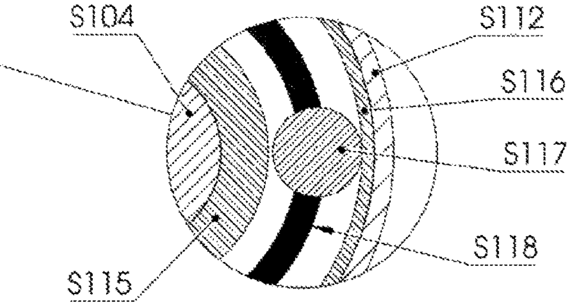
Figure 65A:
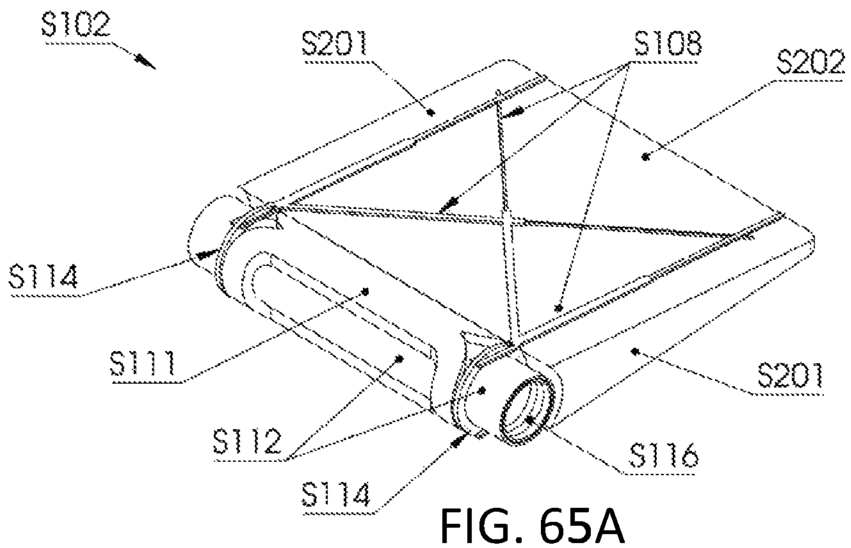
Figure 65B:
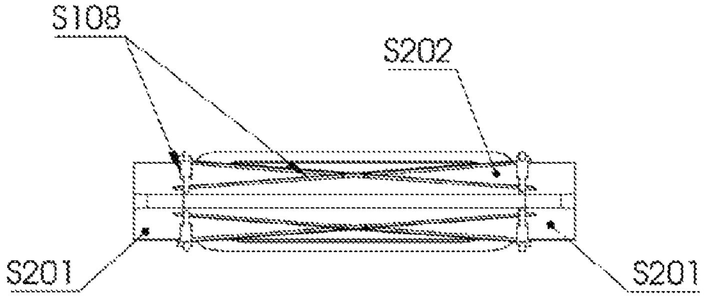
Figure 65C:
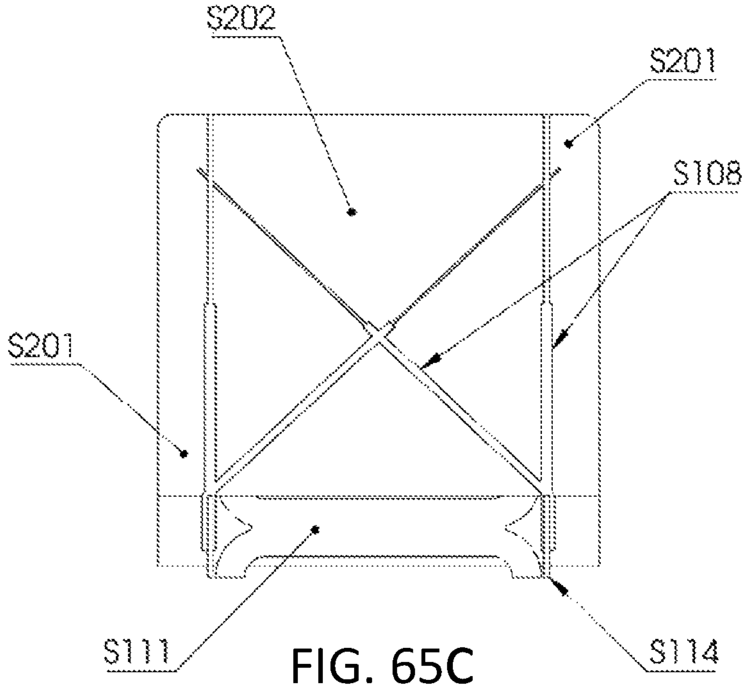
Figure 65D:
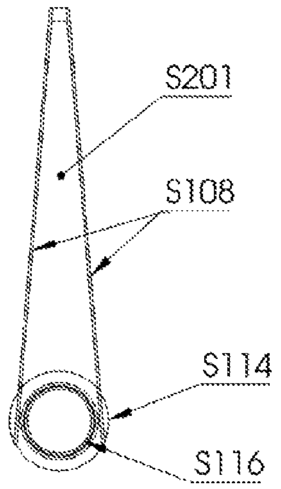
Figure 65E:
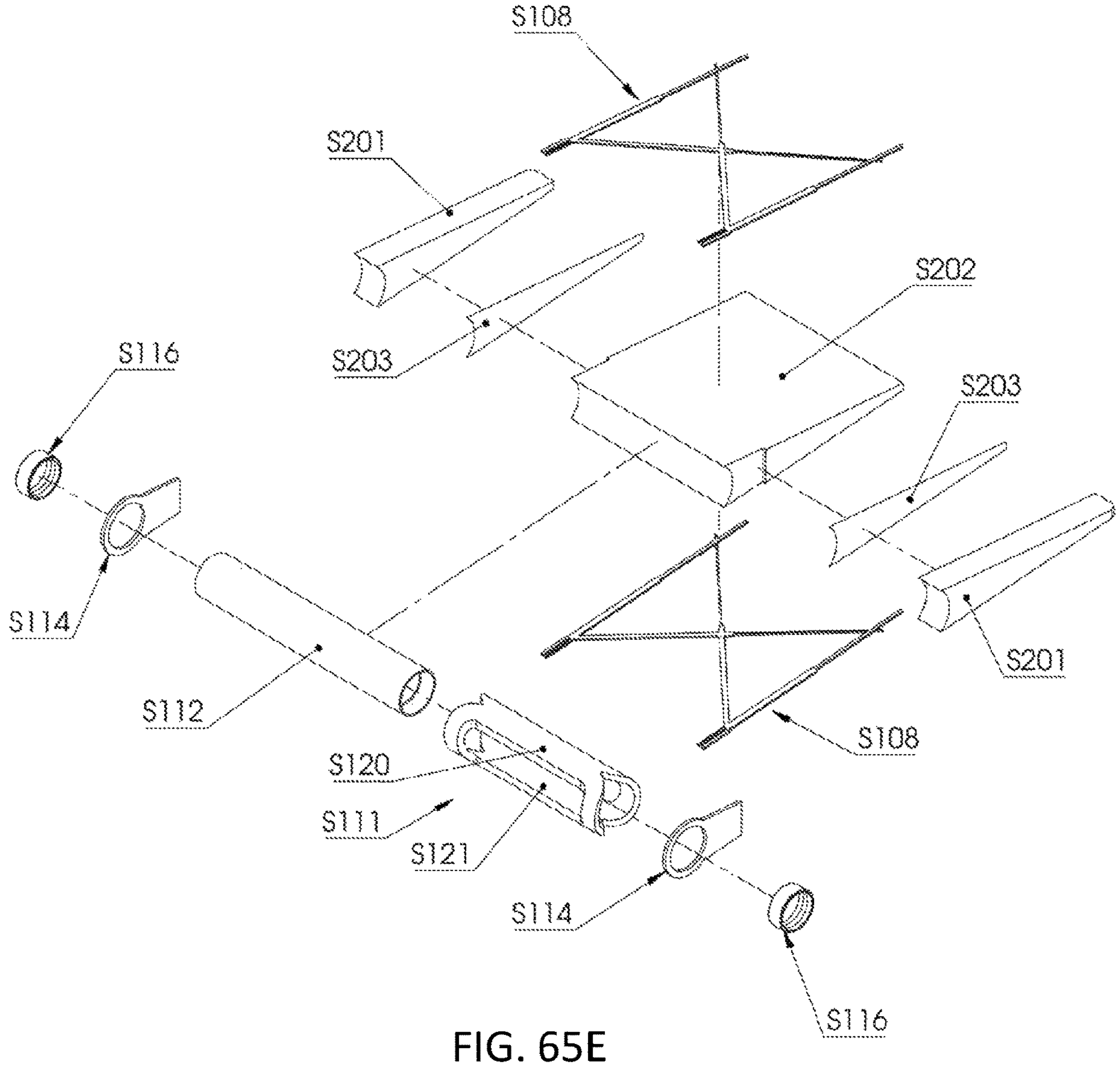
Figure 66A:
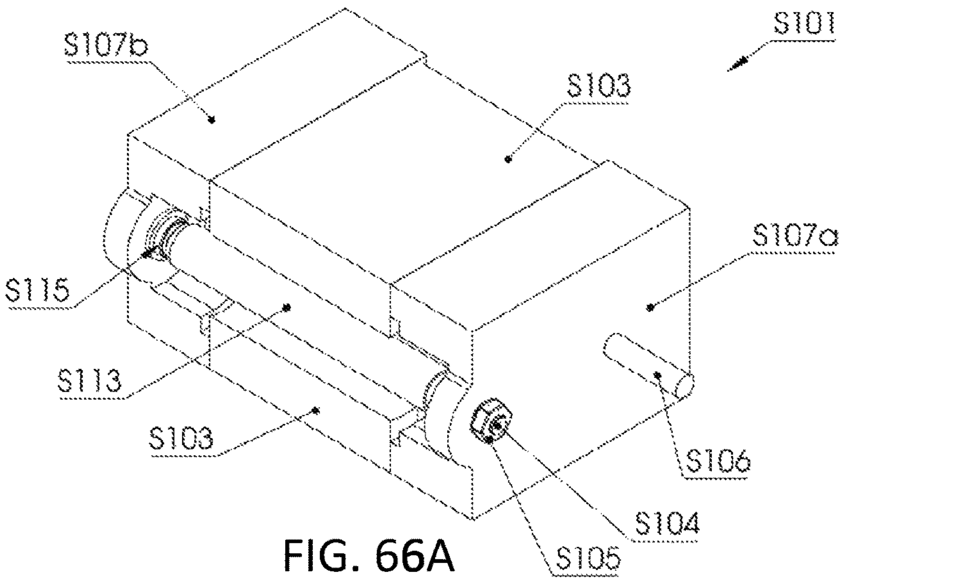
Figure 66B:
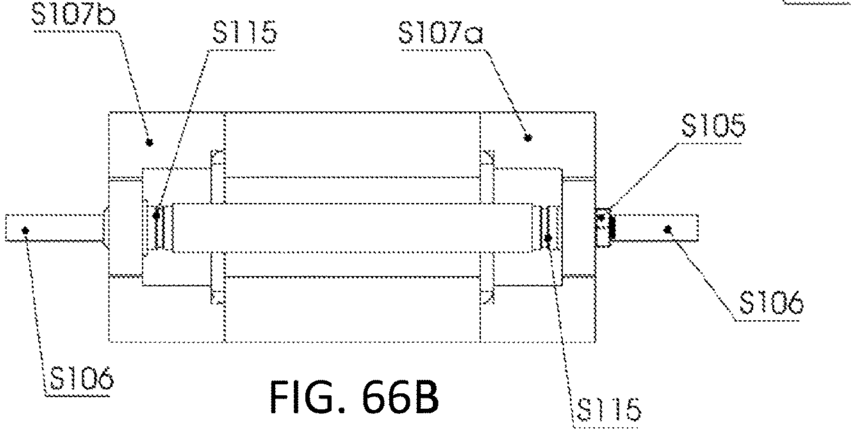
Figure 66C:
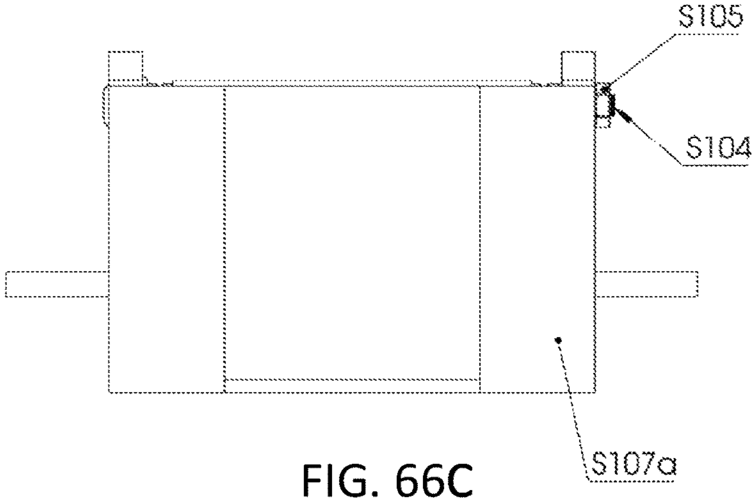
Figure 66D:
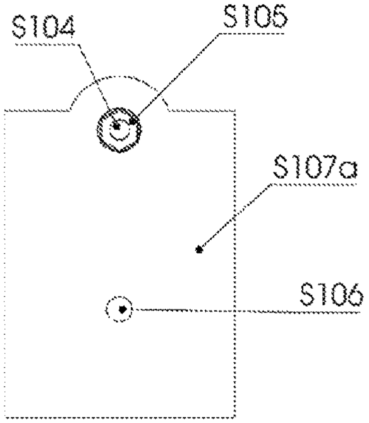
Figure 66E:
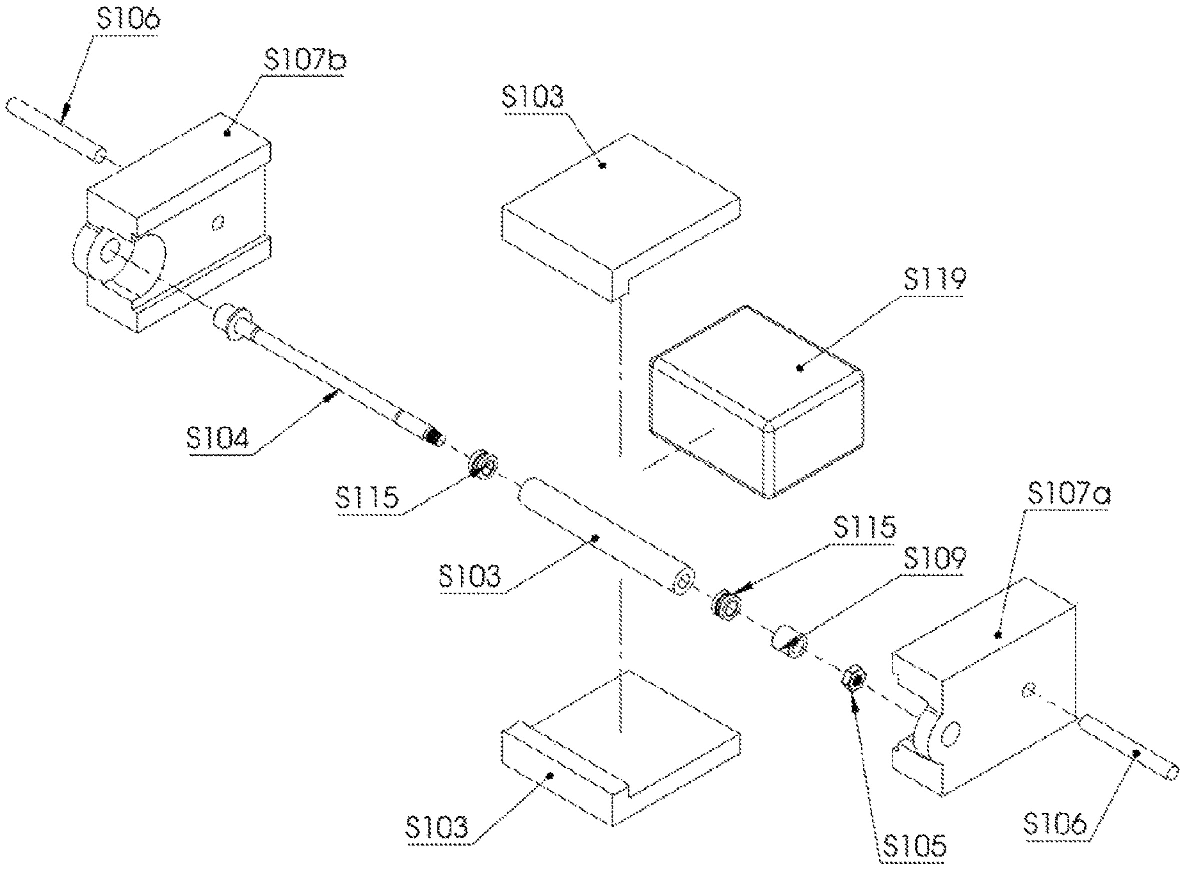
Figure 67A:
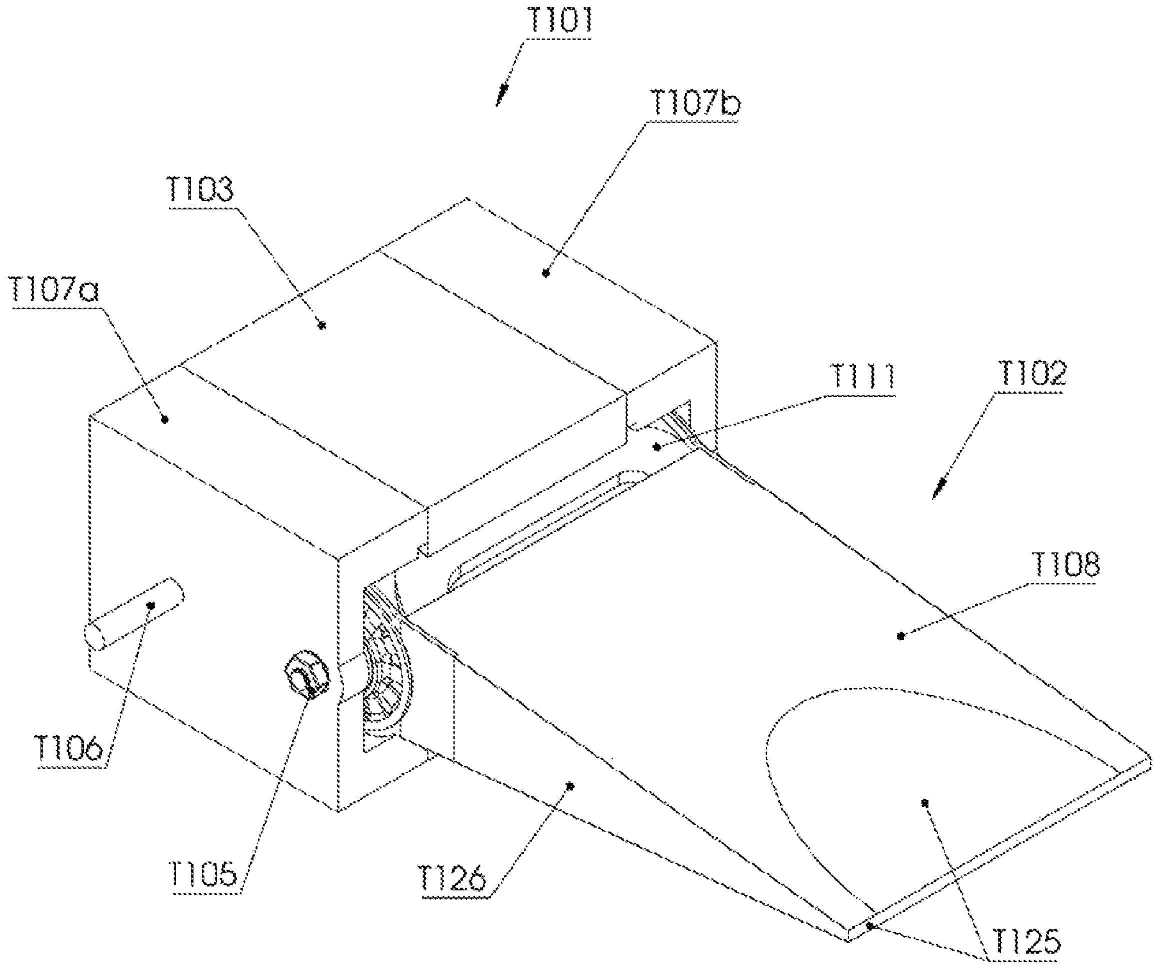
Figure 67B:
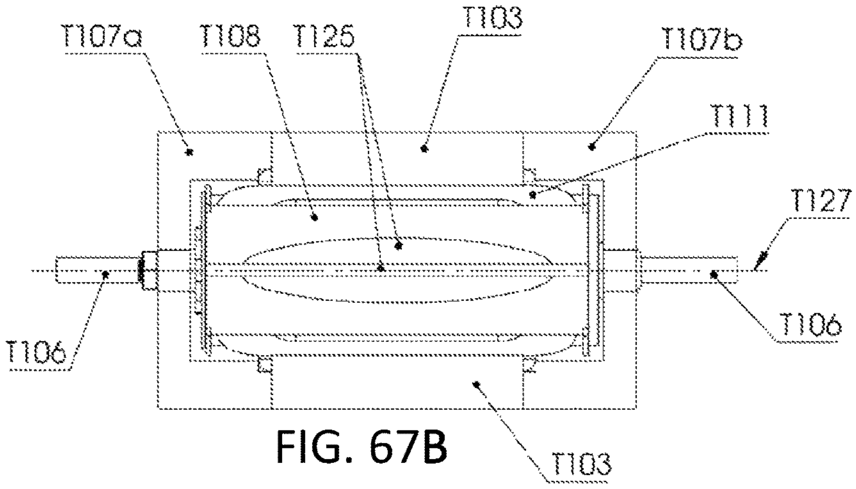
Figure 67C:
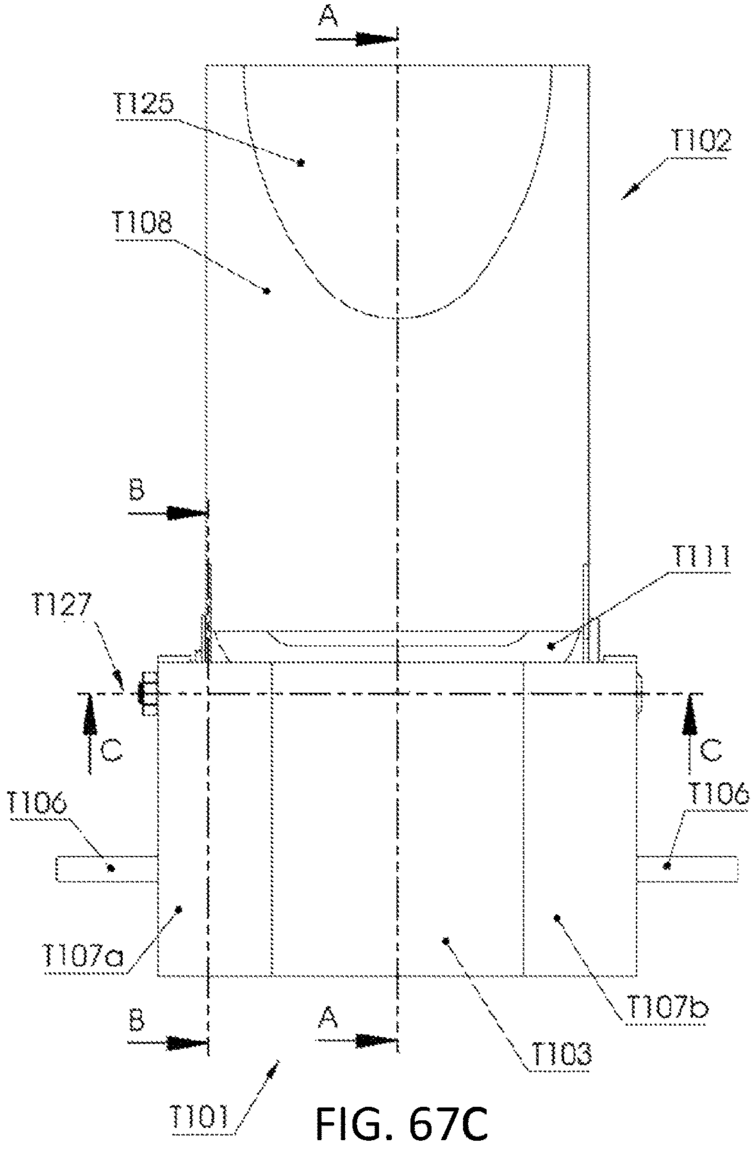
Figure 67D:
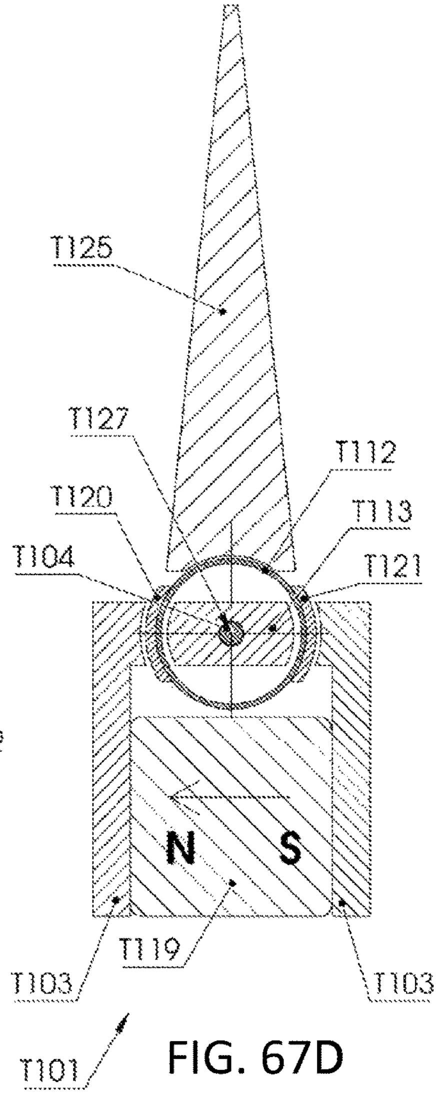
Figure 67E:
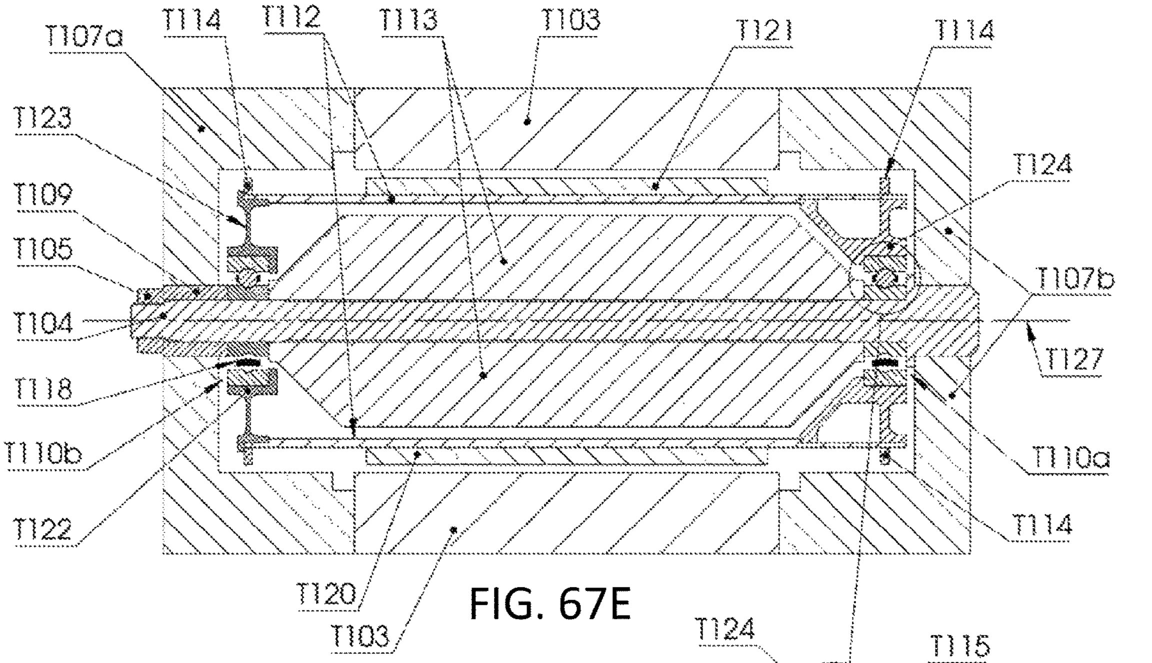
Figure 67G:
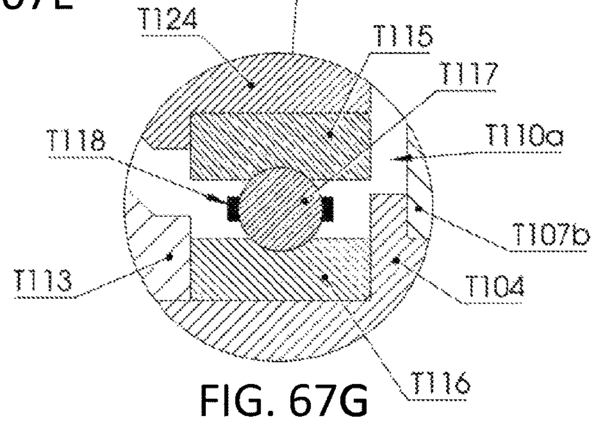
Figure 67F:
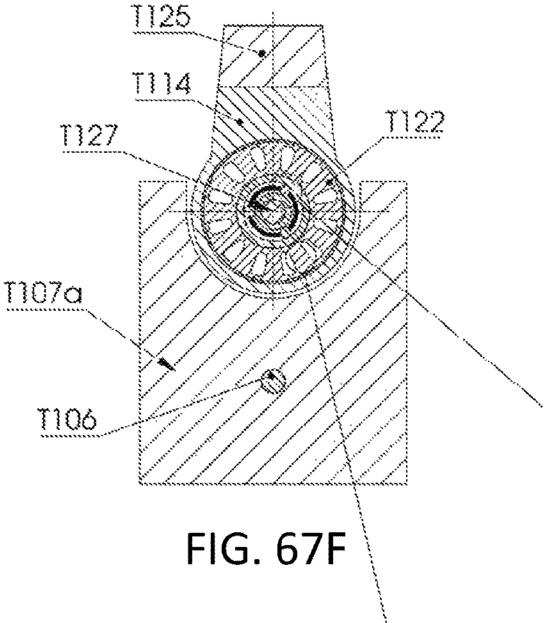
Figure 67I:
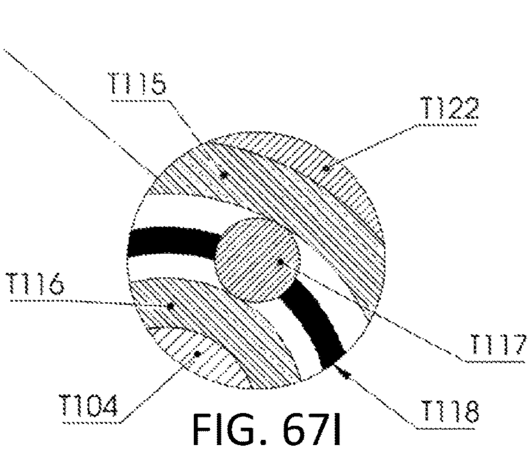
Figure 67H:
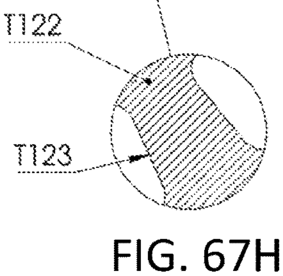
Figure 68A:
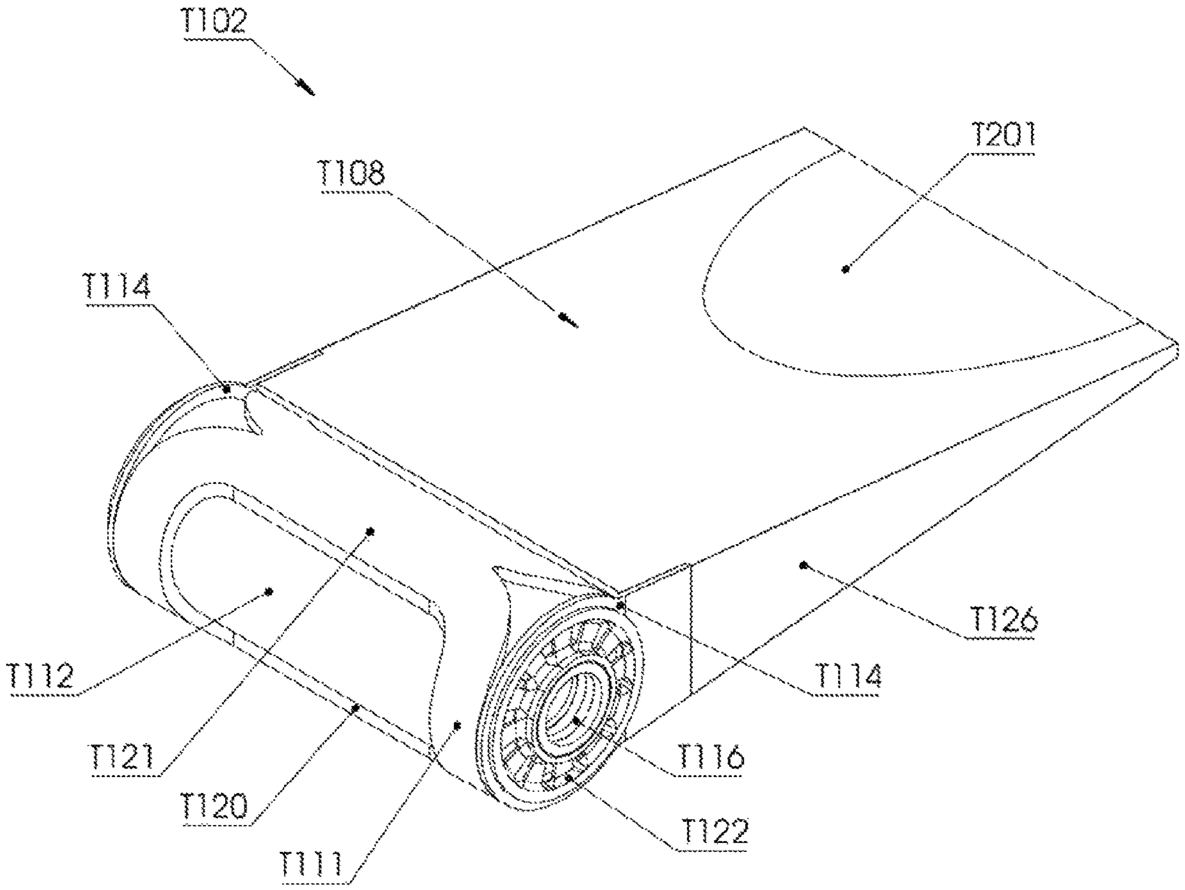
Figure 68B:
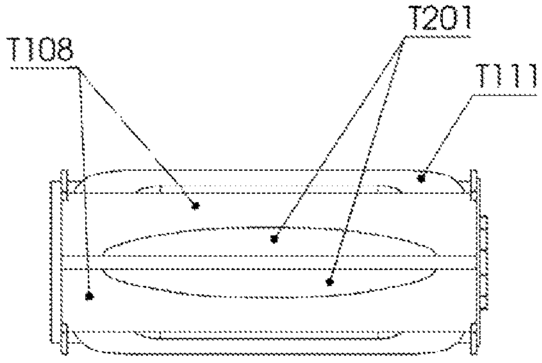
Figure 68C:
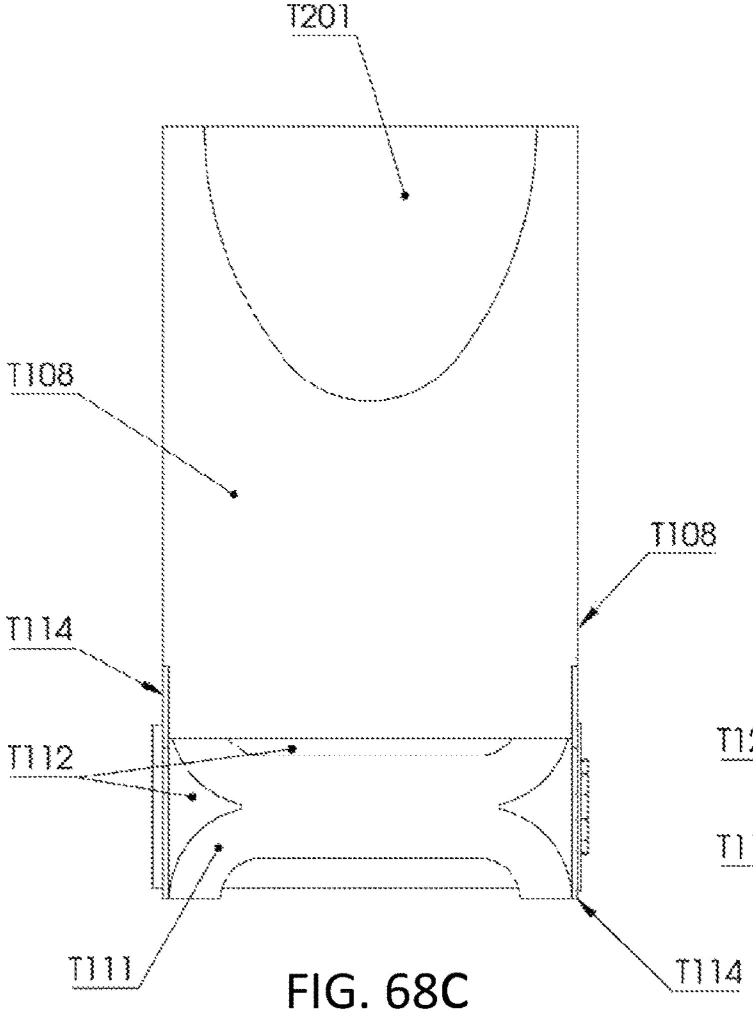
Figure 68D:
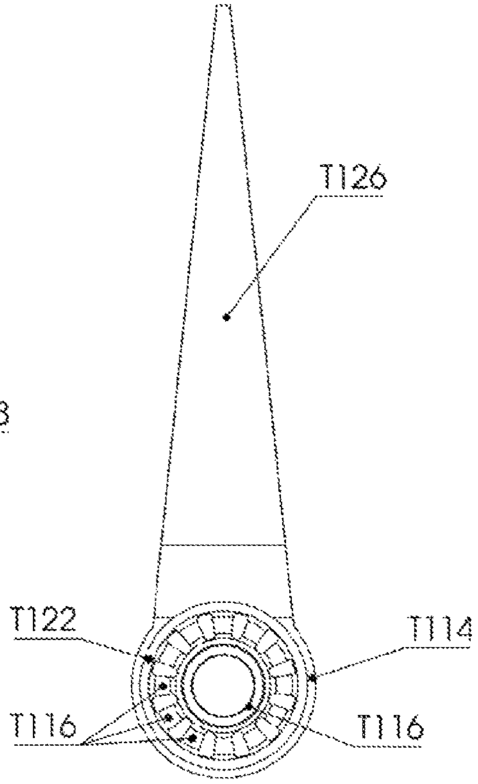
Figure 68E:
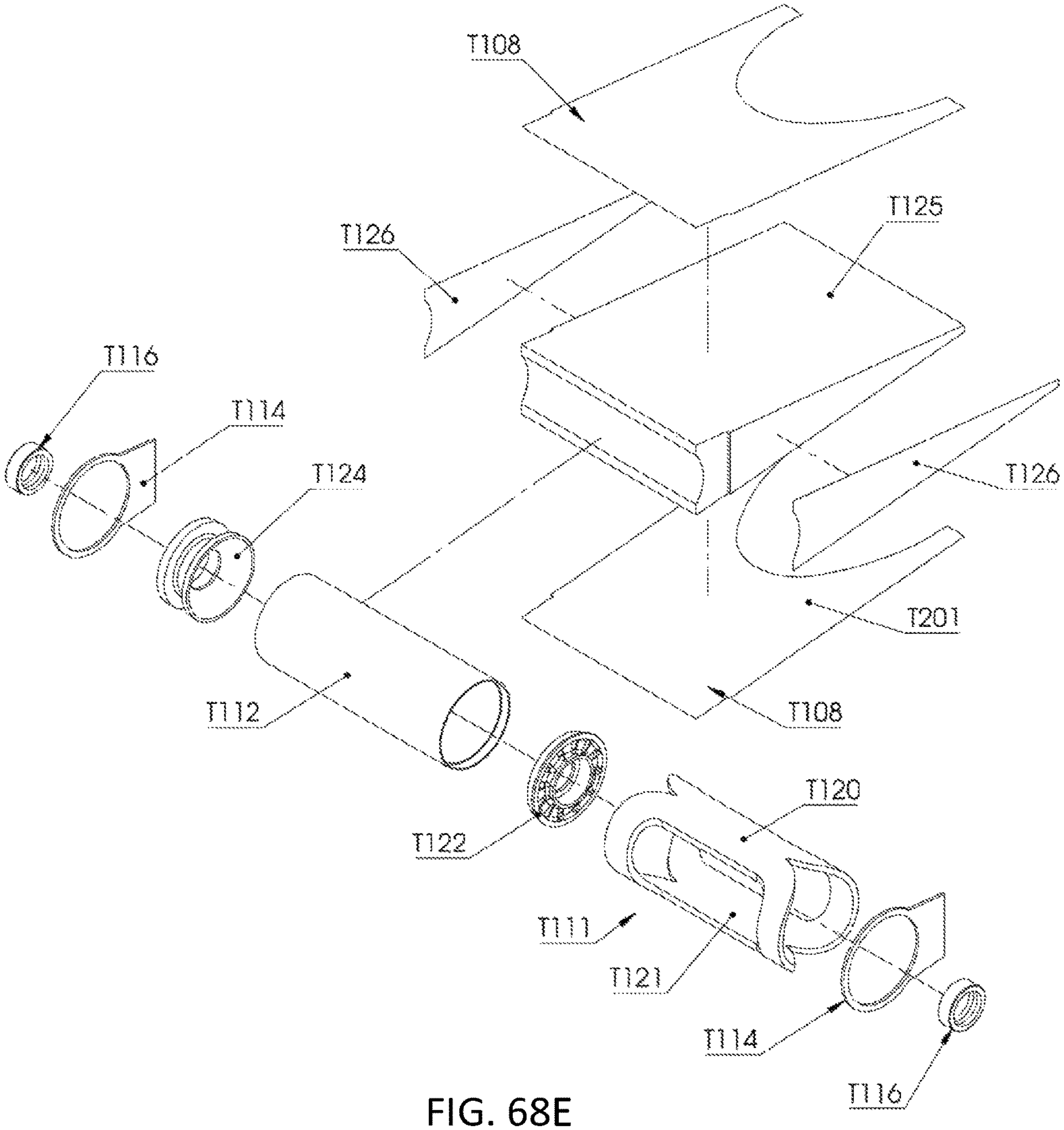
Figure 69A:
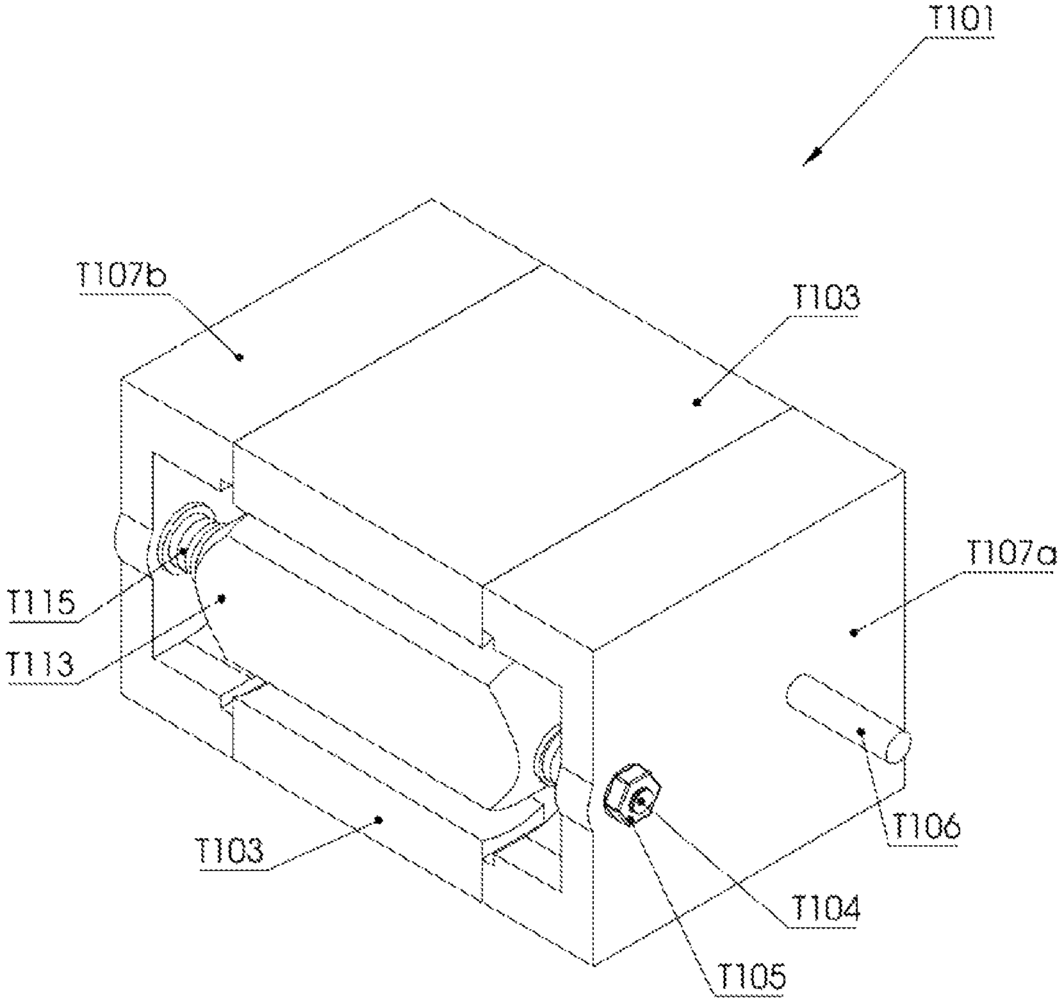
Figure 69B:
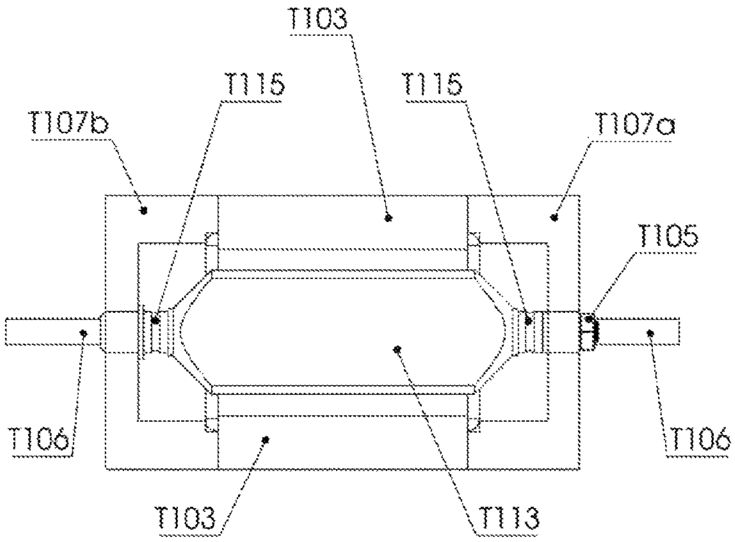
Figure 69C:
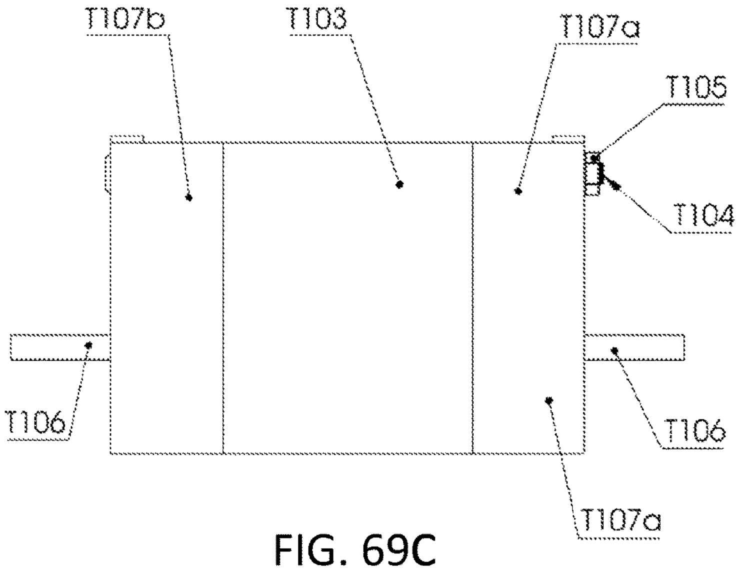
Figure 69D:
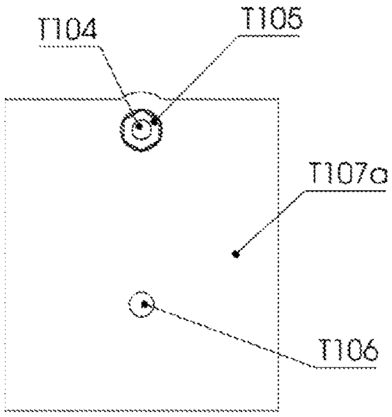
Figure 69E:
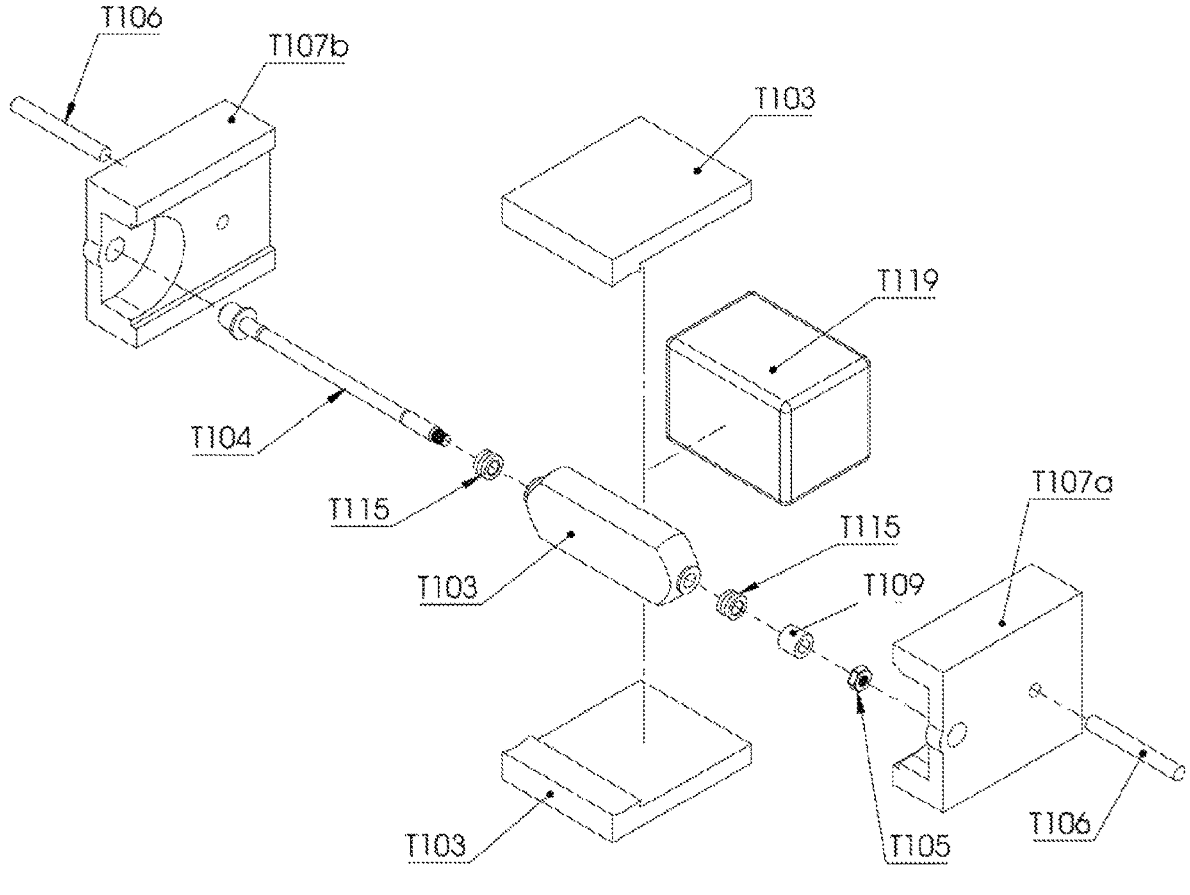
Figure 70A:
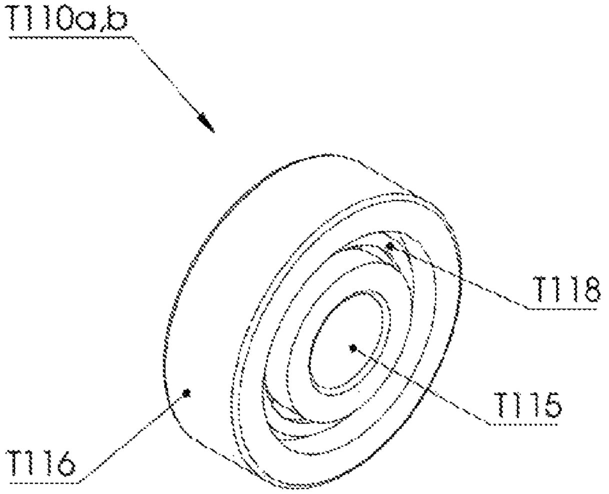
Figure 70B:
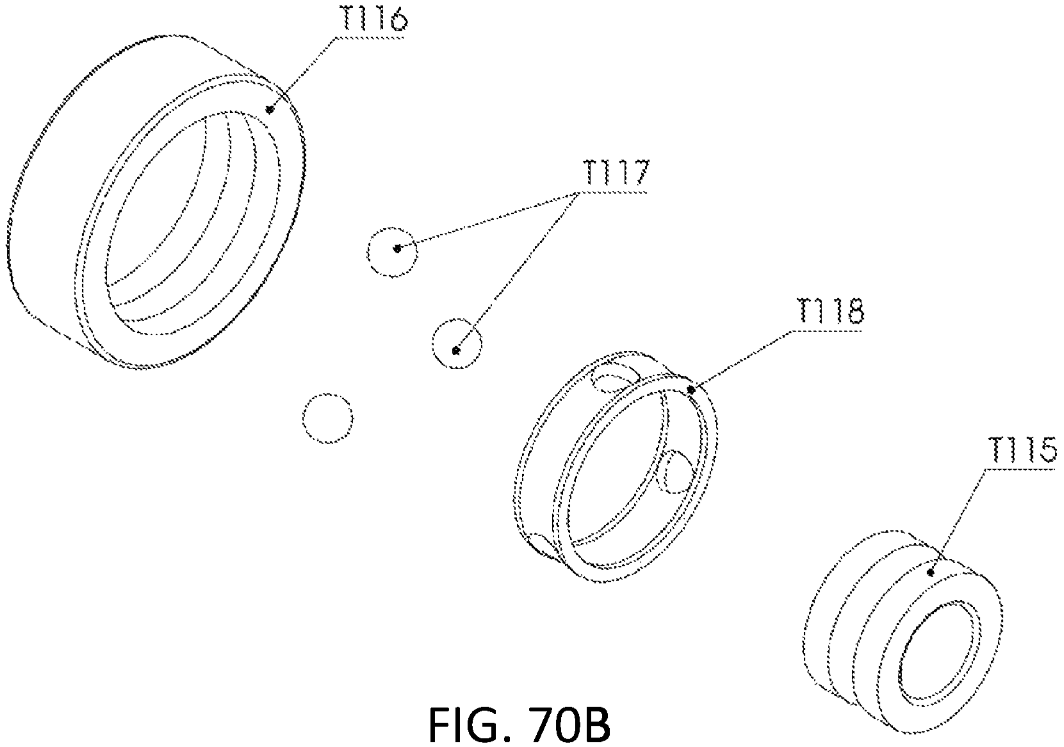
Figure 71A:
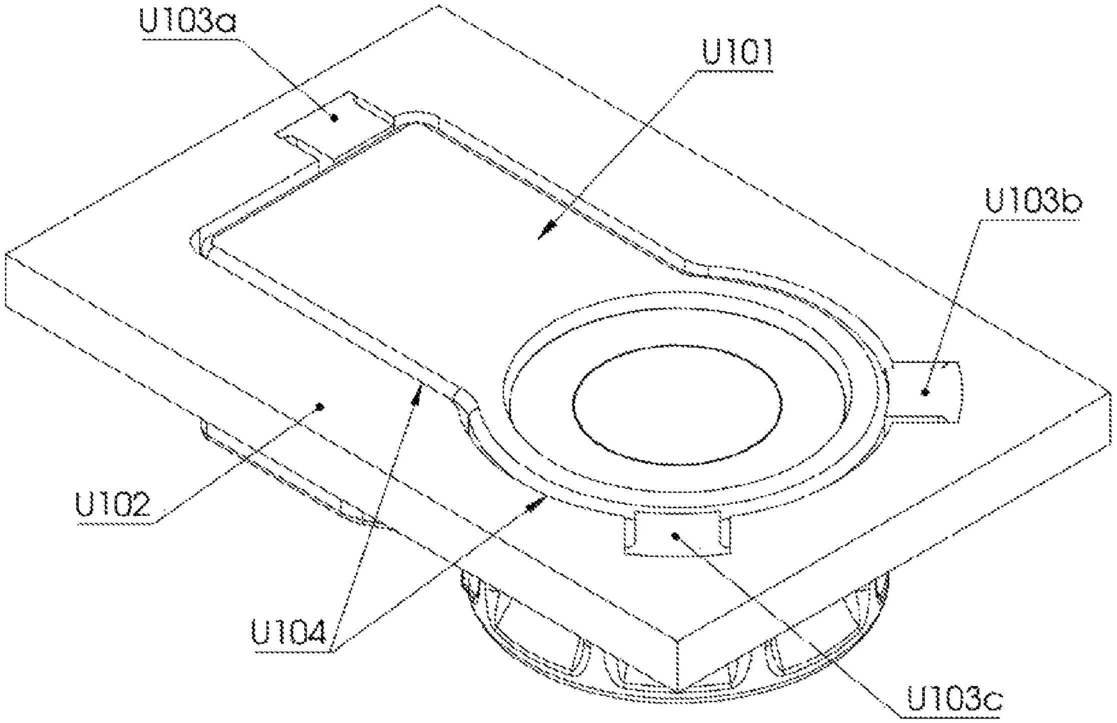
Figure 71B:
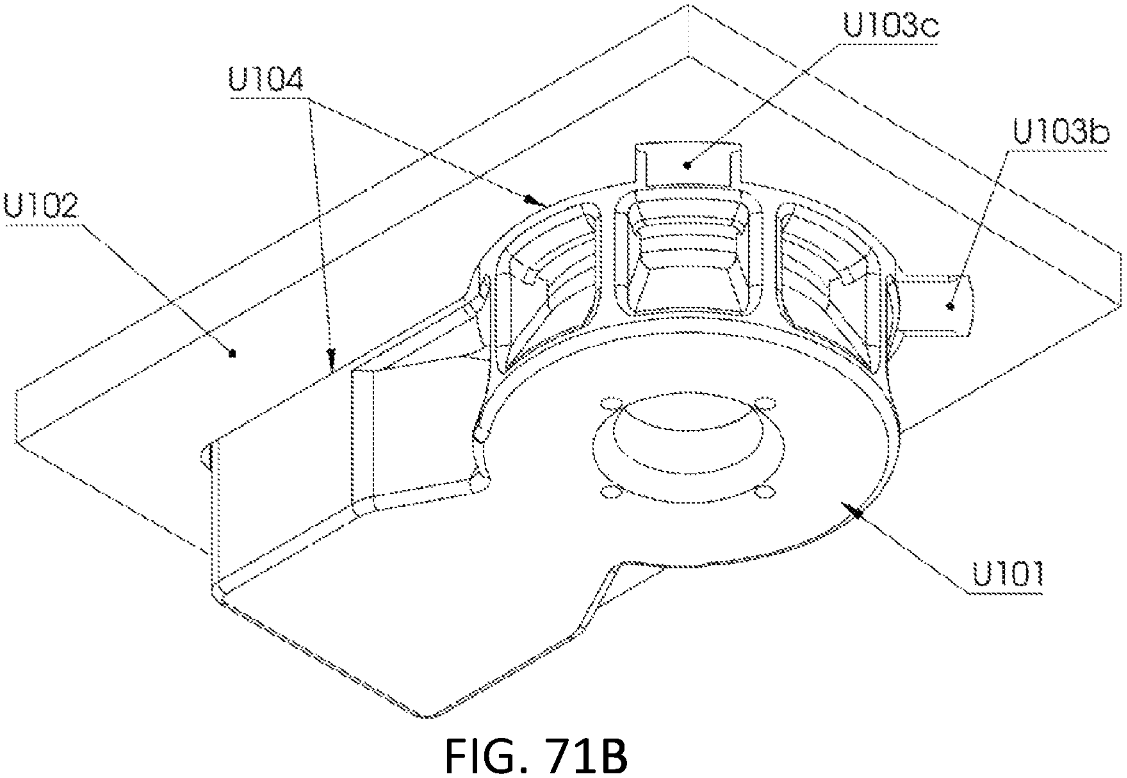
Figure 71C:
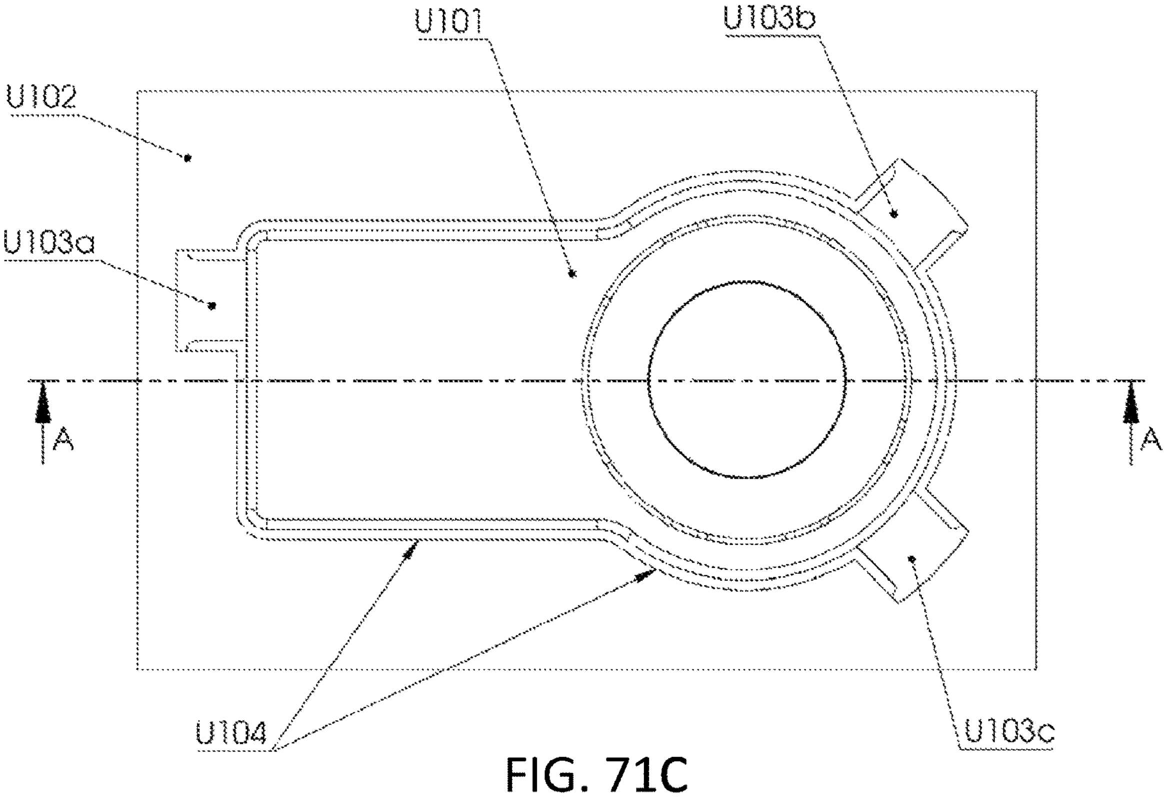
Figure 71D:
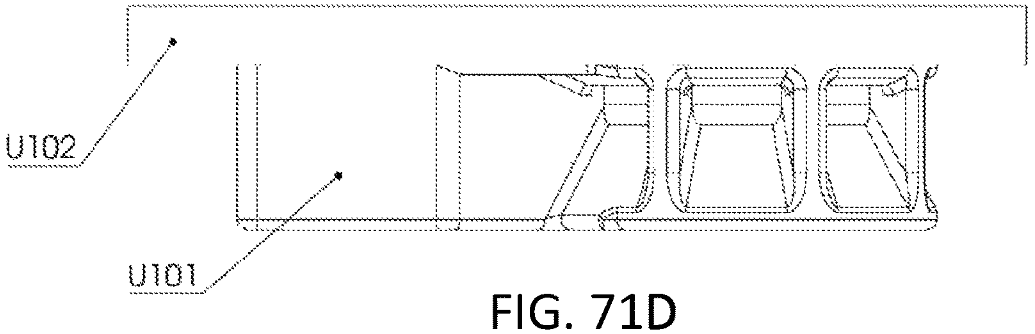
Figure 71E:
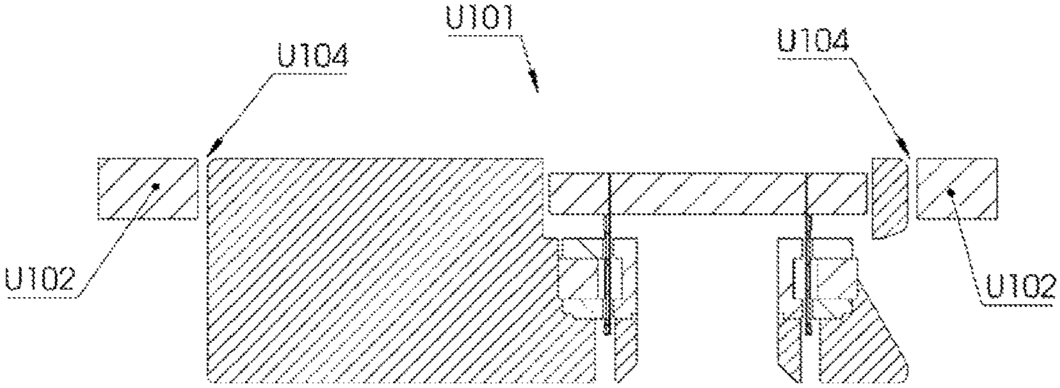
Figure 71F:
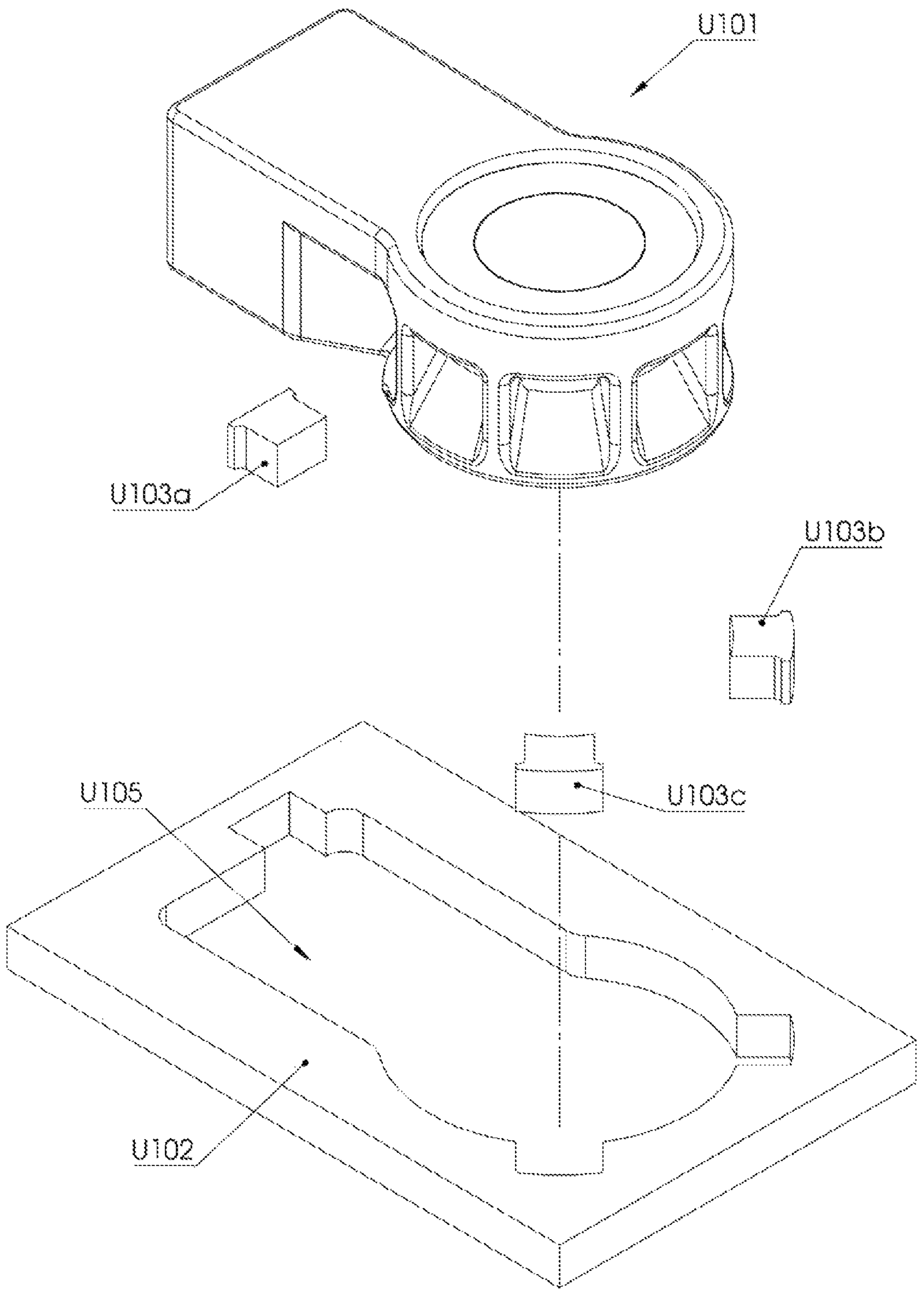
Figure 72A:
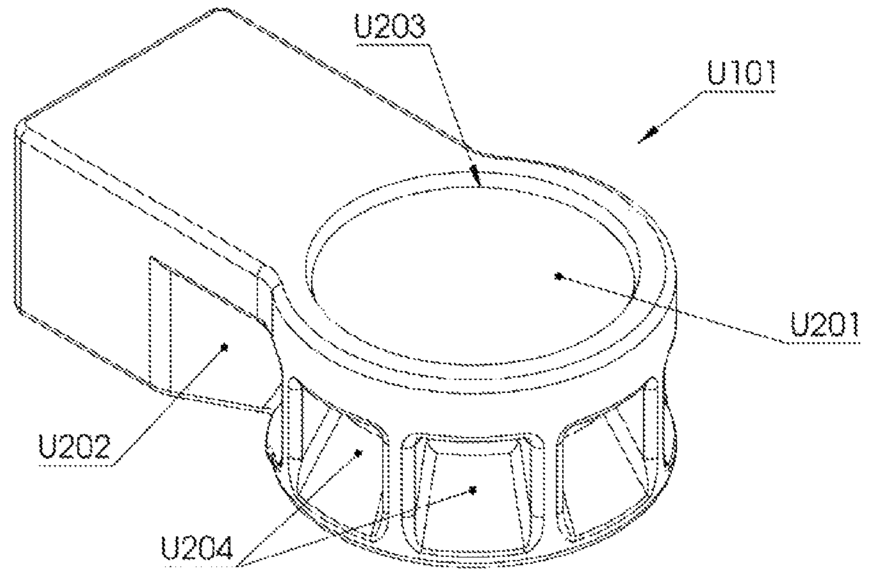
Figure 72B:
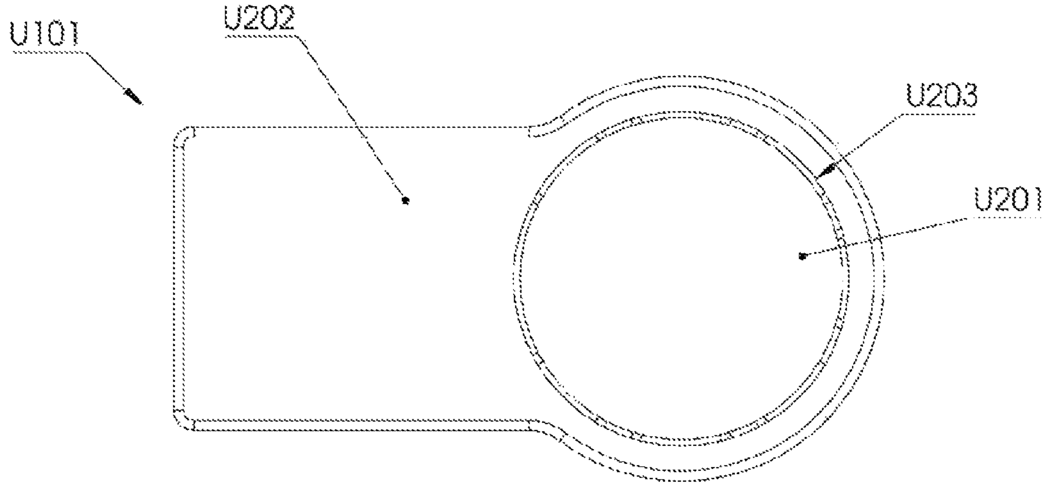
Figure 72C:
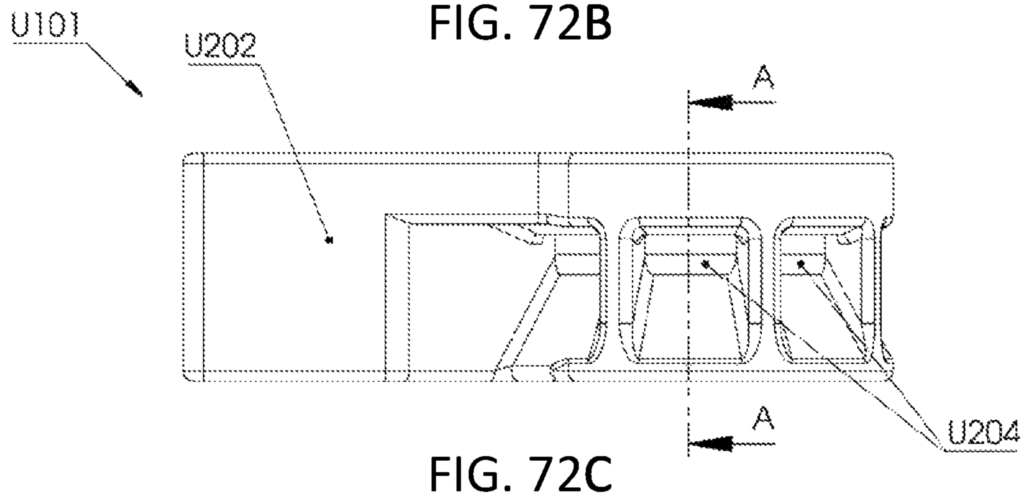
Figure 72D:
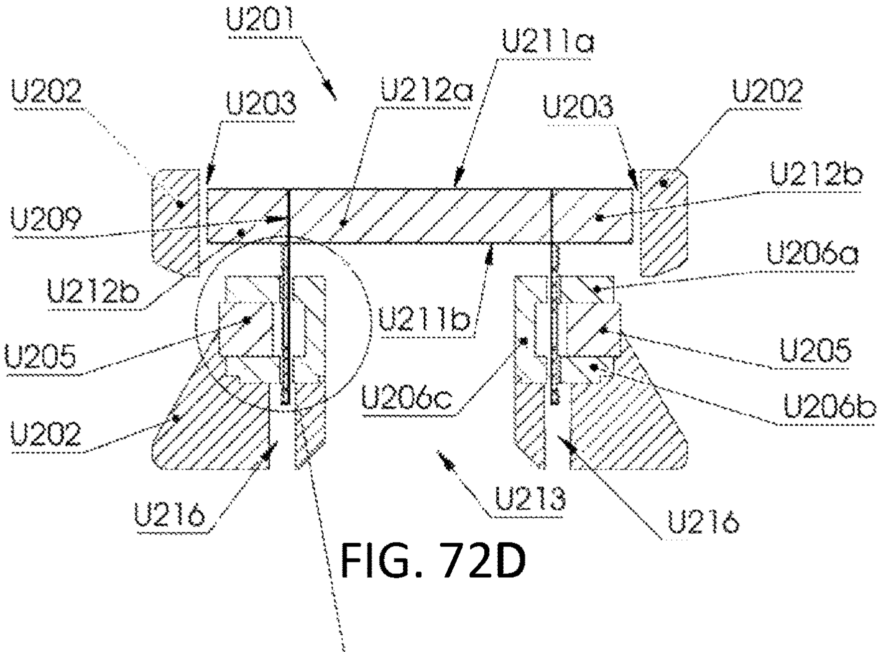
Figure 72E:
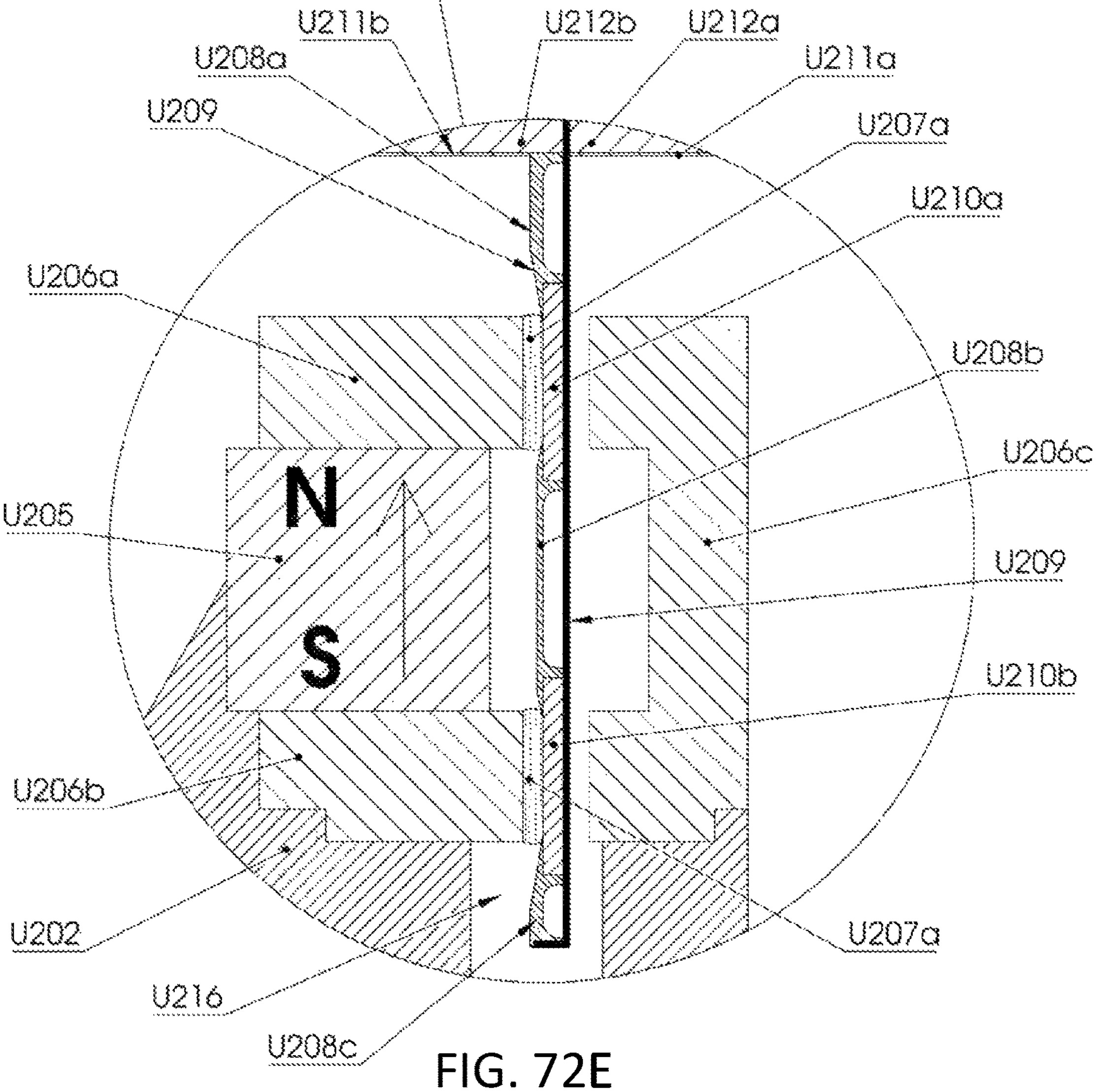
Figure 72F:
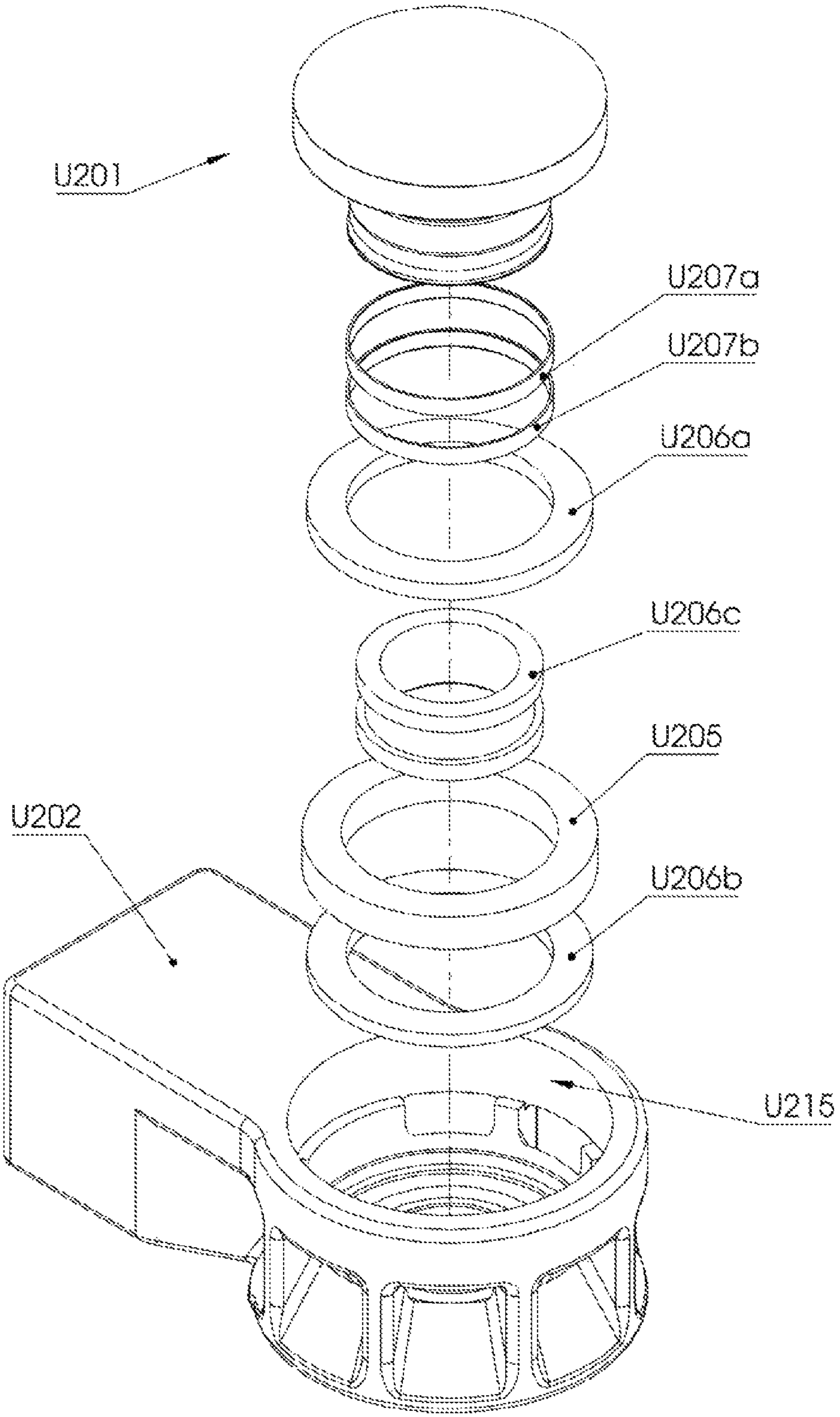
Figure 72G:
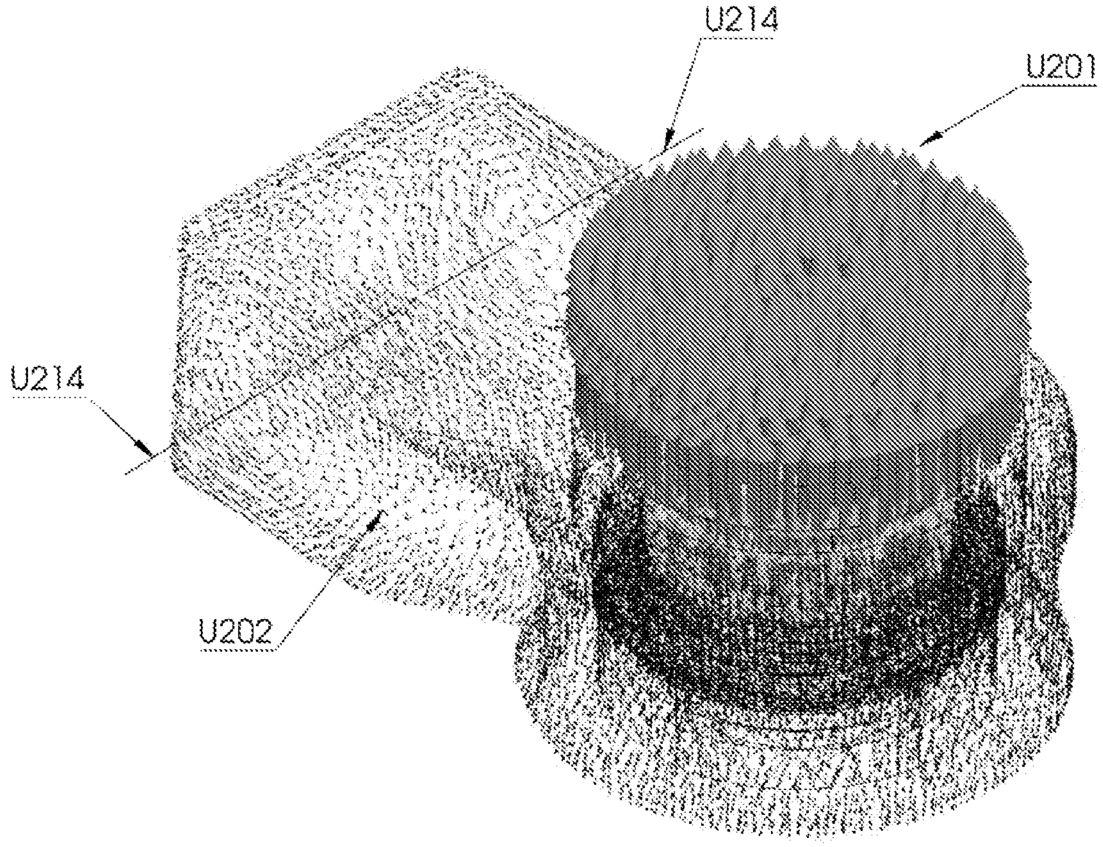
Figure 72H:
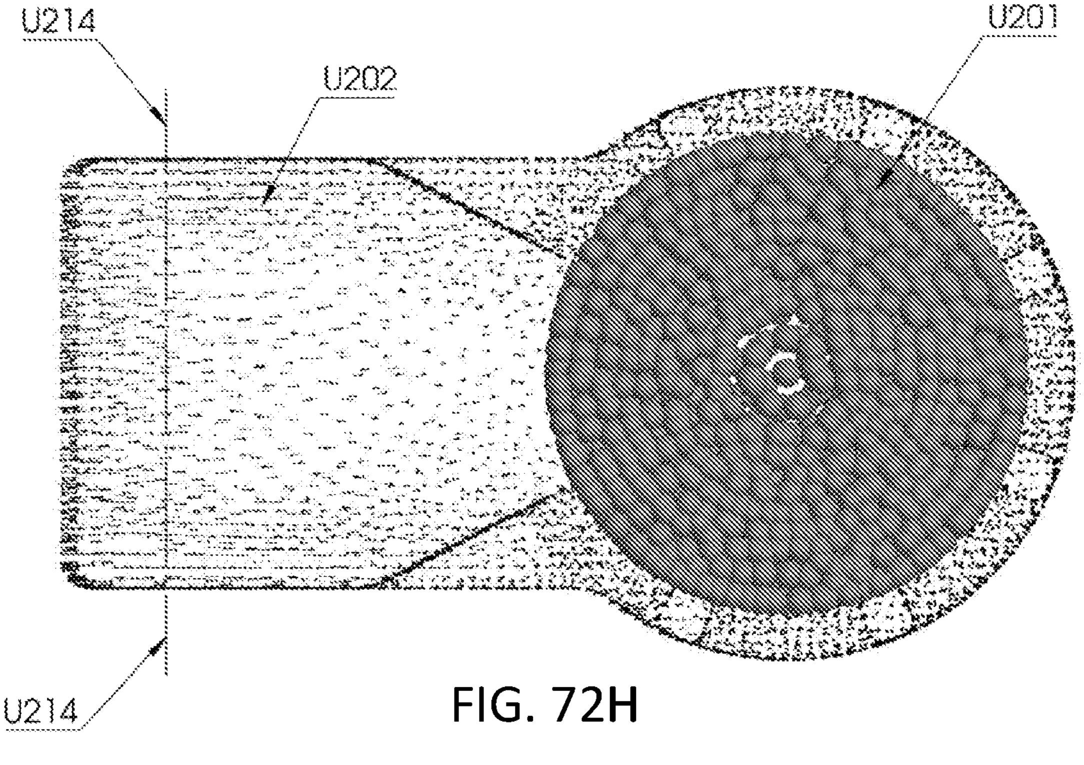
Figure 72I:
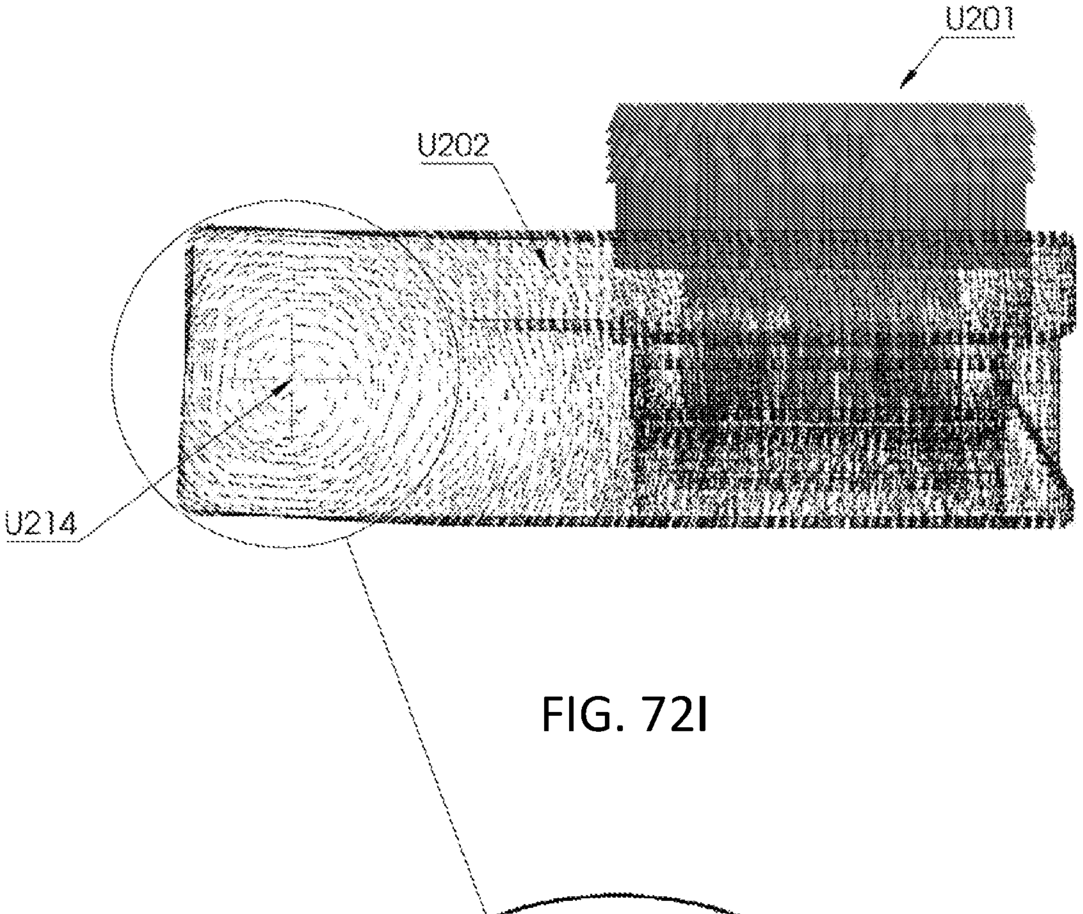
Figure 72J:
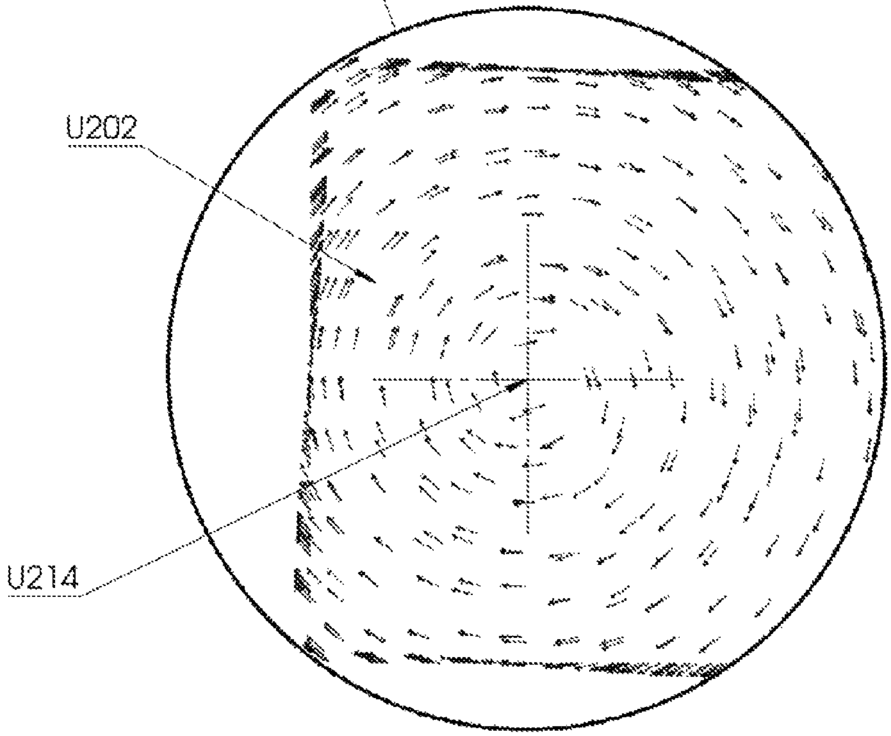
Figure 72K:
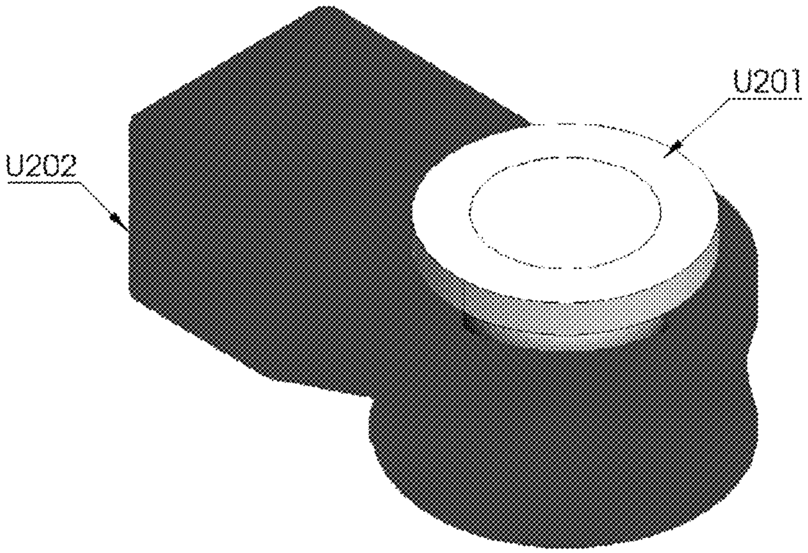
Figure 72L:
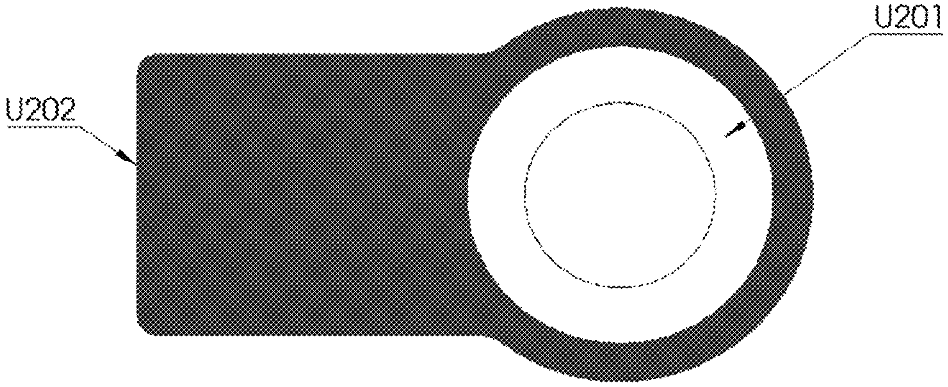
Figure 72M:
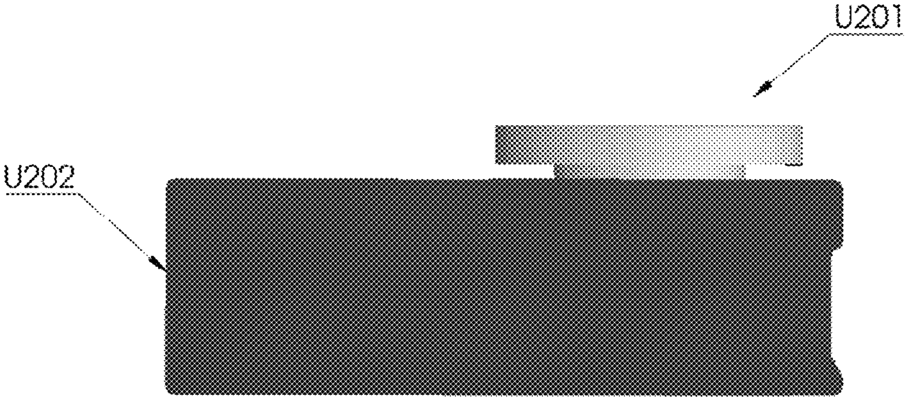
Figure 73A:
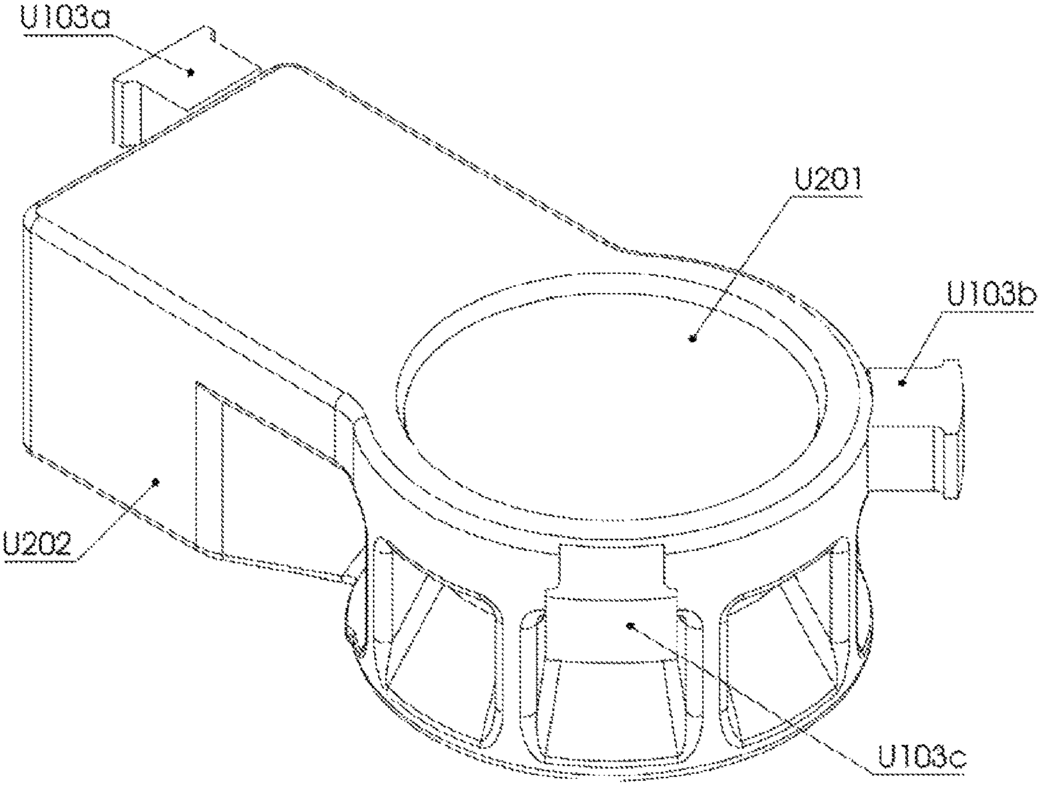
Figure 73B:
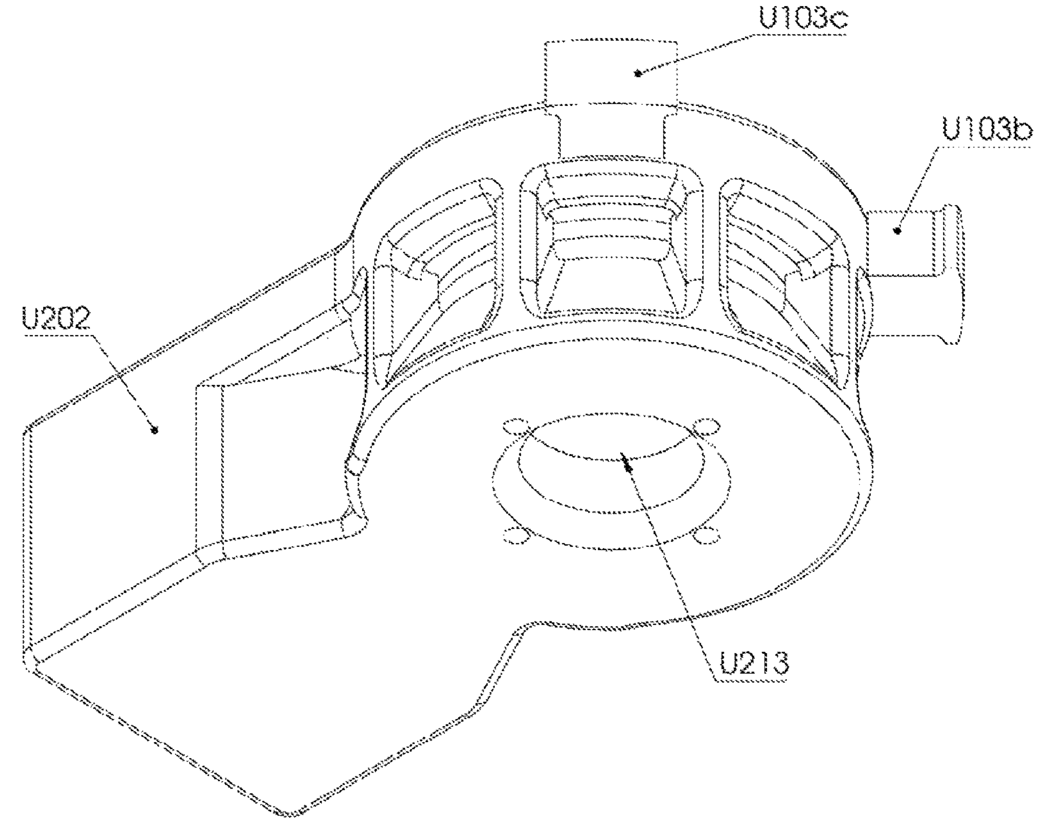
Figure 73C:
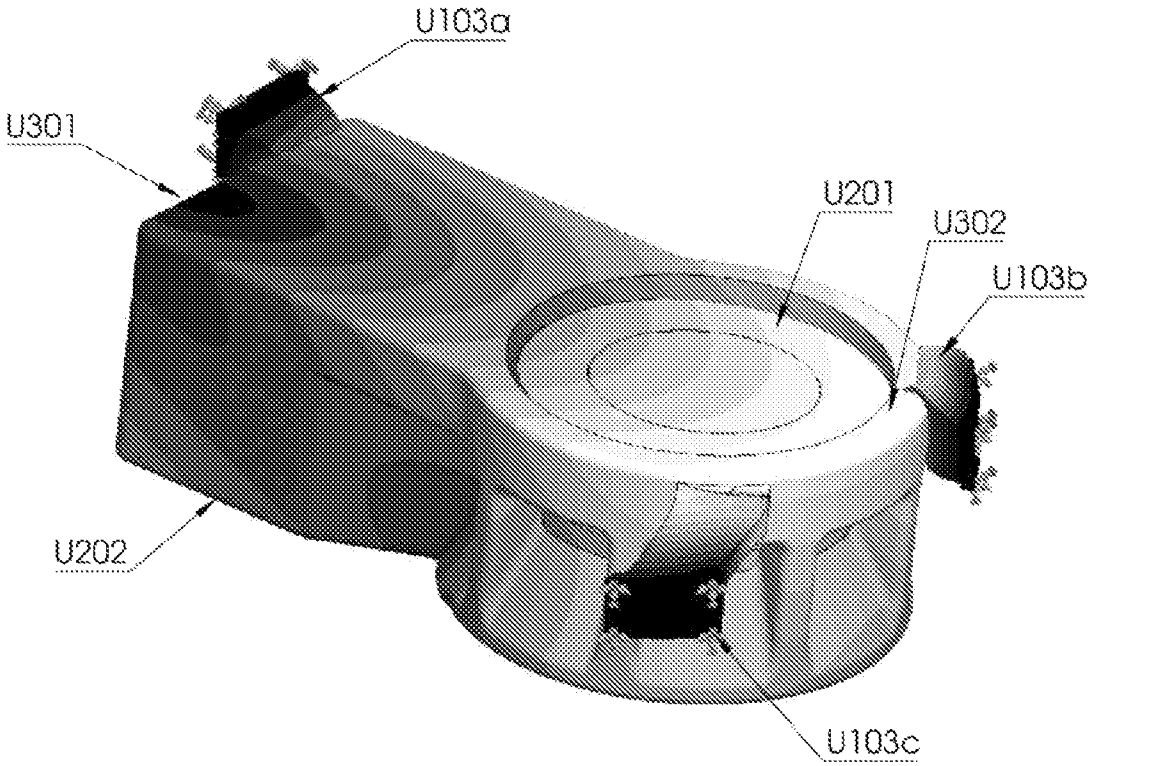
Figure 73D:
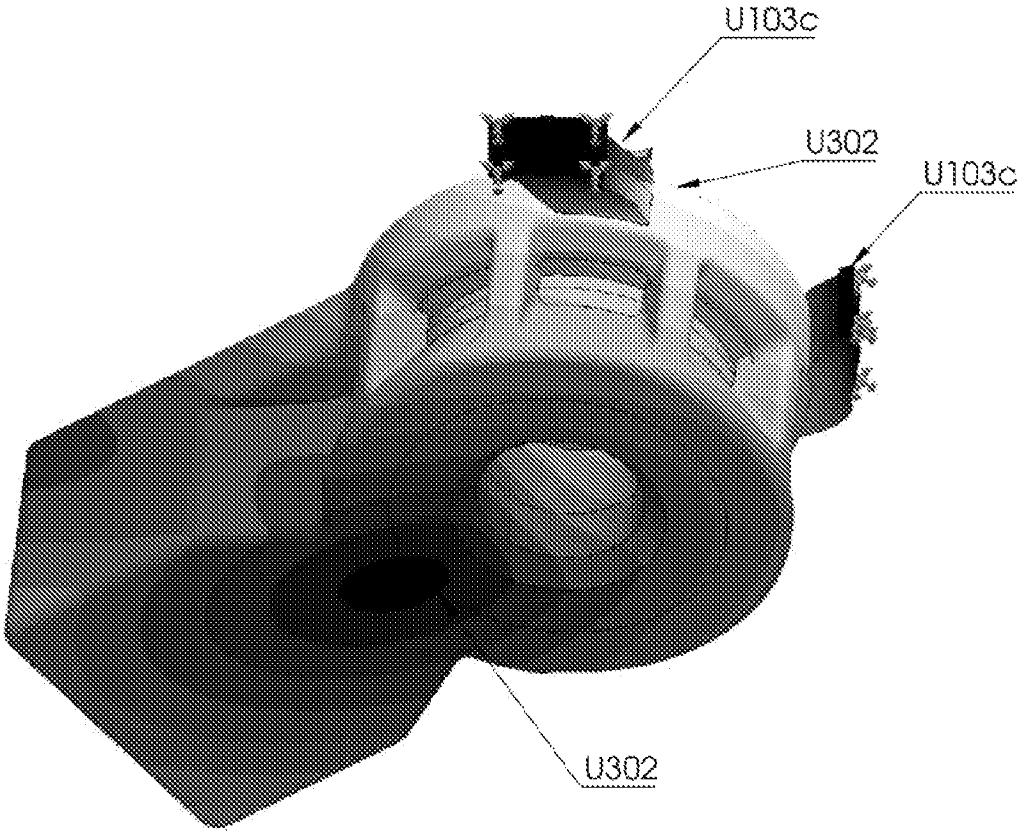
Figure 74A:
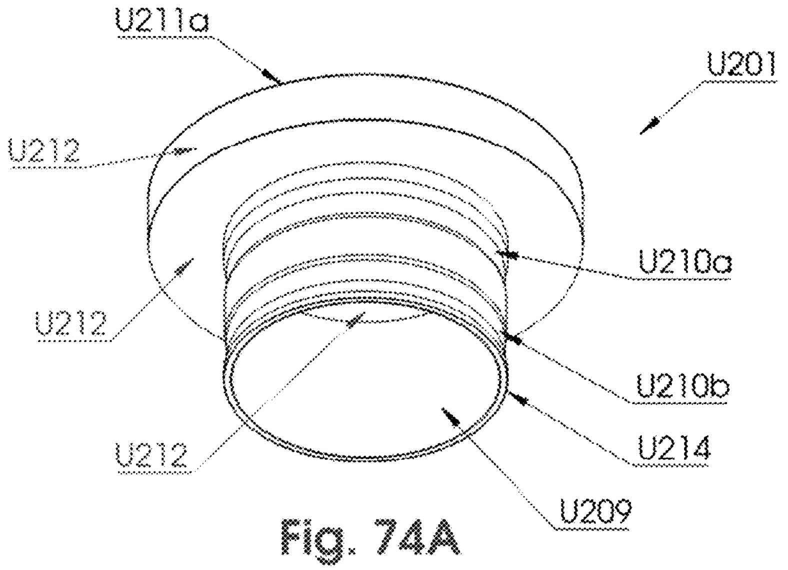
Figure 74B:
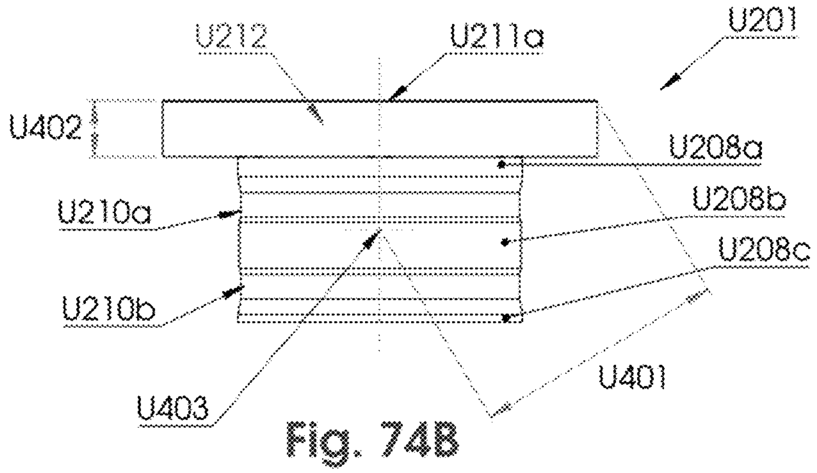
Figure 74C:
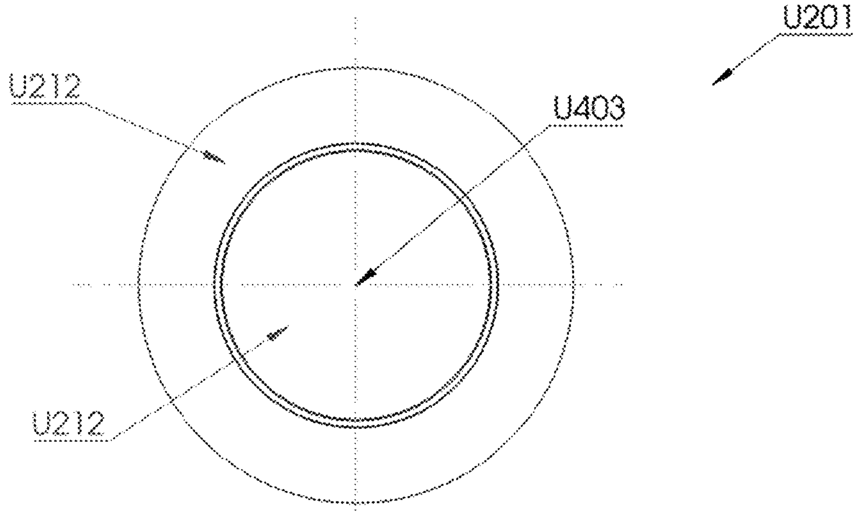
Figure 74D:
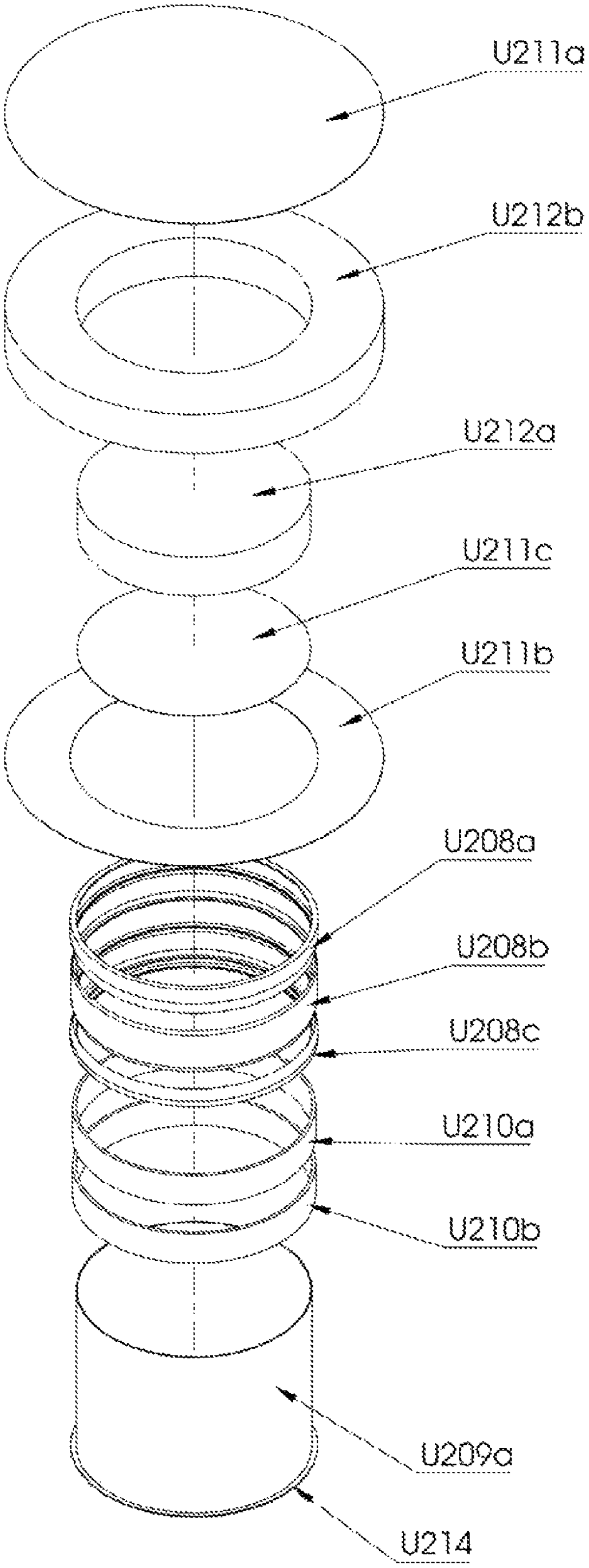
Figure 75A:
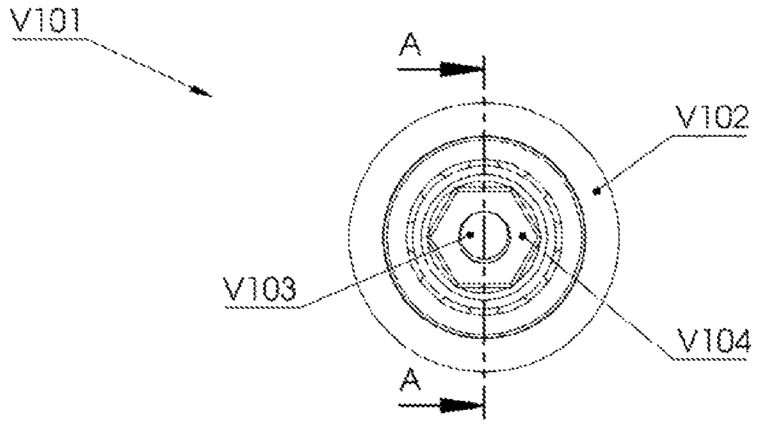
FIG. 75A (PRIOR ART)
Figure 75B:
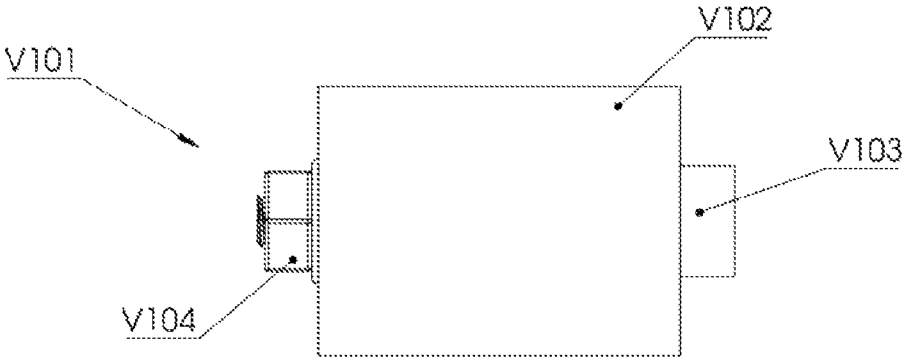
FIG. 75B (PRIOR ART)
Figure 75C:
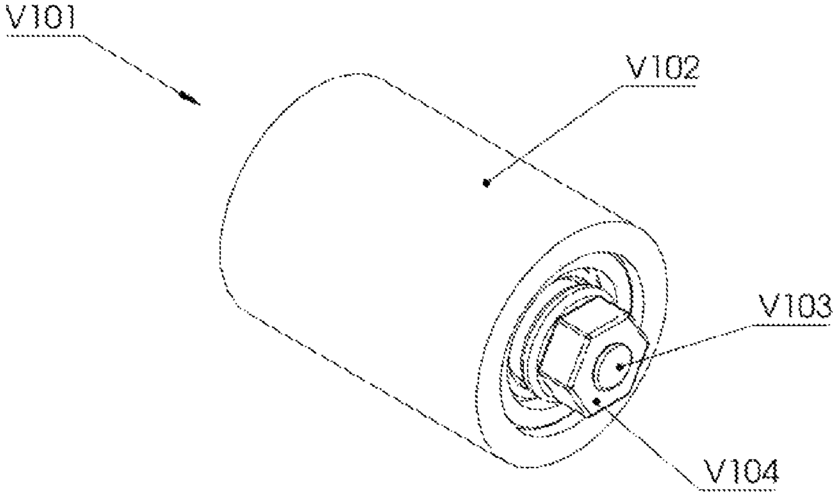
FIG. 75C (PRIOR ART)
Figure 75D:
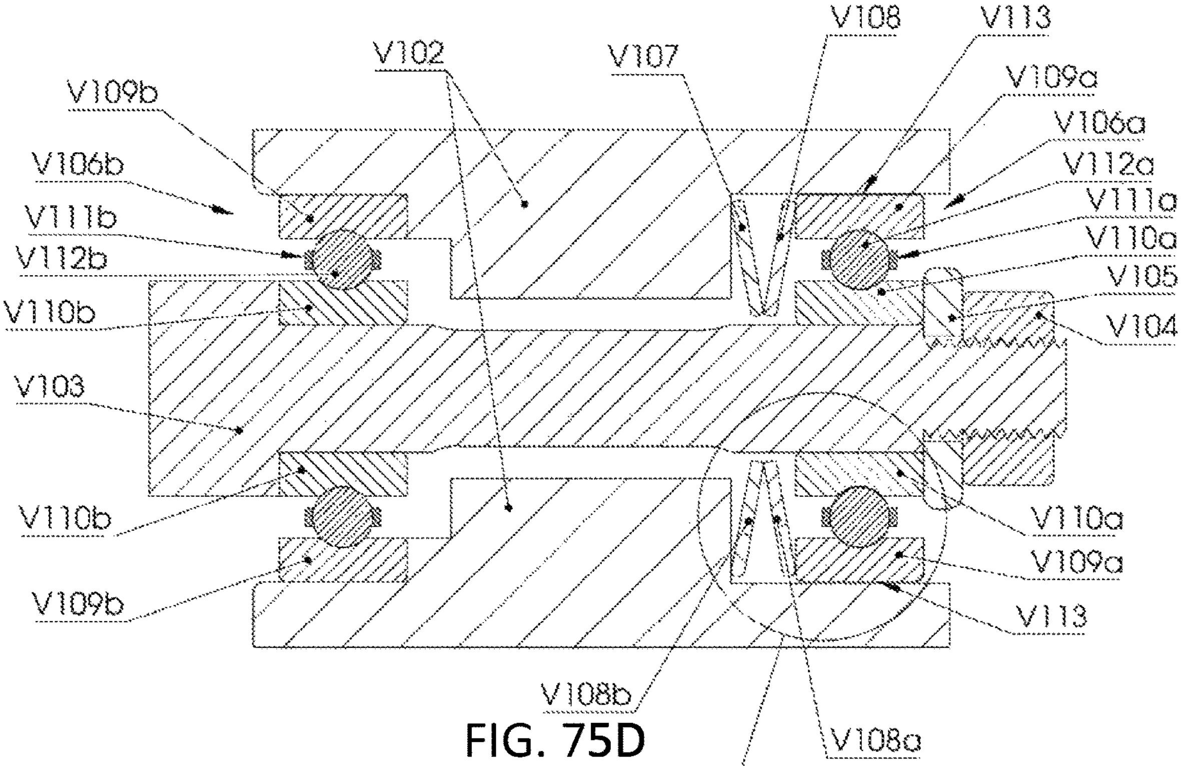
FIG. 75D (PRIOR ART)
Figure 75E:
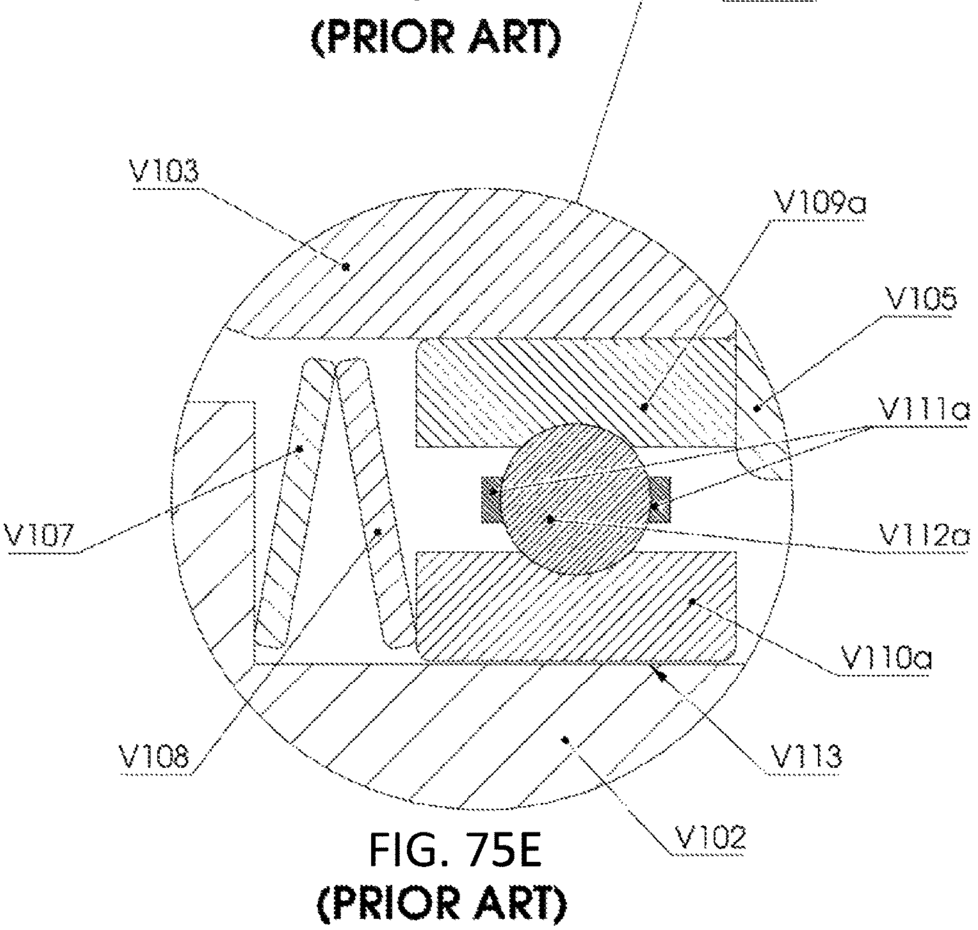
FIG. 75E (PRIOR ART)
Figure 76A:
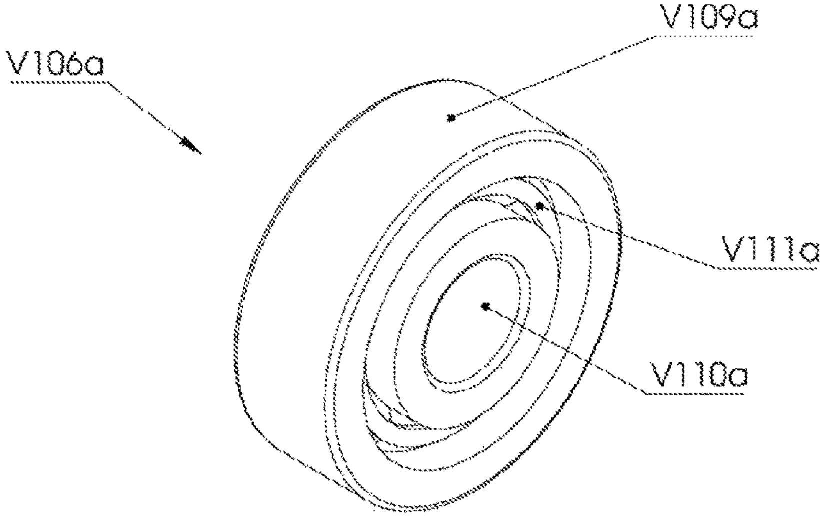
FIG. 76A (PRIOR ART)
Figure 76B:
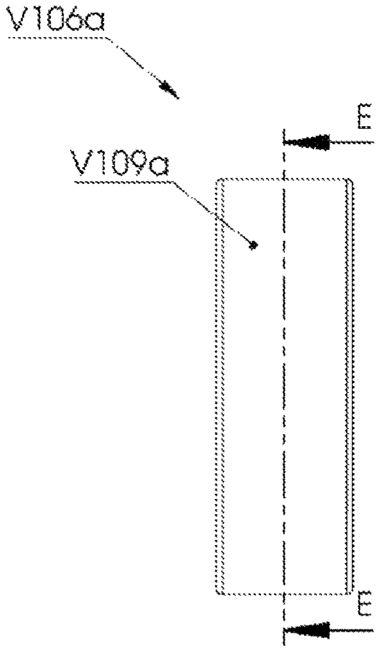
FIG. 76B (PRIOR ART)
Figure 76C:
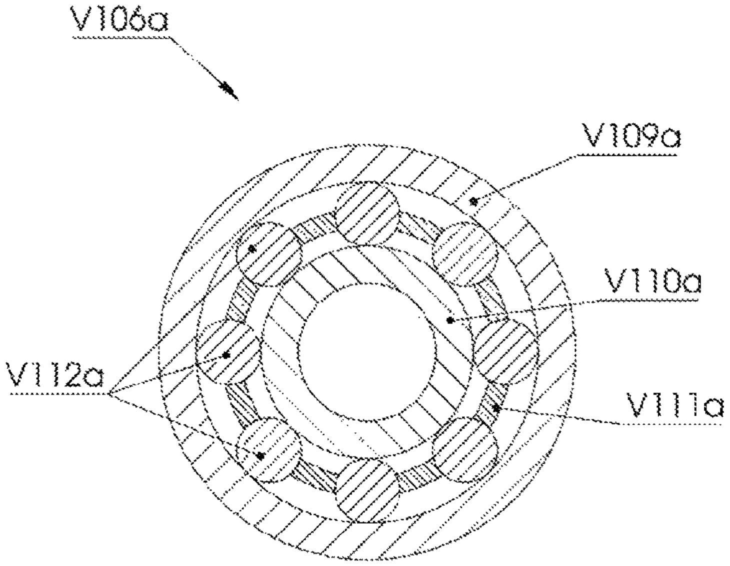
FIG. 76C (PRIOR ART)
Figure 76D:
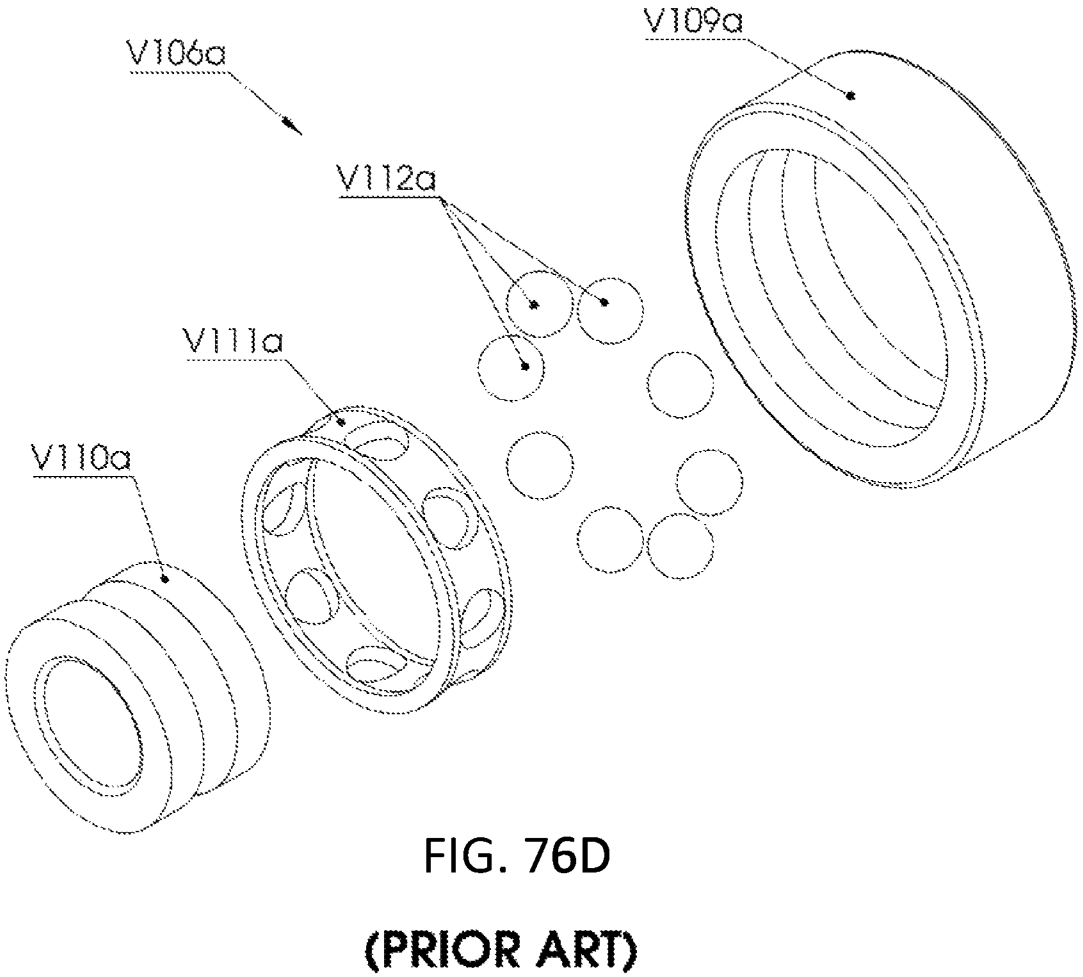
FIG. 76D (PRIOR ART)
Figure 77A:
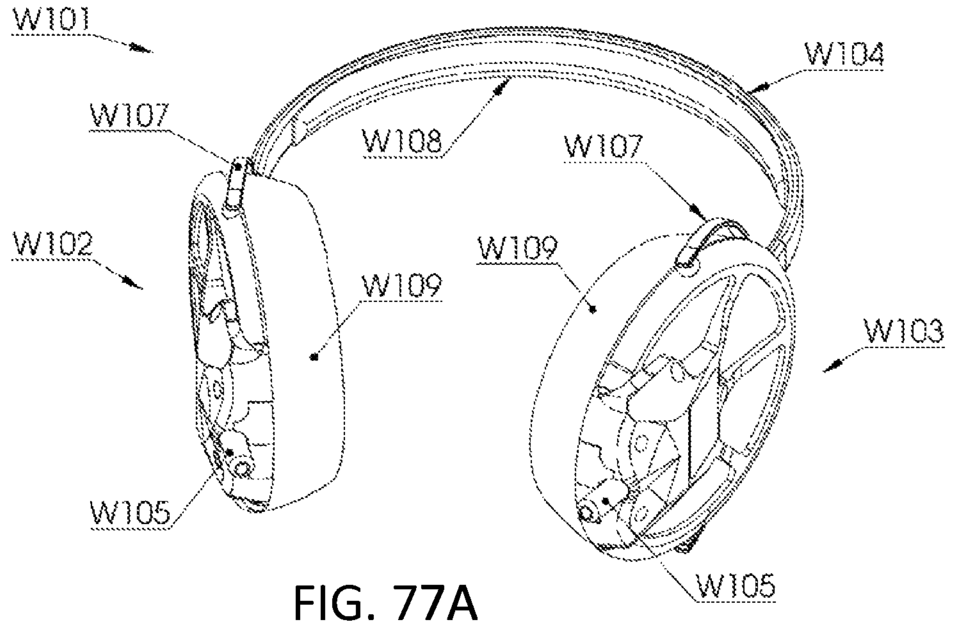
Figure 77B:
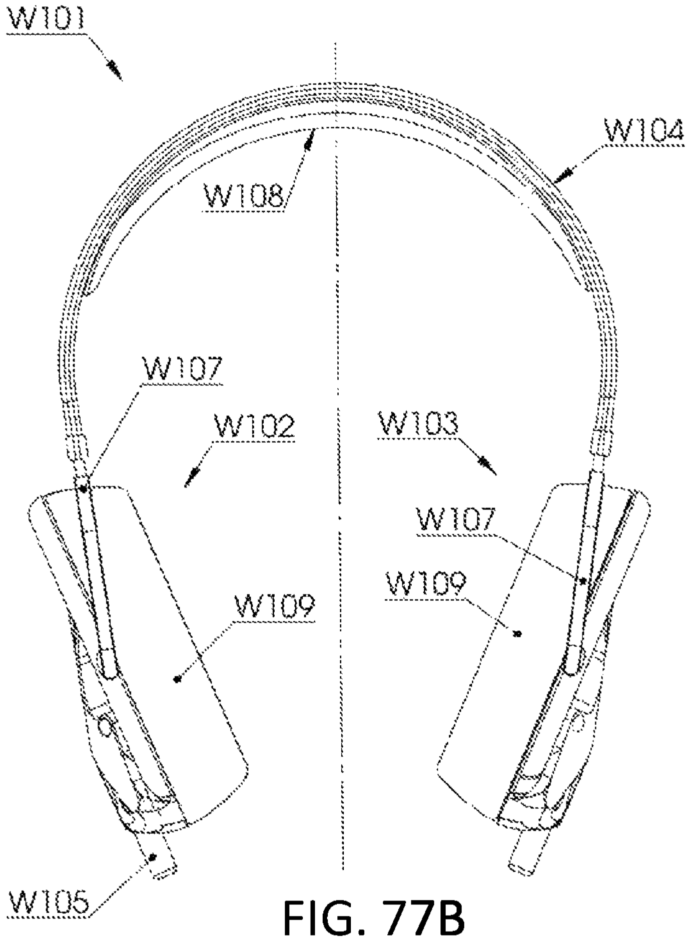
Figure 77C:
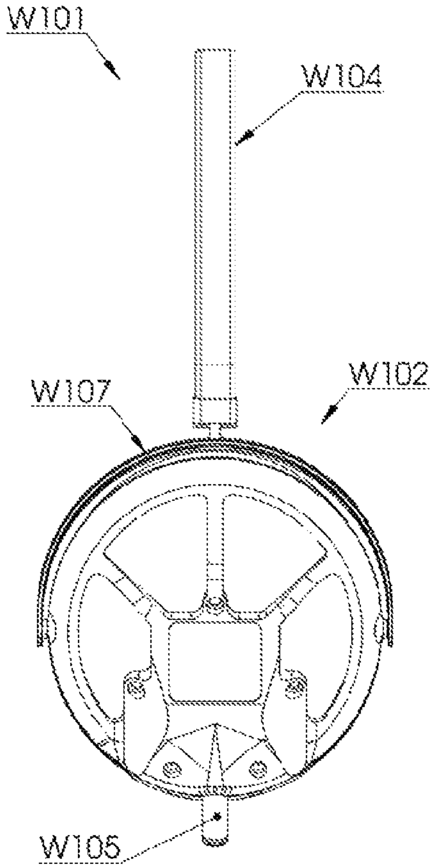
Figure 78A:
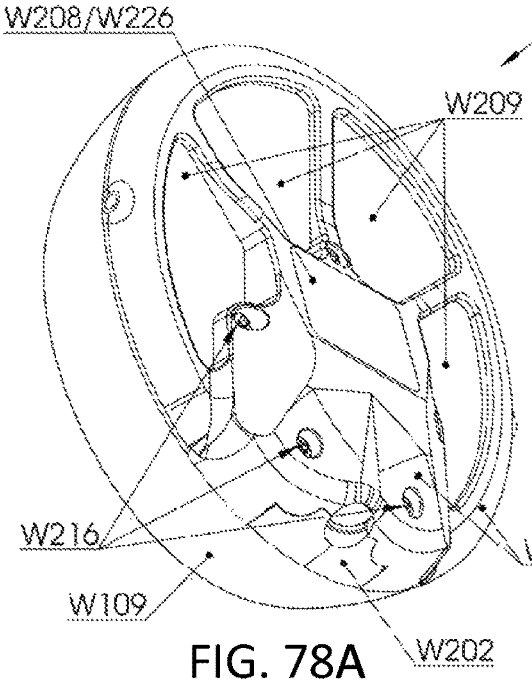
Figure 78B:
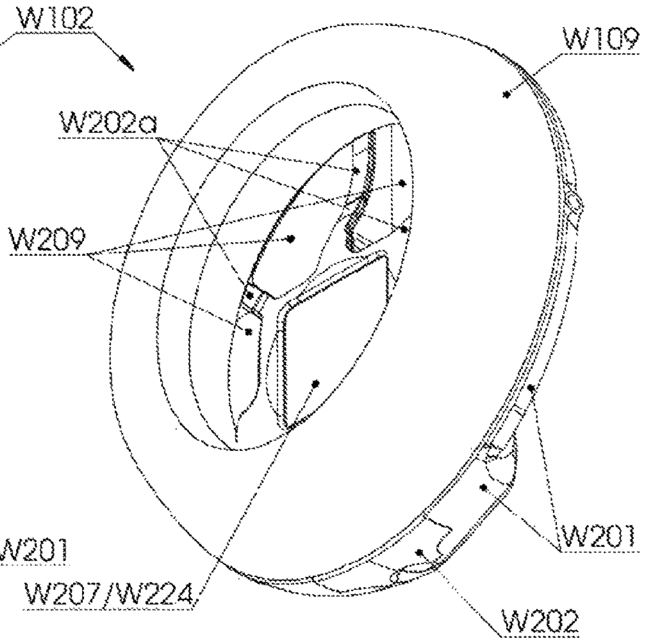
Figure 78C:
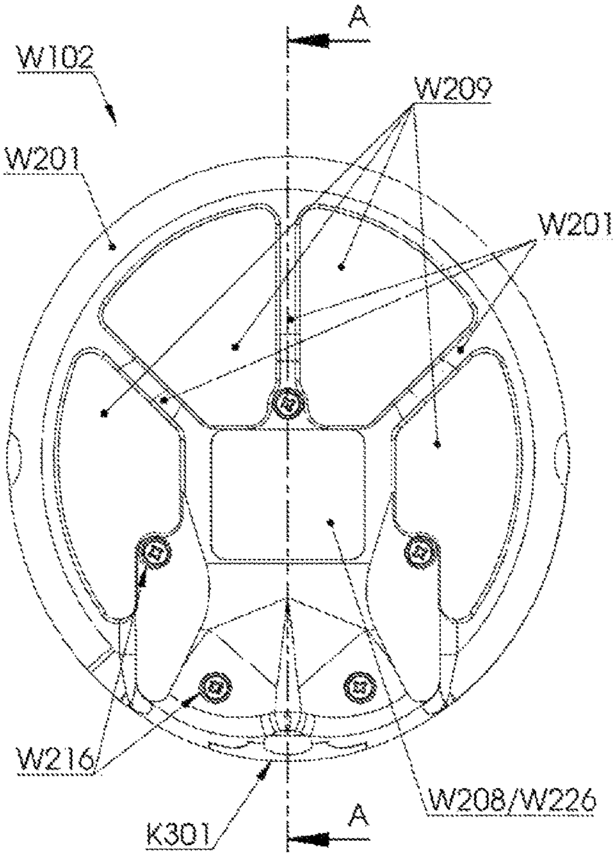
Figure 78D:
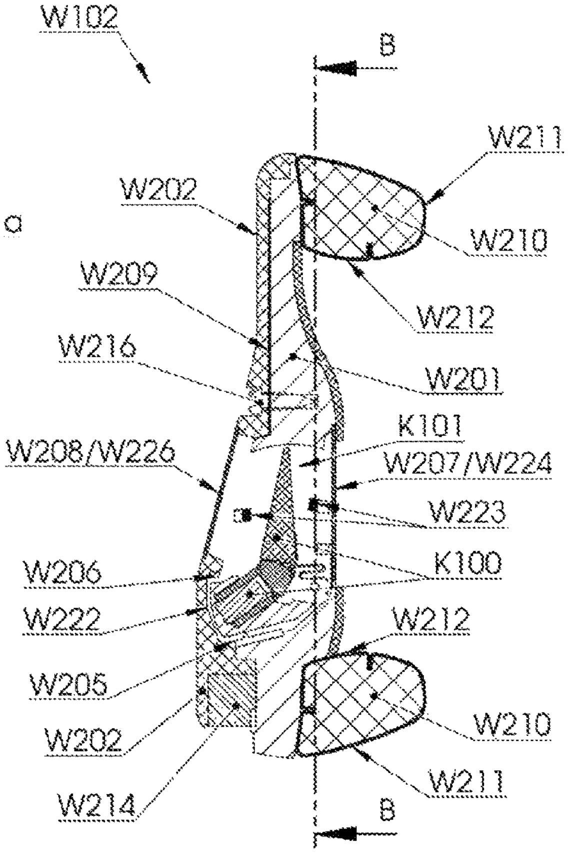
Figure 78E:
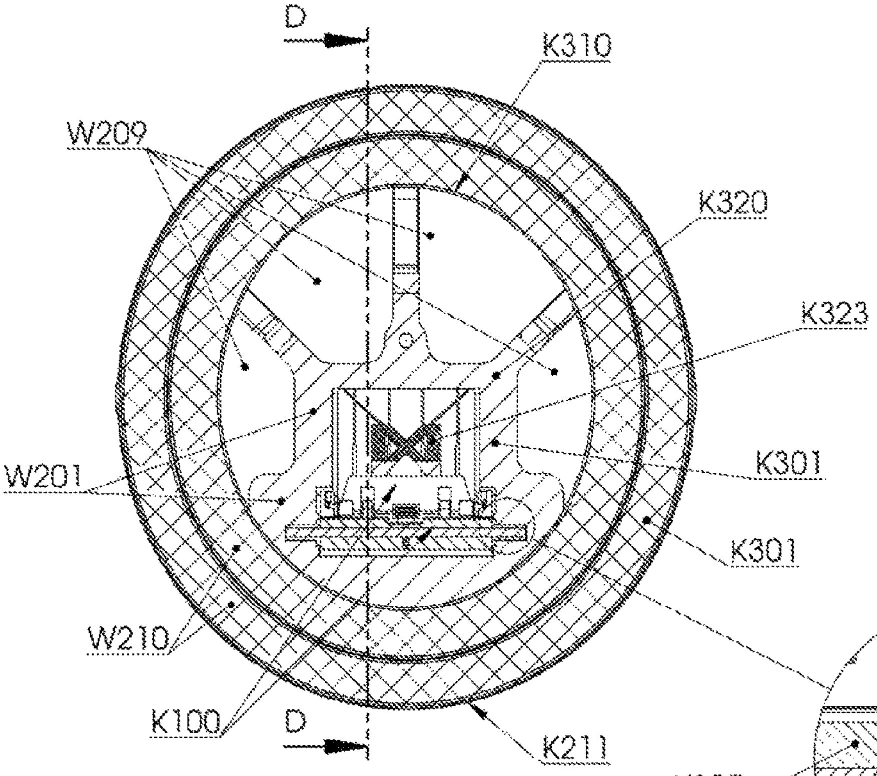
Figure 78F:
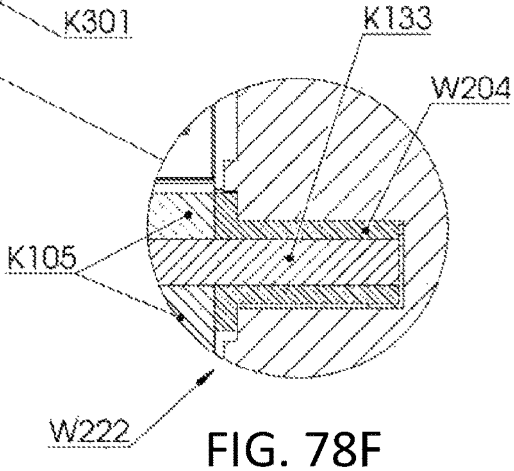
Figure 78G:
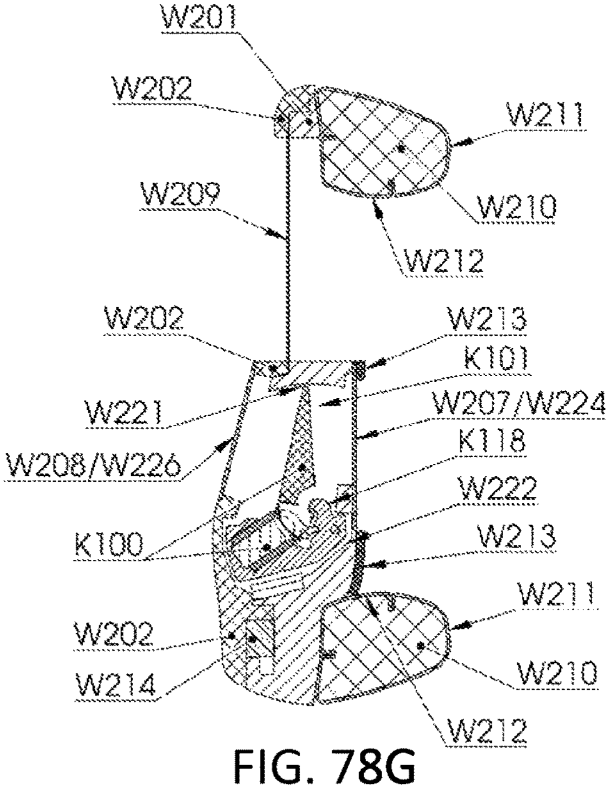
Figure 78H:
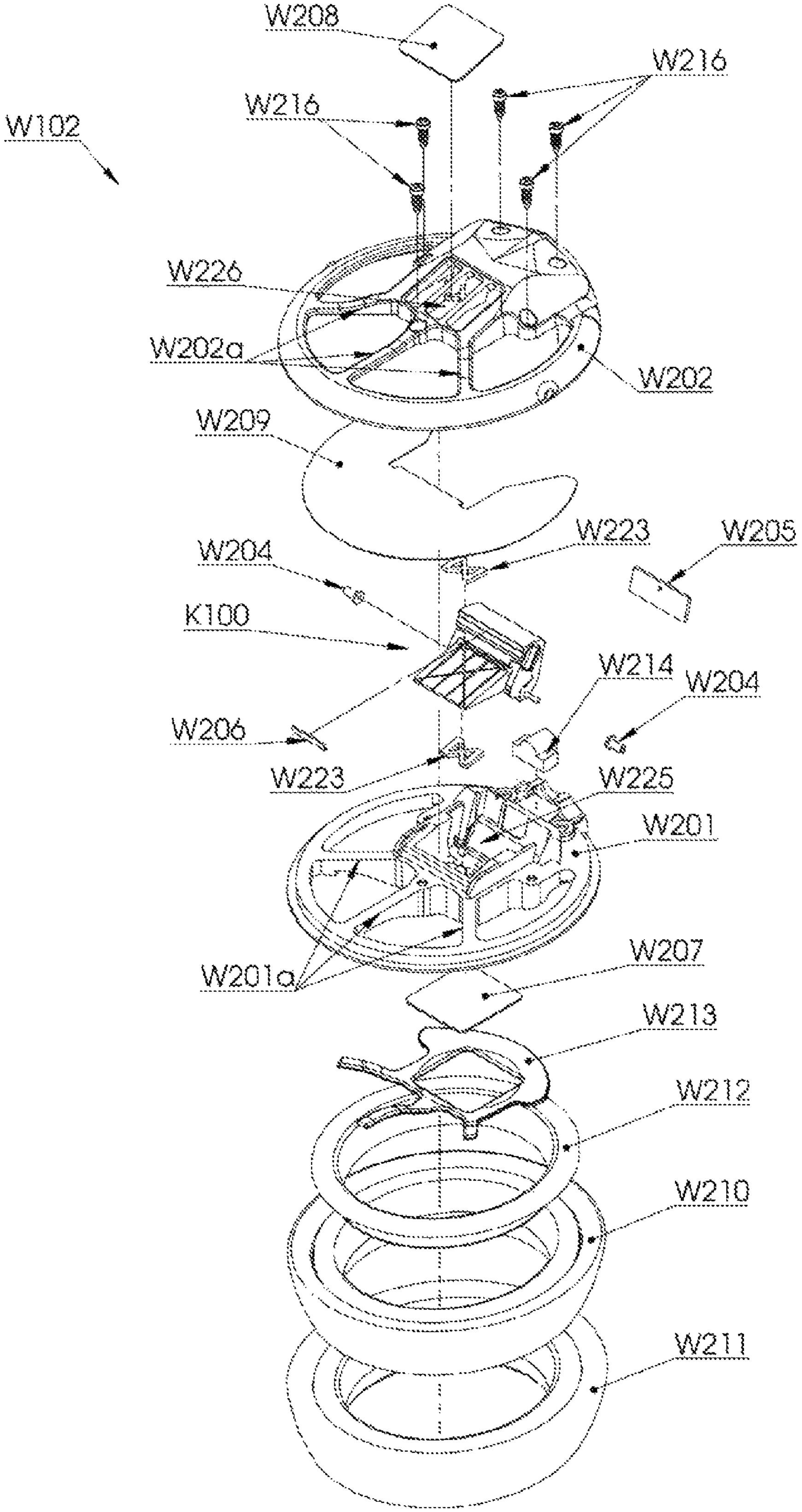
Figure 79:
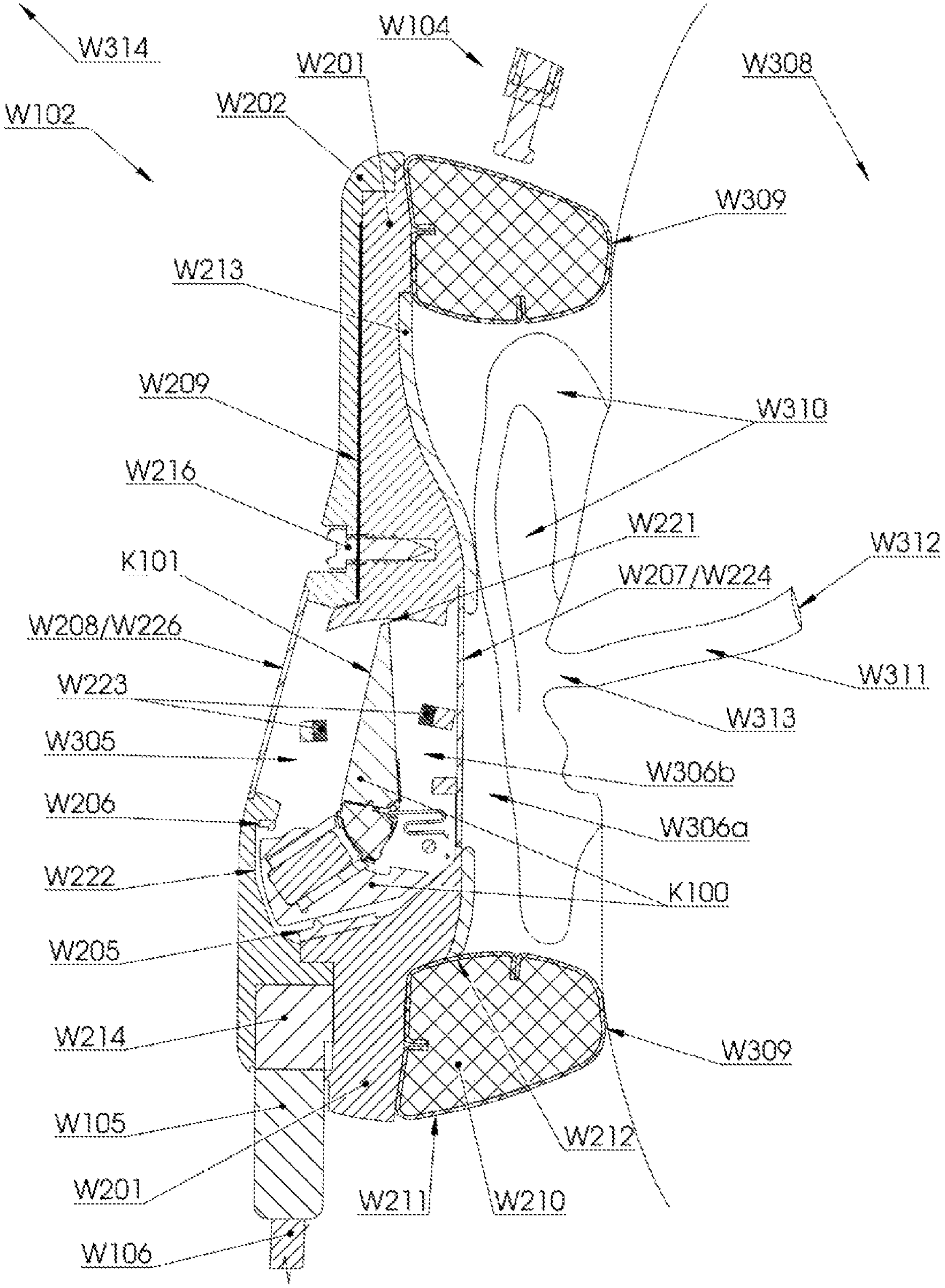
Figure 80A:
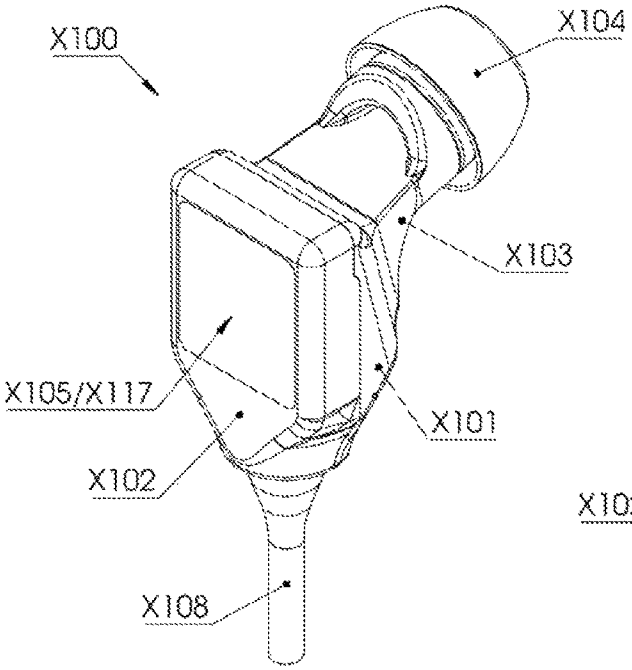
Figure 80B:
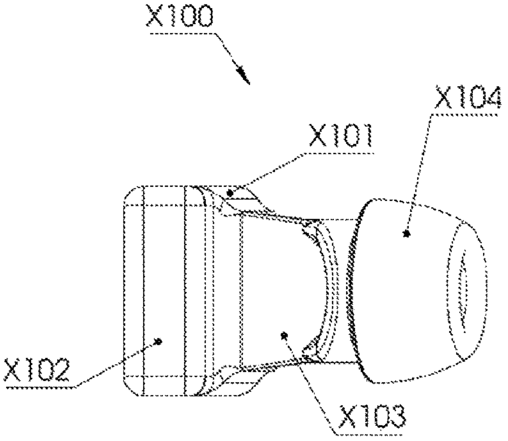
Figure 80C:
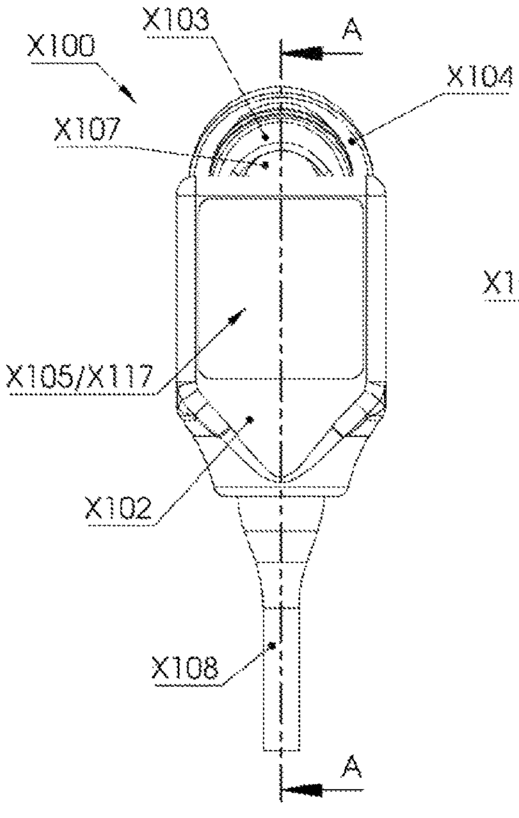
Figure 80D:
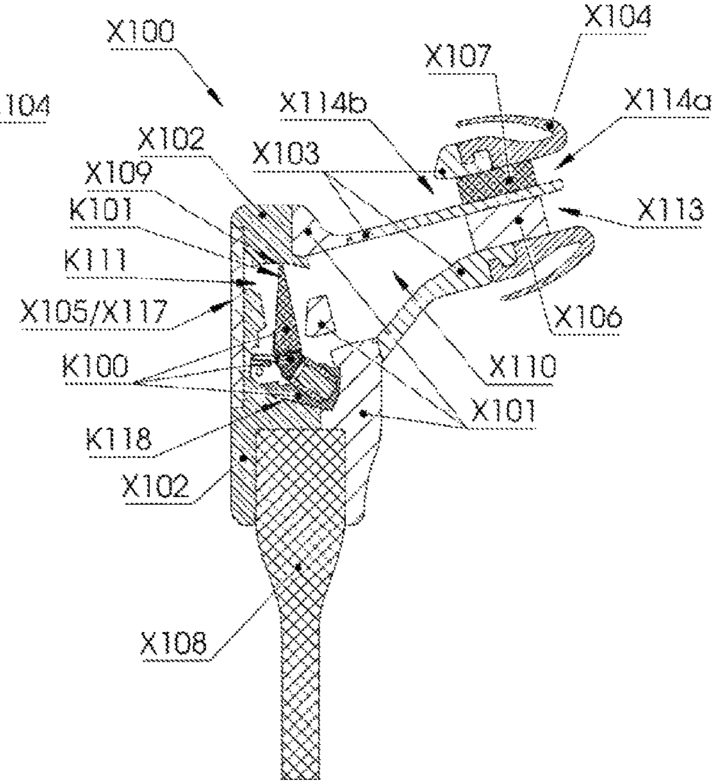
Figure 80E:
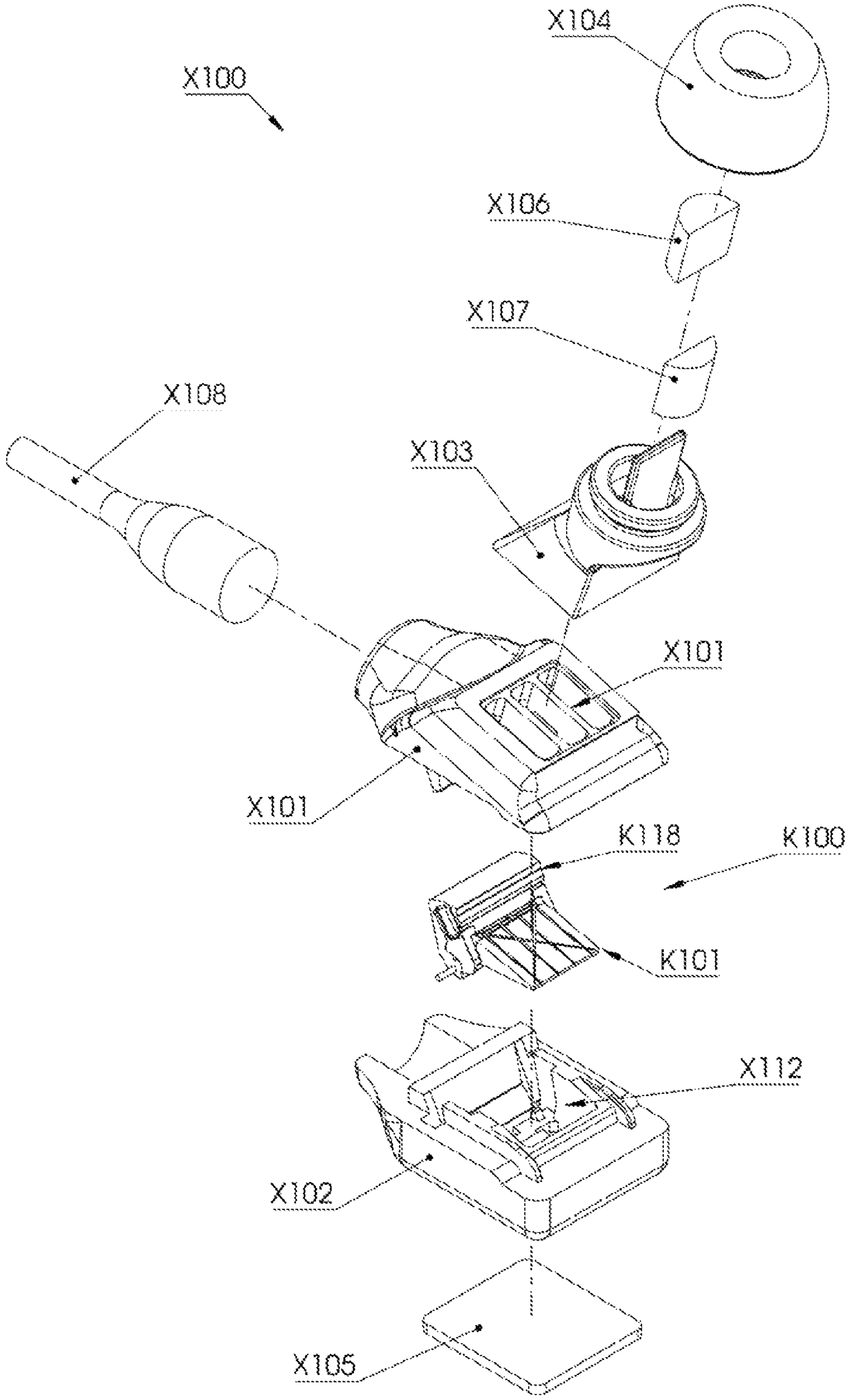
Figure 81:
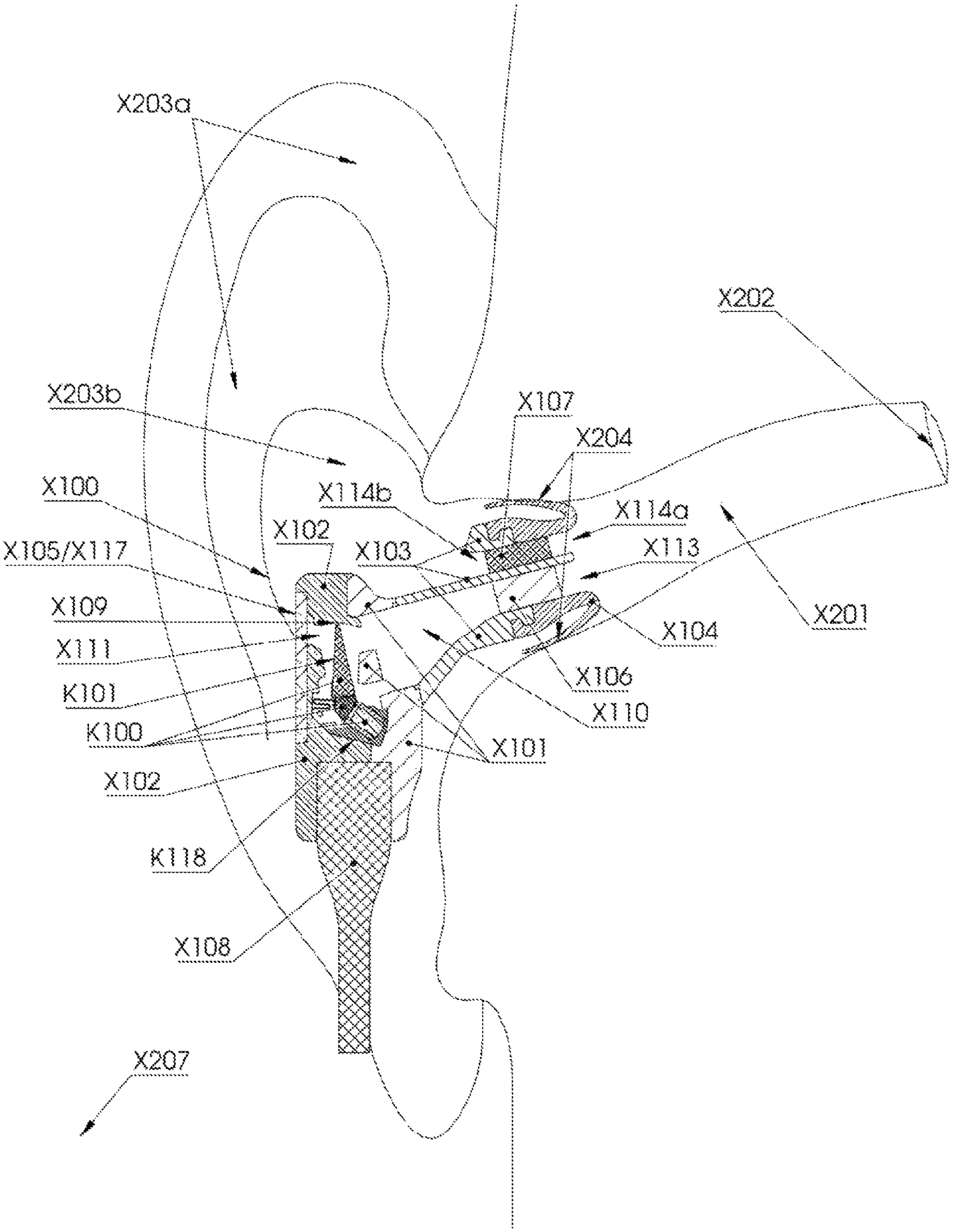
Figure 82A:
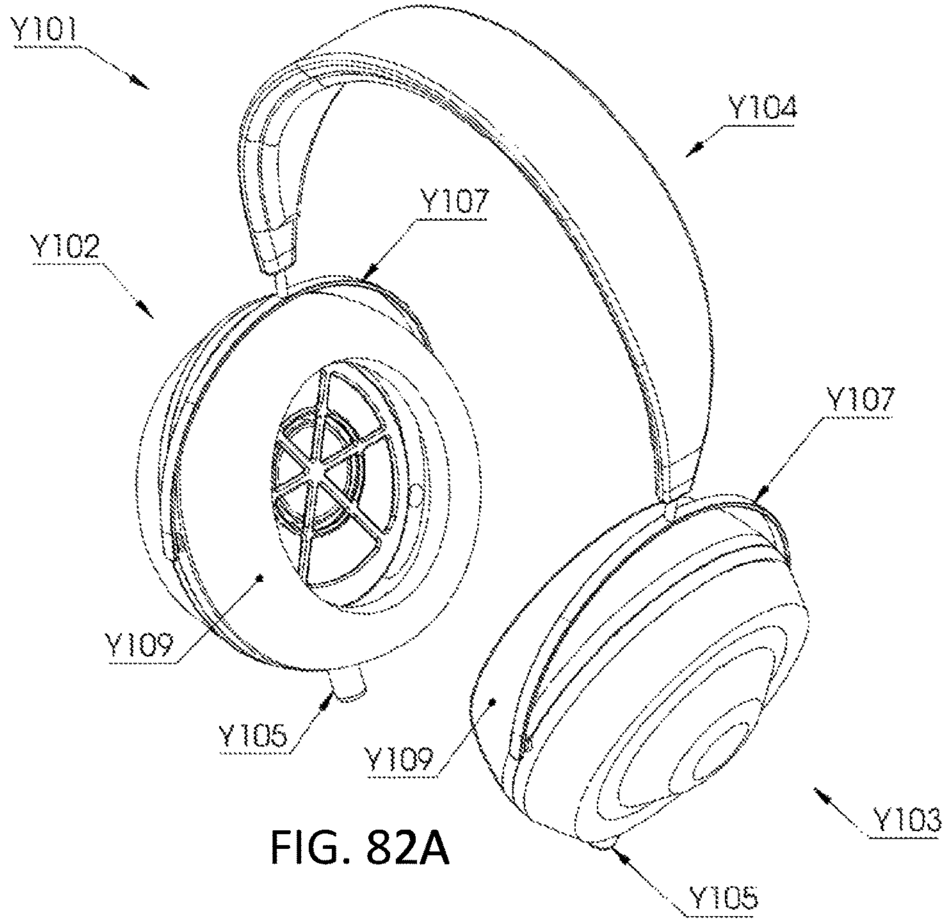
Figure 82B:
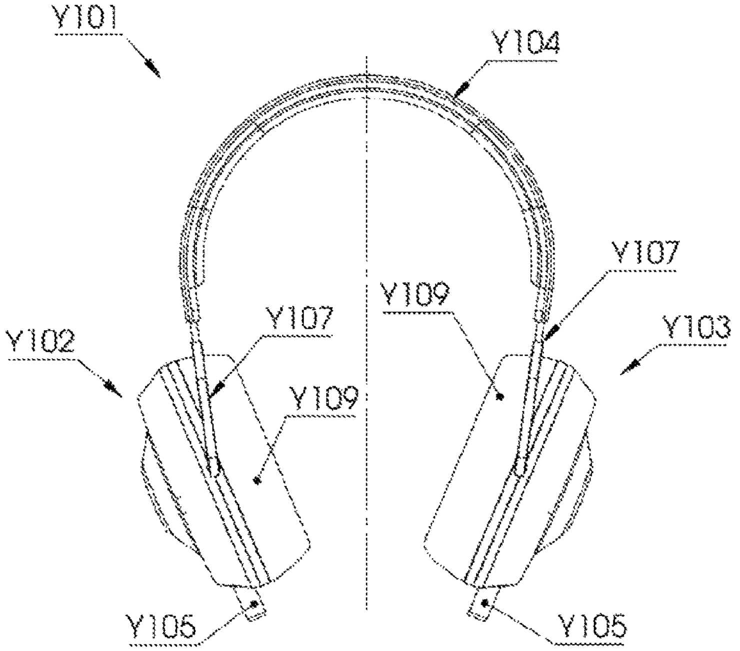
Figure 82C:
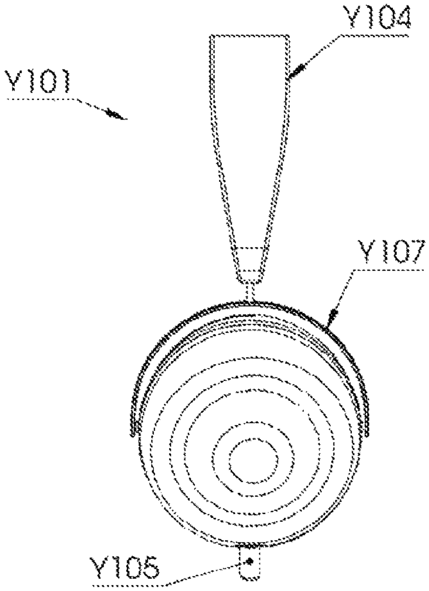
Figure 83A:
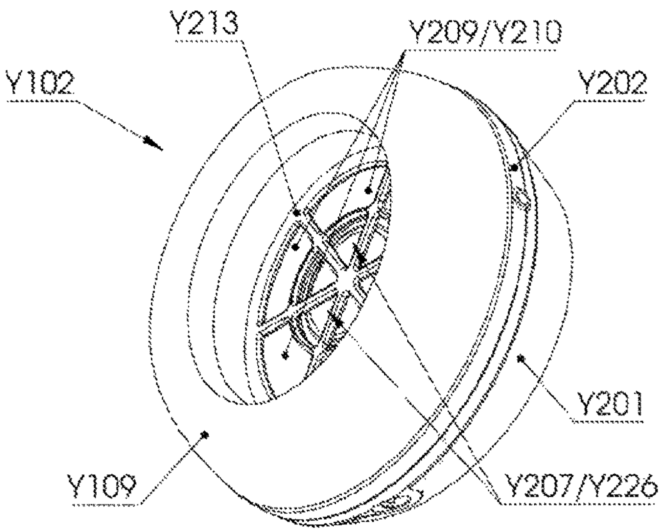
Figure 83B:
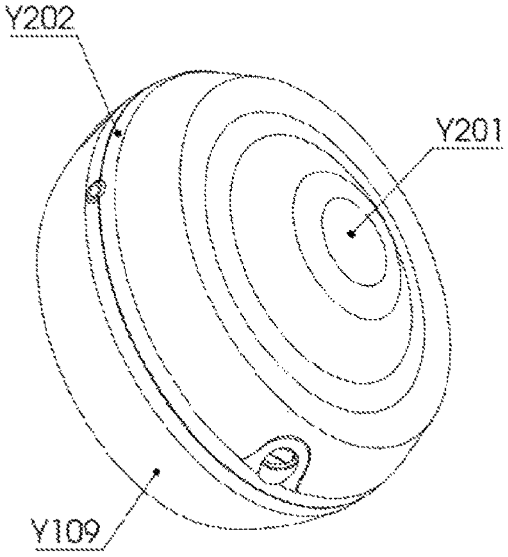
Figure 83C:
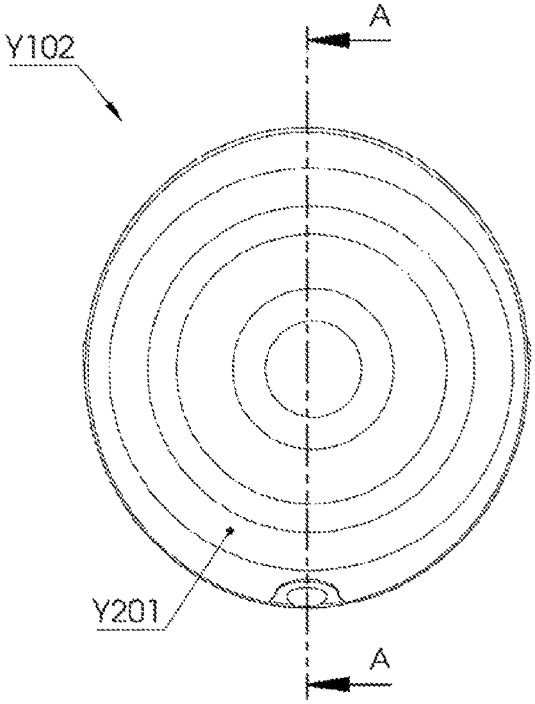
Figure 83D:
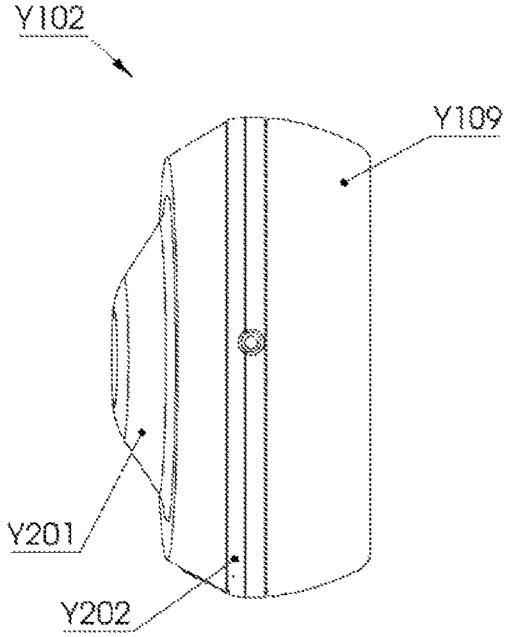
Figure 83E:
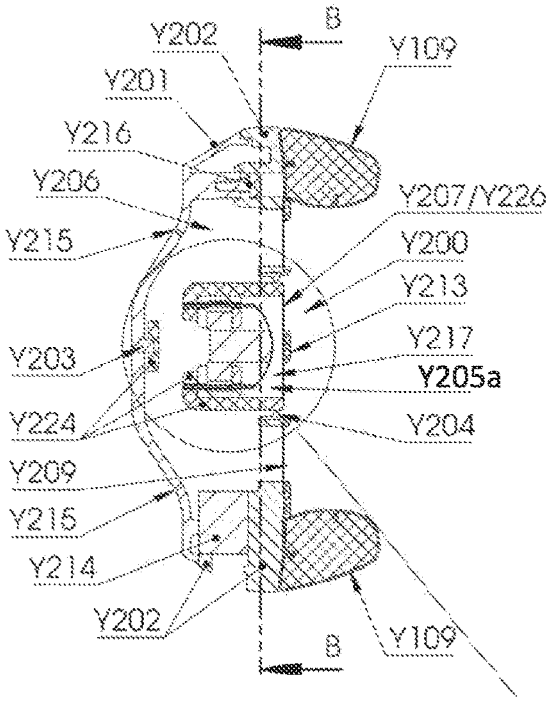
Figure 83F:
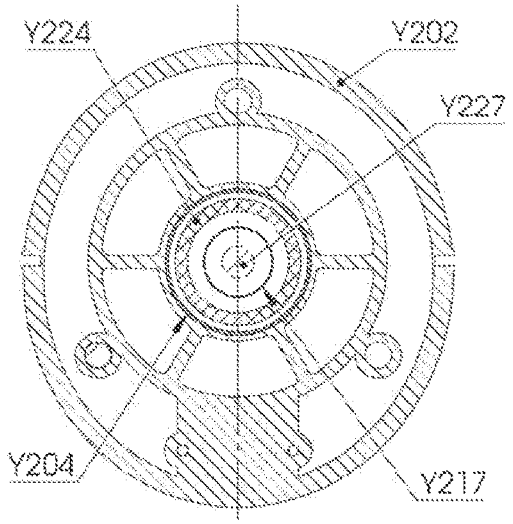
Figure 83G:
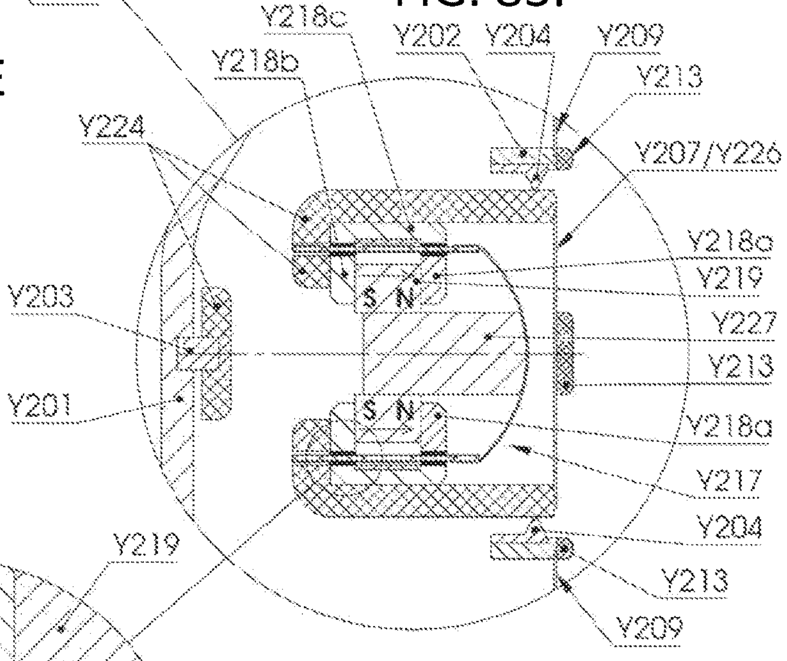
Figure 83H:
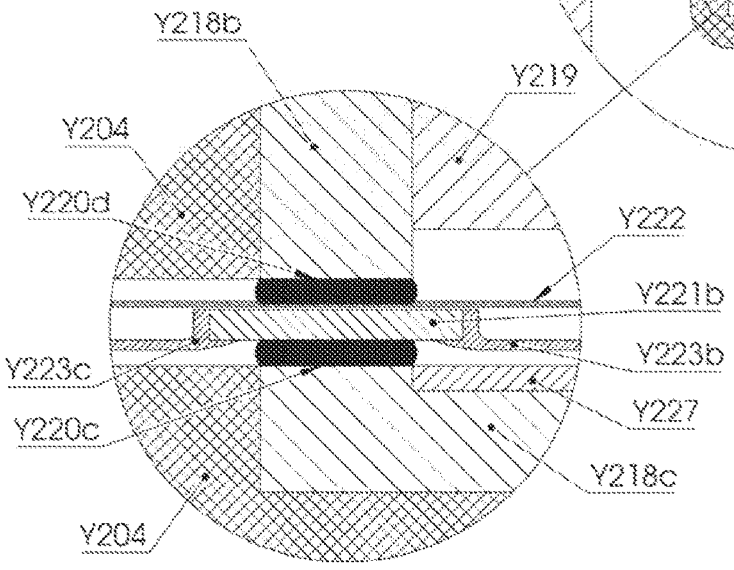
Figure 83I:
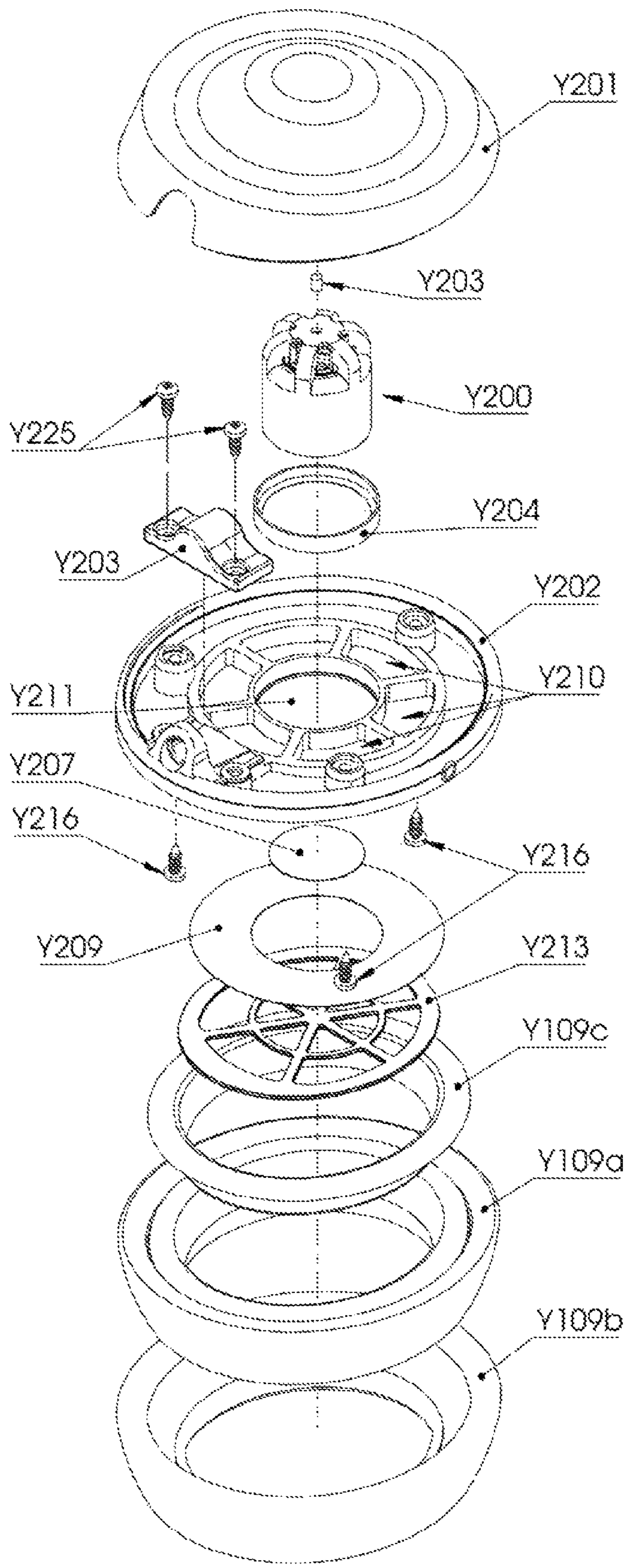
Figure 84:
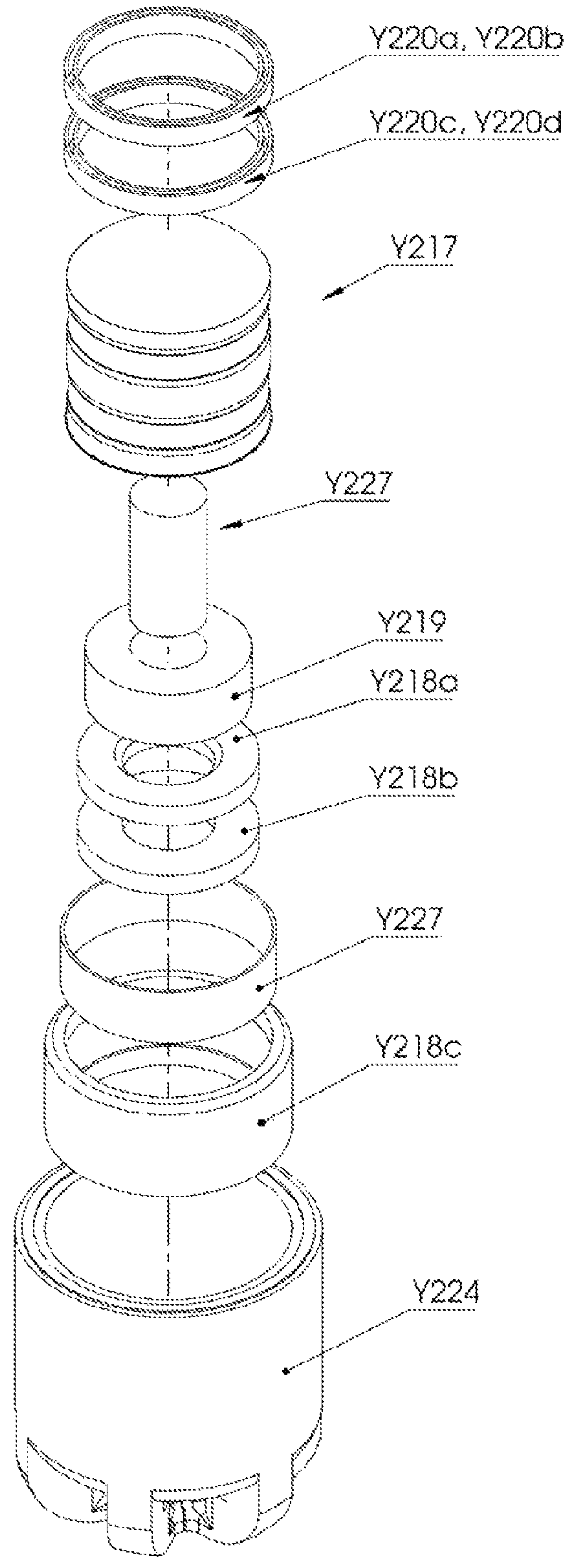
Figure 85:
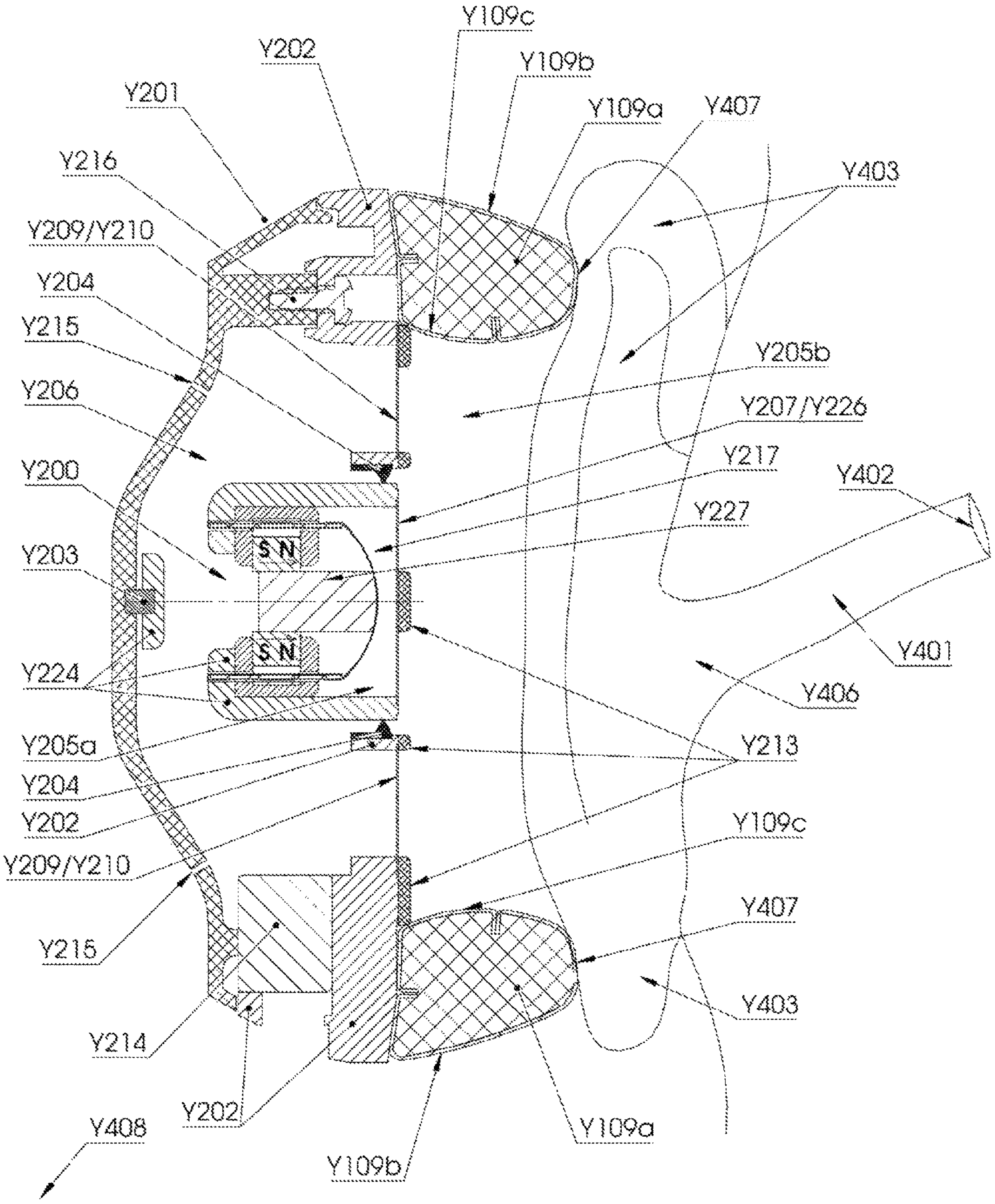
Figure 86A:
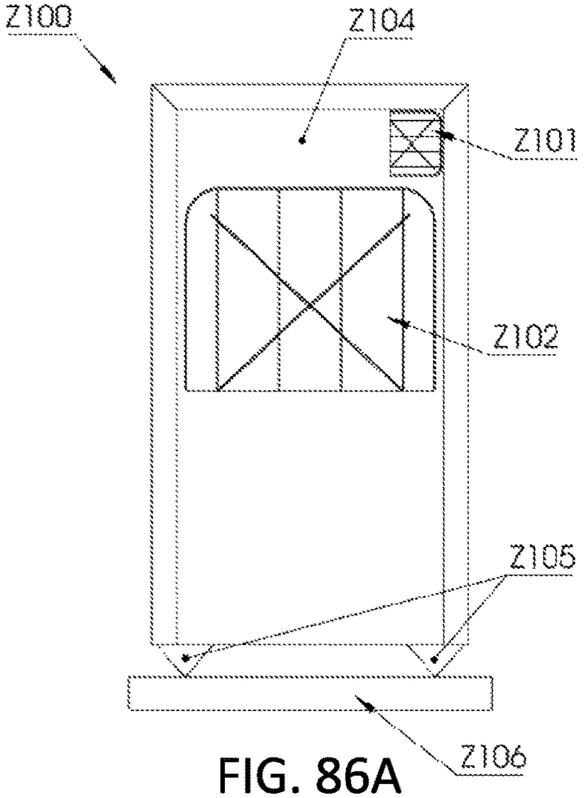
Figure 86B:
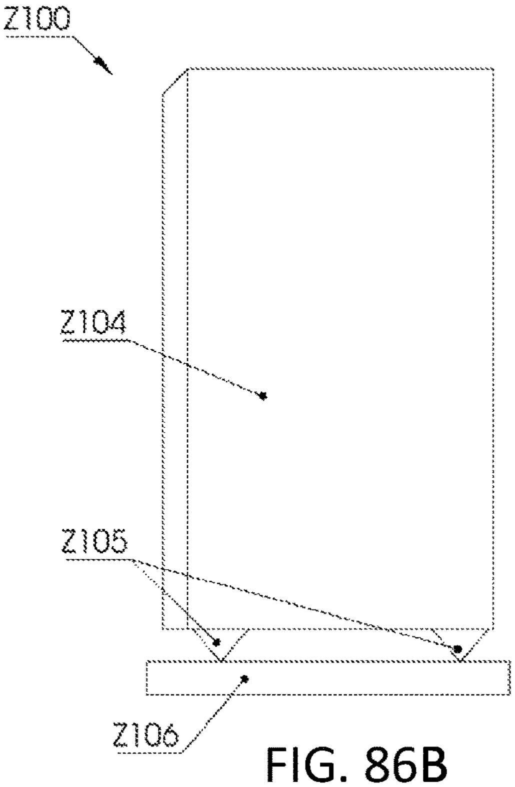
Figure 86C:
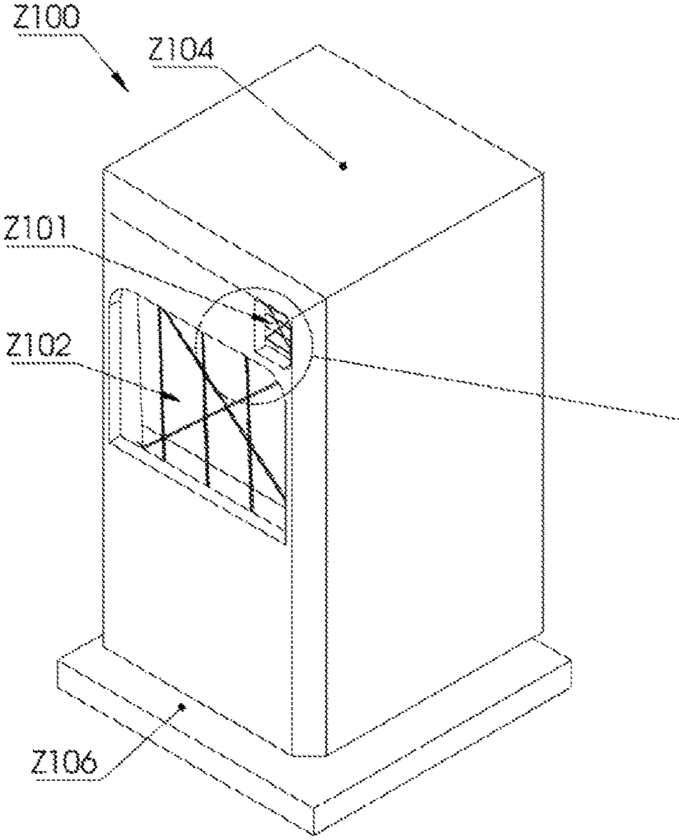
Figure 86D:
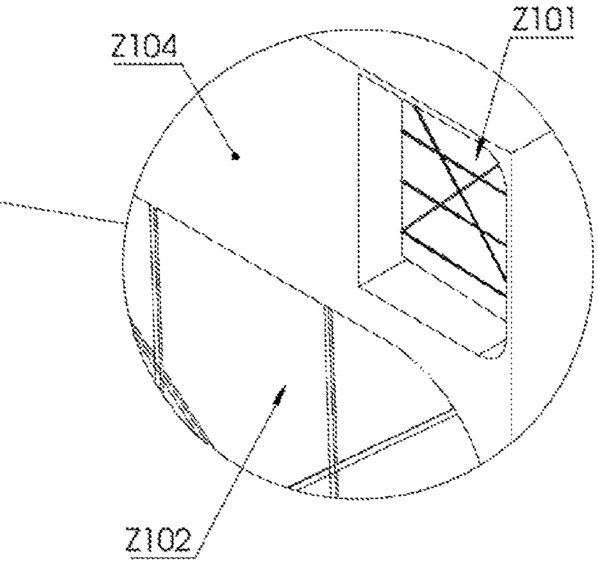

FIG. 57 shows a 3D isometric view, of an audio system comprising a smartphone connected to a pair of closed circumaural headphones, which uses the hinge-action loudspeaker driver of embodiment K in each ear cup;

FIGS. 58A-58H show the right side ear cup of the pair of headphones shown in FIG. 57, incorporating the hinge-action loudspeaker driver of embodiment K, with:

FIG. 58A being a 3D isometric view, showing the padded side of the cup,

FIG. 58B being a 3D isometric view, showing the outward facing, back side of the cup, FIG. 58C being a back side elevation view of the cup, FIG. 58D being a cross-sectional view (section D-D of FIG. 58C), FIG. 58E being a cross-sectional view (section E-E of FIG. 58D), FIG. 58F being a detail view of the decoupling mount shown in FIG. 58E;

FIG. 58G being a cross-sectional view (section F-F of FIG. 58D),

FIG. 58H being an exploded 3D isometric view,

FIG. 59 shows a schematic/cross-sectional view, including the ear cup shown in FIG. 58C held against a human ear and head by the headband of the headphone in FIG. 57;

FIGS. 60A-60D shows the force transmitting component of the embodiment K driver shown in FIGS. 56A-56O, with:

FIG. 60A being a 3D isometric view,

FIG. 60B being a side elevation view,

FIG. 60C being a back side elevation view,

FIG. 60D being a top view;

FIGS. 61A-61K show embodiment P, a linear-action earphone with a dome and dual coil diaphragm assembly that is suspended by a ferromagnetic fluid relative to the magnet assembly, with:

FIG. 61A being a 3D isometric view showing the ear plug side,

FIG. 61B being a 3D isometric view showing the outer body side,

FIG. 61C being a plan view,

FIG. 61D being a side elevation view,

FIG. 61E being an end elevation view,

FIG. 61F being a bottom view,

FIG. 61G being a cross-sectional view (section A-A of FIG. 61C),

FIG. 61H being a detail view of the magnet and diaphragm assembly FIG. 61G, FIG. 61I being a detail view of the view shown in FIG. 61H, FIG. 61J being a detail view of the view shown in FIG. 61I, FIG. 61K being an exploded 3D isometric view, FIGS. 62A-62D show the diaphragm assembly of the embodiment P driver shown in FIGS. 61A-61K, with:

FIG. 62A being a plan view,

FIG. 62B being a side elevation view,

FIG. 62C being a 3D isometric view,

FIG. 62D being an exploded 3D isometric view,

FIG. 63 shows a schematic, including a front view of the embodiment P earphone shown in FIGS. 61A-51K in use, inside a cross-sectional schematic of a human ear;

FIGS. 64A-64H show embodiment S, a hinge-action loudspeaker transducer with a composite diaphragm of low rotational inertia, hinged using a pair of modified ball bearing races, that have the balls biased with the contact surfaces that they roll against, with:

FIG. 64A being a 3D isometric view,

FIG. 64B being a front (tip of diaphragm) elevation view,

FIG. 64C being a plan view,

FIG. 64D being a cross-sectional view (section A-A of FIG. 64C),

FIG. 64E being a cross-sectional view (section C-C of FIG. 64C),

FIG. 64F being a detail view of the hinging assembly shown in FIG. 64E,

FIG. 64G being a cross-sectional view (section B-B of FIG. 64C),

FIG. 64H being a detail view of the hinging assembly shown in FIG. 64G;

FIG. 67I being a detail view of the hinging assembly shown in FIG. 67F;

FIGS. 65A-65E show the diaphragm assembly of the embodiment S, hinge-action loudspeaker transducer shown in FIGS. 64A-64H, with:

FIG. 65A being a 3D isometric view,

FIG. 65B being a front (tip of diaphragm) elevation view,

FIG. 65C being a plan view,

FIG. 65D being a side elevation view,

FIG. 65E being an exploded 3D isometric view;

FIGS. 66A-66E show the transducer base structure assembly of the embodiment S, hinge-action loudspeaker transducer shown in FIGS. 64A-64H, with:

FIG. 66A being a 3D isometric view,

FIG. 66B being a front elevation view,

FIG. 66C being a plan view,

FIG. 66D being a side elevation view,

FIG. 66E being an exploded 3D isometric view;

FIGS. 67A-67H show embodiment T, a hinge-action loudspeaker transducer with a composite diaphragm of low rotational inertia, hinged using a pair of modified ball bearing races, that have the balls biased with the contact surfaces that they roll against, with:

FIG. 67A being a 3D isometric view,

FIG. 67B being a front (tip of diaphragm) elevation view,

FIG. 67C being a plan view,

FIG. 67D being a cross-sectional view (section A-A of FIG. 67C),

FIG. 67E being a cross-sectional view (section C-C of FIG. 67C),

FIG. 67F being a partial cross-sectional view (section B-B of FIG. 67C), FIG. 67G being a detail view of the hinging assembly shown in FIG. 67E, FIG. 67H being a detail view of a biasing spring shown in FIG. 67G;

FIG. 67I being a detail view of rolling elements shown in FIG. 67F;

FIGS. 68A-68E show the diaphragm assembly of the embodiment T, hinge-action loudspeaker transducer shown in FIGS. 67A-67H, with:

FIG. 68A being a 3D isometric view,

FIG. 68B being a front (tip of diaphragm) elevation view,

FIG. 68C being a plan view,

FIG. 68D being a side elevation view,

FIG. 68E being an exploded 3D isometric view;

FIGS. 69A-69E show the transducer base structure assembly of the embodiment T, hinge-action loudspeaker transducer shown in FIGS. 67A-67H, with:

FIG. 69A being a 3D isometric view,

FIG. 69B being a front elevation view,

FIG. 69C being a plan view,

FIG. 69D being a side elevation view,

FIG. 69E being an exploded 3D isometric view;

FIGS. 70A-70B show one of the pair of ball bearing races of the hinge system used in the embodiment T transducer shown in FIGS. 67A-67H, with:

FIG. 70A being a 3D isometric view,

FIG. 70B being an exploded 3D isometric view;

FIGS. 71A-71F show embodiment U, a linear action transducer with a composite diaphragm that is decoupled to a baffle, with:

FIG. 71A being a 3D isometric view,

FIG. 71B being another 3D isometric view,

FIG. 71C being a plan view,

FIG. 71D being a side elevation view,

FIG. 71E being a cross-sectional view (section A-A of FIG. 71C),

FIG. 71F being an exploded 3D isometric view;

FIGS. 72A-72M show the embodiment U linear action transducer of embodiment U shown in FIGS. 71A-71F, with:

FIG. 72A being a 3D isometric view,

FIG. 72B being a plan view,

FIG. 72C being a side elevation view,

FIG. 72D being a cross-sectional view (section A-A of FIG. 72C),

FIG. 72E being a detail view of part of the magnet assembly shown in FIG. 72D, FIG. 72F being an exploded 3D isometric view, FIG. 72G being a 3D isometric view showing a FEM modal analysis depiction, a resultant displacement vector plot of the fundamental diaphragm resonance mode, FIG. 72H being a top view showing a FEM modal analysis depiction, a resultant displacement vector plot of the fundamental diaphragm resonance mode, FIG. 72I being a side elevation view showing a FEM modal analysis depiction, a resultant displacement vector plot of the fundamental diaphragm resonance mode, FIG. 72J being a detail view of the node axis region of the FEM modal analysis depiction shown in FIG. 72I, FIG. 72K being a 3D isometric view showing a FEM modal analysis depiction, a resultant displacement plot of the fundamental diaphragm resonance mode, FIG. 72L being a top view showing a FEM modal analysis depiction, a resultant displacement plot of the fundamental diaphragm resonance mode, FIG. 72M being a side elevation view showing a FEM modal analysis depiction, a resultant displacement plot of the fundamental diaphragm resonance mode;

FIGS. 73A-73D show transducer assembly of the embodiment U transducer and the decoupling mounts shown in FIGS. 71A-71F, with:

FIG. 73A being a 3D isometric view,

FIG. 73B being a 3D isometric view,

FIG. 73C being a 3D isometric view showing a FEM modal analysis depiction, a resultant displacement plot of a resonance mode involving movement of the driver base structure on the decoupling mounts, FIG. 73D being an alternative 3D isometric view showing a FEM modal analysis depiction, a resultant displacement plot of a resonance mode involving movement of the driver base structure on the decoupling mounts;

FIGS. 74A-74D show the diaphragm assembly of the embodiment U transducer shown in FIGS. 72A-72M, with:

FIG. 74A being a 3D isometric view,

FIG. 74B being a front elevation view,

FIG. 74C being a plan view,

FIG. 74D being an exploded 3D isometric view;

FIGS. 75A-75E show, a prior art bearing assembly incorporating preload, with:

FIG. 75A being a side elevation view,

FIG. 75B being a front elevation view,

FIG. 75C being a 3D isometric view,

FIG. 75D being a cross-sectional view (section A-A of FIG. 75A),

FIG. 75E being a detail view of the magnetic flux gap shown in FIG. 75D;

FIGS. 76A-76D show a bearing race of the bearing assembly shown in FIGS. 75A-75E, with:

FIG. 76A being a 3D isometric view,

FIG. 76B being a front elevation view,

FIG. 76C being a cross-sectional view (section E-E of FIG. 75B),

FIG. 76D being an exploded 3D isometric view;

FIGS. 77A-77C show embodiment W, a pair of open circumaural headphones, each side incorporating the Embodiment K hinge-action loudspeaker driver shown in FIGS. 56A-56O, with:

FIG. 77A being a 3D isometric view,

FIG. 77B being a plan view,

FIG. 77C being a side elevation view;

FIGS. 78A-78H show the right side ear cup of the pair of headphones shown in FIGS. 77A-77C, incorporating the hinge-action loudspeaker driver of embodiment W, with:

FIG. 78A being a 3D isometric view, showing the outward facing, back side of the cup, FIG. 78B being a 3D isometric view, showing the padded side of the cup, FIG. 78C being a back side elevation view of the cup, FIG. 78D being a cross-sectional view (section A-A of FIG. 78C), FIG. 78E being a cross-sectional view (section B-B of FIG. 78D), FIG. 78F being a detail view of the decoupling mount shown in FIG. 78E, FIG. 78G being a cross-sectional view (section D-D of FIG. 78D), FIG. 78H being an exploded 3D isometric view;

FIG. 79 shows a schematic/cross-sectional view, including the section shown in FIG. 78D ear cup in use, held against a human ear and head by the headband of the headphone in FIG. 77A;

FIGS. 80A-80E show embodiment X, an earphone incorporating the hinge action embodiment K transducer shown in FIGS. 56A-56O:

FIG. 80A being a 3D isometric view,

FIG. 80B being a plan view,

FIG. 80C being an end elevation view,

FIG. 80D being a cross-sectional view (section A-A of FIG. 80C),

FIG. 80E being an exploded 3D isometric view;

FIG. 81 shows a schematic, including a cross-sectional view of the embodiment P earphone shown in FIG. 80D in use, inside a cross-sectional schematic of a human ear;

FIGS. 82A-82C show embodiment Y, a supra-aural headphone incorporating a pair of decoupled linear-action loudspeaker drivers, the magnet assembly and diaphragm assembly of which are also used in Embodiment P of FIGS. 61A-61K, with:

FIG. 82A being a 3D isometric view,

FIG. 82B being a front view,

FIG. 82C being a side elevation view;

FIGS. 83A-83I show the right side ear cup of the pair of headphones shown in FIG. 82A, incorporating driver of embodiment P, with:

FIG. 83A being a 3D isometric view, showing the padded side of the cup,

FIG. 83B being a 3D isometric view, showing the outward facing, back side of the cup, FIG. 83C being a back side elevation view of the cup, FIG. 83D being a side elevation view of the cup, FIG. 83E being a cross-sectional view (section A-A of FIG. 83C), FIG. 83F being a cross-sectional view (section B-B of FIG. 83E), FIG. 83G being a detail view of the transducer shown in FIG. 83E, FIG. 83H being a detail view of the transducer magnetic flux gap, shown in FIG. 83G, FIG. 83I being an exploded 3D isometric view;

FIG. 84 shows an exploded 3D isometric view of the transducer assembly of the embodiment Y ear cup of FIGS. 83A-83I;

FIG. 85 shows a schematic, including a cross-sectional view of the embodiment Y supra-aural ear cup shown in FIG. 83E in use, sitting on a cross-sectional schematic of a human ear;

FIGS. 86A-86D show embodiment Z, a computer speaker standing on a floor, incorporating two drivers, a treble hinge action transducer and a mid-bass hinge action transducer, both similar to the embodiment K transducer shown in FIGS. 56A-56O, and decoupled from an enclosure using a decoupling system similar way to that shown in FIGS. 58A-58H, with:

FIG. 86A being a front view,

FIG. 86B being a side elevation view,

FIG. 86C being a 3D isometric view,

FIG. 86D being a detail view of FIG. 86C.

DETAILED DESCRIPTION OF PREFERRED EMBODIMENTS

Various embodiments or configurations of audio transducers or related structures, mechanisms, devices, assemblies or systems will now be described in detail. These will be described with reference to the figures. The audio transducer embodiments shown in the drawings are referred to as embodiments A, B, D, E, G, G9, H3, H4, K, P, S, T, U, W, X, Y and Z for the sake of clarity.

Embodiments or configurations of audio transducers or related structures, mechanisms, devices, assemblies or systems of the invention will be described in some cases with reference to an electroacoustic transducer, such as a loudspeaker driver. Unless otherwise stated, the audio transducers or related structures, mechanisms, devices, assemblies or systems may otherwise be implemented as or in an acoustoelectric transducer, such as a microphone. As such, the term audio transducer as used in this specification, and unless otherwise stated, is intended to include both loudspeaker and microphone implementations.

The embodiments or configurations of audio transducers or related structures, mechanisms, devices, assemblies or systems described herein are designed to address one or more types of unwanted resonances associated with audio transducer systems.

In each of the audio transducer embodiments herein described the audio transducer comprises a diaphragm assembly that is movably coupled relative to a base, such as a transducer base structure and/or part of a housing, support or baffle. The base has a relatively higher mass than the diaphragm assembly. A transducing mechanism associated with the diaphragm assembly moves the diaphragm assembly in response to electrical energy, in the case of an electroacoustic transducer. It will be appreciated that an alternative transducing mechanism may be implemented that otherwise transduces movement of the diaphragm assembly into electrical energy. In this specification, a transducing mechanism may also be referred to as an excitation mechanism.

In the embodiments of this invention, an electromagnetic transducing mechanism is used. An electromagnetic transducing mechanism typically comprises a magnetic structure configured to generate a magnetic field, and at least one electrical coil configured to locate within the magnetic field and move in response to received electrical signals. As the electromagnetic transducing mechanism does not require coupling between the magnetic structure and the electrical coil, generally one part of the mechanism will be coupled to the transducer base structure, and the other part of the mechanism will be coupled to the diaphragm assembly. In the preferred configurations described herein, the heavier magnetic structure forms part of the transducer base structure and the relatively lighter coil or coils form part of the diaphragm assembly. It will be appreciated that alternative transducing mechanisms, including for example piezoelectric, electrostatic or any other suitable mechanism known in the art, may otherwise be incorporated in each of the described embodiments without departing from the scope of the invention.

The diaphragm assembly is moveably coupled relative to the base via a diaphragm suspension mounting system. Two types of audio transducers are described in this specification: rotational action audio transducers in which the diaphragm assembly rotatably oscillates relative to the base; and linear action audio transducers in which the diaphragm assembly linearly reciprocates/oscillates relative to the base. Examples of rotational action audio transducers are shown in the audio transducers of embodiments A, B, D, E, K, S, T, W and X. In rotational action audio transducers, the suspension mounting system comprises a hinge system configured to rotatably couple the diaphragm assembly to the base. Examples of linear action audio transducers are shown in the audio transducers of embodiments G, G9, P, U and Y.

The audio transducer may be accommodated with a housing or surround to form an audio transducer assembly, which may also form an audio device or part of an audio device, such as part of an earphone or headphone device which may comprise multiple audio transducer assemblies for example. In some embodiments, the transducer base structure may form part of the housing or surround of an audio transducer assembly. The audio transducer, or at least the diaphragm assembly, is mounted to the housing or surround via a mounting system. A type of mounting system that is configured to decouple the audio transducer from the housing or surround to at least mitigate transmission of mechanical vibrations from the audio transducer to the housing (and vice versa) due to unwanted resonances during operation, for example, will be described with reference to some of the embodiments, and hereinafter referred to as a decoupling mounting system.

The following description has been divided into multiple sections to describe various structures, mechanisms, devices, assemblies or systems relating to audio transducers, and also to describe the various audio transducer embodiments incorporating these structures, mechanisms, devices, assemblies or systems. In particular, the description includes the following major sections:

Overview of audio transducer embodiments;

Rigid diaphragm structures and assemblies and audio transducers incorporating the same;

Diaphragm suspension systems and rotational action audio transducers incorporating the same;

Decoupling mounting systems and audio transducers incorporating the same;

Personal audio devices incorporating audio transducers of the present invention; and Preferred transducer base structure designs.

Although various structures, assemblies, mechanisms, devices or systems described under these sections are described in association with some of the audio transducer embodiments of this invention, it will be appreciated that these structures, assemblies, mechanisms, devices or systems may alternatively be incorporated in any other suitable audio transducer assembly without departing from the scope of the invention. Furthermore, the audio transducer embodiments of the invention incorporate certain combinations of one or more of various structures, assemblies, mechanisms, devices or systems as will be described. But, it will be appreciated that a person skilled in the art may alternatively construct an audio transducer incorporating any other combination of one or more of the various structures, assemblies, mechanisms, devices or systems described under these embodiments without departing from the scope of the invention.

The following description also includes a section for describing the various suitable audio transducer applications in which the audio transducer embodiments of the invention may be incorporated, or within which an audio transducer including any combination of the various structure, assemblies, mechanisms, devices or systems relating to audio transducers may be incorporated. Audio device embodiments, including personal audio devices such as headphones or earphones, incorporating such transducers will therefore also be described with reference to the drawings.

Methods of construction of audio transducers, audio devices or any of the various structures, assemblies, mechanisms, devices or systems have been described for some but not all embodiments for the sake of conciseness. Methods of construction associated with each of the described embodiments and/or the related structures, assemblies, mechanism, devices or systems that are apparent to those skilled in the relevant art from the following description are therefore also intended to be covered within the scope of this invention. Furthermore, the invention is also intended to cover methods of transducing audio signals using the principles and/or features of the audio transducers and related structures, assemblies, mechanism, devices or systems described herein.

A brief overview of some of the audio transducer embodiments is given first.

1. Overview of Audio Transducer Embodiments 1.1 Embodiment A Audio Transducer

FIGS. 1A-7F show an embodiment A audio transducer of the invention. The audio transducer is a rotational action audio transducer that comprises a diaphragm assembly A101 rotatably coupled to a transducer base structure A115 via a diaphragm suspension system. The diaphragm assembly comprises a substantially rigid diaphragm structure A1300. The features of this diaphragm structure are described in detail under section 2.2 of this specification. Possible variations of the diaphragm structure are also shown in FIGS. 8A-12D and described in detail under section 2.2 of this specification. The transducer base structure comprises a substantially rigid and compact geometry designed in accordance with the preferred design described under section 6 of this specification. A detailed description of the transducer base structure is also provided in section 2.2 of this specification.

As noted, the diaphragm assembly A101 is rotatably coupled to the transducer base structure A115 via a diaphragm suspension system. In this embodiment, a contact hinge system is used to rotatably couple the diaphragm assembly to the transducer base structure. This is shown in detail in FIGS. 2A-4D. The features of the contact hinge system relating to this embodiment are described in detail in section 3.2.2 of this specification. In alternative configurations of this embodiment, an alternative contact hinge system may be incorporated in the audio transducer. For example, the audio transducer may comprises: a contact hinge system as designed in accordance with the principles set out in section 3.2.1; a contact hinge system as described under sections 3.2.3a in relation to embodiment S; a contact hinge system as described under section 3.2.3b in relation to embodiment T; a contact hinge system as described under section 3.2.4 in relation to embodiment K; or a contact hinge system as described under section 3.2.5 in relation to embodiment E. In yet another set of alternative configurations, the contact hinge system of embodiment A may be substituted for any one of the flexible hinge systems described under section 3.3 of this specification. For example, the embodiment A audio transducer may alternatively incorporate a flexible hinge system as described under section 3.3.1 in relation to embodiment B; any one of the alternative flexible hinge systems described under section 3.3.1 of this specification; or a flexible hinge system as described under section 3.3.3 in relation to embodiment D.

As shown in FIGS. 6A-6I and 7A-7F, the audio transducer of embodiment A is preferably housed within a housing A613 configured to accommodate the transducer. The housing may be of any type necessary to construct a particular audio device depending on the application. As described in detail under section 2.3 of this specification, in situ the diaphragm assembly accommodated within the housing comprises an outer periphery that is substantially free from physical connection with an interior of the housing. In alternative configurations of this embodiment, however, the diaphragm assembly may not have an outer periphery that is substantially free from physical connection with the associated housing in situ.

The audio transducer is preferably mounted relative to the housing body A601 via a decoupling mounting system of the invention. The decoupling mounting system of embodiment A is described in detail under section 4.2.1 of this specification. In alternative configurations of this embodiment, the decoupling mounting system may be substituted by any other decoupling mounting system described in the specification, including for example: the decoupling mounting system described in section 4.2.2 in relation to embodiment E; the decoupling mounting system described section 4.2.3 in relation to embodiment U; or any other decoupling mounting system that may be designed in accordance with the design principles outlined in section 4.3 of this specification.

The performance of the embodiment A audio transducer is shown in FIG. 14 and described in section 4.2.1 of this specification.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 2.2 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment A is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment A. For example, the audio transducer in embodiment A may be housed within any one of the surrounds or housings described under sections 5.2.2, 5.5.3, 5.2.4 or 5.2.7 for the embodiment K, W, X and H personal audio devices respectively and implemented as a personal audio device, or incorporated in associated with any other personal audio device implementation, modification or variation as outlined under section 5.2.8 of this specification. Another implementation is shown in relation to FIG. 50A-50B, where the embodiment A audio transducer is used in a headphone device. As shown, each headphone cup comprises, multiple audio transducers constructed in accordance with embodiment A, to provide the full bandwidth of the speaker. FIGS. 51A-51B show yet another implementation where a single embodiment A audio transducer is inserted in either earphone plug of a set of earphones.

It will be appreciated that the embodiment A audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment A: the diaphragm assembly and structure, the hinge system, the decoupling mounting system, the transducer base structure and/or the transducing mechanism.

1.2 Embodiment B Audio Transducer

FIGS. 15A-15F, 16A-16G, 17A-17D and 18A-18F show an embodiment B audio transducer of the invention. The audio transducer is a rotational action audio transducer that comprises a diaphragm assembly B101 rotatably coupled to a transducer base structure B120 via a diaphragm suspension system. The diaphragm assembly comprises a substantially rigid diaphragm structure. The features of this diaphragm structure are described in detail under section 3.3.1f of this specification. The diaphragm structure may be substituted for any other diaphragm structure described under sections 2.2 and 2.3 of this specification. The transducer base structure comprises a substantially rigid and compact geometry designed in accordance with the preferred design described under section 6 of this specification. A detailed description of the transducer base structure is also provided in section 3.3.1e of this specification.

As noted, the diaphragm assembly B101 is rotatably coupled to the transducer base structure B120 via a diaphragm suspension system. In this embodiment, a flexible hinge system is used to rotatably couple the diaphragm assembly to the transducer base structure. This is shown in detail in FIGS. 16A-16G and 17A-17D. The features of the flexible hinge system relating to this embodiment are described in detail in sections 3.3.1a-3.3.1d of this specification. In alternative configurations of this embodiment, an alternative flexible hinge system may be incorporated in the audio transducer. For example any one of the alternative flexible hinge systems described under section 3.3.2 of this specification, or a flexible hinge system as described under section 3.3.3 in relation to embodiment D may be incorporated instead. In yet another set of alternative configurations, the flexible hinge system of embodiment B may be substituted by a contact hinge system of the invention. For example, the audio transducer of embodiment B may alternatively comprise: a contact hinge system as designed in accordance with the principles set out in section 3.2.1; a contact hinge system as described under section 3.2.2 in relation to embodiment A; a contact hinge system as described under sections 3.2.3a in relation to embodiment S; a contact hinge system as described under section 3.2.3b in relation to embodiment T; a contact hinge system as described under section 3.2.4 in relation to embodiment K; or a contact hinge system as described under section 3.2.5 in relation to embodiment E.

As shown in FIGS. 18A-18F, the audio transducer of embodiment B may comprise a diaphragm housing B401 configured to accommodate at least the diaphragm assembly. The diaphragm housing is rigidly coupled and extends from the transducer base structure to house the adjacent diaphragm assembly. The housing in combination with the transducer base structure forms a transducer base assembly. The diaphragm assembly housing is described in detail under section 3.3.1 g of this specification. In situ the diaphragm assembly accommodated within the housing comprises an outer periphery that is substantially free from physical connection with an interior of the housing. Air gaps B405 and B406 separate the diaphragm periphery from the housing. As such the audio transducer of this embodiment may be constructed in accordance with any one or more of the design principles outlined in section 2.3 of this specification. In alternative configurations of this embodiment, however, the diaphragm assembly may not have an outer periphery that is substantially free from physical connection with the associated housing in situ.

The audio transducer implemented in an audio device may be mounted relative a housing or other surround of the audio device via a decoupling mounting system of the invention. For example, the decoupling mounting system described in section 4.2.2 in relation to Embodiment E may be used. Alternatively, any other decoupling mounting system described in the specification may be utilised instead, including for example: the decoupling mounting system described in section 4.2.1 in relation to embodiment A; the decoupling mounting system described section 4.2.3 in relation to embodiment U; or any other decoupling mounting system that may be designed in accordance with the design principles outlined in section 4.3 of this specification.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 3.3.1e of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment B is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment B. For example, the audio transducer in embodiment B may be housed within any one of the surrounds or housings described under sections 5.2.2, 5.5.3, 5.2.4 or 5.2.7 for the embodiment K, W, X and H personal audio devices respectively and implemented as a personal audio device, or incorporated in associated with any other personal audio device implementation, modification or variation as outlined under section 5.2.8 of this specification.

It will be appreciated that the embodiment B audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment B: the diaphragm assembly and structure, the hinge system, the decoupling mounting system, the transducer base structure and/or the transducing mechanism.

1.3 Embodiment D Audio Transducer

FIGS. 32A-32E and 33A-33E show an embodiment D audio transducer of the invention. The audio transducer is a rotational action audio transducer that comprises a diaphragm assembly rotatably coupled to a transducer base structure via a diaphragm suspension system. The diaphragm assembly comprises multiple substantially rigid diaphragm structures radially spaced about the axis of rotation. The features of this diaphragm assembly design is described in section 3.3.3 of this specification. Each diaphragm structure may be substituted by any other diaphragm structure described under sections 2.2 and 2.3 of this specification in alternative configurations. The transducer base structure comprises a substantially rigid and compact geometry designed in accordance with the preferred design described under section 6 of this specification. A detailed description of the transducer base structure is also provided in section 3.3.3 of this specification.

As noted, the diaphragm assembly is rotatably coupled to the transducer base structure via a diaphragm suspension system. In this embodiment, a flexible hinge system is used to rotatably couple the diaphragm assembly to the transducer base structure. This is shown in detail in FIG. 33E. The features of the flexible hinge system relating to this embodiment are described in detail in section 3.3.3 of this specification. In alternative configurations of this embodiment, an alternative flexible hinge system may be incorporated in the audio transducer. For example any one of the alternative flexible hinge systems described under section 3.3.2 of this specification, or a flexible hinge system as described under section 3.3.1 in relation to embodiment B may be incorporated instead. In yet another set of alternative configurations, the flexible hinge system of embodiment D may be substituted by a contact hinge system of the invention. For example, the audio transducer of embodiment D may alternatively comprise: a contact hinge system as designed in accordance with the principles set out in section 3.2.1; a contact hinge system as described under section 3.2.2 in relation to embodiment A; a contact hinge system as described under sections 3.2.3a in relation to embodiment S; a contact hinge system as described under section 3.2.3b in relation to embodiment T; a contact hinge system as described under section 3.2.4 in relation to embodiment K; or a contact hinge system as described under section 3.2.5 in relation to embodiment E.

As shown in FIGS. 33A-33E, the audio transducer of embodiment B may comprise a diaphragm housing D203 configured to accommodate at least the diaphragm assembly. The diaphragm housing is rigidly coupled and extends from the transducer base structure to house the adjacent diaphragm assembly. The housing in combination with the transducer base structure forms a transducer base assembly. The diaphragm assembly housing is described in detail under section 3.3.3 of this specification. In situ the diaphragm assembly accommodated within the housing comprises an outer periphery that is substantially free from physical connection with an interior of the housing. Air gaps separate the diaphragm periphery from the housing. As such the audio transducer of this embodiment may be constructed in accordance with any one or more of the design principles outlined in section 2.3 of this specification. In alternative configurations of this embodiment, however, the diaphragm assembly may not have an outer periphery that is substantially free from physical connection with the associated housing in situ.

The audio transducer implemented in an audio device may be mounted relative a housing or other surround of the audio device via a decoupling mounting system of the invention. For example, the decoupling mounting system described in section 4.2.2 in relation to Embodiment E may be used. Alternatively, any other decoupling mounting system described in the specification may be utilised instead, including for example: the decoupling mounting system described in section 4.2.1 in relation to embodiment A; the decoupling mounting system described section 4.2.3 in relation to embodiment U; or any other decoupling mounting system that may be designed in accordance with the design principles outlined in section 4.3 of this specification.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 3.3.3 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment B is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment B. For example, the audio transducer in embodiment D may be housed within any one of the surrounds or housings described under sections 5.2.2, 5.5.3, 5.2.4 or 5.2.7 for the embodiment K, W, X and H personal audio devices respectively and implemented as a personal audio device, or incorporated in associated with any other personal audio device implementation, modification or variation as outlined under section 5.2.8 of this specification.

It will be appreciated that the embodiment D audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment D: the diaphragm assembly and structure, the hinge system, the decoupling mounting system, the transducer base structure and/or the transducing mechanism.

1.4 Embodiment E Audio Transducer

FIGS. 34A-34M, 35A-35H, 36 and 37A-37C show an embodiment E audio transducer of the invention. The audio transducer is a rotational action audio transducer that comprises a diaphragm assembly E101 rotatably coupled to a transducer base structure E118 via a diaphragm suspension system. The diaphragm assembly comprises a substantially rigid diaphragm structure. The features of this diaphragm structure are described in detail under section 3.2.5 of this specification. The diaphragm structure may be substituted for any other diaphragm structure described under sections 2.2 and 2.3 of this specification. The transducer base structure comprises a substantially rigid and compact geometry designed in accordance with the preferred design described under section 6 of this specification. A detailed description of the transducer base structure is also provided in section 3.3.5 of this specification.

As noted, the diaphragm assembly E101 is rotatably coupled to the transducer base structure E118 via a diaphragm suspension system. In this embodiment, a contact hinge system is used to rotatably couple the diaphragm assembly to the transducer base structure. This is shown in detail in FIGS. 34B-34J and 36. The features of the contact hinge system relating to this embodiment are described in detail in section 3.2.5 of this specification. In alternative configurations of this embodiment, an alternative contact hinge system may be incorporated in the audio transducer. For example, the audio transducer may comprises: a contact hinge system as designed in accordance with the principles set out in section 3.2.1; a contact hinge system as described under section 3.2.2 in relation to embodiment A; a contact hinge system as described under sections 3.2.3a in relation to embodiment S; a contact hinge system as described under section 3.2.3b in relation to embodiment T; or a contact hinge system as described under section 3.2.4 in relation to embodiment K. In yet another set of alternative configurations, the contact hinge system of embodiment E may be substituted for any one of the flexible hinge systems described under section 3.3 of this specification. For example, the embodiment E audio transducer may alternatively incorporate a flexible hinge system as described under section 3.3.1 in relation to embodiment B; any one of the alternative flexible hinge systems described under section 3.3.1 of this specification; or a flexible hinge system as described under section 3.3.3 in relation to embodiment D.

As shown in FIGS. 37A-37C, the audio transducer of embodiment E may comprise a diaphragm housing E201 configured to accommodate at least the diaphragm assembly. The diaphragm housing is rigidly coupled and extends from the transducer base structure to house the adjacent diaphragm assembly. The housing in combination with the transducer base structure forms a transducer base assembly. The diaphragm assembly housing is described in detail under section 4.2.2 of this specification. In situ the diaphragm assembly accommodated within the housing comprises an outer periphery that is substantially free from physical connection with an interior of the housing. Air gaps E205 and E206 separate the diaphragm periphery from the housing. As such the audio transducer of this embodiment may be constructed in accordance with any one or more of the design principles outlined in section 2.3 of this specification. In alternative configurations of this embodiment, however, the diaphragm assembly may not have an outer periphery that is substantially free from physical connection with the associated housing in situ.

The audio transducer implemented in an audio device may be mounted relative a housing or other surround of the audio device via a decoupling mounting system of the invention. A possible decoupling mounting system is described in detail under section 4.2.2 of this specification. Alternatively, any other decoupling mounting system described in the specification may be utilised instead, including for example: the decoupling mounting system described in section 4.2.1 in relation to embodiment A; the decoupling mounting system described section 4.2.3 in relation to embodiment U; or any other decoupling mounting system that may be designed in accordance with the design principles outlined in section 4.3 of this specification.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 3.2.5 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment E is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment E. For example, the audio transducer in embodiment E may be housed within any one of the surrounds or housings described under sections 5.2.2, 5.5.3, 5.2.4 or 5.2.7 for the embodiment K, W, X and H personal audio devices respectively and implemented as a personal audio device, or incorporated in associated with any other personal audio device implementation, modification or variation as outlined under section 5.2.8 of this specification.

It will be appreciated that the embodiment E audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment E: the diaphragm assembly and structure, the hinge system, the decoupling mounting system, the transducer base structure and/or the transducing mechanism.

1.5 Embodiment G Audio Transducer

FIGS. 39A-39C and 40A-40D show an embodiment G audio transducer of the invention. The audio transducer is a linear action audio transducer that comprises a diaphragm assembly G101 moveably coupled to a transducer base structure (A104, G106, and G107) via a diaphragm suspension system G102, G105. The diaphragm assembly comprises a substantially rigid diaphragm structure. The features of this diaphragm structure are described in detail under section 2.2 of this specification. The diaphragm structure may be substituted for any other diaphragm structure described under sections 2.2 and 2.3 of this specification. Some variations on the diaphragm structure of this embodiment are also described in section 2.2 of this specification with reference to FIGS. 41A-46D. The transducer base structure comprises a substantially rigid and compact geometry designed in accordance with the preferred design described under section 6 of this specification. A detailed description of the transducer base structure is also provided in section 2.2 of this specification.

As noted, the diaphragm assembly G101 is linearly coupled to the transducer base structure via a diaphragm suspension system. In this embodiment, a conventional flexible surround G102 and spider G105 suspension is used as shown in FIG. 39C and described in detail in section 2.2. In alternative configurations of this embodiment, a ferromagnetic diaphragm suspension may be used as described, for example, in relation to the embodiment P and Y audio transducers in section 5.2.1 and 5.2.5 of this specification.

As shown in FIGS. 39A-39C, the audio transducer may comprise a diaphragm housing or surround G103 configured to accommodate at least the diaphragm assembly. In situ the diaphragm assembly accommodated within the housing comprises an outer periphery that is substantially physical connection with an interior of the housing via flexible surround G102 and spider G105. In alternative configurations, as shown in sub-configuration G9 in FIGS. 47A-47G, the audio transducer may be constructed with an outer periphery of the diaphragm that is substantially free from physical connection with the surround. In some configurations a ferrofluid support may replace the surround and spider or the surround and spider connections may be reduced significantly to meet the criteria of substantially free set in section 2.3.

The audio transducer implemented in an audio device may be mounted relative a housing or other surround of the audio device via a decoupling mounting system of the invention. Possible decoupling mounting systems includes for example: the decoupling mounting system described in section 4.2.3 in relation to embodiment U; or any other decoupling mounting system that may be designed in accordance with the design principles outlined in section 4.3 of this specification.

The audio transducer of this embodiment comprises an electromagnetic excitation/transducing mechanism comprising a permanent magnet G104 with inner and outer pole pieces G106, G107 that generate a magnetic field, and one or more force transferring or generation components, in the form of one or more coils G112 that are operatively connected with the magnetic field. This is described in detail under section 2.2 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment G is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment G. For example, the audio transducer in embodiment G may be housed within any one of the surrounds or housings described under sections 5.2.1 and 5.2.5 for the embodiment P and Y personal audio devices respectively and implemented as a personal audio device, or incorporated and associated with any other personal audio device implementation, modification or variation as outlined under section 5.2.8 of this specification.

It will be appreciated that the embodiment G audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment G: the diaphragm assembly and structure, the transducer base structure and/or the transducing mechanism.

1.6 Embodiment K Audio Transducer and Personal Audio Device

FIGS. 56A-60D show an embodiment K audio device having an embodiment K audio transducer of the invention. The audio transducer of embodiment K is a rotational action audio transducer that comprises a diaphragm assembly K101 rotatably coupled to a transducer base structure K118 via a diaphragm suspension system. The diaphragm assembly comprises a substantially rigid diaphragm structure. The features of this diaphragm structure are described in detail under section 5.2.2 of this specification. The diaphragm structure may be substituted for any other diaphragm structure described under sections 2.2 and 2.3 of this specification. The transducer base structure comprises a substantially rigid and compact geometry designed in accordance with the preferred design described under section 6 of this specification. A detailed description of the transducer base structure is also provided in section 5.2.2 of this specification.

As noted, the diaphragm assembly K101 is rotatably coupled to the transducer base structure K118 via a diaphragm suspension system. In this embodiment, a contact hinge system is used to rotatably couple the diaphragm assembly to the transducer base structure. This is shown in detail in FIGS. 56H-56M. The features of the contact hinge system relating to this embodiment are described in detail in section 3.2.4 of this specification. In alternative configurations of this embodiment, an alternative contact hinge system may be incorporated in the audio transducer. For example, the audio transducer may comprises: a contact hinge system as designed in accordance with the principles set out in section 3.2.1; a contact hinge system as described under section 3.2.2 in relation to embodiment A; a contact hinge system as described under sections 3.2.3a in relation to embodiment S; a contact hinge system as described under section 3.2.3b in relation to embodiment T; or a contact hinge system as described under section 3.2.5 in relation to embodiment E. In yet another set of alternative configurations, the contact hinge system of embodiment K may be substituted for any one of the flexible hinge systems described under section 3.3 of this specification. For example, the embodiment K audio transducer may alternatively incorporate a flexible hinge system as described under section 3.3.1 in relation to embodiment B; any one of the alternative flexible hinge systems described under section 3.3.1 of this specification; or a flexible hinge system as described under section 3.3.3 in relation to embodiment D.

As shown in FIGS. 58A-58H and 59, the audio transducer of embodiment K is preferably housed within a surround K301 of the device configured to accommodate the transducer. The housing may be of any type necessary to construct a particular audio device depending on the application. In the preferred implementation of this embodiment, the audio transducer is housed within a personal audio device, and in particular with a headphone cup of a headphone device. The headphone cup may also comprise any form of fluid passage configured to provide a restrictive gases flow path from the first cavity to another volume of air during operation, to help dampen resonances and/or moderate base boost. This implementation is described in further detail in section 5.2.2 of this specification. Also, as further described in detail under section 5.2.2 of this specification, in situ the diaphragm assembly accommodated within the housing comprises an outer periphery that is substantially free from physical connection with an interior of the housing. In alternative configurations of this embodiment, however, the diaphragm assembly may not have an outer periphery that is substantially free from physical connection with the associated housing in situ.

The audio transducer is preferably mounted relative to the housing via a decoupling mounting system of the invention. The decoupling mounting system of embodiment K is described in detail under section 5.2.2 of this specification and is similar to that described in relation to embodiment A, under section 4.2.1. In alternative configurations of this embodiment, the decoupling mounting system may be substituted by any other decoupling mounting system described in the specification, including for example: the decoupling mounting system described in section 4.2.2 in relation to embodiment E; the decoupling mounting system described section 4.2.3 in relation to embodiment U; or any other decoupling mounting system that may be designed in accordance with the design principles outlined in section 4.3 of this specification.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 5.2.2 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment K is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment K. For example, the audio transducer in embodiment K may be housed within any one of the surrounds or housings described under sections 5.5.3 and 5.2.4 for the embodiment W and X personal audio devices respectively, or it may be incorporated in associated with any other personal audio device implementation, modification or variation as outlined under section 5.2.8 of this specification.

It will be appreciated that the embodiment K audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment K: the diaphragm assembly and structure, the hinge system, the decoupling mounting system, the transducer base structure, the transducing mechanism; and/or the housing including the air leak fluid passages and/or sealability of the interface.

1.7 Embodiment S Audio Transducer

FIGS. 64A-66E show an embodiment S audio transducer of the invention. The audio transducer is a rotational action audio transducer that comprises a diaphragm assembly S102 rotatably coupled to a transducer base structure S101 via a diaphragm suspension system. The diaphragm assembly comprises a substantially rigid diaphragm structure. The features of this diaphragm structure are described in detail under section 3.2.3b of this specification. The transducer base structure comprises a substantially rigid and compact geometry designed in accordance with the preferred design described under section 6 of this specification.

As noted, the diaphragm assembly S102 is rotatably coupled to the transducer base structure S101 via a diaphragm suspension system. In this embodiment, a contact hinge system is used to rotatably couple the diaphragm assembly to the transducer base structure and is constructed in accordance with the principles set out in section 3.2.1. This is shown in detail in FIGS. 64A-64H and 65A-65E. The features of the contact hinge system relating to this embodiment are described in detail in section 3.2.3b of this specification. This embodiment shows an alternative contact hinge system which may be incorporated in any rotational action audio transducer embodiment of the invention, including for example embodiments A, B, D, E, K, T, W and X.

1.8 Embodiment T Audio Transducer

FIGS. 67A-70B show an embodiment T audio transducer of the invention. The audio transducer is a rotational action audio transducer that comprises a diaphragm assembly T102 rotatably coupled to a transducer base structure T101 via a diaphragm suspension system. The diaphragm assembly comprises a substantially rigid diaphragm structure. The features of this diaphragm structure are described in detail under section 3.2.3c of this specification. The transducer base structure comprises a substantially rigid and compact geometry designed in accordance with the preferred design described under section 6 of this specification.

As noted, the diaphragm assembly T102 is rotatably coupled to the transducer base structure T101 via a diaphragm suspension system. In this embodiment, a contact hinge system is used to rotatably couple the diaphragm assembly to the transducer base structure and is constructed in accordance with the principles set out in section 3.2.1. This is shown in detail in FIGS. 67A-67H, 69A-69E and 70A-70B. The features of the contact hinge system relating to this embodiment are described in detail in section 3.2.3c of this specification. This embodiment shows an alternative contact hinge system which may be incorporated in any rotational action audio transducer embodiment of the invention, including for example embodiments A, B, D, E, K, S, W and X.

1.9 Embodiment U Audio Transducer

FIGS. 71A-74D show an embodiment U audio transducer of the invention. The audio transducer of embodiment U is a linear action audio transducer that comprises a diaphragm assembly U201 linearly coupled to a transducer base structure U202 via a diaphragm suspension system. The diaphragm assembly comprises a substantially rigid diaphragm structure. The features of this diaphragm structure are described in detail under section 4.2.3 of this specification. The diaphragm structure may be substituted for any other diaphragm structure described under sections 2.2 and 2.3 of this specification, for example any of the diaphragm structures described in relation to the embodiment G audio transducer. Alternatively it may be a diaphragm assembly as described for embodiments P and Y under sections 5.2.1 and 5.2.5 of this specification. The transducer base structure U202 comprises a substantially rigid and compact geometry designed in accordance with the preferred design described under section 6 of this specification. A detailed description of the transducer base structure is also provided in section 4.2.3 of this specification.

As noted, the diaphragm assembly U201 is linearly coupled to the transducer base via a diaphragm suspension system. In this embodiment, a ferromagnetic fluid suspension system is used as described in section 4.2.3. This may be similar or the same as the ferromagnetic fluid suspension of embodiments P and Y described in sections 5.2.1 and 5.2.5 respectively. In alternative configurations of this embodiment, any one of the suspension systems described in section 2.2 in relation to embodiment G may be utilised instead.

Also, as further described in detail under section 4.2.3 of this specification, in situ the diaphragm assembly accommodated within the surround U102 comprises an outer periphery that is substantially free from physical connection with an interior of the housing. In alternative configurations of this embodiment, however, the diaphragm assembly may not have an outer periphery that is substantially free from physical connection with the associated housing in situ.

As shown in FIGS. 71A-71F and 72A-72M, the audio transducer of embodiment U is preferably housed within a surround U102 of the device configured to accommodate the transducer. The surround may be of any type necessary to construct a particular audio device depending on the application.

A decoupling mounting system U103 is provided to mount the audio transducer to the surround. The decoupling mounting system of embodiment U is described in detail under section 4.2.3. In alternative configurations of this embodiment, the decoupling mounting system may be substituted by any other decoupling mounting system described in the specification, including for example: the decoupling mounting system described for embodiment Y under in section 5.2.5; or any other decoupling mounting system that may be designed in accordance with the design principles outlined in section 4.3 of this specification.

The performance of this audio transducer embodiment is shown in FIGS. 73C and 73D and described in section 4.2.3.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 4.2.3 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment U is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment U. For example, the audio transducer in embodiment U may be housed within any one of the surrounds or housings described under sections 5.5.1-5.2.5 for the embodiment P, K, W, X and Y personal audio devices respectively, or it may be incorporated in associated with any other personal audio device implementation, modification or variation as outlined under section 5.2.8 of this specification.

It will be appreciated that the embodiment U audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment U: the diaphragm suspension system, the transducer base structure, the transducing mechanism; and/or the decoupling mounting system.

1.10 Embodiment P Audio Transducer and Personal Audio Device

FIGS. 61A-63 show an embodiment P audio device having an embodiment P audio transducer of the invention. The audio transducer of embodiment P is a linear action audio transducer that comprises a diaphragm assembly P110 linearly coupled to a transducer base P102 via a diaphragm suspension system. The diaphragm assembly comprises a substantially rigid diaphragm structure. The features of this diaphragm structure are described in detail under section 5.2.1 of this specification. The diaphragm structure may be substituted for any other diaphragm structure described under sections 2.2 and 2.3 of this specification, for example any of the diaphragm structures described in relation to the embodiment G audio transducer. The transducer base comprises a substantially rigid and compact geometry designed in accordance with the preferred design described under section 6 of this specification. In this embodiment, the base forms part of the housing. A detailed description of the transducer base is also provided in section 5.2.1 of this specification.

As noted, the diaphragm assembly P110 is linearly coupled to the transducer base via a diaphragm suspension system. In this embodiment, a ferromagnetic fluid suspension system is used as described in section 5.2.1. In alternative configurations of this embodiment, any one of the suspension systems described in section 2.2 in relation to embodiment G may be utilised instead.

Also, as further described in detail under section 5.2.1 of this specification, in situ the diaphragm assembly accommodated within the housing comprises an outer periphery that is substantially free from physical connection with an interior of the housing. In alternative configurations of this embodiment, however, the diaphragm assembly may not have an outer periphery that is substantially free from physical connection with the associated housing in situ.

As shown in FIGS. 61G and 61J, the audio transducer of embodiment P is preferably housed within a surround P102/P103 of the device configured to accommodate the transducer. The housing may be of any type necessary to construct a particular audio device depending on the application. In the preferred implementation of this embodiment, the audio transducer is housed within a personal audio device, and in particular with an earphone housing of an earphone device. The earphone housing may also comprise any form of fluid passage configured to provide a restrictive gases flow path from the first cavity to another volume of air during operation, to help dampen resonances and/or moderate base boost. This implementation is described in further detail in section 5.2.1 of this specification.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 5.2.1 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment P is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment P. For example, the audio transducer in embodiment P may be housed within any one of the surrounds or housings described under sections 5.5.2-5.2.5 for the embodiment K, W, X and Y personal audio devices respectively, or it may be incorporated in associated with any other personal audio device implementation, modification or variation as outlined under section 5.2.8 of this specification.

It will be appreciated that the embodiment P audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment P: the diaphragm assembly and structure, the diaphragm suspension system, the transducer base, the transducing mechanism; and/or the housing including the air leak fluid passages and/or sealability of the interface.

1.11 Embodiment W Audio Transducer and Personal Audio Device

FIGS. 77A-79 show an embodiment W audio device of the invention incorporating an embodiment K audio transducer. Embodiment W differs from the embodiment K audio device in that a different housing is used to accommodate the embodiment K audio transducer. The overview description in relation to the embodiment K audio transducer in section 1.6, apart from the design of the housing, therefore also applies to this audio device embodiment. The details of the housing design of the embodiment W audio, including air fluid passages and sealability of the interface are described in detail in section 5.2.3 of the specification.

An audio transducer embodiment of the invention may be constructed that incorporates on any one or more of the following systems, structures, mechanisms or assemblies of embodiment W: the diaphragm assembly and structure, the hinge system, the decoupling mounting system, the transducer base structure, the transducing mechanism; and/or the housing including the air leak fluid passages and/or sealability of the interface.

1.12 Embodiment X Audio Transducer and Personal Audio Device

FIGS. 80A-80E and 81 show an embodiment X audio device of the invention incorporating an embodiment K audio transducer. Embodiment X differs from the embodiment K audio device in that a different housing is used to accommodate the embodiment K audio transducer. In this embodiment, the embodiment K audio transducer is implemented in an earphone device. The overview description in relation to the embodiment K audio transducer in section 1.6, apart from the design of the housing, therefore also applies to this audio device embodiment. The details of the housing design of the embodiment X audio, including air fluid passages and sealability of the interface are described in detail in section 5.2.4 of the specification.

An audio transducer embodiment of the invention may be constructed that incorporates on any one or more of the following systems, structures, mechanisms or assemblies of embodiment X: the diaphragm assembly and structure, the hinge system, the decoupling mounting system, the transducer base structure, the transducing mechanism; and/or the housing including the air leak fluid passages and/or sealability of the interface.

1.12 Embodiment Y Audio Transducer

FIGS. 82A-85 show an embodiment Y audio device having an embodiment Y audio transducer of the invention. The audio transducer of embodiment Y is a linear action audio transducer, similar to that of embodiment P, comprising a diaphragm assembly Y117 linearly coupled to a transducer base Y224 via a diaphragm suspension system. The diaphragm assembly comprises a substantially rigid diaphragm structure. The features of this diaphragm structure are described in detail under section 5.2.5 of this specification. The diaphragm structure may be substituted for any other diaphragm structure described under sections 2.2 and 2.3 of this specification, for example any of the diaphragm structures described in relation to the embodiment G audio transducer. The transducer base comprises a substantially rigid and compact geometry designed in accordance with the preferred design described under section 6 of this specification. In this embodiment, the base forms part of the housing. A detailed description of the transducer base is also provided in section 5.2.5 of this specification.

As noted, the diaphragm assembly Y117 is linearly coupled to the transducer base via a diaphragm suspension system. In this embodiment, a ferromagnetic fluid suspension system is used as described in section 5.2.5. In alternative configurations of this embodiment, any one of the suspension systems described in section 2.2 in relation to embodiment G may be utilised instead.

Also, as further described in detail under section 5.2.5 of this specification, in situ the diaphragm assembly accommodated within the housing comprises an outer periphery that is substantially free from physical connection with an interior of the housing. In alternative configurations of this embodiment, however, the diaphragm assembly may not have an outer periphery that is substantially free from physical connection with the associated housing in situ.

As shown in FIGS. 83A-83I and 85, the audio transducer of embodiment Y is preferably housed within a surround of the device configured to accommodate the transducer. The housing may be of any type necessary to construct a particular audio device depending on the application. In the preferred implementation of this embodiment, the audio transducer is housed within a personal audio device, and in particular with headphone cup of a headphone device. The headphone cup may also comprise any form of fluid passage configured to provide a restrictive gases flow path from the first cavity to another volume of air during operation, to help dampen resonances and/or moderate base boost. This implementation is described in further detail in section 5.2.5 of this specification.

A decoupling mounting system Y204 is provided to mount the audio transducer to the housing. The decoupling mounting system of embodiment Y is described in detail under section 5.2.5 of this specification and is similar to that described in relation to embodiment U, under section 4.2.3. In alternative configurations of this embodiment, the decoupling mounting system may be substituted by any other decoupling mounting system described in the specification, including for example: the decoupling mounting system described in section 4.2.3 in relation to embodiment U; or any other decoupling mounting system that may be designed in accordance with the design principles outlined in section 4.3 of this specification.

The audio transducer of this embodiment comprises an electromagnetic excitation/transducing mechanism comprising a permanent magnet with inner and outer pole pieces that generate a magnetic field, and one or more force transferring or generation components, in the form of one or more coils that are operatively connected with the magnetic field. This is described in detail under section 5.2.5 of this specification. In alternative configurations of this embodiment, the transducing mechanism may be substituted by any other suitable mechanism known in the art, including for example a piezoelectric, electrostatic, or magnetostrictive transducing mechanism as outlined under section 7 of this specification.

The audio transducer of embodiment Y is described in relation to an electroacoustic transducer, such as a speaker. Some possible applications of the audio transducer are outlined in section 8 of this specification. Also, the audio transducer may be implemented in any one of the personal audio devices outlined in section 5 of this specification by substituting the audio transducer of the device with that of embodiment Y. For example, the audio transducer in embodiment Y may be housed within any one of the surrounds or housings described under sections 5.5.1-5.2.4 for the embodiment P, K, W and X personal audio devices respectively, or it may be incorporated in associated with any other personal audio device implementation, modification or variation as outlined under section 5.2.8 of this specification.

It will be appreciated that the embodiment Y audio transducer may in some configuration be otherwise implemented as an acoustoelectric transducer, such as a microphone as explained in detail under section 7 of this specification.

An audio transducer embodiment of the invention may be constructed that incorporates on any one or more of the following systems, structures, mechanisms or assemblies of embodiment Y: the diaphragm assembly and structure, the diaphragm suspension system, the transducer base, the transducing mechanism; the decoupling mounting system; and/or the housing including the air leak fluid passages and/or sealability of the interface.

2. Rigid Diaphragm Structures and Assemblies and Audio Transducers Incorporating the Same 2.1 Introduction Although a typical cone or dome diaphragm geometry provides rigidity in the primary piston direction, it is not possible for a thin membrane geometry to effectively resist every possible resonance modes through sheer rigidity so these modes are instead 'managed', for example through minimisation of excitation, or application of damping. Rigid materials and geometries may be employed to combat well-balanced resonances in a few cases but, because the diaphragm is a membrane, the design does not lend itself to achieving resonance-free behaviour over the entire operating bandwidth, and so there is almost always an element of resonance management in the design process behind the best speakers.

There exists a wide variety of different loudspeaker designs, including some having thick rigid-type diaphragms as opposed to the thin membranes that are most common. Thick diaphragm constructions are intended to mitigate some of the mechanical resonance issues exhibited in thin-membrane diaphragms. However, at resonant frequencies, thick-design diaphragms can exhibit outer tension/compression and/or inner shear stresses which cause the diaphragm to deform, thereby affecting the quality of sound transducing.

The following describes novel diaphragm structures and audio transducer assemblies incorporating the same that focus on using the principle of rigidity to push diaphragm resonance modes to the relatively high frequencies that are preferably outside of the audio transducer's FRO to improve the operation and quality of the transducer.

2.2 Rigid Diaphragm Configuration

Various diaphragm structure configurations will now be described with reference to some examples.

2.2.1 Configuration R1 Diaphragm Structure

A diaphragm structure configuration of the invention, designed to address shear deformation and other issues will now be described with reference to a first example shown in FIGS. 1A-1F and 2A-2I. Many variations on the shape or form, material, density, mass and/or other properties of this diaphragm structure are possible and some variations will be described and illustrated using other examples but without limitation. This diaphragm structure configuration will herein be referred to as the configuration R1 diaphragm structure for the sake of conciseness. The diaphragm structure is configured for use in an audio transducer assembly. For the sake of clarity, various preferred and alternative elements and/or features of the diaphragm structure of configuration R1 will be described with reference to a number of different examples first, then the implementation of these examples in an audio transducer will be described.

Figure 2A:
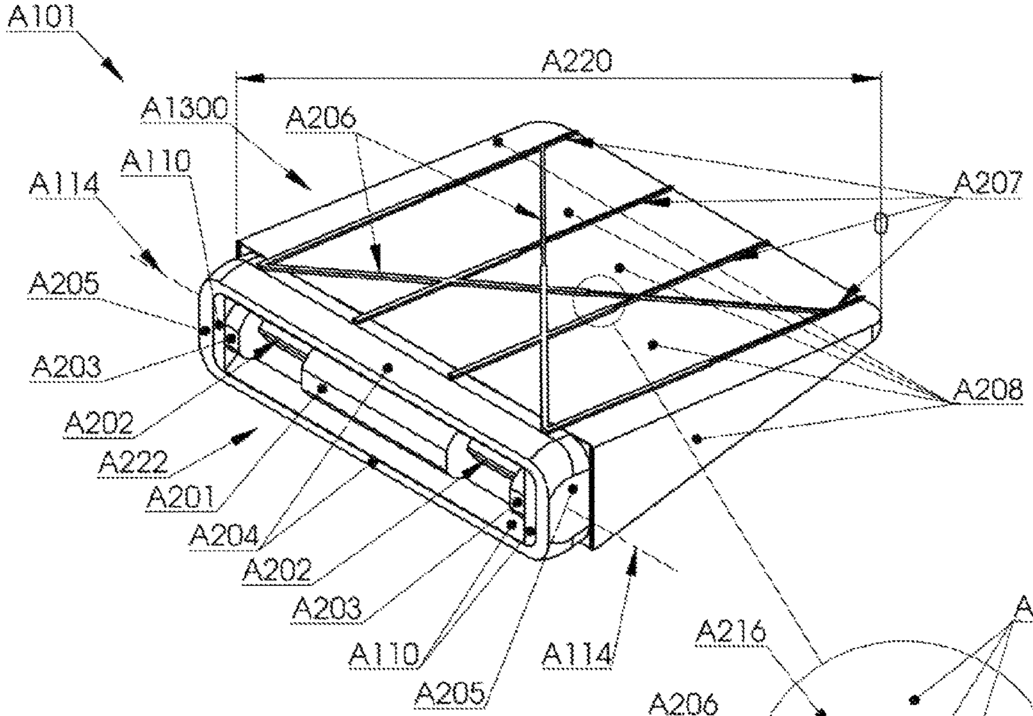
Figure 2B:
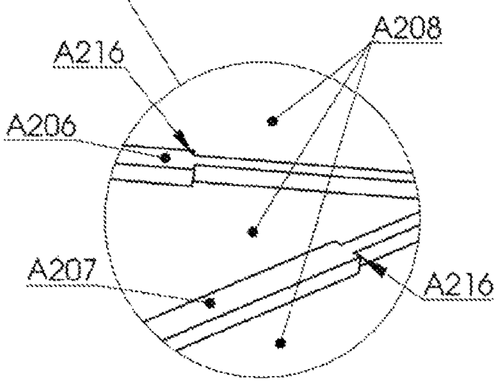
Figure 2C:
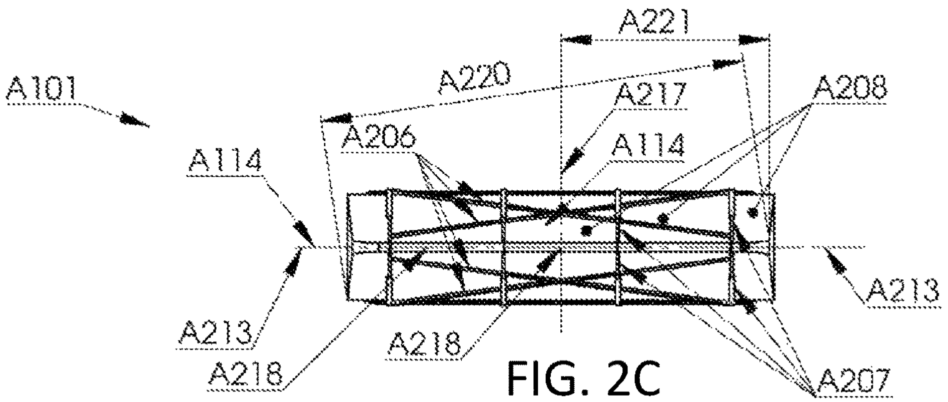
Figure 2D:
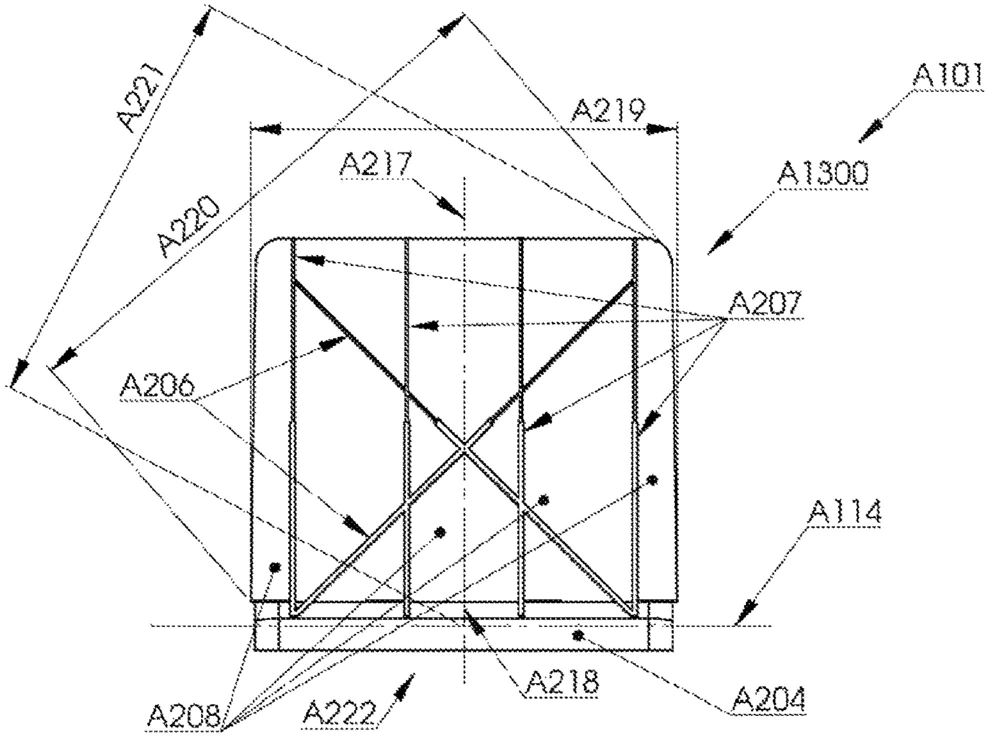
Figure 2E:
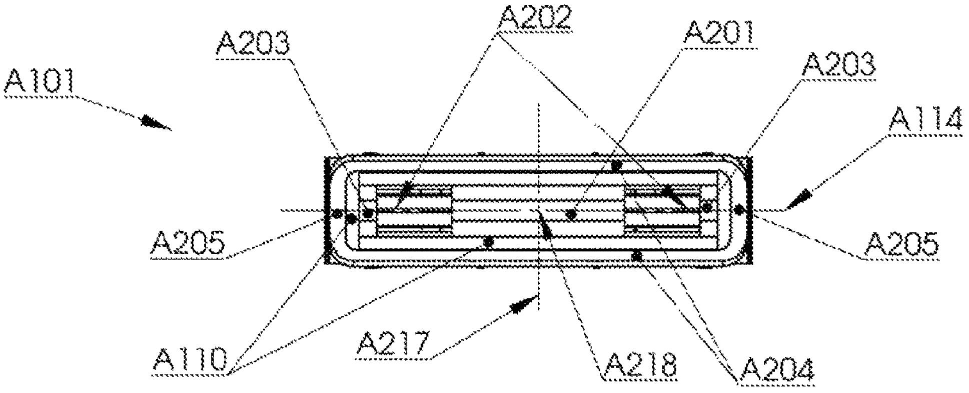
Figure 2F:
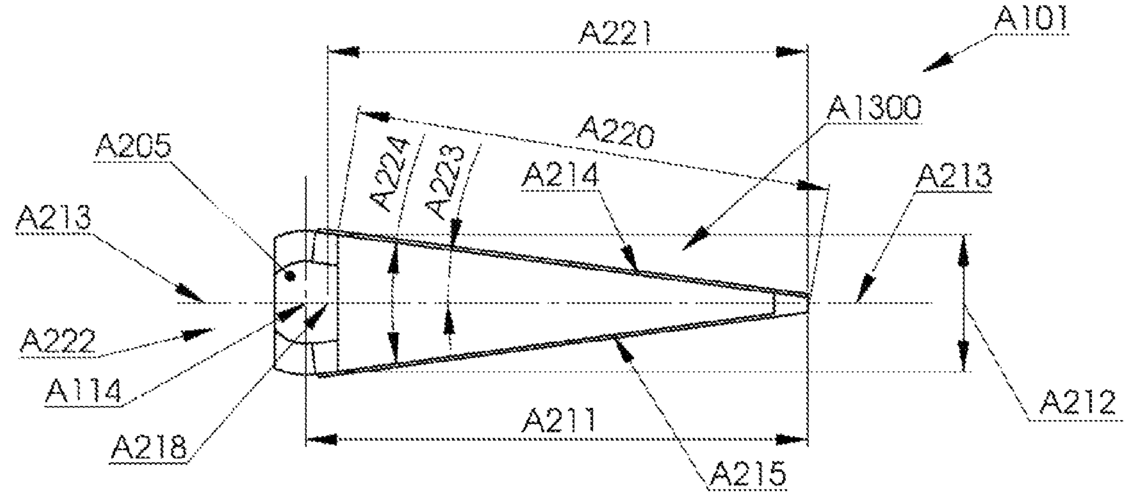
Figure 2G:
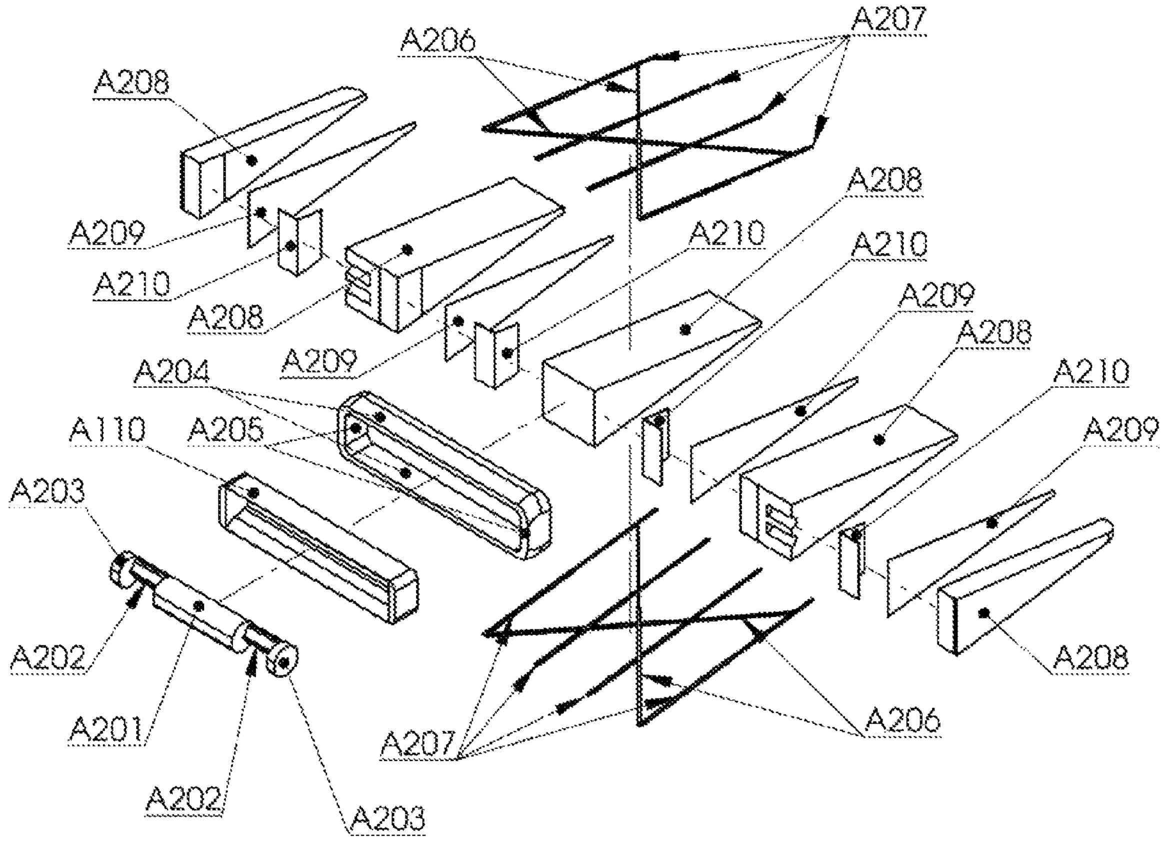
Figure 2H:
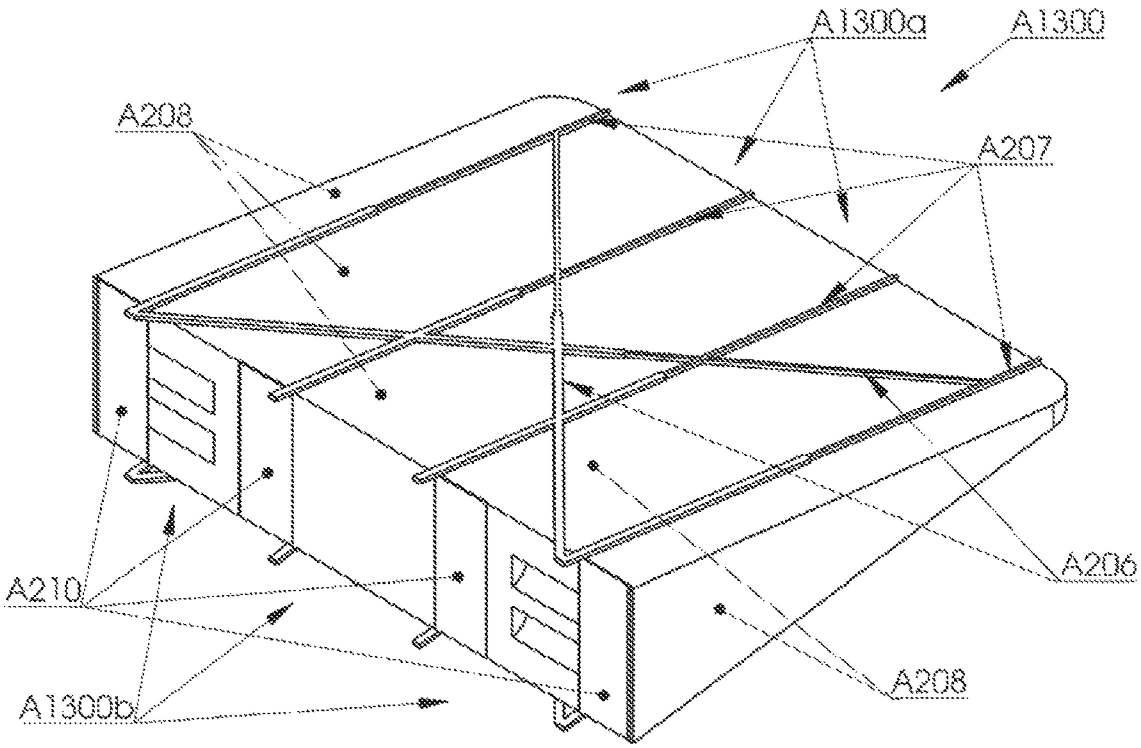
Figure 2I:
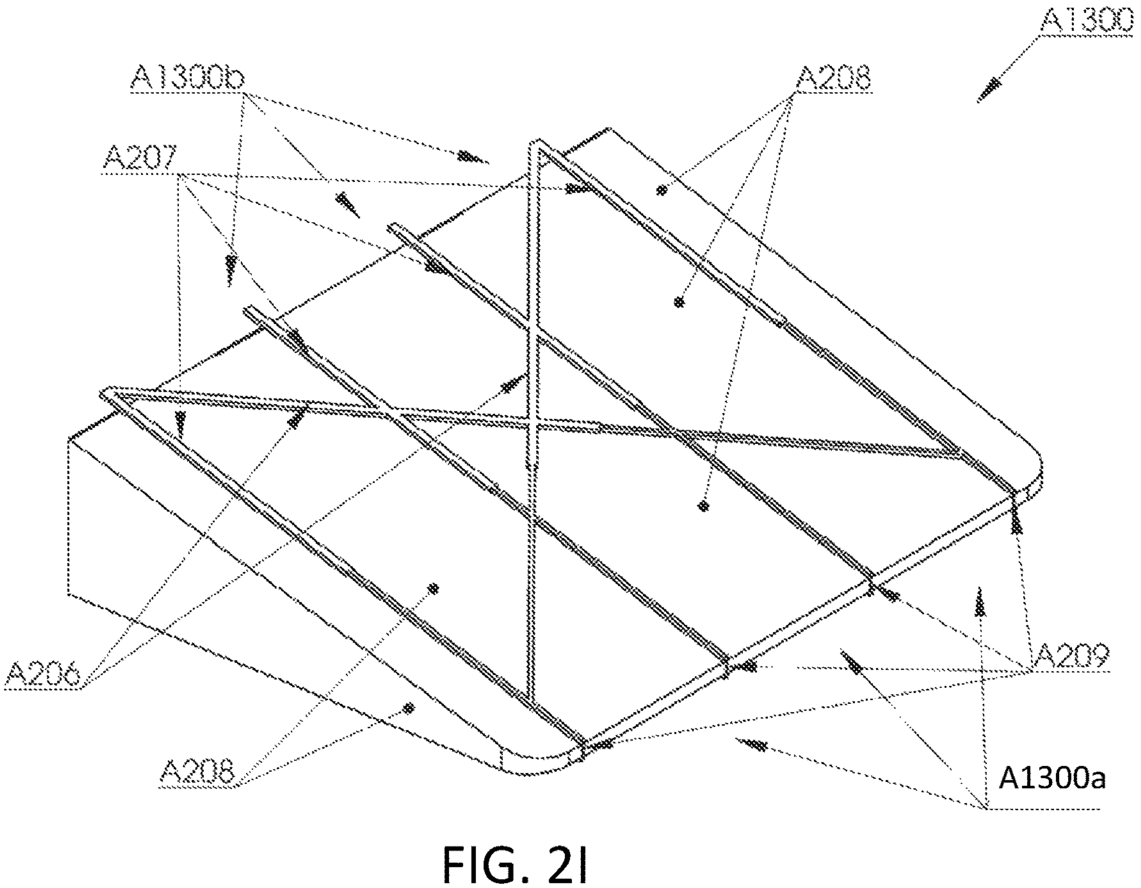

Referring to FIGS. 2G-2I, the diaphragm structure A1300 of configuration R1 comprises a sandwich diaphragm construction. This diaphragm structure A1300 consists of a substantially lightweight core/diaphragm body A208 and outer normal stress reinforcement A206/A207 coupled to the diaphragm body adjacent at least one of the major faces A214/A215 of the diaphragm body for resisting compression-tension stresses experienced at or adjacent the face of the body during operation. The normal stress reinforcement A206/A207 may be coupled external to the body and on at least one face, and preferably at least one major face A214/A215 (as in the illustrated example), or alternatively within the body, directly adjacent and substantially proximal the at least one major face A214/A215 so to sufficiently resist compression-tension stresses during operation. Preferably the normal stress reinforcement A206/A207 is oriented approximately parallel relative the at least one major face or surface A214/A215 and extends within a substantial portion of the area defined by each associated face. In this example, and as preferred for configuration R1, the normal stress reinforcement comprises a reinforcement member A206/A207 on each of the opposing, major front and rear faces A214/A215 of the diaphragm body A208 for resisting compression-tension stresses experienced by the body during operation. Unless otherwise stated, reference to a major face or major surface of a diaphragm body is intended to mean an outer face or surface of the body that contributes significantly to the generation of sound pressure (in the case of an electroacoustic transducer) or that contributes significantly to movement of the diaphragm body in response to sound pressure (in the case of an acoustoelectric transducer) during operation, when incorporated in an audio transducer. A major face or surface is not necessarily the largest face or surface of the diaphragm body.

As shown in FIG. 2G, the diaphragm structure A1300 further comprises at least one inner reinforcement member A209 embedded within the core, and oriented at an angle relative to at least one of the major faces A214/A215 for resisting and/or substantially mitigating shear deformation experienced by the body during operation. In this example, and as preferred for configuration R1, the at least one inner reinforcement members is/are oriented substantially parallel to a sagittal plane A217 of the diaphragm body. The at least one inner reinforcement member may also be substantially perpendicular relative to; a peripheral edge of a major face of the diaphragm body that is distal and/or most distant from a base region A222 of the diaphragm structure. In this specification, unless otherwise stated, a base region A222 or base of the diaphragm structure is intended to mean a region where a diaphragm assembly A101 incorporating the diaphragm structure exhibits an approximate centre of mass A218. In some embodiments, the base region may also be a region that is configured to couple part of an excitation mechanism (e.g. a diaphragm base structure). The inner reinforcement member(s) A209 is/are preferably attached to one or more of the outer normal stress reinforcement member(s) A206/A207 (preferably on both sides—i.e. at each major face). The inner reinforcement member(s) acts to resist and/or mitigate shear deformation experienced by the body during operation. There are preferably a plurality of inner reinforcement members A209 distributed within the core of the diaphragm body.

The diaphragm body or core A208 is formed from a material that comprises an interconnected structure that varies in three dimensions. The core material is preferably a foam or an ordered three-dimensional lattice structured material. The core material may comprise a composite material. Preferably the core material is expanded polystyrene foam. Alternative materials include polymethyl methacrylamide foam, 35 polyvinylchloride foam, polyurethane foam, polyethylene foam, Aerogel foam, corrugated cardboard, balsa wood, syntactic foams, metal micro lattices and honeycombs. In this example the core A208 comprises a plurality of core parts connected to one another and having one or more (preferably a plurality of) inner reinforcement members A209 located therebetween when the diaphragm structure is assembled. In alternative embodiments, the core A208 comprises a single part having one or more inner reinforcement members embedded therein.

This construction provides improved breakup behaviour through synergistic interactions between the components. Tension and/or compression loads associated with the primary/major/large-scale diaphragm breakup resonance modes are primarily resisted by the outer normal stress reinforcement, which has significant and maximal physical separation between the members in the preferred form (i.e. separation between the outer normal stress reinforcement members across each major face is the full thickness of the diaphragm body) so that, due to the I-beam principle, diaphragm bending stiffness is increased. Shear associated with such modes is primarily resisted by the inner reinforcement members. The inner reinforcement members also act to transfer shear loads into large areas of said foam core thereby helping to support it against localised foam blobbing resonance modes. The foam core acts to minimise buckling and localised transverse resonances of said normal stress reinforcement and anti-shear inner reinforcement members.

The configuration R1 diaphragm structure will now be described in further detail with reference to various examples, however it will be appreciated that the invention is not intended to be limited to these examples. Unless stated otherwise, reference to the configuration R1 diaphragm structure in this specification shall be interpreted to mean any one of the following exemplary diaphragm structures described, or any other structure comprising the above described design features.

A preferred example of a configuration R1 diaphragm structure shown in the embodiment A audio transducer of FIGS. 1A-1F, 2A-2I (a rotational action diaphragm with struts). FIGS. 1A-1F show an audio transducer embodiment, hereinafter referred to as the embodiment A audio transducer of the invention, incorporating a configuration R1 diaphragm structure. The audio transducer comprises a diaphragm assembly A101 that is suspended on a transducer base structure A115. In this particular embodiment, the audio transducer comprises a diaphragm assembly A101 that is rotatably coupled to the base structure A115, however, it will be appreciated that the configuration R1 diaphragm structure may be used in an alternative audio transducer design, such as a linear action transducer. FIGS. 2A-2I show the diaphragm assembly A101 incorporating a configuration R1 diaphragm structure A1300 and a diaphragm base structure A222 rigidly coupled to the base region A222 or an end face of the diaphragm structure A1300. The diaphragm base structure comprises a force generating component A109 and part of a suspension system/hinge assembly A111. A diaphragm assembly incorporating the configuration R1 diaphragm structure may herein be referred to as a configuration R1 diaphragm assembly. FIGS. 2H-2I show the diaphragm structure A1300. This diaphragm structure A1300 comprises a single diaphragm comprised of a substantially lightweight core A208, outer normal stress reinforcement A206 and A207 and inner reinforcement members A209.

To address diaphragm core shearing and bending issues, as described in the background section, the diaphragm combines normal (compression-tension) stress reinforcement A206, A207 coupled at or directly adjacent to the major faces A214, A215 of the body and inner shear stress reinforcement members A209 embedded within the core material of the body A208. In this example, the normal stress reinforcement comprises external struts A206, A207 on the front and rear major faces A214, A215 of the diaphragm body core A208. In alternative configurations the normal stress reinforcement struts A206 and A207 may be located underneath but still sufficiently close to the front and rear major faces A214, A215 to maintain sufficient separation to resist tension-compression deformation in use. The inner reinforcement members A209 are embedded within the core. The inner reinforcement members A209 are separate from the core material A208 and so create a discontinuity in the diaphragm body. In the preferred configuration the inner reinforcement members A209 are angled relative to the major faces such that they can sufficiently resist shear deformation in use. Preferably the angle is between 40 degrees and 140 degrees, or more preferably between 60 and 120 degrees, or even more preferably between 80 and 100 degrees, or most preferably approximately 90 degrees relative to the major faces. The inner reinforcement members A209 are approximately orthogonal to the coronal plane of the diaphragm body A213. The inner reinforcement members A209 are preferably approximately parallel to the sagittal plane of the diaphragm body.

Normal Stress Reinforcement

Referring to FIGS. 2A-2I, in this example, the diaphragm body A208 comprises at least one substantially smooth major face A214/A215, and the normal stress reinforcement comprises at least one reinforcement member A206/A207 extending along one of said substantially smooth major faces. Each reinforcement member A206/A207 extends along a substantial or entire portion of the area of the corresponding major face(s), or in other words the reinforcement member extends along a substantial or entire portion of each dimension of the corresponding major face. In alternative embodiments the normal stress reinforcement member may extend only partially along one or more dimensions of the corresponding major face.

Normal Stress Reinforcement Form

The smooth major face of the diaphragm body A208 may be a planar face or alternatively a curved smooth face (extending in three dimensions). Each normal stress reinforcement member A206/A207 comprises one or more substantially smooth reinforcement plates A206/A207 having a profile corresponding to the associated major face and configured to couple over or directly adjacent to the associated major face of the diaphragm body A208. The reinforcement plate A206/A207 may comprise any profile or shape necessary for achieving sufficient resistance to compression-tension stresses experienced at or adjacent the corresponding face of the body during operation, and the invention is not intended to be limited to any particular profile. For instance, each reinforcement plate may be solid, it may be formed from a series of struts, a network of struts crossing over one other, or it may be perforated or recessed in some areas. The periphery of each plate A206/A207 may be smooth or it may be notched.

In the example shown in FIGS. 1A-1F and 2A-2I, each normal stress reinforcement member comprises a plurality of elongate or longitudinal struts A206/A207 extending along the corresponding major face of the diaphragm body A208. A first series/group of substantially parallel and spaced struts A207 provided on each major face A214, A215 are configured to extend substantially longitudinally along the corresponding major face. The normal stress reinforcement member further comprises one or more struts A206 (preferably a pair of struts) extending at an angle relative to the longitudinal axis of the corresponding major face and/or relative the group of parallel struts A207. The pair of struts A206 are angled relative to one another, preferably substantially orthogonally, and for example extend diagonally across the associated major face/over the parallel struts A207. The normal stress reinforcement member in this embodiment thus comprises a network of angled struts extending along a substantial portion of the corresponding major face. It will be appreciated that a network of two or more struts may be provided in varying relative orientations in other alternative configurations provided they sufficiently cover or extend along the corresponding major face to sufficiently resist tension-compression stresses across that face. This particular example is preferable in terms of performance due to the low diaphragm inertia and high stiffness. The struts A206 may be formed integrally with the struts A207 or they may be formed separately and rigidly coupled to one another via any suitable method known in the art of mechanical engineering.

The normal stress reinforcement member on each major face may comprise a reduced mass region, in one or more areas that extend away and/or are most distal from a base region A222 of the diaphragm structure. For example, the normal stress reinforcement struts A206 and A207 on each face A214, A215 reduce in thickness and/or width as they extend away from the base region A222 of the diaphragm structure A1300. In other words, the normal stress reinforcement struts A206/A207 comprise a reduced thickness and/or width in regions distal from the base region A222 of the structure relative to the thickness and/or width in regions proximal to the base region. In this example, the normal stress reinforcement struts A206 and A207 reduce in width at locations A216 as seen in FIG. 2B. The reduction in width is stepped A216 however alternatively this may be tapered/gradual. It will be appreciated that struts with uniform thickness, width and/or mass along their length are also possible within the configuration R1 diaphragm.

Normal Stress Reinforcement Connection

The normal stress reinforcement member A206/A207 may be rigidly coupled/fixed to the corresponding major face of the diaphragm body A208 via any suitable method known in the art of mechanical engineering. In this example, each normal stress reinforcement members A206/A207 is bonded to the corresponding major face of the diaphragm body via relatively thin layers of adhesive, such as epoxy adhesive for example. This would have the effect of significantly reducing the overall weight of the diaphragm structure.

In this example, the struts A207 connect directly to the inner reinforcement members A209 so that both tension/compression and shear deformations, respectively, are resisted with no significant source of intermediate compliance. The two diagonal struts A206, per face A214/A215, of normal stress reinforcement A206 are attached to the surface of a diaphragm face. They attach securely where they cross the normal stress reinforcement struts A207.

All the struts A206 and A207 also connect securely to one of the long sides of the coil windings A204 in this example. All the reinforcement is well connected to the diaphragm core A208, with plenty of overlap provided in order to minimise compliance associated with these connections. These diaphragm parts are adhered to each other via an adhesive such as epoxy resin, however other fixing methods (e.g. fasteners, welding etc.) well known in the art may also or alternatively be used.

Care should be taken to avoid loose attachments, loose parts of the diaphragm body, etc., since these can rattle in use thereby generating unwanted noise and harmonics.

Normal Stress Reinforcement Material

Each normal stress reinforcement member A206/A207 is formed from a material having a relatively high specific modulus compared to a non-composite plastics material. Examples of suitable materials include a metal such as aluminium, a ceramic such as aluminium oxide, or a high modulus fibre such as in carbon fibre reinforced plastic. Other materials may be incorporated in alternative embodiments. In this example, the normal stress reinforcement struts A206 and A207 are made from an anisotropic, high modulus carbon fibre reinforced plastic, having a Young's modulus of approximately 450 GPa, a density of about 2000 kg/m^3 and a specific modulus of about 225 MPa/(kg/m^3) (all figures including the matrix binder). An alternative material could also be used, however to be sufficiently effective at resisting deformation the specific modulus is preferably at least 8 MPa/(kg/m^3), or more preferably at least 20 MPa/(kg/m^3), or most preferably at least 100 MPa/(kg/m^3).

It is also preferable that the reinforcing material has a higher density than the diaphragm body core material A208, for example at least 5 times higher. More preferably normal stress reinforcement material is at least 50 times the density of the core material. Even more preferably normal stress reinforcement material is at least 100 times the density of the core material. This means there is a concentration of mass towards the major faces, which improves resistance to major diaphragm bending resonance modes in the same way that the moment of inertia of a beam is improved by use of an 'I' profile as opposed to a solid rectangle. It will be appreciated in alternative forms the normal stress reinforcement has a density value that is outside of these ranges.

In this example, suitable materials for use in the normal stress reinforcement could include Aluminium, Beryllium and Boron fibre reinforced plastic. Many metals, and ceramics are suitable. The Young's modulus of the fibres without the matrix binder is 900 GPa. Preferably the struts are made from an anisotropic material such as fibre reinforced plastic, and preferably the Young's modulus of the fibres that make up the composite is higher than 100 GPa, and more preferably higher than 200 GPa and most preferably higher than 400 GPa. Preferably the fibres are laid in a substantially unidirectional orientation through each strut and laid in substantially the same orientation as a longitudinal axis of the associated strut to maximise the stiffness that the strut provides in the direction of orientation.

Normal Stress Reinforcement Thickness

The thickness of the normal stress reinforcement may be uniform along/across one or more dimensions of the reinforcement, or alternatively it may be varying along/across one or more dimensions.

Some Possible Normal Stress Reinforcement Variations

FIGS. 8A-8B, 9A-9B, 10A-10B, 11A-11C, and 12A-12D show some possible variations to the form of the normal stress reinforcement of the configuration R1 diaphragm structure. These are described below but it will be appreciated that the invention is not intended to be limited to these particular variations. Other variations as may be described in other sections of this specification and/or variations that would be envisaged by those skilled in the relevant art are also intended to be included within the scope of the invention. Other properties of the diaphragm including reinforcement material, reinforcement thickness and/or reinforcement connection type as in the above example of configuration R1 are also applicable to the following normal stress reinforcement variations.

As described above, the normal stress reinforcement of the configuration R1 diaphragm may comprise any combination of plates, foil and/or struts etc. for covering or extending along or close to the surface of a major face to resist tension-compression deformation.

Figure 8A:
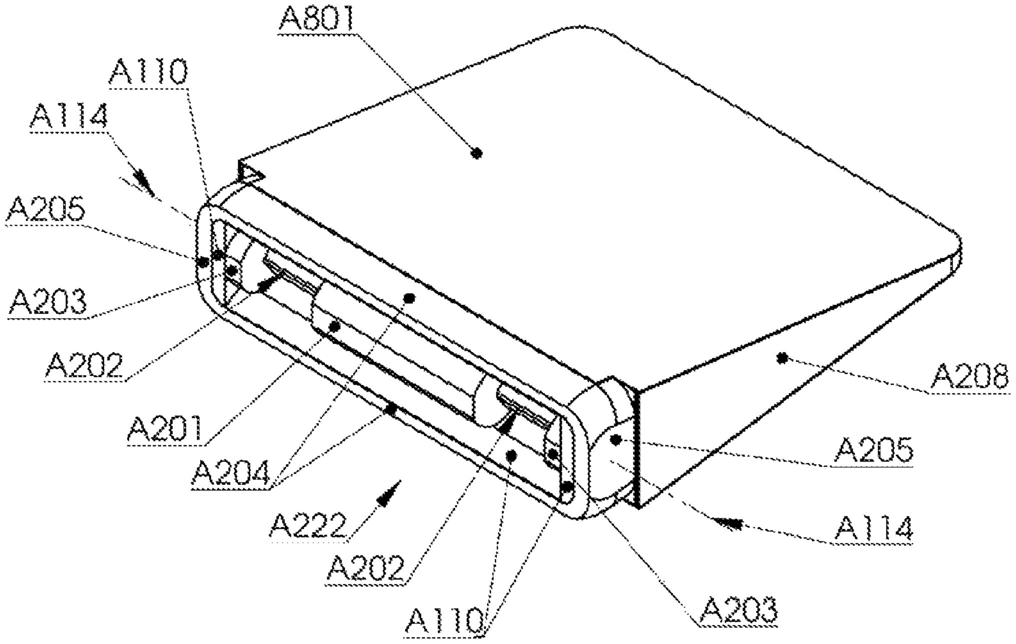
Figure 8B:
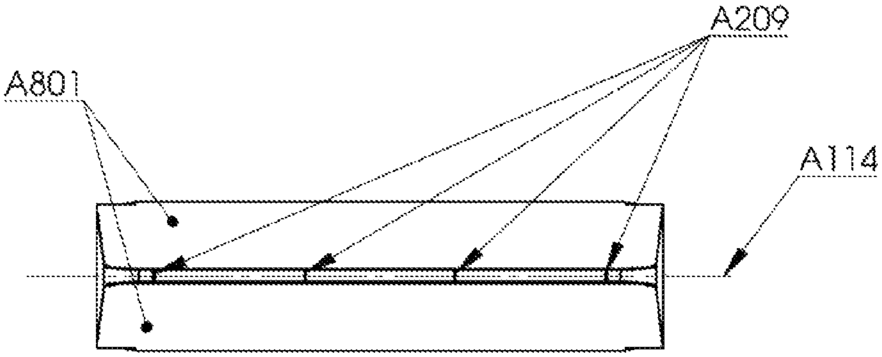

A variation of the form of normal stress reinforcement of the configuration R1 diaphragm structure A1300 is shown in FIGS. 8A-8B. In this example the normal stress reinforcement A801 comprises a foil or substantially solid and thin plate substantially covering an entire portion of each major face A214, A215 of the diaphragm body. This variation also has inner reinforcement members A209 within the core of the diaphragm body.

Figure 9A:
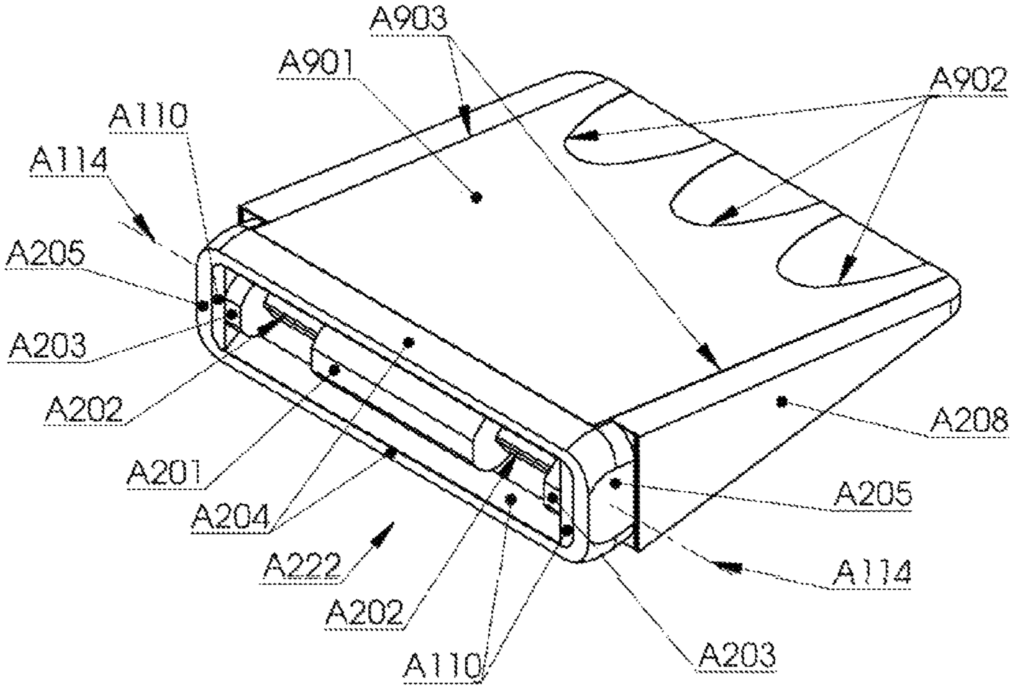
Figure 9B:
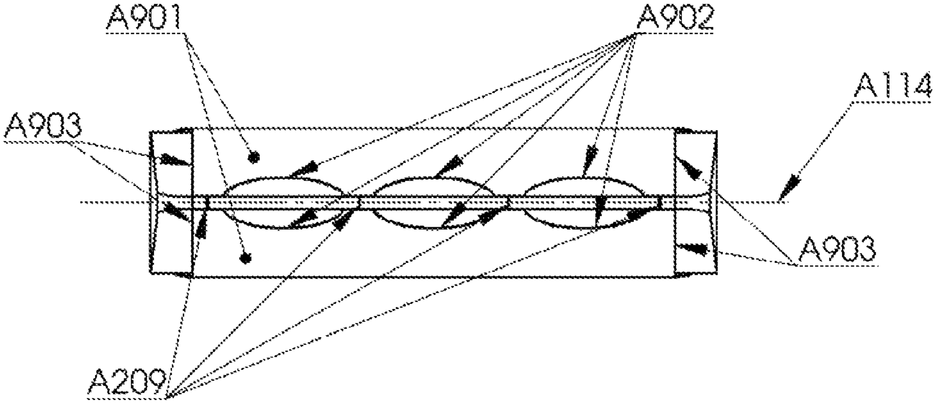

Another variation is shown in FIGS. 9A and 9B. In this example, the diaphragm structure A1300 comprises normal stress reinforcement A901 that are similar to normal stress reinforcement A801 shown in FIGS. 8A-8B, except that for at least one (but preferably each) major face of the diaphragm structure that incorporates normal stress reinforcement, normal stress reinforcement is omitted at or proximal to one or more peripheral edge regions of the major face located distal from the base region A222 of the diaphragm structure. Normal stress reinforcement is at least omitted at or proximal to one or more peripheral edge regions that are distal from the base region A222 of the diaphragm structure (e.g. the diaphragm assembly centre of mass region and/or excitation mechanism). In this example, multiple disconnected regions A902 are devoid of reinforcement along and/or adjacent a peripheral edge region of the major face that opposes and/or is most distal from a base region A222 of the diaphragm body configured to couple part of an excitation mechanism in use (i.e. most distal from the diaphragm base frame). The regions A902 devoid of reinforcement are preferably located substantially between adjacent inner reinforcement members A209. The edge region A902 of each major face that is devoid of reinforcement (close to the diaphragm structure terminal end/tip) is in the shape of three arcs, although many other shapes could suffice, such as rectangular, annular or triangular for example. In this example, for each major face with normal stress reinforcement, the diaphragm structure is also devoid of normal stress reinforcement at opposing longitudinal peripheral edge regions A903 at or adjacent the side edges of the major face extending between the base region A222 of the diaphragm body and the opposing terminal end. In this example each side edge region of each major face within which normal stress reinforcement is omitted is in the shape of a straight line or is substantially linear on, although many other shapes could suffice, such as a serpentine shape for example. FIGS. 32A-32E, for example, show a similar variation to the normal stress reinforcement D109-D111, in which normal stress reinforcement is omitted at regions D118-D120 of each major face of each diaphragm structure in diaphragm assembly, at or near the free peripheral edge of the major face distal from the base of the diaphragm structure. For each diaphragm structure, a central arcuate section of each major face is devoid of normal stress and is shaped in a semi-circular fashion and two other devoid sections either side of the central section extend to the respective side edges of the diaphragm.

Figure 10A:
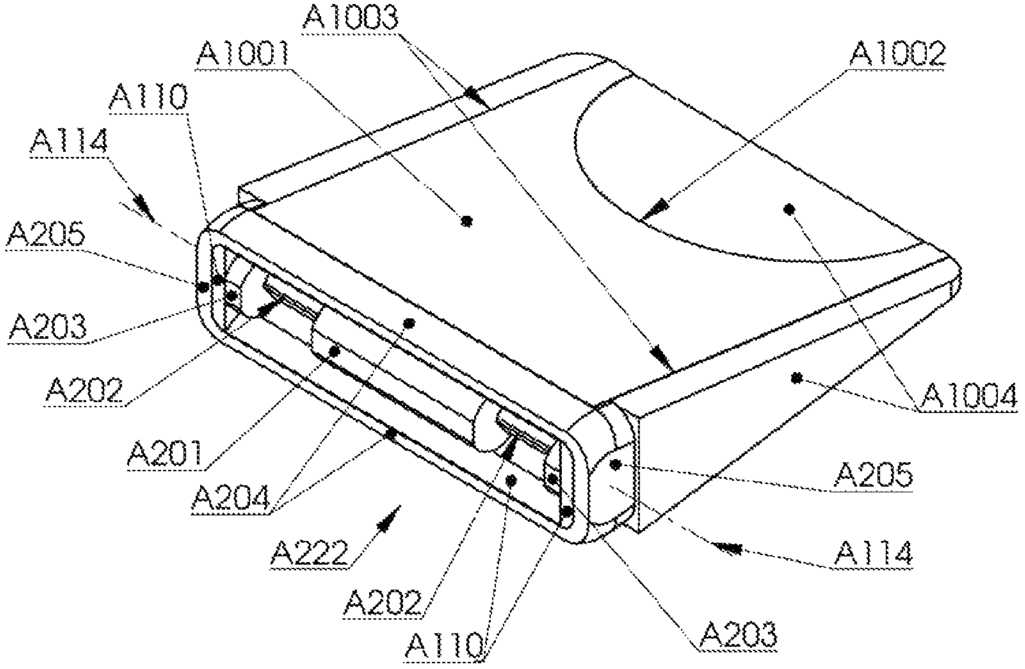
Figure 10B:
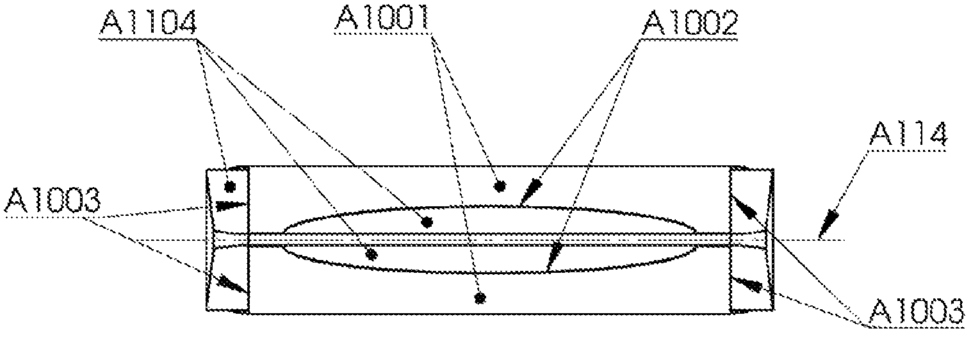

FIGS. 10A and 10B show another similar variation to the normal stress reinforcement of configuration R1, in which a region A1002 is devoid of normal stress reinforcement on either major face. In this variation, the region A1002 is substantially semi-circular and extends across a substantial portion of the width of the reinforcement A1001. Edge regions A1003 of each major face of the diaphragm structure at or proximal to either side of each face are also devoid of normal stress reinforcement in similar linear manner to the variation of FIGS. 9A and 9B. Region A1002 may not be arcuate and/or regions A1003 may not be linear in alternative embodiments as per the FIGS. 9A and 9B variation.

Figure 11A:
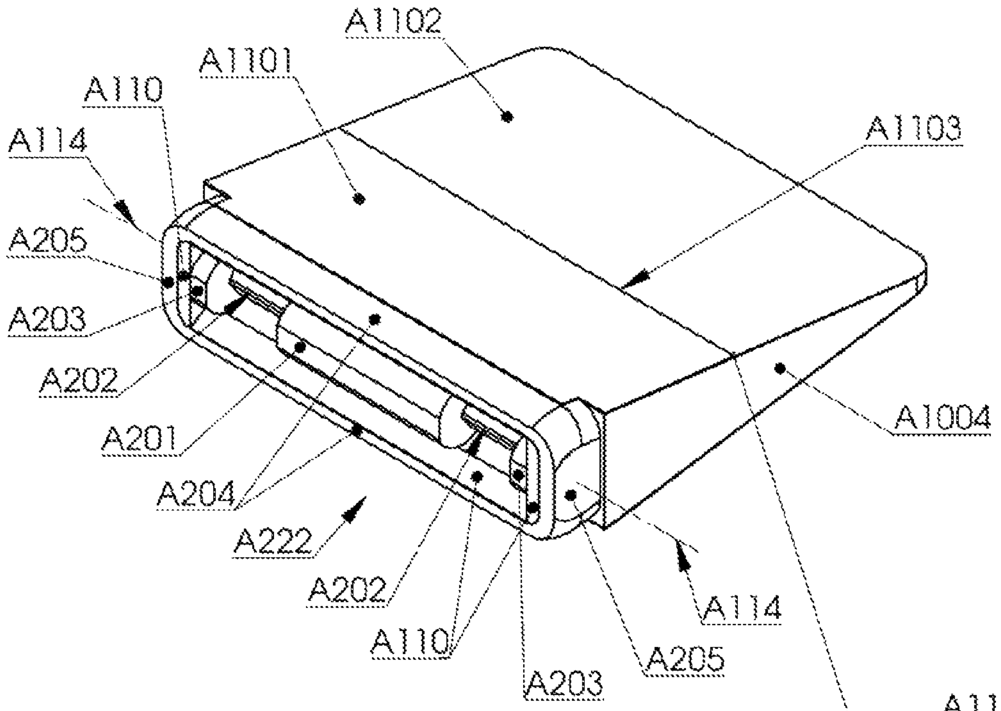
Figure 11B:
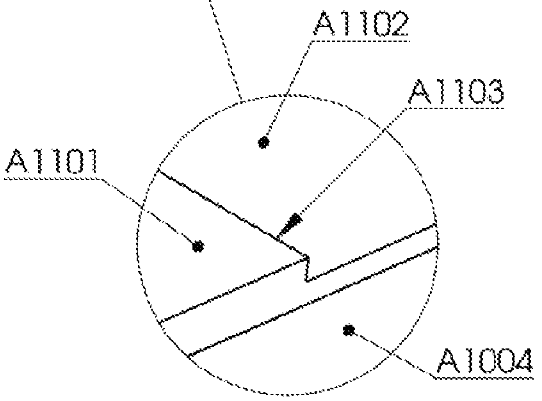
Figure 11C:
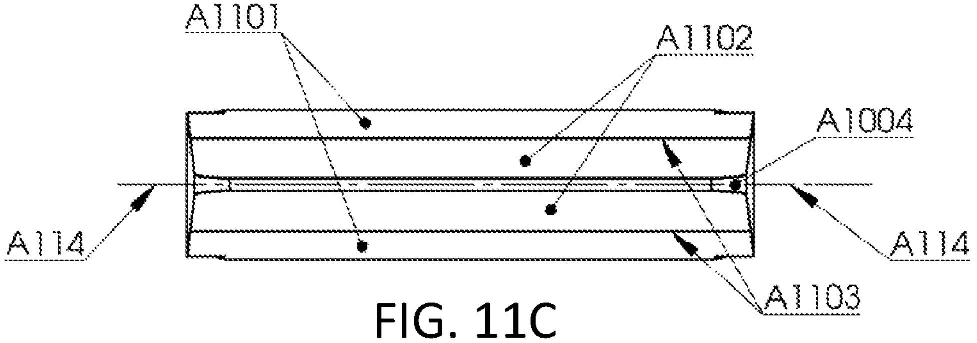

FIGS. 11A-11C show another variation similar to the foil variation of FIGS. 8A-8B, except that the normal stress reinforcement at each major face comprises a reduced thickness at a region A1102 of the normal stress reinforcement (or of the associated major face) that is distal from the base region A222 of the diaphragm structure, relative to the thickness at a region proximal to the base of the diaphragm structure. The change in thickness reduces at step A1103. The thickness may be stepped or alternatively tapered/gradual. In this variation, the region of the diaphragm structure of reduced thickness A1102 at each major face is that most proximal to the tip/edge region of the major face that is most distal from the base region A222 of the diaphragm structure. It is important to note that the diaphragm structure shown in this example is not necessarily a configuration R1 structure (as it may only optionally comprise inner reinforcement members as described in more detail under section 1.6 below) however, it is included here for the purposes of illustrating a possible variation of the form of outer normal stress reinforcement that can be employed in configuration R1.

Another variation is shown in FIGS. 12A-12D. This variation is similar to the example described above with reference to FIGS. 1A-1F and 2A-2I, in that a series of struts A1201 and A1202 are used to form the normal stress reinforcement on each major face of the diaphragm. In this embodiment, the struts A1202 extend longitudinally adjacent, but slightly spaced from the opposing sides of the diaphragm body of each major face, and the struts A1202 extend diagonally across each major face to form a single cross brace that extends to the ends of the opposing side struts A1202. The struts A1201 comprise a reduced thickness along a section of their length that is distal from the base region of the diaphragm structure (e.g. region configured to couple an excitation mechanism). The variation in thickness is stepped A1203, but alternatively it may be tapered/gradual. In alternative embodiments however, each strut A1202 may comprise a reduced width or a reduced mass, or may have a uniform thickness, width and/or mass along an entire portion of its length.

Shear Stress/Inner Reinforcement

As mentioned above, the diaphragm structure of configuration R1 includes at least one inner reinforcement member A209 (also referred to as shear stress reinforcement) embedded/retained within the core material and between a pair of opposing major faces A214 and A215 of the diaphragm body A208. In this example a plurality of inner reinforcement members A209 are retained within the core material of the diaphragm body. It will be appreciated any number of members A209 may be used to achieve the necessary level of shear stress resistance. In alternative embodiments only a single member may be retained within the body A208.

In this example each of the at least one inner reinforcement members A209 is separate to and coupled to the core material of the diaphragm body to provide resistance to shear deformation in the plane of the stress reinforcement separate from any resistance to shear provided by the core material. Also, each of the at least one inner reinforcement member A209 extends within the core material A208 at an angle relative to at least one of said major faces sufficient to resist shear deformation during operation. Preferably the angle is between 40 degrees and 140 degrees, or more preferably between 60 and 120 degrees, or even more preferably between 80 and 100 degrees, or most preferably approximately 90 degrees relative to the major faces. In this example, each inner reinforcement member A209 extends substantially parallel to the sagittal plane of the diaphragm body A208 and approximately orthogonally to the pair of opposing major faces and to the normal stress reinforcement members A206/A207. Having substantially or approximately orthogonal reinforcement maximizes shear stress resistance.

Shear Stress Reinforcement Form

In this example, each inner reinforcement member A208 is a plate A209. The plate may comprise any profile or shape necessary for achieving the desired level of resistance to shear stresses on the diaphragm body A208 during operation. For example, each inner reinforcement member may be a plate, the plate may be solid or perforated in some areas, or it may be formed from a series of struts, a network of struts crossing over one other. The periphery of each member A209 may be smooth or it may be notched. In this example, each inner stress reinforcement member comprises a plate A209 that is substantially solid. The plates A209 extend in a substantially spaced (preferably, but not necessarily, evenly spaced) and parallel manner relative to one another within the core material in the assembled form of the diaphragm structure A1300. Each plate A209 has a similar profile or shape to a cross-sectional shape of the diaphragm body A208, and in particular to a shape across a sagittal cross-section of the diaphragm body A208. Alternatively each inner reinforcement member A209 comprises a network of coplanar struts. Furthermore, in alternative embodiments the plates and/or struts may extend across three-dimensions within the core material.

Each inner reinforcement member A209 extends substantially towards one or more peripheral regions of the diaphragm body A208 most distal from the base region of the diaphragm structure (e.g. location that exhibits a centre of mass of a diaphragm assembly when the diaphragm is assembled therewith). In this example, this distal region is the tapered terminal end of the diaphragm body A208.

Shear Stress Reinforcement Material

Each inner reinforcement member A209 is formed from a material having a relatively high maximum specific modulus compared to a non-composite plastics material, Examples of suitable materials include_a metal such as aluminium, a ceramic such as aluminium oxide, or a high modulus fiber such as in carbon fiber reinforced composite plastic.

Preferably each internal reinforcement member is formed from a material having a relatively high maximum specific modulus, for example, preferably at least 8 MPa/(kg/m^3), or most preferably at least 20 MPa/(kg/m^3). Many metals, ceramics or a high modulus fibre-reinforced plastics are suitable. For example the internal reinforcement member may be formed from aluminium, beryllium or carbon fibre reinforced plastic.

Preferably the internal reinforcement member has a high modulus in directions approximately +45 degrees and −45 degrees relative to a coronal plane of the diaphragm body A213. If the internal reinforcement member is anisotropic then preferably tension compression is resisted at approximately +−45 degrees to the coronal plane, e.g. if carbon fibre then preferably at least some of the fibres are oriented at a +−45 degree angle to the coronal plane. Note that in some diaphragm designs there may be regions of the internal reinforcement that require stiffness in other directions, for example in the proximity of points of application of loads to the diaphragm such as close to a hinge assembly.

In this example, the inner reinforcement members A209 may be made from aluminium foil of 0.01 mm thickness, having a Young's modulus of about 69 GPa and a specific modulus of about 28 MPa/(kg/m^3). It will be appreciated this is only exemplary and not intended to be limiting.

Shear Stress Reinforcement Thickness

Each inner reinforcement member A209 is preferably relatively thin to thereby reduce the overall weight of the diaphragm structure A1300, but sufficiently thick to provide sufficient resistance against shear stresses. Thus, the thickness of the inner reinforcement members is dependent (although not exclusively) on the size of the diaphragm body, the shape and/or performance of the diaphragm body and/or the number of inner reinforcement members A209 used. In a preferred implementation of configuration R1, the inner reinforcement members are substantially thin and correspond to the area of the diaphragm body that it is reinforcing, so as to provide significant rigidity against breakup modes of resonance. It is preferable that each inner reinforcement member comprises of an average thickness of less than a value x (measured in mm), as determined by the formula:

$$x = \frac{\sqrt{a}}{c}$$

Where, a, is an area of air (measured in mm^2) capable of being pushed by the diaphragm body in use, and where, c, is a constant that preferably equals 100. More preferably c=200, or even more preferably c=400 or most preferably c=800. Preferably each inner reinforcement is made from a material less than 0.4 mm, or more preferably less than 0.2 mm, or more preferably 0.1 mm, or more preferably less than 0.02 mm thick.

In this example, each inner reinforcement member A209 is made from a material that is approximately 0.01 mm thick.

Shear Stress Reinforcement Connection Type

During assembly of the diaphragm structure, the inner reinforcement members A209 are preferably rigidly fixed/coupled at either side to either one of the opposing normal stress reinforcement members A206/A207 (on the opposing major faces of the diaphragm body A208). Alternatively each inner reinforcement member extends adjacent to but separate from the opposing normal stress reinforcement members. During assembly, each inner reinforcement member A209 is rigidly coupled/fixed to the core material of the diaphragm body A208 via any suitable method known in the art of mechanical engineering. In this example, the members A209 are bonded to the core material A208 and preferably to corresponding normal stress reinforcement member(s) A206/A207 via relatively thin layers of epoxy adhesive. Preferably the adhesive is less than approximately 70% of a weight of the corresponding inner reinforcement member. More preferably it is less than 60%, or less than 50% or less than 40%, or less than 30%, or most preferably less than 25% of a weight of the corresponding inner reinforcement member A209.

The inner reinforcement members A209 preferably extend to or proximal to diaphragm edge regions that are furthest from the diaphragm base structure A222 or force generation component, being the coil windings A109, where the diaphragm is subjected to a change in force in use and where a large part of the mass is concentrated. The inner reinforcement members A209 are, in the preferred configuration, coupled to the normal stress reinforcement struts A206 and A207 on either side. The inner reinforcement members run in a direction from the motor coil A109 to the edges of the diaphragm that are most remote from said motor coil, because the remoteness of these edges from the largest mass concentration generally makes them particularly prone to resonance. Hence most of the struts, and all of the inner reinforcement members, extend directly towards this most distal edge.

The effect of this orientation for the inner reinforcement members and most of the struts is that the lowest and/or most problematic diaphragm breakup frequencies are increased, optimising diaphragm performance. The two side edges that are not supported by inner reinforcement members are closer to the diaphragm structure's base region A222 including the motor coil and the centre of mass of the diaphragm assembly, and so are less prone to resonance. Also, the lowest-frequency resonance involving displacement of the sides often manifests as a twisting mode which is not highly damaging because it usually has a nearly zero net displacement of air, and because it is usually only minimally excited due to symmetry of the diaphragm and overall excitation.

Some Possible Normal Stress Reinforcement Variations

The inner reinforcement members A209 comprise any combination of panels and/or struts embedded within the core material and each preferably extending to cover a substantial portion of the thickness of the material to sufficiently resist shear stress forces. The simplest, and most preferable version (as used in the embodiment A audio transducer of FIGS. 1A-1F and 2A-2I) is shown in FIGS. 48A and 48B, whereby the inner reinforcement member is a substantially flat and substantially thin foil.

Alternative forms of inner reinforcement members can be substituted. For example, a network of triangulated struts as shown in FIGS. 48C and 48D, similar to what is seen in a side view of the middle part of a typical crane structure. In some cases the shear reinforcement function may be performed fairly well even if not oriented strictly in a plane, say for example if an aluminium foil was corrugated (such as shown in FIGS. 48E and 48F) so long as there are connections to the outer normal stress reinforcement components.

Furthermore, in some variations the inner stress reinforcement member may take on an alternative shape (such as rectangular, arcuate etc.) in accordance with a cross-sectional shape of the corresponding diaphragm body. For example, in the embodiment G audio transducer shown in FIGS. 40A-40D, the inner stress reinforcement members G109 are substantially rectangular to accord to the cross-sectional shape of diaphragm body G108. Another variation of shape is shown in FIGS. 44A-44F where the inner reinforcement members G603 comprise a substantially trapezoidal profile to correspond to the cross-sectional shape of diaphragm body G602.

Some possible variations to the form of the inner stress reinforcement of configuration R1 are described above, however, it will be appreciated that the invention is not intended to be limited to these particular variations. Other variations as may be described in other sections of this specification and/or variations that would be envisaged by those skilled in the relevant art are also intended to be included within the scope of the invention. Other properties of the diaphragm including reinforcement material, reinforcement thickness and/or reinforcement connection type as in the above example of configuration R1 are also applicable to these configuration R1 diaphragm variations.

Diaphragm Body

Diaphragm Body Form

Referring back to FIGS. 2A-2I, in this example of the configuration R1 diaphragm structure A1300, the major faces A214 and A215 of the diaphragm body A208 are substantially smooth so as to allow a suitable profile to which the normal stress reinforcement A206 and A207 can be adhered. The surface is preferably reasonably flat, because the corresponding normal stress reinforcement provides more optimal rigidity if it is relatively straight and so becomes less prone to buckling, at least in locations and directions where it is not supported by inner reinforcement members A209. If a diaphragm core A208 is used that has a particularly inconsistent or irregular form, for example a honeycomb core having irregular walls and/or cavities, then the overall outer peripheral profile of the major faces of the diaphragm body is most preferably substantially smooth for the reason that reinforcement is able to be adhered to each wall that it passes so that the wall may provide transverse support to the reinforcement to help minimise localised resonance, and so that the reinforcement is able to provide rigidity to the core to provide overall diaphragm stiffness.

In this example, the diaphragm A101 when assembled comprises a substantially wedge shaped body A208 and/or a body that is substantially triangular in cross-section. Although the general cross-sectional shape of the diaphragm body of rotational transducers (parallel to the sagittal plane of the diaphragm body A217) is preferably substantially triangular or wedge shaped, other geometries, such as rectangular, kite shaped or bowed profiles are also possible in alternative variations of configuration R1 and the invention is not intended to be limited to the shape of this particular example.

A diamond cross-sectional profile works well with linear action transducers, however other profiles are also possible in alternative variations, for example trapezoidal, rectangular, or bowed profiles Approximately convex profiles, such as a trapezoidal profile as shown in FIGS. 44A-44F, will generally have better break-up characteristics and will be lighter, and so are generally preferable.

Diaphragm Body Core Material

The diaphragm assembly A101 or diaphragm structure A1300 comprises a tapered wedge shaped diaphragm body (but could consist of many other geometries) formed from a core material A208 that is a foam, such as expanded polystyrene of density 16 kg/m^3 and specific modulus 0.53 MPa/(kg/m^3) or other core material, having properties of low density (ideally less than 100 kg/m^3) and high specific modulus.

The core A208 is preferably a lightweight and fairly rigid material that comprises an interconnected structure that varies in three dimensions, such as a foam or an ordered three-dimensional lattice structured material. The core material may comprise a composite material. Although expanded polystyrene foam is the preferred material, alternative materials that are suitable could include polymethyl methacrylamide foam, Aerogel foam, corrugated cardboard, metal micro lattices aluminium honeycomb, aramid honeycomb and balsa wood. Other materials that would be apparent to those skilled in the art are also envisaged and not intended to be excluded from the scope of this invention.

The core material of the diaphragm body A208, in isolation of the remaining components of the diaphragm structure A1300 (e.g. in isolation of the outer and inner reinforcements), has a relatively low density. In this example the core material has a density that is less than approximately 100 $kg/m^3$, more preferably less than approximately 50 $kg/m^3$, even more preferably less than approximately 35 $kg/m^3$, and most preferably less than approximately 20 $kg/m^3$. It will be appreciated in alternative forms the core material of the diaphragm body may have a density value that is outside of these ranges. This means that the diaphragm can be made relatively thick without adding undue mass, which increases rigidity and decreases mass thereby improving resistance to breakup resonances.

Although the diaphragm assembly comprises a highly rigid skeleton of inner shear stress and outer normal reinforcement, in some cases the body material is still called upon to support the skeleton components against localised transverse resonance, and to support itself against localised 'blobbing' resonances in regions between the skeleton components. The diaphragm body A208 in isolation of the remaining components of the diaphragm structure (e.g. in isolation of the outer and inner reinforcements) preferably has a relatively high specific modulus. In this example, the diaphragm body A208 in isolation of the remaining components of the structure has a specific modulus higher than approximately 0.2 MPa/(kg/m^3), and most preferably higher than approximately 0.4 MPa/(kg/m^3). It will be appreciated in alternative forms the diaphragm body may have a specific modulus value that is outside of these ranges. The high specific modulus means that the diaphragm body can support the skeleton, and especially also its own weight, against the localised 'transverse' and 'blobbing' resonance modes respectively.

Diaphragm Body Thickness

The diaphragm body (made up of all the body parts A208) is substantially thick (at its thickest region). In this specification, and unless otherwise specified, reference to a substantially thick diaphragm body is intended mean a diaphragm body that comprises at least a maximum thickness that is relatively thick compared to at least a greatest dimension of the body such as the maximum diagonal length A220 across the body (hereinafter also referred to as the maximum diaphragm body length or maximum length of the diaphragm body). In the case of a three-dimensional body (as is the case for most embodiments), the diagonal length dimension may extend across the thickness/depth and width of the body in three-dimensions. The diaphragm body may not necessarily comprise a uniform thickness that is substantially thick along one or more dimensions. The phrase relatively thick in relation to the greatest dimension may mean for example at least about 11% of the greatest dimension (such as the maximum body length A220). More preferably the maximum thickness, A212, is at least about 14% of the greatest dimension of the body A220. In this specification, the maximum thickness in relation to a substantially thick diaphragm body may also be related to the length dimension of the diaphragm body that is substantially perpendicular to the thickness dimension (hereinafter also referred to as the diaphragm body length A211). The phrase relatively thick in this context may mean at least about 15% of the diaphragm body length A211, or more preferably at least about 20% of the diaphragm body length A211. In some embodiments the diaphragm may be considered to be relatively thick in relation to the diaphragm radius (or a length dimension) from the centre of mass location A218 (exhibited by the diaphragm assembly) to a most distal periphery of the diaphragm body. The phrase relatively thick in this context may mean at least about 15% of the maximum diaphragm radius A221, or more preferably at least about 20% of the maximum radius A221. In some embodiments, and especially in the case of rotational action drivers, the diaphragm body length A211 may be measured from the axis of rotation to the most distal peripheral edge.

In this example, where the diaphragm is designed for a rotational action transducer, it is preferable that the diaphragm body thickness A212 (in at least the thickest region) is substantially thick relative to the diaphragm body length A211 (which is the length from the axis of rotation A114 or base region A222 to the opposing terminal end/tip of the diaphragm body). Preferably the ratio of diaphragm body thickness, A212, to length, A211, is at least 15% or most preferably at least 20% as described above.

Preferably the region of maximum thickness is the base region of the diaphragm structure.

An increase in thickness can result in a disproportionate increase in the overall rigidity of the diaphragm, particularly if normal stress reinforcement is located on the outside surfaces, and if the diaphragm body has shear reinforcement such as described herein.

Angle Tabs

Referring to FIG. 2G, in this example, to help provide a rigid connection, particularly in regards to shear loadings, between the inner reinforcement A209 and the diaphragm base structure, comprising a coil winding A109, a spacer A110 and a shaft A111, a plurality angle tabs A210 are inserted and adhered (or otherwise rigidly fixed) inside the base of the diaphragm body/wedge A208, with each tab providing a large surface area of contact with the spacer A110 and the inner reinforcement members A209 to improve the strength of the connection. In this example, four tabs are used however it will be appreciated that any number of tabs may be utilised and this would typically depend on the number of inner reinforcement members A209 and/or the number of parts used to make up the diaphragm body A208. This is important for rigidity since adhesives are not as rigid as the structural components being connected and so, as has been mentioned above, can potentially act to restrict transducer breakup performance.

Once all angle tabs A210 are attached within the diaphragm body/wedge A208 the diaphragm body/wedge structure A208 is glued to the coil, spacer and shaft of the associated transducer assembly using a relatively rigid adhesive such as epoxy resin.

Note that many adhesives contain softeners to improve their strength, but which may be detrimental in this application, as well as in many other applications described herein, where rigidity is paramount. Subject to strength considerations it may be preferable to use a resin that does not contain a softener. Epoxy resins used for laying up of fibreglass may be suitable, but without limitation.

Method of Production

A method for bulk production of the diaphragm structure A1300 of this example is outlined below. It will be appreciated that other methods may be utilised for individual or bulk production and the invention is not intended to be limited to this particular example.

In the case of this example, a wedge is initially formed comprising a core A208 and inner reinforcement member A209. Multiple (in this case 4) large sheets of the inner reinforcement member material A209 are laminated in between multiple (in this case 5) large sheets of the core material A208 using an adhesion agent, for example epoxy adhesive. Once cured, the laminate is sliced into pieces, for example wedges A208 in this particular example (or whatever the shape is required for the diaphragm body in other variations). Each piece/wedge A208 forms one diaphragm body A208 as shown in FIGS. 2A-2I, and is attached to other components such as the force generation component of an associated transducing mechanism (e.g. coil windings) and/or a diaphragm base structure A222. Normal stress reinforcement may then be connected to the major faces of the wedge laminate. It will be appreciated that in alternative embodiments, the diaphragm structure is formed using other methods, such as by forming each individual diaphragm structure separately.

It is preferable to minimise the mass of adhesive used to join the inner shear stress reinforcement members and the normal stress reinforcement to one-another and to the diaphragm core, subject to the constraint that there should be enough to prevent delamination in use. This is because the adhesive does not contribute proportionally to the performance, particularly to the rigidity, of the structure. Preferably the adhesive is less than approximately 70% of a mass per unit area of the corresponding internal reinforcement member. More preferably it is less than 60%, or less than 50% or less than 40%, or less than 30%, or most preferably less than 25% of a mass per unit area of the corresponding internal reinforcement member.

Several suitable methods exist for applying a thin glue layer to the normal or shear reinforcement members in preparation for adhering said member to a diaphragm core material. One method involves the adhering agent being applied in the form of a fine spray. Another method involves the adhering agent being applied initially excessively, and then being removed, for example by a rubbing or brushing action, until a minimal and even amount of adhering agent is left remaining. It is advantageous for both of these methods if the adhering agent has low viscosity.

A useful method of determining how much adhering agent has been applied, is to visually determine shade of colour. If an epoxy resin is used that is yellow, then the thicker areas of glue will be a darker shade of yellow, when seen applied to (for example) a sheet of aluminium foil. Accurate scales may be used to measure the mass of reinforcement before and then after the adhering agent has been applied, and this information can be used to indicate the overall mass of glue that has been applied. When applying the adhering agent, a thin layer can provide very satisfactory adhesion to a core of polystyrene foam, for example a sheet of aluminium reinforcement can be adequately adhered to an expanded polystyrene core using epoxy resin applied with a mass per area of as low as 0.5 g/m^2. The thickness of this layer is approximately 0.5 um. Note that glue mass is doubled in the case of a single reinforcement member laminated in between two pieces of core material, as both sides of the reinforcement require adhesive.

Adhering agent may be applied to just a surface of a reinforcement member (and not the core); or just a surface of the core (and not the reinforcement member); or to both surfaces of the reinforcement member and core to be adhered together.

Adhering agent may be applied to the core material selectively, so far as is possible, so that only parts that contact the reinforcement are coated, whereas any small occlusions in the core are not coated, since, because occlusions will not contact the inner reinforcement, applying adhesive would add mass without improving the strength. One method of achieving this outcome is to apply adhering agent thinly (for example by using a method described earlier) to a glue application board or sheet, for example a sheet of Teflon or UHMWPE. The core material is then dabbed into the adhering agent on the glue application board, which is located on a flat surface so that the adhering agent is transferred to the correct parts of the core, being parts which that contact the board, without filling in the occlusions.

It is preferable to minimise the mass of adhering agent that is used, which is able to adequately adhere the components together, some trial and error is used. The amount of adhering agent that is effective is likely to vary depending on the type of reinforcement and core materials being adhered.

When lamination of the reinforcement members and core material it is important to ensure that these parts are held together adequately as the adhering agent cures. One method for achieving this to first stack the parts in the order that they are to be adhered, and then apply a force, for example by applying weights. A jig may be configured to ensure that the force is applied evenly. Such a jig may comprise a base board upon which the laminate stack sits, and a top board, that pushes the top of the laminate stack towards the base board. The jig may also include side guides (if required) to help prevent parts within the laminate stack for slipping sideways as the force is applied.

One method for determining how much pressure to apply is to first identify, for example by experimentation or by investigating the manufacturer's specifications, the maximum that can be applied without causing damage that significantly reduces the performance of the core (in particular the specific modulus), and then reduce this somewhat to provide a safety margin. For example reducing this pressure by 50% may be an effective yet safe target. An alternative preferred bulk production method comprises a jig incorporating stoppers that mechanically limit the laminate stack from being over-compressed.

Audio Transducer Incorporating the Configuration R1 Diaphragm Structure

The configuration R1 diaphragm structure is intended and configured for use in an audio transducer assembly, an example of which is shown in FIGS. 1A-1F. In this example, the diaphragm structure A1300 is configured for use in accordance with a first preferred embodiment A audio transducer assembly. The embodiment A transducer assembly is a rotational action audio transducer assembly. In an assembled state, the transducer comprises a base structure A115 to which the diaphragm assembly A101 is coupled and rotates relative thereto. The base structure A115 includes at least part of an actuating mechanism for causing the diaphragm assembly A101 to rotate relative to the base structure during operation. In this embodiment of an audio transducer, an electromagnetic actuating mechanism rotates the diaphragm during operation. The base structure A115 comprises a magnet body A102 with opposing and separated pole pieces A103 and A104 at an end of the body A102 adjacent the diaphragm assembly A101. The diaphragm assembly A101 comprises the diaphragm structure A1300 and a diaphragm base structure A222 rigidly coupled to the base of the diaphragm A1300 and having a coil of the electromagnetic mechanism located between the pole pieces A103 and A104 and coupled to the actuation end of the diaphragm A101.

It will be appreciated that although the terms "diaphragm structure" and "diaphragm assembly" have been used in this specification to refer to a certain combination of features of each of the audio transducer embodiments, this has been done mainly for the purposes of conciseness and the terms are not intended to be limited to such combinations of features. For example, in this specification and claims, in its broadest interpretation and unless otherwise stated reference to a diaphragm structure may mean at least a diaphragm body, and reference to a diaphragm assembly may also mean at least a diaphragm body. Reference to a diaphragm may also mean either a diaphragm structure or a diaphragm assembly.

The embodiment A audio transducer is preferably an electro-acoustic transducer configured to convert electrical energy into audio. The following description may refer to this type of application or to components that are suited for this application. However, it will be appreciated that the embodiment A audio transducer may also be utilized as an acoustoelectric transducer if modified or if certain components were replaced with their counterparts as would be readily apparent to those skilled in the art.

Diaphragm Assembly

Referring to FIGS. 2A-2I, one end of the diaphragm A1300, the thicker end (sometimes referred to as the base end or base region of the diaphragm) has a diaphragm base structure A222 comprising a force generation component attached thereto. The diaphragm structure A1300 coupled to at least the force generation component forms a diaphragm assembly A101. The force generation component is configured to impart mechanical force on the diaphragm structure in response to energy, for example electrical energy. In this embodiment, the force generation component is an electromagnetic coil A109 that is wound into a roughly rectangular shape consisting of two long sides A204 and two short sides A205, to match the shape of the base end of the diaphragm structure A1300. Other shapes are possible, such as spiral or helix type windings, and it will be appreciated that the shape will be dependent on the shape and form of the diaphragm body A208. The coil winding may be made from any suitable conductive material, such as copper or for example from enamel coated copper wire held together with epoxy resin. This may optionally be wound around a spacer A110 which may be formed from any suitable material that is preferably non-conductive or only slightly conductive, such as a plastic reinforced carbon fibre or epoxy impregnated paper. The spacer may comprise a Young's modulus of approximately 200 GPa. The spacer is also of a profile complementary to the thicker base end of the diaphragm structure A1300 to thereby extend about or adjacent a peripheral edge of the thicker base end of the diaphragm structure A1300, in an assembled state of the diaphragm assembly A101. The spacer A110 is attached/fixedly coupled to a steel shaft A111. The combination of these three components located at the base/thick end of the diaphragm body A208 forms a rigid diaphragm base structure A222 of the diaphragm assembly having a substantially compact and robust geometry, creating a solid and resonance-resistant platform to which the more lightweight wedge part of the diaphragm assembly is rigidly attached.

In a rotational action audio transducer, such as the one shown in embodiment A of the invention, optimal efficiency may be obtained when the transducing mechanism is located relatively close to the axis of rotation. This works in well with objectives for the present invention around minimisation of unwanted resonance modes, and in particular with the afore-mentioned observation that locating the typically heavy excitation mechanism close to the axis of rotation permits rigid connection to a hinge mechanism via relatively heavy and compact components without causing too much of an increase in rotational inertia of the diaphragm assembly. In the case of embodiment A, the coil radius may be about 2 mm for example, or about 13% of the diaphragm body length A211 when used for personal audio type applications, however it will be appreciated this is dependent on the size and purpose of the audio transducer.

In order to maximise the ability of the transducer to provide high-fidelity audio reproduction via maximised diaphragm excursion and reduced susceptibility to resonance, the ratio of the radius of attachment location of the force generation component to the diaphragm body length, A212, measured from the axis of rotation, is preferably less than 0.5 and most preferably less than 0.4. This may also help to optimise efficiency.

In the case that the force transferring component is a coil, efficiency considerations mean that it is preferable for the ratio of the coil radius to the diaphragm body length, again measured from the axis of rotation, is greater than 0.1, more preferably greater than 0.15, more preferably still greater than 0.2, and most preferably greater than 0.25. Generally in order to optimise driver efficiency and breakup, a larger coil radii will work better with lower mass coil windings.

Transducer Base Structure

The diaphragm assembly A101 including the diaphragm structure A1300 and diaphragm base structure is configured to be rotatably coupled to a transducer base structure A115 to form the audio transducer.

Figure 1A:
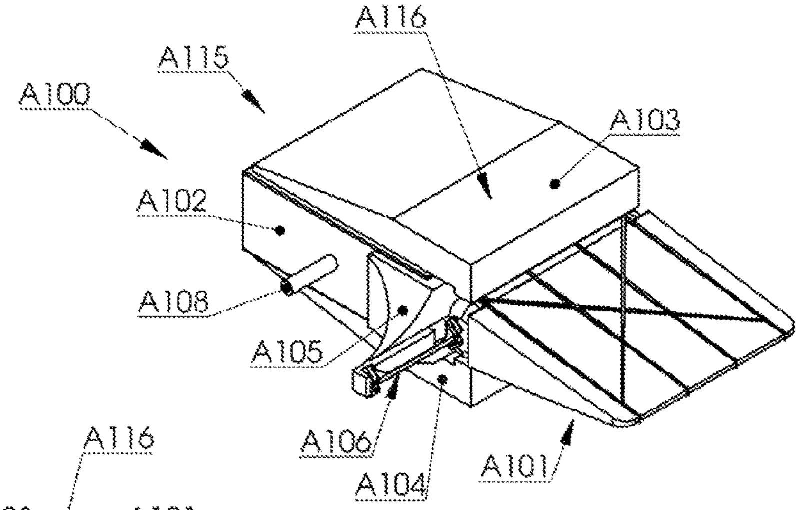
Figure 1B:
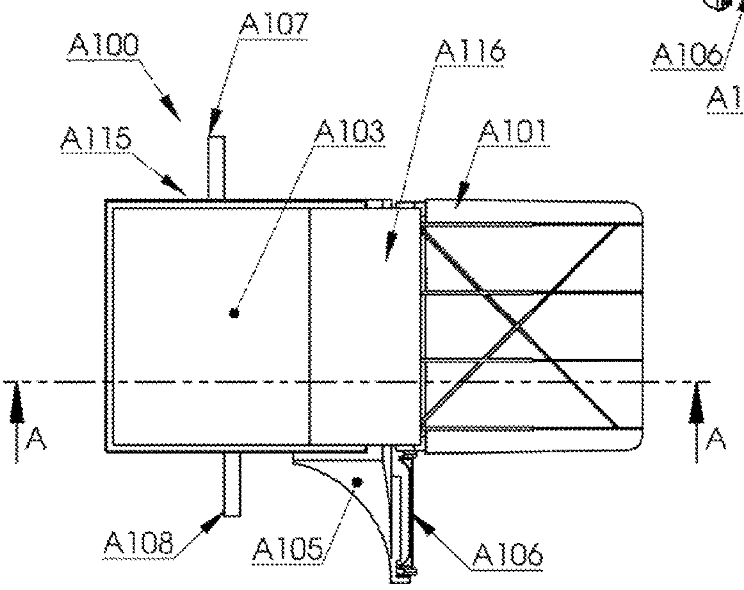
Figure 1C:
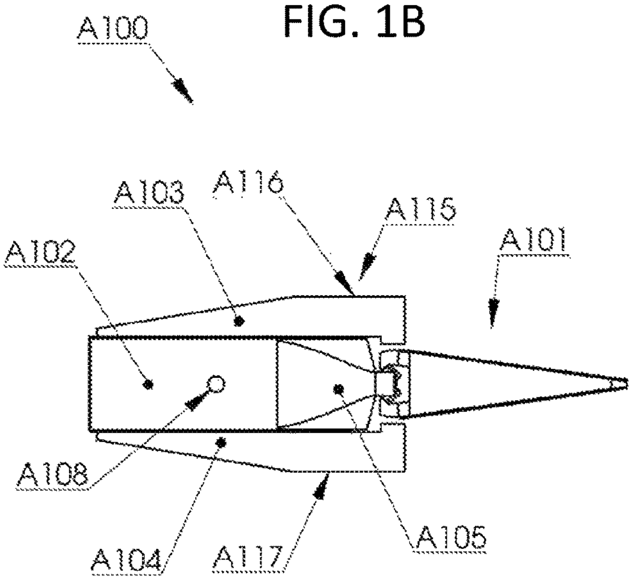
Figure 1D:
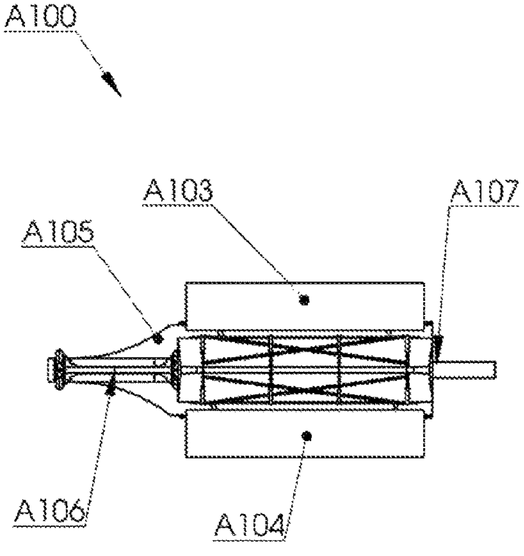

The embodiment A audio transducer shown in FIGS. 1A-1B has a transducer base structure A115 that is constructed from one or more components/parts having a high specific modulus characteristic. The primary benefit of this is that resonance frequencies inherent in the base structure A115 occur at relatively high frequencies because the structure is comparatively stiffer and comparatively lighter. In this preferred embodiment, the base structure A115 comprises part of an electromagnetic actuating mechanism, including a magnet body A102 and opposing and separated pole pieces A103 and A104 coupled to opposing sides of the magnet body A102. The pole pieces are configured to direct magnetic flux adjacent/proximate to and surround the long sides A204 of coil winding A109 in situ, to thereby operatively cooperate with the windings and form the actuating mechanism.

An elongate contact bar A105 extends transversely across the magnet body within the gap formed between the pole pieces. The contact bar A105 forms part of a contact hinge assembly of the audio transducer and is coupled to the magnet body on one side and to the other part of the contact hinge assembly, being the shaft A111 of diaphragm assembly A101 at an opposing side. The contact hinge assembly of this embodiment is described in detail in section 3.2 of this specification which is hereby incorporated by reference and will not be repeated for conciseness. The contact bar A105 is formed to have a larger contact surface area at the side coupling the magnet A102 relative to the side coupling the diaphragm assembly A101.

A pair of decoupling pins A107 and A108 protrude laterally from opposing sides of the magnet body A102 and form part of a decoupling system configured to pivotally couple the base structure A115 to an associated housing in situ. The decoupling system of this embodiment is described in detail in section 4.2 of this specification which is hereby incorporated by reference and will not be repeated for conciseness.

In the preferred configuration of embodiment A, the base structure A115 comprises a neodymium (NdFeB) magnet A102, steel pole pieces A103 and A104, a steel contact bar A105 and titanium decoupling pins A107 and A108. All parts of the transducer base structure A115 are connected using an adhesive agent, for example an epoxy-based adhesive. It will be appreciated other materials and connection methods may be utilised in alternative configurations of this embodiment such as via welding or clamping by fasteners as will be readily apparent to those skilled in the art.

In this embodiment, the transducer further comprises a restoring/biasing mechanism operatively coupled to the diaphragm assembly A101 for biasing the diaphragm assembly A101 to a neutral rotational position relative to the base structure A115. Preferably the neutral position is a substantially central position of the reciprocating diaphragm assembly A101. In the preferred configuration of this embodiment, a diaphragm centring mechanism in the form of a torsion bar A106 links the transducer base structure A115 to the diaphragm assembly A101 and provides a restoring/biasing force strong enough to centre the diaphragm assembly A101 into an equilibrium position relative to the transducer base structure A115. The restoring mechanism A106 forms part of the hinge assembly in this example and it is described in further detail in section 3.2 of this specification. In this configuration a torsional spring is utilised to provide the restoring force, but it will be appreciated in alternative configuration other biasing components or mechanisms well known in the art may be utilised to provide rotational restoration force.

The transducer base structure A115 is designed to be substantially rigid so that any resonant modes that it has will preferably occur outside of the transducer's FRO. An example of this type of design is that the main part of the transducer base structure A115 (that is, the majority of the base structure's mass), consisting of the magnet A102 and pole pieces A103 and A104, have a substantially rigid and compact geometry where no dimension is significantly larger than any other.

The contact bar A105 is connected to the torsion bar A106 at an end tab A303 (as seen in FIGS. 3A-3J) and to facilitate this connection in a rigid manner, the contact bar A105 must protrude out and away from the magnet A102 and the outer pole pieces A103 and A104. The torsion bar A106 extends laterally and substantially orthogonally from a side of the diaphragm assembly A101 and at or adjacent an end of the assembly A101 most proximal to the base structure A115.

The laterally protruding end of the contact bar A105 is comparatively slender and correspondingly prone to resonances. To mitigate the effect of these the protrusion is tapered toward the terminal free end to reduce the mass near the end tab A303 where flexing results in maximum displacement, and to also increase the relative rigidity of the support provided by the squat bulk towards the base of the protrusion where any deformation would result in the greatest displacement of the end tab area. The contact bar also has a large surface area, oriented in two different planes, at its connection to the magnet A102 in order to minimise compliance associated with adhesive, since the adhesive, an epoxy resin, has comparatively low Young's modulus of approximately 3 GPa.

Since the transducer base structure A115 is mounted towards one end of the diaphragm, both front and rear major faces A214, A215 of the diaphragm structure are free from obstruction, which maximises air flow and minimises air resonances that may otherwise be created when a volume of air is contained, for example, between the diaphragm and magnet of a conventional dynamic headphone driver.

It will be appreciated that any one of the examples of the configuration R1 diaphragm structure shown in FIGS. 8A-8B and 12A-12D and as described in detail above, may alternatively be utilized with the embodiment A transducer assembly. Other configuration R1 diaphragm structures not depicted but that would be readily apparent from the above description can also be incorporated in the embodiment A transducer assembly without departing from the scope of the invention.

During operation of the audio transducer, in an electro-acoustic transducing application (e.g. where the audio transducer is a loudspeaker driver), audio signals are transmitted to the coil winding, via a cable or any other suitable method, which causes the winding A109 to react to the magnetic field generated by the magnet and pole pieces of the base structure A115. This reaction results in mechanical movement which is then imparted on the base of the diaphragm structure A1300. The hinge system allows the diaphragm assembly A101 to then rotatably oscillate relative to the base structure A115. This oscillation of the diaphragm structure A1300 causes a change in air pressure on either side of the diaphragm A1300 which results in the generation of sound. The configuration R1 diaphragm structure is designed such that unwanted resonant breakup modes due to diaphragm bending, twisting and/or other deformation are pushed outside the transducers intended FRO or at least close to the lower and upper bandwidth limits. For example, a high fidelity audio transducer may have a FRO that spans across at least a substantial portion of the audible frequency range and within this range the configuration R1 diaphragm structure does not experience unwanted resonances. The restoring mechanism A106 acts to bias the diaphragm assembly A101 back toward the neutral position when audio signals are no longer received by the winding A109.

Other Examples of a Configuration R1 Diaphragm Structure

Some variants of the diaphragm structure of FIGS. 2H-2I have already been described above, with reference to FIGS. 8A-12D for instance. Other exemplary diaphragm structures of the configuration R1 will now be described with reference to FIGS. 39A-46D. These exemplary configuration R1 diaphragm structures are most preferably used for linear-action transducers, however their use is not intended to be limited to such application.

An example configuration R1 diaphragm structure is shown in relation to the embodiment G audio transducer of FIGS. 39A-39C and 40A-40D. In this example the diaphragm body G108 is in the shape of a rectangular prism with substantially curved corner regions. The material and thickness of the diaphragm body G108 may be as described in relation to the example diaphragm body of embodiment A, in the preceding subsections. In this example, the diaphragm body G108 comprises a lightweight foam or equivalent core G108, and in particular a low density polystyrene. Normal stress reinforcement G110 in the form of a solid, substantially rectangular sheet is provided on each major face and are complementary to the shape of the associated major faces of the body G108. Further reinforcement is provided by inner shear stress reinforcement member(s) G109 bonded to the interior of said foam core and oriented substantially perpendicular to the coronal plane G114 of the diaphragm body G108. Each inner shear stress reinforcement member G109 is substantially rectangular in accordance with a cross-sectional shape of the diaphragm body G108.

The outer normal stress reinforcement G110 and the inner shear stress reinforcement G109 are form from material as defined above in relation to the example diaphragm structure of the embodiment A audio transducer. For instance the outer normal stress reinforcement G110 and the inner reinforcement members G109 are made from a material having high specific modulus such as a metal or ceramic or high-modulus fibre and as opposed to from a plastic. Preferably the normal stress reinforcement has a specific modulus of at least 8 MPa/(kg/m^3), or more preferably at least 20 MPa/(kg/m^3), or most preferably at least 100 MPa/(kg/m^3) and preferably the inner stress reinforcement has a specific modulus of at least 8 MPa/(kg/m^3), or most preferably at least 100 MPa/(kg/m^3). In this example aluminium foil may be used. Furthermore, the outer normal stress reinforcement G110 and inner reinforcement member(s) G109 are thin, for example approximately 0.08 mm for a diaphragm having equivalent area to that of a conventional 10-inch driver.

This particular embodiment moves with a linear action as opposed to with a rotational action, and is supported by a conventional surround and spider diaphragm suspension system. Preferably the inner reinforcement member(s) G109 are fixed (e.g. bonded) to both the front and rear outer normal stress reinforcement G110, as well as to the foam core G108. Preferably said inner reinforcement member(s) are substantially planar, although this is not strictly necessary for them to effectively fulfil their primary functions which include resisting shear deformation. Preferably, and like the outer normal stress reinforcement, they are made from a relatively rigid material such as a metal, ceramic or high modulus fibres. In the latter case, preferably at least some of said fibres should be oriented at, approximately, +45 and −45 degree angles relative to the coronal plane of the diaphragm body, since their primary purpose is resisting shear. In this embodiment aluminium foil is used.

Alternative anti-shear reinforcement structures can be substituted to perform an equivalent or similar role. For example, a network of triangulated struts similar to what is seen in the middle part of a typical crane structure would perform similarly. The anti-shear function may, in some cases, performed fairly well even if not oriented strictly in a plane, say for example if an aluminium foil was corrugated, so long as there is sufficient connection to the outer normal stress reinforcement components.

Preferably thin layers of epoxy adhesive are used such as are still sufficient to avoid delamination, in order to minimise mass associated with this component since adhesive does not contribute proportionally to the performance of the structure.

The inner reinforcement members run from the central base region (configured to couple the heavy motor coil for example) to the peripheral sides of the diaphragm body extending between the major faces and that are located remotely from the central base region. The peripheral regions of the diaphragm structure most distal from the central base region are more prone to resonating at lower frequencies, hence it is advantageous to optimise the structural integrity of support for this region by minimising shearing deformation associated with deflection at these via use of said inner reinforcement members. The effect of this orientation for the inner reinforcement members is therefore that breakup frequencies are increased and performance is optimised.

In this example, the opposing peripheral sides that are not supported by inner reinforcement members are closer to the base region of the diaphragm structure including the heavy motor coil and the centre of mass of the diaphragm assembly, and so are less prone to resonance. However, in some variations these regions may also be supported by inner reinforcement.

A cavity is formed in a central region of the diaphragm body for supporting and accommodating part of an excitation mechanism of the associated diaphragm assembly. The cavity is located at the base region of the diaphragm structure.

As shown in FIGS. 39A-39C and 40A-40D, this embodiment G audio transducer consists in a loudspeaker driver comprising a diaphragm for a linear action audio transducer. The diaphragm is supported by a diaphragm suspension system comprising a conventional flexible surround G102 and spider G105 (as shown in FIG. 39C). The diaphragm structure G101 comprises inner reinforcement members G109 embedded within a lightweight foam core G108 which are bonded to both the front and rear outer normal stress reinforcements G110, as well as to the core G108. The construction provides improved breakup behaviour, since it comprises structures dedicated and optimised for addressing the primary limiting factors in terms of diaphragm breakup affecting conventional diaphragms as described above. The structures work together symbiotically: tension/compression deformations associated with the primary/major/large-scale diaphragm breakup resonance modes are resisted primarily by the outer normal stress reinforcement G110, which has significant and maximal physical separation (i.e. separation is the full thickness of the diaphragm) so that, due to the I-beam principle, diaphragm bending stiffness is increased; shear deformation associated with such modes is primarily resisted by the inner reinforcement members G109; the inner reinforcement members G109 also act to transfer shear loads into large areas of said foam core thereby helping to support it against localised foam blobbing resonance modes; the foam core G108 acts to minimise buckling and localised transverse resonances of said outer normal stress reinforcement G110 and inner reinforcement members G109; and also displaces air during operation.

The audio transducer further comprises a transducer base structure of a substantially thick and compact geometry, comprising a permanent magnet A104, inner pole pieces G107 that extend along or about one or more faces of the magnet and outer pole pieces G106 that also extend along or about one or more faces of the magnet. The inner and outer pole pieces are separated to thereby provide a channel therebetween for receiving a force generating component G112 of the transducer. A former or other diaphragm base frame G111 is coupled to and extends laterally from a central base region of the diaphragm structure toward the transducer base structure. The force generating component which comprises one or more coils G112 in this embodiment is wound tightly and rigidly coupled to an end of the base frame adjacent the transducer base structure. The diaphragm base frame G111 is formed from a substantially rigid material and is substantially elongate and may comprise a cylindrical shape. One end of the base frame may be rigidly coupled to the inner reinforcement members G109 or otherwise to the outer reinforcement G110 or to the diaphragm core G108 or any combination thereof.

The base frame G11, coil and diaphragm structure form a diaphragm assembly. The coil extends within the channel formed between the magnetic pole pieces in situ which causes excitation during operation. The diaphragm assembly is supported about its periphery relative to a housing, such as an enclosure or baffle G103 by a flexible surround member G102 and a flexible spider G105. The spider and surround extend substantially along an entire portion of the length of the diaphragm assembly. The surround G102 is fixedly coupled at one end to a peripheral edge of the diaphragm structure and at an opposing end to an inner peripheral edge of the housing (enclosure or baffle) G103. The spider G103 is fixedly coupled at one end to the diaphragm base frame and at an opposing end to the inner periphery of the housing G103. The diaphragm suspension is substantially flexible such that it flexes during operation as the diaphragm assembly reciprocates in response to electrical signals received through the coil G112.

FIGS. 41A-43C show variations to the normal stress reinforcement of this example. In these variations the amount/mass of outer normal stress reinforcement G110 is reduced at regions proximal to the edges of the associated major face. For instance in the FIGS. 41A-41B variation, the width of the normal stress reinforcement is reduced and a triangular void or notch is located at either end of the normal stress reinforcement. The triangular void tapers toward the centre of the normal stress reinforcement member G110. In the FIGS. 42A-42B variation, two additional triangular apertures are formed on either side and adjacent each triangular void. In the FIGS. 43A-43C variation, the normal stress reinforcement reduces in thickness in a terminal region G502 adjacent the triangular void and apertures, to thereby further reduced the amount/mass of normal stress reinforcement in these outer regions. It will be appreciated that in each of these variants, the voids and the apertures may take on alternative forms such as arcuate, annular or the like. It will also be appreciated that in the FIGS. 43A-43C variant, while the reduction in thickness is stepped at G503, this may alternatively be gradual in other embodiments.

Yet another example of a configuration R1 diaphragm assembly G600 is shown in FIGS. 44A-44F. In this example, the body comprises a trapezoidal prism shape. The material and thickness of the diaphragm body G602 may be as described above in relation to the example of FIGS. 39A-39C and 40A-40D. In the example, the normal stress reinforcement members G601 on either opposing major face of the diaphragm body differ in form. A first normal stress reinforcement member G601 is substantially flat and planar to correspond to the form of the associated upper major face. A second normal stress reinforcement member G601 on the opposing face comprises a hollow trapezoidal prism shape (having four angled faces extending outwardly from a central face) to correspond to the form of the associated lower major faces (note in this embodiment all four angled lower faces and the upper face are considered major faces). The inner reinforcement members G603 comprise a substantially trapezoidal profile to correspond to the cross-sectional shape of diaphragm body G602.

FIGS. 45A-45B and 46A-46D show variations of the normal stress reinforcements of this example. In these variations the amount/mass of outer normal stress reinforcement G601 is reduced at regions proximal to the edges of the associated major face. For instance in the FIGS. 45A-45B variation, the width of the upper normal stress reinforcement member is reduced, a triangular void or notch is located at either end of the normal stress reinforcement and two additional triangular apertures are formed on either side and adjacent each triangular void. The lower normal stress reinforcement member has two opposing angled faces omitted. The two other opposing angled faces have triangular voids formed at their terminal ends and two additional triangular apertures are formed on either side and adjacent the triangular void.

In the FIG. 46A-46D variation, the normal stress reinforcement members comprise a series of struts. The struts along the upper major face comprise a pair of longitudinal struts extending substantially parallel and distal to the longitudinal edges of the major face. A pair of cross-struts are then located at either end and extend between the pair of longitudinal struts. On the underside of the diaphragm body, the normal stress reinforcement comprises a series of struts that form an enclosed shape including a pair of side-by-side triangular teeth on each one of a pair of opposing angular faces, and a pair of longitudinal struts extending along the edge of a central face between the angular faces and connecting to the teeth of each angular face. In this variation, the normal stress reinforcement reduces in thickness in terminal regions via steps G802 to thereby further reduce the amount/mass of normal stress reinforcement in these outer regions. It will be appreciated that in each of these variants, the voids and the apertures may take on alternative forms such as arcuate, annular or the like. It will also be appreciated that in the FIG. 46A-46D variant, while the reduction in thickness is stepped at G802, this may alternatively be gradual in other embodiments.

It will be appreciated that any one of the examples of the configuration R1 diaphragm structure shown in FIGS. 41A-46D and as described in detail above, may alternatively be utilized with the embodiment G transducer assembly. Other configuration R1 diaphragm structures not depicted but that would be readily apparent from the above description can also be incorporated in the embodiment G transducer assembly without departing from the scope of the invention.

Various diaphragm structure configurations that are sub-structures of configuration R1 will now be described in detail with reference to examples. Unless otherwise stated, the features and possible variations of the configuration R1 diaphragm structure described in section 1.2 above will also apply to each of the following sub-structures. Such common features and possible variations will not be described again for each sub-structure for the sake of conciseness and clarity. Only the features that a particular sub-structure design is intended to be limited to will be described in the following sections.

2.2.2 Configurations R2-R4 Diaphragm Structures

Many diaphragms have a uniform profile and construction.

In some rigid-approach diaphragm designs the unsupported outer edges or peripheral regions of the diaphragm structure remote and/or distal from the base region, where the main bulk/mass of the diaphragm assembly including electromagnetic coil or other heavy excitation components are often located, tend to displace comparatively large distances due to excitation of key breakup resonance modes, and mass in these zones can disproportionately limit/reduce the frequency of key unwanted diaphragm resonance modes. Unnecessary mass in such regions is, therefore, another limiting factor that could affect diaphragm breakup.

Reducing the amount of outer normal stress reinforcement in such distal edge regions on each or all major faces can provide a win-win benefit of reducing diaphragm structure mass and increasing the frequency of key diaphragm breakup resonance modes, despite the reduction in reinforcing material, because a reduction in mass in such strategic locations unloads a series of supporting structures.

When used in conjunction with inner reinforcement members to reduce core shearing, diaphragm breakup performance can be greatly improved by the simultaneous elimination of two limiting factors.

Configuration R2-R4 diaphragm structures will now be described in further detail with reference to various examples, however it will be appreciated that the invention is not intended to be limited to these examples. Unless stated otherwise, reference to the configuration R2-R4 diaphragm structures in this specification shall be interpreted to mean any one of the following exemplary diaphragm structures described, or any other structure comprising the described design features as would be apparent to those skilled in the art.

Configuration R2

A diaphragm structure configuration of the invention, designed to address unwanted resonance issues will now be described with reference to a first example shown in FIGS. 1A-1F and 2A-2I. This diaphragm structure configuration will herein be referred to as configuration R2. The configuration R2 diaphragm structure is a sub-structure of configuration R1 and as such much of the features incorporated in the configuration R1 structure are also incorporated in the configuration R2 structure. The configuration R2 diaphragm structure provides improved diaphragm breakup performance by addressing core shearing issues (as in configuration R1) and also optimising the mass distribution in a diaphragm structure by reducing mass of the structure in regions at or proximal to the perimeter/periphery of the diaphragm body or structure, and in particular in one or more peripheral regions that are distal from the base region of the diaphragm structure. In other words, the diaphragm structure comprises a lower mass in one or more peripheral regions that are distal from the base region, relative to a mass of the diaphragm structure in region(s) at or proximal to the base region. In this specification, unless otherwise stated, reference to a periphery or outer periphery of the diaphragm body or of the diaphragm structure is intended to mean the entire boundary about the major faces of the diaphragm body, including the collective peripheral edges of the major faces, regions of the major faces that are directly adjacent and proximal to the peripheral edges, and any side faces that may exist connecting the peripheral edges of the major faces. In this specification, unless otherwise stated, reference to a peripheral region or outer peripheral region of the diaphragm body or of the diaphragm structure is intended to mean a region within the periphery of the diaphragm body or diaphragm structure respectively and may comprise a partial or entire portion of the periphery. In configuration R2, the reduction of mass of the diaphragm structure in said perimeter/peripheral regions of the diaphragm structure is achieved via reduction in mass of the outer normal stress reinforcement in those regions. Configuration R2 is thus similar to configuration R1 except that the amount and/or mass of outer normal stress reinforcement coupled adjacent at least one major face of the diaphragm body, reduces at or towards one or more peripheral edges of the major face that are distal to/remote from the base region A222 (where the centre of mass A218 of a diaphragm assembly A101 incorporating the diaphragm structure A1300 is exhibited). In this context, the diaphragm assembly A101 is intended to consist of the diaphragm structure A1300 and all other parts that are rigidly connected to and move with the diaphragm structure, when incorporated in an audio transducer assembly. Preferably the one or more peripheral edges distal from the base region are one or more edges most distal from the centre of mass location. As with configuration R1, inner reinforcement is employed in the diaphragm structure of configuration R2 to address core shearing issues. In the following examples, reference will be made to the form of normal stress reinforcement in relation to one major face. It will be appreciated that unless stated otherwise, in the most preferred configuration, this form will also apply to normal stress reinforcement located at or adjacent any other major faces of the diaphragm structure.

Figure 1E:
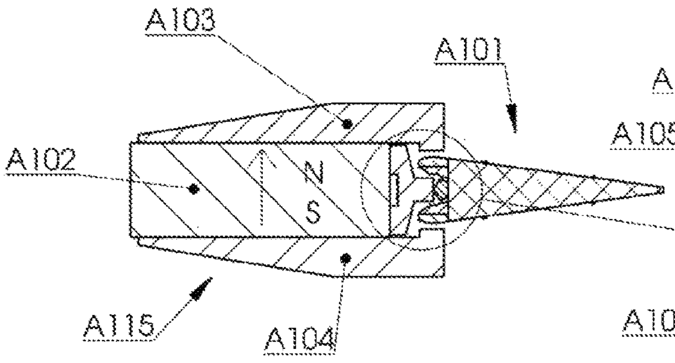

A first example of a configuration R2 diaphragm structure A1300 is shown in FIGS. 1A-1F and 2A-2I. Referring to FIGS. 2A and 2B in particular, in this example the mass of one or more (preferably all) normal stress reinforcement struts A206 and A207 is reduced by reducing the width of each strut A206, A207 in a region of the diaphragm structure A1300 that is at or proximal to a peripheral edge of the associated major face that is most distal from a base region A222 of the diaphragm structure A1300. In other words, the region of reduced mass is located in a region that is most distal to a base region A222 or centre of mass A218 of a diaphragm assembly incorporating the diaphragm structure. The diaphragm assembly includes the diaphragm structure A1300 and the diaphragm base structure A222 as previously described. In this particular example, the diaphragm base structure A222 comprises the coil winding A109, the spacer A110 and the shaft A111 of the hinge assembly (but may alternatively include any combination of one or more of these parts) as described in section 2.2.1 above. In this example, the centre of mass is located proximal to the thicker base end of the diaphragm structure A1300 due to the relatively larger mass of the diaphragm base structure A222 including the coil A109, the spacer A110 and the steel shaft A111 relative to the remainder of the diaphragm structure A1300. As such, the regions of the normal stress reinforcement with reduced mass are located proximal to the thinnest regions of the tapering diaphragm body A208, i.e. the distal free end of the diaphragm structure A1300. Therefore, for this configuration preferably the normal stress reinforcement of each major face comprises a relatively lower mass in a peripheral edge region distal from the base region A222 of the diaphragm structure and a relatively higher mass in a region at or proximal to the base region. In this example, the normal stress reinforcement of each major face comprises a relatively lower width in a region distal from the base region A222 of the diaphragm structure and a relatively larger width in a region at or proximal to the base region. In this specification, unless otherwise stated, reference to a peripheral edge region of a major face of a diaphragm body, is intended to mean a region that is located at, and directly adjacent and proximal to, a peripheral edge of the associated major face.

As shown in FIGS. 2A and 2B, in this example the reduction in width in the normal stress reinforcement struts A206, A207 occurs in a stepped manner at A216, however it will be appreciated that the reduction in width may otherwise be gradual across the length of the struts and/or tapered. Furthermore, the stepped region A216 is located approximately midway along the longitudinal length of the diaphragm body A208. However, it will be appreciated that this is a matter of design and is dependent on a number of factors including desired resonance response, material used, and design of diaphragm body as well as a number of other factors that would be apparent to those skilled in the relevant art.

The reduction in width of struts A206, A207 may also or otherwise be a reduction in thickness to reduce mass in the relevant regions. Furthermore, the reduction may be achieved by altering the material used for the struts in the relevant regions, however it will be appreciated that this may be more difficult to implement.

A second example of a configuration R2 structure is shown in FIGS. 9A and 9B. In this example, one or more recesses A902 are formed in the normal stress reinforcement member A901 of each major face in regions that are distal from the base region A222 (as previously described above for the first example). The regions A902 devoid of normal stress reinforcement may be of any shape required to achieve the desired resonance response during operation. In the example shown, the recesses A902 are truncated ovals. The reduction of mass increases as a function of the distance from the base region A222. The recesses A902 are tapered for example and increase in width in regions most distal from the base region A222. In some variations, the recesses may be rectangular, triangular or comprise any other shape. Similarly, the number of recesses can be altered in accordance with the desired resonance response and application. FIGS. 10A-10B show a variation of the FIGS. 9A and 9B diaphragm structure for example, where a single truncated circle/oval recess A1002 extends across a substantial portion of the width of the diaphragm body.

Referring to FIGS. 11A-11C, another example of the configuration R2 diaphragm structure is shown. In this example, the normal stress reinforcement plates adjacent each major face comprise a region of increased thickness A1101 proximal to the diaphragm structure's base region A222, and a region of reduced thickness A1102 distal to the diaphragm structure's base region. The reduction in thickness is stepped at A1103, but it will be appreciated this may be gradual or tapered in variations of this example. The reduction of mass may be tapered and increases in regions most distal from the base region A222 in some variations. Also the step A1103 is located approximately midway along the length of the diaphragm body but it will be appreciated this may be in any other region sufficiently distal from the aforementioned base region A222. FIGS. 12A-12D show a variation of this example where the reduction in thickness occurs in reinforcement struts A1201, A1202 (instead of reinforcement plates). Again, the reduction is stepped at A1203 but this may be gradual or tapered and whilst the reduction occurs midway along the length of the diaphragm body, this may be located in another region sufficiently distal from the aforementioned base region A222.

A configuration R2 diaphragm structure is also exemplified within the audio transducer embodiment shown in FIGS. 41A-41B, which has a diaphragm similar to that shown in FIGS. 39A-39C, except that the amount of outer normal stress reinforcement G301 reduces towards perimeter/peripheral edge remote from the central base region where the excitation location(s) and also the centre of mass of the diaphragm assembly are exhibited. In this example, recesses are formed in the normal stress reinforcement plate of each major face in regions adjacent the perimeter of the diaphragm body and most distal from the base region of the diaphragm structure. In addition, normal stress reinforcement is omitted at either side G303 of each normal stress reinforcement plate, adjacent the edges of the major face that are located more proximal to the central base region. The recesses are tapered such that they increase in width in regions most distal from the base region. In this embodiment, the end recesses G304 are triangular but other shapes are also possible. In some variations the recesses may have a substantially constant width. In this example, the base region/centre of mass of the diaphragm assembly is located proximal to the motor coil G112 and coil former G111 located substantially centrally of the diaphragm body. Normal stress reinforcement mass is thus reduced, preferably evenly, at the perimeter/peripheral edge regions of the associated major face of the diaphragm body.

In this example each outer normal stress reinforcement plate G301 is of constant thickness, and of identical thickness to the embodiment of FIGS. 39A-39C, and in this case the reduction of the outer normal stress reinforcement G301 occurs through removal of the reinforcing, with the removal increasing towards the edges that are furthest from the coil G112 attached to the coil former G111.

Parts of the outer normal stress reinforcement plates G301 are omitted from edge regions G304 located mid-way between the inner shear stress reinforcement members G109. This serves a purpose of reducing mass associated with said parts of the outer normal stress reinforcement G301, as well as of the adhesive used to attach said parts to the foam core G108.

It is preferable that if said normal stress reinforcement G301 is omitted from parts of the surface in order to minimise mass, remaining parts of the diaphragm surface are left bare or at least any coating is very lightweight such as a thin coat of paint, since this maximises the mass reduction.

The reduction in the amount of outer normal stress reinforcement material G301 reduces resistance to diaphragm bending in the localised region between adjacent inner reinforcement members G109, however this distance is short and the associated adverse effect on localised diaphragm resonances is offset by the reduced mass and associated reduction in susceptibility to both bending and shear mode deformation. In some cases the net effect may be a net improvement in terms of localised 'blobbing' resonances.

Looking at non-localised resonances, such as whole-diaphragm bending, again there is a reduction in resistance to bending mode deformation due to the reduced outer layer normal stress reinforcement G301, however this is offset to some degree by: the fact that the areas where the outer layers have been omitted are comparatively less effective against whole-diaphragm bending in this region because they were not connected to inner reinforcement members G109, and; a reduction in mass in the outer peripheral edge regions.

This peripheral edge region of each major face is important because its location remote from most of the rest of the diaphragm and from the heavy excitation mechanism, in this case a motor coil attached at the middle of the diaphragm, means that it tends to displace comparatively large distances under excitation of key breakup resonance modes. Unloading the peripheral edge regions tends to provide win-win benefits being a disproportionate reduction in diaphragm breakup, as well as a reduction in diaphragm mass.

Note that, in the case of this diaphragm structure, the edge regions where outer normal stress reinforcement material/layers are not omitted are less susceptible to localised resonances, compared to edge regions where outer layers are omitted, due to the presence of the anti-shear inner reinforcement members G109. In other words, the outer periphery of each recess G108 is either connected or located directly adjacent inner stress reinforcement to thereby reinforce the peripheral edge regions of the major face that include normal stress reinforcement. Also, it is preferable that the outer normal stress reinforcement G301 is rigidly connected to the inner reinforcement member(s) G109 to enhance symbiotic benefit. For these reasons it is preferable that normal stress reinforcement G301 is omitted in peripheral edge regions that are located adjacent or between, but not directly over, inner reinforcement members G109.

FIGS. 42A-42B show another variation of the configuration R2 diaphragm structure of FIG. 41A-41B. In this example, multiple recesses are formed in opposing edge regions of each normal stress reinforcement plates G401, leaving struts which taper outwardly towards the edge regions.

FIGS. 43A-43C show yet another variation of the configuration R2 diaphragm structure of FIGS. 41A-41B. In this example, the diaphragm structure is similar to that shown in FIGS. 42A-42B except that the thickness of outer normal stress reinforcement is also reduced towards perimeter/peripheral edges remote from the central base region. The normal stress reinforcement is relatively thick at location G501 and steps down at location G503 to a relatively thinner section G502 adjacent the recesses. This construction could be made, for example, using a single component combining thick areas G501 and thin areas G502, or from two laminated components, one component extending to region G502, and the other stopping at location G503. The reduction in thickness may be stepped or otherwise gradual/tapered in other examples, reducing towards the peripheral edge of the associated major face.

As illustrated in FIGS. 41A-41B, 42A-42B and 43A-43C, said reduction in the amount of outer normal stress reinforcement, towards perimeter edge regions remote from the base region (where the excitation mechanism and/or centre of mass location when the diaphragm structure is part of a diaphragm assembly is/are exhibited) may occur through, for example, thinning of an outer normal stress reinforcement layer, omission of outer normal stress reinforcement layer from certain zones/regions, narrowing of struts, tapering of reinforcement and any other possible method of mass reduction as would be readily apparent to those skilled in the art. Furthermore, the diaphragm structure may comprise a tapered reduction of mass in the peripheral edge regions where mass is reduced further closer to the edge of the major face. This may be done via an increase in the width of recesses, or a tapering of thickness of reinforcement plates, or a tapering of thickness and/or width of reinforcement struts for example. It is also preferred that the peripheral regions of reduced mass are located adjacent or between regions of the major face that are directly adjacent or locate over inner stress reinforcement, or in other words, the peripheral regions including normal stress reinforcement located directly adjacent or over inner stress reinforcement members of the diaphragm structure.

FIGS. 45A-45B and 46A-46D show two further examples of a configuration R2 structure of the invention. In these examples the amount/mass of outer normal stress reinforcement G601 is reduced at regions at or proximal to the peripheral edge regions of the associated major face. For instance in the FIGS. 45A-45B variation, the width of the upper normal stress reinforcement member is reduced, a triangular recess or notch is located at either end of the normal stress reinforcement and two additional triangular apertures/recesses are formed on either side and adjacent each triangular recess. The lower normal stress reinforcement member (which extends over three major faces of the diaphragm body) has two opposing angled faces omitted. The two other opposing angled faces have triangular recesses formed at their terminal ends and two additional triangular apertures are formed on either side and adjacent the triangular recess. In this manner, the recesses cause a reduction in mass of the normal stress reinforcement adjacent regions of the associated major faces that are distal from the base region. The outer regions are regions that are distal from the base region, where the motor coil G112 and former G111 of a diaphragm assembly incorporating this structure are located.

In the FIG. 46A-46D example, the normal stress reinforcement members comprise a series of struts. The struts along the upper major face comprise a pair of longitudinal struts extending substantially parallel and distal to the longitudinal edges of the major face. A pair of cross-struts are then located at either end and extend between the pair of longitudinal struts. On the underside of the diaphragm body, the normal stress reinforcement (which also extends over three major faces) comprises a series of struts that form an enclosed shape including a pair of adjacent triangular teeth on each one of a pair of opposing angular faces, and a pair of longitudinal struts extending along the edge of a central face between the angular faces and connecting to the teeth of each angular face. In this variation, the normal stress reinforcement reduces in thickness in peripheral edge regions G801 via steps G802 to thereby further reduce the amount/mass of normal stress reinforcement in these outer regions that are distal from the base region. The base region is where a centre of mass of a diaphragm assembly including the diaphragm structure and the motor coil G112 and former G111 is exhibited. It will be appreciated that in each of these examples, the recesses and the apertures may take on alternative forms such as arcuate, annular or the like. It will also be appreciated that in the FIG. 46A-46D example, while the reduction in thickness is stepped at G802, this may alternatively be gradual in other embodiments.

FIGS. 9A and 9B illustrates embodiment A9 which is an example of configuration R2 implemented in a single-diaphragm rotational-action diaphragm assembly.

FIGS. 32A-32E illustrate embodiment D which is an example of configuration R2 implemented in a multi-diaphragm rotational-action diaphragm assembly.

Configuration R3

A further diaphragm structure configuration of the invention, designed to simultaneously address resonance issues resulting from core shear deformation and high mass at the diaphragm extremities will now be described with reference to a first example shown in FIGS. 1A-1F and 2A-2I. This diaphragm structure will be herein referred to as configuration R3. The configuration R3 diaphragm structure is a sub-structure of configuration R1 and as such much of the features incorporated in the configuration R1 structure are also incorporated in the configuration R3 structure. The configuration R3 diaphragm structure consists in a diaphragm structure in accordance with configuration R1 wherein one or more peripheral regions of the diaphragm body that are distal from the base region of the diaphragm structure are reduced in thickness relative to a remainder of the diaphragm body and/or relative to regions that are proximal to the base region of the diaphragm structure. This has the effect of reducing the mass of the diaphragm structure in regions that are distal from the centre of mass, as with the configuration R2 structure. In the most preferred implementation of configuration R3, one or more peripheral region(s) that are distal or remote from the base region of the diaphragm structure comprise a reduced thickness relative to region(s) proximal to the base region. In the example of the embodiment A audio transducer shown in FIGS. 1A-1F and 2A-2I, the diaphragm structure A1300 is wedge shaped and tapers in thickness along the length of the body from a thicker end A1300*b* to a thin end A1300*a*. It is preferred that the reduction in thickness/taper is gradual and continuous but may alternatively be stepped or comprise any other profile, and/or the taper may commence in a region that is midway along the length of the body and not necessarily located at the peripheral region. The peripheral region(s) of reduced thickness is (are) preferably that (those) which is (are) most distant from the base region of the diaphragm structure. In this example, one end of the diaphragm body A208 at or adjacent the base region A222 and configured to couple the diaphragm base structure is thicker than an opposing end region A1300*a* distal from the base region.

In the example of embodiment A, a thickness envelope or profile between the base region A222 of the diaphragm body and an opposing peripheral region A1300*a* most distal from the base region is angled at, at least about 4 degree relative to a coronal plane of the diaphragm body, and more preferably at least approximately 5 degrees relative to a coronal plane of the diaphragm body A208. For example, the angle A223 shown in FIG. 2F indicates that the major face A214 of the diaphragm structure A1300 is angled at approximately 7.5 degrees to the coronal plane A213.

Another example of a configuration R3 diaphragm structure is shown in relation to the audio transducer embodiment shown in FIGS. 44A-44F. The diaphragm body G602 comprises one or more peripheral regions of reduced thickness that are distal from a central base region of the diaphragm structure (at or proximal the diaphragm assembly base structure, including motor coil G112 and former G111 coupled to the diaphragm structure). As mentioned the reduction of thickness reduces the mass of the diaphragm structure in these distal regions. The diaphragm body comprises a truncated trapezoidal shape where the body tapers and reduces in thickness outwardly from the central base region. In this example, the entire periphery being made up of all peripheral regions comprises reduced thickness relative to the central region which comprises a relatively thicker, and preferably the thickest, part of the diaphragm body.

The configuration R3 diaphragm structure achieves a similar outcome to that achieved by the diaphragm structure of configuration R2 by reducing the mass of the diaphragm structure in regions distal (preferably most distal) from the base region. Note that in both examples the peripheral regions should preferably not be made too thin since the geometry may not support the outer normal stress reinforcement (e.g. G601) and the core's (e.g. G602) own mass against localised transverse resonances facilitated by core bending near the edge and/or core blobbing resonances facilitated by the core material shearing (these modes may tend to combine into the same thing in this case.) In other words, the structure preferably remains substantially rigid in these peripheral regions. Inner reinforcement members (e.g. G603) address core shearing issues.

Configuration R4

Yet another sub-structure of the configuration R1 diaphragm structure of the invention will now be described. This diaphragm structure will be herein referred to as configuration R4 and addresses the same resonance sources more comprehensively than configurations R2 and R3 by employing both diaphragm thinning of the diaphragm body at one or more peripheral regions distal to the base region of the associated structure and also reduction of outer normal stress reinforcement mass of at least one major face at or adjacent peripheral edge regions of the major face distal from the structure's base region (which is essentially a combination of configuration R2 and configuration R3 diaphragm structures).

The reduced mass of normal stress reinforcement in the peripheral edge region(s) distal from the base region means that there is less mass for the associated peripheral regions of the diaphragm body to support, which means that the peripheral region of the diaphragm body can be made even thinner, thus providing a synergistic effect. Configuration R4 is exemplified in the diaphragm structures shown in FIGS. 1A-1F, 2A-2I, 9A-9B, 10A-10B, 11A-11C and 12A-12D for the wedge shaped diaphragm body type structure, and is also exemplified in the diaphragm structures shown in FIGS. 45A-45B and FIGS. 46A-46D for the trapezoidal prism diaphragm body type structure. The forms of the normal stress reinforcement are described in detail under configuration R2 and will not be repeated for conciseness. Similarly the reduction in diaphragm body mass for these examples is described in detail under configuration R3 and will not be repeated for conciseness. In all these examples, the reduction in mass of the normal stress reinforcement and the reduction in mass/thickness of the diaphragm body exists in the same peripheral regions of the diaphragm structure that are distal (and preferably most distal) from the base region where a centre of mass location of an associated diaphragm assembly incorporating the diaphragm structure is exhibited.

For instance, within the embodiment shown in FIGS. 45A-45B, which is similar to the embodiment shown in FIGS. 44A-44F except that parts of the outer normal stress reinforcement G701 are omitted to reduce mass, and in particular are omitted from peripheral edge regions located mid-way between the inner reinforcement members G603. This serves a purpose of reducing mass associated with said parts of the outer layers G701 as well as of the adhesive used to attach said parts to the core G602, from the critical edge areas. The net effect is a reduction in mass in the peripheral region so that the diaphragm body core G602 has only to support its own mass.

As described previously in relation to configuration R2 it is preferable that when parts of the normal stress reinforcement G701 are omitted, this occurs in areas between the inner reinforcement members G603.

Although an important purpose of the configuration R4 diaphragm structure is mitigation of adverse effects associated with of diaphragm breakup resonance modes, thinning of diaphragm peripheral regions and removal of reinforcing material from the peripheral edge regions has an additional benefit in that overall diaphragm mass reduces and driver efficiency improves.

2.3 Configurations R5-R7 Audio Transducers

Conventional speakers having cone and dome membrane type diaphragms suffer a number of membrane-type resonance modes, which are sometimes addressed by techniques such as balancing and improvement of manufacturing accuracy to minimise excitation of modes, where possible, and also by damping via use of diaphragm materials such as plastic, coated or sliced etc. paper, silk and Kevlar.

The 'diaphragm surround' component plays a crucial role in conventional thin membrane type diaphragms: 1) supporting the flimsy diaphragm edge so that it doesn't touch surrounding components as it flexes; 2) damping resonances, since the diaphragm may have low stiffness in terms of resistance to certain resonances such as 'gong' modes.

Conventional surround and spider diaphragm suspension components create a problematic three-way design compromise whereby the requirement to increase diaphragm excursion or reduce the diaphragm's fundamental resonance frequency results in a wider and floppier suspension component, respectively, which in turn increases resonance issues at the upper end of a speaker's frequency bandwidth. In simple terms this means that improved bass results in an increase in unwanted resonance.

Nonetheless diaphragm surround suspension components are ubiquitous, including in combination with a range of non-membrane diaphragm types.

This symbiotic benefit does not, however, apply when a conventional surround is combined with a thick, rigid-design-approach diaphragm.

An audio transducer combining a substantially rigid diaphragm structure with an outer peripheral region that is substantially free from physical connection with a surrounding structure, provides several advantages. Firstly the peripheral region of the diaphragm can be less rigid and more lightweight since it no longer has to support the surround, and only has to support its own relatively low mass. Intermediate diaphragm regions in turn can be made significantly lighter since they no longer have to support the surround, nor the component of peripheral-region mass that has been eliminated. The base of the diaphragm can be lighter still since it no longer needs to support the surround, nor the component of peripheral-region mass that has been eliminated, nor the component of intermediate-region mass that has been eliminated. The electromagnetic coil can now be made lighter due to the reduction in mass elsewhere. In the case of a rotary action diaphragm, the hinge mechanism carries less mass and so provides improved support.

Various audio transducer configurations that have been designed to address some of the shortcomings mentioned above using these identified principles will now be described with reference to some examples. The following audio transducer configurations will herein be referred to as configuration R5-R7 for the sake of conciseness. The configuration R5-R7 audio transducers will be described in further detail with reference to examples, however it will be appreciated that the invention is not intended to be limited to these examples. Unless stated otherwise, reference to the configuration R5-R7 audio transducers in this specification shall be interpreted to mean any one of the following exemplary audio transducers described, or any other audio transducer comprising the described design features of these configurations as would be apparent to those skilled in the art.

Free Periphery

In the each of configuration R5-R7 audio transducers, the audio transducer consists in a diaphragm assembly having a diaphragm structure with one or more peripheral regions that is/are free from physical connection with a surrounding structure of the transducer.

The phrase "free from physical connection" as used in this context is intended to mean there is no direct or indirect physical connection between the associated free region of the diaphragm structure periphery and the housing. For example, the free or unconnected regions are preferably not connected to the housing either directly or via an intermediate solid component, such as a solid surround, a solid suspension or a solid sealing element, and are separated from the structure to which they are suspended or normally to be suspended by a gap. The gap is preferably a fluid gap, such as a gases or liquid gap.

Furthermore, the term housing in this context is also intended to cover any other surrounding structure that accommodates at least a substantial portion of the diaphragm structure therebetween or therewithin. For instance a baffle that may surround a portion of or an entire diaphragm structure, or even a wall extending from another part of the audio transducer and surrounding at least a portion of the diaphragm structure may constitute a housing or at least a surrounding structure in this context. The phrase free from physical connection can therefore be interpreted as free from physical association with another surrounding solid part in some cases. The transducer base structure may be considered as such a solid surrounding part. In the rotational action embodiments of the invention for example, parts of the base region of the diaphragm structure may be considered to be physically connected and suspended relative to the transducer base structure by the associated hinge assembly. The remainder of the diaphragm structure periphery, however, may be free from connection and therefore the diaphragm structure comprises at least a partially free periphery.

The phrase "at least partially free from physical connection" (or other similar phrases such as "at least partially free periphery" or sometimes abbreviated as "free periphery") used in relation to the outer periphery in this specification is intended to mean an outer periphery where either:

approximately the entire periphery is free from physical connection, or otherwise in the case where the periphery is physically connected to a surrounding structure/housing, at least one or more peripheral regions are free from physical connection such that these regions constitute a discontinuity in the connection about the perimeter between the periphery and the surrounding structure.

A diaphragm structure periphery that is physically connected along one or more edges along approximately an entire length of the periphery, but free from connection along one or more other peripheral edges or sides (such as the conventional suspension shown in FIGS. 39A-39C) does not constitute a diaphragm structure that comprises an outer periphery that is at least partially free from physical connection as in this case the entire peripheral length or perimeter is supported in at least one region, and there is no discontinuity in the connection about the perimeter.

As such, in the case where the audio transducer comprises a solid suspension, including a solid surround or sealing element for example, preferably the solid suspension connects the diaphragm structure to the housing or surrounding structure with a discontinuity in the connection about the periphery. For example the suspension connects the diaphragm structure along a length that is less than 80% of the perimeter of the periphery. More preferably the suspension connects the diaphragm structure along a length that is less than 50% of the perimeter of the periphery. Most preferably the suspension connects the diaphragm structure along a length that is less than 20% of the perimeter of the periphery.

The audio transducer embodiment shown in FIGS. 47A-47E (hereinafter referred to as embodiment G9) is an example of a partially free periphery implementation. This audio transducer is similar to that shown FIGS. 39A-39C. The magnet assembly and basket G103 and spider G105 is the same assembly as shown in FIGS. 39A-39C, and the diaphragm assembly G600 is the same assembly as shown in FIGS. 44A-44F. The only other differences are that the diaphragm structure suspension G102 is replaced by multiple suspension members G901 causing a discontinuity in the suspension about the perimeter. In this manner, this embodiment constitutes a free edge design, in which one or more outer peripheral regions G908 of the diaphragm structure are free from physical connection with the surround G902. At the free periphery regions G908, an air gap G903 exists between the outer periphery of the diaphragm structure and the surrounding structure G902 (at locations G902*b* of the structure G902). The surrounding structure G902 may be rigidly coupled to a basket G103.

As shown, preferably the one or more peripheral regions G908 that are free from physical connection constitute at least 20% of an entire perimeter of the diaphragm structure (e.g. approximately 2×G906+2×G905). More preferably the one or more free peripheral regions constitute at least 50%, or at least 80% of the perimeter. This lack of physical connection provides advantages over embodiments having a higher degree of connection about the perimeter of the diaphragm structure. One advantage is that a lower fundamental Wn is facilitated. Another is that, as surrounds are prone to adverse mechanical resonances, reducing the area and peripheral length of the sound propagating component can provide benefits to sound quality. A periphery that is even partially free from physical connection, e.g. along approximately 20% of the perimeter, still provides a significant advantage in bandwidth of operation (e.g. by lowering the fundamental frequency Wn) and reducing distortion produced by breakup of the surround. As another example, if a periphery is made to be partially free from physical connection and the surround material that remains is thickened such that the fundamental diaphragm frequency remains unchanged, then this may cause resonance modes inherent in the surround to increase in frequency. The parts of the peripheral regions of the diaphragm G908 that are free from connection are separated from the surrounding structure G902 by an air gap G903. Preferably this gap is substantially small. For example it may be between 0.2-4 mm in some applications.

The diaphragm suspension members G901 connect the diaphragm G600 to the major face G902*a* of the surrounding structure G902, which in this case is a guide plate G902 of the basket G103. In combination with the spider G105 this provides a diaphragm suspension system that operationally suspends the diaphragm assembly G600 within the basket and magnet assembly. Each diaphragm suspension member G901 consists of a flexible region G901*a*, and connection tabs G901*b* and G901*c*. Tabs G901*c* provide surface area to attach to the guide plate major face G902*a*. The tabs G901*c* attach to the outer reinforcement G601 and the core G602 at the outer periphery of the diaphragm structure. In this embodiment the diaphragm suspension members G901 are made from a rubber. Other suitable materials include metals, such as spring steel and titanium, silicon, closed cell foams and plastics. These components are solid suspension components (e.g. not a fluid suspension). The geometry, for example the length G907, and the width of region G901*a* has a large effect on the compliance of the suspension system. The combination of material geometry and Young's modulus should preferably be compliant to provide this transducer a substantially low fundamental frequency Wn.

It is preferred for any audio transducer embodiment that the diaphragm structure periphery is at least partially and significantly free from physical connection. For example a significantly free periphery may comprise one or more free peripheral regions that constitute approximately at least 20 percent of a length or two dimensional perimeter of the outer periphery, or more preferably approximately at least 30 percent of the length or two dimensional perimeter of the outer periphery. The diaphragm structure is more preferably substantially free from physical connection, for example, with at least 50 percent of the length or two dimension perimeter of the outer periphery free from physical connection, or more preferably at least 80 percent of the length or two dimensional perimeter of the outer periphery. Most preferably the diaphragm structure is approximately entirely free from physical connection.

In some audio transducer embodiments of this invention, a ferromagnetic fluid may be utilised to support the outer periphery of the diaphragm structure, such as described for embodiments P and Y in sections 5.2.1 and 5.2.5 of this specification respectively. A ferromagnetic fluid does not constitute a solid component such as a solid suspension provided there is substantially no physical mechanical connection (as defined by the above criteria) made between the outer periphery of the diaphragm structure and the inner periphery of the surrounding structure. A ferrofluid or other suspension fluid may be located in gaps G903 of the embodiment G9 transducer for example, and the diaphragm structure would still be considered of the free periphery type.

In this specification, where reference is made (outside this section 2.3) to a free periphery configuration, or a free periphery configuration as defined under section 2.3, or any other similar reference, then unless otherwise stated, such a configuration is not intended to be limited to the additional features described in sections 2.3.1-2.3.3 below, although these additional features are not precluded from being a sub-configuration of that reference.

2.3.1 Configuration R5

An audio transducer configuration of the invention will now be described with reference to FIG. 6G. The audio transducer A100 will be referenced as configuration R5, however, it is important to note that the diaphragm structure employed in this audio transducer is not necessarily a sub-structure of the configuration R1 diaphragm structure, but it can be in some variations. The configuration R5 audio transducer provides improved diaphragm breakup behaviour by simultaneously substantially eliminating the diaphragm suspension/surround and reducing outer normal stress reinforcement mass at one or more peripheral regions of the diaphragm body A208/diaphragm structure A1300 that are distal from the base region A222. The audio transducer of configuration R5 consists in a diaphragm assembly A101 having a diaphragm structure A1300 with one or more peripheral regions that is/are at least partially free from physical connection with a surrounding structure of the transducer and a substantially lightweight diaphragm body A208 with outer normal stress reinforcement associated with one or more major faces that reduces in mass towards one or more peripheral edge regions of the major face that are distal from the base region A222 of the diaphragm structure.

Figure 6A:
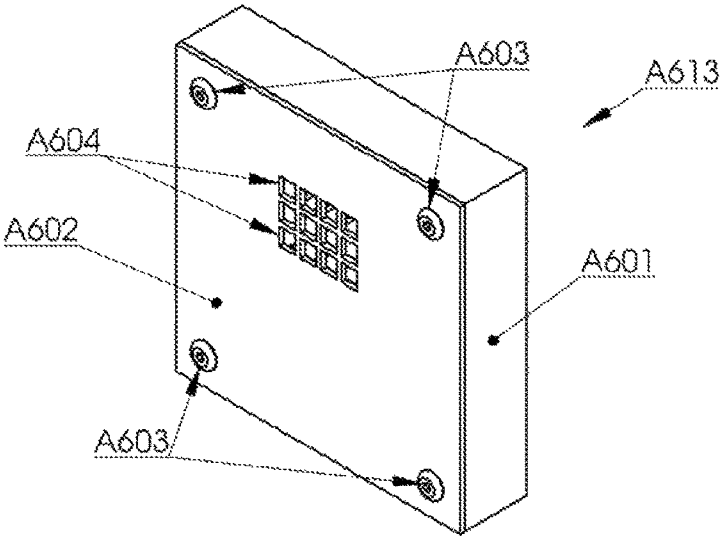
Figure 6B:
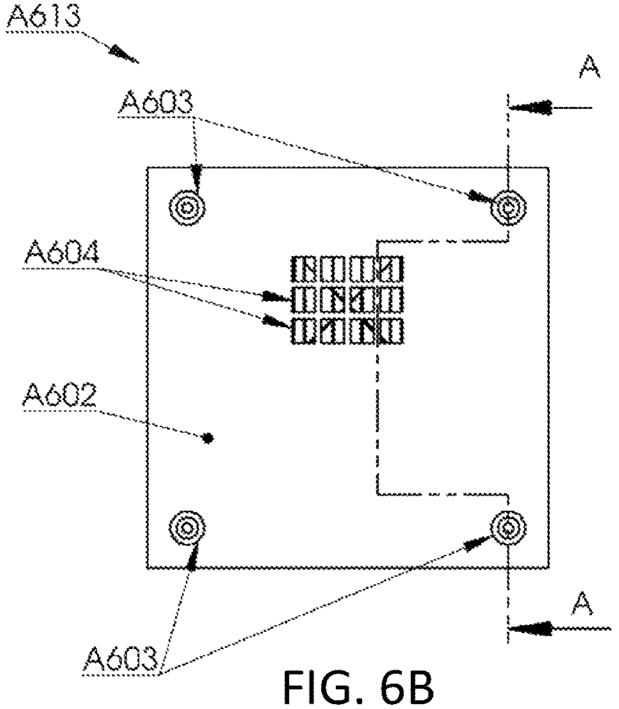
Figure 6C:
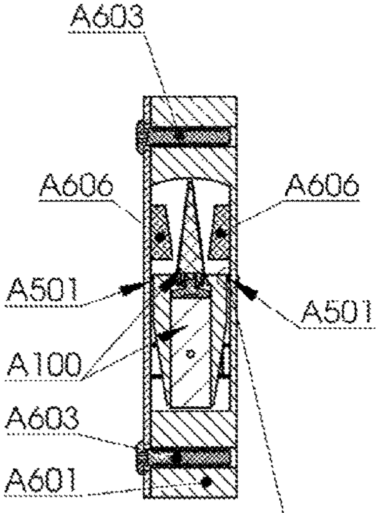
Figure 6E:
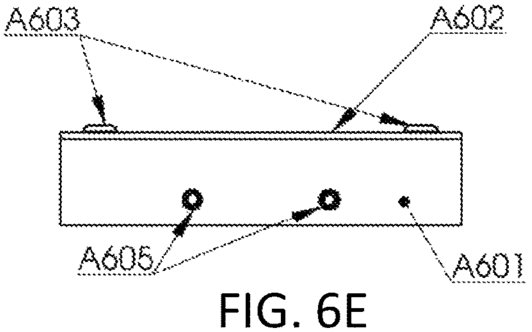
Figure 6D:
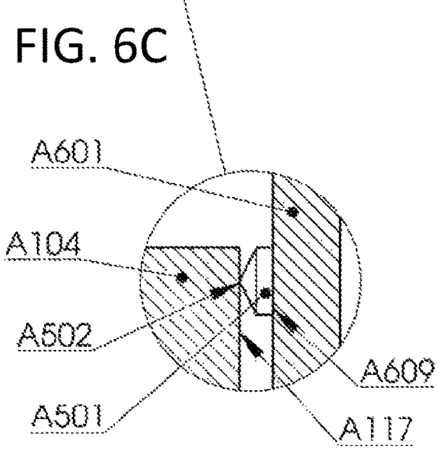
Figure 6F:
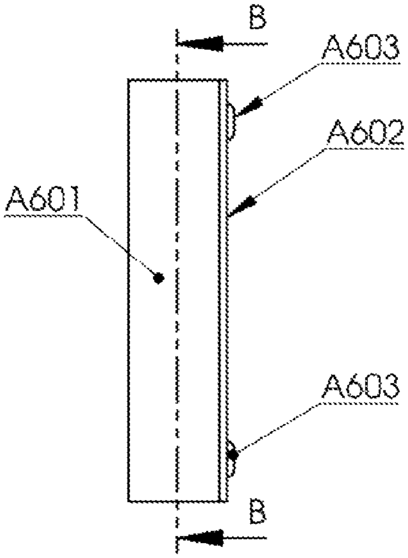
Figure 6G:
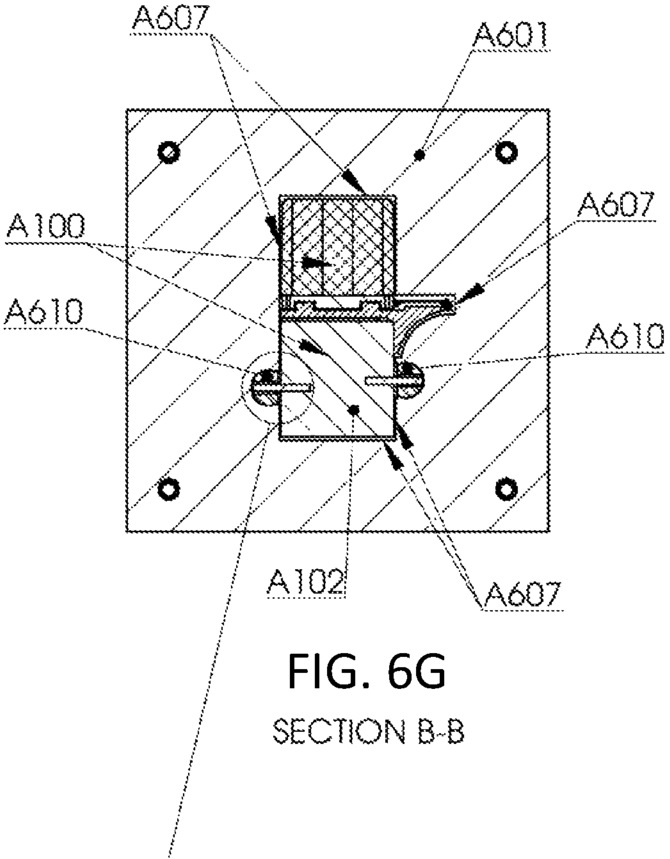

As shown in the configuration R5 audio transducer of FIG. 6G, the audio transducer assembly A100 (which may also be referred to herein as an audio device incorporating an audio transducer) comprises a diaphragm assembly A101 including a diaphragm structure A1300 (shown in FIGS. 2H-2I) having a body A208 with one or more major faces that are reinforced with outer normal stress reinforcement A2076/A207 (just as in previously described configurations R1, R2 and R4 diaphragm structures). As with the configuration R2 diaphragm structure, the normal stress reinforcement of the diaphragm structure of the configuration R5 audio transducer comprises a distribution of mass that results in a relatively lower amount of mass at one or more peripheral edge regions of the associated major face that is/are distal from base region of the diaphragm structure or that is/are distal from a centre of mass location of the diaphragm assembly.

The audio transducer further comprises a housing or surround A601 in the form of an enclosure and/or baffle, for example, for accommodating the diaphragm assembly A101 therein. The housing preferably also accommodates the transducer base structure A115 therewithin. In addition to the reduction of mass in the normal stress reinforcement, the diaphragm structure A1300 comprises a periphery that is at least partially free from physical connection with an interior of the surrounding structure, being the housing body A601 in this example. In this example, approximately 96% of the periphery of the diaphragm structure A1300 is free from physical connection with any surrounding structure including the housing body A601 and transducer base structure, and is spaced form the interior wall of the housing as shown by air gaps A607. As such the outer periphery is approximately entirely free from physical connection. The base region A222 however is suspended by a diaphragm suspension system relative to the transducer base structure and makes a physical connection with the base structure at the hinge joints (which constitute approximately 4% of the peripheral edge perimeter). However, in some variations the periphery of the diaphragm structure may only be partially free from physical connection with the housing by a different amount as mentioned above, but still significantly free from physical connection. For example, for a diaphragm structure to be significantly free from physical connection, preferably the one or more peripheral regions free from physical connection constitute approximately at least 20 percent of a length or two dimensional perimeter of the outer periphery, or more preferably approximately at least 30 percent of the length or two dimensional perimeter of the outer periphery. The diaphragm structure may be substantially free from physical connection, for example with at least 50 percent of the length or two dimension perimeter of the outer periphery free from physical connection, or more preferably at least 80 percent of the length or two dimensional perimeter of the outer periphery.

In this example, the at least one or more peripheral regions free from physical connection comprises at least one peripheral region (e.g. the edge opposing the base region of the diaphragm assembly) that is most distal from the base region of the diaphragm structure.

Configuration R5 is used in the embodiment A audio transducer A100. It will be appreciated however that the diaphragm structure used in this configuration audio transducer may be any one of the configuration R1-R4 diaphragm structure or any other diaphragm structure including a diaphragm body having one or more major faces, and normal stress reinforcement coupled adjacent at least one of said major faces for resisting compression-tension stresses experienced by the body during operation, wherein a distribution of mass of the normal stress reinforcement is such that a relatively lower amount of mass is at one or more regions distal from a center of mass location of the diaphragm assembly. An example diaphragm assembly that may be used in place of the diaphragm assembly A101 is shown FIGS. 11A-11C for example. This assembly is similar to that of embodiment A except that the core A1004 optionally does not have inner shear reinforcement laminated within, and that the outer normal stress reinforcement consists of a thin foil. The foil is thicker at region A1101, close to the relatively high mass base of the diaphragm assembly and is thinner at region A1102 which is towards the diaphragm tip at one or more distal regions. The step change in thickness can be seen in the detail view of FIG. 11B at location A1103. In this example, the one or more distal regions of the diaphragm body are aligned with the one or more distal regions of the normal stress reinforcement that have a reduced thickness or mass. As mentioned previously for other configurations, the change in thickness may be otherwise tapered or gradual in some alternative variations. In this variation, the region of reduced thickness A1102 is that most proximal the tip/edge region of the diaphragm most distal from the region configured to couple an excitation mechanism in use.

It will be appreciated that many alternative variations exists that achieve a reduction of mass of the outer normal stress reinforcement in the regions distal from the centre of mass, as previously described for configuration R1 and R2 for example. These variations are also possible for the diaphragm structure of the configuration R5 audio transducer, but without limitation. For example the outer normal stress reinforcement of the diaphragm structures of FIGS. 1A-1F, 2A-2I, 9A-B, 10A-10B, 12A-12D, 41A-41B, 42A-42B and may alternatively be used. Note that the diaphragms of FIGS. 41A-41B, 42A-42B and would need to be deployed with a diaphragm suspension that leaves the periphery at least partially free from physical connection in order to constitute an R5 configuration (e.g. as in embodiment G9 or similar). Furthermore, in some variations, the diaphragm structure may also comprise inner stress reinforcement as per any of the diaphragm structures described under configuration R1. It will be appreciated that the diaphragm structure used in this configuration audio transducer may comprise any combination of one or more of the following (previously described) features:

- one or more peripheral regions most distal from the center of mass location are devoid of any normal stress reinforcement;
- the diaphragm body comprises a relatively lower mass at one or more regions distal from the center of mass location;
- the diaphragm body comprises a relatively lower thickness at the one or more distal regions.
- The thickness may be tapered towards the one or more distal regions or stepped;
- the thickness of the diaphragm body is continually tapered from a region at or proximal the center of mass location to the one or more most distal regions from the center of mass location; and/or
- the one or more distal regions of the diaphragm body are aligned with the one or more distal regions of the normal stress reinforcement that have a reduced thickness or mass.

Parts of the outer normal stress reinforcement located close to the base region of the diaphragm structure take more load under breakup conditions since they are 'piggy-in-the-middle' having to support other distant parts of the diaphragm, such as the edge regions distal from the base region and the heavy diaphragm base and force transferring component, against diaphragm bending. This means that it is more optimal for non-edge (distal from the base) regions to have thicker outer reinforcing. Parts of the outer layers located away from the centre of mass of the diaphragm assembly and near the periphery, on the other hand, do not have to support distant parts of the diaphragm, so the outer normal stress reinforcement can be reduced, as has been described above.

The diaphragm assembly of FIGS. 11A-11C also features diaphragm thickness tapering towards outer peripheral regions remote from the base region of the diaphragm structure and/or the centre of mass of the diaphragm assembly as in the configuration R3 diaphragm structure, which means that the disadvantages resulting from excess diaphragm mass associated with excessive thickness in the peripheral region are also eliminated, but it will be appreciated that in alternative embodiment, the thickness may not be tapered and substantially uniform along the length of the diaphragm body.

In some implementations of this configurations, a ferromagnetic fluid may be utilised to support the outer periphery of the diaphragm assembly, such as described for embodiments P and Y in sections 5.2.1 and 5.2.5 of this specification respectively. As mentioned above a ferromagnetic fluid variation would still reside within the scope of this configuration provided there is substantially no physical mechanical connection (as defined by the above criteria) made between the outer periphery of the diaphragm assembly and the inner periphery of the surrounding structure. Anyone of the rotational action audio transducers, including for example the embodiment A transducer described under section 2.2 of this specification, may be modified to include a ferromagnetic fluid support for the associated diaphragm structure or assembly and the invention is not intended to be limited to supporting diaphragm assemblies of linear action audio transducers as exemplified in embodiments P and Y.

2.3.2 Configuration R6

Another audio transducer configuration will now be described with reference to FIGS. 6G and FIGS. 10A-10B.

This audio transducer configuration is a sub-configuration of the configuration R5 audio transducer and will hereinafter be referred to as configuration R6. The configuration R6 audio transducer of the present invention comprises an audio transducer having a lightweight (preferably foam) diaphragm body that is reinforced by outer normal stress reinforcement at one or more major faces of the diaphragm body. The diaphragm structure may or may not comprise inner stress reinforcement as described for configurations R1-R4. FIG. 6G shows the diaphragm structure periphery at least partially free from physical connection with the surrounding housing The above description in relation to configuration R5 describes the features of this free periphery design. Referring to FIGS. 10A and 10B, in the configuration R6 audio transducer assembly, the diaphragm assembly of FIGS. 10A and 10B is utilised in the audio transducer of embodiment A and comprises a diaphragm structure having normal stress reinforcement members A1001 that comprise one or more regions of reduced mass as per the diaphragm structure of the configuration R5 audio transducer. In this configuration, the diaphragm structure is devoid of any normal stress reinforcement at one or more peripheral edge regions A1002 of the associated major face, each peripheral edge region A1002 being located at or beyond a radius centred on a centre of mass location that is 50 percent of a total distance from the centre of mass location to a most distal peripheral edge of the associated major face.

The centre of mass location is a location of a centre of mass of the diaphragm assembly incorporating the diaphragm structure as per the previously described configurations. The outer normal stress reinforcement A1001 is discontinuous near to one or more peripheral edge regions of the associated major face distal from the base region in order to achieve a reduction in mass in the critical outer edge area. Additionally, a diaphragm structure design that is substantially free from physical connection with a surrounding structure is employed as per configuration R5. That is, the audio transducer of configuration R6 further comprises a housing having an enclosure and/or baffle for accommodating the diaphragm assembly, and the diaphragm structure comprises one or more outer peripheral regions that is/are free from physical connection with an interior of the housing. As mentioned preferably the one or more outer peripheral regions constitute at least 20 percent of a length of the outer periphery of the diaphragm structure as shown in FIG. 6G. The diaphragm structure is designed to remain substantially rigid during the course of normal operation. Also there is some normal stress reinforcement material omitted from the associated surface in one or more peripheral regions lying beyond a radius of 50% as previously mentioned, but more preferably beyond 80% of the distance from the centre of mass of the diaphragm assembly. Preferably there is a small air gap between regions of the diaphragm structure periphery that are free from physical connection with the interior of the housing, and the interior of the housing. In some cases a width of the air gap defined by the distance between the peripheral region of the diaphragm structure and the housing is less than $1/10^{th}$, and more preferably less than $1/20^{th}$ of a shortest length along a major face of the diaphragm body. In some cases the air gap width is less than $1/20^{th}$ of the diaphragm body length. In some cases the air gap width is less than 1 mm.

The outer normal stress reinforcement is omitted at regions A1002 from a total of at least approximately 10% of the area of the associated major faces of the diaphragm body, more preferably at least approximately 25%, and most preferably at least approximately 50%. An advantage of omitting normal stress reinforcement from certain areas as opposed to, say, thinning it, is that no adhesive is required. This in turn means that the diaphragm body in such areas need only be able to support its own mass. For this reason, it is preferable (although not essential) that the regions A1002 devoid of any normal stress reinforcement are left bare or uncoated in order to minimise mass at this critical area, or at least any coating that is utilised in these regions is very lightweight such as a thin coat of paint, for example.

The embodiment shown in FIGS. 10A and 10B is an example of a diaphragm structure that can be used in the configuration R6 audio transducer assembly. The core A1004 is solid and the normal stress reinforcement at the diaphragm surface is of substantially uniform/consistent thickness, and has an approximately semi-circular void or recess in said outer stress reinforcement extending into the associated major surface of the diaphragm body from the distal edge of the diaphragm body opposing the base region. It will be appreciated that the recess A1002 may take on any other form or shape, it may rectangular or triangular and/or there may be multiple recesses, as shown in the outer stress reinforcement of FIGS. 9A-9B, 41A-41B, 42A-42B and 45A-45B for example. Note that the diaphragms of FIGS. 41A-41B, 42A-42B and 45A-45B would need to be deployed with a diaphragm suspension that leaves at least 20% of the periphery free from physical connection in order to constitute an R6 configuration (e.g. deployed in the G9 audio transducer). Normal stress reinforcement A1001 of the FIGS. 9A-9B example has also been omitted from either side of the two major faces of the diaphragm, along a substantial or entire portion of the length of the diaphragm body. However, it will be appreciated that in other embodiments a strip of material may not be omitted in these side regions. The outer normal stress reinforcement is identical on both major faces of the diaphragm body.

In this example, the normal stress reinforcing comprises thin aluminium, and the core comprises polystyrene foam, however, it will be appreciated this is only exemplary and other material for the normal stress reinforcement and diaphragm body may be utilised as defined for the configuration R1 diaphragm structure for example.

Preferably the diaphragm body is substantially thick relative to its length, for example it may have a maximum thickness that is greater than 15% of a length of the body.

The diaphragm structure of the configuration R6 audio transducer may or may not incorporate inner stress reinforcement members as defined for the configuration R1 diaphragm structure for example.

In some implementations of this configurations, a ferromagnetic fluid may be utilised to support the outer periphery of the diaphragm assembly, such as described for embodiments P and Yin sections 5.2.1 and 5.2.5 of this specification respectively. A ferrofluid variation would still reside within the scope of this configuration provided there is substantially no physical mechanical connection (as defined by the above criteria) made between the outer periphery of the diaphragm assembly and the inner periphery of the surrounding structure.

2.3.4 Configuration R7

Referring to FIGS. 6G and 12A-12D, yet another configuration of an audio transducer of the invention is shown. In this configuration the diaphragm structure shown in FIGS. 12A-12D is utilised in the audio transducer of embodiment A and in particular within the assembly shown in FIG. 6G. The diaphragm structure comprises a lightweight core diaphragm body stiffened by outer normal stress reinforcement A1201/A1202 on or close to the surface of both the front and rear major faces of the diaphragm body. In the configuration a series of struts are utilised to provide the outer stress reinforcement leaving other parts of the surface unreinforced. As defined for configuration R5, the configuration R7 audio transducer further comprises a housing in the form of an enclosure and/or baffle for accommodating the diaphragm assembly therein. In addition to the reduction of mass in the normal stress reinforcement, this diaphragm structure comprises an outer periphery that is at least partially free from physical connection with an interior of the housing. In this embodiment the periphery is approximately entirely free from connection but in some variations the periphery may be only partially free from physical connection with the housing, but is preferably free from connection along at least 20 percent of a length of the outer periphery. The diaphragm structure of the configuration R7 audio transducer comprises outer normal stress reinforcement that is in the form of a series or network of struts A1201/A1202, to thereby maintain an associated major surface that is substantially and almost entirely devoid of normal stress reinforcement.

Preferably the struts are substantially narrow in order to reduce the overall mass of the normal stress reinforcement and adhesive agent. Preferably the concentration of normal stress reinforcement is such that each strut comprises a thickness greater than 1/100$^{th}$ of its width, or more preferably greater than 1/60$^{th}$ of its width, or most preferably greater than 1/20$^{th}$ of its width. This means that the reinforcing is concentrated into a smaller area, which helps to reduce adhesive mass, provides more effective cooperation between fibres within a strut via reduced internal shearing, and improves connection to and cooperation with other reinforcing components such as at intersections with other struts and connections to inner reinforcement members.

The reduction in adhesive mass helps to reduce foam core shearing issues, particularly near the edge zone region. Edge zone regions are either comprehensively supported by struts such as A1201 or else, in between areas where the struts provide support, the foam body has only to support its own mass against localised 'blobbing' resonance modes.

Figure 12B:
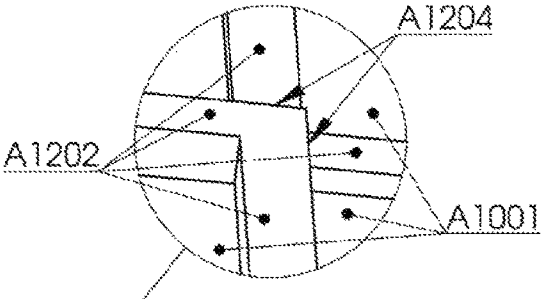
Figure 12A:
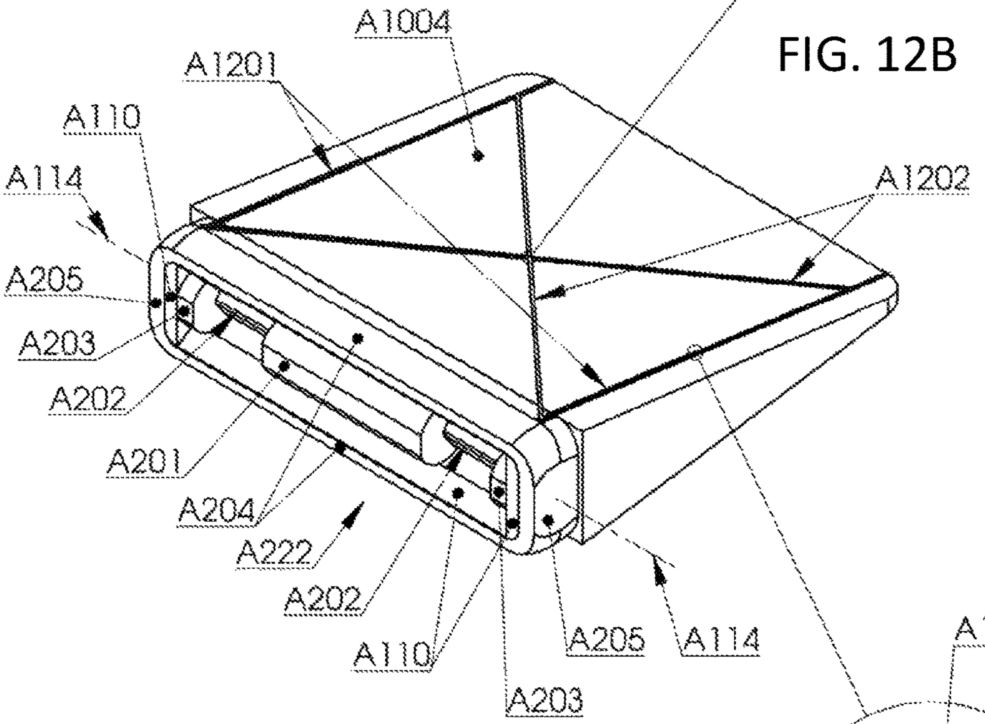
Figure 12C:
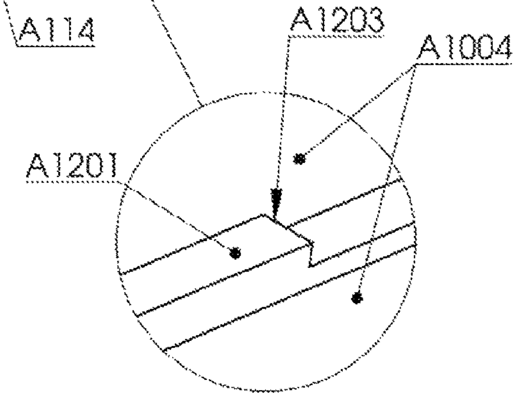
Figure 12D:
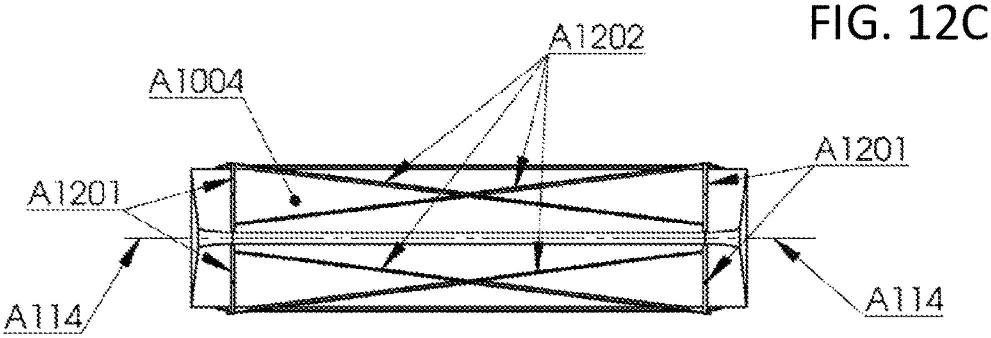

The diaphragm structure shown in FIGS. 12A-12D also comprises outer normal stress reinforcement that reduces in mass towards one or more peripheral regions that are distal from a centre of mass location of the diaphragm assembly incorporating the diaphragm structure. The struts A1201 and A1202 are thicker close to the base region of the diaphragm structure (near the axis of rotation A114 which is proximal to the centre of mass location of the assembly), and from intermediate the length of the associated major face of the diaphragm body (for example approximately half way across the major face of the diaphragm body) towards the peripheral edge opposing the base region, the thickness of the normal stress reinforcement struts reduces to reduce the mass. The detailed view in FIG. 12C shows the thinning at step locations A1203 on the two struts A1201 that run parallel to the sides of each major face of the diaphragm body. The detailed view FIG. 12B shows the thinning of the struts two A1202 that run diagonally across the major face at step location A1204, just past the intersection of these struts. The configuration is the same on both major faces of the diaphragm. This change in thickness achieves a further reduction in mass in the peripheral edge regions (distal from the centre of mass location), and so may improve the diaphragm breakup performance. It will be appreciated that alternatively or additional the reduction in mass could be achieved via reduction in width of the struts subject to the requirement that they couple sufficiently to the associated major face. Furthermore, any reduction in thickness and/or width of the struts may alternatively be tapered or gradual instead of stepped, or any combination thereof.

The diaphragm structure design having a periphery that is substantially free from physical connection also reduces mass at the diaphragm structure periphery (as there is no or very minimal diaphragm suspension connected here), resulting in a cascade of unloading through the rest of the diaphragm, and thereby further addressing internal core shearing issues.

These features result in a driver that produces minimal resonance within the operating bandwidth and so has exceptionally low energy storage characteristics within the operating bandwidth, without requiring internal shear stress reinforcement. It will be appreciated however that in alternative embodiments, the diaphragm structure of the configuration R7 audio transducer may comprise internal shear stress reinforcement as defined for the configuration R1 diaphragm structure for example.

Preferably the normal stress reinforcement has a specific modulus of at least 8 MPa/(kg/m^3), or more preferably at least 20 MPa/(kg/m^3), or most preferably at least 100 MPa/(kg/m^3). Preferably the normal stress reinforcement should comprise an anisotropic material having increased stiffness in the direction of the struts. Unidirectional carbon fibre is suitable, ideally of a high modulus variety, e.g. with Young's modulus (excluding binder matrix) of over 450 Gpa on-axis, since stiffness is often more important than strength in this application. Preferably the Young's modulus of the fibres that make up the composite is higher than 100 GPa, and more preferably higher than 200 GPa and most preferably higher than 400 GPa.

Preferably at least 10 percent of a total surface area of the one or more major faces is devoid of normal stress reinforcement, or at least 25%, or at least 50% in the one or more edge zone regions.

In this example of configuration R7, two or more of the struts A1201/A1202 intersect and are joined at said intersections. Preferably regions of intersection between the struts are located at or beyond 50 percent of a total distance from an assembled center of mass location to a periphery of the diaphragm. Other regions of intersection may also be located within 50 percent of the total distance, however.

Also one or more of the struts A1201/A1202 extend longitudinally along the associated major face of the diaphragm body towards at least one peripheral edge of the associated major face and connect, at or near the common peripheral edge, to another corresponding strut A1201/A1202 located at or close to the opposing major face. Preferably said connection forms a substantially triangular reinforcement that supports the associated common peripheral edge against displacements in the direction perpendicular to the coronal plane of the diaphragm body.

In this example of configuration R7, the fact that the outer normal stress reinforcement is omitted from certain regions distal from the diaphragm base implies that the reinforcing is concentrated into other areas. This provides the advantage that more effective connection can be made where outer normal reinforcing connects to other outer normal reinforcing in order to limit the possibility of displacement at the point of intersection. So, the design can be thought of as a skeleton comprising preferably unidirectional struts which project rigidity out towards the periphery distal from the diaphragm base, and particularly to the strategically chosen locations at which the struts intersect. Such intersection locations are rigidly locked in space, comparatively speaking, relative to the diaphragm base. Other locations of the periphery are kept lightweight, so that they can be supported by the intersection locations without having to support any mass beyond the self-mass of the foam core.

It is particularly useful to limit displacements of peripheral regions of the diaphragm structure distal from the base (said displacements resulting from diaphragm breakup as opposed to from the fundamental mode) in directions perpendicular to the coronal plane of the diaphragm body. While perhaps not as advantageous as a construction incorporating internal shear stress reinforcement members, a triangular construction incorporating struts on opposing faces which meet at strategically chosen locations at the diaphragm structure peripheral regions will help to support said peripheral regions in a way that is less susceptible to core shear deformation.

Concentrating reinforcing into certain areas also has other advantages including any one or more of: Easier manufacture compared to other forms of customised laying of anisotropic fibres; Permits said reinforcing to be manufactured separately under controlled conditions, such as under high compression or with heat, without causing damage to the core material; Permits optimisation of location of reinforcing; Permits more controlled interaction between various skeleton elements, for example a strut may run along the edge of an inner reinforcement member (as is the case in embodiment A, for example) thereby ensuring that all tension/compression reinforcing is well supported against shear (unlike the case where it is spread across areas remote from inner reinforcement member(s). This is particularly true in the case of unidirectional fibre reinforced polymer or equivalent composite anisotropic reinforcing material, which, if thinly distributed over a wide area, may exhibit low shear modulus, or there may even be gaps having zero shear modulus, which means that parts of the reinforcing fibres may not be effectively co-opted into helping to load up the shear reinforcing and thereby stiffening the diaphragm.

Manufacturing very small diaphragms that are rigid in 3-dimensions while also achieving the required low mass per unit area may be particularly difficult, and particularly so if anisotropic composite reinforcing is used since it is hard to produce sufficiently thin layers of composite reinforcement and then attach this to a wide area of both sides of a foam (etc.) core diaphragm in a lightweight manner. Concentrating the reinforcing greatly assists in solving this issue, hence strut-based diaphragm configurations, including configuration R7, are particularly useful in applications where diaphragms are small such as personal audio and treble drivers.

In some implementations of this configurations, a ferromagnetic fluid may be utilised to support the outer periphery of the diaphragm assembly, such as described for embodiments P and Yin sections 5.2.1 and 5.2.5 of this specification respectively. A ferrofluid variation would still reside within the scope of this configuration provided there is substantially no physical mechanical connection (as defined by the above criteria) made between the outer periphery of the diaphragm assembly and the inner periphery of the surrounding structure.

2.4 Configurations R8 and R9 Audio Transducers

Hinge systems are highly effective diaphragm suspensions in certain respects, for example the three-way trade-off between diaphragm excursion, diaphragm resonance frequency and unwanted resonances can be, through the use of innovative hinge systems such as are described herewithin, in some cases easier to solve since high frequency performance is more independent of diaphragm excursion and the fundamental diaphragm resonance frequency. Also, rotational action audio transducers do not suffer from low frequency whole-diaphragm rocking resonance modes as do linear action transducers.

Transducers based on rotational action diaphragms tend to be more difficult to design against diaphragm resonance compared to transducers having linear diaphragm action, because the hinge rigidly couples the diaphragm structure to the transducer base structure in terms of translation in three directions and rotation in two directions. This coupling mean that the base of the diaphragm is locked to the high mass of the transducer base structure, which reduces the frequency at which the diaphragm suffers from serious, for example, whole-diaphragm bending type breakup resonances. Furthermore, diaphragm resonances in rotational action drivers tend to be poorly damped, and some are also strongly excited.

Previous rotational-action-diaphragm loudspeakers, such as the ‘Cyclone’ speaker manufactured by Phoenix Gold, have attempted to utilise the capability of hinge-action diaphragms to provide high volume excursion and low fundamental diaphragm resonance frequency for the purpose of providing bass in far-field applications such as home or car audio systems, but rotational action speakers have not been notable for high quality audio reproduction, particularly at mid-range and treble bandwidths.

In order to realise the potential of rotational action transducers and improve their performance, the diaphragm breakup weakness must be solved, and this can be achieved using the previously described diaphragm structure configurations of the present invention.

Two audio transducer configurations that have been designed to address some of the shortcomings mentioned above using these identified principles will now be described with reference to some examples. The following audio transducer configurations will herein be referred to as configurations R8 and R9 for the sake of conciseness. The configurations R8 and R9 audio transducers will be described in further detail with reference to examples, however it will be appreciated that the invention is not intended to be limited to these examples. Unless stated otherwise, reference to the configuration R8 and R9 audio transducers in this specification shall be interpreted to mean any one of the following exemplary audio transducers described, or any other audio transducer comprising the described design features as would be apparent to those skilled in the art.

2.4.1 Configuration R8

An audio transducer configuration of the invention, herein referred to as configuration R8, comprises a diaphragm structure as defined in any one of configurations R1-R4 that is rotatably coupled to a transducer base structure for producing sound via oscillatory rotational action. An example of configuration R8 is shown in the embodiment A audio transducer of FIGS. 1A-1F. This audio transducer comprises a rotational action diaphragm structure that has at least one diaphragm body comprising a lightweight foam or equivalent core A208 reinforced by outer normal stress reinforcement on the front and back major faces of the diaphragm body, and with further reinforcement provided by inner shear stress reinforcement members A209 coupled to the interior of the diaphragm body and preferably to the outer normal stress reinforcement. The inner shear stress reinforcement members A209 are preferably oriented substantially parallel to the sagittal plane of the diaphragm body as defined in configuration R1.

In the case of embodiment A the normal stress reinforcement consists of struts A206 and A207, but as mentioned under configuration R1 there may be other forms of normal stress reinforcement.

Another example of a diaphragm structure suitable for the configuration R8 audio transducer assembly is shown in FIGS. 8A-8B, which has been described in further detail under configuration R1.

In these examples of configuration R8, each inner reinforcement member of the associated diaphragm structure is rigidly coupled to the hinge assembly, either directly or via at least one intermediary components. The contact hinge assembly used to rotatably couple the diaphragm assembly A101 to the transducer base structure A115 is described in further detail under section 3.2 of this specification. It will be appreciated however that the diaphragm structure may be rotatably coupled to the transducer base structure via other suitable hinge mechanisms such as a flexible hinge mechanism as detailed under section 3.3 of this specification.

The hinge assembly helps to solve the three-way diaphragm suspension trade-off between diaphragm excursion, diaphragm resonance frequency and shifting unwanted resonances outside of the FRO, and also eliminates the low frequency whole-diaphragm rocking resonance mode that affects some linear action drivers. Meanwhile the shear reinforcement increases bandwidth by reducing core shearing deformation of the diaphragm.

2.4.2 Configuration R9

Another configuration of an audio transducer assembly of the invention, which is a sub-structure of the configuration R6 audio transducer, herein referred to as configuration R9, will now be described. An example of this audio transducer is incorporating the diaphragm assembly of FIGS. 10A and 10B in the embodiment A audio transducer.

Configuration R9 consists in an audio transducer incorporating a diaphragm assembly which: moves with a substantially rotational action about an approximate axis which; comprises a diaphragm body made from a lightweight foam or equivalent core A1004; comprises outer normal stress reinforcement A1001 on or close to the surface of both the front and rear major faces; and wherein the normal stress reinforcement A1001 is omitted from one or more parts of the front and/or back surfaces in the peripheral edge regions of the associated major face. The peripheral edge regions are preferably located beyond a radius of 80% of the distance from the axis of rotation (which passes close to the base region and centre of mass of the diaphragm assembly) to the diaphragm structure's most distal peripheral edge from the axis, wherein the radius is centred at the axis of rotation. The diaphragm body remains substantially rigid in-use.

In this particular example the normal stress reinforcement A1001 is omitted from the sides of the two major faces of the diaphragm body where the reinforcement extends to edge A1003 of the normal stress reinforcement, and also the middle peripheral edge region of the associated major face where the reinforcement extends to arcuate edge A1002 of the normal stress reinforcement.

As is the case with configurations R2, R4 and R6, the omission of normal stress reinforcing from the peripheral edge regions of the associated major face distal from the base region achieves a reduction in mass in the outer regions. In the case of a rotational action driver reduction of mass in regions distal from the base region, including in the region of the terminal edge/end, is beneficial because this is the furthest region from the hinge that couples the heavier transducer base structure, and it tends to displace comparatively large distances as a result of excitation of key breakup resonance modes, and so is particularly prone to resonance.

Again, the use of a hinge assembly helps to solve the three-way trade-off between diaphragm excursion, diaphragm resonance frequency and resonance, as well as the low frequency whole-diaphragm rocking resonance mode affecting linear action drivers. The reduction in outer tension/compression reinforcement addresses diaphragm shear deformation by unloading the diaphragm structure peripheral region that is distal from the hinge axis or base region (as per configuration R6, configuration R9 does not necessarily include inner reinforcement members to explicitly address core shearing, but may do so in some implementations). The result may be bass extension and resonance-free performance over a wide bandwidth.

3. Hinge Systems and Audio Transducers Incorporating the Same 3.1 Introduction

Over many decades a tremendous amount of research has been conducted into ways of minimising the effect of diaphragm and diaphragm suspension breakup resonance modes in conventional cone and dome-diaphragm loudspeaker drivers. Comparatively little equivalent research appears to have been conducted into improvement and optimisation of breakup performance, diaphragm excursion and fundamental diaphragm resonance frequency in rotational action loudspeaker diaphragms and diaphragm suspensions.

The conventional diaphragm suspension system consisting of both a standard flexible rubber type surround and a flexible spider suspension, limits diaphragm excursion, increases the diaphragm fundamental resonance frequency and introduces resonance. The soft materials used and the range of motion that they are used in is typically non-linear, with respect to Hooke's law, leading to inaccuracies in transducing an audio signal.

Rotational-action diaphragm loudspeakers have not been notable for providing clean performance in terms of energy storage as measured by a waterfall/CSD plot, nor have they been notable for providing audiophile sound quality, particularly in the mid-range and treble frequency bands.

The base structures of these drivers and conventional loudspeaker drivers are often prone to adverse resonance modes within their frequency range of operation, and these modes can be excited by the driver motor and amplified by the diaphragm, especially if the diaphragm suspension system incorporates some rigidity.

3.1.1 Overview

Diaphragm suspension systems movably couple a diaphragm structure or assembly of an audio transducer to a relatively stationary structure, such as a transducer base structure, to allow the diaphragm structure or assembly to move relative to the stationary structure and generate or transduce sound. The following description relates to rotational action audio transducers, in which a diaphragm structure is configured to rotate relative to a base structure to generate and/or transduce sound. In such audio transducers, a hinge system is required for rotatably coupling the diaphragm structure to the base structure. To minimise the generation of unwanted resonance, it is preferable that the hinge system constrains movement to a single degree of movement, i.e. rotation about a single axis with minimal to zero translational or other rotational movement throughout the frequency range of operation of the audio transducer. Hinge systems of the invention have been developed that enable a diaphragm assembly to move in a substantially single degree of freedom relative to a transducer base structure and/or other stationary parts of the audio transducer. These hinge systems permit a single movement action while also providing high rigidity in terms of all other movements of the diaphragm assembly.

As will be shown in the various embodiments described below, the hinge system may comprise a system of two or more interoperable sub-systems, an assembly of two or more interoperable components or structures, a structure having two or more interoperable components, or it may even comprise a single component or device. The term system, used in this context, is therefore not intended to be limited to multiple interoperable parts or systems.

Two categories/types of hinge systems will be detailed in this specification. These are: Contact hinge system and Flexure hinge system. Both systems serve a common purpose, and can be used interchangeably (to a degree), or can be combined into one embodiment in some implementations.

For both categories and in each of the audio transducer embodiments described in this section, the hinge system is coupled between the transducer base structure of the audio transducer and to the diaphragm assembly. The hinge system may form part of one or both of the transducer base structure and the hinge system. It may be formed separately from one or both of these components of the audio transducer, or otherwise may comprise one or more parts that are formed integrally with one or both of these components. Modifications to the audio transducer embodiments described below in accordance with these possible variations are therefore envisaged and not intended to be excluded from the scope of the invention.

In some embodiments, such as the embodiments A, B, E, K, S, T audio transducers for example, the diaphragm assembly incorporates, a force generation component of a transducing mechanism that transduces electricity or movement, and that is rigidly coupled to the diaphragm structure. As the mass of the force generation component is generally high relative to the diaphragm structure, often in the same order of magnitude as the mass of the other parts of the diaphragm assembly, a rigid coupling between the diaphragm structure and the force generation component is preferable in order to prevent resonance modes consisting of the mass of one moving in opposition to the mass of the other.

The transducer base structure may be integrally formed with part of the hinge system, or otherwise rigidly connected to the hinge system by a suitable mechanism, such as using an adhesive agent such as epoxy resin, or by welding, by clamping using fasteners, or by any number of other methods known in the art for achieving a substantially rigid connection between two components/assemblies.

In the preferred configurations of the =hinge system, the assembly is connected at at least two substantially widely spaced locations on the diaphragm assembly, relative to the width of the diaphragm body. Likewise, the hinge system is preferably be connected at at least two substantially widely spaced locations on the transducer base structure, relative to the width of the diaphragm body. The connections at these locations may be separate or part of the same coupling.

Suitably wide spacing between connections from the transducer base structure to the diaphragm assembly means that the hinge system or combination of hinge systems are able to effectively resist a range of unwanted diaphragm/transducer base structure resonance modes.

It is also preferable that the connections from the transducer base structure to the hinge system, and from the hinge system to the diaphragm assembly, provide rigidity in terms of translational compliance. When such hinge joint connections are used at a suitably wide spacing the resulting hinge mechanism is able to provide suitable rigidity to the diaphragm assembly such that breakup modes may potentially be pushed to high frequencies and potentially beyond the FRO.

3.1.2 Advantages

Preferred hinge system configurations of the invention, to be fully described in this specification, have potential advantages over conventional diaphragm suspension systems. For example, soft flexible suspension parts used in conventional diaphragm suspension systems, as in the surround J105 and the spider J119, shown in FIGS. 55A-55B, may be susceptible to mechanical resonances during operation. Further, such suspensions do not sufficiently resist translation of the diaphragm 3101 along axes other than the primary axis of movement, and hence can further promote unwanted resonances.

The hinge systems of the invention facilitate a substantially compliant fundamental rotational motion while also providing substantial rigidity in other rotational and translational directions. As such, they can be configured to operatively support a diaphragm in a substantially single degree of freedom mode of operation over a wide bandwidth of the FRO. As the fundamental rotational mode is very compliant, a low fundamental frequency (Wn) of the transducer is facilitated, aiding the high-fidelity reproduction of bass frequencies, and only minimally adversely affecting the high frequency performance.

Yet another potential advantage is that the hinge components themselves are able to be designed (as detailed in this specification) so as not to have their own internal adverse resonances within the audio transducer's FRO.

3.1.3 Preferred Simple Rotational Mechanism Concept

The following description applies to both contact hinge systems and flexible hinge systems of the invention.

A simple form of audio transducer diaphragm suspension system for a rotational action audio transducer is a mechanism that limits the motion of the diaphragm assembly to substantially rotational motion about a transducer base structure. FIG. 54A is a schematic that symbolises a diaphragm assembly H802 connected to part of a transducer base structure H803 by a hinge system H801. In this schematic, the diaphragm assembly H802 is illustrated in the shape of a wedge, however it will be appreciated that a range of alternative shapes and hinge locations may be implemented and the configuration shown is to aid description and not intended to be limiting unless otherwise stated. There is an approximate axis of rotation, or hinging axis, of the diaphragm assembly H802 with respect to the transducer base structure H803. This configuration is preferable to the four-bar linkage configurations described later in this document with reference to FIGS. 54A-54C. In the preferred form hinge system of the invention, the hinge system is configured to constrain movement of the associated diaphragm assembly to a single degree of motion (preferably pivotal motion about a single axis of rotation) within the desired FRO, as allowing other modes of operation that store and release energy can add distortion to the audio being transduced.

3.1.4 the Four-Bar Linkage Concept

The following description applies to both contact hinge systems and flexible hinge systems of the invention.

An example of a single degree of freedom type of audio transducer diaphragm suspension comprises a four-bar linkage mechanism, with a hinge system located at each corner of the four-bar linkage. An example of such a concept is shown in the schematic of FIG. 54B, whereby the diaphragm assembly H802 is connected to part of a transducer base structure H803 by hinge system H801 (as per the concept illustrated in FIG. 54A). In addition, hinge systems H806, H807 and H808, are connected by bars H804 and H805. Hinge system H806 is linked to the diaphragm assembly H802 and bar H805 links the preceding hinge systems H807 and H806 to the transducer base structure via hinge system H808. The bars are shaped as long and slender beams in the figure to represent a linkage member however these members may be of any form of shape or size and the invention is not intended to be limited to any particular shape or size unless stated otherwise. In this concept, parts of a transducing mechanism could be attached to bars H804 or H805 (or even the diaphragm H802).

FIG. 54C illustrates another example of a diaphragm suspension system utilising a four-bar linkage mechanism with multiple hinge systems. This concept is similar to the version illustrated in FIG. 54B, however the diaphragm is connected between hinging mechanisms H806 and H807 (instead of bar H804) and a bar H809 links hinge systems H806 and H801 (instead of the diaphragm). As the bars H805 and H809 are of equal length (in this example) this mechanism translates the diaphragm substantially compared to the rotational component of motion (relative to the transducer base structure). This mechanism confines the motion of the diaphragm such that it always points in the same direction, yet the tip of the diaphragm still scribes a significant arc (relative to the base structure).

Many variations on this action can be made by varying the length of the bars and the distances between the hinge systems.

The purpose of the four bar linkage is to provide a mechanism that limits the motion of the diaphragm to a single degree of freedom. By using hinge joints described herein, each providing high compliance in all directions except their designed rotational direction, the overall four bar linkage mechanism confines the diaphragm to single mode of motion and restricts undesired motion that may distort the sound that the diaphragm produces.

An advantage of using mechanisms, such as are shown in FIGS. 54A-54C, is that a force generation component can be positioned in a location where the distance it moves is not necessarily the same as the diaphragm. A piezo transducer, for example (which in general is optimised for maximum operating efficiency without much distance travel) could be located closer to the diaphragm axis of rotation, or located connecting one bar to another bar etc., depending on the optimum travel required for that transducing mechanism.

Other configurations of multiple hinge systems can be configured to operatively support the diaphragm in use.

3.2 Contact Hinge System

The rigid load-bearing elements and rotational symmetry exhibited by bearing race based hinge systems, such as that of the Phoenix Gold Cyclone loudspeaker, means that in certain cases, and unlike the majority of other previous diaphragm suspension designs, low compliance may be provided in along all three orthogonal translational axes. The problems with an entirely rigid hinge of this type where there is almost zero compliance along all three orthogonal translational axes, is that the hinge becomes susceptible to malfunction, for instance due to manufacturing variances (e.g. bumps on the bearing ball) or when dust or other foreign matter is introduced into the hinge for example.

Hinge system configurations for an audio transducer that have been designed to address some of the shortcomings mentioned above will now be described in detail with reference to some examples. The following configurations comprise a diaphragm assembly suspension hinge system incorporating at least one hinge element that rolls or pivots rigidly against an associated contact member and which is held firmly in place by a biasing mechanism such that the biasing mechanism is capable of applying a reasonably constant force to the contact join. The biasing mechanism is preferably substantially compliant along at least on translational axis or in at least one direction. The compliance of the biasing mechanism is preferably substantially consistent, able to be repeatedly manufactured, and/or not susceptible to environmental or operational variances. Such a hinge system will hereinafter be referred to as contact hinge system.

As will be shown in the various embodiments described below, the biasing mechanism may comprise two or more interoperable systems, an assembly of two or more interoperable components or structures, a structure having two or more interoperable components, or it may even comprise a single component or device. The term mechanism, used in this context, is therefore not intended to be limited to multiple interoperable parts or systems.

3.2.1 Contact Hinge System—Design Considerations and Principles

Figure 53A:
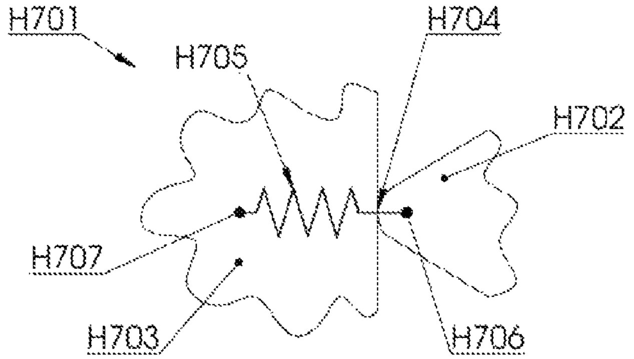
Figure 53B:
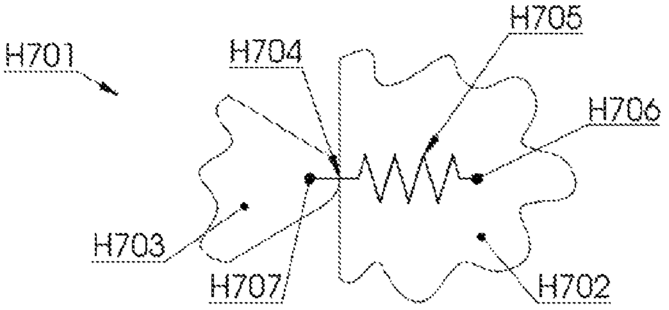
Figure 53C:
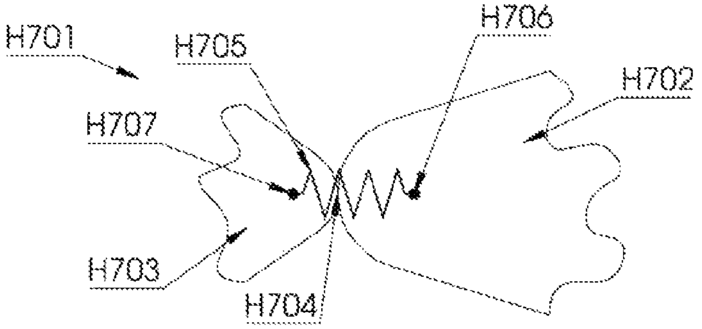

Referring to FIGS. 53A-53C, concepts and principles for designing a contact hinge system for a rotational action audio transducer (having a diaphragm assembly rotatably coupled to a transducer base structure via the hinge system) in accordance with the invention will now be described. This will be followed by a description of exemplary hinge system embodiments that are designed in accordance with these concepts/principles.

Examples of basic hinge joints H701 of a contact hinge system of the invention is schematically depicted in FIGS. 53A-53D.

A contact hinge joint comprises two components configured to contact each other in a manner that allows one to rotate relative to the other, for example allowing motions such as rocking, rolling, and twisting. Preferably, the hinge joint of the hinge system substantially defines the axis of rotation of the diaphragm assembly relative to the transducer base structure.

FIG. 53A shows a hinge joint H701 whereby a first component, herein referred to as a hinge element H702, contacts a second component, herein referred to as a contact member H703, at a contact point/region H704. At the contact point/region H704, the hinge element H702 has a substantially convexly curved surface and the contact member H703 has a substantially planar surface. It will be appreciated that in this specification, reference to a convexly curved or concavely curved surface or member, is intended to mean a convex or concave curve across at least a cross-sectional plane that is substantially perpendicular to the axis of rotation.

FIGS. 53A-53D show a biasing mechanism H705 symbolised as a coil spring in tension that applies a force to the hinge element H702 at location H706 and an opposing force to the contact member H703 at location H603 such that the hinge element and the contact member are held together in a compliant manner. Although a spring symbol is used, the biasing mechanism may take the form of structures or systems other than a spring, examples of which are described herein. Although the spring symbol depicts a separate structure to the hinge element and the contact member, the biasing mechanism may comprise or incorporate either or both of the hinge element and the contact member, and in fact may not be separate at all. Examples of such biasing mechanism configurations are also described herein.

FIG. 53B shows a hinge joint H701 whereby the hinge element H702 contacts the contact member H703 at a contact point/region H704. At the contact point/region H704 the hinge element H702 has a substantially planar surface and the contact member H702 has a convexly curved surface.

FIG. 53C shows a hinge joint H701 whereby the hinge element H702 contacts the contact member H703 at a contact point/region H704. At the contact point/region H704, the hinge element H702 has a convexly curved surface and the contact member H703 also has a convexly curved surface. The hinge element H702 comprises a surface of relatively larger radius (or is relatively more planar) than the surface of the contact member H703.

Figure 53D:
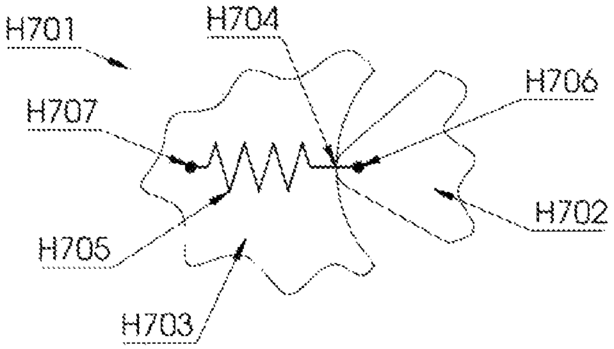

FIG. 53D shows a hinge joint H701 whereby the hinge element H702 contacts the contact member H703 at a contact point/region H704. At the contact point/region H704, the hinge element H702 has a convexly curved surface and the contact member has a concavely curved surface H703.

These are four examples of contact hinge joints. It will be appreciated that other configurations are possible, for example the hinge element may be concavely curved at the contact point/region and the contact member may be convexly curved at this same point/region. In some cases where two surfaces are convexly curved, one surface may have a relatively larger radius than the other as in FIG. 53C and this may be either the hinge element or the contact member surface, or in other cases the two surfaces may have radii that are substantially the same. The cross-sectional profile, viewed in a plane perpendicular to the axis of rotation of either component does not necessarily have a constant radius. Other profiles shapes could be used, such as a parabolic curve.

3.2.1a Curvature Radius at the Contact Point/Region

In accordance with the above examples, one of the hinge element H702 or contact member H703 will have a convexly curved surface of relatively smaller radius/sharper curvature than the other surface, or at least of equal radius, when viewed in cross-sectional profile in a plane perpendicular to the axis of rotation. This curved surface of relatively smaller or at least equal radius, preferably comprises a radius that is sufficiently small so as to provide sufficiently low resistance to rolling over the opposing surface during operation.

This is so that hinge joint enables:

a fundamental frequency (Wn) of operation of the audio transducer that is relatively low, a level of noise generation that is relatively low, and/or hinge performance that is sufficiently consistent in cases where the contacting surfaces have discontinuities due to manufacturing variances and/or the introduction of foreign matter such as dust between the surfaces.

This radius is preferably also not too small and overly sharp because a significantly reduced rolling area at the contact point/region contact may be prone to localized deformation and undue compliance. There is a therefore a compromise that needs to be considered in establishing the required/desired curvature radius for the convex contact surface.

Furthermore, when designing the required curvature radius for the more convexly curved surface the following factors can be taken into consideration:

For diaphragms assemblies/structures that are relatively longer or larger, the radius of curvature of the convexly curved surface can generally be made relatively larger, and for relatively shorter or smaller diaphragm assemblies/structures the curvature radius can be made relatively smaller; and/or For audio transducers that do not require a relatively low fundamental frequency of operation (such as a dedicated treble driver for example) a relatively larger curvature radius (larger rolling area) at the contact surface may be used, and for audio transducer that require a relatively low fundamental frequency a relatively smaller curvature radius (smaller rolling area) may be used.

For example, when determining the curvature radius, preferably the contact surface of the hinge element or the contact member, whichever one has a convexly curved surface that is relatively less planar/relatively smaller radius of curvature, (when viewed in cross-sectional profile in a plane perpendicular to the axis of rotation), has curvature radius r in meters satisfying the relationship:

$$r > \frac{E \cdot l}{1000{,}000{,}000} \times (2\pi f)^2$$

where l is the distance in meters from the axis of rotation of the hinge element to the most distal edge of the diaphragm structure (relative to the contact member), f is the fundamental resonance frequency of the diaphragm in Hz, and E is a constant that is preferably approximately between 3-30, such as for example 3, more preferably 6, more preferably 12, even more preferably 20, and most preferably 30.

Alternatively or in addition, when determining the curvature radius, preferably the contact surface of the hinge element or the contact member, whichever one has a convexly curved surface that is relatively less planar/relatively smaller radius of curvature, when viewed in cross-sectional profile in a plane perpendicular to the axis of rotation, has a curvature radius r in meters satisfying the relationship:

$$r < \frac{E \cdot l}{1000{,}000{,}000} \times (2\pi f)^2$$

where l is the distance in meters from the axis of rotation of the hinge element to the most distal edge of the diaphragm structure relative to the contact member, f is the fundamental resonance frequency of the diaphragm in Hz, and E is a constant in the range of approximately 140-50, such as 140, more preferably 100, more preferably again 70, even more preferably and most preferably 40.

3.2.1b Rolling Resistance

The rolling resistance of the hinge element and the contact member should preferably be low compared to the inertia of the diaphragm assembly, in order to reduce the fundamental resonance frequency of the diaphragm. Preferably, the surfaces of the hinge element and contact member that roll against each other during normal operation are substantially smooth, allowing a free and smooth operation.

Rolling resistance can be reduced by reducing the curvature radius at a rolling contact surface. Preferably, whichever is the smaller curvature radius, when viewed in cross-sectional profile in a plane perpendicular to the axis of rotation, out of that of the contacting surface of the hinge element and that of the contact member, has a curvature radius that is less than approximately 30%, more preferably still less than approximately 20%, and most preferably less than approximately 10% of the greatest distance, in a direction perpendicular to the axis of rotation, across all components effectively rigidly connected to the localised part of the same component that is immediately adjacent to the contact location. For example in the case of embodiment A audio transducer shown in FIGS. 1A-7F, the rigid diaphragm assembly A101 has a maximum length in a direction perpendicular to the axis of rotation A114 equal to the diaphragm body length A211. The radius of curvature of the shaft A111 at the location of contact A112 with the planar surface of the contact bar A105 of the transducer base structure A115 is approximately less than 10% of the diaphragm body length A211.

Alternatively or in addition whichever one of the contacting surface of the hinge element and the contact surface of the contact member that has the smaller curvature radius, when viewed in cross-sectional profile in a plane perpendicular to the axis of rotation, also has a radius that is less than 30%, more preferably less than 20%, and most preferably less than 10% of the distance, in a direction perpendicular to the axis of rotation, across the smaller out of:
The maximum dimension across all components effectively rigidly connected to parts of the contact surface in the immediate vicinity of the contact location with the hinge element, or The maximum dimension across all components effectively rigidly connected to parts of the hinge element in the immediate vicinity of the contact location with the contact surface.

As diaphragm inertia generally increases with increasing diaphragm length, it is preferable that whichever of the contacting surface of the hinge element and the contact surface of the contact member that has the smaller curvature radius, when viewed in cross-sectional profile in a plane perpendicular to the axis of rotation, also has a radius that is relatively small compared to the length of the diaphragm, as measured from the axis of rotation of the two parts to the furthest periphery of the diaphragm. Preferably, this radius should be less than 5% of the diaphragm length.

3.2.1c Contact Points and Contact Lines

FIGS. 53A-53D all show a side view of a contact hinge system hinge joint. In some forms, the contact member and hinge element are substantially longitudinal and may have a longitudinal profile, in the direction of the axis of rotation, whereby the contacting surfaces of these parts have the same cross-section along the length of the part. In this form a contact line exists between the hinge element H702 and the contact member H703. A contact line can be considered to be a series of contact points, so in this case the contact point H704 indicated in FIG. 53A would be part of this contact line. This configuration means that the hinge element H702 is confined to an approximate axis of rotation relative to the contact member H703. If a hinge system uses a hinge joint as explained above that has a line of contact, then it is preferable that any additional hinge joint, used as part of the same hinging mechanism/assembly, has a contact point or line of contact, that remain(s) substantially collinear to the line of contact of the first hinge joint in order to help ensure that the mechanism works freely and without constraint.

In another form, the hinge joint H701 might only contact at a single point. For example, if, in the case of hinge joint shown in FIGS. 53A, the hinge element H702 had a spherical surface at the contact point H704, then there would not be a contact line, just a contact point.

3.2.1d Biasing Mechanism

In order for the basic hinge joint H701 to operate as desired, the hinge element preferably remains in direct and substantially consistent contact with the contact member. To achieve this, the hinge joint H701 may be supported by a biasing mechanism H705 which applies a sufficiently large and consistent force that, either directly or indirectly, holds the hinge element H702 against the contact member H703 during the course of normal operation, or in other words maintains frictional engagement between the contact surfaces. In addition, the biasing mechanism H705 is preferably compliant in a direction substantially perpendicular to the tangential plane of the contact surface of the convexly curved surface of smaller radius to enable efficient pivotal movement of the hinge as will be described.

Examples of this component will be described later in this document with reference to embodiments.

Biasing Force

The biasing mechanism H705 applies a significant and consistent force which, either directly or indirectly, holds the hinge element H702 against the contact member H703 during the course of normal operation.

Preferably the biasing mechanism is configured to apply a sufficient biasing force to each hinge element such that when additional forces are applied to the hinge element, and the vector representing the net force passes through the region of contact of the hinge element with the contact surface and is relatively small compared to the biasing force, the substantially consistent physical contact between the hinge element and the associated contact member rigidly restrains the hinge element at the contact region against translational movements relative to the contact surface in a direction perpendicular to the contact surface at the contact region.

The contact between the hinge element H702 and the contact member H703, facilitated by the biasing mechanism H705, results in friction, preferably non-slipping static friction, which causes the hinge element to be rigidly restrained against translational displacements relative to the contact member at the point of contact.

For a hinge system that comprises several hinge joints, it is possible that a single biasing mechanism can be used to apply the force required to hold the hinge elements against their respective contact members within multiple hinge joints. For example, a single spring connected between a diaphragm assembly and a transducer base structure could apply a force at the middle of the base of a diaphragm assembly, holding it towards the transducer base structure and producing a reaction force within hinge joints located towards each side of the diaphragm.

Preferably a substantial amount of the contacting force between the hinge element and the contact member is provided by the biasing mechanism. The biasing mechanism is therefore a physical component, structure, system or assembly, rather than an external means of biasing such as gravity, or loads applied by the force generation component during the course of operation for example. Gravity is, in general, too weak to effectively bias together the components of a contact hinge joint for example. If the force used is too weak then components run the risk of slipping unpredictably or rattling.

Slippage can create disproportionately loud distortion since such movement may be mechanically amplified via the lightweight diaphragm, hence it is highly desirable if slippage events do not occur during normal operation, or that if they do occur they are infrequent.

Additionally, and as mentioned above, translational compliance at a pivot, or at a rolling joint interface, may reduce with increasing contact force, meaning that increased contact force may result in a reduction in diaphragm resonances.

Preferably the net force applied by all biasing mechanisms is greater than the force of gravity acting on the diaphragm assembly and/or is greater than the weight of the diaphragm assembly.

The net force applied by all biasing mechanisms is therefore preferably greater than the force of gravity acting on the diaphragm assembly and/or greater than the weight of the diaphragm assembly, or more preferably greater than approximately 1.5 times the force of gravity and/or more preferably greater than approximately 15 times the weight of the diaphragm assembly. This is especially preferable in applications where the transducer may be operated at different angles of orientation, such as in headphones and earphones, as it is important that the transducer continues to function properly if the force of gravity acts in the opposite direction to that of the force applied by the biasing mechanism. Preferably the biasing force is substantially large relative to the maximum excitation force of the diaphragm assembly. Preferably the biasing force is greater than 1.5, or more preferably greater than 2.5, or even more preferably greater than 4 times the maximum excitation force experienced during normal operation of the transducer.

It is also preferable that the biasing force is larger for a diaphragm assembly with greater inertia, and also larger for a diaphragm assembly that operates at higher frequencies.

In order that the biasing force is sufficient to minimize diaphragm resonances, preferably the average ($\Sigma F_n/n$) of all the forces in Newtons ($F_n$), biasing each hinge element towards its associated contact surface within the number n of hinge joints of this type within the hinge system, the rotational inertia of the diaphragm assembly about the axis of rotation of the diaphragm assembly with respect to the contact surface in kg·m$^2$ (I), and the fundamental resonance frequency of the diaphragm in Hz (f) consistently satisfies the following relationship, when constant excitation force is applied such as to displace the diaphragm to any position within its normal range of movement:

$$\frac{\sum F_n}{n} > D \times \frac{1}{n} \times (2\pi f)^2 \times I$$

where D is a constant preferably equal to 5, or more preferably equal to 15, or even more preferably equal to 30, or more preferably equal to 40.

If the biasing force is too large this can unduly restrict the fundamental diaphragm resonance frequency, and can make the transducer susceptible to noise generation at low frequencies, for example if dust gets into the contact region.

Therefore, preferably the average ($\Sigma F_n/n$) of all the forces in Newtons ($F_n$) biasing each hinge element towards its associated contact surface within the number n of hinge joints of this type within the hinge system, consistently satisfies the following relationship when constant excitation force is applied such as to displace the diaphragm to any position within its normal range of movement:

$$\frac{\sum F_n}{n} < D \times \frac{1}{n} \times (2\pi f)^2 \times I$$

where D is a constant preferably equal to 200, or more preferably equal to 150, or more preferably equal to 100, or most preferably equal to 80.

As has been described above, each biasing mechanism applies a biasing force compliantly in order to provide a degree of constancy of contact force.

As mentioned the biasing mechanism H705 is preferably also designed or configured to apply a force that is sufficient to firmly hold the hinge element H702 against the contact member H703. The amount of force applied by the biasing mechanism may be dependent on a number of factors including (but not limited to):

The intended FRO of the audio transducer;

The rotational inertia of the diaphragm structure or assembly and/or the length, width, depth shape or size of the diaphragm structure or assembly; and/or The mass of the diaphragm structure or assembly.

Preferably the net force F biasing a hinge element to a contact member satisfies the relationship:

$$F > D \times (2\pi f_t)^2 \times I_s$$

where $I_s$ (in kg·m$^2$) is the rotational inertia, about the axis of rotation, of the part of the diaphragm assembly that is supported by the hinge element, $f_t$ (in Hz), is the lower limit of the FRO, and D is a constant preferably equal to 5, or more preferably equal to 15, or more preferably equal to 30, or more preferably equal to 40, or more preferably equal to 50, or more preferably equal to 60, or most preferably equal to 70.

Preferably the above relationship is satisfied consistently, at all angles of rotation of the hinge element relative to the contact member during the course of normal operation.

In general, increasing the biasing force will form a stiffer and more rigid connection thereby mitigating or partially alleviating potential unwanted translational movement of the hinge element H702 relative to the contact member H703. This means, a higher force may be desirable in some cases and particularly so for audio transducers intended to operate at relatively high frequencies, such as treble drivers. Also a high diaphragm structure mass, means a higher force may be required to maintain sufficient contact during operation at high frequencies. At low frequencies of operation, such as for bass drivers, a relatively high biasing force can have a negative impact in that it may cause noise generation and/or resistance to movement due to higher frictional/contact forces during rolling of the contact surfaces. Also a high rotational inertia of the diaphragm structure may mean a higher contact force can be used without overly compromising operation at low frequencies, all else being equal.

Biasing Compliance

The biasing mechanism preferably applies a force that is compliant in a lateral direction with respect to the contact surfaces, such that rolling resistance originating in the hinge system may be reduced in certain circumstances during operation. In other words, the biasing mechanism, introduces a level or degree of compliance between the hinge element and contact member to enable the hinge element to rotate or roll relative to the contact member about the desired axis of rotation, and also to allow some relative lateral movement in some circumstances.

The degree or level of compliance of the biasing mechanism may also affect the oscillation frequency of the diaphragm during operation, similar to the way that an object attached to a spring is affected by the stiffness of the spring. Therefore, the compliance of the biasing mechanism may also be designed with one or more factors taken into consideration including (but not limited to) the audio transducer's intended FRO. For an audio transducer configured to operate at relatively low frequencies for example, such as a bass driver, the biasing mechanism compliance can be relatively high, whereas for a transducer configured to operate at a relatively high frequency, such as a treble driver, the biasing mechanism compliance can be relatively low (i.e. stiff) without unduly affecting performance at the lower end of the FRO.

Other hinge system compliances may also be taken into consideration when designing the hinge system and these will be explained in some detail further below.

Preferably the biasing mechanism is sufficiently compliant such that:

- when the diaphragm assembly is at a neutral position during operation; and
- an additional force is applied to the hinge element from the contact member, in a direction through the a region of contact of the hinge element with the contact surface that is perpendicular to the contact surface; and
- the additional force is relatively small compared to the biasing force so that no separation between the hinge element and contact member occurs;
- the resulting change in a reaction force exerted by the contact member on the hinge element is larger than the resulting change in the force exerted by the biasing mechanism.

Preferably the biasing structure compliance excludes compliance associated with and in the region of contact between non-joined components within the biasing mechanism, compared to the contact member.

Preferably the biasing mechanism H705 is sufficiently compliant such that the biasing force it applies does not vary by more than 200%, or more preferably 150% or most preferably 100% of the average force when the transducer is at rest, when the diaphragm traverses its full range of excursion.

A computer model simulation method such as Finite element analysis (FEA) of the structure can be used to analyze compliance inherent in a biasing mechanism. For example, a force can be applied to a hinge element, from the contact surface, and the displacement due to compliance in the biasing mechanism can then be observed.

Preferably the stiffness k (where "k" is as defined under Hook's law) of the biasing mechanism acting on a hinge element is less than 5,000,000, more preferably is less than 1,000,000, more preferably is less than 500,000, more preferably is less than 200,000, more preferably is less than 100,000, more preferably is less than 50,000, more preferably is less than 20,000, more preferably is less than 5,000, and most preferably is less than 500.

Preferably, when the diaphragm is at its equilibrium displacement during normal operation, if two equal and opposite forces are applied perpendicular to the contacting surfaces, one force to each surface, in directions such as to separate them, the ratio dF/dx between a small increase in force in Newtons (dF), above and beyond the force required to just achieve initial separation, and the resulting change in separation at the surfaces in meters (dx) resulting from deformation of the rest of the driver, excluding compliance associated with and in the localized region of points of contact between non-joined components within the biasing mechanism, is less than 10,000,000. More preferably, this is less than 5,000,000, more preferably less than 3,000,000, more preferably is less than 1,000,000, more preferably is less than 500,000, more preferably is less than 200,000, more preferably is less than 100,000, more preferably is less than 40,000, more preferably is less than 10,000, more preferably is less than 1,000, and most preferably is less than 500.

dF/dx can be thought of as the rigidity (or inverse compliance) of the structure in terms of translational forces applied to a hinge joint, in a direction perpendicular to the contact surfaces and such as to separate the hinge element and the contact surface.

Note that compliance associated with localised points of contact between rigid materials, for example due to microscopic surface features, is not always useful in the context of analysis of biasing mechanism compliance, and so may be neglected. This is because such compliance may be inconsistent with diaphragm excursion, time/wear, if dust enters the gap, and between units due to manufacturing variations. The biasing mechanism therefore preferably provides compliance via more controllable, reliable and manufacturable structures.

If computer simulation is used to determine compliance, and if one desires to exclude 'compliance associated with and in the localized region of points of contact between non-joined components within the biasing mechanism, for reasons outlined above and also to avoid inaccuracy associated with an inability of computer simulations to calculate compliance in point load situations, these contact points can be replaced with a very small solid connection, equivalent to a spot weld. Such connections should be sufficiently small such that resistance to pivoting (the equivalent to rolling for the purposes of the analysis) at said point is negligible compared to other sources of compliance affecting the variables being investigated. Additionally, care should be taken that spot welds are only applied to joints that are in compression, and that joints that are in tension are free to separate as would occur in the real-world scenario.

As an example, referring to FIGS. 56G and 56I, which show a contact hinge system in an embodiment K audio transducer, to analyze the compliance inherent in the biasing mechanism of this hinge system one possible method is to apply, at a first contact location k114 to be analyzed, a force separating the hinge element K108 from the contact member K105 (refer to FIGS. 56G and 56I) The force is then varied to determine, by trial and error that required to only just cause separation at first contact location K114. Once a small separation has been achieved, the other contact surfaces or surface of the hinge system (there is only one other in this example) are observed to see whether separation occurs. If separation occurs at another contact location then this is fine, or if no separation occurs then a very small 'spot weld' is added to the model at this location in order to join the contacting elements in terms of translations towards/away from one-another, and thereby eliminate compliance associated with microscopic surface features at this location. This isolates the analysis towards compliance associated with the biasing mechanism, as opposed to microscopic surface features or inaccurate analysis associated with a point load. The force applied is then be increased, and the associated change in separation is observed. The increase in force combined with the change in separation indicates the compliance of the biasing mechanism.

As a possible check, the spot weld size can be reduced and the above analysis repeated, in order to confirm that the weld in both cases is sufficiently small so that results are only negligibly affected by this change.

Preferably the overall stiffness k (where "k" is as defined under Hook's law) of the biasing mechanism acting on the hinge element, the rotational inertia of about its axis of rotation of the part of the diaphragm assembly supported via said contacting surfaces, and the fundamental resonance frequency of the diaphragm in Hz (f) satisfy the relationship:

$$k < C \times 10{,}000 \times (2\pi f)^2 \times I$$

where C is a constant preferably given by 200, or more preferably by 130, or more preferably given by 100, or more preferably given by 60, or more preferably given by 40, or more preferably given by 20, or most preferably given by 10.

Preferably also, when the diaphragm is at its equilibrium displacement during normal operation, if two small equal and opposite forces are applied perpendicular to the contacting surfaces, one force to each surface, in directions such as to separate them, the relationship between a small increase in force in Newtons (dF), above and beyond the force required to just achieve initial separation, the resulting change in separation at the surfaces in meters (dx), resulting from deformation of the rest of the driver, excluding compliance associated with and in the localized region of points of contact between non-joined components within the biasing mechanism, the rotational inertia of the diaphragm about the axis of rotation of the diaphragm, with respect to the contact surface in kg·m$^2$ (I), and the fundamental resonance frequency of the diaphragm in Hz (f), satisfies the relationship:

$$\frac{dF}{dx} < C \times 10{,}000 \times (2\pi f)^2 \times I_s$$

where C is a constant preferably given by 200, or more preferably by 130, or more preferably given by 100, or more preferably given by 60, or more preferably given by 40, or more preferably given by 20, or most preferably given by 10.

Achieving Equilibrium

The biasing mechanism preferably applies the contact force in a location and direction such that either:

- in the case that there is a separate means to applying a diaphragm pivotal restoring force, the biasing force results in no significant moment that may otherwise either destabilise the diaphragm creating an unstable equilibrium or else unduly increase said diaphragm's fundamental mode frequency, or
- in the case that the biasing force is responsible, either directly or indirectly, for applying the diaphragm restoring force, then the restoring force should be sufficiently linear with diaphragm excursion during normal operation.

Preferably, the biasing force applied to the hinge element is applied close to an edge that is co-linear with the axis of rotation of the diaphragm, relative to the contact surface throughout the full range of diaphragm excursion. More preferably, the biasing force applied between the hinge element and the contact surface is applied at a location that is co-linear to an axis passing close to the centre of the contact radius of the contacting surface side which is the convexly curved with a relatively smaller radius, when viewed in cross-sectional profile in a plane perpendicular to the axis of rotation, out of the contacting surface of the hinge element and the contacting surface of the contact member, throughout the full range of diaphragm excursion. Preferably, at all times during normal operation the location and direction of the biasing force is such that it passes through a hypothetical line oriented parallel to the axis of rotation and passing through the point, line or region of contact between the hinge element and the contact member.

The configurations described can help to minimize any restoring force (minimizing Wn) acting on the diaphragm, avoid creating an unstable equilibrium, and help to prevent excessive restoring force on diaphragm that could unduly increase the fundamental diaphragm resonance frequency Wn.

It will be appreciated that many different forms of biasing mechanisms are possible and can be designed in accordance with the abovementioned requirements. For example, spring or other resilient member structures may be used in some embodiments. Otherwise a magnetic force based structure may also be utilized. Examples of these will be given with reference to the embodiments of this invention. However, it will be appreciated that other biasing mechanisms known in the art can be used instead and the invention is not intended to be limited to such examples.

3.2.1e Rigid Restraint Provided by Contact

The contact between the hinge element H702 and the contact member H703 preferably substantially rigidly restrains the hinge element at the point/region of contact H704 against translation relative to the contact member in, at a minimum, directions perpendicular to the plane tangent to the surface of the hinge element at the point/region of contact. This is preferably provided by the biasing mechanism, but may not be in some embodiments. In normal operation, when forces that are small (and in opposition) compared to the biasing force are applied to the hinge element H702, the consistent physical contact between the hinge element and the contact member rigidly restrains the contacting part of the hinge element against translational movements, relative to the contact member in a direction perpendicular to the contact surface. Preferably, when forces that are small compared to the biasing force, i.e. forces that are typical during normal operation, are applied to the hinge element, the consistent physical contact will also rigidly restrain the hinge element, at the point of contact, against translation, relative to the contact member, in directions substantially parallel to or substantially within the plane tangent to the surface of the hinge element at the point/region of contact. Such restrain most preferably results from static friction between the hinge element and the contact surface. If significant translational restraint is not provided, the hinge system will not perform well, or at all, in terms of being able to prevent breakup modes from occurring within the FRO.

3.2.1f Modulus and Geometry

It is preferable that both the hinge element H702 and contact member H703 are formed from a substantially rigid material. A small amount of deflection in the contact region can result in a significant reduction in the frequency of diaphragm breakup modes, and a corresponding reduction in sound quality.

For example, the hinge element and the contact member are made from a material having Young's modulus higher than approximately 8 GPa, or more preferably higher than approximately 20 GPa. Suitable materials include for example a metal such as steel, titanium, or aluminium, or a ceramic or tungsten.

The contacting surfaces of the hinge element H702 and the contact member H703 may also be coated with a hard, durable and rigid coating. An aluminum component could be anodized or a steel component could have a ceramic coating.

A ceramic coating on one or preferably both of the components will reduce or eliminate corrosion due to fretting and/or other corrosion mechanisms, at the contact points. Either or (preferably) both of the contact surfaces of the hinge element and the contact member at the location of contact may comprise a non-metallic material or coating and/or corrosion resistant material or coating and/or material or coating resistant to fretting-related corrosion for this reason.

The geometry of the hinge element H702 and contact member H703 must also be substantially rigid close to the point/region of contact H704. If either component was to have a particularly thin wall that was unsupported, in the vicinity of the point/region of contact for example, then there could be a risk of deflection and associated hinge compliance—allowing translation movement within the tangential plane for example. For this reason, it is preferable that both the hinge element and contact member are substantially thick and/or wide compared to the radius of curvature of the relatively smaller radius contacting surface, at the location of contact H704.

Preferably the hinge element is thicker than ⅛$^{th}$ of, or ¼ of, or ½ of, or most preferably thicker than the radius of the contacting surface that is more convex in side profile out of that of the hinge element and the contact member, at the location of contact. Also, it is preferable that the wall thickness of the contact member is thicker than ⅛$^{th}$ of, or ¼ of, or ½ of or most preferably thicker than the radius of the contacting surface that is more convex in side profile out of that of the hinge element and the contact member, at the location of contact.

Preferably, there is at least one substantially non-compliant pathway by which translational loadings may pass from the diaphragm through to the transducer base structure via the hinge joint. For example there is at least one pathway connecting the diaphragm body to the base structure comprised of substantially rigid components and whereby, in the immediate vicinity of places where one rigid component contacts another without being rigidly connected, all materials have a Young's modulus higher than 8 GPa, or even more preferably higher than 20 GPa.

3.2.1 g Rolling

The hinge element H702 is preferably capable of rolling and/or rocking against the contact member H703 in a substantially free manner during operation. It should be noted that a rolling mechanism does not necessarily define a perfectly pure rotational action. For instance, if the convexly curved surface of smaller radius has a radius greater than 0, when viewed in cross-sectional profile in a plane perpendicular to the axis of rotation, then there will also be an element of translation in the movement of that surface against the other and this may change the location of the axis of rotation during operation. Also, if the hinge element H702 has a parabolic cross-sectional profile, when viewed in a plane perpendicular to the axis of rotation, and the contact member has a flat cross-sectional profile, when viewed in a plane perpendicular to the axis of rotation, then the degree of translation may vary as the diaphragm deflects again changing the location of the axis of rotation. Although in some configurations the distance of translation may be significant, for the purposes of this invention reference to an axis of rotation will mean an approximate axis of rotation as defined by the hinge joint during operation.

3.2.1h Rubbing

In some configurations, it is also possible for the hinge element H702 to rub, twist, slide against or move along the surface of the contact member H703 as it hinges. For example, in one configuration, the hinge element contacts the contact member and rotates (or twists) about an axis that lies perpendicular to the plane tangent to the surface at point/region of contact H704. Suitable materials for both hinge element and contact member could include a hard and rigid material such as sapphire or ruby. In this configuration, one hinge joint would be located on one side of the diaphragm width and a second element would be located on the other. Both hinge joints together would define an axis of rotation.

It is preferable that all points of rubbing or sliding should be located as close to the axis of rotation as possible. Preferably, whichever of the contacting surface of the hinge element and the contact surface has the smaller convex curvature radius, when viewed in cross-sectional profile along a plane perpendicular to the axis of rotation, also has a radius that is relatively small compared to the length of the diaphragm assembly as measured from the axis of rotation of the two parts to the furthest periphery of the diaphragm. This radius is for example less than 2% of the diaphragm assembly length, most preferably less than 1% of the diaphragm assembly length.

3.2.1i Connection to Base Structure and Diaphragm

The hinge system including hinge joint H701 may be configured to couple between a diaphragm assembly and a transducer base structure. For example, the hinge assembly of the hinge system, including the hinge element H702 of contact hinge joint, H701 may be rigidly connected to the diaphragm assembly, and the contact member H703 of the hinge joint of the assembly may be rigidly attached to the transducer base structure. This forms a simple and effective hinge joint mechanism whereby the path that translational forces are transferred between the diaphragm and base structure is direct, which helps to achieve rigidity against pure translations. The absence of intermediate components helps to minimise opportunity for compliance. In other words, the connections are rigid such that there is low to zero compliance at the interface of the diaphragm structure or assembly with the hinge element, and at the interface of the base structure with the contact member.

Alternatively, the hinge joint could be reversed so that the hinge element H702 is rigidly attached to the transducer base structure and the contact member H703 is rigidly attached to the diaphragm assembly.

Preferably, the diaphragm is operatively supported by the hinge system to substantially rotate about an approximate axis of rotation relative to the transducer base structure. Preferably, the hinge element rolls against the contact surface about an axis that is substantially collinear with an axis of rotation of the diaphragm. But alternatively the hinge element rolls about an axis that is parallel but not collinear with the axis of rotation.

The diaphragm assembly, including the diaphragm structure or body is preferably in close proximity to, closely associated with and/or in contact with each hinge joint and the associated contact surfaces. It is also preferable that the hinge element (or the contact member) is rigidly attached to the diaphragm structure and therefore is a component and forms part of the diaphragm assembly so that, to all intents and purposes, the diaphragm structure is in direct contact, leading to improved translational rigidity. Similarly transducer base structure, and in particular the squat bulk of the base structure is preferably in close proximity to, closely associated with and/or in contact with each hinge joint and the associated contact surfaces. It is also preferable that the contact member (or the hinge element) is rigidly attached to the squat bulk of base structure and therefore is a component and forms part of the base structure so that, to all intents and purposes, the base structure is in direct contact, leading to improved translational rigidity.

If there is a distance separating the diaphragm structure and the contact surface it is preferable that this distance is small compared to the total distance from the axis of rotation to the most distal periphery of the diaphragm structure, such that the diaphragm and each hinge joint are closely associated. For example, it is preferable that this distance is less than ¼ of the maximum distance from the diaphragm tip to the axis of rotation, or even more preferably less than ⅛ the maximum distance of the diaphragm tip to the axis of rotation, or most preferably less than 1/16 the maximum distance of the diaphragm tip to the axis of rotation. This helps to reduce compliance between the diaphragm body and the hinge joint. Similarly the squat bulk of the transducer base structure and each hinge joint are preferably closely associated by similar distances if there is separation.

3.2.1j Shim in Hinge System

In some possible configurations the contact member H703 may be attached to the transducer base structure, via one or more shims or other substantially rigid members. These may be considered to form part of the contact member H703 in some instances. For example, a designer may perhaps decide that it is useful to insert a shim into gap H704. In this case the hinge system H701 may still work well with only minimal increase in translational compliance. It is preferable that a shim used in this configuration is of high rigidity, and is preferably be made from a material having Young's modulus higher than approximately 8 GPa, or more preferably higher than approximately 20 GPa. Suitable materials include for example a metal such as steel, titanium, or aluminum, or a ceramic or tungsten.

Preferably one of the diaphragm assembly and transducer base structure is effectively rigidly connected to at least a part of the hinge element of each hinge joint in the immediate vicinity of the contact region, and the other of the diaphragm assembly and transducer base structure is effectively rigidly connected to at least a part of the contact member of each hinge joint in the immediate vicinity of the contact region.

It is also preferable that at all times during the course of normal operation, the point or region where the hinge element and the contact member are in contact is effectively rigidly connected to both the hinge element and the transducer base structure in terms of translational displacements in all directions. In this manner the contact surface and the hinge element of each hinge joint is effectively substantially immobile relative to both the diaphragm assembly and the transducer base structure in terms of translational displacements.

Preferably one of the diaphragm assembly and transducer base structure is effectively rigidly connected to the hinge element, and the other of the diaphragm assembly and transducer base structure is effectively rigidly connected to the contact member. Furthermore preferably, one of the diaphragm assembly and transducer base structure is effectively rigidly connected to a part or parts of the hinge element in the immediate vicinity of the location where the hinge element and the contact member are in contact, and the other of the diaphragm assembly and transducer base structure is effectively rigidly connected to a part or parts of the contact member in the immediate vicinity of the location where the hinge element and the contact member are in contact.

Figure 1F:
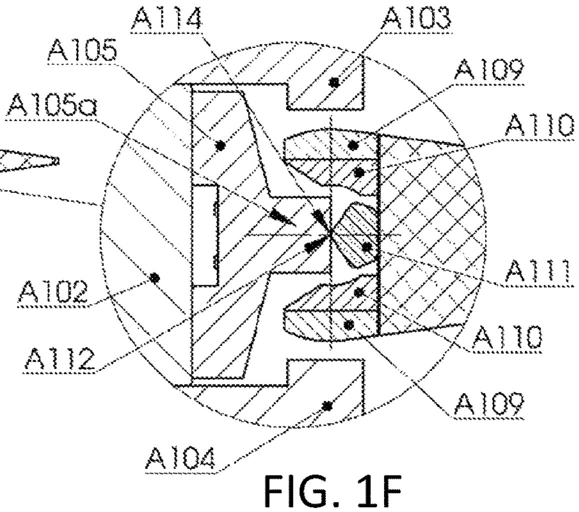

The embodiment shown in FIG. 1F is an example of this configuration, which provides advantages including simplicity, low cost, and low susceptibility to unwanted resonance, as will be described in further detail below.

Note that if a flat metal shim was to be inserted in the gap between the diaphragm assembly and the transducer base structure such that this was held in constant contact against the transducer base structure by the diaphragm assembly, the device would still function fairly well. The shim would behave, at least in the localised area of the point/region of contact, as if it was rigidly connected to the transducer base structure. In this case, if contact member comprises the shim and the diaphragm assembly comprises the hinge element, the transducer base structure remains effectively rigidly connected to shim/contact member, and the hinge element is rigidly connected to the diaphragm assembly, so the advantageous configuration still exists as described above.

3.2.2 Embodiment A—Contact Hinge System

Hinge System Overview

An example of a contact hinge system configuration of the invention designed in accordance with the above described design principles and considerations is shown in an embodiment A audio transducer depicted in FIGS. 1A-1F. The embodiment A transducer of the present invention comprises a rotational action driver having a diaphragm assembly A101 that is pivotally coupled to a transducer base structure A115 via a hinge system. As mentioned in section 3.2 of this specification, the diaphragm assembly comprises a diaphragm body that remains substantially rigid during operation. The diaphragm assembly preferably maintains a substantially rigid form over the FRO of the transducer, during operation. The hinge system is configured to operatively support the diaphragm assembly and forms a rolling contact between the diaphragm assembly A101 and the transducer base structure A115 such that the diaphragm assembly A101 may rotate or rock/oscillate relative to the base structure A115. In this example, the hinge system comprises a hinge assembly A301 (shown in FIG. 3A) having one or more hinge joints, wherein each hinge joint comprises a hinge element and a contact member, the contact member having a contact surface. In this embodiment, the hinge assembly comprises a pair of hinge joints on either side of the diaphragm assembly. It will be appreciated that the hinge elements of the hinge joints may be elements of the same or a separate components, and/or the contact members of the hinge joints may be members of the same or separate components as will be apparent from the description below. During operation each hinge joint is configured to allow the hinge element to move relative to the associated contact member while maintaining a substantially consistent physical contact with the contact surface. Furthermore, the hinge system biases the hinge element towards the contact surface. Preferably the hinge system is configured to apply a biasing force to the hinge element of each joint toward the associated contact surface, compliantly.

In this embodiment, both hinge joints comprise a common hinge element, being a longitudinal hinge shaft A111, which rolls against a contact member, being a longitudinal contact bar A105 having a contact surface (also shown in FIG. 1F), with substantially no or insignificant sliding during operation. In this example, the hinge element A111 comprises a substantially convexly curved contact surface or apex on one side of the hinge element at the contact region A112, and the contact surface on one side of the contact bar A105 at the contact region A112 is substantially planar or flat. It will be appreciated that in alternative configurations as described above, either one of the hinge element A111 or the contact member A105 may comprise a convexly curved contact surface on one side and the other corresponding surface of the contact bar or hinge element may comprise a planar, concave, less convex (of relatively larger curvature radius) surface, or even another convex surface of similar radius, to enable rolling of one surface relative to the other.

The hinge element A111 and contact member A105 components are held in substantially constant and/or consistent physical contact by a substantially consistent force applied with a degree of compliance by a biasing mechanism of the hinge system. The biasing mechanism may comprise part of the hinge assembly, for example part of the hinge element and/or separate thereto as will be explained further with some examples below. The diaphragm assembly, structure or body may also comprise the biasing mechanism in some embodiments. In the example of the embodiment A audio transducer, the biasing mechanism of the hinging system comprises a magnetic structure or assembly having a permanent magnet A102 with opposing pole pieces A103 and A104 and also the magnetically attractive steel shaft A111 embedded in the diaphragm assembly. The biasing mechanism acts to force the hinge element against the contact member with a desired level of compliance. The biasing mechanism ensures the hinge element A111 and contact member A105 remain in physical contact during operation of the audio transducer and is preferably also sufficiently compliant such that the hinge system, and particularly the moving hinge element, is less susceptible to rolling resistances that may exist during operation due to factors such as manufacturing variances or imperfections in the contact surfaces and/or due to dust or other foreign material that may be inadvertently introduced into the assembly, during manufacture or assembly of the hinge system for example. In this manner, the hinge element A111 can continue to roll against the contact member without significantly affecting the rotating motion of the diaphragm during operation, thereby mitigating or at least partially alleviating sound disturbances that can otherwise occur.

Preferably the biasing force is applied in a direction substantially perpendicular to the contact surface at the region of contact between the hinge element and contact member. Preferably the biasing mechanism is substantially compliant. Preferably the biasing mechanism is substantially compliant in a direction substantially perpendicular to the contact surface at the region of contact between the hinge element and contact member. The contact between the hinge element and the contact member preferably substantially rigidly restrains the hinge element at the point/region of contact against translation relative to the contact member in, at a minimum, directions perpendicular to the plane tangent to the surface of the hinge element at the point/region of contact.

The biasing mechanism is configured to apply a force in a direction substantially parallel to the longitudinal axis of the diaphragm structure and/or substantially perpendicular to the plane tangent to the region or line of contact A112 or apex of the hinge element A111 to hold the hinge element A111 against the contact member A105. The biasing mechanism is also sufficiently compliant in at least this lateral direction such that the rolling hinge element can move over imperfections or foreign material that exists between the contact surfaces of the hinge system with minimal resistance, thereby allowing a smooth and sufficiently undisturbed rolling action of the hinge element over the contact member during operation. In other words, the increased compliance of the biasing mechanism allows the hinge to operate similar to a hinge system having perfectly smooth and undisturbed contact surfaces.

Biasing Mechanism

In the example of the embodiment A audio transducer, the biasing mechanism of the hinging system comprises a magnet based structure having a magnet A102 with opposing pole pieces A103 and A104, and also the magnetically attractive shaft A111 embedded in the diaphragm assembly. The magnet A102 may be made from for example, but not limited to, a Neodymium material. The opposing pole pieces A103 and A104 may be made from for example a ferromagnetic material such as, but not limited to mild steel). The pole pieces A103 and A104 are located on either side of the contact bar A105 and pivot shaft A111 to thereby create a magnetic field therebetween that exerts a force on shaft A111 biasing it toward the contact member A105. In this example, the magnet A102 is located in longitudinal alignment with the diaphragm assembly and the pole pieces are located adjacent either side of the opposing major faces of the diaphragm assembly to achieve the required magnetic field, however it will be appreciated that other configurations are also possible.

The shaft A111 may be made from, for example but not limited to, a ferromagnetic material such as stainless steel and in this case forms part of the diaphragm assembly A101. In this example, the contact bar A105 is also made from a ferromagnetic material such as stainless steel, however other suitable materials may be incorporated in alternative configurations. A sufficiently magnetic steel is preferably used such as 422 grade steel, however other types are also possible. Both contact bar A105 and shaft A111 are, in the preferred form, coated using a thin physical vapour deposition ceramic layer such as chromium nitride which: has a reasonably high co-efficient of friction (which helps to prevent slippage at a point of contact), has preferably low wear characteristics, and being non-metallic is useful in terms of helping to prevent corrosion such as fretting. It will be appreciated that other materials and/or coatings may be utilised for the contact bar A105 and/or shaft A111 as explained in the preceding section and the invention is not intended to be limited to this particular example. The diaphragm assembly A101 and transducer base structure A115 are substantially rigid. The materials, geometries and/construction of both the diaphragm assembly and the transducer base structure are relatively rigid in the immediate vicinity of and/or proximal to the contact region A112 on the contact bar A105.

As mentioned the biasing mechanism including the magnet A102, pole pieces A103, A104 of the transducer base structure, and the shaft A111 of the hinge and diaphragm assemblies, forms a magnetic field that applies a particular biasing force on the hinge element A111 and that carries a particular degree of compliance and/or stiffness to movement. In other words the magnetic force is compliant to a degree that enables the hinge element to move translationally relative to the contact member along an axis substantially parallel to the longitudinal axis of the diaphragm assembly A101.

The magnetic field generated by this structure includes magnetic field lines that traverse from the north side of the magnet A102 (the north side as indicated by the arrow direction and “N” symbol in FIG. 1*e*) and extends through the north side outer pole piece A103 towards its end closest to the coil A109, and then in an approximately linear manner through: the first long side A204 of coil winding A109, the first side of the spacer A110, the shaft A111, and through to the end of the south side outer pole piece A104. The field then follows the south side outer pole piece A104 and re-enters the magnet A102 at the south side (the south side as indicated by the arrow direction and “S” symbol in FIG.

1E). It will be appreciated that the orientation of the North and South Poles of the magnet may be altered in alternative configurations.

The direction of the force exerted by one side of the coil winding A109 will depend on the direction of the electrical current through the coil. As the force generated is always perpendicular to both the direction of the current and magnetic field, with reference to FIGS. 1E and 1F the direction of the force applied by one long side A204 of coil winding A109 will be approximately left or right.

A magnetic biasing mechanism provides advantages with respect to the aims of a biasing mechanism, preferably providing a substantial force to one or more hinge joints applied with substantial compliance, and biasing one or more hinge elements to one or more contact members, while still allowing a substantially unobstructed rotational motion between respective pairs of hinge elements and contact members.

In other configurations, a biasing mechanism could consist of multiple magnets arranged to repel and/or attract one another.

The degree of compliance and amount of force can be designed based on any one of the following factors as explained in detail above:

The intended FRO of the audio transducer;

The rotational inertia of the diaphragm structure or assembly and/or the length, width, depth shape or size of the diaphragm structure or assembly; and/or The mass of the diaphragm structure or assembly.

Finite Element Method analysis is a good way to determine compliance inherent in biasing mechanism of a hinge system as described under section 3.2.1d.

The hinge system of the present invention that is employed in the embodiment A audio transducer provides a win-win benefit being that translational compliance (i.e. the ease with which the shaft A111 can translate relative to the contact bar A105) at the hinge joint is relatively low or mitigated, as the main path through which loads are passed between the diaphragm assembly and transducer base structure consists entirely of components made from rigid materials and having rigid geometries. Also, since the force holding the shaft A111 and contact bar A105 together is applied compliantly, resistance to rotation can be made to be relatively low, consistent and reliable, especially in relation to the firmness of contact.

This performance is achieved through the asymmetry inherent in the hinge system whereby, from one side, the biasing mechanism compliantly applies a consistent force which holds the diaphragm assembly against the transducer base structure, and from the opposite side, the transducer base structure responds by defining a substantially constant displacement, resulting in an equal and opposite reaction force applied in the opposite direction and minimal translational compliance that could otherwise exacerbate unwanted diaphragm-base structure resonance modes. Preferably the reaction force is provided by parts of the contact member connecting the contact surface to the main body of the contact member which are comparatively non-compliant.

The biasing mechanism of this embodiment is sufficiently compliant such that it does not exhibit significant internal loadings relative to the diaphragm assembly during operation. For instance, during operation, when small loads are applied to the diaphragm assembly in use, for example when a break-up resonance mode is excited, displacement of the shaft A111 of the hinge and diaphragm assemblies is resisted primarily by the contact with the contact bar A105, since this connection is constructed non-compliantly. On the other hand, the biasing mechanism, is relatively compliant and is therefore configured to maintain relatively constant internal loadings and does not effectively resist such displacements.

Preferably, the hinge element/shaft A111 is rigidly connected to the diaphragm structure and forms part of the diaphragm assembly, and the region of the hinge element A111 immediately local to the contact surface A112, particularly, and also connections between this region and the rest of the diaphragm assembly, are relatively non-compliant compared to the biasing mechanism.

In the case of the embodiment A audio transducer, the force exerted by the excitation mechanism force generating component, being the coil windings A109, may potentially act in a way that causes the hinge element and contact member to slip unpredictably. In order to minimise this possibility the net force applied by all biasing mechanisms should preferably be larger than the maximum force applied by the excitation mechanism. Preferably, the force is greater than 1.5, or more preferably 2.5, or even more preferably 4 times the maximum excitation force experienced during normal operation of the transducer.

The force that biases the hinge element A111 towards the contact member A105 is preferably sufficiently large such that substantially insignificant or non-sliding contact is maintained between the hinge element A111 and the contact member A105 when the maximum excitation is applied to the diaphragm assembly during normal operation of the transducer. Preferably, the biasing force in a particular hinge joint is 3 times, or more preferably 6 times, or most preferably 10 times greater than the component of the reaction force occurring at the hinge joint in a direction parallel to the contact surface when the maximum excitation is applied to the diaphragm assembly during normal operation of the transducer. Preferably at least 30%, or more preferably at least 50%, or most preferably at least 70% of contacting force between the hinge element and the contact member is provided by the biasing mechanism.

The net force applied by all biasing mechanisms is applied in a direction, approximately, and permitting some variation as the diaphragm rotates during the course of normal operation, which minimises tendency for slippage at the point(s) of contact. So, in the case of embodiment A, it is preferable that the biasing force is applied in a direction with an angle of less than 25 degrees, or more preferably less than 10 degrees, and even more preferably less than 5 degrees to an axis perpendicular to the contact surface (or a vector normal to the contact surface) where it contacts the hinge element when in use. Most preferably the angle is approximately 0 degrees between the two, which is the case for embodiment A, when in use.

Hinge Joint

In the example of embodiment A, the contact bar A105, is rigidly connected to the transducer base structure A115. The contact bar A105 may be formed separately and rigidly coupled the base structure via any suitable mechanism or otherwise it may be formed integrally with another part of the base structure A115. The contact bar A105 may form part of the base structure. In this example, the contact bar A105 is rigidly coupled to a face of the magnet A102 of the base structure A115, and forms part of the base structure. Similarly, the hinge element/shaft A111 is rigidly coupled to the diaphragm structure A1300 and may therefore form part of the diaphragm assembly A101. The shaft A111 may be formed separately or integrally with the diaphragm assembly. In this example, the shaft A111 is formed separately and a planar end face opposing the convexly curved surface rigidly couples a corresponding planar end face of the diaphragm body A208, via any suitable mechanism known in the art.

In this example, the convexly curved surface A311 of the pivot shaft A111 comprises a relatively small radius of approximately 0.05-0.15 mm, for example 0.12 mm at the location/region of contact A112. This is less than 1% of the length A211 (shown in FIG. 2F) of the diaphragm body A208 from the axis of rotation A114 to the distal tip/edge of the diaphragm. For example, in this example the length of the diaphragm body is approximately 15 mm. This ratio helps to facilitate free diaphragm movement and a low fundamental diaphragm resonance frequency (Wn). It will be appreciated that these dimensions are only exemplary and others are possible as defined under the preceding design principles and considerations section of this patent specification.

Figure 3A:
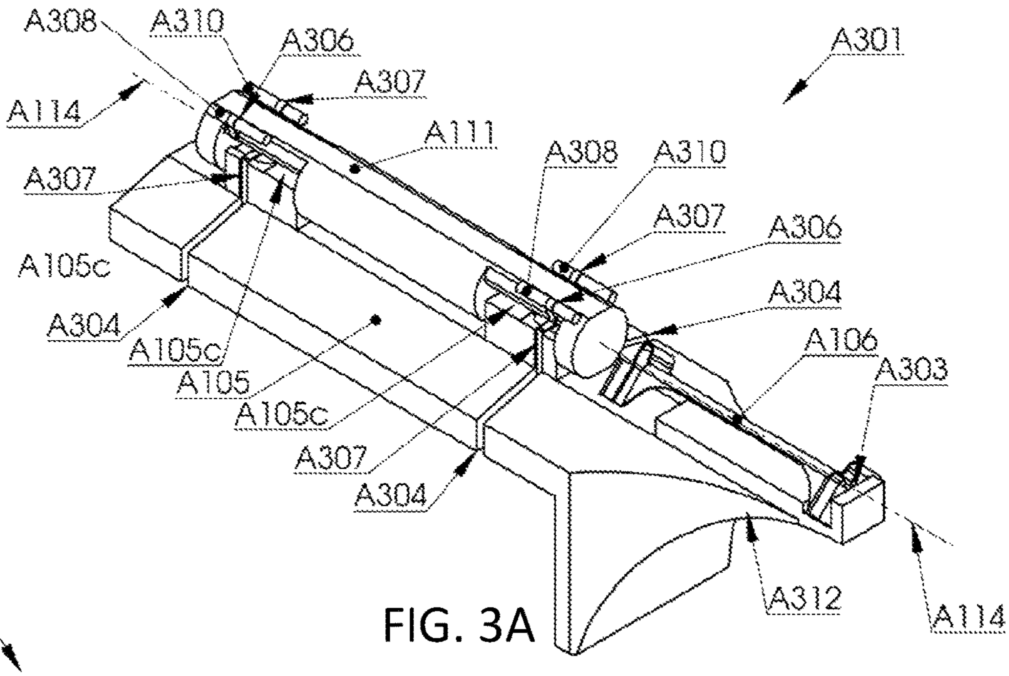
Figure 3B:
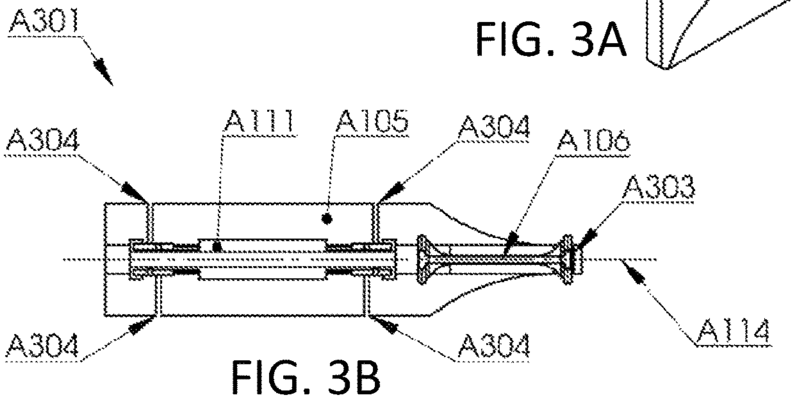
Figure 3C:
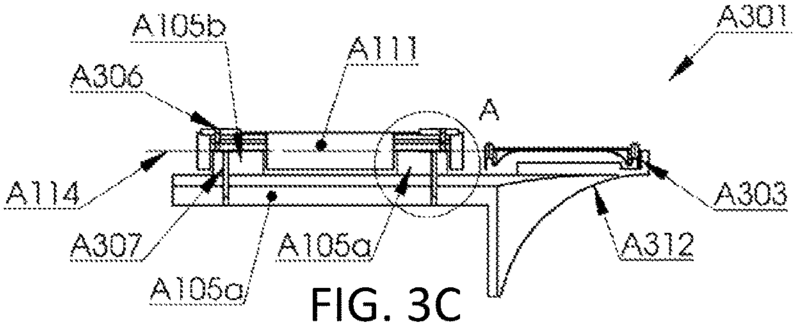
Figure 3D:
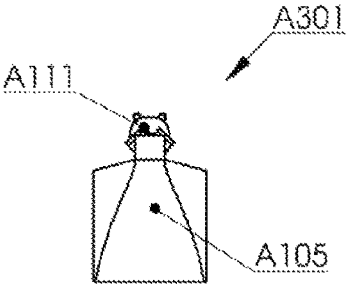
Figure 3E:
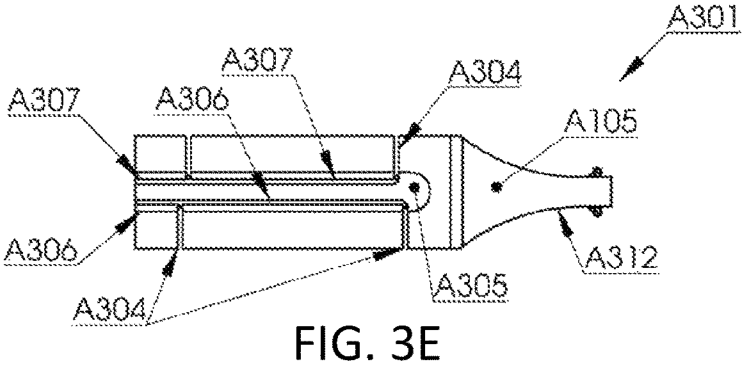

Referring to FIG. 3A, the components of the contact hinge assembly of the hinge system are shown in more detail. The hinge element or shaft A111 comprises a substantially longitudinal body of an approximately cylindrical overall shape. The size of the shaft is dependent on the application and size of the transducer, for example it may be between approximately 1 mm-10 mm for a personal audio application. Other sizes are envisaged and this example is not intended to limit the range of sizes possible. Referring also to FIG. 2G, adjacent either end A203 of the shaft A111 is a recess or section of reduced diameter A202. In this manner the shaft A111 comprises a central section A201 and two end sections of substantially similar diameters and two recessed sections between the central section and either end section of substantially reduced diameters relative to the central and end sections. The contact member A105 comprises a main body having a substantially planar surface. A pair of contact blocks protrude laterally from the planar surface. The main body is configured to couple the magnet A102 and/or base structure A115 of the transducer assembly in the assembled state of the transducer.

Each recessed section A202 is sized to receive a corresponding contact block A105*a* and A105*b* protruding from a face of the contact member A105. Each contact block is sized to be accommodated within the corresponding recess and comprises a substantially planar contact surface A105*c* configured to locate against/adjacent an opposing face of the recessed section. Each recessed section A202 of the pivot shaft A111 comprises a substantially convexly curved (in cross-section) surface that is configured to contact against the contact surface A105*c* of the corresponding contact block A105*a*/A105*b* of the contact member A105, in the assembled form of the assembly. The central section A201 of the pivot shaft A111 is configured to locate between the contact blocks of the contact member and the ends A203 are configured to locate outside of the contact blocks. The central section A201 is preferably spaced from the contact member A105. In this manner the shaft A111 can roll against the contact member by action of the recessed sections A202 rolling against the contact surfaces of the contact blocks. The hinge system thus allows the diaphragm assembly to freely rock back and forth/oscillate with minimal restriction.

Each recessed section A202 of the shaft A111 has an angled surface leading up to the convexly curved contact surface A311. This provides space for the shaft to roll relative to the contact surface A105*c* of the contact member A105 with minimal resistance. The angled surfaces may be for example about 120 degrees but other angles are also possible and the invention is not intended to be limited to such. At the apex of the angled sections, the cross-section of each recessed section A202 has a convexly curved surface A311 of a relatively small radius (such as between 0.05 mm-0.15 mm as mentioned above) which contacts and rolls against the substantially planar contact block A105*a*/A105*b* or platform on the contact bar A105 at the contact regions A112.

In this example, the hinge system comprises a pair of hinge joints spaced along the axis of rotation A114 of the assembly and each being defined by a recessed section and a corresponding contact block/platform A105*a*/A105*b*. The pair of hinge joints and in particular the contact regions A112 of both are substantially aligned, such that the contact regions A112/lines are collinear to form a common approximate axis of rotation A114 for the hinge system. It will be appreciated that in alternative embodiments there may be more than two hinge joints along the longitudinal axis, or there may be a single hinge joint extending across a substantial portion of the longitudinal length of the hinge system. In this example, the pair of hinge joints are configured to locate adjacent either side of the width of the diaphragm body A208 of the diaphragm assembly A201 in the assembled state of the transducer.

Fixing Structure

FIG. 3A shows a close up perspective view of parts that comprise the hinge assembly A301 of the hinge system of this embodiment. Referring to FIG. 3A, in this embodiment, the hinge assembly A301 comprises ligaments A306 and A307 that are operative to hold the diaphragm assembly A101 in position in directions substantially perpendicular to the contact plane. These are designed such that they do not greatly influence rotation. They are too fine and compliant to contribute significantly to resisting translational displacement for the purpose of minimising diaphragm break-up resonances, and they primarily serve to hold the diaphragm roughly in position.

As it is possible that in the course of normal operation, or in other situations such as in a drop or bump scenario, a force may be applied to the hinge element in a direction tangential to the contact surface at the point of contact, a fixing structure preferably positions the hinge element, relative to the contact member, in the desired location for operation, while still allowing a free rotational mode of operation.

There are many possible configurations of fixing structure. The transducer of embodiment A has a hinge/motor configuration where there is likely to be a force acting on the shaft A111 to rotate it into a diagonal position where one end is attracted towards pole piece A103 and the other end is attracted to pole piece A104. For such configurations incorporating a magnetic element (being the steel shaft A111) embedded in the diaphragm assembly, the fixing structure must be able to apply a large reaction force yet still provide low compliance in terms of the allowable rotational mode of vibration.

In embodiment A this is achieved by a fixing structure comprised of ligaments. Such ligaments are preferably comprised of multiple strands to facilitate having a: greater bending compliance resulting in a reduced fundamental diaphragm resonance frequency; high tensile modulus, e.g. higher than 10 GPa or more preferably higher than 20 GPa, or more preferably higher than 30 GPa, or most preferably 50 GPa; low tendency to creep over time, since this can result in a change in diaphragm positioning away from an ideal location; a high resistance to abrasion to help prevent wear. A suitable material for the ligaments is a liquid crystal polymer fibre such as Vectran™.

For hinge/motor configurations that do not incorporate a magnetic element embedded in the diaphragm assembly, for example embodiment E, other simpler fixing structures may be more cost-effective. For example, embodiment E, shown in FIGS. 34A-34K, has base block E105 with contact member indentations E117 and hinge element protrusions E125 that contact and roll within the indent at contact location E114, the protrusion being part of the diaphragm base frame E107. In the event of impact such as may occur if the transducer is dropped, the protrusion E125 contacting a sloped side wall E117*b*/E117*c*/E117*c* of an indentation E117 can prevent excessive displacement of the protrusion. In the case that the protrusion moves in the direction of the axis, sloped side wall E117*d* can prevent excess displacement of the protrusion.

Figure 34K:
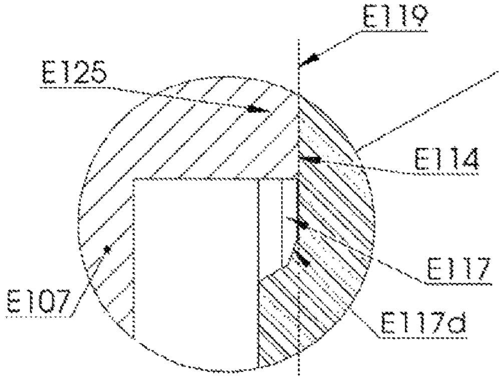
Figure 34L:
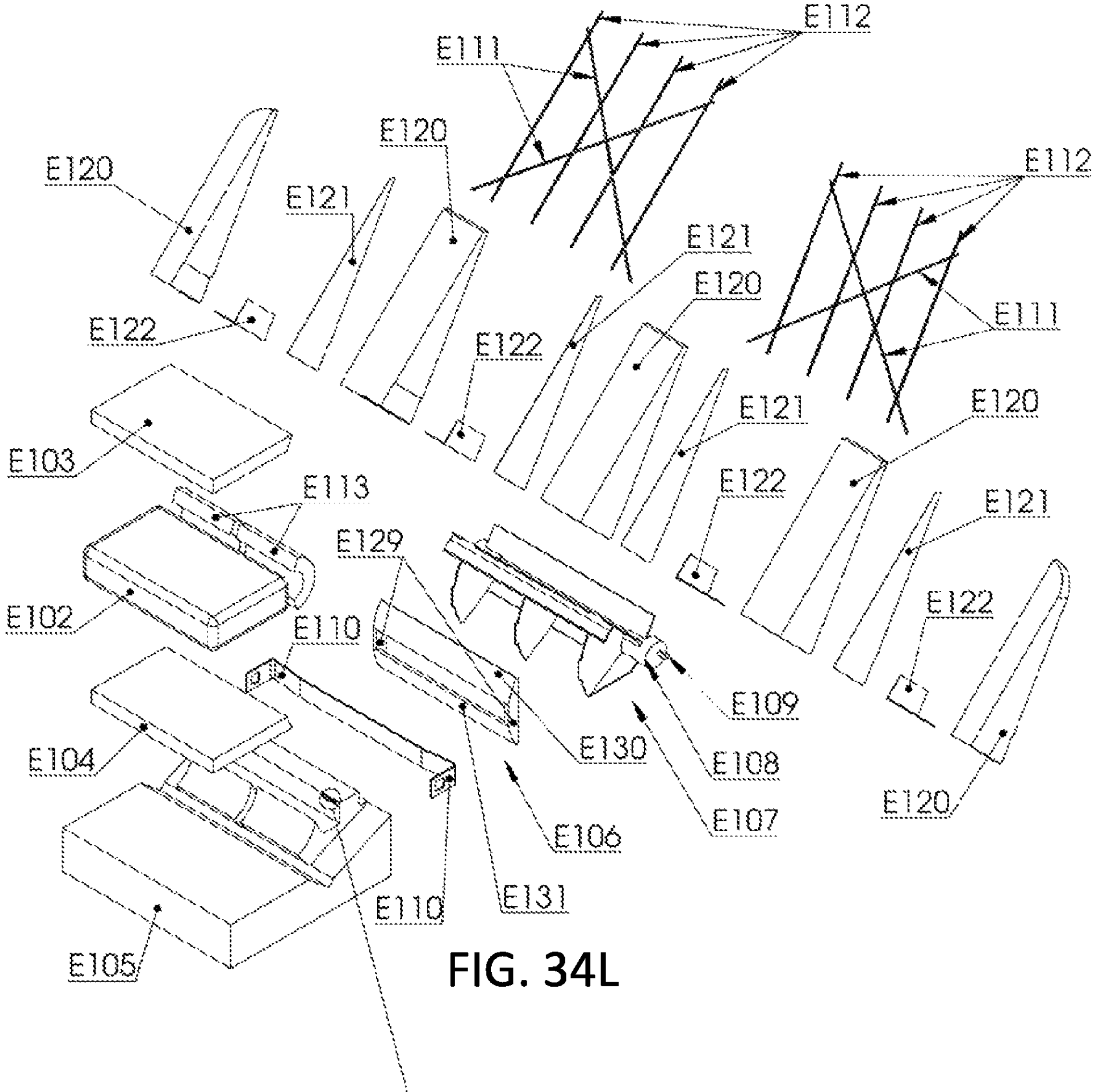
Figure 34M:
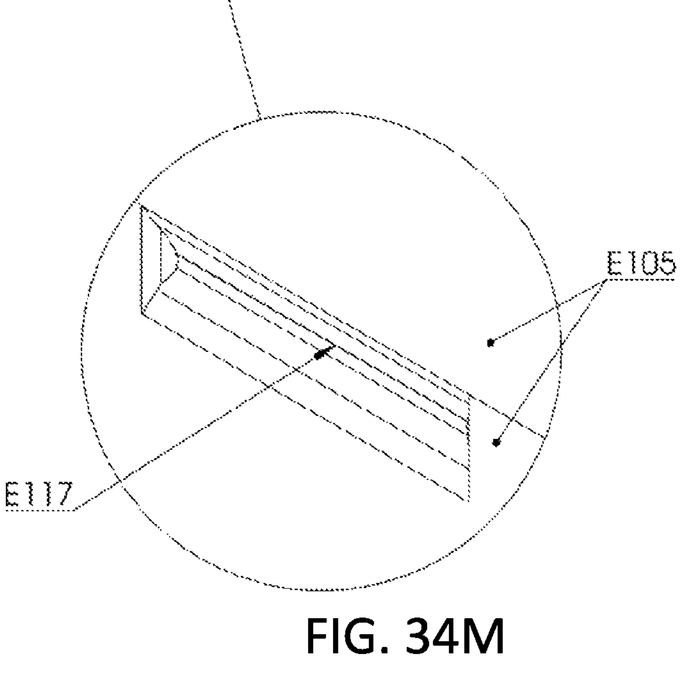

Preferably, the other out of the hinge element and the contact surface has, in the cross-sectional profile in a plane co-linear to the axis of rotation and perpendicular to the plane of the contact surface (i.e. the cross-section as shown in FIG. 34K) one or more raised portions preventing the first element moving too far in the direction of the axis of rotation.

The torsion bar A106 detailed in FIGS. 4A-4D of embodiment A is a different type of fixing structure, being a metal spring that contributes towards locating the shaft A111 relative to the transducer base structure A115.

As an alternative to the ligament fixing structure of embodiment A, two torsion bars similar to, but not the same as, torsion bar A106 could be used, one in the position shown in FIGS. 1A-1F, and the other attached on the opposite side of the diaphragm. They could be modified because torsion bar A106 was not designed to provide rigidity in terms of translational forces perpendicular to the axis of rotation. The flexible tabs of wing A401 may need to be reduced or eliminated, and preferably the cross-section of the torsion bar would be greater. This dual torsion bar fixing structure could be simpler and cheaper to produce than the ligament type fixing structure, but would likely restrict the fundamental diaphragm resonance frequency as well as diaphragm excursion.

For such fixing structures using flexing springs it is preferable that the spring is resistant to fatigue. For example, a metal such as steel or titanium would be suitable.

Other types of fixing structures can be used, such as soft flexible blocks of elastomer, or magnetic centring, to provide positioning of the hinge element with respect to the contact member.

Referring to FIGS. 3A and 3F-3I, to help locate the pivot shaft A111 relative to the contact bar A105 the hinge assembly A301 further comprises a fixing structure. The fixing structure consists of a pair of ligaments A306 and A307 at each hinge joint, adjacent each end of the shaft. For each hinge joint, a first ligament A306 wraps around a first ligament pin A308 on one side of a planar surface of the shaft (opposing the contact member) and a second ligament A307 wraps around a second ligament pin A310, and a second ligament on the opposing side of the planar surface of the shaft A111. Each ligament pin A308, A310 is rigidly attached to both the shaft A111 and the spacer A110 of the diaphragm assembly. This can be via any suitable mechanism, for example via an adhesive agent such as epoxy adhesive. Each ligament A306, A307 comprises an elongate strand of material that wraps around the ligament pin, past and under the pivot shaft A111 and onto the opposing side of the contact member, and is fixed along its length to the pivot shaft A111 and contact member A105 to thereby fix the two components together.

Figure 3F:
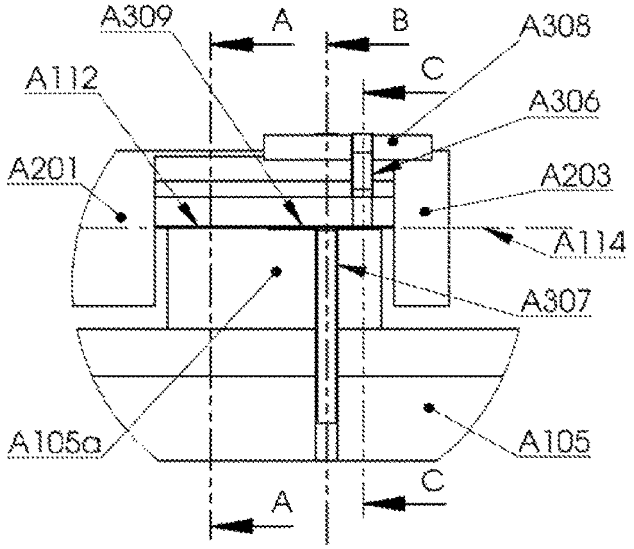
Figure 3J:
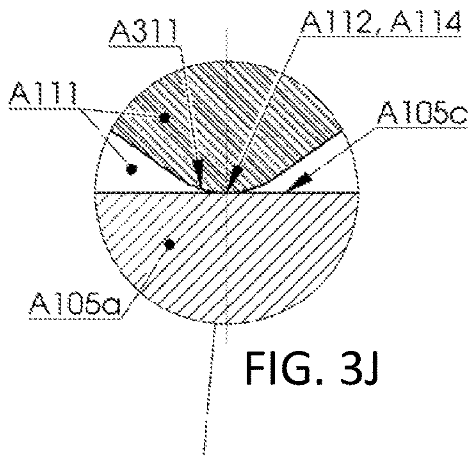
Figure 3G:
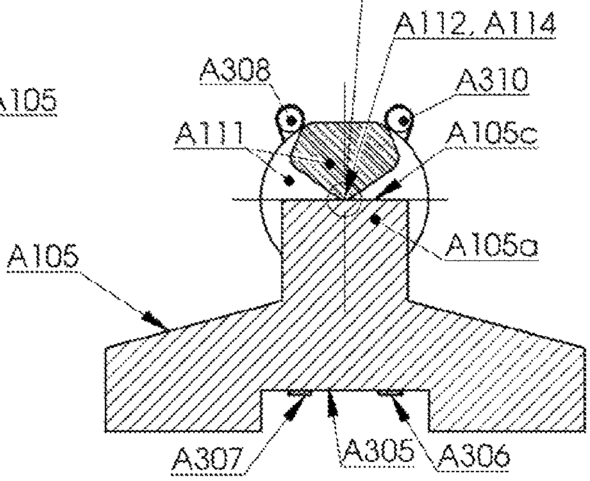
Figure 3H:
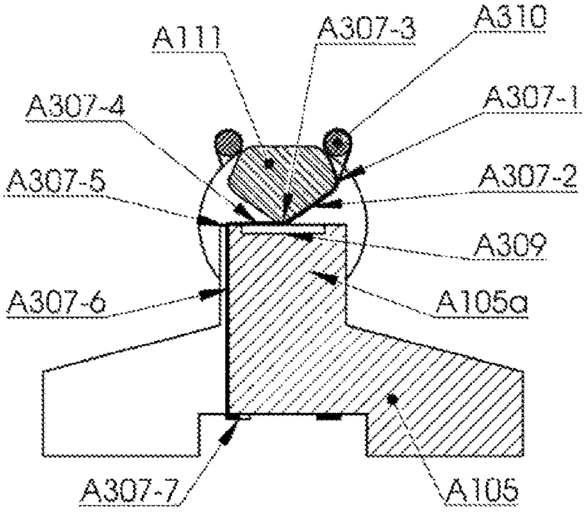
Figure 3I:
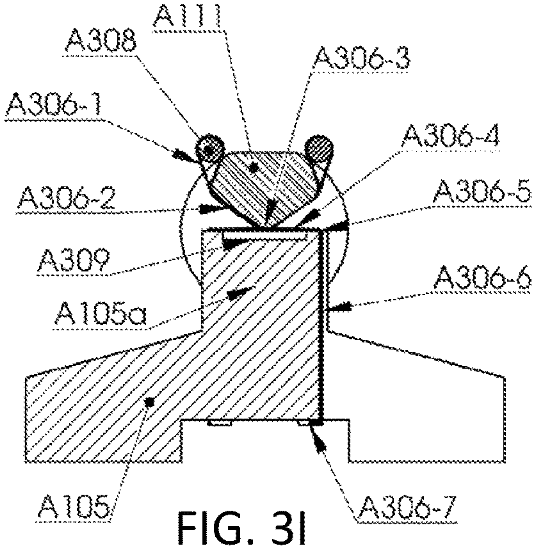
Figure 4A:
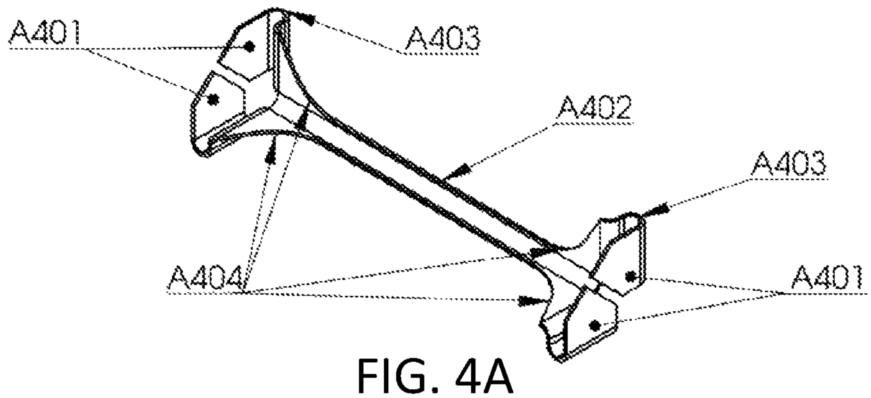
Figure 4B:
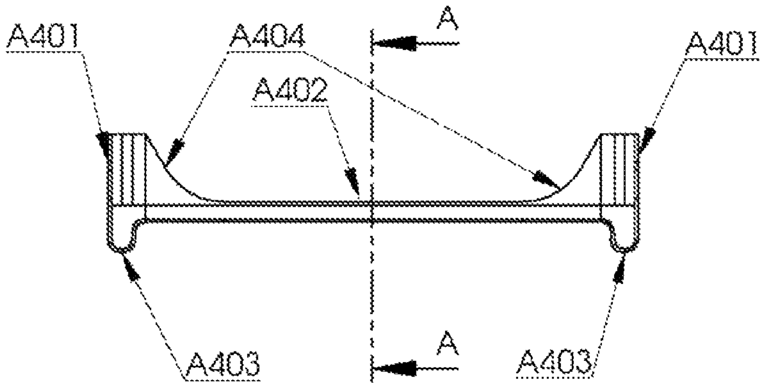
Figure 4C:
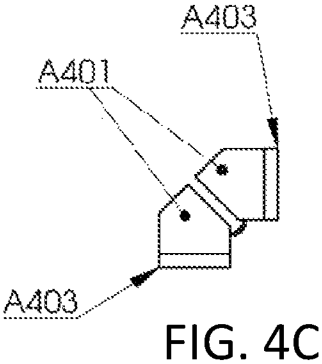
Figure 4D:
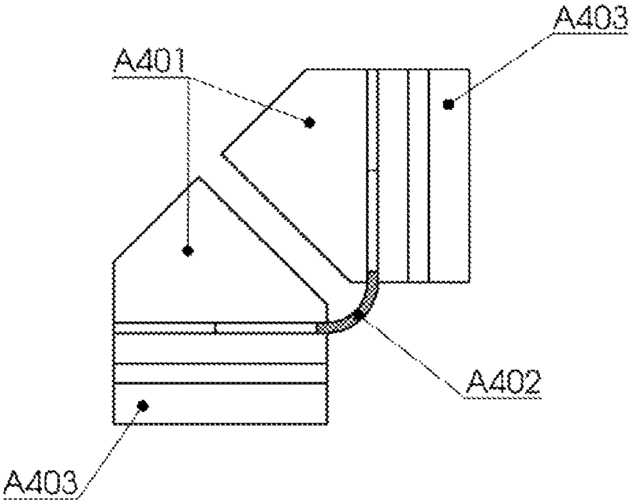

Referring to FIG. 3F for example, the ligament A307 loops around the pin A310 and intersects itself at location A307-1 as it passes around the side of the shaft A111. The ligament A307 then extends along an angled flat surface A307-2 where it preferably attaches to the shaft A111 using an adhesion agent, for example epoxy adhesive. However, care is taken to prevent the adhesion agent from getting close to the small radius at location A307-3. This means that about half of the length of the flat surface A307-2, close to location A307-3 is free from adhesive. This allows the ligament A307 to be as flat as possible as it passes around the convexly curved surface A311 at location A307-3, facilitating a low fundamental frequency (Wn). The ligament A307 then passes through air to a corner/edge at location A307-5 on an opposing side of the contact block A105*a* to the ligament pin A310. Beneath the region of the radius at location A307-3 there is a small clearance A309 recessed into contact block A105*a* of the contact bar A105. This recess A309 prevents the shaft A111 from squashing the ligament A306, A307, since this could cause it to break with time, and it also prevents the ligament from restricting the shaft from directly contacting the contact bar A105 at contact region A112. The ligament A307 passes around corner/edge A307-5 of the block, and then within a slot A304 formed in the contact bar A105 along the block and the main body. The ligament preferably attaches to the contact bar along region A307-6 using an adhesion agent, for example epoxy adhesive. The ligament then passes underneath the main body of the contact bar A105 at location A307-7 and into the channel A305 on an opposing side of the body to the contact block A105*a* where it is again attaches to the contact bar using an adhesion agent, for example epoxy adhesive. Ligament A306 follows a similar path to that of ligament A307, except in an opposite direction. It starts by looping over ligament pin A308, the loops combine into one ligament at location A306-2, and follows a path via locations A306-2, A306-3, A306-4, A306-5, A306-6 and A306-7 as shown in FIG. 3I. Both ligament pin A308 and ligament A306 are connected as per ligament pin A310 and ligament A307. The direction of the ligament A306 at location A306-4 is in a direction substantially parallel to the ligament A307 at location A307-4. The two ligaments may overlap in this region.

At all times and all angles of diaphragm excursion the ligaments remain substantially co-linear to the contact surface A105*c* of the contact bar A105 that is in contact with the shaft A111. Both of these features allow the shaft A111 to be only minimally constrained in respect to the allowable rotational diaphragm action, thereby facilitating a low fundamental frequency (Wn).

All ligaments are placed under a small tensile load, approximately 80 g in this case, before adhesive agent is applied to the regions to be adhered, to help minimise slack that could otherwise result in inaccurate diaphragm positioning.

Pivot Shaft

The shaft A111 is subjected to a magnetic field in situ, and is fixed in a manner such that the shaft A111 can rock against the contact member and/or transducer base structure A115 at the contact region A112. The magnetic field provides a benefit being that it exerts the biasing force holding the shaft A111 to the transducer base structure A115.

In some, but not all cases, this magnetic force may create problems. The magnetic field can rotate the shaft in two ways being 1) create an unstable equilibrium whereby the diaphragm wants to move to an extreme excursion angle or 2) apply a centring force that holds the diaphragm at its equilibrium angle, thereby raising the diaphragm fundamental frequency during operation.

Two of the factors governing any torque applied to the shaft by the magnetic field are: 1) net movement of the shaft towards one or other pole piece will generally release potential energy, and so if this is possible then there may be a force exerted by the magnetic field in this direction, and 2) The magnetic field will try to position the shaft towards an angle that maximises magnetic flux travelling through the shaft from one pole piece to the other. So the magnetic field will try to rotate the shaft to an angle where the widest part of the shaft in cross-sectional profile, assuming that there is a widest part, is aligned so that it spans the gap between the pole pieces.

The radius of curvature of the surfaces of the shaft A111 at the contact regions A112, and the location of the curved surfaces relative to the net location at which the biasing in force is applied, may also apply a torque to the shaft A111, due to simple geometrical considerations. The direction and strength of the magnetic field lines also influence the equilibrium.

The aim for a high performance transducer is to achieve a balance between all these factors so that a low fundamental frequency (Wn) is achieved.

In the example of embodiment A, the above problematic factors associated with the magnetic field of the transducer are substantially mitigated in the following manner. Firstly the shaft A111 is largely cylindrical in shape. Although the shaft A111 has two large recesses A202 as mentioned earlier which are located in the region where the contact points A112 and where the centring ligaments A306 and A307 are located (meaning that the shaft is not a simple annular cross-section all the way through), both recesses are still relatively small such that they do not significantly alter the bulk or overall profile/shape of the shaft A111. Also, the recesses are shaped/sized such that the curved contact surfaces are located in proximate to and/or substantially in alignment with the central longitudinal axis of the shaft A111. By locating the approximate axis of rotation A114, as defined by the contact regions A112 close to the central longitudinal axis of the cylindrical shape of the shaft A111, the body of the shaft A111 hardly moves closer to either outer pole piece A103, A104 during rotation.

The body of the shaft A111 may translate slightly towards one or other pole piece, for example as the diaphragm assembly rotates during operation or if the ligaments 306 or 307 are installed inaccurately or stretch, and in this case an unstable equilibrium may result. To counteract this, the shaft A111 comprises flattened surfaces on the opposing ends A203 and the central section A201 of the shaft configured directly adjacent the contact member A105. A further flattened surface is created against the entire face where the shaft A111 contacts the diaphragm body A208. This creates a slightly oblong cross-sectional profile. The major axis of the oblong profile will, to an extent, want to align with the magnetic field lines extending between the two outer pole pieces A103 and A104, and this counteracts the instability providing a low/neutral net torque.

Also, the radius of curvature of the contact surface A311 of the shaft A111 at the contact region A112 is relatively small, and selected to balance conflicting requirements for translational rigidity (better if the radius is larger) and low fundamental diaphragm resonance frequency and low noise generation (better when the radius is smaller) as explained in more detail in the design principles and considerations section of the specification. The relatively small radius also minimises translation towards the pole pieces as the hinge element rolls against the contact member, which could drive an unstable equilibrium.

By adjusting the geometry of the contacting parts, and also the magnetic structures of embodiment A as described, the diaphragm assembly can be positioned in a state of either equilibrium or unstable equilibrium whereby the magnetic forces holding the diaphragm assembly in either of these states is small. Once this is achieved, another easier to control method of centring the diaphragm assembly into its rest position can be used to overcome the small forces and yet still provide a low fundamental frequency.

Restoring Mechanism

During operation, the hinge element/shaft A111 is configured to pivot against the contact member/bar A105 between two maximum rotational positions, located preferably on either side of a central neutral rotational position. In this embodiment, the hinge system further comprises a restoring mechanism for restoring the hinge and diaphragm assembly to a desired neutral or equilibrium rotational position, in terms of its fundamental resonance mode, when no excitation force is applied to the diaphragm. By using a restoring mechanism the bass roll-off frequency response can be tailored to the transducer's diaphragm excursion capability to optimise bass response to make best use of the excursion capability.

The restoring mechanism may comprise any form of resilient means to bias the diaphragm assembly toward the neutral rotational position. In this embodiment, a torsion bar is utilized as the restoring/centering mechanism. In another form the restoring mechanism comprises a compliant, flexible element such as a soft plastics material (e.g. silicone or rubber), located close to the axis of rotation. In another form, such as described herein in regards to embodiment E, part, or all of the restoring mechanism and force is provided within the hinge joint through the geometry of the contacting surfaces and through the location, direction and strength of the biasing force applied by the biasing mechanism. In the same or an alternative form, a significant part of the restoring/centering mechanism and force is provided by a magnetic structure.

As mentioned, the embodiment A transducer shown in FIGS. 1A-1F, comprises a diaphragm restoring and/or centring mechanism in the form of a torsion bar A106 (as shown in FIG. 1A). The torsion bar A106 is connected between the diaphragm assembly A101 and the transducer base structure A115 to restore the diaphragm to a neutral rotational position.

A resilient member such as a spring or as in this case, a torsion bar A106 is an easy, linear and reliable mechanism to use. The torsion bar also serves secondary purposes being to position the diaphragm assembly A101 in the translational direction parallel to the axis of rotation A114 so that the moving parts of the diaphragm assembly A101 do not touch and rub against the transducer base structure A115 or a transducer housing A613 (as shown in FIG. 6A-6I) that may extend around the perimeter of the diaphragm assembly A101 in situ and during operation. The torsion bar furthermore supports the wires leading to the coil windings A109, and prevents them from resonating and thereby adversely affecting the quality of audio reproduction.

FIGS. 4A-4D detail the construction of the torsion bar A106 used in embodiment A. The torsion bar may be formed from any suitable resilient material, such as a metallic or a resilient plastics material. In this example, the torsion bar is folded out of titanium foil of a relatively small thickness, such as 0.05 mm for example. The shape of the torsion bar is sufficiently rigid such that it has minimal to no adverse resonances within the transducers FRO, and yet also is sufficiently flexible in torsion that it provides a low fundamental diaphragm resonance frequency (Wn).

The material used preferably comprises a relatively low Young's modulus (to help facilitate low fundamental frequency and high excursion), reasonably high specific Young's modulus (i.e. low density, in order to mitigate internal resonances in spite of the low Young's modulus), high yield strength and/or preferably does not suffer significantly from creep nor fatigue over many of cycles of operation. A non-magnetic material, such as titanium may also be useful in preventing or mitigating complications due to attraction to the magnetic assembly. Other materials are also suitable, for example 402 grade stainless steel may suffice.

The torsion bar comprises a longitudinal body having a central longitudinal flexing section/region A402. This region preferably has a consistent cross-section (as seen cross-hatched in FIG. 4D). This section A402 comprises a substantially bent or curved wall that forms a channel extending the length of the bar. The wall of section A402 is bent at approximately 90 degrees. Region A402 is long (as seen in the side elevation view of FIG. 4B) and is thin-walled in side profile, hence it is compliant in torsion. Section A402 is preferably also substantially rigid/stiff against bending in response to forces that are normal to the section A402. This is achieved by forming the section A402 to have a significantly larger height and width dimensions relative to the thickness of the foil. This geometry is important for mitigating or preventing resonances over such a long span.

The torsion bar further comprises a widened and relatively broad winged section A401 at either end of the central flexing region A402. The central flexing region A402 widens at regions A404 at or adjacent either end of the torsion bar to transition into the winged sections. The widening at this region A404 is gradually tapered, preferably (but not exclusively) using a curved taper as shown, and is not stepped, to avoid creating stress raisers that might fatigue over time, and to transition into the broader flat-winged spring section A401 smoothly. It will be appreciated that the taper may be linear in other configurations and/or it may be made up of a series of steps to reduce the risk of creating stress raisers. Each end A401 of the torsion bar A106 then comprises a pair of separated tabs forming a wing A401. For each wing section A401, each tab extends from one side of the folded wall of the central flexing section A402 and comprises a folded wall that is bent toward the opposing tab. The opposing walls of the tabs are spaced and disconnected in this embodiment to form a channel therebetween. These wings A401 provide a sufficiently large surface area for effective attachment to the lateral end tab A303 (which can be seen in FIG. 3A) extending from one end of the main body of the contact bar A105, and also to a short side A205 of the coil windings A109 of the diaphragm assembly.

In situ, the torsion bar is configured to locate on an arm A312 of the main body of the contact member A105 extending longitudinally from one side of the body and having a laterally projecting tab A303 at the end. A recess in the arm A312 locates adjacent the tab for retaining a wing section A401 of the torsion bar therein. Another recess between the arm A312 and the pivot shaft A111 retains the other wing A401 of the torsion bar, and the central section A402 locates on the arm A312. One wing is rigidly coupled to the tab A303 and the other end is rigidly coupled to the diaphragm assembly, such as a side of the coil winding A109. Any suitable fixing mechanism may be used, for example via a suitable adhesive.

With respect to the torsion bar A106, the bends in the end tab walls (that are substantially planar and thin) at the four bend locations A403 introduce a degree of rotational flexibility similar to a universal joint, because as the flexing region A402 of the torsion bar A106 twists, it tends to want to skew the end parts of the torsion bar. If this compliance is not provided, this has some effect of restraining the flexing region A402 against torsion, which would increase the fundamental frequency (Wn) of the assembly. Also, the skewing force may act to break the adhesive or other mechanism securing the ends of the torsion bar. Preferably one, or more preferably both, of the end wing sections incorporates rotational flexibility, in directions perpendicular to the length of the middle section. Preferably the translational and rotational flexibility is provided by one or more flat springs/end tab walls at one or both ends of the torsion bar, the plane of which is/are oriented substantially perpendicular to the primary axis of the torsion bar. Preferably both end wing sections are relatively non-compliant in terms of translations in directions perpendicular to the primary axis of the torsion bar Preferably at least one end of the sections provides translational compliance in the direction of the primary axis of the torsion bar. The bends in the end tab walls at the four bend locations A403 also introduce a small degree of translational flexibility along the longitudinal axis of the torsion bar to help ensure that the contact region A112 does not slide in along the axis of rotation A114 due to any shortening of the flexing section A402 of the torsion bar A106 as it undergoes torsion during operation. Also, in an impact scenario such as a drop the bends at the four bend locations A403 also help ensure that the torsion bar is not ripped from its connections to the transducer base structure A115 and the diaphragm assembly A101.

The torsion bar design shown in FIGS. 4A-4D is substantially resonance-free within the FRO of the transducer.

Preferably the mechanism of providing a restoring force is substantially linear with respect to the force vs displacement relationship (displacement measured in either distance displaced or degrees rotated). If the mechanism substantially obeys Hooke's law, this means that audio signal will be reproduced more accurately.

Preferably conducting wires connecting to the motor coil are attached to the surface of the middle section of the torsion bar. Preferably the wires are attached close to an axis running parallel to the torsion bar and about which the torsion bar rotates during normal operation of the transducer.

Biasing Mechanism Variations

As described with regards to embodiment E, a mechanical biasing mechanism provides advantages with respect to the aims of a biasing mechanism, preferably providing a substantial force to one or more hinge joints, applied with substantial compliance, biasing one or more hinge elements to one or more contact members, while allowing a substantially free rotational motion between respective pairs of hinge elements and contact members.

There are many types and configurations of mechanical biasing mechanisms. In one form, the biasing mechanism comprises a resilient element, part or component which biases or urges the hinge element towards the contact surface. The resilient element could be a pre-tensioned resilient member such as a spring member located at each end of the hinge element to bias or urge the diaphragm towards the contact surface, as described in embodiment E, or an elastomer with a low Young's modulus such as silicon rubber, or natural rubber, or viscoelastic urethane Polymer® configured to be used in either tension (e.g. a stretched latex rubber band) or in compression (e.g. a squashed block of rubber). Other kinds of springs including needle springs, torsional springs, coiled compression springs, and coiled tension springs may also be effective. These springs are preferably made from a material with high yield stress such as steel or titanium.

In another configuration the biasing mechanism comprises a metal flat spring (in a flexed state) that has one end attached to the transducer base structure, the other end is connected to one end of an intermediate component consisting of a ligament and the other end of the ligament is connected to the diaphragm assembly. For such a configuration, it would be preferable to use a multi strand ligament of high tensile modulus (e.g. higher than 10 GPa) such as a liquid crystal polymer fibre such as Vectran™ or an ultra-high molecular weight polyethylene fibre such as Spectra™.

In some configurations the biasing mechanism may comprise a first magnetic element that contacts or is rigidly connected to the hinge element, and also a second magnetic element, wherein the magnetic forces between the first and the second magnetic elements biases or urges the hinge element towards the contact surface so as to maintain the consistent physical contact between the hinge element and the contact surface in use. The first magnetic element may be a ferromagnetic fluid. The first magnetic element may be a ferromagnetic fluid located near an end of the diaphragm body. The second magnetic element ay be a permanent magnet or an electromagnet. Alternatively the second magnetic element may be a ferromagnetic steel part that is coupled to or embedded in the contact surface of the contact member. Preferably, the contact member is located between the first and the second magnetic elements.

It should be apparent to those knowledgeable in the art that a wide range of other possible configurations of biasing mechanism that may perform an equivalent or similar function consistent with the principles outlined herein.

As mentioned, the biasing mechanism provides a degree of compliance when applying a biasing force between the hinge element and the contact member. The structure connecting the hinge element to the diaphragm assembly, on the other hand, should preferably be rigid and non-compliant. For this reason, it is preferable that the biasing mechanism is a structure that is separate from or at least operates separately from the structure or mechanism that connects the hinge element to the diaphragm assembly. It should be noted that it is possible for the biasing mechanism to operate separately from the structure or mechanism connecting the hinge element to the diaphragm assembly, yet still be integral with the structure or mechanism connecting the hinge element to the diaphragm assembly. This is explained further in relation to the hinge system of the embodiment S audio transducer for example.

The biasing mechanism of the hinge system described above in relation to the embodiment A audio transducer may therefore be replaced by any one of these variations without departing from the scope of the invention.

Diaphragm Assembly

Although the above described hinge system may be utilised with any form of diaphragm assembly, it is preferred that a diaphragm assembly incorporating any one of the diaphragm structures defined under configurations R1-R11 in section 2 of this specification is used. The diaphragm assembly A101 comprises a substantially thick and rigid diaphragm employing a rigid approach to resonance control (as defined for the configuration R1-R4 diaphragm structures of section 2.2 or the diaphragm structures of the R5-R9 audio transducer configurations of sections 2.3 and 2.4 for example). Given that hinge systems according to the present invention has the advantage of minimising translational compliance across the contact surfaces that leads to diaphragm breakup, combining such hinge mechanisms with a rigid diaphragm construction will often compound the benefit.

The above described hinge system is therefore preferably incorporated in an audio transducer having a rigid diaphragm structure as described in relation to the configuration R1 diaphragm structure of this invention for example. Features and aspects of the configuration R1 diaphragm structure of this audio transducer example are described in detail in section 2.2 of this specification, which is hereby incorporated by reference. Only a brief description of this diaphragm structure will be given below for the sake of conciseness.

Referring to FIGS. 1A-1F and 2A-2F, the audio transducer incorporating the above described decoupling system further comprises a diaphragm structure A1300 of configuration R1 comprising a sandwich diaphragm construction. This diaphragm structure A1300 consists of a substantially lightweight core/diaphragm body A208 and outer normal stress reinforcement A206/A207 coupled to the diaphragm body adjacent at least one of the major faces A214/A215 of the diaphragm body for resisting compression-tension stresses experienced at or adjacent the face of the body during operation. The normal stress reinforcement A206/A207 may be coupled external to the body and on at least one major face A214/A215 (as in the illustrated example), or alternatively within the body, directly adjacent and substantially proximal the at least one major face A214/A215 so to sufficiently resist compression-tension stresses during operation. The normal stress reinforcement comprises a reinforcement member A206/A207 on each of the opposing, major front and rear faces A214/A215 of the diaphragm body A208 for resisting compression-tension stresses experienced by the body during operation.

The diaphragm structure A1300 further comprises at least one inner reinforcement member A209 embedded within the core, and oriented at an angle relative to at least one of the major faces A214/A215 for resisting and/or substantially mitigating shear deformation experienced by the body during operation. The inner reinforcement member(s) A209 is/are preferably attached to one or more of the outer normal stress reinforcement member(s) A206/A207 (preferably on both sides—i.e. at each major face). The inner reinforcement member(s) acts to resist and/or mitigate shear deformation experienced by the body during operation. There are preferably a plurality of inner reinforcement members A209 distributed within the core of the diaphragm body.

The core A208 is formed from a material that comprises an interconnected structure that varies in three dimensions. The core material is preferably a foam or an ordered three-dimensional lattice structured material. The core material may comprise a composite material. Preferably the core material is expanded polystyrene foam.

Preferably the diaphragm body thickness is greater than 15% of its length, or more preferably 20% of its length, in order that the geometry is sufficiently robust to maintain substantially rigid behavior over a wide bandwidth. Alternatively or in addition the diaphragm body comprises a maximum thickness that is greater than 11%, or more preferably greater than 14% of a greatest dimension (such as the diagonal length across the body).

In some embodiments the inner stress reinforcement of the diaphragm structure of this exemplary transducer may be eliminated. However, it is preferred that there is inner stress reinforcement. In this preferred configuration, the inner reinforcement addresses diaphragm shear deformation, and the hinge system provides a high degree of support against translational displacements that might otherwise result in whole-diaphragm breakup resonance modes. The hinge system furthermore provides high diaphragm excursion and a low fundamental diaphragm resonance frequency.

Referring to FIGS. 2A-2I, one end of the diaphragm A101, the thicker end, has a force generation component attached thereto. The diaphragm structure A1300 coupled to the force generation component forms a diaphragm assembly. In this embodiment, a coil winding A109 is wound into a roughly rectangular shape consisting of two long sides A204 and two short sides A205. The coil winding is made from enamel coated copper wire held together with epoxy resin. This is wound around a spacer A110 made from plastic reinforced carbon fibre, having a Young's modulus of approximately 200 GPa, although an alternative material such as epoxy impregnated paper would suffice. The spacer is of a profile complementary to the thicker end of the diaphragm structure A1300 to thereby extend about or adjacent a peripheral edge of the thick end of the diaphragm structure, in an assembled state of the audio transducer/diaphragm assembly. The spacer A110 is attached/fixedly coupled to the pivot shaft A111. The combination of these three components located at the base/thick end of the diaphragm body A208 forms a rigid diaphragm base structure of the diaphragm assembly having a substantially compact and robust geometry, creating a solid and resonance-resistant platform to which the more lightweight wedge part of the diaphragm assembly is rigidly attached.

3.2.3 Embodiment S & T

Two further embodiments of rotational action audio transducers of the invention will now be described having a hinge system for pivotally coupling a diaphragm structure to a base structure and designed in accordance with the principles of the invention will now be described. In particular, the biasing mechanism associated with these hinging systems will be described in detail. Other components will not be described in detail for the sake of conciseness. However it will be appreciated that the remaining components of the transducer, including the base structure, the diaphragm assembly, and the excitation mechanism can be of any one of the previously described audio transducer constructions, or even a different construction as would be apparent to those skilled in the art. In other words, the hinge systems described for the embodiment S or T audio transducers may be incorporated in any one of the audio transducers described in relation to embodiments A, B, D, E, K, S, T, W, X and Y.

The following embodiments exemplify biasing mechanisms designed in accordance with the principles outlined above. In particular, the biasing mechanism or mechanism of the following embodiments is constructed such that it forces the hinge element of the hinge system against the contact member to maintain consistent physical contact during operation, in a manner that minimises translational displacement in the planes of the contact surfaces at the contact region (such as sliding, but not rolling, of the contact surfaces relative to one another). Furthermore, the biasing mechanism or mechanism comprise a degree of compliance in a lateral direction with respect to the contact surfaces to allow a relative reduction in frictional contact force between the surfaces during operation when necessary.

3.2.3a Background

Hinge joints based on rolling or pivoting elements offer potential for high diaphragm excursion and reasonably low compliance in rotational action loudspeakers as mentioned above.

Standard ball bearing race hinges are a somewhat standard mechanism used in most prior art rotational action audio transducers. This hinge design is susceptible to high rotational resistance and/or rattling of balls. These issues may be exacerbated by wear, corrosion and the introduction of foreign material such as dust. Manufacturing tolerances must be high which results in increased cost.

If a gap opens up between the (once) contacting surfaces, either by parts wearing, inaccuracy of parts during manufacture, or temperature fluctuations then this can allow parts to rattle and/or break-up frequencies to appear due to restraint not being able to be provided to the diaphragm. The mechanism can also be prone to becoming slightly jammed in situations such as when 1) the bearing is exposed to dust (which can be created as parts wear during operation), 2) the parts have manufacturing inaccuracies or 3) when temperature fluctuations cause dimensional changes. All of these problems can generate unwanted noise, and create a non-linear response resulting in poor sound quality.

When used with a diaphragm of very small size, for example a personal audio headphone or earbud loudspeaker driver, these kinds of problems become even more problematic because of the need in these kinds of applications for a low fundamental frequency (Wn) and the additional challenges of achieving this with a diaphragm that is small and of low mass, as well as the correspondingly smaller manufacturing tolerances required.

Some existing rolling element bearings (e.g. ball bearings) include spring elements in the construction that apply preload in a compliant manner. Many standard pre-load bearing types are not well suited to audio transducer applications, although they could still be utilised.

Referring to FIGS. 75A-75E a standard prior art ball bearing V101 incorporating a compliantly applied pre-load is shown. The bearing V101 comprises an outer shell V102 and having housed therein a pair of bearing elements V106*a* and V106*b*, each having a series of balls V112, accommodated and rollable between an annular outer race V109 and an annular inner race V110. A central shaft V103 extends through the annular inner races V110 of the bearings. The mechanism can form a hinge between two components by coupling one component to the shaft and the other component to the shell/sheath V102. Preload is applied to the mechanism via spring-loaded washers V108*b* and V108*a* located between the shell/sheath V102 and the outer race V109*a* of one of the bearings. The spring loaded washers cause outer race V109*a* to slide towards the right hand side relative to outer sheath V102 which, because the profile of outer race V109*a* is curved, pushes contacting rolling elements towards the centre axis of the bearing thereby compliantly loading the right hand side bearing race V106*a*. There is also a reaction force side causing the outer race at the left hand side V109*b* to be pushed towards the left which, in an equivalent manner, compliantly loads the left hand side bearing element V106*b*. Note that this happens despite the fact that left hand side outer race V106*b* is not adjacent a spring.

If a diaphragm and force transducing component were to be mounted to bearing V101 to form a rotational action diaphragm assembly this would provide benefits over prior art audio transducers in terms of that the compliant loading of rolling elements would result in reduced and more consistent rolling resistance, all else being equal, which could potentially facilitate deeper bass with less distortion, for example self-noise generation may be reduced. An audio transducer embodiment of the invention may include such a bearing V101 for hingedly coupling the diaphragm assembly to the base structure for example.

However, the right hand side set of rolling elements V112*a* within bearing V101 are not optimal for high-frequency performance in a loudspeaker, as there is no rigid contact between outer race V109*a* and the outer sheath V102 against which it can slide. Instead there is a small air gap V113 where there is minimal contact between V109*a* and V102 (to allow the race V109*a* to slide relative to the sheath V102). This means that there is a discontinuity in the pathway by which loads are transmitted from the shaft V103 to the outer sheath V102, and this discontinuity introduces translational unwanted compliance in the hinge assembly (not the biasing mechanism) that is effectively between the diaphragm structure or assembly and the hinge element of the hinge assembly, indirections perpendicular to the axis of rotation. This unwanted compliance in the hinge assembly may result in diaphragm breakup or other forms of resonance during operation. As well as introducing compliance, this sliding contact also introduces a possibility of rattling. On the other hand, the hinge systems of the present invention, such as that described in relation to embodiment A for example, have relatively very low to zero compliance between the diaphragm assembly and the hinge element.

Another solution that solves the discontinuity issue would be to use two or more of bearing V101, for example one could be located at each end of one side of a hinge-action diaphragm. Since the left-hand side of the bearing element V106*b* is capable of passing translational loads in a non-compliant manner, if two such bearing elements are employed then both sides of the diaphragm will be non-compliantly restrained thereby reducing the possibility for unwanted resonance. For clarity in regards to compliance and non-compliance, the overall goal is to provide a hinge assembly that is compliant in terms of rotations about one axis and non-compliant in terms of translations and other rotational axes, and this is achieved via a hinge system that comprises a combination of a compliant biasing mechanism and non-compliant rolling contacts. Meanwhile the advantage of reduced and consistent rolling resistance is retained, so low frequency performance is improved compared to comparable prior art speakers.

FIGS. 64A-66E and 67A-70B illustrate two simpler and more effective solutions which are less prone to rattling and which remove the requirement for a sliding surface and/or a liquid. These embodiments show alternative hinge systems that have been developed in accordance with the principles of design outlined in the section 3.2.1 of this specification.

3.2.3b Embodiment S

Referring to FIGS. 64A-64H, an alternative form of a rotational action audio transducer is shown having a diaphragm assembly S102 (shown in FIGS. 65A-65E) that is pivotally coupled to a transducer base structure S101 (shown in FIGS. 66A-66E) via a hinge system. The diaphragm assembly S102 comprises a diaphragm structure that is similar to a configuration R1-R4 structure as defined under section 2.2 of this specification. Furthermore, the transducer base structure S101 comprises a relatively thick and squat geometry as per the embodiment A audio transducer, with a permanent magnet S119 and outer pole pieces S103, defining a magnetic field of the excitation mechanism. When implemented in an audio device, the diaphragm structure may have an outer periphery that is at least partially, substantially or approximately entirely free from physical connection with a surrounding structure of the device as defined for any one of the configuration R5-R7 audio transducers of section 2.3. The audio transducer may comprise a decoupling mounting system as described for the embodiment A audio transducer in section 4.2.1 of this specification. Otherwise any other decoupling mounting system designed in accordance with the principles outlined in section 4.3 may be employed.

The hinge system of this embodiment is based on a standard rolling element bearing (e.g. ball bearing) construction, except that half of the original number of (typically eight or more) balls are removed so that there are only four or less balls in each sub bearing/bearing element. Preferably a cage made from a plastics material S118 maintains circumferential ball separation as plastics low mass and inherent damping mean that it is less susceptible to rattling, however other cage designs will also work.

Preferably the outer race S116 of each bearing element is thinner, in profile, than is typical in a rolling element of this radius. The outer race S116 is preferably pressed and also adhered into a preferably thin-walled aluminium tube S112. The tube S112 may alternatively be made from any relatively rigid material, for example carbon fibre reinforced plastic would also be suitable. Interference-fit rolling elements S117 are used, and the outer race S116 and tube S112 compliantly deform to accommodate these without the jamming and other problems associated with standard rolling element bearings.

The fact that there are less rolling elements S117 in each bearing element means that the span or distance, between rolling elements S117, of the outer race and tube, when viewed from the side such as can be seen in FIG. 64G, is increased compared to the case of typical rolling element bearings, and this, in conjunction with the thin outer race S116 and tube S112, means that localised lateral compliance, in the immediate vicinity of each of the bearings element S117 (which in this case for part of the hinge system biasing mechanism), is greater than is typical in a typical rolling element bearing.

Note that although there may be lateral compliance inherent in the outer race S116 and its supporting tube S112 localised in the immediate vicinity of each ball, the overall translation compliance (other than lateral compliance) of the hinge system is low in terms of transmission of radial loads between the transducer base structure S101 and the diaphragm assembly S102. This is because overall compliance of the hinge system depends on the overall compliance/deflection of the tube relative to the transducer base structure, as opposed to depending on the compliance in the localised compliance/deflection in the immediate vicinity of a particular ball.

This means that, again, the advantage of reduced and consistent rolling resistance is retained due to the lateral translational compliance in the localised region of contact between each ball and the outer race, yet also, overall translational compliance in terms of translation of the entire diaphragm S102 relative to the base structure S103 is relatively low, because localised lateral deformation of the outer race in response to pressure from a particular ball does not result in a proportional compliance facilitating translation of the entire diaphragm. This low overall translational compliance in the hinge mechanism facilitates high-frequency extension with reduced susceptibility to unwanted resonance/diaphragm breakup.

In this case the property of reduced and/or more consistent rotational friction in the hinge facilitates use of larger radius bearings than would otherwise be possible all else being equal. This in turn facilitates support of a large diameter hollow shaft S112, which can house a stationary steel shaft S104/S113 that doubles as an inner pole piece and which is thick enough to remain resonance-free over a wide bandwidth. Variations on this design are possible, for example if smaller diameter rolling element bearings are used this will reduce rotational friction, thereby improving low frequency performance.

This design also removes the possibility of over-constraint of the rolling elements S117 whereby some are loaded while others are not and therefore may be free to rattle.

In this embodiment, the biasing mechanism, including the outer race S116 and supporting tube S112, operates separately from the structure or mechanism, which in this case is collectively all 4 balls S117 outer race S116 and tube S112, that supports the diaphragm assembly against translations with respect to the transducer base structure, but it is an integral part of the same structure. It should be noted that it is possible for the biasing mechanism to operate separately from the structure or mechanism connecting the hinge element to the diaphragm assembly, yet still be integral with the structure or mechanism connecting the hinge element to the diaphragm assembly.

3.2.3c Embodiment T

Referring to FIGS. 67A-67H, a further embodiment of a rotational action audio transducer T of the invention is shown comprising a diaphragm assembly T102 (shown in FIGS. 68A-68E) that is rotatably coupled to a transducer base structure T101 (shown in FIGS. 69A-69E) via a hinge system incorporating a compliant biasing mechanism. The diaphragm assembly T102 comprises a diaphragm structure that is similar to a configuration R1-R4 structure as defined under section 2.2 of this specification. Furthermore, the transducer base structure T101 comprises a relatively thick and squat geometry as per the embodiment A audio transducer, with a permanent magnet T119 and outer pole pieces T103, defining a magnetic field of the excitation mechanism. When implemented in an audio device, the diaphragm structure may have an outer periphery that is at least partially, substantially or approximately entirely free from physical connection with a surrounding structure of the device as defined for any one of the configuration R5-R7 audio transducers of section 2.3. The audio transducer may comprise a decoupling mounting system as described for the embodiment A audio transducer in section 4.2.1 of this specification. Otherwise any other decoupling mounting system designed in accordance with the principles outlined in section 4.3 may be employed.

The hinge system is an adaptation of the bearing in FIGS. 75A-75E, where compliance is introduced in a manner that avoids the problematic sliding contact between the outer race V109*a* and the casing V102. Instead, bearing preload is applied via compliance introduced within the diaphragm assembly T102, and this compliance is introduced in a manner such that this does not result in undue diaphragm breakup resonance. In this case the diaphragm is supported by two rolling element bearing assemblies T110*a* and T110*b*. Compliance is inherent in a number of flat springs T123 which make up a leaf spring bush component T122 located adjacent to rolling element bearing assembly T110*b*. The springs T123 are oriented in a plane perpendicular to the axis of rotation T127 in order that they can transmit force compliantly in the axial direction while transmitting force non-compliantly along their length, i.e. in the radial direction.

As with embodiments V and S the compliance introduced, in this case via flat springs T123, results in reduced and more consistent rolling resistance. In this case rolling elements T117 are located at a smaller radius relative to the radius of the coil T111, compared to that of embodiment S, and this results in further reduced rolling resistance and improved low frequency extension, as well as in further reduced noise generation at low frequencies for configurations of equivalent coil radius.

The entire diaphragm is rigidly restrained against axial displacements via the other rolling element bearing assembly T110*a*, which does not have flat springs adjacent. Axial loads are transmitted to the diaphragm via component T124 which, when rigidly adhered to diaphragm base tube T112, forms a triangulated profile for this purpose, as can be seen in FIG. 67E.

3.2.5 Embodiment K

Referring to FIGS. 56G-56J, a further contact hinge system embodiment of the invention is shown in association with the embodiment K audio transducer. Other features of the embodiment K audio transducer are described in detail in section 5.2.2 of this specification. The following is just a description of the hinge system associated with this embodiment.

The hinge system is a contact hinge system constructed in accordance with the design principles and considerations described in section 3.2.1 of this specification. The hinge system comprises a hinge assembly having a pair of hinge joints on either side of the assembly. Each hinge joint comprises a contact member that provides a contact surface and a hinge element configured to abut and roll against the contact surface. Each hinge joint is configured to allow the hinge element to move relative to the contact member, while maintaining a consistent physical contact with the contact surface, and the hinge element is biased towards the contact surface.

A hinge element, in the form of a hinge shaft K108 is rigidly coupled on one side via a connector K117 to the diaphragm base frame K107. On an opposing side, the hinge shaft K108 is rollably or pivotally coupled to a contact members K138. As shown in FIG. 56I, in this embodiment, each contact member comprises a concavely curved contact surface K137 to enable the free side of the shaft K108 to roll thereagainst. The concave K137 surface comprises a larger curvature radius than that of shaft K108. Each contact member K138 is a base block of the transducer base structure assembly K118 base component K105 that extends laterally from the base structure assembly toward the diaphragm assembly. A pair of base blocks K138 extend from either side of the base component K105 to rollably or pivotally couple with either end of the shaft K108 thereby forming two separated hinge joints. The base blocks may extend into a corresponding recess formed at the base end of the diaphragm structure. The contact hinge joints are preferably closely associate with both the diaphragm structure and the transducer base structure.

Referring to FIGS. 56L-56M, the hinge shaft K108 is resiliently and/or compliantly held in place against the contact surfaces K137 of the base blocks K138 by a biasing mechanism of the hinge system. The biasing mechanism includes a substantially resilient member K110 in the form of a compression spring, and a contact pin K109. The spring K110 is rigidly coupled to the base structure K118 at one end and engages the contact pin K109 at the opposing end at a contact location K116. The resilient contact spring K110 is biased toward the contact pin K109 and is held at least slightly in compression in situ. In situ, the contact pin K109 is rigidly coupled to the diaphragm base frame K107 via a connector K117 and extends between the contact members K138 fixedly against a corresponding concavely curved surface of the connector K117. The contact pin K109 and corresponding biasing spring K110 are preferably located centrally between the hinge joints. This arrangement compliantly pulls the diaphragm base structure, including the base frame K107, the connector K117 and the hinge shaft K108 against the contact base blocks K138 of the hinge joints. In this manner, the shaft K108 contacts the curved surfaces K137 of base blocks K138 at two contact locations. The degree of compliance and/or resilience is as is described under section 3.2.2 of this specification.

The geometry of the hinge system is designed with the approximate rotational axis K119 (shown in FIG. 56B) of the transducer coinciding with the two locations of contact K114 between the diaphragm assembly K101 and the transducer base structure K118, and preferably also at the location of contact between the contact pin K109 and the contact spring K110. This configuration helps to minimise the restoring force generated by these components, and so helps reduce the fundamental resonance Wn of the transducer.

In some forms one of the hinge element or the contact member comprises a contact surface having one or more raised portions or projections configured to prevent the other of the hinge element or contact member from moving beyond the raised portion or projection when an external force is exhibited or applied to the audio transducer.

Depending upon the application it may also be useful to provide stoppers that prevent impacts to potentially fragile components such as the motor coil. These may be independent from stoppers acting on the contact surfaces.

In this embodiment the hinge element K108, comprises at least in part, a convex cross-sectional profile, when viewed in a plane perpendicular to the axis of rotation, such as in FIG. 56I, and a contact member K138, being base block protrusion of base component K105K, comprising a contact surface K137 that is substantially concave. This configuration contributes to the re-centering of the hinge mechanism in situations where the hinge element is forced to move away from the central, neutral region K137*a* of the contact surface. The concavely raised edge regions K137*b* or K137*c* of the contact surface that locate on either side of the central region, will cause the associated hinge element K108 to recentralize back towards the central region K137*a* in the event that the element is forced to move beyond its intended position. This feature is advantageous in the case of a minor impact, such as when a transducer is knocked or dropped and the contact points K114 slip, as the geometry described would prevent excess slippage that may potentially cause contact resulting in audible rattling distortion during operation of the device. Such a configuration can be applied to any one of the other contact hinge embodiments described herein, such as embodiment A, E, S or T.

Further refinements to this structure are preferable whereby during normal operation there are no locations where the convex surface of the hinge element K108, can contact the concave surface K137 in a place where the convex radius is larger than the concave radius, when viewed in cross-sectional profile in a plane perpendicular to the axis of rotation. This configuration substantially prevents an impact between surfaces that could, conceivably, repeat without causing centering, thereby generating an ongoing rattle distortion. Instead, as in Embodiment K which has a contact surface K137 with a larger radius than the hinge element K108 convex radius, centering can only be caused by a gradient at the contacting surfaces, which means that any distortion created by sliding on the gradient is necessarily associated with a correction in the centering location, thereby reducing the chance of any ongoing distortion. Such a configuration can be applied to any one of the other contact hinge embodiments described herein, such as embodiment A, E, S or T.

3.2.5 Embodiment E

Overview

Referring to FIGS. 34A-34M, 35A-35H, 36 and 37A-37C a further audio transducer embodiment of the invention, herein referred to as embodiment E, is shown comprising a diaphragm assembly E101 that is rotatably coupled to a transducer base structure E118 via a contact hinge system designed in accordance with the principles set out in section 3.2.1 of this specification. By way of summary the diaphragm assembly E101 comprises a diaphragm structure that is similar to a configuration R1-R4 structure as defined under section 2.2 of this specification. Furthermore, the transducer base structure E102 comprises a relatively thick and squat geometry as per the embodiment A audio transducer, with a permanent magnet E102 and outer pole pieces E103 and inner pole pieces E113, defining a magnetic field of the excitation mechanism. One or more coil windings E130/131 rigidly coupled to the diaphragm structure extend within the magnetic field to move the diaphragm assembly during operation. As shown in FIGS. 35A-35HE2, the diaphragm structure has an outer periphery that is at least partially, substantially or approximately entirely free from physical connection with a surrounding structure E201-E204 of the transducer as defined for any one of the configuration R5-R7 audio transducers of section 2.3. The audio transducer may comprise a decoupling mounting system as described for in section 4.2.2 of this specification. Otherwise any other decoupling mounting system designed in accordance with the principles outlined in section 4.3 may be employed.

Diaphragm Base Structure

Figure E1*h* shows a cross-section of the audio transducer, and the cross-section of the coil winding long sides E130 and E131 being curved at a radius centred on the axis of rotation E119, and overhung, so that as the diaphragm rotates, an angle of displacement is available before the coil winding long sides start to exit the region of the magnetic flux gaps between outer pole pieces E103 and E104, and the inner pole pieces E113. In this way a high degree of linearity of driving torque is achieved.

Figure E3*a* shows the diaphragm base frame E107 by itself, which comprises two side arc coil stiffeners E301, two stiffener triangles E302, a main base plate E303 extending the width of the diaphragm, an underside strut plate E304 also extending the width of the diaphragm, a topside strut plate E305 again extending the width of the diaphragm, a middle arc coil stiffener E306 and an underside base plate E307 extending the width of the diaphragm.

Coil windings E106 is attached to diaphragm base frame E107. Each coil winding short sides E129 are attached to each of the two side arc coil stiffeners E301. The coil winding long sides E130 and E131 are attached to the two side arc coil stiffeners E301 and also the middle arc coil stiffener E306. Coil winding long side E130 is attached to the edge of the topside strut plate E305.

The combination of all the regions of diaphragm base frame E107: side arc coil stiffeners E301, stiffener triangles E302, main base plate E303, underside strut plate E304, topside strut plate E305, middle arc coil stiffeners E306 and underside base plate E307, adhered to the coil windings E106 creates a diaphragm base structure that is substantially rigid, and does not resonate within the FRO. Although the mass of diaphragm base frame E107 and windings E106 is relatively high compared to other parts that of the diaphragm assembly E101, because the mass is located close to the axis of rotation E119, the rotational inertia is reduced.

The three coil stiffeners E301 and E306 each comprise a panel extending in a direction perpendicular to the axis of rotation and connecting the first long side E130 of the coil to the second long side E131 of the coil. Each side arc coil stiffener E301 is located close to and touching each of the short sides E129 of the coil E106 and extends from approximately the junction between the first long side E130 of the coil and the first short side E129, to approximately the junction between the second long side E131 of the coil and the first short side, and also extends in a direction perpendicular to the axis of rotation towards the other parts of the diaphragm base frame. If these diaphragm base frame parts are not made from the same piece of material (as in this embodiment, which is sintered as one part) then a suitable rigid method of connection should be employed, for example soldering, welding, or adhering using an adhesive such as epoxy resin or cyanoacrylate, taking care to ensure a reasonable size contact area between the parts to be glued is used.

Preferably the coil stiffening panels are made from a material have a Young's modulus higher than 8 GPa, or more preferably higher than 20 GPa.

The long sides E130 and E131 of the coil are not connected to a former, and instead they are sufficiently thick so as to be able to support themselves in regions between the coil stiffeners. A former could also be used.

Contact Hinge Assembly

The contact hinge assembly facilitates the diaphragm assembly E101 to rotate back and forth about an approximate axis of rotation E119 with respect to the transducer base structure E118 in response to an electrical audio signal played through coil windings E106 attached to the diaphragm assembly E101.

The hinge assembly comprises a pair of hinge joints located on either side of the diaphragm assembly and transducer base structure. Each hinge joint comprises a hinge element and a contact member. The diaphragm base frame E107 has two convexly curved (in cross-section) protrusions E125 located at either side of the diaphragm base frame (one of which is shown in cross-sectional detail views in FIGS. 34G and 34I), which form the hinge elements of the hinge joints. The transducer base structure E118 comprises a base block E105, wherein either side forms the contact members of the hinge joints. Each side of the base block E105 comprises a concavely curved contact surface E117, against which the associated hinge element E125 bears and rolls during operation. The contact assembly could be reversed so that the concave indentations are on the diaphragm side and the convex protrusions on the transducer base structure side, in alternative embodiments.

The hinge elements are formed from a material having a sufficiently high modulus to rigidly support the diaphragm against translational and rotational displacements (excluding the desired rotational mode) which might otherwise result in diaphragm break-up resonances.

At the region of contact with the contact base block E105, each hinge element E125 comprises a surface E114 with a radius that is substantially small relative to the diaphragm body length E126 as described in relation to embodiment A, in order to help facilitate a free movement and low diaphragm fundamental resonance frequency (Wn), but preferably not so small as to cause the contacting material to flex, affecting breakup performance.

During transportation, if the audio transducer has a knock or is dropped, or later, is subject to over-extended use (e.g. millions of cycles), it is possible that the hinge elements may shift from sitting in the middle of the contact surface of the base block. The contact surface comprises an increasing slope from the contact region, in all directions, such that if the hinge element shifts too far from its optimal location (for example due to a one-off impact event), it will eventually reach a slope sufficient to bias it back into the appropriate contact position. The sides of the contact surface of the contact block also comprise a gradual change in slope so that there is no possibility of impact that might create on-going rattle distortion. Note that such slips of the hinge element are one-off and rare occurrences and do not occur in the course of normal operation of the transducer.

The diaphragm is configured to rotate about an approximate axis E119 relative to the transducer base structure E118 via the hinge assembly. The coronal plane of the diaphragm body E123 ideally extends outwards from the axis of rotation E119 such that it displaces a large volume of air as it rotates.

Unlike the embodiment A audio transducer, the embodiment E audio transducer does not have ferromagnetic material embedded in the diaphragm assembly E101, so the magnet E102 and pole pieces do not exert a biasing force on the diaphragm assembly or hinge element to maintain contact between the hinge element and the contact member.

The hinge assembly of this embodiment comprises a biasing mechanism having a resilient member E110 that holds the hinge elements on the diaphragm base frame E107 against the contact members E117 in the transducer base structure E118. The resilient member E110 is an elongate member made from a substantially thin body. The middle part of the body connecting either resilient end is rigidly connected to the base block E105 by any suitable method and therefore does not flex. Either end of the resilient biasing member E110 are coupled to the either side of the diaphragm base frame respectively to bias the base block toward the protrusions/hinge element of the base frame. The biasing member applies a consistent biasing force to hold the contact surfaces of the hinge joints together during operation, but is sufficiently compliant to enable rotation of the diaphragm assembly about the axis of rotation during operation, and also to enable some lateral movement therebetween in certain circumstances (such as due to the existence of dust or manufacturing tolerances as explained under sections 3.2.1 and 3.2.2 of this specification).

FIG. 34I shows a lengthways cross-section of a resilient biasing member E110 on one side of the audio transducer. Each end of the biasing member extends off the side of the base block E105, and is bent (approximately orthogonally relative to the intermediate section), and extends approximately parallel to the side of the audio transducer until it surrounds a force application pin E109 of the diaphragm base frame E107. Each bent end of the biasing member E110 preferably has sufficient length to allow the end to be unhooked from its position, by flexing it sideways. When the diaphragm assembly is first assembled with the transducer base structure E118*a*, and the ends of the biasing member E110 are hooked onto the base frame E107, the ends must be suitably pre-tensioned so that once hooked in place, they provide the required contact force (the size of which and reasons for are outlined in section 3.2.1 for example).

FIG. 34E shows a side view of one end of the resilient biasing member E110 hooked over the force application pin E109. An approximately square hole can be seen. The edge of the hole that contacts the force application pin E109 at the force application location E116 is substantially flat. The direction that the force is applied is substantially perpendicular to that flat edge and towards the force application pin E109. This direction was chosen to be substantially perpendicular to the plane tangent to the convexly curved surface of the hinge element at the contact region E114 on each side. In this manner a combination of forces are not applied to the diaphragm assembly that act to unbalance it with respect to the transducer base structure E118. The force application pin location E116 coincides with the axis of rotation E119. The positioning of the axis defined by the two force application locations E116, relative to the axis of rotation E119, reduces the resonant frequency (Wn) and provides a restoring force to center the diaphragm to its equilibrium position. For example, if the axis defined by the force application location E116 is located offset from the axis of rotation E119 towards the diaphragm side (which is to the left with respect to FIG. 34E), then as the diaphragm rotates it will become unstable and flick towards one side. If the axis defined by the force application location E116 is located offset from the axis of rotation E119 towards the base structure side (which is to the right with respect to FIG. 34E) then the force will act to center the diaphragm at an equilibrium rest position.

The two hinge joint protrusions/hinge elements E125 are located at a reasonable distance apart, with respect to the diaphragm body width E128, with one on one side of the sagittal plane of the diaphragm body E120, close to the maximum width of the diaphragm body and another protrusion E125 similarly spaced on the other side. By spacing the contact hinge joints suitably apart, the combination are able to provide improved rigidity and support to the diaphragm assembly E101 with respect to rotational modes of the diaphragm that are not the fundamental rotational mode of the diaphragm (Wn). There are two such rotational modes, both having axes of rotation substantially perpendicular to the fundamental axis of rotation E119 of the diaphragm, and both substantially perpendicular to each other. These can be identified using a finite element analysis of a computer model of this transducer, similar to the analysis conducted on embodiment A within this specification.

In this embodiment, the configuration of the hinge system suspends the diaphragm assembly at an angle relative to the transducer base structure to provide a more compact transducer assembly. In other words, in an assembled state, a longitudinal axis of the base structure is oriented at an angle relative to a longitudinal axis of the diaphragm assembly, in the diaphragm assembly's neutral position/state. This angle is preferably obtuse, but it may be orthogonal or even acute in alternative configurations.

Transducer Base Structure

The transducer base structure E118 comprises the base block E105, outer pole pieces E103 and E104, magnet E102, and inner pole pieces E113. These transducer base structure parts are all adhered via an adhesion agent such as epoxy resin or otherwise rigidly connected to one another. The magnet E102 is magnetised such that the North Pole is situated on the face connected to outer pole piece E103, and the South Pole is on the face connected to outer pole piece E104. This may be the other way around in alternative embodiments.

A magnetic circuit is formed by the magnet E102, outer pole pieces E103 and E104 and the two inner pole pieces E113. Flux is concentrated in the small air gaps between outer pole pieces E103 and E104 and inner pole pieces E113. The direction of the flux in the gaps between outer pole piece E103 and inner pole pieces E113 is overall, approximately towards the axis of rotation E119. The direction of the flux in the gaps between inner pole pieces E113 and outer pole piece E104 and is overall, approximately away from the axis of rotation E119. The coil windings E106 which may be wound from enamel coated copper wire in an approximately rectangular shape, with two long sides E130 and E131 and two short sides E129 as described above. Long side E130 is located approximately in the small air gap between outer pole piece E103 and inner pole pieces E113, and the other long side E131 is located in the small air gap between outer pole piece E104 and inner pole pieces E113. During operation, as an electrical audio signal is played through the coil windings, torque is exerted by both coil winding long sides E130 and E131 in the same direction to cause the diaphragm assembly to oscillate. The coil winding E106 is wound thick enough (and adhered together with an adhesive such as epoxy) to be relatively rigid, and push unwanted resonant modes up beyond the FRO. It is preferably thick enough to not require a coil former, and this means that the magnetic flux gaps are able to be made smaller (increasing flux density and audio transducer efficiency) for a given coil winding thickness and given clearance gap in between the coil winding long sides E130 and E131 and pole pieces E103, E104 and E113.

Diaphragm Structure

The diaphragm assembly is configured to rotate about an approximate axis E119 relative to the transducer base structure E118. The diaphragm body thickness E127 is substantially thick relative to the length of the diaphragm body length. For example the maximum thickness is at least 15% of the length, or more preferably at least 20% of the length. This thickness provides the structure with improved rigidity helping to push resonant modes up out of the range of operation. The geometry of the diaphragm is largely planar. The coronal plane of the diaphragm body E123 ideally extends outwards from the axis of rotation E119 such that it displaces a large volume of air as it rotates. It is tapered, as shown in FIG. 37C at an angle E402 of about 15 degrees, to significantly reduce its rotational inertia, providing improved efficiency and breakup performance. Preferably the diaphragm body tapers away from the centre of mass E401 of the diaphragm assembly E101.

The diaphragm comprises a plurality inner reinforcement members E121 laminated in between wedges of low density core E120 and alongside a plurality of angled angle tabs E122. These parts are attached using an adhesion agent, for example epoxy adhesive, a synthetic rubber-based adhesive or latex-based contact adhesive. Once adhered, the base face end of this wedge laminate (including faces of four angle tabs E122) is then attached to the main base plate E303. Normal stress reinforcement comprising multiple thin parallel struts E112 are attached to a major face E132 of the body, preferably in alignment with the multiple inner reinforcement members E121, and connecting to the topside strut plate E305. Additional normal stress reinforcement comprising two diagonal struts E111 are attached in a cross configuration, across the same major face E132 of the body and over the top of the parallel struts E112, and also connecting to the topside strut plate E305. On the other major face E132 of the body, struts E111 and E112 are also attached in a similar manner, except connecting to the underside base plate E307. The struts are preferably made from an ultra-high-modulus carbon fibre, for example Mitsubishi Dialead, having a Young's modulus of about 900 Gpa (without the matrix binder). These parts are attached to each other using an adhesion agent, for example epoxy adhesive. Other connection methods however are also envisaged as previously described in relation to other embodiments.

The use of high modulus struts E111 and E112, connected on the outside of a thick, low density core E120 made from EPS foam, for example, provides a beneficial composite structure in terms of diaphragm stiffness, again due to the thick geometry maximising the second moment of area advantage that the struts can provide.

During operation, the diaphragm body E120 displaces air as it rotates, and as such, it is required to be significantly non-porous. EPS foam is a preferable material due to its reasonably high specific modulus and also because it has a low density of 16 kg/m^3. The EPS material characteristics help to facilitate improved diaphragm breakup compared to conventional rotational action audio transducers. The stiffness performance allows the core E120 to provide some support to the struts E111 and E112 which may be so thin that without the core E120, they would suffer localised transverse resonances at frequencies within the FRO. The laminated inner reinforcement members E121 provide improved diaphragm shear stiffness. The orientation of the plane of each inner reinforcement member is preferably approximately parallel to the direction the diaphragm moves and also approximately parallel to the sagittal plane of the diaphragm body E120. For the inner reinforcement members E121 to adequately aid the shear stiffness of the diaphragm body, reasonably rigid connections are preferably made to the parallel struts E112 laid on either side of each inner reinforcement member. Also, at the base end of the diaphragm the connection from the inner reinforcement members E121 to the main base plate E303 needs to be rigid, and to aid this rigidity, angle tabs E122 are used. Each tab E122 has a large adhesive surface area for connecting to each inner reinforcement member E121, and shear forces are transferred around the corner of the tab, the other side of which is another large adhesive surface area which is connected to the main base plate E303.

Diaphragm Assembly Housing

FIGS. 35A-35H show the embodiment E audio transducer mounted to a diaphragm housing, comprising a surround E201, a main grille E202, two side stiffeners E203 and two 304 decoupling pins E208 of the decoupling described in section 4.2.2.

The surround E201 is attached to base block E105, outer pole piece E103, and magnet E102, and it is assembled such that there is a small air gap E206 of between approximately 0.1 mm to 1 mm between the periphery of the diaphragm structure and the inner walls of the surround E201.

The cross-sectional view of FIG. 35E shows that the surround E201 has a curved surface at the small air gap E205 at the tip of the diaphragm. The centre of radius of this curve is located approximately at the axis of rotation E119 of the audio transducer, such that as the diaphragm rotates, the small air gap E205 is maintained at the tip of the diaphragm. Air gaps E206 and E205 are required to be sufficiently small to prevent significant amounts of air from passing through due to the pressure differential that exists during normal operation.

Surround E201 has walls that act as a barrier or baffle, reducing cancellation of radiation from the front of the diaphragm by anti-phase radiation from the rear. Note that, depending upon the application, a transducer housing (or other baffle components) may also be required to further reduce cancelation of frontward and rearward sound radiation.

The main grille E202 and two side stiffeners E203 are attached using a suitable method, such as via an adhesive agent (for example epoxy adhesive) to the surround E201. Because these diaphragm housing components are all rigidly attached to the transducer base structure the combined structure, being the base structure assembly, is rigid enough for adverse resonance modes to be above the FRO. To achieve this, the overall geometry of the combined structure is compact and squat meaning no dimension is significantly larger than another. Also, the region of the diaphragm housing that extends around the diaphragm is stiffened by the use of triangulated aluminium struts incorporated into the main grille E202 and side stiffeners E203 which form a stiff cage around the plastic surround E201. Triangulated structures have lower mass compared to structures that are not, and as the stiffness is not reduced as much, this means that a triangulated structure will in general perform better in terms of adverse resonances.

The diaphragm housing also incorporates stoppers which do not connect with the diaphragm assembly except in the case of an unusual event such as a drop, or a bump as a means of preventing damage from occurring to more fragile parts of the diaphragm assembly. A cylindrical stopper block E108, which is part of the diaphragm base frame E107, protrudes out each side of the diaphragm assembly E101. After the transducer is mounted in the diaphragm housing, and after parts of the transducer base structure that are in contact with the diaphragm housing are connected, for example by the use of an adhesive such as epoxy, two stopper rings E207 are inserted into each side of the diaphragm housing surround E201. In an assembled state, a small gap E209 exits between each stopper ring E207 and each stopper block E108. The size of these gaps E209 are preferably small compared to the length of the diaphragm body E126 and also the size of the gaps around the perimeter edge of the diaphragm E205, E206. This is so that in the case of a drop, the stopper gaps close and the stopper components E207 and E108 connect before other parts of the diaphragm assembly E101 connect to something else, for example to the diaphragm housing surround E201. Once each stopper ring E207 has been installed, two plugs E204 made from plastic are inserted into the remaining hole on each side of the diaphragm housing. This is to help prevent an air flow route from areas of positive sound pressure on one side of the diaphragm to areas of negative sound pressure on the other side of the diaphragm. The stopper rings E207 and the plugs E204 made be connected to the diaphragm housing surround E201 and each other via and adhering agent such as epoxy.

In another configuration, the audio transducer of embodiment E does not comprise a diaphragm housing, and the audio transducer is accommodated in a transducer housing via a decoupling mounting system.

3.3 Flexible Hinge Systems

Prior art flexible hinge designs often suffer from a compromise whereby reducing the diaphragm fundamental frequency (Wn) and increasing diaphragm excursion, to extend low frequency performance, tends to increase translational compliance in at least one direction, thereby reducing the frequency of problematic diaphragm/hinge interaction resonance modes, which, in designs where minimisation of energy storage is a key design goal, compromises high frequency performance.

Hinge assemblies including flexible and resilient sections or elements, such as thin-walled sections or elements, including spring components for example, have the potential to facilitate an audio transducer design having low energy storage characteristics as measured in a waterfall/CSD plot, facilitating good audio reproduction as well as good volume excursion and bandwidth capability, if designed appropriately Reduction of translational compliance of the overall hinge assembly, preferably along three orthogonal axes, aids in achieving high performance rotational action audio transducers.

A flexure hinge system of the invention incorporating two or more flexible and resilient elements and/or sections will now be described in detail with reference to some examples. The elements and/or sections may form part of a single resilient component or may be separate.

The examples will be described with reference to an audio transducer comprising a diaphragm assembly, a transducer base structure and a flexure hinge system rigidly connected to both the diaphragm assembly and the transducer base structure. The diaphragm assembly is operatively supported by the flexure hinge system to enable pivotal movement of the diaphragm relative to the base structure during operation. The hinge system comprises at least two resilient hinge elements, which may be sections of a single member. The elements may be separate or coupled (integrally or separately). Both elements are rigidly coupled to the transducer base structure and to the diaphragm assembly and deform or flex in response to forces that are normal thereto to facilitate movements of the diaphragm assembly about the hinge assembly about the approximate axis of rotation. Each hinge element is closely associated to both the transducer base structure and the diaphragm, and comprises substantial translational rigidity to resist compression, tension and/or shear deformation along and across the element. At least one hinge element may be integrated with or form part of the diaphragm assembly and/or at least one hinge element may be integrated with or form part of the transducer base structure. As will be explained in further detail below, in some embodiments, each flexible hinge element of each hinge joint is substantially flexible with bending. Preferably, in these embodiments each hinge element is substantially rigid against torsion in situ. In alternative embodiments, each flexible hinge element of each hinge joint is substantially flexible in torsion. Preferably, in these embodiments each flexible hinge element is substantially rigid against bending in situ.

The flexure hinge systems described herein may be incorporated in any one of the rotational action audio transducer embodiments described in this specification, including for example the audio transducers of embodiments A, D, E, K, S, T W and X, and the invention is not intended to be limited to their application in the embodiments described below.

As will be described in some examples, the resilient sections may flex by bending and in some other examples the resilient sections flex by torsion. In other configurations, the resilient sections may flex via bending and torsion.

3.3.1 Embodiment B Audio Transducer

FIGS. 15A-15F show an example rotational action audio transducer of the invention (hereinafter referred to as the embodiment "B" audio transducer) including a diaphragm assembly B101 (shown in FIGS. 16A-16G) pivotally coupled to a transducer base structure B120 via an exemplary flexure hinge system. In this embodiment the flexure hinge system comprises a flexure hinge assembly B107 (shown in detail in FIGS. 17A-17D). The audio transducer in this example is a rotational action, full range headphone loudspeaker audio transducer, but it will be appreciated that the transducer may alternatively be any other loudspeaker design or an acoustoelectric transducer, such as a microphone. The diaphragm assembly B101 comprises a composite diaphragm of substantially low rotational inertia as described for example in relation to the configuration R1-R4 diaphragm structures, or as described in relation to the diaphragm structures of the configuration R5-R7 audio transducers. The hinge assembly B107 comprises at least one hinge joint that is rigidly coupled between the diaphragm assembly and the transducer base structure. In this embodiment the hinge assembly B107, comprises a first hinge joint B201 and a second hinge joint B203, that are both rigidly coupled to the transducer base structure B120 at one end and to the diaphragm assembly B101 at an opposing end. The flexure hinge assembly B107 facilitates rotational/pivotal movement/oscillation of the diaphragm assembly B101 about an approximate axis of rotation B116 with respect to the transducer base structure B120 in response to an electrical audio signal played through coil windings B106 attached to the diaphragm assembly. In this embodiment, the hinge assembly comprises a diaphragm base frame at one side/end of each hinge joint that forms part of the diaphragm assembly, and a base block at an opposing side/end of each hinge joint that forms part of the transducer base structure, in the assembled state of the audio transducer. The hinge joints form the intermediary joints between the diaphragm assembly and the transducer base structure.

3.3.1a Hinge Assembly Overview

The hinge assembly B107, and in particular each hinge joint, is configured to be substantially stiff to resist forces of tension and or compression and or shear experienced within the planes of the associated hinge elements B201*a/b* and B203*a/b*. Because the hinge elements are angled relative to one-another this means that the diaphragm assembly overall is rigidly restrained against all translational and rotational displacements, except for rotational motion about the required axis of rotation of the hinge assembly. In particular, the stiffness of the hinge elements in compression, tension and shear, and the relative angles between the pair of hinge elements in each joint, means the diaphragm assembly is sufficiently and substantially resistant/stiff toward translational motion/displacement at each hinge joint along at least two, but preferably all three substantially orthogonal axes during operation. The wide separation of the two hinge joints, as well as the relative angles of the elements, implies that the diaphragm assembly is also sufficiently and substantially resistant/stiff toward rotational motion/displacement about axes perpendicular to the required axis of rotation of the hinge assembly during operation. Each hinge element is preferably substantially flexible about the axis of rotation of the assembly and therefore the hinge assembly is also flexible and enables rotation about this axis.

It should be noted that in some configurations, especially as the diaphragm undergoes a very large excursion, the hinge assembly B107 configuration does not necessarily constrict the movement of the diaphragm to a purely rotational motion about a single axis of rotation, however the motion can be considered approximately rotational about an approximate axis of rotation B116.

FIGS. 16A-16G show the hinge assembly B107 connected to the diaphragm assembly B101. In this embodiment, the hinge assembly comprises the diaphragm base frame to which the coil windings B106 of transducer's excitation mechanism are attached. The transducer base structure has been removed from these figures for clarity. As shown in FIGS. 17A-17D the hinge assembly B107 comprises a substantially longitudinal diaphragm base frame (which is further described herein), and a pair of equivalent hinge joints, the first B201 consisting of element pairs B201$a$ and B201$b$ the second hinge joint B203 consisting of elements B203$a$ and B203$b$, extending laterally from either end of the base frame and configured to locate at either side of the diaphragm assembly and transducer base structure in situ. The diaphragm base frame extends along a substantial portion of the width at the thicker base end of the diaphragm body and is configured to couple the diaphragm body and the coil winding B106 in situ. The structure of the base frame will be described in further detail below.

FIGS. 17A-17D show the flexible hinge assembly B107 of this example in detail. Each hinge joint B201 and B203 connects to a connection block B205/6206 that is configured to rigidly couple one side of the transducer base structure B120. The transducer base structure B120 may comprise a complementary recess on a surface of the structure to aid with coupling of the parts. The hinge assembly B107 comprises pairs of flexible hinge elements B201$a$/B201$b$ and B203$a$/B203$b$. The hinge elements of each hinge joint pair B201$a$/B201$b$ and B203$a$/B203$b$ are angled relative to one another. In this example the hinge elements B201$a$ and B201$b$ are substantially orthogonal relative to one another, and the hinge elements B203$a$ and B203$b$ are substantially orthogonal relative to one another. However, other relative angles are envisaged including an acute angle therebetween for each pair of hinge elements for example. Each hinge element is substantially flexible such that it is capable of flexing in response to forces that are substantially normal to the element and in response to a moment in the desired direction of the axis of rotation B116 of the diaphragm assembly. In this manner, the hinge elements enable rotational/pivotal movement and oscillation of the diaphragm assembly about the axis of rotation B116. The hinge assembly, overall, is preferably also resilient such that it is biased towards a neutral position, to thereby bias the diaphragm assembly toward a neutral position in situ and during operation of the transducer. Each element is capable of flexing in a manner that allows the diaphragm assembly to pivot either direction of the neutral position. In this example, each hinge element B201$a$, B201$b$, B203$a$ and B203$b$ is a substantially planar section of flexible and resilient material. As will be explained in further detail below, other shapes are possible and the invention is not intended to be limited this example.

3.3.1b Flexible Hinge Elements

Form, Dimensions and Material

For each hinge joint, at least one of each pair of flexible hinge elements (but preferably both) are sufficiently thin in this example, and/or have dimensions sufficient to allow flexing of the hinge element in response to forces normal to the element. This allows for a low fundamental frequency (Wn) of the diaphragm assembly B101 with respect to the transducer base structure B120. One or both flexible elements of each pair is formed from a substantially planar sheet or section of material, however it will be appreciated that other forms may be possible. Preferably each hinge element is relatively thin compared to a length of the element to facilitate rotational movement of the diaphragm about the axis of rotation, compared to their lengths. Each hinge element may comprise a substantially uniform thickness across at least a majority of its length and width.

In some configurations, one or each of the pair of hinge elements is a sufficiently thin sheet of material having a thickness, less than about ⅛ of the length of the sheet, or more preferably less than about $1/16^{th}$ of the length, or more preferably less than about $1/35^{th}$ of the length, or even more preferably less than about $1/50^{th}$ of the length, or most preferably less than about $1/70^{th}$ of the length. If the thickness is too thin, then the flexure may risk buckling in situations where a large force is applied, for example in a drop or bump scenario. For this reason, preferably each thin sheet of material is thicker than $1/500^{th}$ of its length.

In some configurations, the width of one or each hinge element is less than twice its length, or less than 1.5 times the length, or most preferably less than the length.

In some configurations, the thickness of one or each hinge element of each pair is less than about $1/8^{th}$ of its width or preferably less than about $1/16^{th}$ of the width, or more preferably less than about $1/24^{th}$ of the width, or even more preferably less than about $1/45^{th}$ of the width, or yet more preferably less than about $1/60^{th}$ of the width, or most preferably about $1/70^{th}$ of the width.

One or each flexible hinge element (both in this example) of each pair is made from a material that is substantially stiff in the plane of the material, for example a material having a substantially high Young's modulus, such as a metal or ceramic material, rather than from a soft, flexible material such as a typical plastics material or rubber. In this manner, the flexible hinge element is substantially resistant to tension and compression forces in the plane of the element. Preferably also the material is substantially resistant to shear loads experienced in the plane of the material. The flexible hinge element thus experiences zero to minimal deformation due to such forces in situ and during operation. At least one or both flexible hinge elements of each pair is oriented substantially parallel to the axis of rotation of the diaphragm assembly, so that the hinge assembly B107 is compliant in terms of diaphragm rotations and flexure of said hinge elements facilitates the desired direction of diaphragm rotation. Preferably one or both hinge elements of each pair is/are made from a material with a Young's modulus higher than 8 GPa, or more preferably higher than approximately 20 GPa.

In the preferred configuration of this example, each hinge element is made from a high tensile steel alloy or tungsten alloy or titanium alloy or an amorphous metal alloy such as "Liquidmetal" or "Vitreloy". In other forms, the hinge elements may be made from a composite material having a sufficiently high Young's modulus such as plastic reinforced carbon fibre.

In some configurations, the material from which the hinge elements are formed, when flexing during normal operation, is used in a range that the force vs displacement relationship (displacement measured in either distance displaced or degrees rotated) is linear, and obeys Hooke's law. This means that audio signal will be reproduced more accurately.

As mentioned, in this example each (or at least one) flexible hinge element in each pair is of an approximately or substantially planar profile, for example in a form of a substantially flat sheet or section of material. In other forms, one or more flexible hinge elements may be slightly bent along their length in a relaxed/neutral state, and become substantially planar as they flex during normal operation and/or when coupled to the hinge assembly in situ.

Preferably each hinge element of each hinge joint has average width or height dimensions, in terms of a cross-sections in a plane perpendicular to the axis of rotation, that are greater than 3 times, or more preferably greater than 5 times, or most preferably greater than 6 times the square root of the average cross-sectional area, as calculated along parts of the hinge element length that deform significantly during normal operation. This helps to provide the element with sufficient compliance in terms of rotations about the hinge axis.

Orientation

The hinge elements of each pair B201a/B201b for hinge joint B201 and B203a/B203b for hinge joint B203 are angled relative to one another and thereby oriented, in a substantially different plane. By virtue of their geometry, and as mentioned above, the hinge elements are comparatively stiff in terms of compressive/tensile and/or shear loadings, but are relatively compliant/flexible in terms of bending in response to substantially normal forces and in response to a moment in the direction of the axis of rotation B116. This means that the flexible hinge elements can effectively restrain the diaphragm, at their respective points of attachment to the diaphragm, in terms of translations in any direction parallel to, and which lie within, their respective planes.

The orientation of the hinge elements of each pair at an angle relative to one another such that they lie in substantially different planes means that if each hinge element can resist translations in its plane, the overall hinge assembly will carry strong resistance to pure translation of the diaphragm in every direction.

It may be possible to achieve suitable performance with the angle between the planes of the hinge elements of between about 20 and 160 degrees, or more preferably between about 30 and 150 degrees, or even more preferably between about 50 and 130 degrees, or yet more preferably between about 70 and 110 degrees, but it is most preferable for the angle therebetween to be approximately perpendicular/90 degrees, i.e. the pair of hinge elements, of each hinge joint, are angled substantially orthogonally relative to each other. In this embodiment, one flexible hinge element of each hinge joint extends significantly in a first direction that is substantially perpendicular to the axis of rotation.

For the hinge structure consisting of first hinge joint B201 with a pair of flexible hinge elements B201a and B201b, the axis of rotation B116 is approximately located at or is approximately collinear with the intersection of the planes occupied by each flexible hinge element, and/or at the intersection between the hinge elements. For the other hinge structure consisting of hinge joint B203 with flexible hinge elements B203a and B203b, the axis of rotation is also approximately located at the intersection of the planes occupied by these two flexible hinge elements. To ensure a low fundamental frequency (Wn) of the diaphragm, the alignment of the axes defined by each of the two hinge joints B201 and B203, on each side of the audio transducer are substantially co-linear. In this embodiment, each flexible hinge element B201a, B201b, B203a and B203b of the hinge assembly is sufficiently wide in the direction of said axis of rotation B116 to sufficiently resist tension/compression and shear forces within the plane of each flexible hinge ensuring that each of the two resulting hinge joint structures have a high degree of stiffness in 3-dimensions with respect to translational motion. Each hinge joint also provides a relatively high degree of rotational compliance about structures' common axis of rotation B116. The combination of the two hinge joints together provide a hinge assembly that operatively supports the diaphragm assembly with respect to the transducer base structure, allowing a relatively low fundamental frequency (Wn) and is sufficiently rigid in terms of all other rotational modes and all translational modes.

Location

Preferably, the diaphragm structure is in close proximity/closely associated with the hinge assembly, to thereby minimise the distance between the flexible hinge elements and the diaphragm structure and create a more rigid connection there between within the transducer's FRO that is less prone to flexing, adversely affecting the performance with regards to unwanted breakup resonance modes. For instance the diaphragm body or structure may be directly connected/directly adjacent the respective ends of the hinge elements. In other examples, the diaphragm body or structure may not be directly attached but the component there between comprises a dimension that enables the diaphragm body to remain in close association with the hinge elements.

Preferably the distance from the diaphragm body or structure to one or both of the flexible hinge elements is less than half the maximum distance of the diaphragm to the axis of rotation, or more preferably less than ⅓ the maximum distance of the diaphragm most distal outer periphery/terminal end to the axis of rotation, or more preferably less than ¼ the maximum distance of the diaphragm most distal outer periphery/terminal end to the axis of rotation. Similarly, the transducer base structure is in close proximity/closely associated with the hinge assembly, to thereby minimise the distance between the flexible hinge elements and the transducer base structure and create a more rigid connection there between within the transducer's FRO that is less prone to flexing, adversely affecting the performance with regards to unwanted breakup resonance modes. For instance the transducer base structure may be directly connected/directly adjacent the respective ends of the hinge elements. In other examples, the transducer base structure may not be directly attached but the component there between comprises a dimension that enables the transducer base structure to remain in close association with the hinge elements.

In a preferred implementation, the transducing mechanism force generation component, for example a motor coil B106, is attached directly to the diaphragm, as opposed to via a lever arm or hinge etc., in order to promote and facilitate single-degree-of-freedom behaviour of the audio transducer system.

The two hinge joints B201 and B203 are located at a reasonable distance apart, with respect to the diaphragm body width B215. The outer side of the first hinge joint B201 connecting to block B205 is located at plane B217 and the outer side of the second hinge joint B203 connecting to block B206 is located at plane B218. Preferably these planes B217 and B218 are parallel to, and located either side of, a central sagittal plane B119 of the diaphragm body B112 in an assembled form. Preferably at least part of one flexure hinge joint B201 is located outside of a plane B219 located a distance of 20% of the diaphragm body width B215 offset from the central sagittal plane B119 of the diaphragm body B112, and at least a part of at least one flexure hinge joint B203 is located outside of a plane B220 located a distance of 20% of the diaphragm body width B215 offset from the other side of the central sagittal plane. By spacing the flexure hinge joints suitably apart, or by having a sufficiently wide hinge joint in the case that there is only one, the hinge assembly provides additional rigidity and support to the diaphragm assembly B101 with respect to rotational modes of the diaphragm that are not the fundamental rotational mode of the diaphragm (Wn). There are usually two such rotational modes, both having axes of rotation usually being substantially perpendicular to the fundamental axis of rotation of the diaphragm B116, and both usually substantially perpendicular to each other. These can be identified using a finite element analysis of a computer model of this transducer, similar to the analysis conducted on embodiment A within this specification.

In this example, the pair of hinge joints are configured to locate adjacent the side edges of the diaphragm structure/assembly in situ. The pair of hinge joints B201 and B203 are preferably connected to the diaphragm structure at at least two widely spaced locations on the diaphragm structure, in comparison to the width B215 of the diaphragm body B112. If the hinge joints are connected at locations that are not widely spaced, then additional hinge elements, flexures or mechanisms are preferably incorporated such that connections are made at, at least two widely spaced locations to the diaphragm assembly. Likewise, a flexure hinge assembly comprising a pair of hinge joints, is preferably attached at, at least two widely spaced locations on the transducer base structure, in comparison to the width of the diaphragm body. If the flexure hinge assembly is attached a location (or locations) that are not widely spaced, then preferably additional hinge elements, flexures or mechanisms are preferably incorporated in conjunction such that connections are made at, at least two widely spaced locations to the transducer base structure. The hinge joints may be located at or proximal to the peripheral sides of the diaphragm structure or assembly, and/or at or proximal to the peripheral sides of the transducer base structure.

In this embodiment each hinge joint is located at either side of the diaphragm. Preferably a first hinge joint is located proximal to a first corner region of an end face of the diaphragm, and the second hinge joint is located proximal to a second opposing corner region of the end face, and wherein the hinge joints are substantially collinear. Preferably each hinge joint is located a distance from a central sagittal plane of the diaphragm that is at least 0.2 times of the width of the diaphragm body.

It will be appreciated that in some embodiments a single hinge joint comprising a pair of flexible hinge elements may extend across a substantially portion of the diaphragm structure or assembly such that it is rigidly attached at, at least two widely spaced locations on the diaphragm structure/assembly and/or on the transducer base structure.

Connection

Each hinge element B201*a*, B201*b*, B203*a* and B203*b* is rigidly connected to the diaphragm assembly B101 at one edge, and at an opposing edge rigidly connected to the transducer base structure B120. In this example, each pair of hinge elements is rigidly connected to the transducer base structure via connection blocks B205 and B206. These connections (e.g. between the hinge elements and the diaphragm base frame, between the hinge elements and the connecting blocks) may be made by an adhesive such as epoxy resin, or by welding, or by clamping using fasteners, or by a number of other methods including any combination thereof as is well known in the art of mechanical engineering. It is preferable, that the geometry that is used to connect both the diaphragm structure to the flexure hinge elements, and also the hinge elements to the transducer base structure are not long thin and slender (for example like a lever arm) in a lateral direction and are instead short, squat and perhaps triangulated (using truss type structures) in that direction. Preferably, the diaphragm is rigidly and operatively coupled to one or both of the hinge elements without a lever arm. For instance, in this embodiment, the diaphragm base frame is used to connect the diaphragm structure to the hinge elements. The base frame is substantially short and squat in at least the lateral direction (i.e. across the connection interface but not necessarily along the connection interface. Similarly the connection blocks connecting the hinge elements to the remainder of the transducer base structure are at least substantially short and squat in at least the lateral direction (across the connection interface). In other words, it is preferred that the hinge elements are closely associated to both the diaphragm structure and to the transducer base structure. For example, the hinge elements may be located directly adjacent the diaphragm structure and the transducer base structure. These types of geometry help prevent flex occurring in these areas that can contribute to breakup modes occurring within the FRO. The materials used for these structures should also be rigid, having a Young's modulus preferably greater than 8 GPa and more preferably greater than 20 Gpa.

Also, to facilitate a substantially rigid connection between each hinge joint and the diaphragm structure or body, the size of the connection is preferably sufficiently large relative to the size of the end face of the diaphragm structure or body (to which the joint is connected). Preferably at least one size dimension of the connection that is parallel to two orthogonal dimensions of the end face is sufficiently large. Preferably two orthogonal size dimensions of the connection are sufficiently large. For example, preferably the one or more hinge joints are connected to at least one surface or periphery of the diaphragm, and at least one overall size dimension of each connection, is greater than $1/6^{th}$, or more preferably is greater than $1/4^{th}$, or most preferably is greater than ½ of the corresponding dimension of the associated surface or periphery. For instance, the main plate B303 of the diaphragm base frame (that connects the hinge joints to the diaphragm) couples the end face of the diaphragm structure and comprises a height and width that is substantially similar to the height and width of the end face of the diaphragm structure. Also, the plate B304 of the diaphragm base frame couples a major face B121 of the diaphragm structure and comprises a width that is similar to the width of the major face, and a length that is greater than $1/16^{th}$ the length of the major face.

The use of adhesive at the termination of a substantially uniform flat hinge element may not be optimal under some circumstances in an audio transducer. Even when the hinge element is embedded in a slot, adhesive tends to form tiny cracks which, while they may not cause complete failure, generate creaking that may be mechanically amplified if coupled with a lightweight and poorly-damped diaphragm.

A hinge element may alternatively be clamped in a slot without use of adhesive and still achieve high excursion without failing, however this tends to result in creaking and noise generation also which, again, is mechanically amplified if coupled with a lightweight and poorly-damped diaphragm.

Therefore connecting the hinge elements via adhesive may be undesirable in some embodiments as it can act as a limitation on diaphragm excursion.

In an alternative configuration of the hinge assembly of the present invention, the first and second thin-walled flexible hinge elements of each hinge joint pair thicken and/or widen towards their terminal edges/boundaries B210/B211, where they connect to the diaphragm assembly/diaphragm base frame and B208/B209, where they connect to the connecting block/transducer base structure. The thickening and/or widening preferably involves no change in the steel/ceramic etc. material of the flexible hinge elements, i.e. it is all formed from a single uniform piece of material. Alternatively said thickening may be implemented via a strong bonding to another strong material, such as by welding or brazing.

The thickening and/or widening towards the terminal edges results in a reduction in the level of stress within the strong and rigid flexing components so that by the time stresses reach points of adhesion/clamping etc. at the diaphragm and transducer base structure they are much reduced. This prevents high stress from being passed into localised areas of adhesion and/or clamping and resulting in localised failure of adhesive or creaking in a clamped joined.

It is preferable that said thicker and/or wider sections of the hinge elements have sufficient surface area suitable for bonding to the diaphragm and/or transducer base structure. Thickening may be more preferable to widening since internal stresses are more reliably reduced across the entire region of adhesion or clamping. Additionally the thickening and/or widening preferably occurs gradually and smoothly (i.e. smoothly tapered) in order to minimise sharp corners and such geometries that may create "stress raisers" thereby limiting maximum diaphragm excursion.

Referring to FIGS. 16A-16E, in this example the flexible hinge element B201*a* connects to the diaphragm base frame at location B210, where cross-sectional thickness of the element gets gradually/incrementally thicker (i.e. is tapered) with the use of small radii at either side of this location. Similarly, where flexible hinge element B201*b* connects to the diaphragm at location B211, the cross-sectional thickness of the element also gets gradually/incrementally thicker (i.e. is tapered) with the use of small radii. Again, where flexible hinge elements B201*a* and B201*b* connect to the corresponding block B205 at locations B209 and B208 respectively, the thicknesses of these elements is increased by use of small radii. In all of these connections, the gradual thickening of cross-section minimises the creation of stress-raising geometries. A similar increase in thickness is also exhibited for the flexible hinge elements B203*a* and B203*b* of the second hinge joint B203.

Section 3.3.2 below outlines possible hinge assembly variations that may otherwise be employed in the embodiment B audio transducer.

3.3.1c Diaphragm Base Frame

In this example, the diaphragm structure is supported by the diaphragm base frame along or near an end that is to be directly attached to the hinge assembly in use, and the diaphragm base frame is directly or closely attached to one or both of the hinge elements. Preferably the diaphragm base frame is arranged to facilitate a rigid connection between the diaphragm structure and the hinge joints. The diaphragm base frame can be considered as part of the diaphragm assembly or part of the hinge assembly, or preferably both. Respective ends of the hinge elements of each hinge joint are rigidly coupled to the diaphragm base frame. The base frame in this example comprises a longitudinal channel that receives and rigidly connects to an end face of the diaphragm structure.

Referring to FIGS. 17A-17D, in this embodiment, the diaphragm base frame comprises a second channel that is angled acutely relative to first channel configured to couple the diaphragm structure. The second channel is configured to couple the coil/force generating component B106. It will be appreciated that the angle between the channels corresponds to the relative orientation of the diaphragm structure end face and the coil. The first channel connected to the diaphragm end face comprises a substantially L-shaped cross-section such that the channel can connect to the end face and an adjacent major face of the diaphragm structure in situ, thereby improving the rigidity of the connection. A plurality of lateral stiffening plates B301, B306 extend within the second channel and connect to the coil/force generating component B106 of the diaphragm assembly to rigidly connect in locations distributed along the longitudinal length of the coil, thereby also improving the rigidity of the connection therebetween.

In this example, the diaphragm base frame comprises a pair of arcuate end plates B301 located at either end of the longitudinal diaphragm base frame. Each plate B301 comprises a substantially arcuate/curved terminal free edge. On an outer side of each arcuate end plate and extending laterally therefrom is a triangular stiffening ridge B302. In this example the assembly further comprises an additional intermediate/central arcuate plate B306 spaced from and extending parallel to the arcuate end plates B301. In some embodiments, there may be two or more intermediate plates B306 spaced between the end plates B301. A main base plate B303 extends longitudinally along the width of the diaphragm base frame and corresponds to the width of the diaphragm structure. The end plates extend laterally from one side of the main base plate B303. An underside strut plate B304 extends laterally from a longitudinal edge of the main base plate B303 from an opposing side to the arcuate plates B301, B303. The underside strut plate B304 locates adjacent the flexible hinge elements B201*a*, B201*b*, B203*a* and B203*b* of the assembly B107. The main base plate B303 also extends along a substantial portion of the width of the diaphragm base frame. A topside strut plate B305 extends laterally from a longitudinal edge of the main base plate B303, opposing the edge from which the underside strut plate B304 extends, and in an opposing direction to the underside strut plate B304. The topside strut plate B305 extends along a portion of the arcuate edge of each arcuate plate B301, B303. The topside strut also extends longitudinally along a substantial portion of the width of the diaphragm base frame. An underside base plate B307 extending longitudinally along a substantial portion of the width of the diaphragm base frame locates adjacent an underside of the arcuate plates B301, B303 substantially in alignment with the triangular stiffeners B302. The underside base plate extends from a central region of the hinge assembly adjacent the connection with the flexible hinge elements B201*a*, B201*b*, B203*a* and B203*b*.

The underside strut plate B304 and the main base plate B303 form the first channel therebetween for accommodating and connecting to the base end of the diaphragm structure. The underside base plate B307 and the main base plate B303 form the second channel therebetween on the opposing side of the first channel for accommodating and connecting to the two arcuate end plates B301, central arcuate plate B306 and the topside strut plate B305, and these four components B301, B306 and B305 in turn accommodate and connect to the coil B106.

Referring back to FIG. 15F, in an assembled state of the audio transducer, coil windings B106 are rigidly attached to the diaphragm base frame of the hinge assembly B107. The coil winding short sides B109 are attached to the two arcuate end plates B301. The coil winding long sides B108 and B117 are attached to the arcuate end plates B301 and also the central arcuate plate B306. The coil winding long sides B108 are also attached to the edge of the topside strut plate B305. These parts can be attached using an adhesive agent, such as an epoxy resin adhesive. Other coupling methods are also possible.

The combination of the diaphragm base frame components, including: end plates B301, triangle stiffeners B302, main base plate B303, underside strut plate B304, topside strut plate B305, middle arc B306 and underside base plate B307, adhered rigidly to the coil windings B106 at the region of the diaphragm body base, creates a diaphragm base structure that is substantially rigid, and does not resonate within the transducer's FRO.

Although the mass of diaphragm base frame and windings B106 is relatively high compared to other parts that of the diaphragm assembly B101, because the mass is located close to the axis of rotation B116 the rotational inertia is reduced.

The three arcuate plates B301, B302 and B306 act as coil stiffeners and each comprise a panel extending in a direction perpendicular to the axis of rotation. The arcuate edges of each plate B301, B302 and B306 connect between the first long side B117 of the coil B106 and the second long side B108 of the coil B106. Each end plate B301 and B302 is located close to and preferably abuts each of the short sides B109 of the coil B106 and extends from approximately the junction between the first long side B117 of the coil B106 and the first short side B109, to approximately the junction between the second long side B108 of the coil B117 and the first short side B109, and also extends in a direction perpendicular to the axis of rotation. If these diaphragm base frame parts are not made from the same piece of material (as in this embodiment, which is sintered as one integral part) then a suitable rigid method of connection is preferably employed, for example soldering, welding, or adhering using an adhesive such as epoxy resin or cyanoacrylate. If adhesive is used then care should be taken to ensure a reasonable size contact area between the parts to be glued is used so that the compliance inherent in the adhesive does not limit system performance.

It will be appreciated that, in this embodiment, the long sides B117 and B108 of the coil B106 are not connected to a former, and instead they are sufficiently thick so as to be able to support themselves in regions between the coil stiffeners. A former could also be used in alternative embodiments however.

3.3.1d Connecting Blocks

The hinge assembly B107 further comprises on the transducer base structure side, connecting blocks B205 and B206. The connecting blocks are rigidly attached to the four thin, flat flexible hinge elements B201*a*, B201*b*, B203*a* and B203*b* as previously described and link the diaphragm to the transducer base structure. The arrangement of flexure hinge elements B201*a* and B201*b* approximately perpendicular to each other, forms a hinge joint B201 on one side of the audio transducer connecting to block B205, and a similar arrangement of flexible hinge elements B203*a* and B203*b* forms a hinge joint B203 on the other side connecting to block B206, such that the diaphragm is constrained to move in a rotational manner about an axis of rotation B116. FIG. 16E details the side view of the hinge assembly on one side of the audio transducer.

Each connection block B205, B206 is formed in the shape of a wedge having a substantially angled surface for coupling the ends of the respective hinge element pair B201*a*/B201*b*, B203*a*/B203*b*. Other shapes for the connection blocks are also envisaged. In some embodiments a single connection block may be provided that connects to both hinge element pairs.

The connection blocks B205 and B206 may be rigidly attached to the transducer base structure block B105 using an adhesive agent, such as an epoxy adhesive for example, or via any other suitable method known in the art. Otherwise, each connection block may be formed integrally with the remainder or other parts of the transducer base structure. The transducer base structure block B105 may be made from aluminium in some configurations but other suitable materials are also envisaged. This diaphragm base frame and connection blocks may be made from any suitable rigid material such as sintered aluminium, but could be made by other materials and using methods such as welding or soldering smaller parts together.

The diaphragm base frame can be considered to comprise all the parts of hinge assembly B107 that are on the diaphragm side of the flexures. Preferably all of the diaphragm base frame components are made from a material having a Young's modulus higher than 8 GPa, or more preferably higher than 20 GPa. Similarly, the connection blocks are preferably made from a material having a Young's modulus higher than 8 GPa, or more preferably higher than 20 GPa.

3.3.1e Transducer Base Structure and Force Generation

The following describes the diaphragm assembly B101 and transducer base structure B120 configurations of the embodiment B audio transducer of this invention. It will be appreciated however that the above described flexible hinge assembly B107 may be incorporated in any suitable rotatable action audio transducer configuration and the invention is not intended to be limited to the combination of structures/assemblies described for this embodiment. For example, the hinge assembly B107 may be incorporated in any one of the embodiments A, D, E, K, S, T, W or X audio transducers described herein.

Figure 15A:
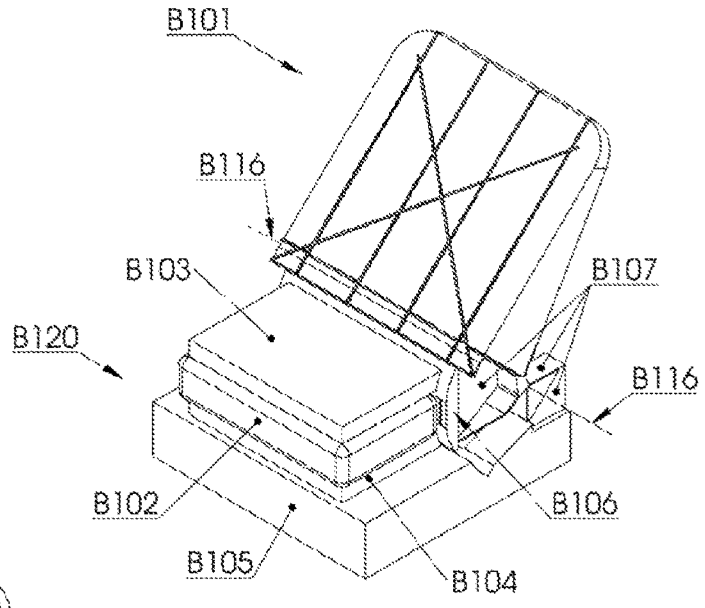
Figure 15B:
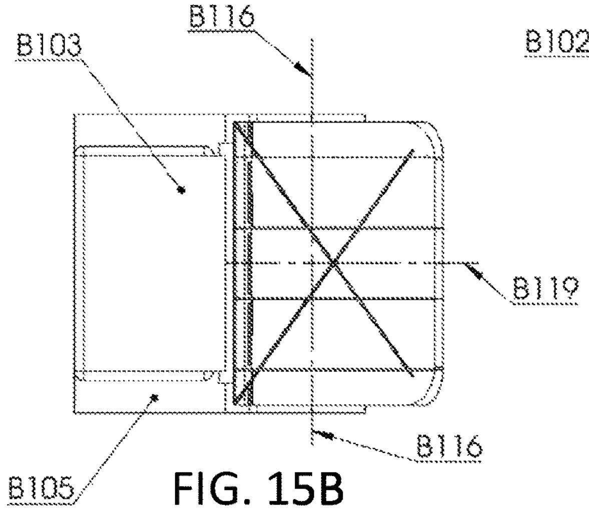
Figure 15C:
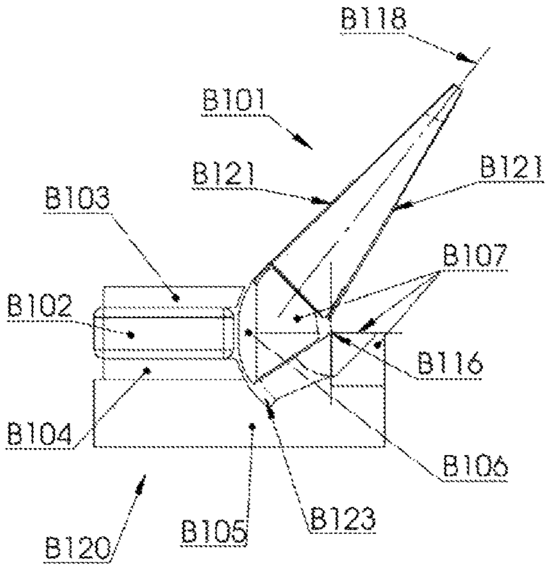
Figure 15D:
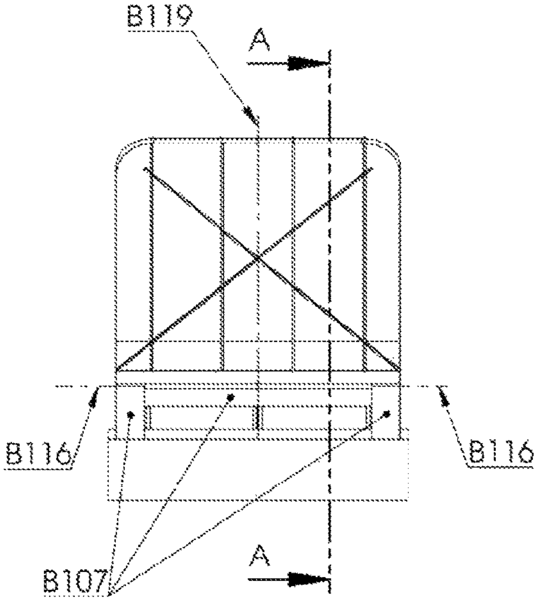
Figure 15E:
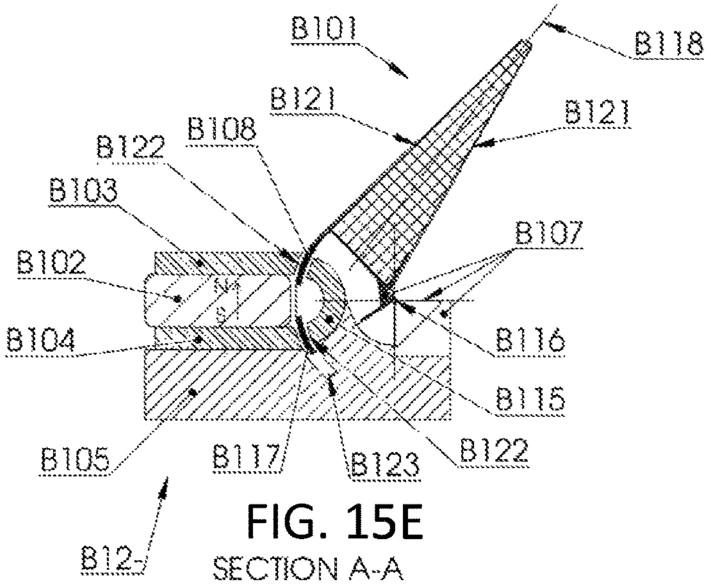
Figure 15F:
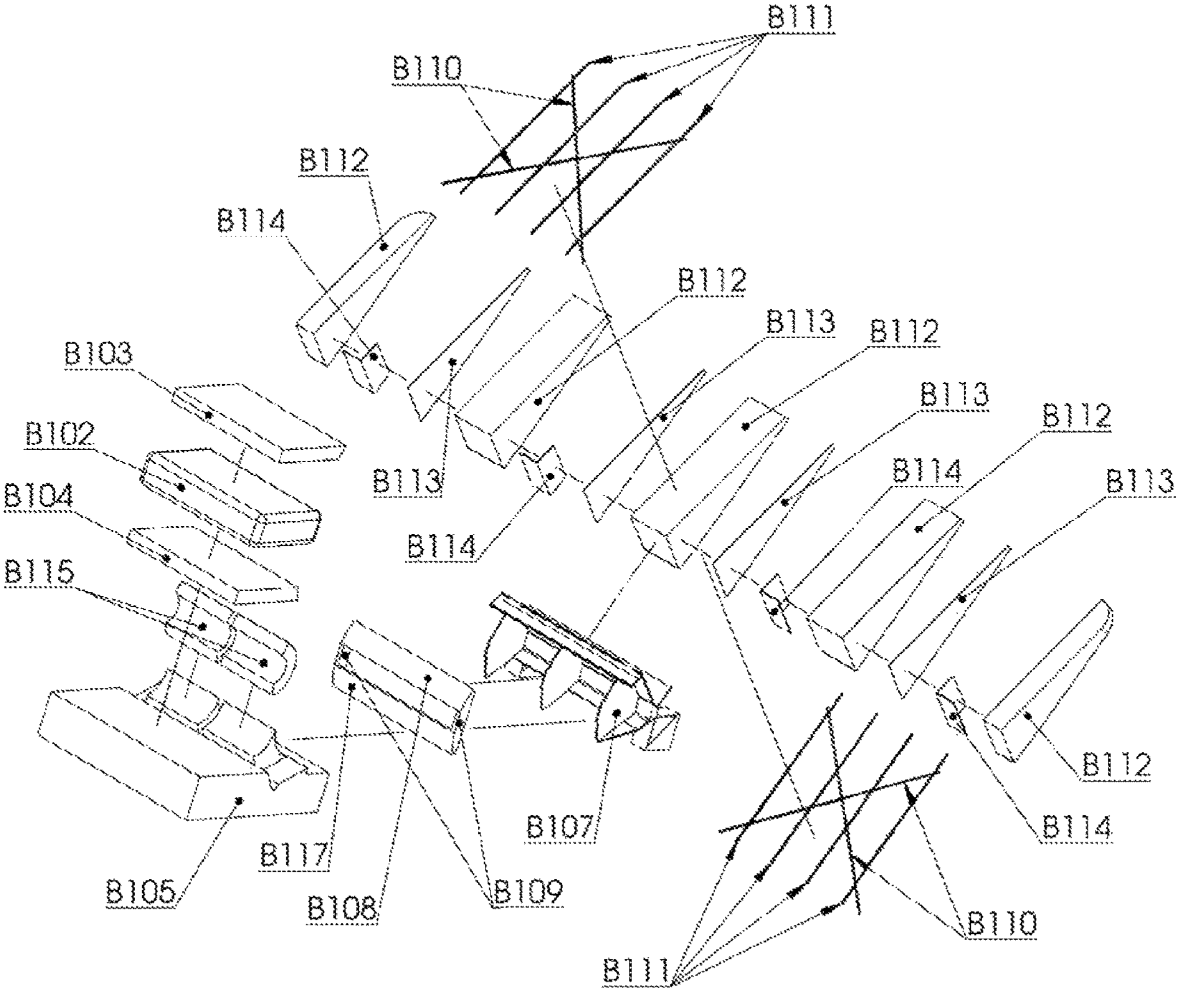

Referring to FIGS. 15E and 15F, the transducer base structure B120 comprises a base block B105 (preferably made from a substantially rigid material such as aluminium). The base block B105 accommodates the magnet assembly at one end, and the hinge assembly B107 at an opposing end. The magnet assembly of the transducer base structure B120 comprises outer pole pieces B104 and B103 (made from steel for example), magnet B102 retained therebetween (made from neodymium—grade N52 NdFeB for example) and inner pole piece parts B115 (made from mild steel for example). The outer pole pieces B104 and B103 and the magnet B102 are stacked onto a corresponding substantially planar surface of the base block B105. The inner pole parts B115 are curved and configured to locate against curved bracing members extending laterally from an upper surface of the base block. In situ, the inner pole parts B115 locate adjacent but slightly spaced from the outer pole pieces B104 and B103 to provide a gap therebetween for the coil B106. At the opposing end of the base block, a stepped region/recess accommodates and rigidly couples the connecting blocks B205 and B206 of the hinge assembly B107. The outer pole pieces B104 and B103, the inner pole pieces and the connecting blocks B205 and B206 are all adhered via an adhesive agent such as epoxy resin to the base block B105. The magnet B102 is adhered at either opposing major surface to the corresponding outer pole piece B104, B103 via a suitable adhesive agent such as an epoxy resin. Other suitable coupling methods are envisaged for alternative embodiments however.

In this example, the magnet B102 is magnetised such that the north pole is situated on the face connected to outer pole piece B103, and the south pole is on the face connected to outer pole piece B104, but it will be appreciated the alternative configuration may also be suitable. The diaphragm assembly B101 is configured to rotate about an approximate axis B116 of rotation relative to the transducer base structure B120 during operation.

With this configuration a magnetic circuit is formed by the magnet B102, outer pole pieces B103 and B104 and the two inner pole pieces B115 in situ. Flux is concentrated in the small air gap between outer pole pieces B103 and B104 and inner pole pieces B115. The direction of the flux in the gaps between outer pole piece B103 and inner pole pieces B115 is overall, approximately towards the axis of rotation B116. The direction of the flux in the gaps between inner pole pieces B115 and outer pole piece B104 is overall, approximately away from the axis of rotation B116. It will be appreciated that the direction of flux may be the opposite in alternative embodiments. In this example, the coil windings B106 are wound from enamel coated copper wire in an approximately curved rectangular shape, with two long sides B108 and B117 and two short sides B109. In situ, long side B108 is located approximately in the small air gap between outer pole piece B103 and inner pole pieces B115, and the other long side B117 is located in the small air gap between outer pole piece B104 and inner pole pieces B115. During operation, an electrical audio signal can be played through the coil windings, and the current along coil winding long side B108 travels in an opposite direction to that in the other long side B117. The torque exerted by both coil winding long sides B108 and B117 is in the same direction due to the current and flux directions described. The coil winding B106 is thick enough, and adhered together with an adhesive such as epoxy, to be relatively rigid, so that unwanted resonance modes preferably occur outside of the FRO. It is thick enough that a coil former is not required, and this means that the magnetic flux gaps are able to be made smaller for increasing flux density and improved audio transducer efficiency, all else being equal. It will be appreciated that these aspects of the magnets and coil winding may be varied in alternative embodiments and the invention is not intended to be limited to such features.

FIG. 15E shows a cross-section of the audio transducer, and the cross-section of the coil winding long sides B108 and B117 being curved at a radius centred on the axis of rotation B116 of the diaphragm assembly B101. The coil winding is overhung so that as the diaphragm rotates during operation an angle of displacement is available before the coil winding long sides B108 and B117 start to exit the region of two magnetic flux gaps B122 between outer pole pieces B103 and B104, and the inner pole pieces B115. In this way a high degree of linearity of driving torque is achieved. The inner ends of the outer pole pieces B103 and B104 adjacent the inner pole parts B115 are angled or curved to correspond with a similar angle or curve on the inner side of the inner pole parts B115. This configuration forms the two approximately curved magnetic flux gaps B122 between the outer and inner pole pieces for the coil winding to extend through. In particular, the coil winding B106 has a substantially curved form to correspond to the curvature of the gaps B122. In this manner, during rotation of the diaphragm, a substantially uniform torque is applied to the diaphragm regardless of rotational position. The gaps B122 is aligned with a corresponding curved recess B123 in the base block B105 such that the coil winding B106 can extend into the base block B105 during operation in some rotational positions of the diaphragm.

3.3.1f Diaphragm Structure

In this example, the hinge assembly comprising a pair of flexible hinge elements on either side of the assembly, supports a diaphragm structure that is relatively and substantially thick. For example, the diaphragm body may comprise a maximum thickness that is greater than 15% of its length from the axis of rotation to the most distal periphery of the diaphragm body, or more preferably a thickness that is greater than 20% of its length from the axis of rotation to the most distal periphery of the diaphragm body. Alternatively or in addition the diaphragm body may comprise a maximum thickness that is greater than approximately 11% of a greatest dimension of the body (e.g. a diagonal length across the body), or more preferably greater than approximately 14% of the greatest dimension—as defined for embodiment A under section 2.2 for example. A relatively thick diaphragm structure is required to provide a geometry that is suitably resistant to diaphragm flexing resonance modes. When used in combination with the hinge assembly, which is effective at resisting pure translations of the diaphragm, this results in an audio transducer that is particularly resistant to unwanted resonance modes over a wide bandwidth. In this example, the diaphragm body thickness B214 may be about 4.2 mm which could be 28% of the diaphragm body length for example. This thickness provides the structure with improved rigidity helping to push resonant modes up out of the range of operation. The geometry of the diaphragm body is largely planar. The coronal plane of the diaphragm body B112 extends substantially outwards from the axis of rotation B116 such that it displaces a large volume of air as it rotates. It is tapered, to significantly reduce its rotational inertia, providing improved efficiency and breakup performance. Preferably the diaphragm body tapers away from the centre of mass B222 of the diaphragm assembly.

In this embodiment, the audio transducer may comprise a rigid diaphragm structure as described in relation to configuration R1 diaphragm structure of this invention for example. Features and aspects of the configuration R1 diaphragm structure are described in detail in section 2.2 of this specification, which is hereby incorporated by reference. Only a brief description of this diaphragm structure will be given below for the sake of conciseness. It will be appreciated that this diaphragm structure may be replaced with any diaphragm structure as described under configuration R1-R4 in section 2.2 or configurations R5-R7 in section 2.3 of this specification, without departing from the scope of the invention.

Referring to FIGS. 15A-15F, the audio transducer incorporating the above described hinging system B107 further comprises a diaphragm assembly B101 having a diaphragm structure comprising a sandwich diaphragm construction. This diaphragm structure consists of a substantially lightweight core/diaphragm body B112 and outer normal stress reinforcement B110/13111 coupled to the diaphragm body adjacent at least one of the major faces B121 of the diaphragm body for resisting compression-tension stresses experienced at or adjacent the face of the body during operation. The normal stress reinforcement B110/13111 may be coupled external to the body and on at least one major face B121 (as in the illustrated example), or alternatively within the body, directly adjacent and substantially proximal the at least one major face B121 so to sufficiently resist compression-tension stresses during operation. The normal stress reinforcement comprises a reinforcement member B110/13111 on each of the opposing, major front and rear faces B121 of the diaphragm body B112 for resisting compression-tension stresses experienced by the body during operation.

The diaphragm structure further comprises at least one inner reinforcement member B113 embedded within the core, and oriented at an angle relative to at least one of the major faces B121 for resisting and/or substantially mitigating shear deformation experienced by the body during operation. The inner reinforcement member(s) B113 is/are preferably attached to one or more of the outer normal stress reinforcement member(s) B110/6111 (preferably on both sides—i.e. at each major face). The inner reinforcement member(s) acts to resist and/or mitigate shear deformation experienced by the body during operation. There are preferably a plurality of inner reinforcement members B113 distributed within the core of the diaphragm body.

The core B112 is formed from a material that comprises an interconnected structure that varies in three dimensions. The core material is preferably a foam or an ordered three-dimensional lattice structured material. The core material may comprise a composite material. Preferably the core material is expanded polystyrene foam.

In some embodiments the inner stress reinforcement of the diaphragm structure of this exemplary transducer may be eliminated.

This diaphragm structure is optimised to minimise unwanted resonances by working particularly well in combination with the flexible hinge assembly described above, since this hinge type is capable of providing a high degree of support against translational displacements, in at least one direction, without compromising rotational compliance and/or maximum excursion.

In this configuration the inner reinforcement addresses diaphragm breakup resonance by minimising internal shearing. The hinge assembly provides resistance to translations thereby addressing whole-diaphragm breakup resonance modes while also permitting high diaphragm excursion and low fundamental resonance frequency.

In this example of embodiment B, the diaphragm structure comprises four inner reinforcement members B113 laminated in between five wedges of low density core B112 and alongside four angled angle tabs B114. These parts are attached using any suitable method for rigid connection, such as using an adhesive agent, for example epoxy adhesive. The normal stress reinforcement comprising thin parallel struts B111 that are attached to a major face B121 of the diaphragm body, aligning with the inner reinforcement members B113, and connecting to the topside strut plate B305. Additional normal stress reinforcement comprising two diagonal struts B110 are attached in a cross configuration, across the same major face B121 of the diaphragm body and over the top of the parallel struts B111, and also connecting to the topside strut plate B305. On the other major face B121 of the diaphragm body, struts B110 and B111 are also attached in a similar manner, except connecting to the underside base plate B307. The struts are preferably made from an ultra-high-modulus carbon fibre, for example Mitsubishi Dialead, having a Young's modulus of about 900 Gpa (without the matrix binder). These parts are attached to each other using any suitable connection method, such as using an adhesive agent, for example epoxy adhesive. It will be appreciated that other forms of inner and outer reinforcement, core material and methods of attachment are possible as defined for the configuration R1-R4 diaphragm structures.

The diaphragm structure is coupled to the hinge assembly B107 in the following manner. An end face of the diaphragm body (at the thicker end of the diaphragm body, including faces of four angle tabs B114) is rigidly coupled to the main base plate B303 of the diaphragm base frame of the hinge assembly B107. The normal stress reinforcement comprising thin parallel struts B111 are connected to the topside strut plate B305. The additional normal stress reinforcement comprising two diagonal struts B110 are also attached to the topside strut plate B305. On the other major face B121 the struts B110 and B111 are attached to the underside base plate B307 of the hinge assembly.

The use of relatively high modulus/stiff struts B110 and B111, connected on the outside of a thick, low density diaphragm body core B112 provides a useful composite structure in terms of diaphragm stiffness, again due to the thick geometry maximising the second moment of area advantage associated with the separation achieved between the struts on the front versus rear faces.

During operation, the diaphragm body B112 displaces air as it rotates/oscillates, and as such, it is required to be significantly non-porous. In this example, the diaphragm body is formed from an EPS foam due to its reasonably high specific modulus and also because it has a low density of 16 kg/m^3. The diaphragm body core material preferably comprises no large occlusions in critical places such as near the tip of the diaphragm. The EPS material characteristics help to facilitate improved diaphragm breakup. The stiffness performance allows the core B112 to provide some support to the thin carbon fibre struts B110 and B111 which are so thin that without the core B112, they would suffer localised transverse resonances at frequencies within the FRO. The laminated inner reinforcement members B113 provide improved diaphragm shear stiffness. The orientation of the plane of each inner reinforcement member is preferably approximately parallel to the direction the diaphragm moves and also approximately parallel to the longitudinal of the diaphragm body B112. For the inner reinforcement members B113 to aid the shear stiffness of the diaphragm body, reasonably rigid connections need to be made to the parallel carbon fibre struts B111 laid on either side of each inner reinforcement member. Also, at the base end of the diaphragm the connection from the inner reinforcement members B113 to the main base plate B303 is preferably rigid, and to aid this rigidity, angle tabs B114 are used. Each tab B114 has a large adhesive surface area for connecting to each inner reinforcement member B113, and shear forces are transferred around the corner of the tab, the other side of which is another large adhesive surface area which is connected to the main base plate B303.

In this embodiment, the hinge system configuration is such that the diaphragm structure is oriented to extend at an angle relative to the longitudinal axis of the transducer base structure, in the diaphragm assembly's neutral position/state. This angle is preferably obtuse, but it may be substantially orthogonal or even acute. The relative orientation between the diaphragm body and the transducer base structure affects the overall size of the audio transducer to provide a more compact device. In this particular example, the audio transducer may be of relatively small dimensions: diaphragm body width B215 and diaphragm body length B213 (as measured from the axis of rotation) may be both approximately 15 mm, for example. Many other sizes are also possible however depending on the application and FRO required and the invention is not intended to be limited to these dimensions.

3.3.1g Diaphragm Structure Housing

FIGS. 18A-18F show the "embodiment B" audio transducer shown in FIGS. 15A-15F mounted to a diaphragm housing, comprising a surround B401, a main grille B402 and two side stiffeners B403. In an assembled form of the audio transducer, the diaphragm housing substantially encloses the diaphragm structure B101 and the transducer base structure. The surround may be made from a plastics material such as a polycarbonate plastic and the main grille and side stiffeners may be made from stamped and pressed aluminium. Alternatively these parts could be made by another process such as laser cutting or sintering, and the stiffer main grille and side stiffeners could be insert moulded into the surround. Alternatively all of these parts could be combined into a single, integral part made from a material such as aluminium, and sintered. Other materials, configurations and process are also possible and the invention is not intended to be limited to these examples.

An inner surface of the surround B401 is rigidly coupled to a corresponding outer surface of the base block B105 of the transducer base structure using any suitable method. In this example, an adhesive agent, such as epoxy adhesive is used to couple the surround B401 to the base block B105. The inner surface of the surround is preferably also rigidly coupled to the outer surfaces of the outer pole piece B103, and the magnet B102. The surround is shaped and sized relative to the transducer base structure and diaphragm structure such that in an assembled state there is a relatively small air gap B406 (compared to the overall size of the entire audio transducer assembly), of about 0.01 mm-1 mm, e.g. 0.3 mm (however it will be appreciated the size of this gap depends on the application), between the sides of the diaphragm structure and the surround B401 and also a relatively small air gap B405 between the tip of the diaphragm and the surround B401 (e.g. a similar size gap to that adjacent the sides).

Figure 18A:
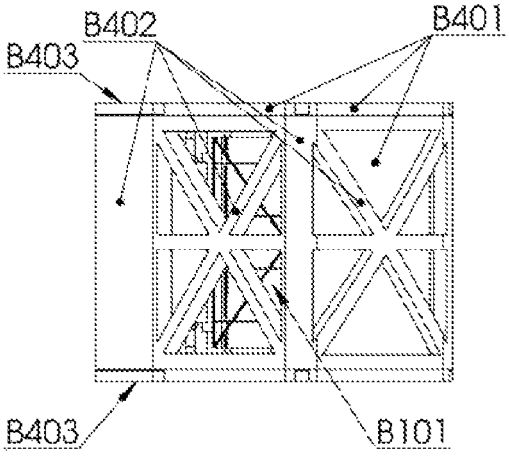
Figure 18B:
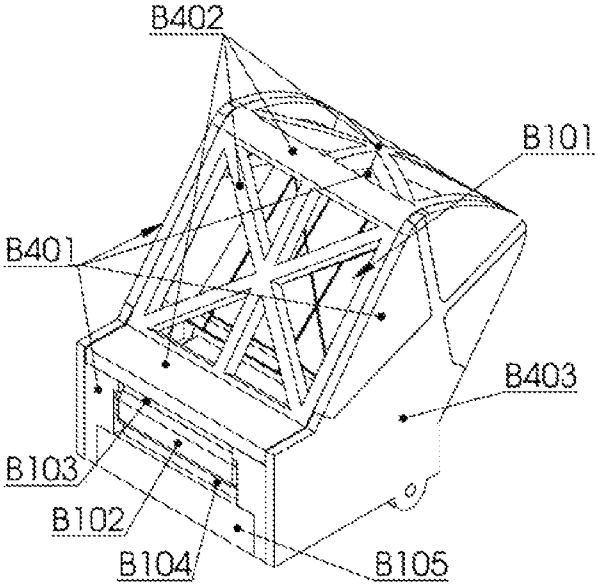
Figure 18C:
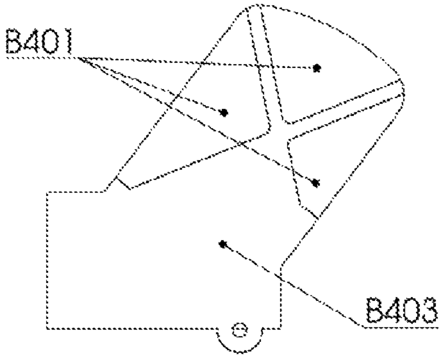
Figure 18D:
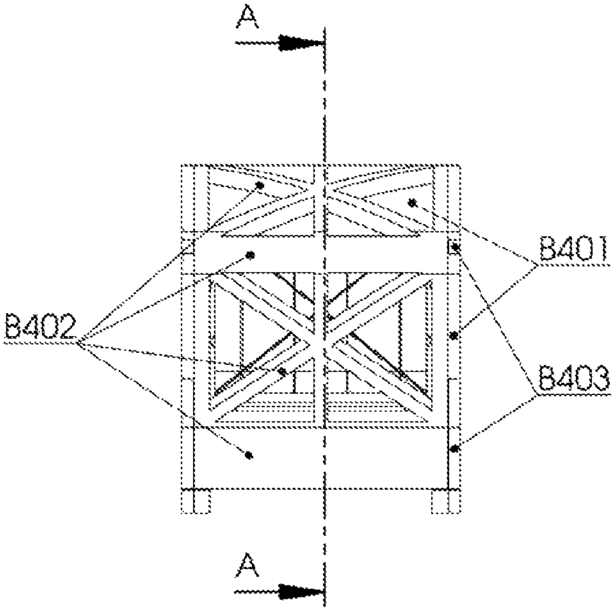
Figure 18E:
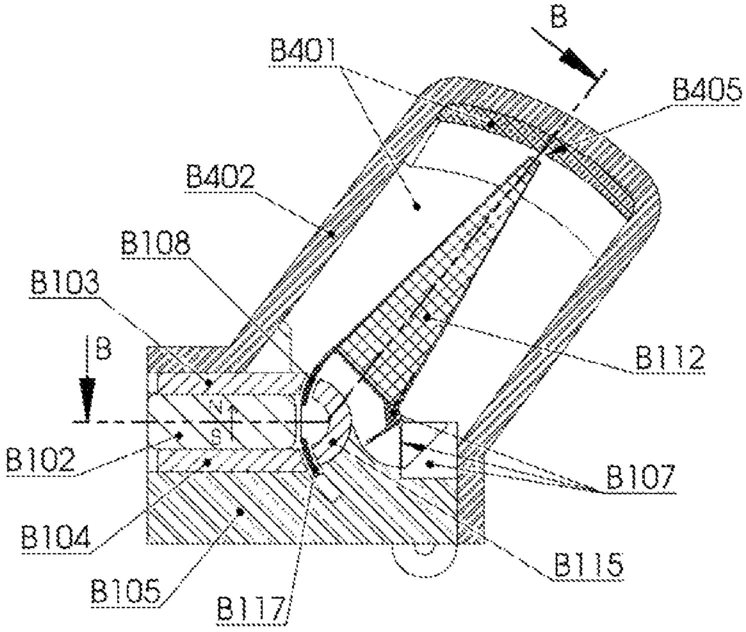
Figure 18F:
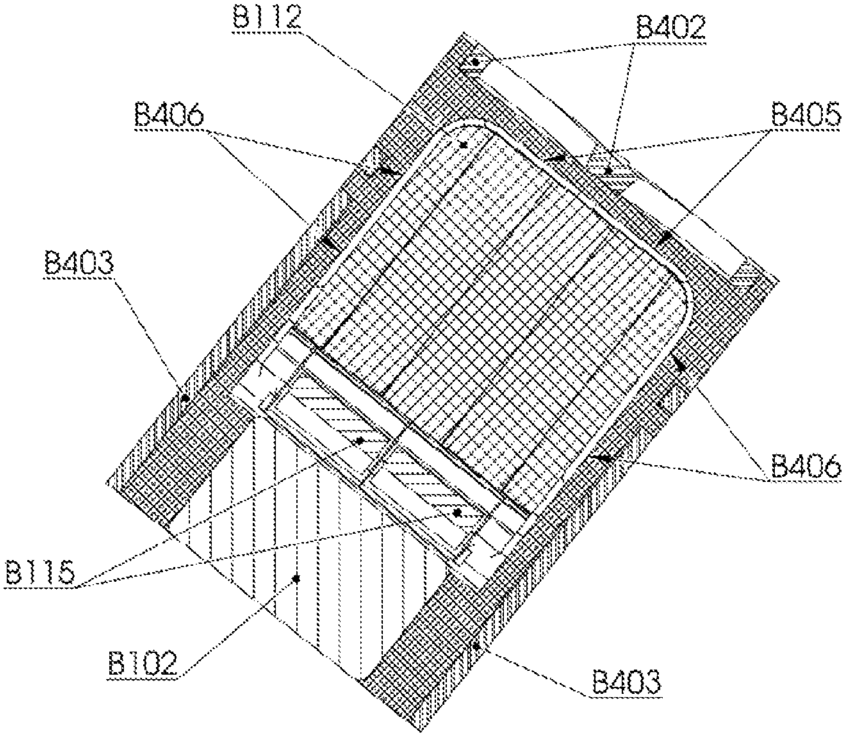

Cross-sectional view FIG. 18E shows that the surround B401 has a curved surface at the end configured to locate adjacent (with a small air gap B405) the tip of the diaphragm body. The centre of radius of this curve is located approximately at the axis of rotation B116 of the audio transducer, such that as the diaphragm rotates, a substantially uniform air gap B405 is maintained between the surround and the free end/tip of the diaphragm body. Air gaps B406 and B405 are small to prevent significant amounts of air from passing through due to the pressure differential that exists during normal operation.

Surround B401 has walls that act as a barrier or baffle, reducing cancellation of radiation from the front of the diaphragm by anti-phase radiation from the rear. Note that depending upon the application a transducer housing (or other baffle components) may also be desirable to further reduce cancelation of frontward and rearward sound radiation.

The main grille B402 and two side stiffeners B403 are rigidly attached using any suitable method, such as via an epoxy adhesive, to the surround B401, or are alternatively integrally formed with the surround. The main grille and two side stiffeners are also rigidly attached to the transducer base structure. Because these diaphragm housing components are all rigidly attached to the transducer base structure the combined structure, being the base structure assembly, is sufficiently rigid that adverse resonance modes may occur above the FRO. To achieve this, the overall geometry of the combined structure is preferably short and squat. Also, the region of the diaphragm housing that extends around the diaphragm is stiffened by the use of triangulated aluminium struts incorporated into the main grille B402 and side stiffeners B403 which form a rigid cage supporting the plastic component of the surround B401.

As described above the transducer base structure is rigidly mounted to a diaphragm housing having a narrow gap B405 and B406 around the diaphragm in order to effectively seal against air moving from the front to the back. The diaphragm housing is made from one or more structural materials, at least one of which, preferably, has a high specific modulus, such as does a metal like aluminium or magnesium, in order that said diaphragm housing can be made to be sufficiently rigid. Preferably this material has a specific modulus of at least 8 MPa/(kg/m^3) or more preferably at least 20 MPa/(kg/m^3. Preferably, when rigidly mounted to said audio transducer, both diaphragm housing resonance modes and also diaphragm housing/audio transducer system resonances occur at high frequencies, preferably at frequencies beyond the FRO, and hence audio degradation caused by any resonances transmitted to the lightweight diaphragm via said rigid mounting and then via said rigid hinge assembly and then mechanically amplified by virtue of the lightness of the diaphragm, is not significantly audible.

In this embodiment, the diaphragm structure comprises a periphery that is at least partially free from physical connection with an interior of the surrounding structure, being the diaphragm housing/transducer base structure in this example. A periphery free from physical connection in relation to a diaphragm structure is described in detail in section 2.3 of this specification. In this example, approximately the entire periphery of the diaphragm structure is free from physical connection with the housing and spaced form the interior wall of the housing as shown by the gaps. However, in some variations the periphery of the diaphragm structure may only be partially free from physical connection with the housing, but still significantly free from physical connection. For example, one or more peripheral regions of the diaphragm structure may be free from physical connection with the interior of the housing, and collectively the one or more peripheral regions constitute approximately at least 20 percent of the length or perimeter periphery of the diaphragm structure for the periphery to be significantly free from physical connection. Preferably the one or more peripheral regions free from physical connection with the interior of the housing constitute approximately at least 30 percent of the outer periphery. More preferably the diaphragm structure outer periphery is substantially free from physical connection, such as along at least percent of the length or perimeter of the outer periphery, or most preferably along at least percent of the length or perimeter outer periphery.

In another configuration, the audio transducer of embodiment B does not comprise a diaphragm housing, and the audio transducer is accommodated in a transducer housing via a decoupling mounting system, for example, similar to the housing and decoupling mounting system described with regards to embodiment A or embodiment E as described in section 4.2 or otherwise any decoupling mounting system designed in accordance with the principles outlined in section 4.3 of this specification.

3.3.2 Alternative Hinge Systems

Variations of hinge assemblies that can be used in a flexure hinge system that is designed in accordance with the principles described for the hinge assembly B107 of the embodiment B audio transducer will now be described with reference to FIGS. 19A-29F. Unless otherwise stated, features of the hinge assembly B107 will also apply to the following variations and in most cases only the differences will be described for the sake of conciseness. For example, most of these variations do not show a transducing mechanism force generation component attached to the diaphragm, even though this is preferable.

3.3.2a Bending Hinge Joints

FIGS. 19A-19E show a schematic of an audio transducer, such as the one described in embodiment B for example, having a diaphragm structure C101 connected to a hinge assembly C102 of the invention. This hinge assembly C102 comprises a diaphragm base frame C103, which on one side connects to the diaphragm structure C101, and on the other side it connects to a hinge joint C105 comprising two flexible hinge elements C105*a* and C105*b*. The diaphragm base frame C103 may be the same or similar to the diaphragm base frame of hinge assembly B107 described above in relation to embodiment B. Alternatively, the diaphragm base frame may be the same or similar to any of the diaphragm base frames described in relation to the audio transducers of embodiments A, D, E, K, S, T, W and X for example.

Figure 19A:
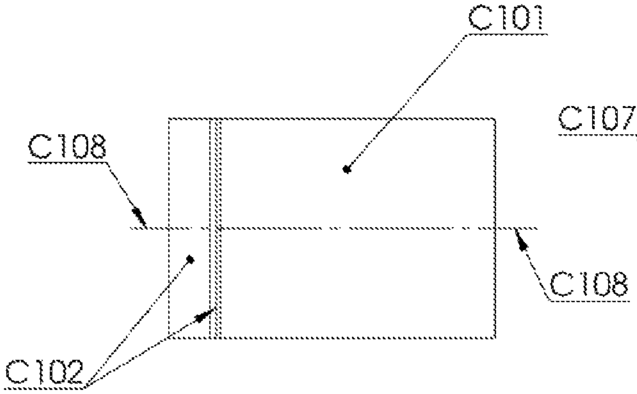
Figure 19B:
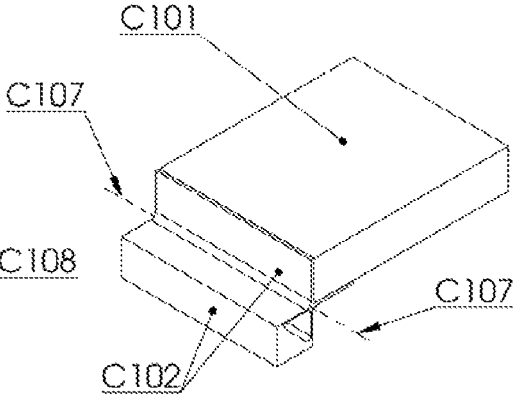
Figure 19C:
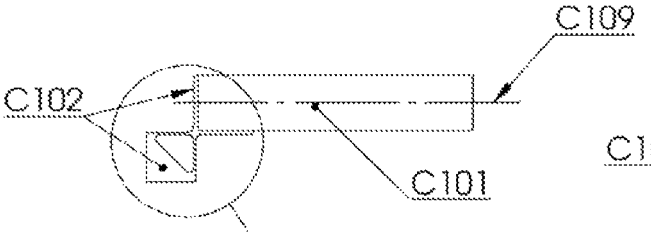
Figure 19D:
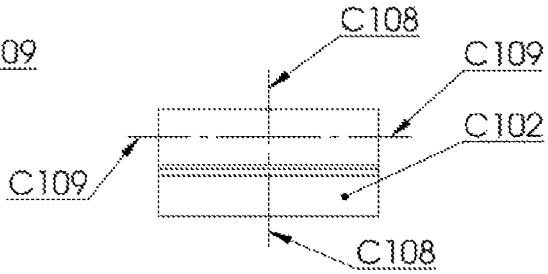
Figure 19E:
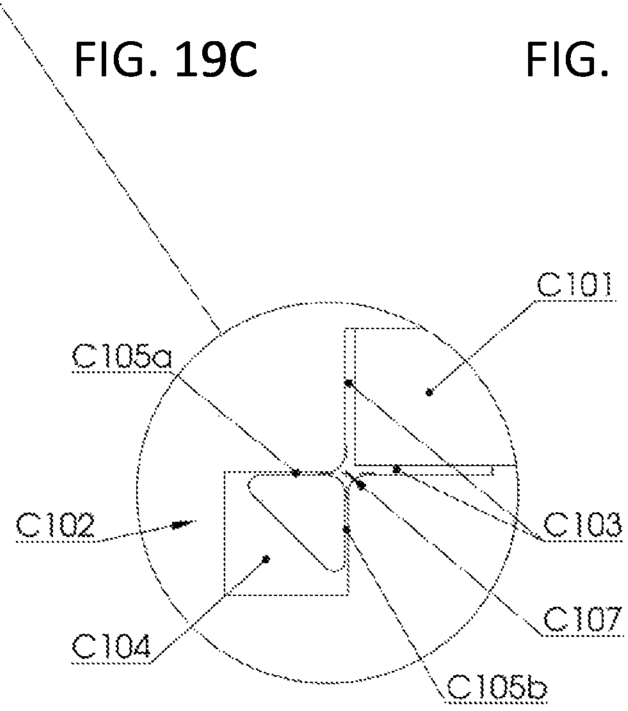
Figure 20A:
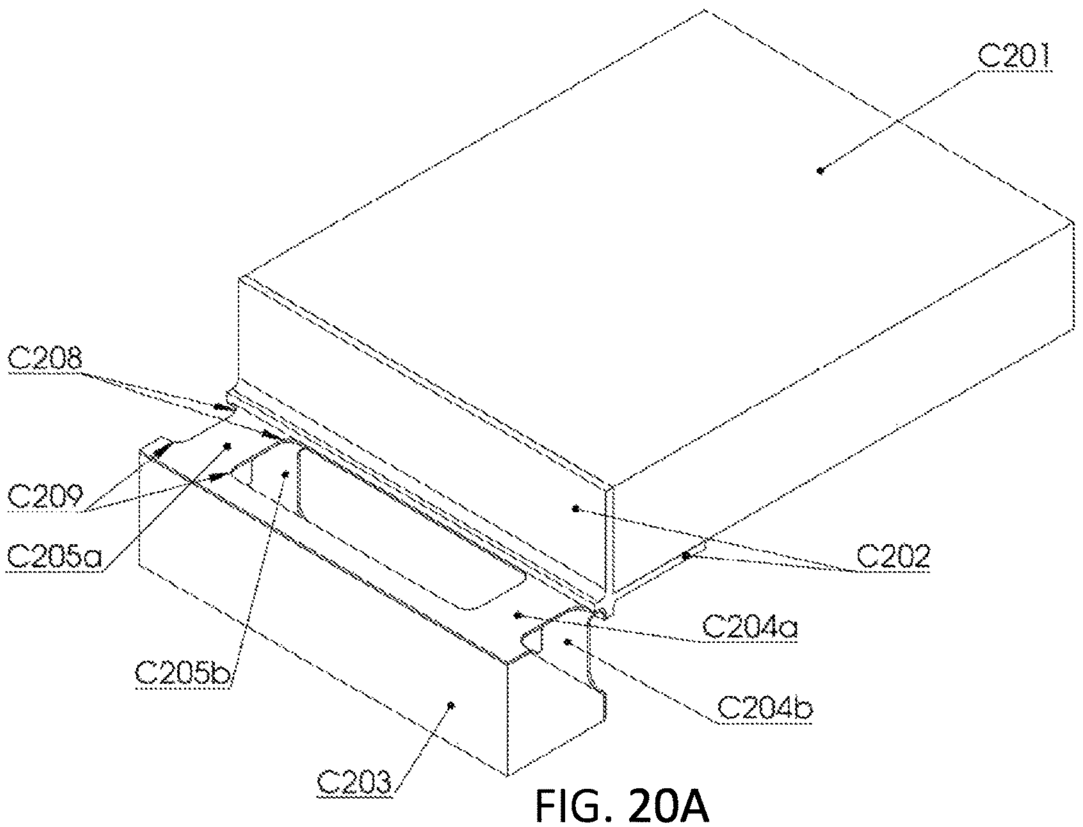
Figure 20B:
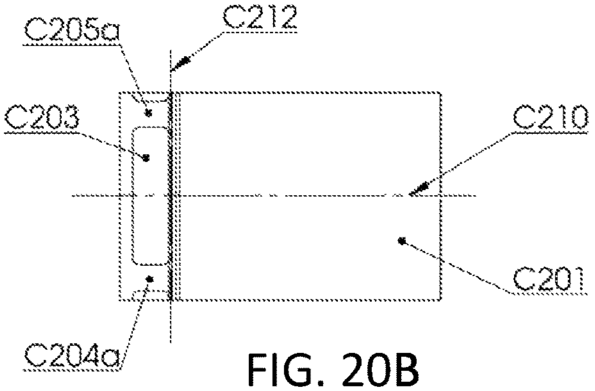
Figure 20C:
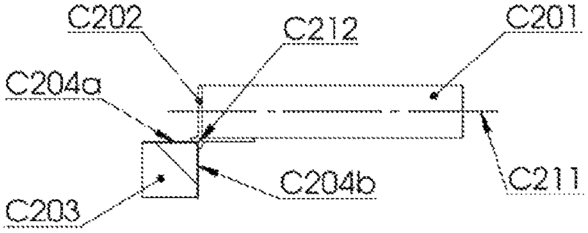
Figure 20D:
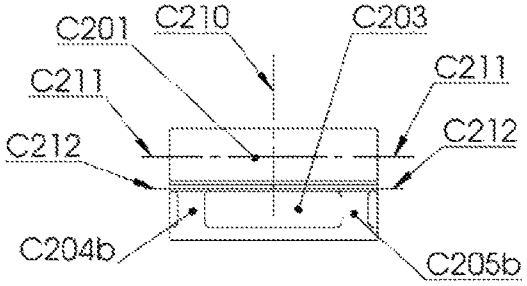

The hinge assembly profile, as shown in FIG. 19E, is similar to that of the hinge assembly B107 described in relation to the embodiment B audio transducer, however rather than having two hinge structures with one on either side of the assembly this hinge assembly variant C102 comprises a single longitudinal hinge assembly structure extending across a substantial portion of the length of the assembly and configured to span across a substantial portion of the width of the associated diaphragm structure C101. This design provides restraint at both ends of the axis of rotation and achieves the desired single-degree-of-freedom result. A single pair of flexible hinge elements C105*a* and C105*b* angled relative to one another, extend across the width of the diaphragm structure in situ. In the preferred implementation of this variant, the pair of flexible hinge elements C105*a* and C105*b* are oriented substantially perpendicular/orthogonal relative to one another, and are rigidly coupled at a junction adjacent the diaphragm base frame C103 on the diaphragm side. It will be appreciated that other relative angles are also possible as described for hinge assembly B107 above. The hinge elements C105*a* and C105*b* are substantially planar and thin such that they are capable of resisting tension/compression forces within their respective planes but flex/deform in response to forces that are normal to their respective planes. An opposing end of each hinge element C105*a*, C105*b* rigidly couples a single connecting block C104 on the transducer base structure side. The connecting base block C104 is similar to the base blocks B205 and B206 described in relation to hinge assembly B107, except that it is a single longitudinal block configured to extend across a substantial portion of the width of the diaphragm structure. In an assembled form and during operation, the diaphragm is configured to rotate about an approximate axis of rotation C107. C109 indicates the coronal plane of the diaphragm body and C108 indicates the sagittal plane of the diaphragm body.

The hinge assembly C102 may be manufactured from any suitable material and method as described under section 3.3.1b above, including for example using wire-electrical-discharge-machining (WEDM) of titanium.

FIGS. 20A-20D show another variation of a hinge assembly of the invention. The figure shows a schematic of a diaphragm assembly C201 being rigidly coupled to the hinge assembly. The hinge assembly comprises a diaphragm base frame C202 that may be the same or similar to the diaphragm base frame described for hinge assembly B107. In particular, the diaphragm base frame is configured to rigidly couple the diaphragm assembly including the diaphragm structure and preferably also the associated coil winding as previously described. The diaphragm base frame may be made from any suitable material as previously described in relation to assembly B107, such as aluminium. It will be appreciated that the diaphragm base frame is shown here for exemplary purposes to represent a component for coupling each hinge joint to the diaphragm structure. It will be appreciated that other components may alternatively be used and/or the hinge joints may be directly coupled to the diaphragm structure.

The hinge assembly further comprises a single pair of flexible hinge members C204 and C205 and that are connected at the diaphragm base frame end of the hinge assembly. The opposing ends of the hinge members are rigidly coupled to a connecting block C203 configured to couple (and form part of) the transducer base structure. Each hinge member C204 and C205 has a pair of flexible hinge elements C204*a, b* and C205*a,b* respectively, that are angled relative to one another. Each pair of hinge elements forms a hinge joint. In this example, two hinge joints are provided on either side of the assembly, with corresponding elements of the joints being formed by the same member/sheet of material. Each hinge member C204, C205 is configured to extend across a substantial portion of the width of the diaphragm structure in situ. In the preferred implementation of this variant, the pair of flexible hinge members, and the pair of flexible hinge elements of each joint, are oriented substantially perpendicular/orthogonal relative to one another. It will be appreciated that other relative angles are also possible as described for hinge assembly B107 above. The hinge elements are substantially planar and thin such that they are capable of resisting tension/compression forces within their respective planes but flex/deform in response to forces that are normal to their respective planes. In situ, the hinge elements are preferably only substantially flexible about axes that are substantially parallel to the intended axis of rotation. The connecting block C203 is wedge shaped to have an angled surface for coupling the ends of the flexible hinge elements. The block C203 may be formed from any suitable material as described for the hinge assembly B107, such as aluminium.

Each flexible hinge member C204, C205 comprises a central recess that extends, centrally across a substantial portion of the width of the member to thereby form two flexible hinge elements of reduced width (C204*a*/C205*a* for the first hinge member and C204*b*/C205*b* for the second hinge member). The hinge elements are therefore sections of a common member in this example, and overall they form two pairs of flexible hinge joints located at either side of the diaphragm assembly C201. In some embodiments, these hinge elements may be separate and not connected by a central bridge. With this hinge assembly, the diaphragm assembly C201 is configured to rotate about an approximate axis of rotation C212. C211 indicates the coronal plane of the diaphragm body and C210 indicates the sagittal plane of the diaphragm body.

The two hinge joints formed by the two pairs of flexible hinge elements C204*a*/C204*b* and C205*a*/C205*b* are similar to the two hinge joints B201 and B203 described for the hinge assembly B107 of the embodiment B audio transducer. In this example the flexible hinge members, base frame C202 and connecting block C203 may be formed integrally but preferably these parts of the hinge assembly are separate and connected to one another via any suitable rigid fixing mechanism. For example, to form the hinge assembly, the flexible hinge elements C204*a*, C204*b*, C205*a* and C205*b*, may be manufactured by stamping or laser cutting from a single sheet of material, such as titanium, and then folding the sheet by the desired relative angle, such as 90 degrees. The corner of the fold can then be attached using any suitable fixing method, such as an adhesive agent and for example epoxy adhesive, to the diaphragm base frame C202. As this fold extends a substantial portion or the entire width of the diaphragm base frame C202, the fixing (e.g. adhesive) surface area is improved. The opposing ends of the hinge elements are connected to the respective edge of the connecting block C203, via any suitable fixing method as explained for hinge assembly B107, for example via a suitable adhesive agent. The connecting block C203 comprises a flattened or substantially planar edge region at either end of the angled surface for increasing the connection surface area with the hinge elements. The opposing ends of the flexible hinge elements (on the transducer base structure side) also span a substantial portion of or the entire width of the audio transducer, which provides improved connection (e.g. adhesive) surface area.

Because the thickness of the flexible hinge element is substantially uniform and/or consistent along its length and width (being cut from a flat sheet) a stress raiser exists at all the connection joints, and there is a risk of the connection failing, the flexure breaking off or the fracture creaking. To help prevent this, the width of each flexible hinge element C204*a*, C204*b*, C205*a*, C205*b* increases at locations adjacent the connection joints with the connecting block C203 and the diaphragm base frame C202. In other words the respective ends of the flexible hinge elements C204*a*, C204*b*, C205*a*, and C205*b* are flanged to achieve a stronger connection. The flanged region/small radii are used to gradually widen each flexible hinge element close to each area of connection, so that as the diaphragm rotates, the stress within the flexible hinge element is reduced in the region of connection to both the diaphragm base frame C202 and connecting block C203 as compared to stress in the narrow middle region. For example, flexible hinge element C205*a* widens gradually by use of two radii (i.e. comprises a flange) at region C209 where it connects to the connecting block C203. Flexible hinge section C205*a* also widens gradually by use of two radii (i.e. comprises a flange) at region C208 where it connects to the diaphragm base frame C202. The other three flexible hinge elements C204*a*, C204*b* and C205*b* also comprise similar flanges at the connection regions.

Figure 21:
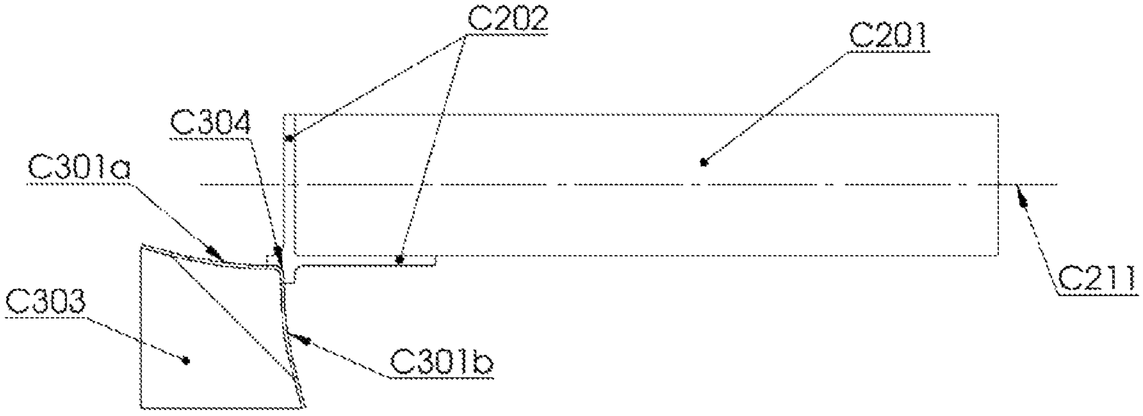
FIG. 21 shows a side elevation of the simplified driver of FIGS. 20A-20D, except with an alternative hinge assembly whereby flexures are in a naturally bent state when the diaphragm is in its rest position.

FIG. 21 shows yet another alternative hinge assembly similar to that described above in relation to FIGS. 20A-20D. In this variation, the hinge joint C301 comprises two flexible hinge elements C301*a* and C301*b* which are in a naturally bent state when the diaphragm assembly C201 is in its rest/neutral position. If the diaphragm C201 starts to rotate clockwise, flexible hinge element C301*a* starts to straighten, and flexible hinge element C301*b* flexes more. Likewise, if the diaphragm C201 starts to rotate anticlockwise from the neutral position, flexible hinge element C301*b* starts to straighten, and flexible hinge element C301*a* flexes more. The flexible hinge elements are preferably only slightly bent in their neutral state, as it aids with resistance of tensile and compressive forces without flexing/buckling, which in turn increases the frequency of breakup modes involving all translational modes, and rotational modes other than the main diaphragm rotational mode The connecting block C303 in this variation comprises angled edges for connecting to the angled ends of the flexible hinge elements. The diaphragm assembly C201 is configured to rotate about an approximate axis of rotation C304 via this hinge assembly, and is connected to the hinge assembly via a similar base frame C202. This hinge assembly, with slightly bent flexible hinge elements is not as preferable as hinge assemblies that have straighter flexible hinge elements, all else being equal.

Figure 22:
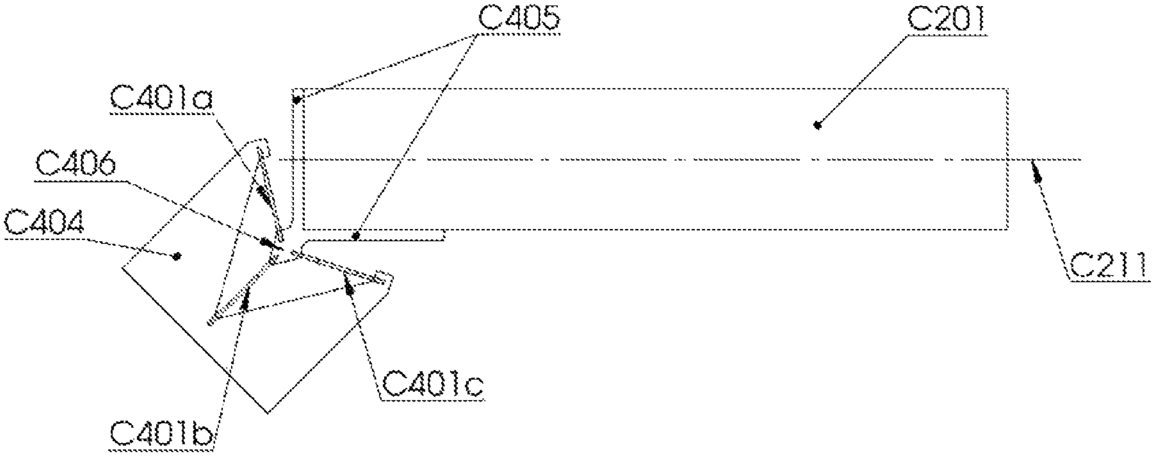
FIG. 22 shows a side elevation of the simplified driver of FIGS. 20A-20D, except with an alternative hinge assembly whereby 3 flexures (on each side) are used, instead of 2.
Figure 23A:
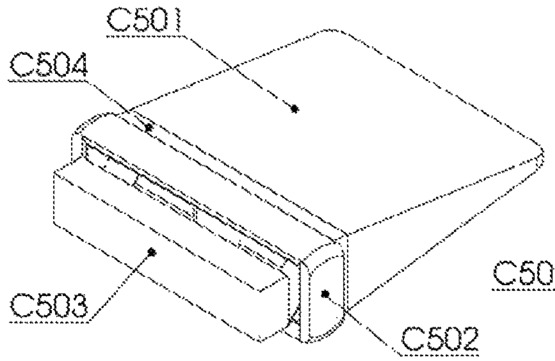
Figure 23B:
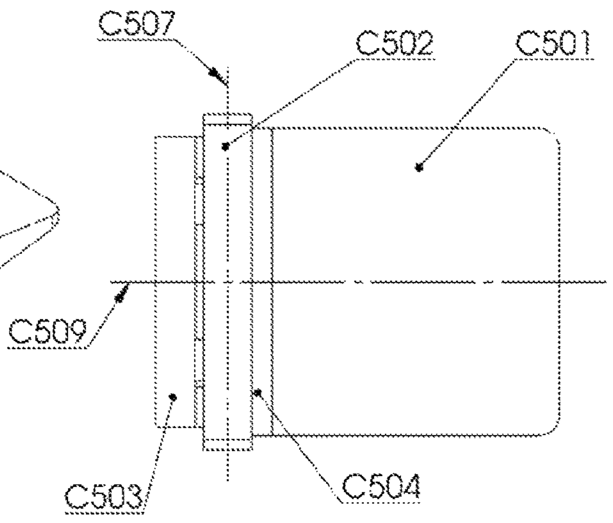
Figure 23C:
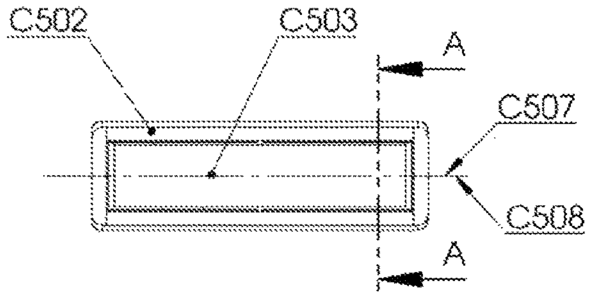
Figure 23D:
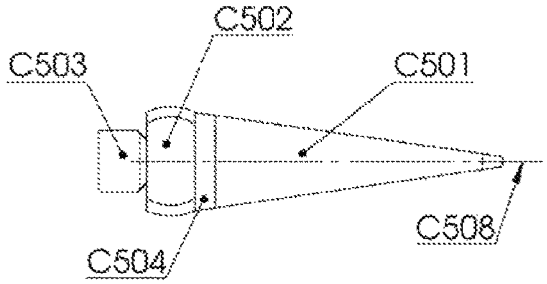
Figure 23E:
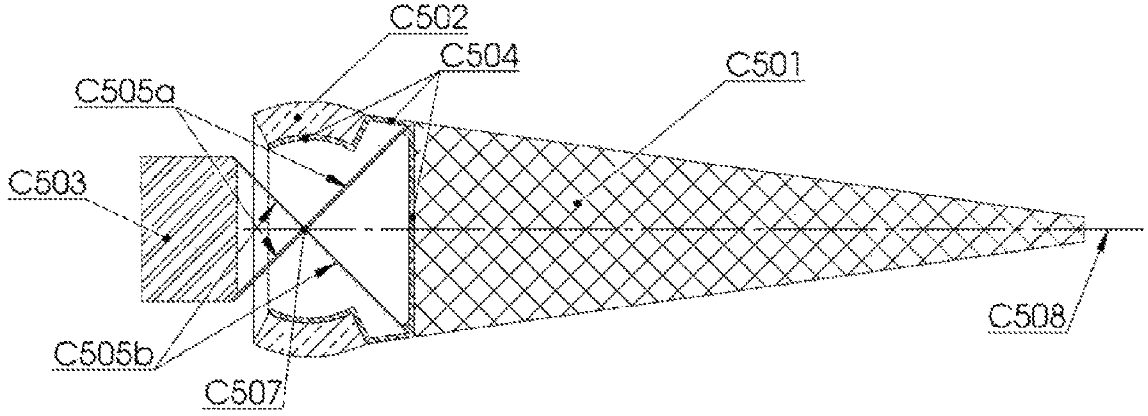

FIG. 22 shows yet another variation of a flexible hinge assembly of the invention. In this example, a hinge joint C401 comprises three flexible hinge elements C401*a-c* which extend from the diaphragm base frame C405 toward the connecting block C404. The flexible hinge elements C401*a*, C401*b* and C401*c* are substantially planar and angled relative to one another such that their combined effect causes the hinge assembly to resist translational movement along three orthogonal axes, and rotational movement about two orthogonal axes (other than the axis of rotation). Each hinge element may be a single longitudinal component or otherwise comprise a plurality of longitudinally spaced (connected or disconnected) sections, with at least one section on either side of the assembly. The flexible hinge elements may be radially displaced substantially evenly, or otherwise in some cases unevenly. There may be any number of two or more flexible hinge elements angled relative to one another and connecting between the diaphragm base frame and the connecting block. The connecting block C404 comprises a sharp concave surface for connecting to the ends of the flexible hinge elements C401*a-c*. The diaphragm base frame comprises a connection flange for connecting to a corresponding end of each element C401*a-c*. The connecting block and/or the diaphragm base frame may comprise recesses or grooves for accommodating the corresponding ends of the flexible hinge elements. Any suitable connection mechanism may be used to connect the hinge elements to the diaphragm base frame and/or connecting block, such as via soldering or an adhesive agent, for example an epoxy adhesive. With this assembly, the diaphragm assembly C201 is configured to rotate about an approximate axis of rotation C406 that is adjacent the ends of the hinge elements at the diaphragm base frame.

FIGS. 23A-23E show a schematic of yet another variation of a flexible hinge assembly designed in accordance with the principles of the hinge assembly B107 previously described. This hinge assembly comprises at least one pair of substantially planar hinge elements/plates C505*a* and C505*b* that are angled relative to one another and that have planes that intersect intermediate their lengths to form an "X" configuration (hereinafter referred to as an "X-flexure" hinge joint). Each pair of hinge elements are preferably orthogonal relative to one another but other relative angles may be possible. In the preferred configuration of this example, there are two pairs of X-flexure hinge joints, one on each side of the hinge assembly to locate on either side of the diaphragm body (similar to the configuration of the hinge joints of assembly B107). It will be appreciated that a single longitudinal X-flexure hinge joint may alternatively be used.

The diaphragm assembly C501 is rigidly coupled to a diaphragm base frame C504 which is attached to coil windings C502 via any suitable connection mechanism as previously described. The flexible hinge elements C505*a*, C505*b*, C601*a* and C601*b* have one end/edge rigidly connected to the diaphragm base frame C504 and the opposing end rigidly connected to the connecting block C503, again via any suitable method as previously described. A first pair of flexible hinge elements C505*a* and C505*a* form the first X-flexure structure, hinge joint C505, on one side of the hinge assembly, and the second pair of flexible hinge elements C601*a* and C601*b* form the second X-flexure structure, hinge joint C601 on the other side. The axis of rotation C507 of this hinge assembly is located approximately at the line of intersection of the planes of each pair of flexible hinge elements. C508 indicates the coronal plane of the diaphragm body and C509 indicates the sagittal plane of the diaphragm body.

In this example, the diaphragm base frame comprises an alternative form to accommodate the substantially separated ends of each X-flexure structure. Similarly the connecting block C503 comprises an alternative form to accommodate the X-flexure structure.

FIGS. 24A-24D show the hinge assembly described above in relation to FIGS. 23A-23E but with the connecting block C503 removed for clarity. As shown each X-flexure structure comprises a pair of hinge elements that are adjacent one another and touching but not overlapping. In alternative configurations of this example the hinge elements may be overlapping or may be slightly separated. The base frame C504 comprises upper and lower lateral plates for connecting to the upper and lower longitudinal inner faces of the coil winding C502, and an end plate connecting between the upper and lower lateral plates for connecting to a corresponding end face of the diaphragm structure. Each flexible hinge element is configured to connect adjacent an upper or lower edge of the end face of the diaphragm structure.

FIGS. 25A-25D show yet another variation of a hinge assembly designed in accordance with the principles described for hinge assembly B107. In this example, the assembly comprises at least one hinge joint C702, which in turn comprises pair of flexible hinge elements C702*a* and C702*b* that are angled relative to one another but are substantially spaced at both end edges. In other words, the hinge elements of each pair are spaced at the base frame C706 end and the connecting block C701 end. In the preferred configuration of this example, two hinge joints C702 and C703 exist and are configured to locate on each side of the sagittal plane of the diaphragm body C710, each pair having one flexible hinge element on each side of the coronal plane C709, to suspend the diaphragm assembly C501. The diaphragm base frame is similar to that described for the hinge assembly shown in FIGS. 23A-23E and 24A-24D, except the base frame further comprises an angled outer rim to which the respective ends of the hinge elements connect. The flexible hinge elements C702*a*, C702*b*, C703*a*, and C703*b* in this example are rigidly connected to one of the longitudinal rim edges of the diaphragm base frame. For each flexible hinge element pair, one hinge element has its end connected to one of the longitudinal edges of the diaphragm base frame C502 and the other hinge element has its corresponding end connected to the other opposing longitudinal edge of the diaphragm base frame C502. The other end of the flexible hinge elements is connected to the connecting block C701, configured to couple the transducer base structure. The axis of rotation C707 of the diaphragm assembly with this hinge assembly, relative to the connecting block C701 is located approximately at the intersection of the planes of the each pair of flexible hinge elements. The angle C708 between the planes of each pair of flexible hinge elements may be orthogonal or otherwise other angles may suffice. In this example, the angle C708 is approximately 60 degrees. An angle of 90 degrees may perform better in terms of raising the frequency of the lowest unwanted translational and rotational breakup modes, however, in certain applications an angle of at least 60 degrees will also perform suitably.

FIGS. 26A-26D show yet another variation of a hinge assembly similar to that described above in relation to FIGS. 23A-23E and 24A-24D (with no connecting blocks shown). In this example, each X-flexure structure, for example hinge joint C801, comprises a pair of overlapping hinge elements C801*a* and C801*b* that intersect along a substantial portion or an entirety of their widths. Two X-flexure structure hinge joints C801 and C802 are located on either side of the diaphragm assembly in this example, however it will be appreciated a single X-flexure hinge joint may extend substantially along the width of the diaphragm assembly. The flexible hinge elements C801*a* and C801*b* may be orthogonal relative to one another. For this hinge assembly, the diaphragm is configured to rotate about an approximate axis of rotation C803 that is located at the intersection of the hinge elements of each hinge joint. C804 indicates the coronal plane of the diaphragm body and C805 indicates the sagittal plane of the diaphragm body.

FIGS. 27A-27B show an example of an X-flexure structure, hinge joint C801, as described for the assembly shown in FIG. 26A-26D. The hinge elements C801*a*/C801*b* may comprise a consistent cross-section throughout the width and may be manufactured using wire electrical discharge machining (WEDM) from titanium for example. Other methods of manufacture and forms are also envisaged however as previously described. The flexible hinge element C801*a* on one plane passes through flexible hinge element C801*b* at another plane that is approximately perpendicular to the first plane, and these are connected at the intersection C903. The thickness of the hinge elements is increased at the intersection C903 to help mitigate performance degradation due to stress raisers, as previously described.

3.3.2b Torsional Hinge Joints

FIGS. 28A-28E show a schematic of yet another variation of a hinge assembly designed in accordance with the principles of hinge assembly B107. The hinge assembly comprises at least one longitudinal and substantially resilient torsional member that may be in the form of a torsion beam for instance, having a pair of flexible and resilient longitudinal hinge elements that are angled relative to one another and that are connected at their intersection.

In the preferred configuration of this example, a torsional member is located at either side of the diaphragm assembly C1001, to form two hinge joints C1005 and C1006. Each torsional member is resilient in torsion, but is substantially rigid/stiff in response compression, tension and shear forces. The first torsional hinge joint C1005 comprises a pair of hinge elements C1005*a* and C1005*b* and the second torsional hinge joint C1006 comprises a pair of hinge elements C1006*a* and C1006*b*. The two pairs of hinge elements may be separate (to form two separate torsional members) and connected at either side of the diaphragm assembly, or alternatively the two pairs may be connected or integral to form a single torsional member extending across the width of the diaphragm and substantially past either side of the diaphragm. In this example, the hinge elements are sections of a single torsional member in each joint. The hinge elements of each torsional hinge joint are preferably angled orthogonally relative to one another, although other angles are also envisaged. Each pair of hinge elements C1005*a*/C1005*b* and C1006*a*/C1006*b* projects/protrudes substantially past the respective side of the diaphragm in a direction substantially parallel to the intended axis of rotation. Each torsional member comprises a substantially L-shaped cross-section. In the assembled state, the inner surface of the L-shaped member faces toward the diaphragm assembly. In this manner, one hinge element of each pair supports the diaphragm adjacent or against one face, and the other hinge element of the pair supports an adjacent face of the diaphragm. One end of each torsional member is rigidly connected to an end face of the diaphragm assembly C1001. Such a connection may be direct or via a diaphragm base frame C1002 as previously described in other examples. A terminal end of each torsional member C1006 and C1005 that is distal from the diaphragm assembly is supported by a connecting block C1004, C1003 respectively. Each connecting block C1003, C1004 is rigidly connected to the transducer base structure in situ and/or forms part of the transducer base structure.

Each torsional member is formed from a substantially stiff material and/or geometry capable of resisting tension, compression and shear forces in the planes of the respective hinge elements of the beam. For example the torsional member is made from a substantially high modulus material such as titanium. The diaphragm base frame C1002 and the connecting blocks C1003, C1004 are preferably formed from a substantially stiff material, having a high specific modulus. For example, the diaphragm base frame and the connecting block may also be formed from titanium but are formed thicker relative to the torsional member to increase the rigidity of these components. The torsional member(s) are rigidly connected to the diaphragm base frame C1002 via any suitable connection method, for example they may be adhered using a suitable adhesive agent, such as an epoxy resin or welded. The torsional member(s) are also rigidly connected to the connecting blocks C1003, C1004 via any suitable method, for example they may be adhered using a suitable agent, such as an epoxy resin or welded. The diaphragm base frame C1002 is rigidly connected to the diaphragm assembly C1001 via any suitable connection method, such as again via an adhesive or welding. Also, the connecting blocks C1003, C1004 are rigidly connected to the transducer base structure of the audio transducer via any suitable connection method, such as via an adhesive or welding. It will be appreciated that in alternative embodiments, other connection methods for the above described components may be used or the components may be integrally formed in some configurations. The two torsional hinge joints C1005 and C1006 provide relatively high compliance to rotate about an approximate axis of rotation C1009, and relatively low compliance in all other rotational and translational directions, which helps push the associated breakup frequencies out of the range of the FRO. C1010 indicates the coronal plane of the diaphragm body and C1011 indicates the sagittal plane of the diaphragm body.

Figure 29A:
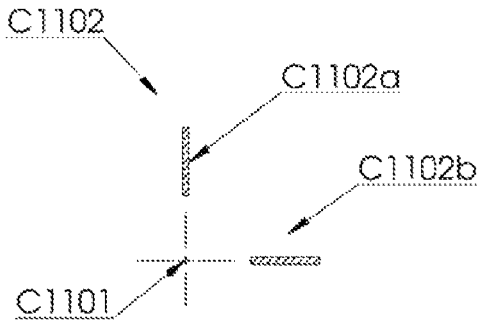
Figure 29B:
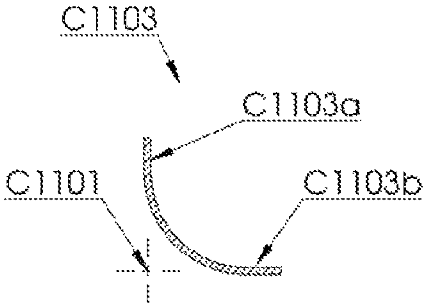
Figure 29C:
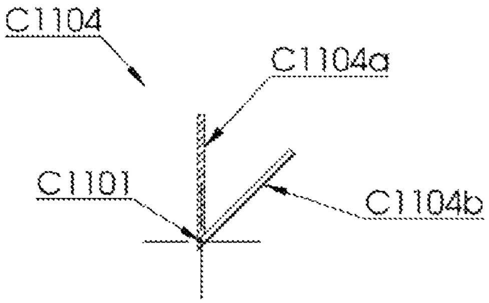
Figure 29D:
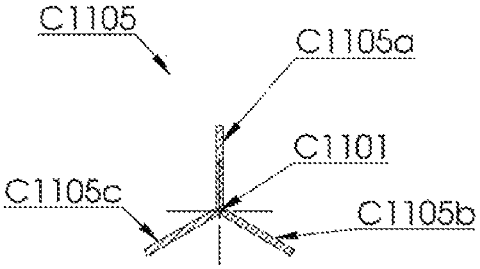
Figure 29E:
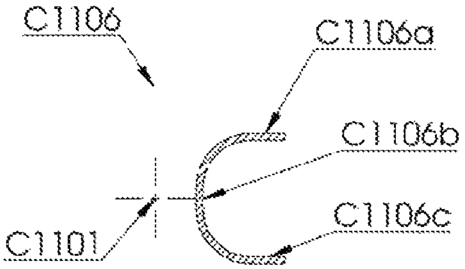
Figure 29F:
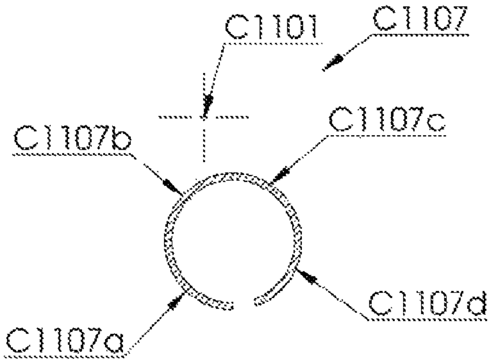

FIGS. 29A-29F shows variations of the cross-sectional shape/form of the torsional members of the hinge assembly described in relation to FIGS. 28A-28E. Each torsional member design shown in these figures achieves relatively high compliance to rotation about an approximate axis of rotation C1101, and relatively low compliance/high stiffness in all other rotational and translational directions. In other words, each member is substantially resilient and flexible in torsion, but substantially stiff/rigid in response to tension, compression and shear forces. FIG. 29A shows a torsional hinge joint C1102 where the two hinge elements C1102*a-b* of the beam are angled relative to one another and separated/not contacting at their adjacent ends. One hinge element may be coupled to one face of the diaphragm assembly and the other hinge element may be coupled to an adjacent face. In combination the form a torsional hinge joint. FIG. 29B shows a torsional hinge joint C1103 which comprises a substantially arcuate/curved, longitudinal body with two flexible hinge elements or sections C1103*a-b* that are angled relative to one another. Each hinge element is a section of the same member in this embodiment. A first flexible hinge element C1103*a* adjacent one edge of the body may be configured to couple a first face of the diaphragm assembly, and a section flexible hinge section C1103*b* adjacent the opposing edge may be configured to couple a second face of the diaphragm assembly adjacent the first face. FIG. 29C shows a torsional hinge joint C1104 comprising two flexible hinge elements, C1104*a-b* that are acutely angled relative to one another. FIG. 29D shows a torsional hinge joint C1105 comprising three flexible hinge elements, C1105*a-c* that are uniformly radially spaced and intersecting at a common axis forming the axis of rotation C1101. FIG. 29E shows a U-shaped or horseshoe shaped torsional hinge joint C1106 having a central flexible hinge section C1106*b* that is angled relative to two other flexible hinge sections C1106*a* and C1106*c* on opposing sides of the central section. FIG. 29F shows a torsional hinge joint C1107 that is substantially cylindrical but having a recess along the length of the body, such that the body comprises multiple hinge element sections C1107*a-d* that are angled relative to one another. A plurality of uniformly spaced flexible hinge sections of a single member that are angled relative to one another form the torsional hinge joint in this example.

In the examples of FIGS. 19A-28E as well as FIGS. 29C and 29D, the change in orientation between the pair of hinge elements is abrupt or sharp. Whereas, in the examples of FIGS. 29B, 29E and 29F, the change in orientation between the hinge elements is gradual or smooth.

In the examples of FIGS. 28A-28E and 29A-29F, the hinge elements form a wall or a plurality of walls of the torsional member. In some configurations, the walls are substantially planar and in other cases the walls are curved or substantially arcuate. For example, FIGS. 28A-28E, 29A, 29C and 29D show torsional members with substantially planar walls and FIGS. 29B, 29E and 29F show torsional members with substantially curved walls.

Note that, as can be seen above in the cases of embodiments of FIGS. 29E and 29F, in the case that the flexible elements operate substantially in torsion the axis of rotation C1101 does not necessarily lie at the intersection of the planes occupied by the elements. Finite element analysis is one way in which the location of the axis of rotation may be determined.

FIG. 30 shows yet another variation of a hinge assembly that is similar to that described in relation to FIGS. 28A-28E. In this hinge assembly each torsional hinge joint C1201 and C1207 is similar to that described in relation to FIGS. 28A-28E except that each longitudinal, flexible hinge element comprises a cross-sectional thickness that varies along the length of the element. In particular, each flexible hinge element C1201*a*, C1201*b*, C1207*a* and C1207*b* comprise regions of increased thickness at the sections of the element configured to couple the diaphragm base frame C1002 and/or the connecting blocks C1003, C1004. At the junctions between the thicker and thinner sections of each hinge element the change in thickness is tapered (e.g. radii exist in these regions) such that the change is gradual (for example at locations C1203-C1206), and this mitigates performance degradation due to stress raisers. It will be appreciated that in alternative embodiments the change in thickness may be stepped. For example, flexible hinge element C1201*a* has a small radius/taper at region C1205 where it gradually increases in thickness close to diaphragm base frame C1002, and also a small radius/taper at region C1203 where it gradually increases in thickness close to connecting block C1004. Similarly, flexure hinge element C1201*b* has a small radius/taper at region C1206 where it gradually increases in thickness close to diaphragm base frame C1002, and also a small radius/taper at region C1204 where it gradually increases in thickness close to connecting block C1004. The thicker parts will undergo less stress during normal operation compared to the similar areas in the audio transducer of FIGS. 28A-28E, and as such, these parts may be adhered rather than welded to the diaphragm base frame C1002 or to the connecting blocks C1003 and C1004. Epoxy adhesive may be used instead with limited risk of the adhesive failing, a crack forming and the part creaking or breaking during operation. It will be appreciated that alternative connection methods may be used however, such as welding.

FIG. 31 shows yet another variation of a hinge assembly similar to the assembly described for FIGS. 28A-28E, except each flexible hinge element comprises an intermediate region (at the protruding part of the element) of reduced cross-sectional width. In other words, each hinge element comprises a cross-sectional width that increases in regions where the element connects to the diaphragm base frame C1002 and the connecting blocks C1003, C1004. This means that the flexible hinge elements C1301*a*, C1301*b*, C1307*a* and C1307*b* are narrower at an intermediate section extending between the wider end sections. Preferably the intermediate narrow section comprises a substantial portion of the length of each element. At the junctions between the wider and narrower sections of each hinge element the change in width is tapered (e.g. at regions C1303, C1304, C1305 and C1306) which means the cross-section changes gradually from wider to narrower regions and vice versa, which mitigates performance degradation due to stress raisers. The wider parts will undergo less stress during normal operation compared to the similar areas in the audio transducer of FIGS. 28A-28E, and as such, these parts do not necessarily need to be welded to a diaphragm base frame or connecting block and a weaker connection method such as adhesion may be used instead. The widening described, limits the risk of the adhesive failing, a crack forming and the part creaking or breaking during operation. It will be appreciated that alternative connection methods may be used however, such as welding.

In each of the above torsional member examples, it is preferred that the the torsional member is arranged to extend substantially in parallel and in close proximity to the axis of rotation, and has a height in direction perpendicular to the coronal plane of the diaphragm, wherein the height as measured in millimetres is approximately greater than twice the mass of the diaphragm assembly as measured in grams. Preferably the torsional member has a width, in direction parallel to the diaphragm and perpendicular to the axis, which is when measured in millimetres approximately greater than two times the mass of the diaphragm assembly as measured in grams. Preferably the torsional member has a width and a height of the as measured in millimetres approximately greater than four times the mass of the diaphragm assembly as measured in grams, or more preferably greater than 6 times, or most preferably greater than 8 times.

Alternatively or in addition in each of the above torsional member examples, the width and height of each torsional member is greater than 3% of the length of the diaphragm structure or body from the axis of rotation to thee most distal periphery of the diaphragm structure/body. More preferably the width and height are greater than 4% of the length associated with the diaphragm body/structure (from the axis of rotation to the most distal periphery). Preferably one or more of the torsional members has an average dimension in the direction perpendicular to the axis of rotation, that is greater than 2 times the square root of the average cross-sectional area (excluding glue and wires which do not contribute much strength), as calculated along parts of the torsional spring member length that deform significantly during normal operation, or more preferably greater than 3 times, or more preferably greater than 4 times, the square root of the average cross-sectional area, as calculated along parts of the spring length that deform significantly during normal operation. Preferably at least one or more torsional members are mounted at or close to the axis of rotation and, in combination, directly providing at least 50% of restoring force when diaphragm undergoes small pure translations in any direction perpendicular to the axis of rotation.

3.3.3 Embodiment D Audio Transducer

Figure 32E:
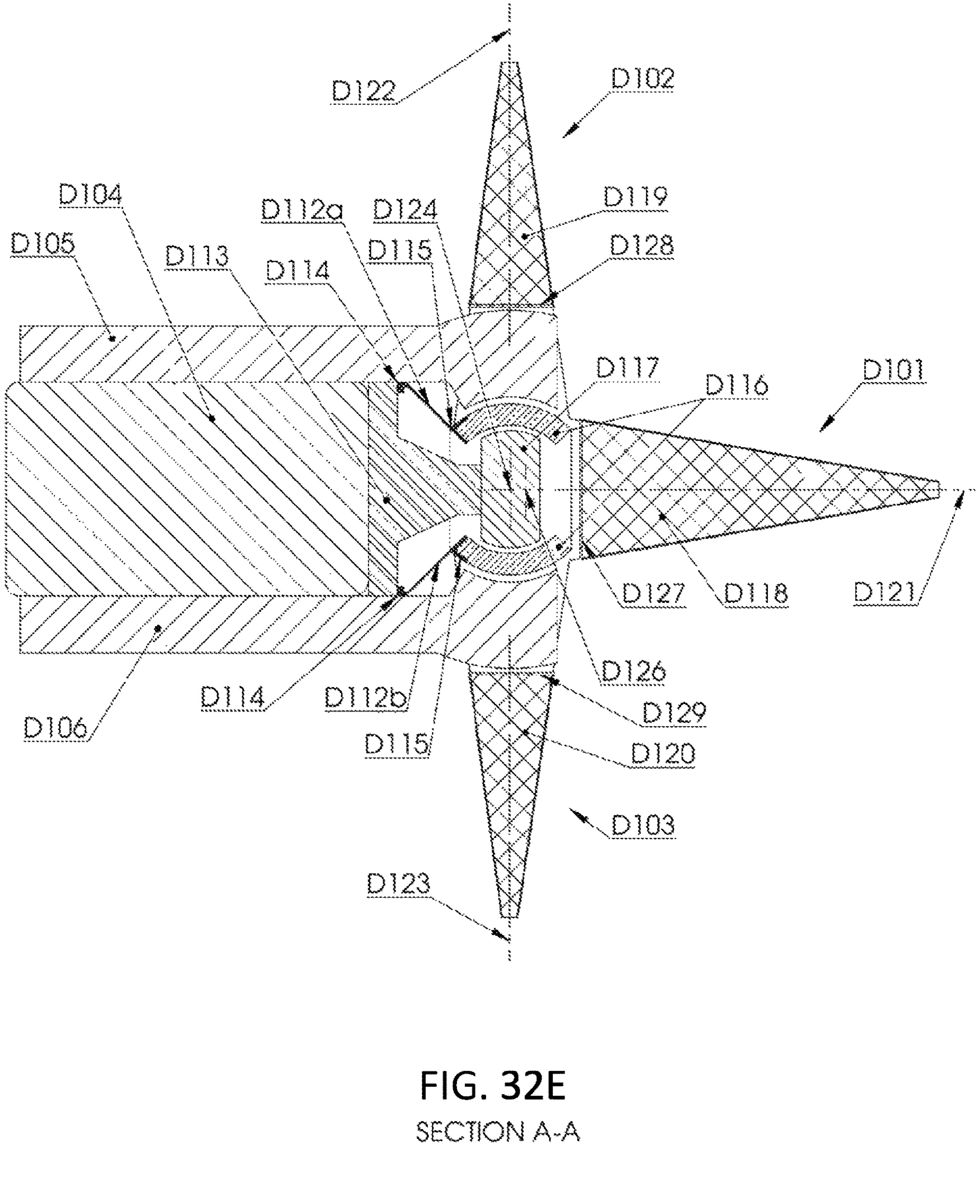

Referring briefly to FIG. 32E, a flexure hinge assembly in accordance with the principles described above is shown implemented in an alternative audio transducer embodiment of the invention. The audio transducer of this embodiment comprises a diaphragm assembly that is hingedly coupled via a hinge system to a transducer base structure. The hinge assembly is similar to that described in relation to FIGS. 25A-25E and comprises at least one flexible hinge joint D112 (but preferably two located at either side of the diaphragm assembly), and each hinge joint D112 having a pair of flexible hinge elements D112*a* and D112*b* angled relative to one another and rigidly coupled to the diaphragm assembly and the transducer base structure. As shown the hinge elements D112*a-b* couple the coil winding D116 to connect to the diaphragm assembly at one end, and couple a connecting block D113 at the opposing end of the transducer base structure. The ends of the flexible hinge elements are thickened and/or widened to strengthen the connection at these regions. Each hinge element is formed from a material that is substantially stiff to resist compression and tension forces in the plane of the material. Also each structure is capable of resisting rotation about axes that are orthogonal to the intended axis of rotation of the diaphragm assembly, but is compliant in terms of rotation about the diaphragm assembly's axis of rotation. Each hinge element is also closely associated with the diaphragm assembly at one end and the transducer base structure at the opposing end to minimise unwanted resonances within the transducer's FRO as described for hinge assembly B107 of embodiment B.

In this particular embodiment, the diaphragm assembly comprises multiple diaphragm structures that are radially spaced. The diaphragm assembly comprises three diaphragms D101, D102 and D103 connected at their outer sides/peripheries by rigid side frames D107 and D108, which are connected in turn to the coil windings D116. Each side frame may be constructed from aluminium. Each diaphragm structure comprises a core, D118, D119 and D120, normal stress reinforcement D109, D110, D111 on the major faces of each diaphragm body, and also inner shear stress reinforcement members embedded within each diaphragm as described under the configuration R1-R4 diaphragm structures under section 2.2. The diaphragm structures comprise an outer periphery that is free from physical connection as defined under section 2.3 of this specification.

The transducer base structure comprises a magnet D104, outer pole pieces D105 and D106, base block D113, and inner pole piece D117. Each flexible hinge element of the hinge system is rigidly attached to the coil windings D116 at one end D115 and to the base block D113 at the other end D114. D125 indicates the sagittal plane of the diaphragm assembly and all three diaphragm structures. D121 indicates the coronal plane of diaphragm D101. D122 indicates the coronal plane of diaphragm D102. D123 indicates the coronal plane of diaphragm D103. The normal stress reinforcement D109, D110, D111 does not cover the major faces of each diaphragm body in regions distal to the axis of rotation D124 or distal to the base region of the diaphragm assembly D126. It will be appreciated that any other diaphragm structure described under sections 2.2 or 2.3 of this specification may be utilised. Diaphragm base reinforcing D127, D128 and D129 may be provided on the base face of each diaphragm body D118, D119 and D120 to improve the rigidity of each diaphragm.

FIGS. 33A-33E show the audio transducer of FIGS. 32A-32E with a substantially cylindrical diaphragm assembly housing incorporated. The transducer base structure is rigidly attached to the diaphragm housing. The housing comprises a diaphragm housing body D203 and two diaphragm housing sides D204. Multiple vent holes D205 on each diaphragm housing side allows air to flow in the direction of the arrows D201 in one side and out the other side following arrows D202 as the diaphragms rotate in one direction during operation. The diaphragm housing is a compact and rigid geometry and preferably is designed so that it does not resonant over the FRO of the transducer. This transducer may mounted in an enclosure or baffle to help prevent cancellation of positive sound pressure emanating from one side of the transducer with negative sound pressure emanating out the other. As this transducer is able to operate over a large frequency bandwidth without mechanical resonances of the diaphragm, it is also preferably to decouple this transducer from an enclosure or baffle, for example by using a decoupling mounting system of the invention as described under section 4 of this specification.

The use of multiple diaphragms is useful for applications that require high sound pressure level at bass frequencies, a compact form factor, and high sound quality (as a result of minimal energy storage).

This driver can be configured to use any of the other hinge assemblies described in this document. The size of the driver can be scaled up in size to displace more air or scaled down in size to improve the high frequency response, depending on the application.

3.3.4 Personal Audio Application

The embodiment B audio transducer, including the variations of the flexible hinge systems described herein, and/or the embodiment D audio transducer may be incorporated in a personal audio device. As defined under section 5, a personal audio device may be configured to be located within 10 cm of the ear in use, for example in a headphone or bud earphone. For example, the audio transducers of the audio devices described under embodiments K, W and X in section 5 may be substituted by the embodiment B or D audio transducers, and/or any one of the flexible hinge systems herein described may be implemented in these embodiments without departing from the scope of the invention.

4. Decoupling Mounting Systems and Audio Transducers Incorporating the Same 4.1 Introduction A disadvantage of decoupling a conventional audio driver from an enclosure is that resonances inherent in the driver may actually be worsened as they cannot be dissipated into the enclosure. Also, if one decouples a typical conventional driver, having a thin membrane diaphragm and a rubber surround suspension, then the resulting reduction in enclosure resonance excitation fails to dramatically improve subjective sound quality because there are still diaphragm and surround resonances clouding audio reproduction in the operating bandwidth. Hence, the benefit is limited and the advantages of decoupling may not be worth the disadvantages and associated cost.

Similarly, decoupling a small, e.g. mid-range driver-enclosure system, from a larger bass driver-enclosure system means that although excitation of the latter system is reduced, there is a downside being that internal resonances inherent in the former system will not be dissipated.

Decoupling systems have further non-audio-related disadvantages including increased potential for damage, for example during transportation, as well as the additional product complexity and cost.

This means that the overall benefit may not be sufficient for decoupling systems to be worthwhile in conventional drivers.

On the other hand, audio drivers incorporating design features of the present invention can have low or zero energy storage within the operating bandwidth due to minimised internal resonances, at least within the operating bandwidth. There is therefore little or no benefit to be had from dissipating internal resonances from such a driver into an enclosure, as with conventional drivers, since resonances are typically few or non-existent within the driver's FRO.

If a transducer having low or zero internal resonance is rigidly mounted to an enclosure (or housing or stand or baffle etc.) that is not resonance-free, the driver and enclosure will become part of the same system and the driver will take on resonances of the enclosure as well as some new driver/enclosure interaction resonances. This means that decoupling is advantageous in conjunction with other audio transducer design features of the present invention that help to eliminate (shift out of the FRO) or at least mitigate internal driver resonances and improve performance.

For instance, if a substantially thick and rigid diaphragm employing a rigid approach to resonance control (as defined for the configuration R1-R4 diaphragm structures under sections 2.2 of this specification for example), is sufficiently decoupled from an enclosure of an audio transducer then neither enclosure resonances nor diaphragm resonances will cloud audio reproduction within the operating bandwidth.

Similarly, if an audio transducer having a diaphragm structure periphery that is substantially free from physical connection with a surrounding (as defined for the configuration R5-R7 audio transducers described in section 2.3 of this specification for example) is sufficiently decoupled from the enclosure, then both enclosure resonances and diaphragm suspension resonances may be reduced or eliminated within the operating bandwidth, helping to prevent clouding of the audio reproduction. Diaphragm suspensions for such audio transducers can be made to be more geometrically robust against resonances without unduly compromising overall diaphragm compliance and excursion. They also have reduced area so that any resonances that might occur are less audible.

Furthermore, if a base structure of an audio driver that is relatively resonance-free because it is made from rigid materials and has a compact and robust geometry (as defined in section 2.2 of the specification for example), then neither enclosure resonances nor base structure resonances will cloud audio reproduction within the operating bandwidth.

Finally, ferromagnetic diaphragm suspensions are useful in combination with decoupling systems, since diaphragm suspension resonances are practically eliminated without compromising diaphragm excursion and fundamental resonance frequency.

4.2 Decoupling Mounting System Embodiments

Several embodiments of audio transducer decoupling systems of the invention will now be described with reference to figures.

4.2.1 Embodiment A Transducer—Decoupling System

An exemplary audio transducer decoupling system of the invention and an audio device incorporating the same will now be described with reference to FIGS. 5A-5H, 6A-6I and 7A-7F. Referring to FIGS. 5A-5H, an audio transducer embodiment of the invention (herein referred to as embodiment A) is shown comprising a diaphragm assembly A101 that is pivotally coupled to a transducer base structure A115. The audio transducer is coupled to an exemplary decoupling system A500 of the invention. The audio transducer in this embodiment is a rotational action transducer, but it will be appreciated that the exemplary decoupling mounting system shown may alternatively be used with a linear action transducer. Furthermore, an alternative decoupling mounting system may be designed for a rotational action or linear action audio transducer in accordance with the decoupling design principles and considerations set out in this specification without departing from the scope of the invention.

The audio transducer of embodiment A comprises a diaphragm assembly A101 incorporating a configuration R1 diaphragm structure (as described under section 2.2.1 of this specification) and further comprises a transducing mechanism (not shown) coupled to the diaphragm assembly A101 that is configured to operatively transduce an electric audio signal (or rotational motion in the case of an acoustoelectric transducer corresponding to sound pressure).

The decoupling system A500 mounts the audio transducer A100 to another component, such as a housing A613 (shown in FIG. 6A) of an audio device. The decoupling mounting system also decouples the audio transducer A100 from the other component, such as the associated housing. Effectively, the decoupling mounting system A500 locates between the diaphragm assembly A101 and at least one other part of the audio device. The term "between" in this context is intended to mean both directly and indirectly between two components. For example, in a series of connected components, the decoupling mounting system A500 may be said to lie between two components of the series even if there are one or more other intermediate components between one or both components and the mounting system. For example, the decoupling mounting system locates between the diaphragm assembly and the housing, even if it is only directly connected to the transducer base structure and the housing. This would at least partially alleviate mechanical transmission of vibration between the diaphragm assembly A101 and at least one other part of the audio device in the series.

The decoupling mounting system A500 is configured to compliantly mount two components of the audio device to effectively decouple the diaphragm assembly from at least one other part of the audio device. For example, the decoupling system compliantly mounts two components of the device. It is preferable that the at least one other part of the audio device is not another diaphragm assembly, for example of another transducer in a multi-way speaker system, but rather another part of the audio device separate from the diaphragm assembly A101. In this example, the decoupling mounting system is mounted to the audio transducer base structure A115, to decouple the audio transducer from an associated housing, such as a baffle or enclosure. It is preferred that the decoupling mounting system A500 is configured to compliantly mount two components such that the components are capable of moving relative to one another along at least one translational axis, but preferably along three orthogonal translational axes during operation of the associated transducer. Alternatively, but more preferably in addition to this relative translational movement, the decoupling system A500 compliantly mounts the two components such that they are capable of pivoting relative to one another about at least one rotational axis, but preferably about three orthogonal rotational axes during operation of the associated transducer. In this manner, the decoupling mounting system at least partially alleviates mechanical transmission of vibration between the diaphragm and the at least one other part of the audio device along at least one translational axis, or more preferably along at least two substantially orthogonal translational axes, or yet more preferably along three substantially orthogonal translational axes. In addition, the decoupling mounting system at least partially alleviates mechanical transmission of vibration between the diaphragm and the at least one other part of the audio device about at least one rotational axis, or more preferably about at least two substantially orthogonal rotational axes, or yet more preferably about three substantially orthogonal rotational axes.

The mounting system comprises a pair of decoupling pins A107, A108 extending laterally from either side of the transducer base structure. The decoupling pins A107, A108 are located such that their longitudinal axes substantially coincide with a location A506 of a node axis of the transducer assembly. A node axis is the axis about which the transducer base structure rotates due to reaction and/or resonance forces exhibited during diaphragm oscillation. In practice, the location of the node axis may change during operation. The location A506 to which the decoupling pins coincide, corresponds to the location of the node axis when the transducer assembly is operated in a hypothetical unsupported state, and operated at frequencies substantially lower than those at which unwanted diaphragm resonances occur. Methods of identifying this location A506 will be described in further detail below. It will be appreciated that in some embodiments a single decoupling pin may extend through the base structure A115 with either end forming the pair of decoupling pins A107, A108. The decoupling pins A107, A108 extend substantially orthogonal to a longitudinal axis of the transducer assembly from the sides between the upper and lower major faces, A116 and A117, of the base structure A115, and are rigidly coupled and/or integral with the base structure A115. A bush A505 is mounted about each pin A107, A108. A washer A504 may also be coupled between the bush A505 and the associated side of the transducer base structure A115. The bushes and washers may be herein referred to as "node axis mounts". The node axis mounts A504, A505 are configured to couple corresponding internal sides of a transducer housing as will be explained in further detail below.

The decoupling mounting system further comprises one or more decoupling pads A501 located on one or preferably both major faces A116 and A117 of the transducer base structure A115. The pads A501 provide an interface between the associate base structure face and a corresponding internal wall/face of a transducer housing, to help decouple the components. In this example, one pad A501 is located on each major face (upper and lower faces) of the base structure. The decoupling pads are preferably located at a region of the transducer base structure that is distal from the node axis location A506. For example, they are located at or adjacent an edge of the base structure A115 adjacent the diaphragm A101. Each pad A501 is preferably longitudinal in shape and extends longitudinally along a transverse edge of the base structure A115. As shown in FIG. 5F, in the preferred form, each pad A501 comprises a pyramid shaped body A501 having a tapering width along the depth of the body. Preferably the apex A502 of the pyramid A501 is coupled to the associated major face of the transducer base structure A115 and the opposing base of the pyramid is configured to couple the associated face of the transducer housing in situ. This orientation may be reversed in some implementations however. It will be appreciated that in alternative embodiments the decoupling mounting system may comprise multiple pads distributed about one or more of the major faces A116 and A117 of the transducer base structure A115 and/or on the side faces of the base structure where the decoupling pins extend from and the invention is not intended to be limited to the configuration of this example as will be apparent to those skilled in the art. Such mounts are herein referred to as "distal mounts".

The node axis mounts A504, A505 and the distal mounts A501 are sufficiently compliant in terms of relative movement between the two components to which they are each attached. For instance, the node axis mounts and the distal mounts may be sufficiently flexible to allow relative movement between the two components they are attached to. They may comprise flexible or resilient members or materials for achieving compliance. The mounts preferably comprise a low Young's modulus relative to at least one but preferably both components they are attached to (for example relative to the transducer base structure and housing of the audio device). The mounts are preferably also sufficiently damped. For instance, the node axis mounts A504, A505 may be made from a substantially flexible plastics material, such as a silicone rubber, and the pads A501 may also be made from a substantially flexible material such as silicone rubber. The pads A501 are preferably formed from a shock and vibration absorbing material, such as a silicone rubber or more preferably a viscoelastic urethane polymer for example. Alternatively, the node axis mounts and/or the distal mounts may be formed from a flexible and/or resilient member such as metal decoupling springs. Other substantially compliant members, elements or mechanism mechanisms such as magnetic levitation that comprise a sufficient degree of compliance to movement, to suspend the transducer may also be used in alternative configurations. Some examples of possible material for the node axis mounts and the distal mounts are (the invention is not intended to be limited to these examples):

- Silicone rubber of hardness grade 30 durometer (on the shore A scale) having a Young's Modulus value of approximately 0.7 MPa;
- Nitrile rubber of hardness grade 50 durometer (on the shore A scale) having a Young's Modulus value of approximately 1.8 MPa;
- Sorbothane of hardness grade 30 durometer (on the shore 00 scale) having a Young's Modulus value of approximately between 0.3 and 1 MPa; or
- Natural rubber of hardness grade 30 durometer (on the shore A scale) having a Young's Modulus value of approximately 10 MPa.

The node axis and distal mounts may be made from a material having a Young's Modulus value of approximately 0.5-30 Mpa for example. These values are just exemplary and not intended to be limiting. Material having other Young's Modulus values may also be used as it will be appreciated that compliance is also dependent on the geometry of the material for example.

In the preferred embodiment, the decoupling system at the node axis mounts A505 has a lower compliance (i.e. is stiffer or forms a stiffer connection between associated parts) relative to the decoupling system at the distal mounts A501. This may be achieved through the use of different materials, and/or in the case of this embodiment, this is achieved by altering the geometries (such as the shape, form and/or profile) of the node axis mounts A505 relative to the distal mounts A501. This difference in geometry means that the node axis mounts A505 comprise a larger contact surface area with the base structure and housing relative to the distal mounts A501, thereby reducing the compliance of the connection between these parts.

In some applications it is desirable to have a relatively rigid decoupling between the base structure and the housing as this minimises movement of the base structure during resonance modes and when the device suffers a sufficiently large impact. However, having a rigid decoupling means that base structure displacements due to vibrations for example are transmitted more easily. The decoupling system of this embodiment helps alleviate these disadvantages of a rigid decoupling system. Locating the less compliant part of the decoupling system at the node axis location A506 means that there will be less movement of the transducer base structure A515 at this location during operation and hence less transmission of unwanted vibrations into the associated housing. The difference in compliance (e.g. flexibility) of the decoupling system at the node axis mounts A504, A505 and the distal mounts A501 also helps prevent or at least reduce the amount by which the node axis location may shift during operation of the transducer as will be explained in further detail below. Preventing or reducing the amount the node axis location shifts means that the base structure will continue to have minimal displacement at the node axis mount location throughout the transducer's FRO. Again, minimising displacement at the node axis mounts (which are the more rigid mounts) means less transmission of vibration or other unwanted mechanical movements into the transducer housing via any relatively rigid decoupling.

Figure 5A:
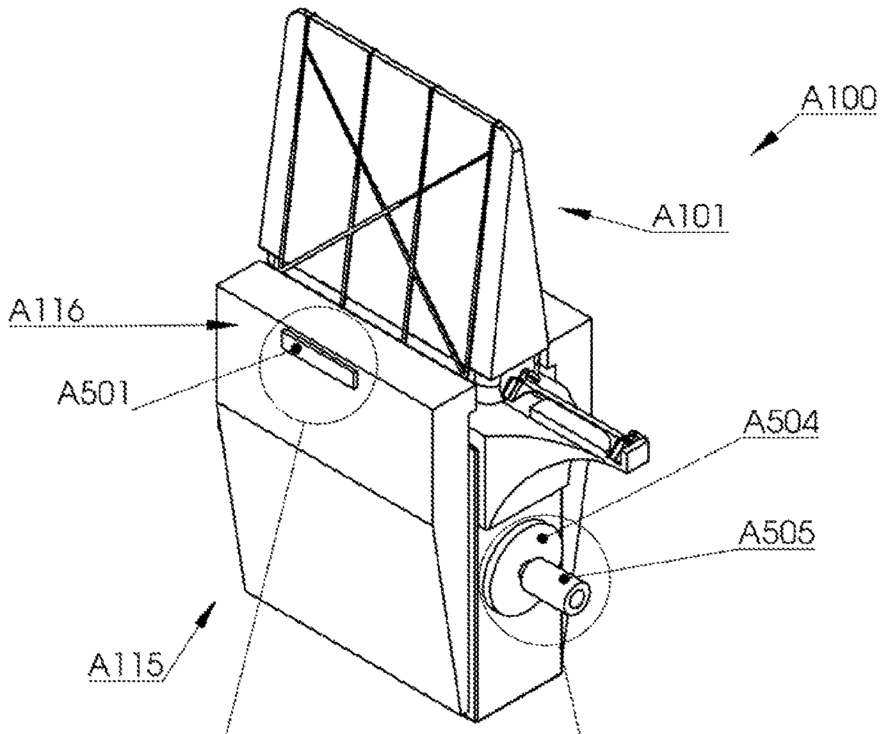
Figure 5B:
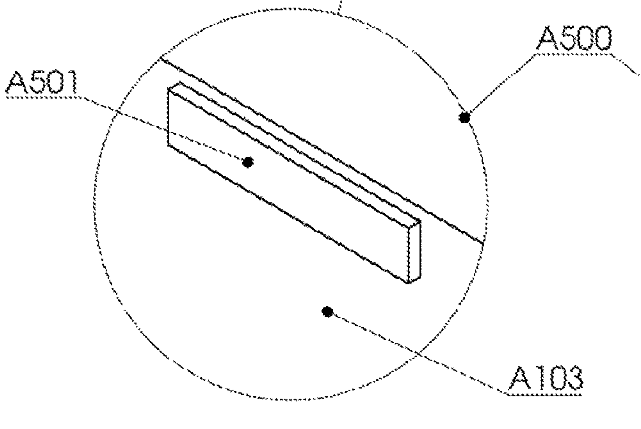
Figure 5C:
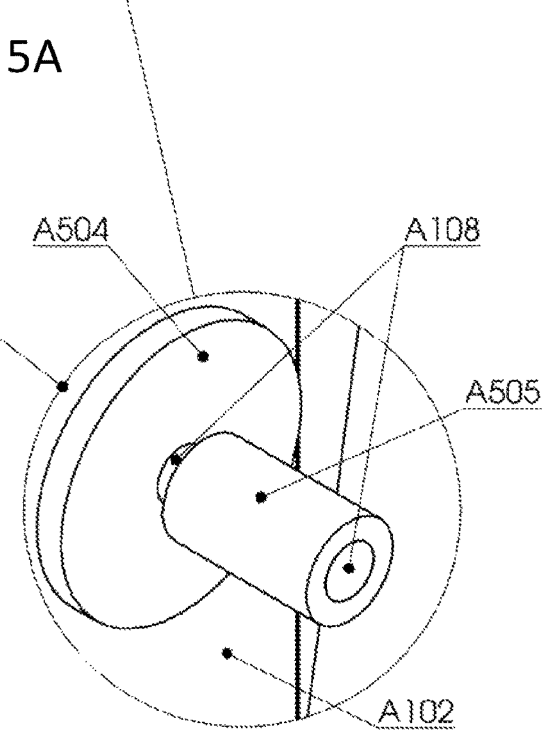
Figure 5D:
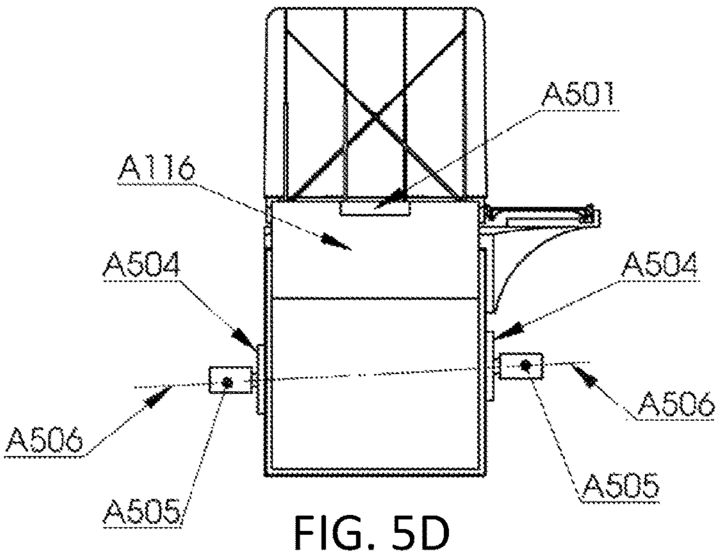
Figure 5E:
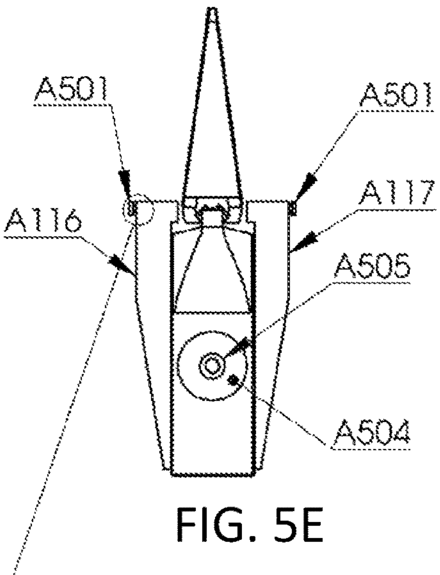
Figure 5F:
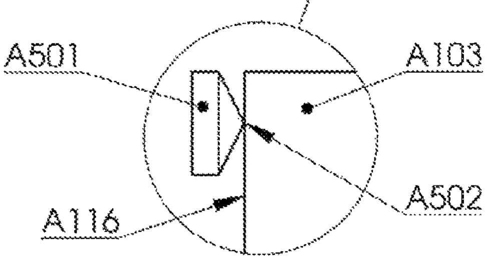
Figure 5G:
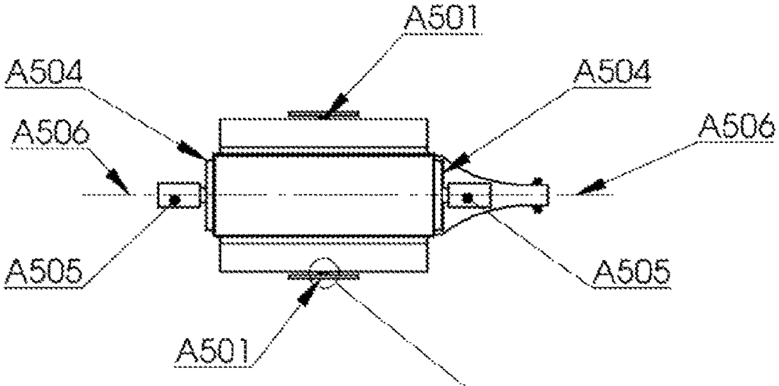
Figure 5H:
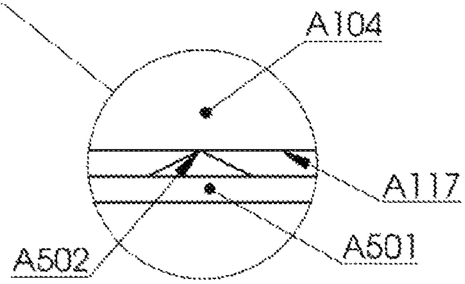

The contacting apex A502 of the pyramids A501 can be seen in detail in FIGS. 5F and 5H where a very small/thin tip contacts the transducer base structure. Because such a small area of contact is touching and because the material is compliant, the support provided at these locations is highly compliant, relative to other locations of support for example (such as the node axis mounts). This is important as these locations are remote from the transducer node axis location A506, which means that these parts of the transducer would naturally, in a hypothetical unsupported state (e.g. no mounts and zero gravity), undergo significant displacements during resonance modes in use. The relatively more compliant decoupling mounts permit such displacements without transferring correspondingly high loads into the housing.

The bushes A505 and washers A504, on the other hand, are located close to the transducer node axis location A506 where displacements, in the hypothetical unsupported state, are small. Accordingly, these components are designed to have comparatively less compliance (i.e. relatively lower compliance (e.g. flexibility) compared to the distal mounts A501), and they provide most of the support locating the transducer within the transducer housing. Providing relatively less compliant mounts at the node axis location means that the decoupling acts to resist movement of the node axis location and it also helps support the base structure's tendency to rotate about this axis during operation of the transducer—meaning minimal displacement/translation at this rigid decoupling location.

Referring now also to FIGS. 6A-6I, the audio transducer assembly A100 is configured to couple inside a transducer housing A613 of the audio device using the decoupling system A500. The housing A613 comprises a housing body A601 having a recess shaped to receive and accommodate the corresponding transducer assembly, and a lid A602 configured to locate over and close the open recess in situ. The lid A602 is rigidly coupled to the housing by a suitable fixing mechanism, such as via fasteners A603 located at the corners of the housing for example. The lid A602 comprises a grille or apertures A604 at a region configured to located adjacent the diaphragm assembly A101 when the audio transducer assembly is coupled within the housing A613, to enable the transmission of sound pressure. The audio transducer assembly (of embodiment A in this particular example) is shown mounted in the transducer housing A613 in FIGS. 6C and 6G. Distal mount pyramids A501 are indicated in FIG. 6C, one of which is detailed in FIG. 6D. Each mount A501 is connected on either side to the associated surfaces using a suitable fixing mechanism, such as via an adhesive agent (e.g. epoxy adhesive). One of the distal mounts A501 is connected on the base side to an internal face of the lid A602 of the housing and on the opposing apex side A502 to the associated major face A116 of the transducer base structure. The other distal mount A501 is connected on the base side to an internal face A609 of the housing body A601 and on the opposing apex side A502 to the associated major face A117 of the transducer base structure (see FIG. 6D for example showing the connection of one mount A501). For this embodiment, one distal mount A501 is coupled to the pole piece A104 of the base structure (as shown in FIG. 6D) and the other is coupled to the pole piece A103 of the base structure (as shown in FIG. 5F). It will be appreciated that in alternative embodiments the orientation of the mounts A501 may be reversed with the apex of each mount coupled to the housing surface and the base of the mount to the transducer base structure.

Figure 6H:
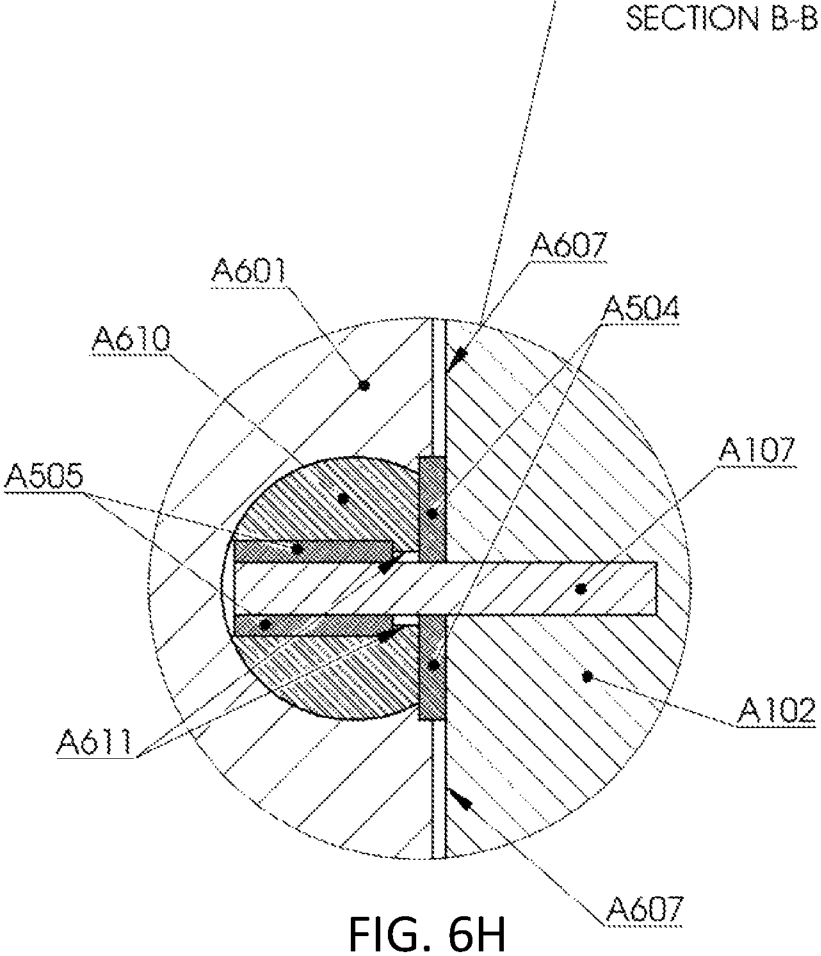

The washer A504 and bushes A505 are connected to the transducer housing body A601 via two slugs A610 of the decoupling system, which are detailed in FIGS. 7A-7F. Each slug A610 comprises a truncated cylindrical body having a substantially flat or planar surface and a substantially arcuate surface. A substantially annular recess A701 is formed in the planar surface to provide a seating/abutment surface for the associated washers A504. An aperture is located within the recess and extends transversely into (and preferably, but not necessarily extends fully through) an internal cavity A704 of the body of the slug A610. The cavity A704 is sized to receive and accommodate a corresponding decoupling pin A107, A108 and bush A505 of the decoupling system in situ. As shown in FIG. 6H, the aperture comprises an entrance of reduced diameter relative to the remainder of the aperture where the bush A505 locates in situ. This creates an internal rim or stop A611 on which the bush A505 rests. The purpose of this stop A611 will be described in further detail below. The body of each slug further comprises a narrow slit A702 extending longitudinally along one side of the slug. A threaded aperture A703 extends through the curved portion of the body, substantially orthogonally to the decoupling pin aperture and the longitudinal axis of the body, and is configured to receive a threaded fastener. The aperture A703 is aligned with and extends into the slit A702 such that upon insertion, a fastener can be screwed fully home to engage and exert force upon the side of the slit most distal from the aperture A703. The causes the base of the body to expand in size/width/diameter, thereby enabling it to frictionally engage and lock into place within a corresponding recess A614 of the housing of the transducer.

Figure 6I:
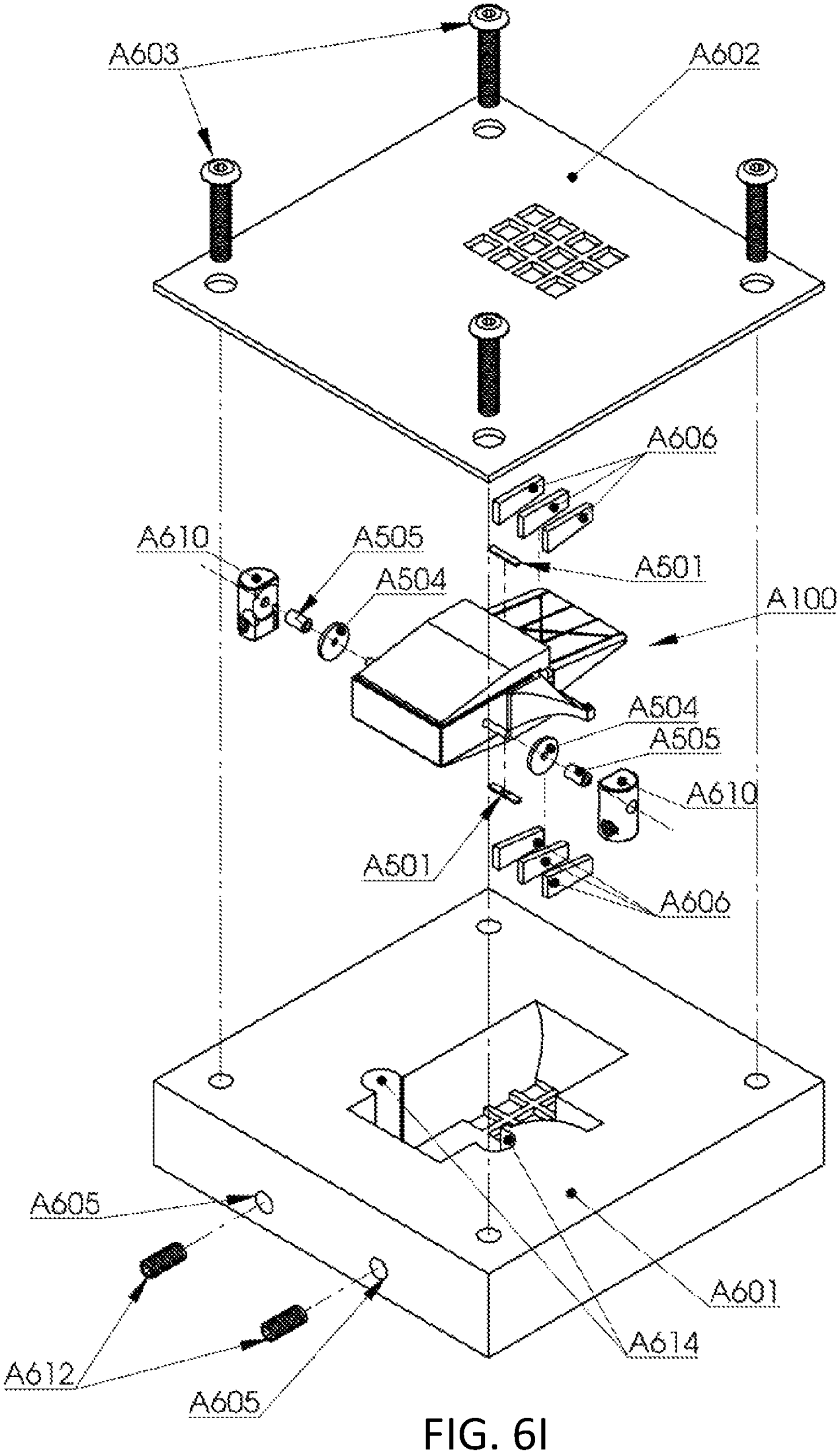
Figure 7A:
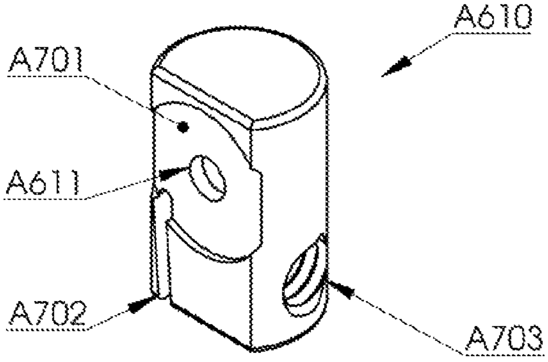
Figure 7B:
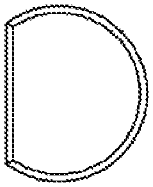
Figure 7C:
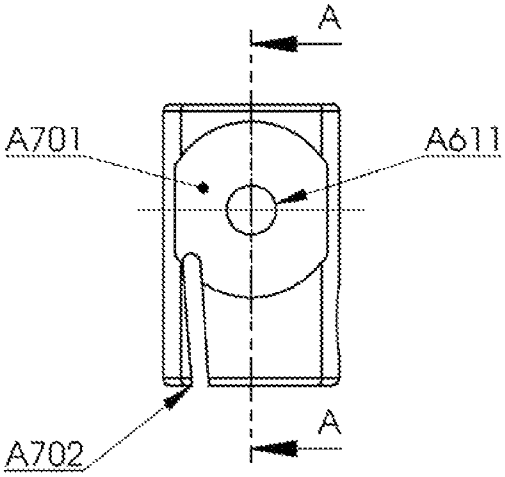
Figure 7D:
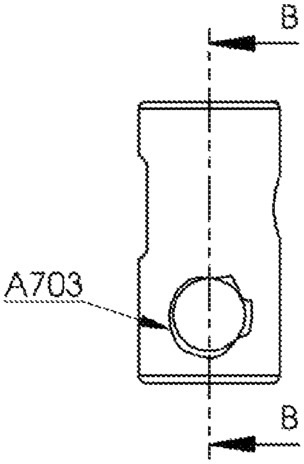
Figure 7E:
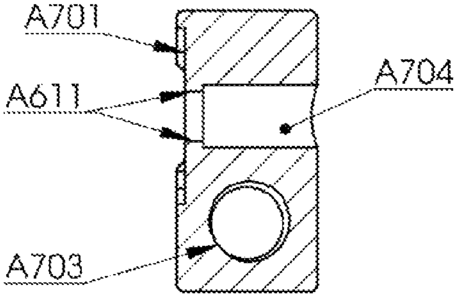
Figure 7F:
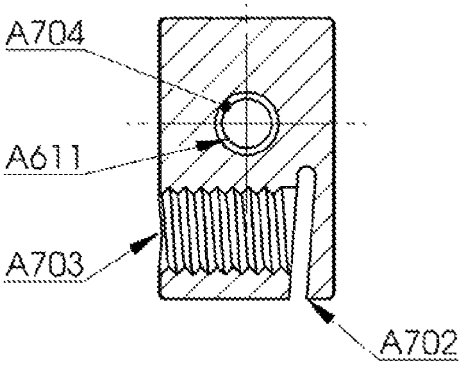

Referring in particular to FIGS. 6H and 6I, to assemble the embodiment A audio transducer within the housing A613, first the washers A504 of the decoupling system are slid onto the pins A107 and A108. Each bush A505 is then slid into the respective cavity A704 of the associated slug A610 from the increased diameter end until it rests on the internal stop A611. The slugs A610 with bushes retained therein are then slid onto the pins A107 and A108 until each washer contacts with its respective seat/recess A701 of the associated slug A610. The recess A701 accommodates a portion of the thickness of the washer to thereby form a gap A607 between the transducer base structure outer peripheral wall and the housing body A601. Furthermore, the decoupling pads A501 are adhered to the associated major faces of the transducer base structure (preferably near the transverse edge adjacent the diaphragm).

The transducer assembly A100, with slugs A610 retained thereon, is then carefully located within the corresponding recess of the housing body A601. In particular, the slugs A610 are aligned and slid into the corresponding, opposing arcuate channels A614 of the body A601. Once in place, grub screws A612 are inserted into the holes A605 in the housing body A601 and are screwed into the threaded apertures A703 in the slugs A610. When screwed fully home, each grub screw contacts the distal edge/side of the corresponding slot A702 and gently flexes the associated, narrow side of the slug A610 next to the slot, thereby expanding the diameter of the base of the slug and frictionally securing the slug within the associated channel A614 of the housing body A601. In this manner the transducer assembly becomes frictionally and securely engaged within the associated recess of the housing.

FIG. 6H shows a cross-sectional detail view of a decoupling bush A505 and washer A504 mounted snugly between a slug A610, a pin A107 and the magnet body A102 of the transducer base structure A115. Slug stopper surfaces A611 are a relatively small and accurate distance away from the pin A107. This configuration means that no contact is made between the transducer assembly and the transducer housing during normal operation. In the event of a bump or a drop, however, the stopper surface will contact the pin A107 preventing any large displacement of the transducer assembly relative to the housing. This in turn prevents the diaphragm assembly A101 from contacting the transducer housing and being damaged in such an event.

A narrow and substantially uniform gap/space A607 as shown in FIGS. 6G and 6H is also formed between the transducer base structure/magnet A102 and the housing body A601 when the transducer is assembled within the housing. This narrow gap A607 may extend about at least a substantial portion of the perimeter (and preferably the entire perimeter) of the base structure A115. The gap A607 may also reduce or close in some regions in an impact event such a drop. If significant movement occurs sideways (in the direction of the axis of rotation A114) then the robust transducer base structure A115 is configured to hit the housing body A601 before the more fragile diaphragm assembly A101 can contact the housing body A601, and so acts as an additional stopper/protective structure. This may be achieved by allowing for a relatively narrower gap between the edges and sides of the transducer base structure A115 and the adjacent internal wall of the housing than the gap between the edges and sides of the diaphragm assembly A101 and the adjacent internal wall of the housing.

As described above, the transducer base structure stoppers are used to help protect the diaphragm assembly from hitting the surround, especially in the case of an unusual bump or drop to the audio device. These stoppers comprise of an area or point of the transducer base structure being physically limited by an area or point of the transducer housing, during the unusual drop or bump event. In the aforementioned case the mounts located at the pins A107, and A108 located close to decoupling washers A504 and decoupling bushes A505 facilitating fine stopper tolerances without creating susceptibility to unwanted in-use contact resulting in loss of decoupling, for example in the case of imperfect manufacturing tolerances or creep of mounts.

In other words, the decoupling system is configured to provide a substantially narrow gap between the transducer base structure and the housing at the node axis decoupling mounts. The narrow gap is located about a longitudinal axis of each decoupling pin and is sized such that it is relatively smaller than a gap between the diaphragm assembly and the housing such that inner surfaces A611 of the slug A610 can act as stoppers to prevent significant relative movement between the transducer and housing that would otherwise cause the diaphragm assembly to contact against the housing. A further gap A607 is provided by the decoupling system (by action of the washers) parallel to the longitudinal axis of the decoupling pins that is substantially narrower than the gap between the diaphragm assembly and housing to prevent the diaphragm assembly from coming into contact with the housing when the transducer moves in directions substantially parallel to the longitudinal axes of the decoupling pins.

Referring to FIG. 6I, in this example, the audio device further comprises diaphragm excursion stoppers A606 which are also connected, for example using an adhesive agent such as an epoxy adhesive, to an interior wall within the transducer aperture of the housing body A601 on one side and to an inner wall of the lid A602 on the other side. There may be one or more such stoppers. In situ, there may be one or more (in this example three) stoppers A606 extending longitudinally and substantially uniformly spaced along each face at a region proximal to the diaphragm structure of the assembly A101. As shown in FIG. 6C, these stoppers A606 have an angled surface that is positioned to contact the diaphragm in the case of any unusual event, such as if the device is dropped or if a very loud audio signal is presented, that may cause over-excursion of the diaphragm. The angled surface is configured to locate adjacent the diaphragm body A208 in situ, to match the angle of the diaphragm body if the diaphragm is caused to inadvertently rotate to this point. The stoppers A606 are made from a substantially soft material, such as an expanded polystyrene foam, to avoid damaging the diaphragm. The material is preferably relatively softer than that of the diaphragm body for example (e.g. it may be of a relatively lighter density than the polystyrene of which the diaphragm body is formed) to alleviate damage. The stoppers A606 have a large surface area so as to effectively decelerate the diaphragm, but not so large as to block too much air flow and/or create enclosed air cavities that are prone to resonance.

Referring back to FIGS. 6G and 6H, as mentioned there is a small gap A607 that extends around a substantial portion but preferably an entire perimeter edge of the transducer in situ. This gap is small, ranging from 0.5 mm to nearly 1 mm, to ensure that positive sound pressure on one side of the transducer is limited from cancelling with negative sound pressure on the other side in use. Preferably, the size of the gap is larger at locations more distal from most rigid decoupling mounts A504/A505 compared to at locations close to the most rigid decoupling mounts A504/A505, because in a drop scenario these locations tend to displace further than those close to the stopper surfaces such as A611.

In this example decoupling system of the invention, there is no contact of the transducer assembly A100 with the transducer housing A613 except via the decoupling mounting system, and also in some cases via the wires (not shown) which carry current to the motor coil winding A109 of the transducer assembly. These wires are preferably adhered thoroughly to the transducer using an adhesive agent, for example epoxy adhesive, to prevent them resonating and buzzing. They lead from the side of the coil windings A109, around first bend A403 (to avoid wire breakage in the event of torsion bar tensioning in a drop), along the inside corner of the fold in the flexing middle region A402 of the torsion bar A106 (because this location does not stretch or compress significantly in use risking wire fatigue), around second bend A403, passes over the end tab A303 of the contact bar A105, and runs along the contact bar towards the magnet A102. At the closest practical location to the transducer node axis location A506, being the location that undergoes minimal displacement during normal operation, the wires leave the transducer and pass across the air gap to the transducer housing from where they lead to an amplifier and audio source.

Most preferably the wire is secured on both sides of the gap and the intermediate portion is sufficiently short that it is resonance-free, thereby preserving substantially resonance-free characteristics of all non-decoupled elements.

Note that these wires are not shown in the drawings. Note also that, although the wire path described is considered to be advantageous in terms of both resonance management and also reliability, it is possible that other wire configurations are also effective and the invention is not intended to be limited to this example.

Preferably the decoupling mounts A504, A505 and A501 are well damped, since damping helps with control of resonances. Preferably mounts are made from a material with relatively low creep, for example from viscoelastic urethane polymer, otherwise, when subjected to long-term loads such as that due to gravity, the transducer may displace over time potentially causing contact against the housing or against a stopper during normal operation. This in turn can result in a loss of decoupling effectiveness. The node axis bushes preferably have a sufficient contact surface area (in particular the area of contact between decoupling pins A107, A108 and bushes A505) so that the long-term stress on the bushings is within the creep stress limits of the material being used. The geometry of the mounts and connections to the mounts may also be designed so that gravity does not overly stress the material in long term situations It will be appreciated that the above described decoupling system can be incorporated in an audio device having any type of audio transducer assembly and the embodiment A transducer used in the above description is only exemplary to provide context for the decoupling system. Some preferred audio transducer assemblies to be combined with the decoupling system described above will now be described in further detail.

The above described decoupling mounting system is preferably incorporated in an audio transducer that comprises any combination of one or more (but preferably all) of:

- a thick, rigid diaphragm employing a rigid approach to resonance control as described in the configuration R1-R4 diaphragm structures in section 2.2 of this specification or as in the diaphragm structures described under the configuration R5-R7 audio transducers of section 2.3,
- a base structure with rigid and robust geometry described for the embodiment A audio transducer under section 2.2.1 of this specification, and/or
- a diaphragm assembly suspension as defined for the audio transducers described under section 2.3 of this specification; and/or
- a rotational action transducer having a hinge system as defined under sections 3.2 or 3.3 of this specification.

Combining one or more of the above assemblies, structures or systems with the decoupling system herein described (results in negligible energy storage within the operating bandwidth of the audio transducer as shown by the CSD/waterfall plots described further below). The embodiment A audio transducer of the invention, for example, incorporates a combination of this decoupling system with all of the above audio transducer features. This is explained in further detail in later sub-sections within section 4 of this specification.

Node Axis Decoupling

Referring back to FIGS. 5A-6I, as previously mentioned, the decoupling pins A107, A108 of decoupling system A500 comprise a longitudinal axis that substantially coincides with the node axis of a rotational action audio transducer to which they are integrated or attached. The node axis of the audio transducer can be observed when the transducer is operated in a hypothetical unsupported state where no external reaction forces are exhibited or influence the structure (such as reaction forces exhibited due to mountings for example). The node axis location A506 of interest is the location about which the transducer base structure rotates, due to the reaction forces exhibited during diaphragm oscillation, when the diaphragm assembly and base structure are operated in the hypothetical unsupported state at frequencies well below those at which unwanted diaphragm resonances manifest. The axis about which the base structure rotates is herein referred to as the "transducer node axis". The location of the node axis during a hypothetical unsupported state of the transducer is herein referred to as node axis location A506. In typical transducers such an axis either does not exist or else it is in a location that is remote from the base structure assembly. In the case of many rotational action transducers, and a few other drivers, the axis does exist close to or within the base structure assembly. In the example audio transducer described above, the node axis is substantially parallel with the hinging axis of the diaphragm assembly A101.

Usually, decoupling mounts must be compliant against translations in order to be effective, however in the case of a rotational action audio transducers having a transducer base structure which (when unconstrained) moves with an action having a significant rotational component during the course of normal operation, there is a special case where decoupling mounts A505/A504 can be located at or close to the location A506 of the node axis about which said rotation occurs. In this case these decoupling mounts do not need to provide a significant degree of translational compliance so long as they compliantly facilitate rotations about the node axis. Since, during the course of normal operation, the transducer will not try to translate substantially at this location A506, only minimal translational displacements will be transmitted into the enclosure to which it is mounted.

Furthermore, if vibrations are passed from external sources into the transducer via translation of these mounts A505/A504, this will result in only minimal translation at the diaphragm hinge point, which in turn means that any excitation of the diaphragm will be substantially confined to rotations about that hinging axis. The diaphragm fundamental mode acts as a form of well-damped decoupling against such an excitation. When the transducer base structure is decoupled in this manner the effect described above, whereby enclosure resonances and other external vibrations are mechanically amplified via the lightweight diaphragm, will be largely mitigated. This also works in the case of microphone transducers, and implies that the microphone will respond only minimally to external vibrations, despite the fact that there is, effectively, a hinge joint in its mounting.

This means that such transducers may be decoupled via a mounting system that provides resistance to translations and is therefore comparatively robust and reliable. Note that it is preferable that such mounts do actually incorporate a degree of compliance, and more preferably that they also provide damping, since in practice the node point may shift slightly over the operating bandwidth, or even over the course of a single diaphragm oscillation.

FEA—Node Axis Determination

As stated above, the transducer base structure assembly node axis location A506 is the location about which rotation of the base structure occurs, with zero or at least minimal translation, when the audio transducer is operated in a hypothetical unsupported state. The hypothetical, unsupported state is a state where there are no external reaction forces such as from mountings, other than the forces exhibited due to diaphragm oscillation. This situation could be achieved in zero gravity since the transducer would not need mounts, however zero gravity is difficult to achieve in practice.

A preferred method of the invention for determining node axis location A506 is to utilise finite element analysis (FEA) to simulate operation of a transducer assembly in zero gravity with no transducer mountings.

An alternative approach to simulation is to operate the audio transducer with a sinusoidal input excitation on the diaphragm of the assembly across a frequency band, and the resulting base structure movement is analysed to identify the location that undergoes zero translation.

The location A506 of the node axis can be determined experimentally if the transducer is mounted using mountings which are exceptionally flexible and lightweight and which apply an effectively constant support load in reaction to the force resulting from gravity. The response of the transducer to sinusoidal excitation then becomes effectively independent of the mountings, so the location A506 of the zero translation axis can be determined using a sensor such as an accelerometer. It may be advantageous to use a sensor that is lightweight compared to the driver. For example, the base structure assembly of the transducer could be suspended via thin compliant rubber bands, or could sit on a lightweight and compliant piece of open-cell foam or pillow stuffing. Excitation of the driver should occur at frequencies sufficiently high such that mounting compliance is negligible, yet also sufficiently low such that the transducer behaves in a substantially single-degree-of-freedom manner.

The above are examples which a person skilled in the art may utilise to determine node axis location of a particular transducer assembly.

Referring back to the preferred method of using FEA, there are several approaches utilising FEA that can be taken including 1) Modal analysis: Run a FEA modal analysis of the driver in zero gravity, and the node axis A506 is the part of the base structure that translates only minimally when the fundamental diaphragm resonance frequency is observed; 2) Linear dynamic finite element analysis: This is another FEA analysis of the driver, again in zero gravity, with sine excitation forces and reaction forces applied to the diaphragm and transducer base structure respectively over a wide frequency range of, for example, 20 Hz to 30 kHz. The displacement amplitudes at the simulated sensor locations on the base structure may be calculated, and from this information it may be possible to determine locations on the base structure that undergo the least displacement. This will be the node axis A506.

The modal analysis method 1) will now be described in more detail.

Results of a computer simulation conducted in accordance with this method is illustrated in FIGS. 13A-13M. In this computer simulation, a transducer model is built and utilised that is the same and/or substantially similar to the transducer assembly of embodiment A described above. The model represents the transducer assembly without the housing.

The transducer is modelled as if floating in free space. The density, modulus and Poisson's ratio of the various materials used have been modelled. A modal analysis is performed, to identify resonance modes inherent in the transducer. Since the simulation is in zero gravity the first six resonance modes calculated, composed of three translational and three rotational modes of the entire transducer, occur at 0 Hz and are ignored. Other resonance modes inherent in the transducer are shown in FIGS. 13A-13M.

The first relevant resonance mode, occurring at 110 Hz, is the fundamental mode of operation of the diaphragm assembly A101 rotating with respect to the transducer base structure A115, and this is shown in FIGS. 13A-13E. FIGS. 13A-13D show a vector plot of the displacement, where hundreds of arrows indicate the direction and magnitude of the displacement. The direction and length of each arrow indicates the direction and magnitude of the displacement of the point of the transducer located at the tail end of the arrow.

Figure 13A:
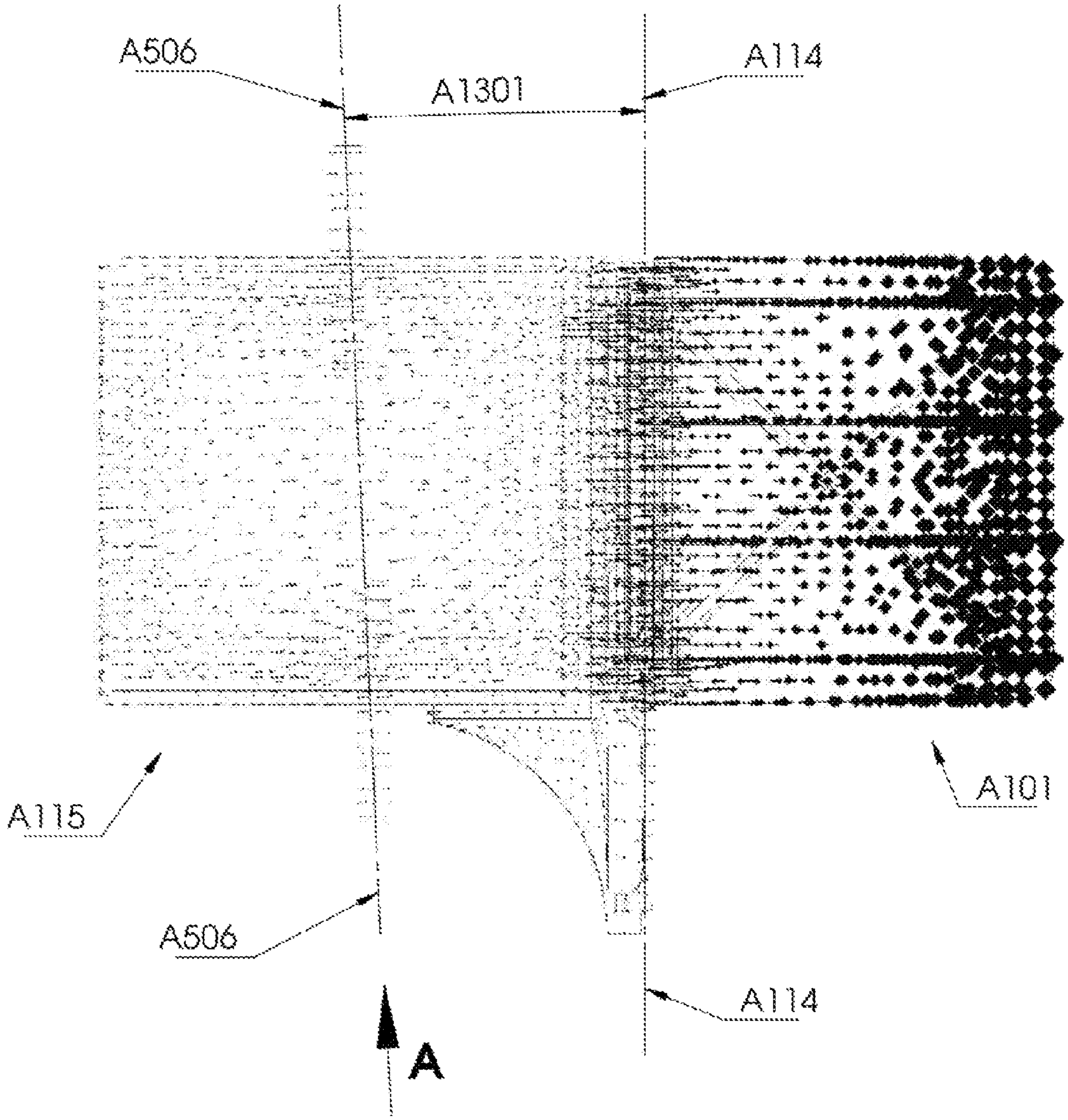
Figure 13B:
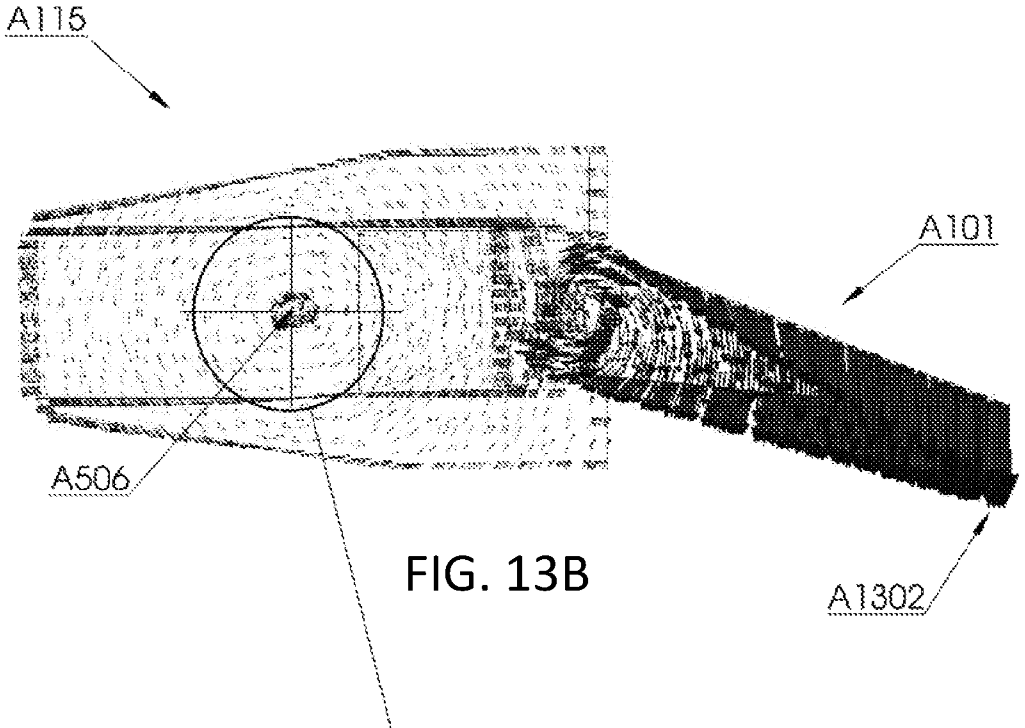
Figure 13C:
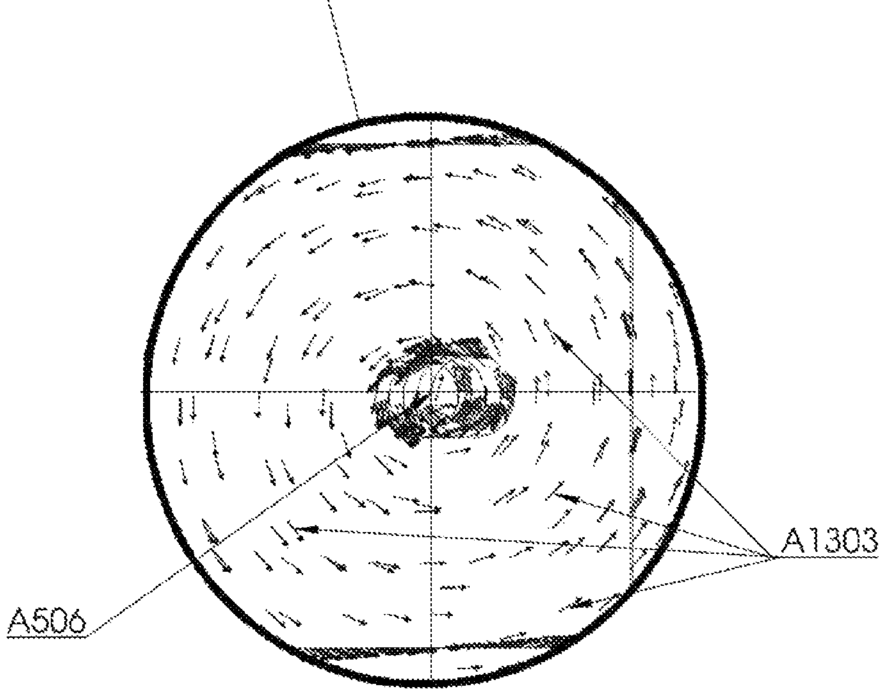

The transducer base structure node axis A506 is approximately parallel to the axis of rotation A114, although a slight angle A1301 of about 2.6 degrees exists between them. If the transducer base structure was more symmetrical about the sagittal plane of the diaphragm body A217, then these two axes would be closer to parallel. FIG. 13B shows a view in direction A (indicated in FIG. 13A) whereby the direction of the arrow vectors A1303 are all concentric about a point on the transducer base structure A115, thus indicating the location A506 of the transducer node axis.

The arrows A1302 also indicating displacement are in general much larger than the arrows A1303 because they indicate that movement of the diaphragm is large compared to that of the heavier transducer base structure. Note that the arrows A1302 are so condensed and large that individual arrows are hard to see, and the outline of the diaphragm assembly A101 is obscured.

Figure 13D:
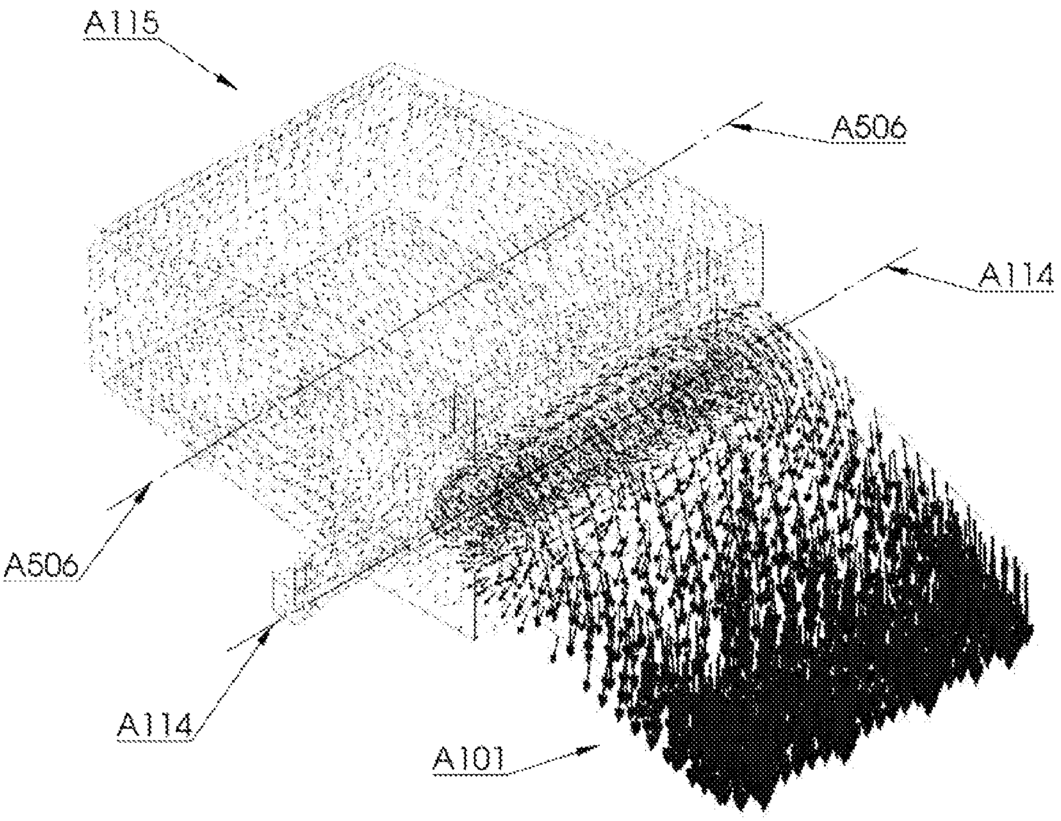
Figure 13E:
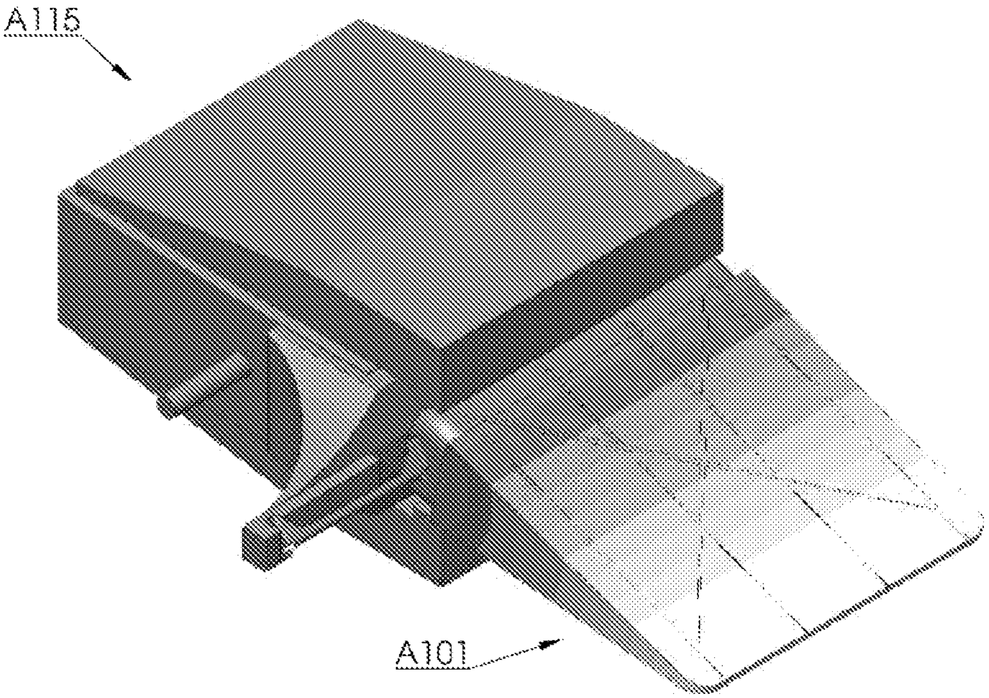

FIGS. 13D and 13E show the same isometric view of the fundamental resonance mode displacement, except FIG. 13D is a vector plot and FIG. 13E is a displacement plot that indicates the magnitude of the displacement by the shade of grey; the whiter the shade of grey, the higher the displacement.

Figure 13F:
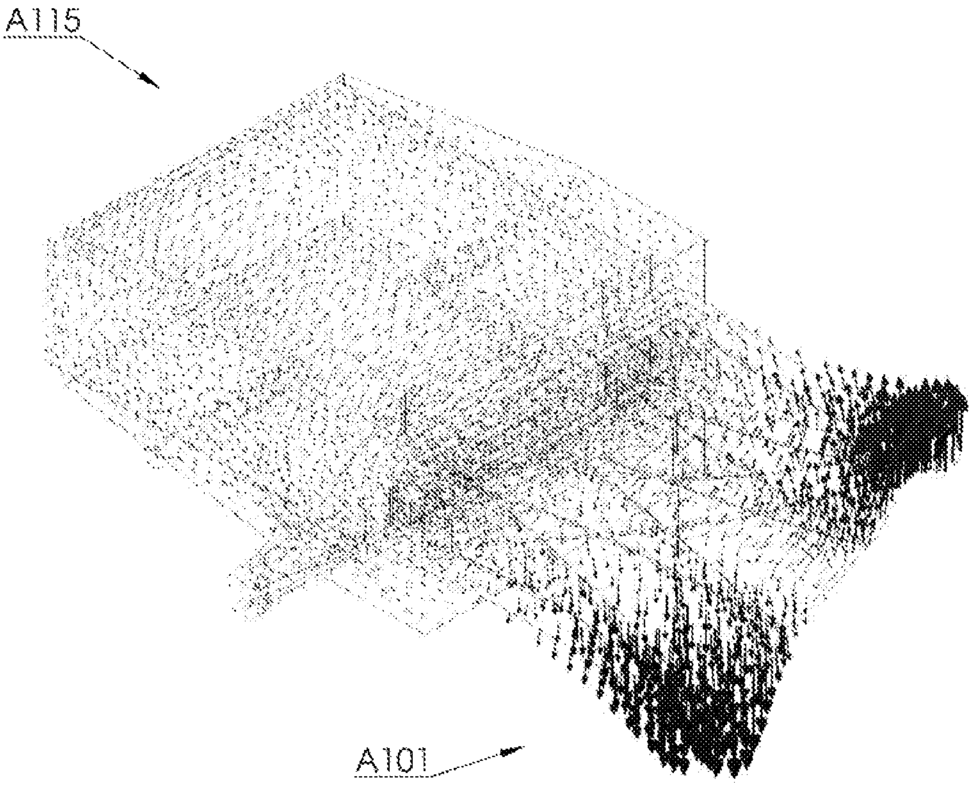
Figure 13G:
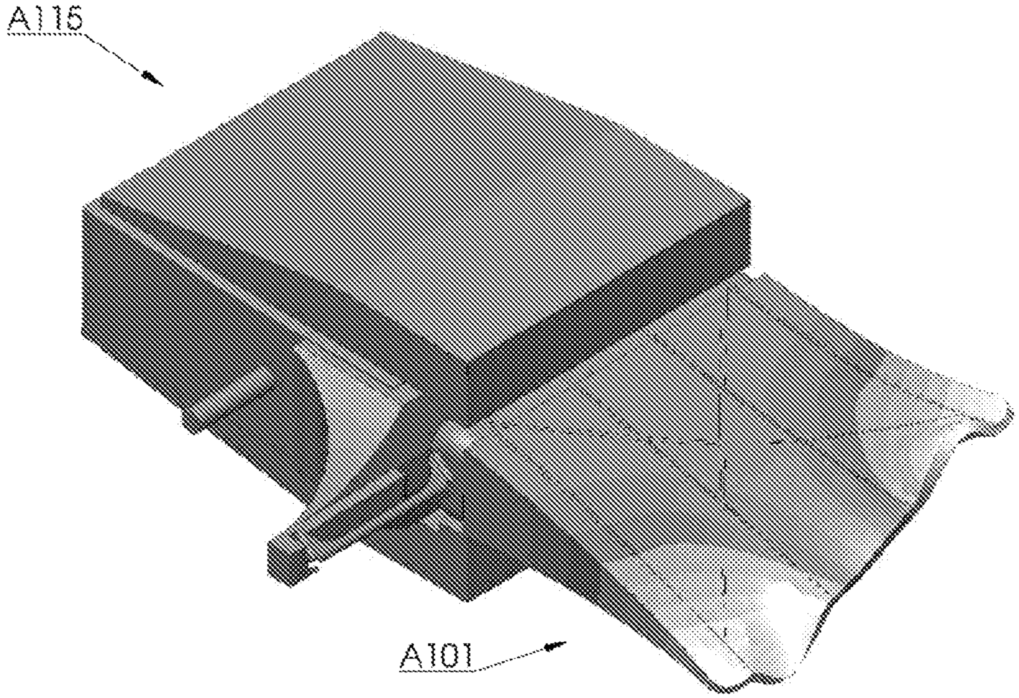

FIGS. 13F and 13G illustrate vector and grey scale style displacement plots of the second diaphragm resonance mode (which we will refer to as the first diaphragm breakup mode) at 18.2 kHz, being a diaphragm twisting mode where the left diaphragm tip moves forwards as the right diaphragm tip moves backwards in opposition.

Figure 13H:
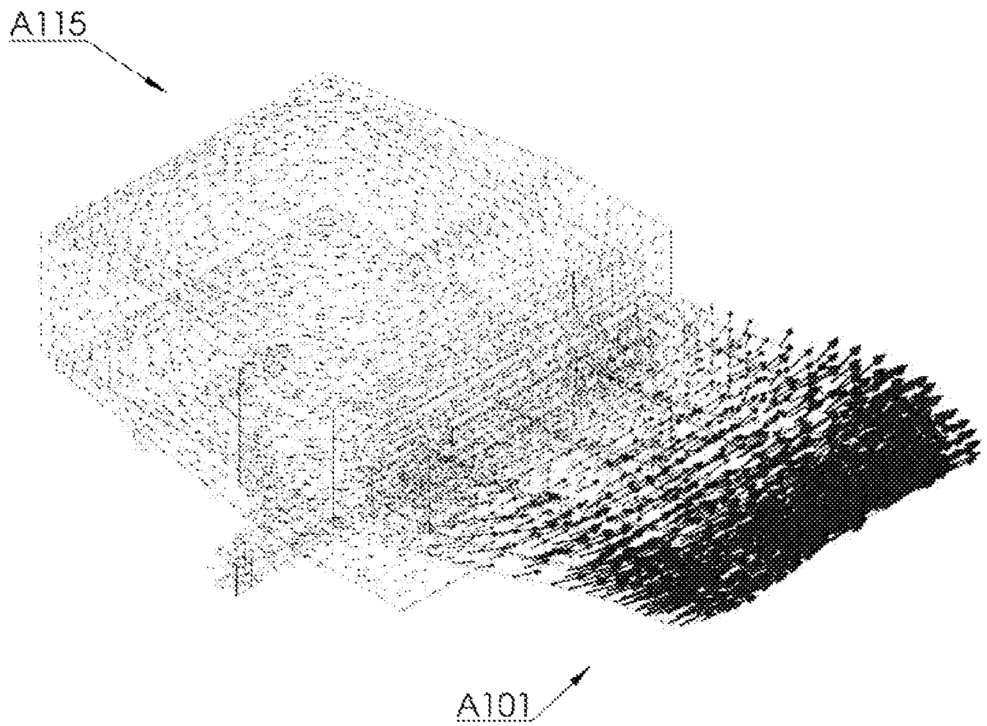
Figure 13I:
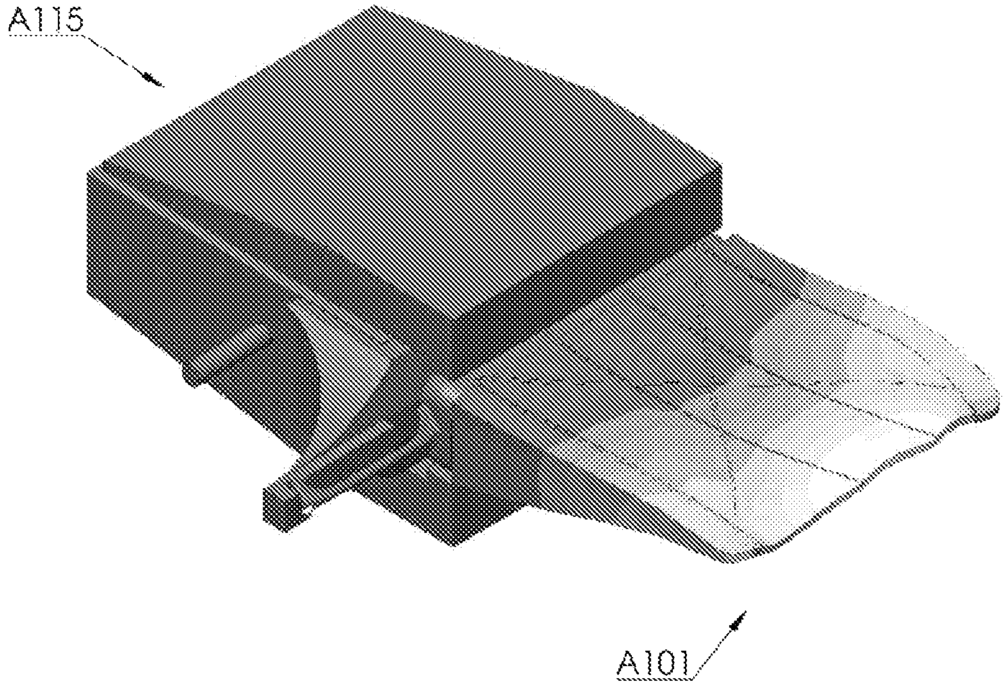

FIGS. 13H and 13I illustrate vector and grey scale style displacement plots of the second diaphragm breakup mode, at 19.4 kHz, being a diaphragm slicing mode where the left and right tips of the diaphragm move in the same direction sideways.

Figure 13J:
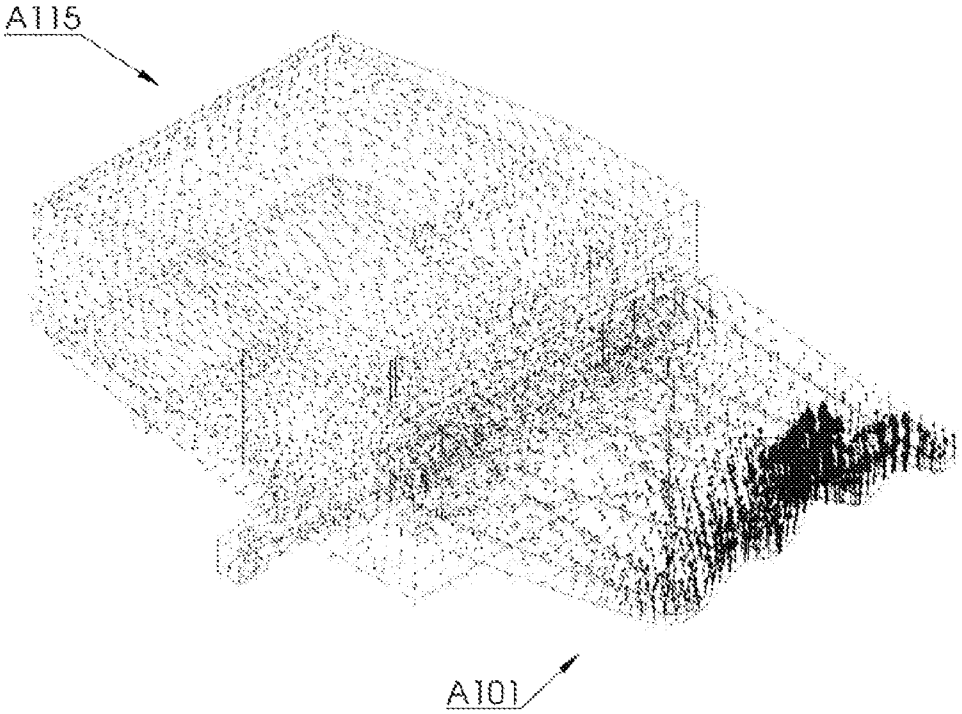
Figure 13K:
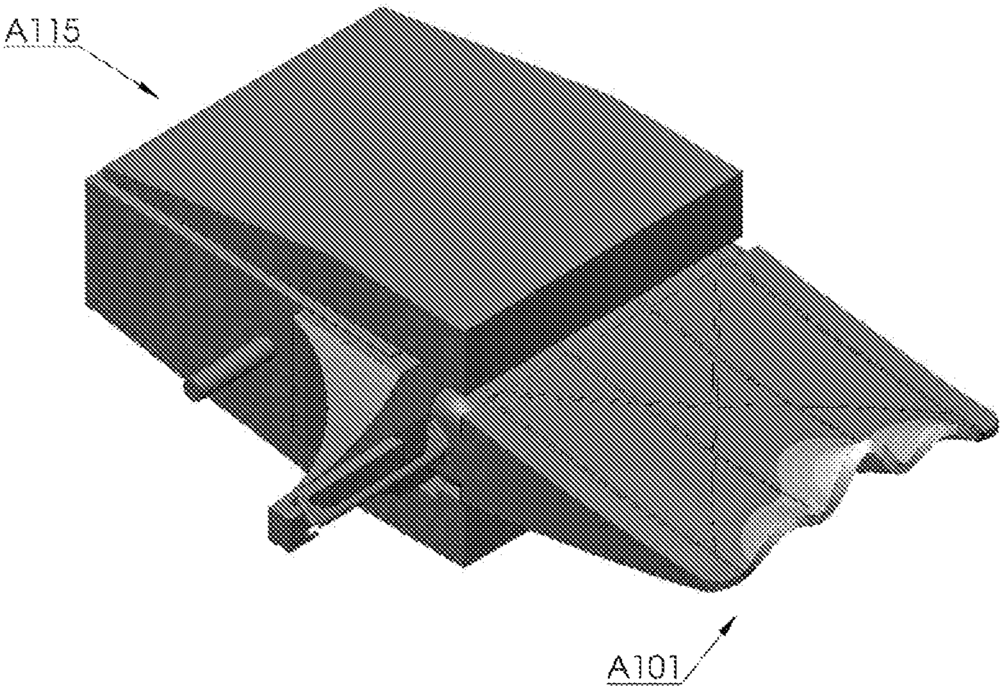

FIGS. 13J and 13K illustrate vector and grey scale style displacement plots of the third diaphragm breakup mode, at 19.9 kHz being a diaphragm bending mode where the middle region of the diaphragm tip displaces forwards and backwards.

Figure 13L:
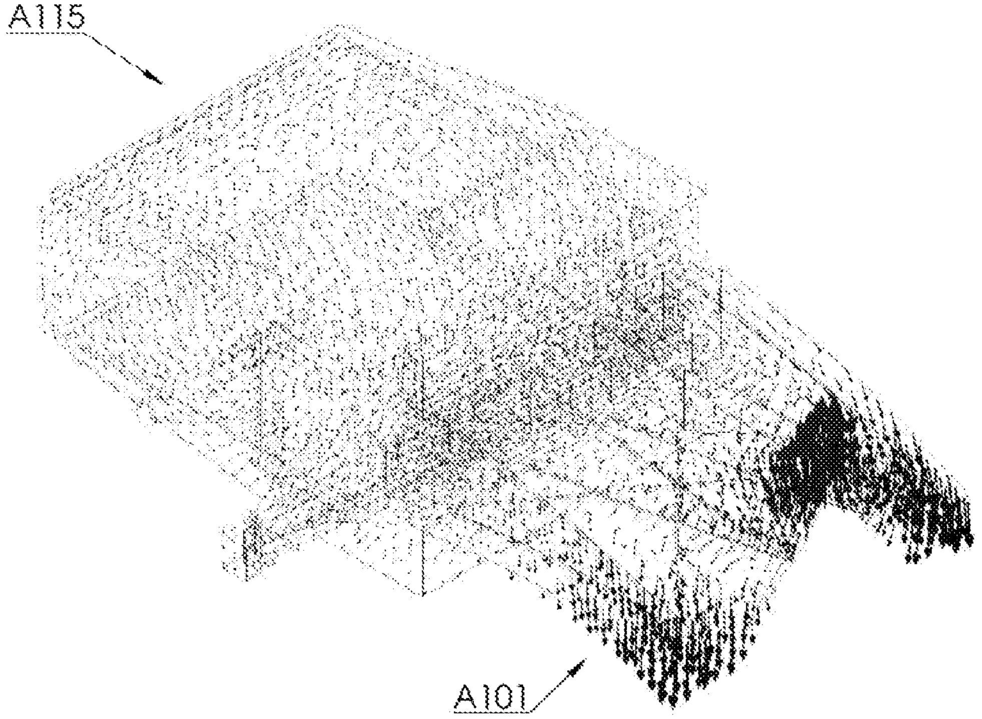
Figure 13M:
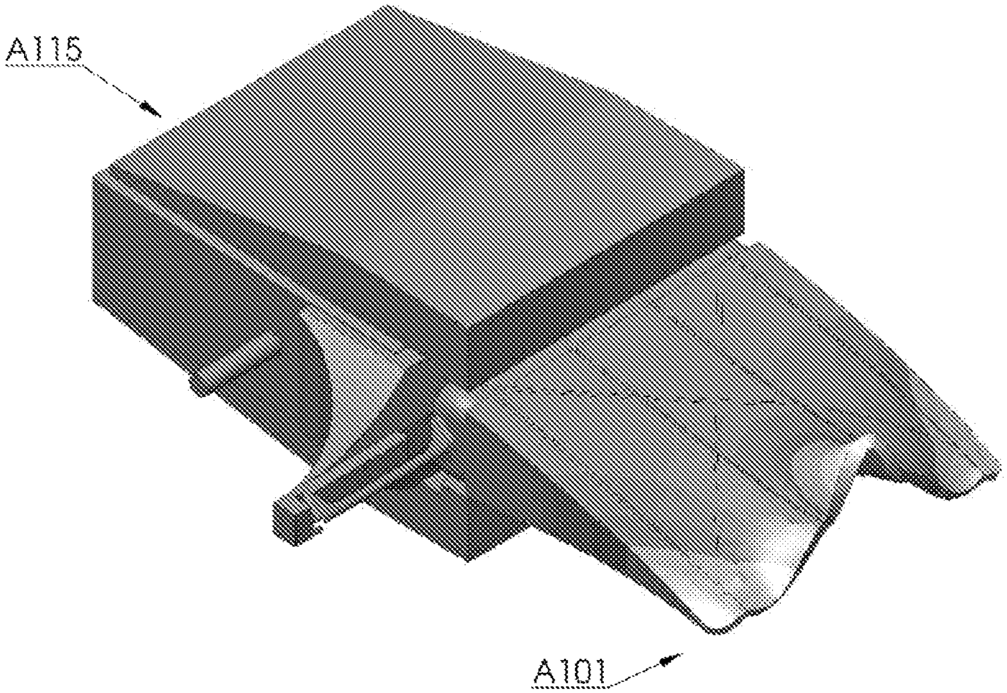

FIGS. 13L and 13M illustrate vector and grey scale style displacement plots of the fourth diaphragm breakup mode, at 22 kHz, being a diaphragm mode where the middle region of the diaphragm tip displaces forwards as the both left and right sides of the diaphragm tip displace backwards.

It should be noted that if we were modelling a transducer that had other parts rigidly attached to the transducer base structure, then these other parts would affect the mass distribution of the base structure and should also be included in the computer model. Hence the axis location should be determined for the entire transducer base structure assembly.

Performance of Decoupling System

The performance of the embodiment A audio transducer including decoupling and other preferred transducer assembly features will now be described with reference to another simulation.

Figure 14A:
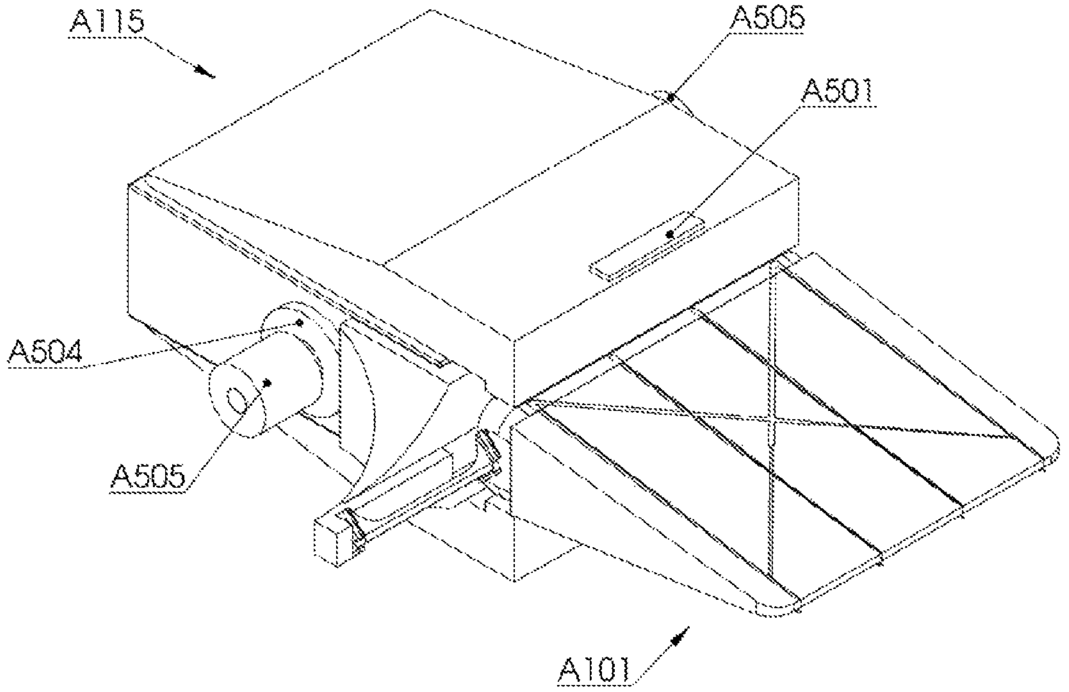
Figure 14B:
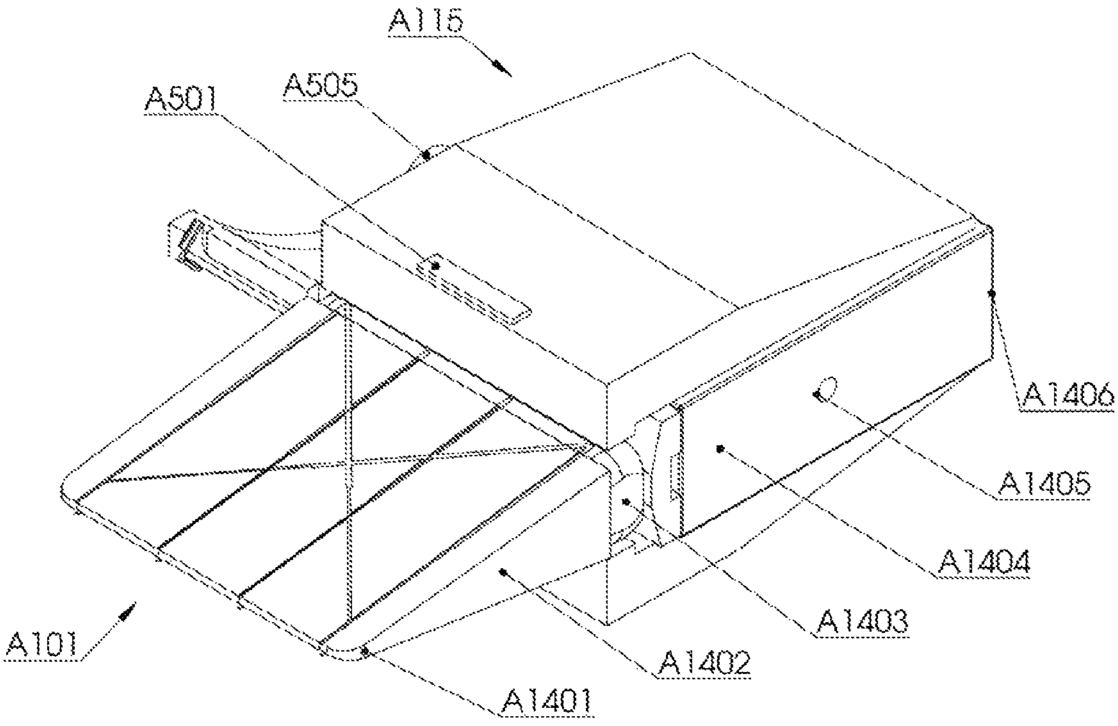

FIG. 14A illustrates the computer model of the same audio transducer model described above, that is now mounted on its decoupling system, which is similar to the decoupling system used in embodiment A in FIG. 5A and described in section 4.2 above. In particular node axis mounts A504, A505 are located to coincide with the node axis location A506 determined from the above unsupported simulation, and distal mounts A505 are located on the major faces near/adjacent the diaphragm hinge. FIG. 14B shows another view of the same model and indicates the location of the six simulated sensor locations: A1401, A1402, A1403, A1404, A1405, and A1406. It should be noted that this view does not show the decoupling bush A505, decoupling washer A504 and decoupling pin A107 on the sensor location side of the transducer, even though these parts are included in the computer model, so as not to obscure sensor location A1405).

Simulated sensor locations are identified along the side of the transducer, A1401 at the tip of diaphragm assembly A101, A1402 part way up the side of the diaphragm, A1403 near the diaphragm base, A1404 on the transducer base structure A115 reasonably close to the diaphragm, A1405 on the transducer base structure and close to the mounting hole for decoupling pin A107, and A1406 on the transducer base structure at the furthest end from the diaphragm.

Figure 14C:
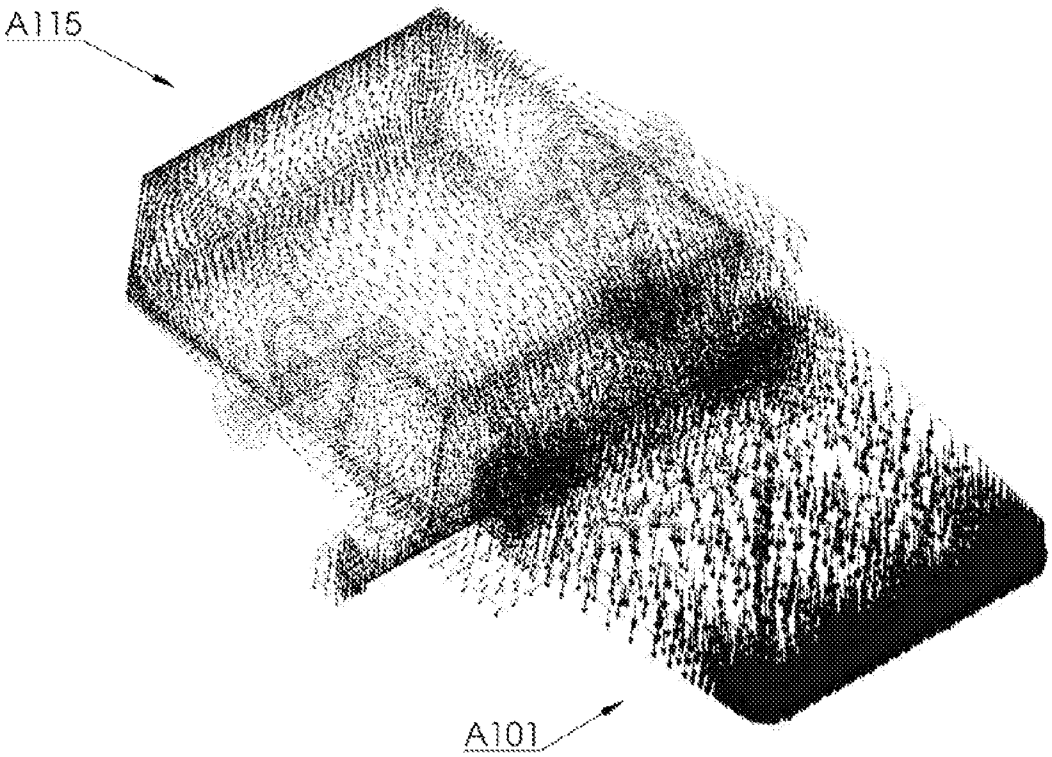
Figure 14D:
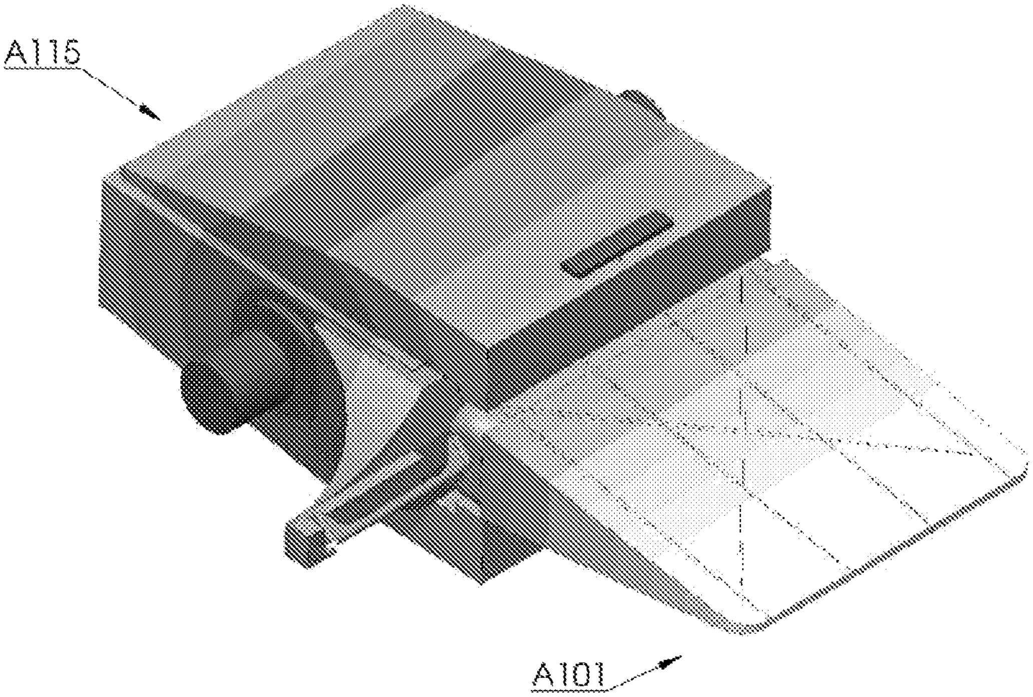
Figure 14E:
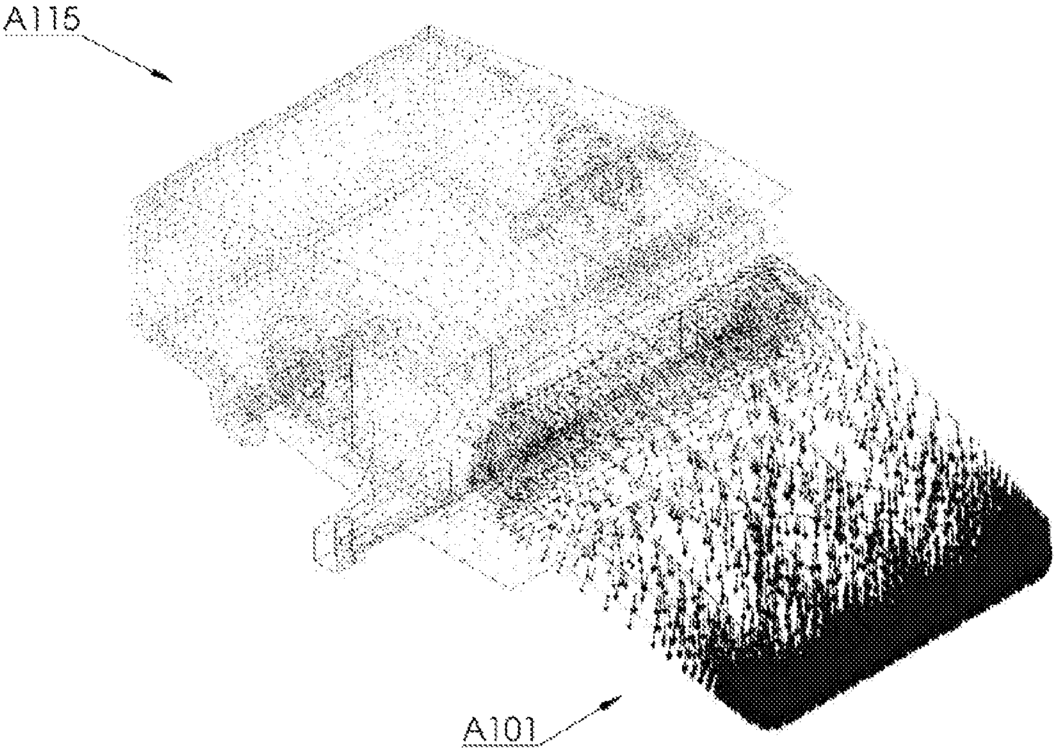
Figure 14F:
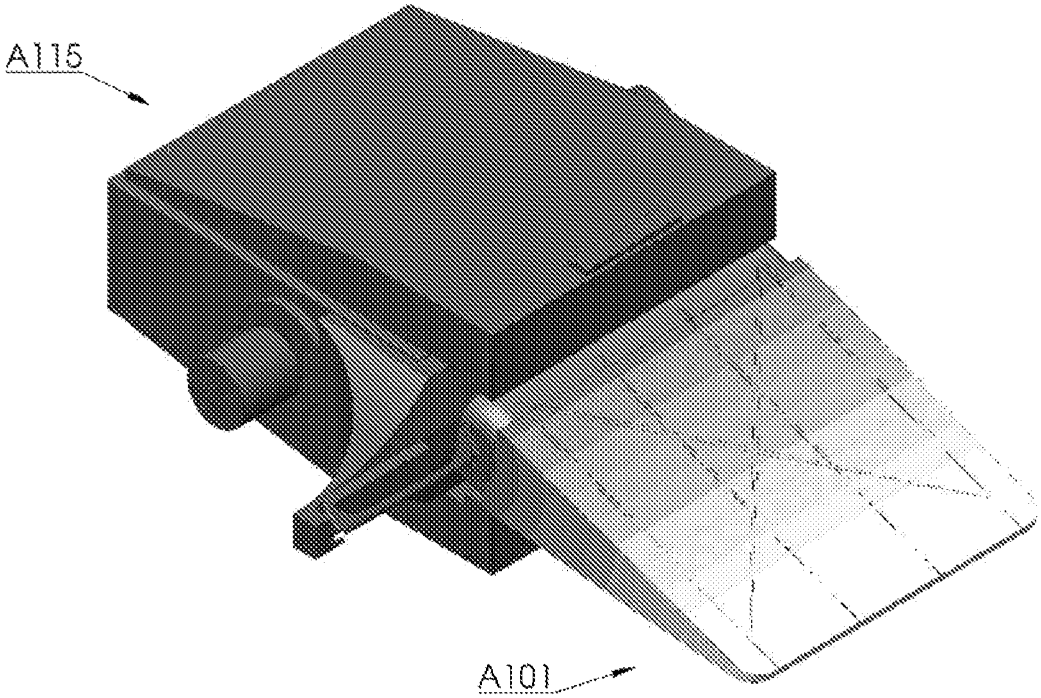

This computer model was analysed using harmonic/modal finite element analysis with surfaces of the decoupling system that are normally touching the transducer housing, fixed in space. For example, the outside cylindrical surfaces of the decoupling bushes A505, the outside flat surfaces of decoupling washers A504, and the outer flat surfaces of the decoupling pyramids A501 were all fixed in space, as this represents the attachment of these surfaces to stationary parts of the housing (such as the housing described with reference to FIG. 6A). The displacement plots of the first eight modes of vibration are illustrated in FIGS. 14C-14R.

The same model was also analysed using linear dynamic finite element analysis (FEA) and with sine forces and reaction forces applied to the diaphragm and transducer base structure respectively over a frequency range of 50 Hz to 30 kHz. The displacement amplitudes at the simulated sensor locations were calculated versus frequency and are shown in the graph of FIG. 14S.

Figure 14G:
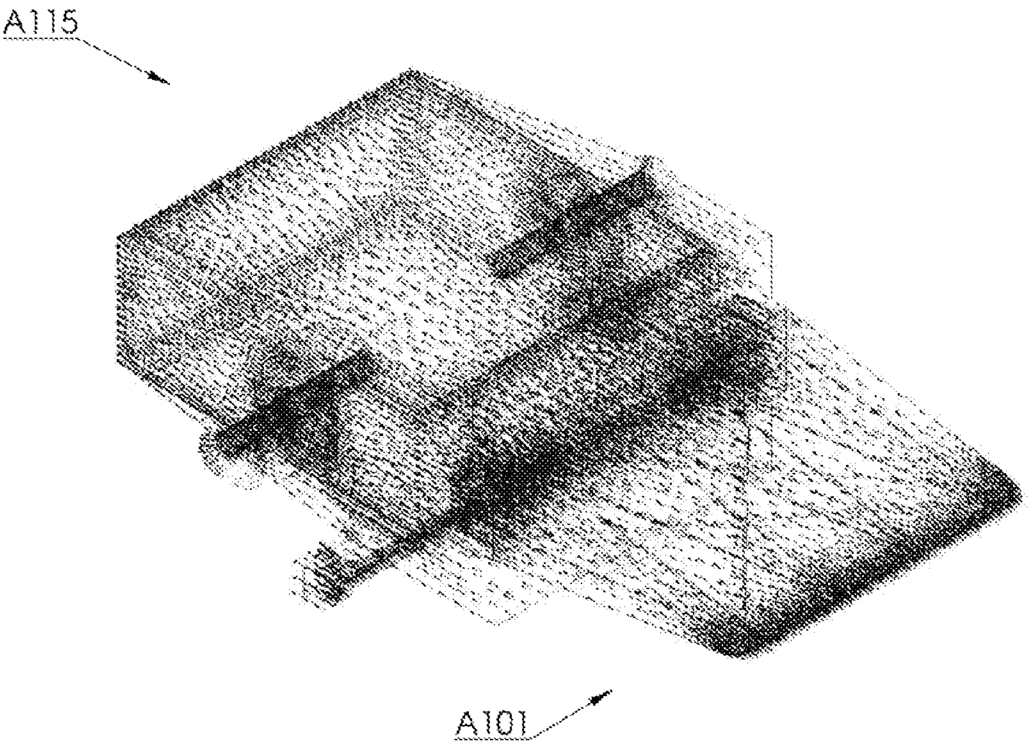
Figure 14H:
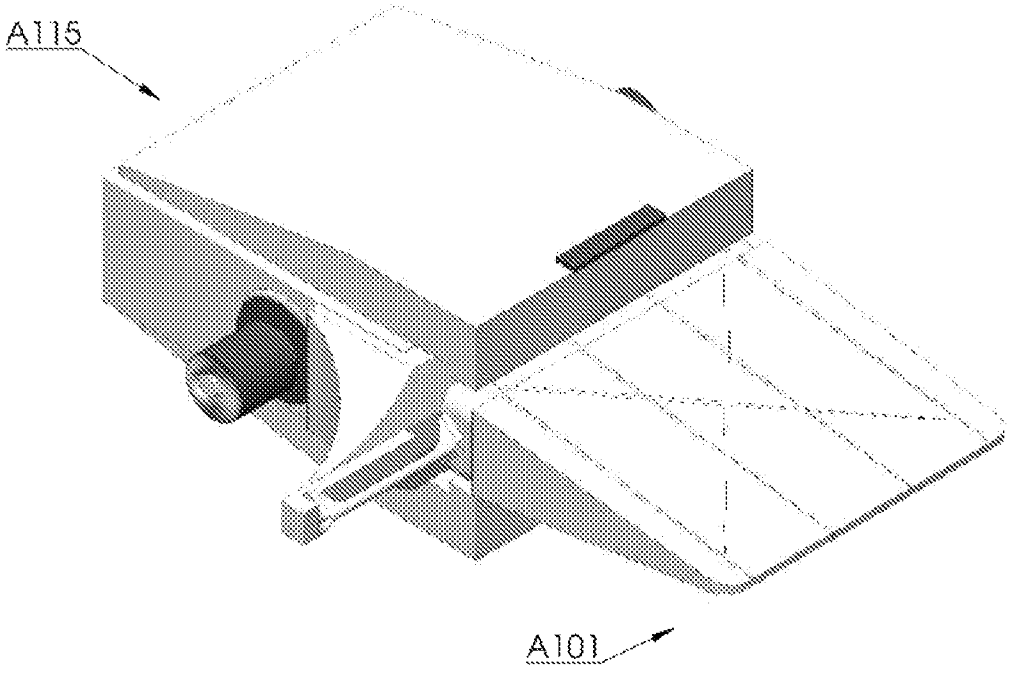
Figure 14I:
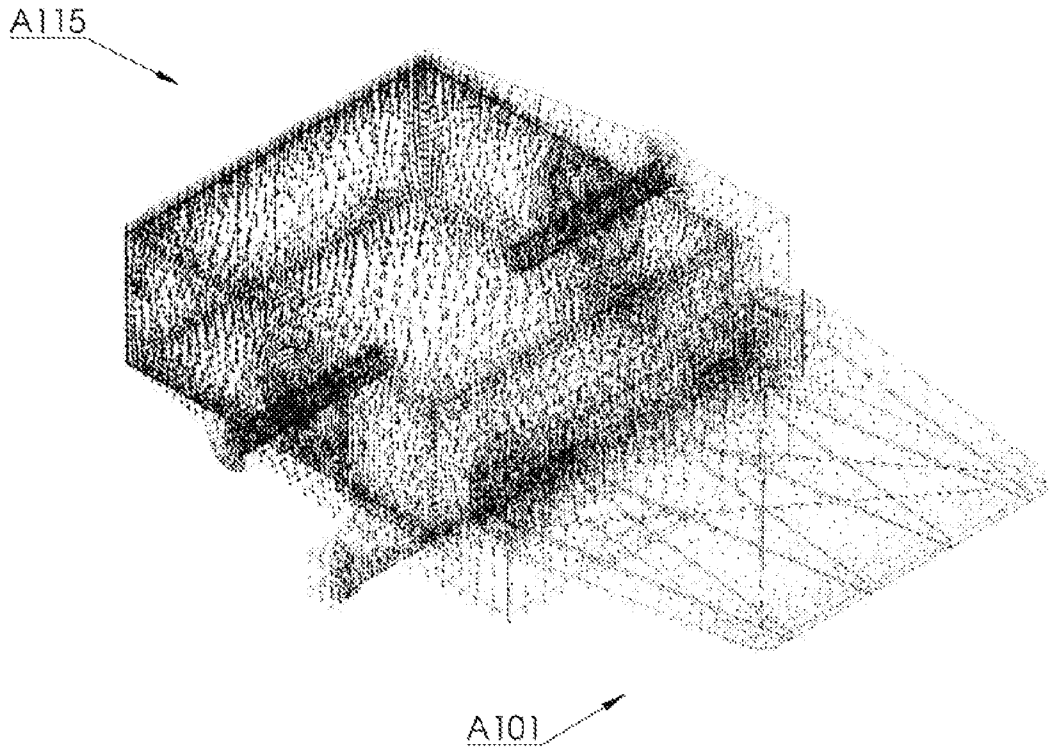
Figure 14J:
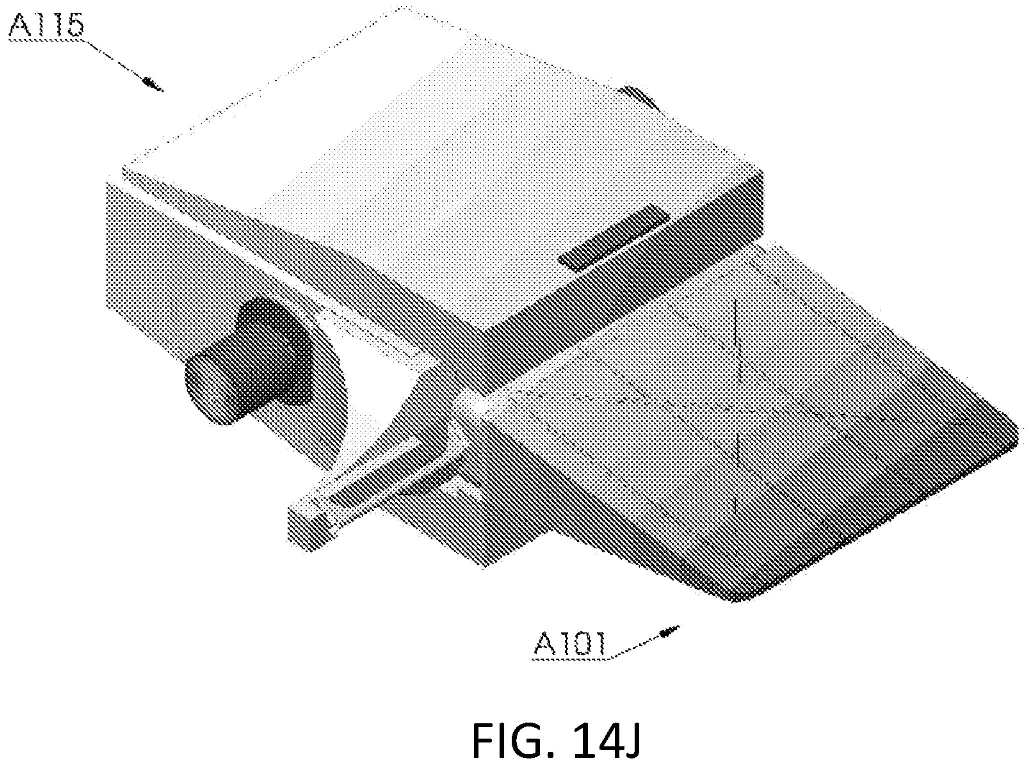
Figure 14K:
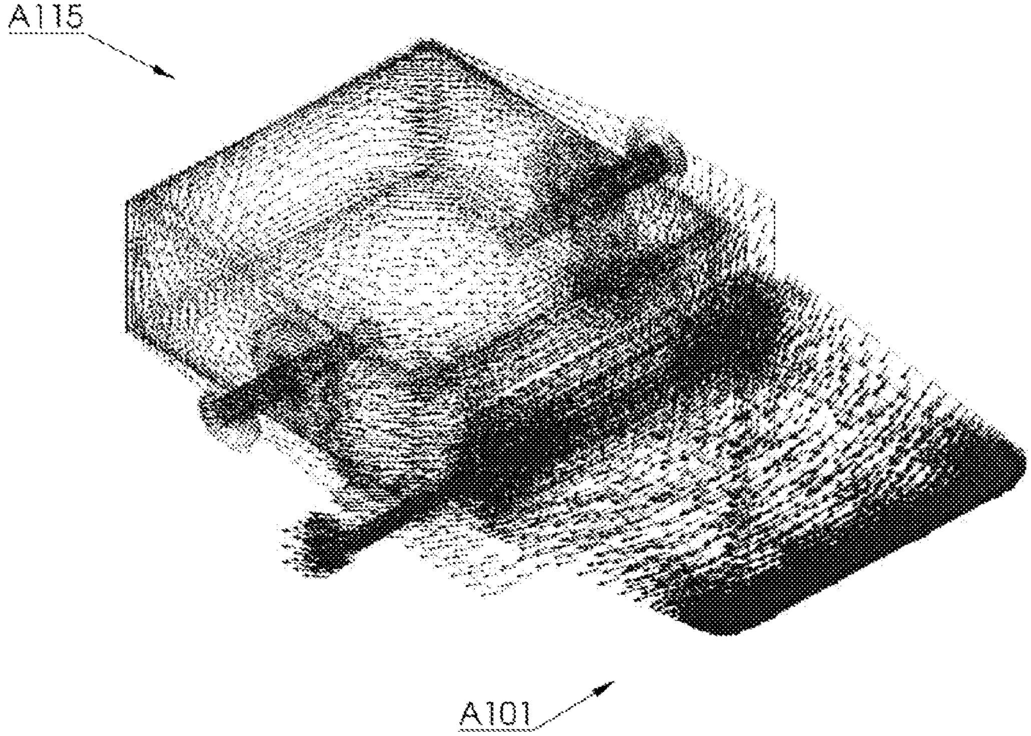
Figure 14L:
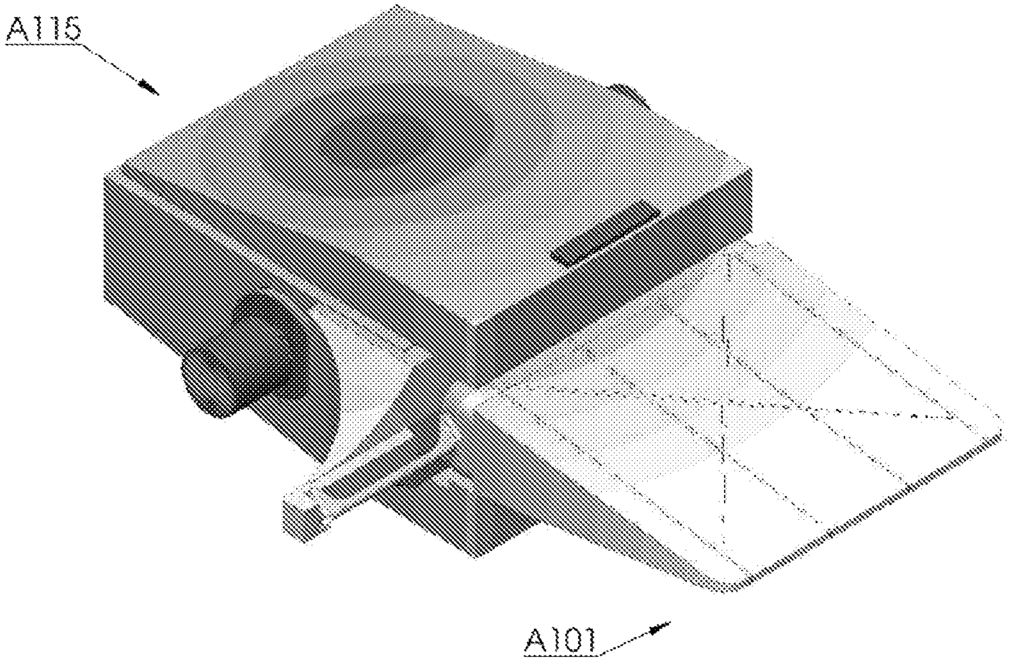
Figure 14M:
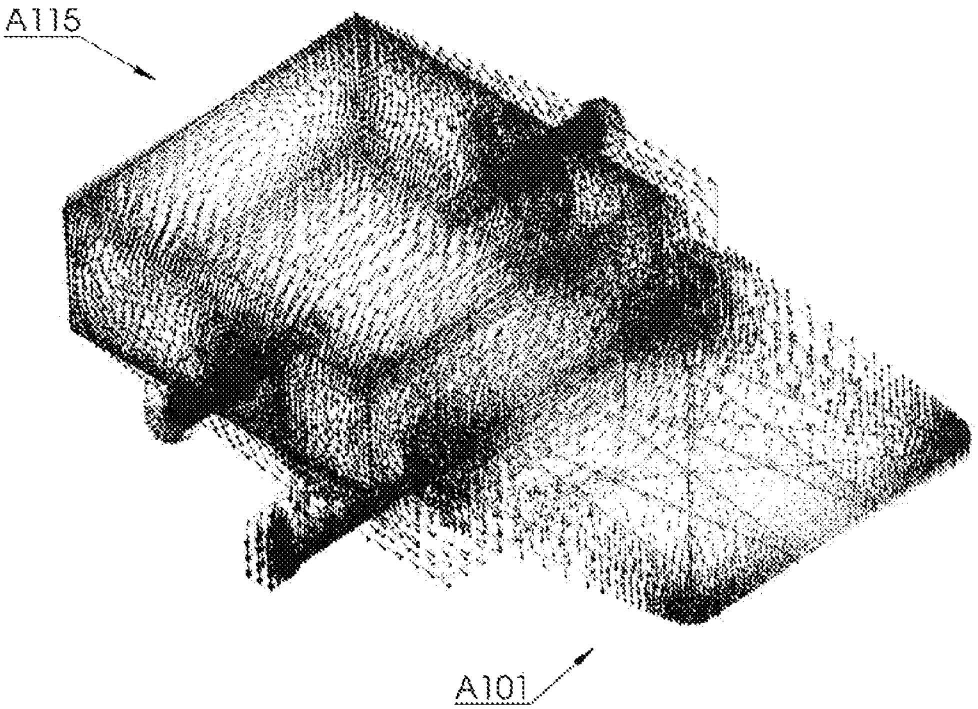
Figure 14N:
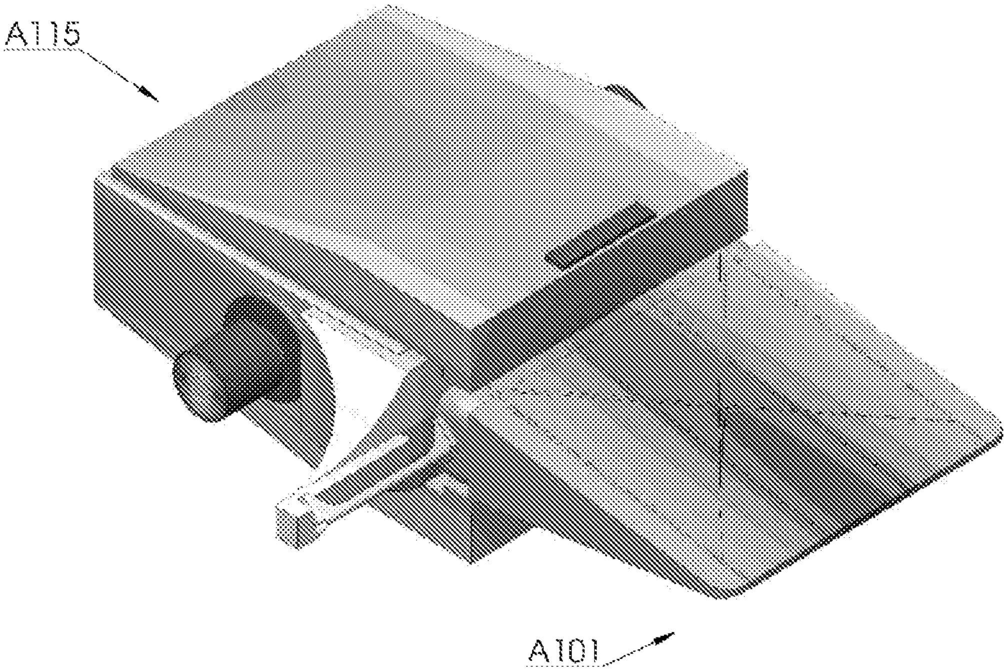
Figure 14O:
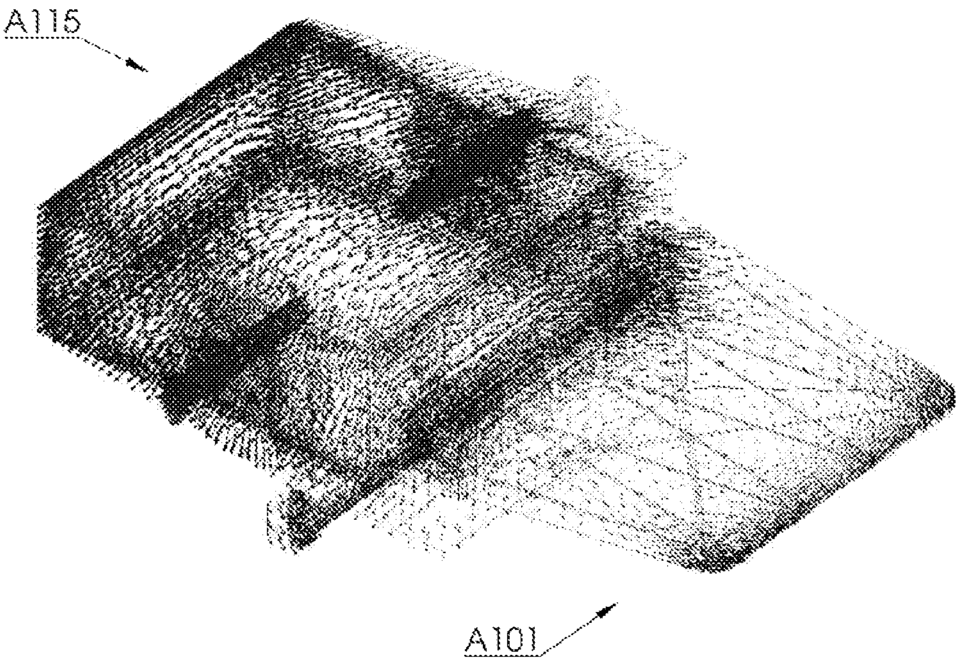
Figure 14P:
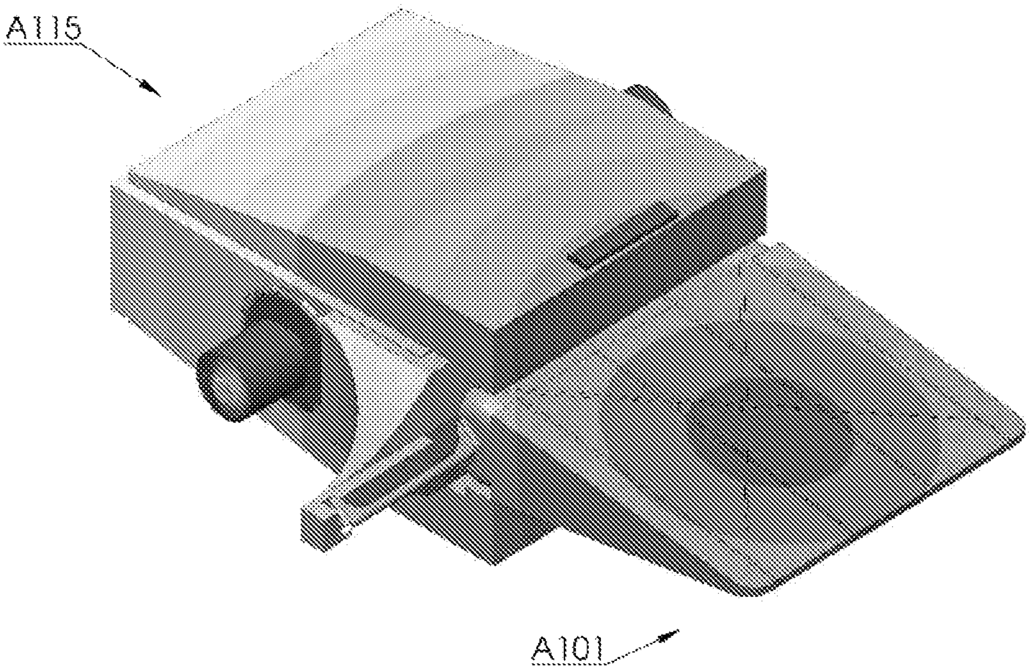
Figure 14Q:
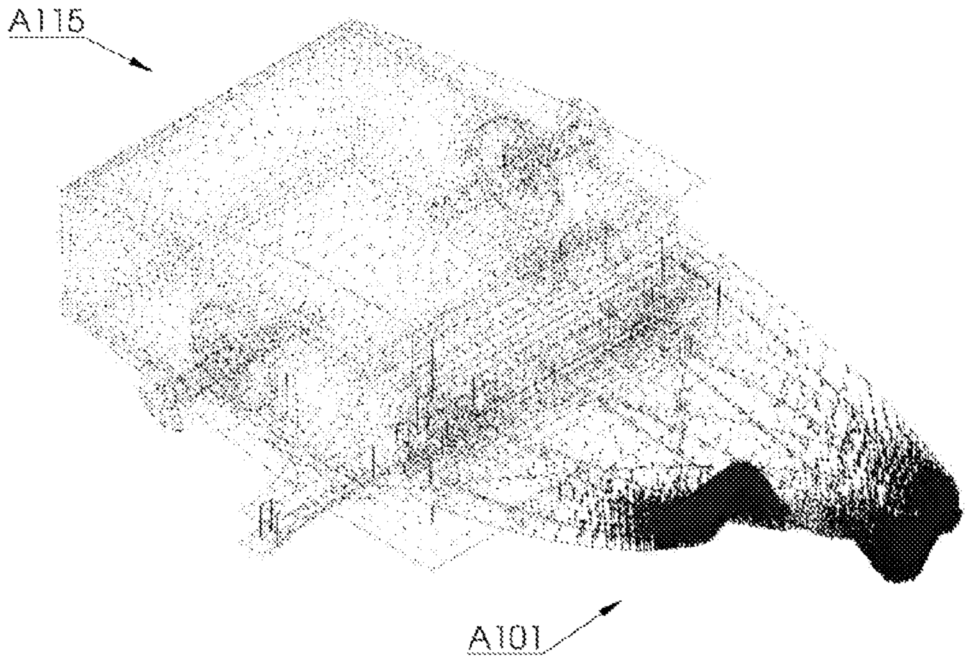
Figure 14R:
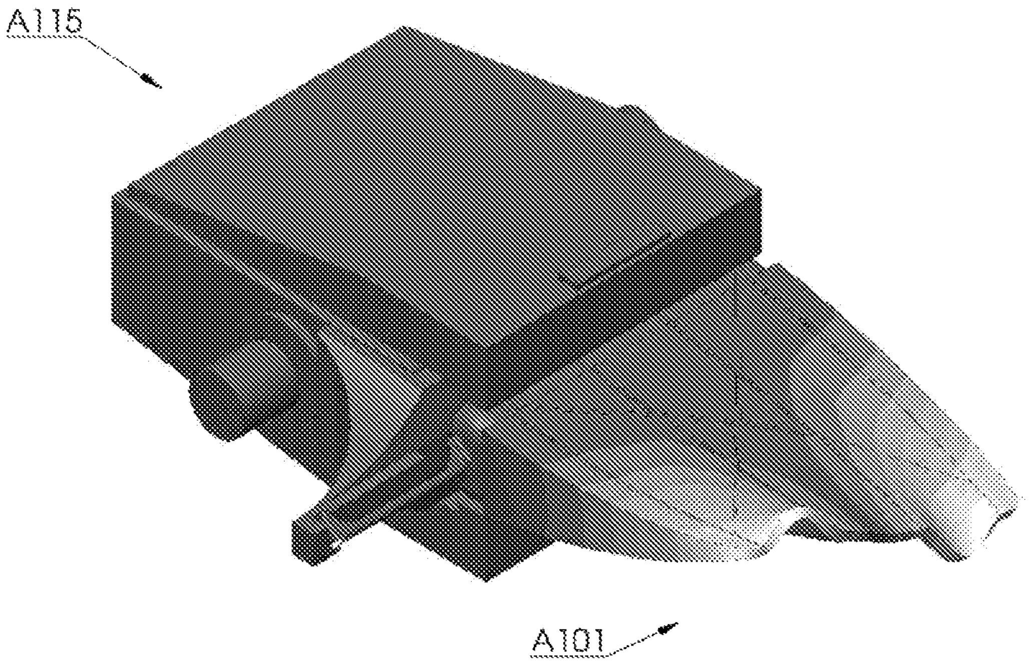
Figure 14S:
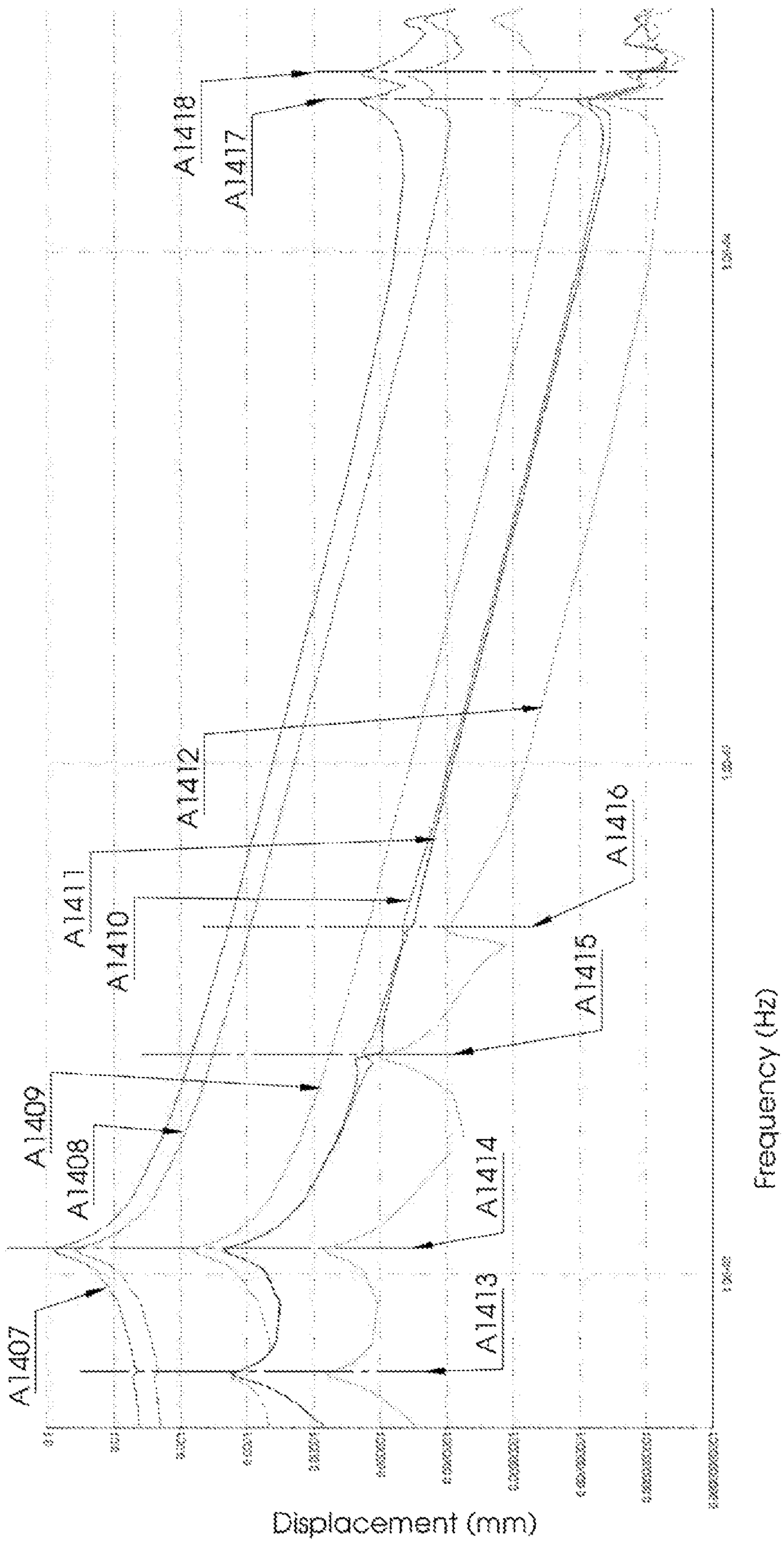

FIG. 14S is a graph of log displacement vs log frequency for the six simulated sensor locations on the transducer simulation, with A1407 indicating the plot for sensor A1401, A1408 indicating the plot for sensor A1402, A1409 indicating the plot for sensor A1403, A1410 indicating the plot for sensor A1404, A1411 indicating the plot for sensor A1406, and A1412 indicating the plot for sensor A1405.

It should be noted that for this simulation a damping ratio of 2% was used for all materials. This is low and does not represent the damping response that we would expect to see from the decoupling materials used, being viscoelastic urethane polymer and silicon rubber in the preferred implementation. The reason that low ratios were used is so that the resonant peaks associated with each mode are made sharper and more prominent, so that these modes can be easily identified on the graph in FIG. 14S.

FIGS. 14C-14R are harmonic/modal analysis results for various resonance modes of the transducer and decoupling mount system. FIGS. 14C and 14D illustrate vector and grey scale style displacement plots, respectively, for the entire driver, on decoupling mounts, for the first decoupling resonance mode at 64 Hz. The plots indicate a rotational mode about an axis located approximately through the decoupling bushes A505 and the decoupling washers A504. In the graph shown in FIG. 14S, frequency location A1413 indicates clear peaks in the plots A1410, A1411 and A1412 corresponding to the three sensors on the transducer base structure A115, and the plot for diaphragm sensor A1409. The plots A1407 and A1408 for the two sensors closest to the diaphragm tip show only a small deviation, as the diaphragm displacement associated with the fundamental resonance of the transducer (Wn) overwhelms the displacement due to the first decoupling resonance. Note that the displacement shown in plot A1412 is very small at 64 Hz, which indicates good performance with minimal translation at the location of the relatively rigid node axis decoupling mounts A504, A505. Relatively soft decoupling mounts A501 are used at other locations away from the node axis location A506 as these locations seem to transmit significant energy and movement at frequencies up to and around 64 Hz.

The fundamental diaphragm resonance of the transducer (Wn) at 111 Hz is the next resonance on the plot in FIG. 14S, indicated at frequency A1414. The associated peak can be seen across all six sensor location plots. FIGS. 14E and 14F illustrate vector and grey scale style displacement plots of this resonance mode, which is the same as the mode that is shown in FIGS. 13A-13D. Displacements shown in plots A1410, A1411 and A1412 are comparable to at 64 Hz in absolute terms, but relative to diaphragm displacement these plots actually exhibit no peak at 111 Hz. This would become more apparent in a plot that is equalised to make diaphragm displacement constant across all frequencies. So, there is no base structure resonance involving displacement on the decoupling mounts at this frequency. Note that, in normal operation, the fundamental diaphragm resonance frequency will be well-controlled by electrical damping.

FIGS. 14G and 14H illustrate vector and grey scale style displacement plots of the second decoupling resonance mode at 259 Hz indicated at frequency A1415, being a translational mode with the transducer moving back and forth substantially in a direction towards and away from the tip of the diaphragm. FIGS. 141 and 14J illustrate vector and grey scale style displacement plots of the third decoupling resonance mode at 266 Hz, being a primarily translational mode. The associated peaks of these two modes can be seen on the graph in FIG. 14S at location A1415, but only on the three sensors positioned on the transducer base structure A115. As both of these modes are very close in frequency, the two peaks have merged into one. Note that both these modes result in very small displacement amplitudes, and this is because they are barely excited due to the placement of the main mounts affecting the mode at the base structure node axis where displacements are small. This indicates that the decoupling mount design has successfully mitigated these two resonance modes. Note also that if realistic values for decoupling damping were used in the model then displacement would be further reduced.

FIGS. 14K and 14L illustrate vector and grey scale style displacement plots of the fourth decoupling resonance mode at 345 Hz, being a rotational mode. This particular mode cannot be seen clearly in any of the plots in the graph of FIG. 14S (and so this location is not indicated) as the force applied by the coil and reaction force applied by the transducer base structure act in a direction and are applied at a location that does not excite it well. Again, this indicates that the decoupling mount design has successfully mitigated this resonance mode.

FIGS. 14M and 14N illustrate vector and grey scale style displacement plots of the fifth decoupling resonance mode at 468 Hz, being a rotational mode. FIGS. 14O and 14P illustrate vector and grey scale style displacement plots of the sixth decoupling resonance mode at 479 Hz, being a primarily translational mode, although there is also a significant rotational action associated as indicated by the circular displacement lines seen in FIG. 14P. As both of these modes are close in frequency, the two peaks have merged into one, indicated at location A1416. This is another case where both these modes result in very small displacement amplitudes, indicating that they have been successfully mitigated through the choice of decoupling mount locations and compliances.

FIGS. 14Q and 14R illustrate vector and grey scale style displacement plots of the second diaphragm resonance mode (which we will refer to as the first diaphragm breakup mode) at 18.2 kHz, and is a twisting diaphragm mode (also shown in FIGS. 13F-13G). An associated peak can be seen on all the plots in the graph in FIG. 14S, at location A1417. In this frequency band the diaphragm the transducer no longer behaves in a single-degree-of-freedom manner, and this means that it is unlikely that the transducer will have a node axis at nor near the location of the decoupling mounts. However, since high frequency displacements are small and all mounts do possess some compliance, decoupling performance should still be good.

For this transducer, the plot A1412, corresponding to the location A1405 of the most robust/least compliant decoupling mounts, indicates the lowest displacement of all the sensor locations, over the entire FRO.

A benefit of this decoupling system design is that only one of the six decoupling system resonance modes is strongly excited and significantly affects diaphragm displacement. The other five modes have only a small effect on both the diaphragm and even on the base structure, as can be seen by the fact that all associated peaks are orders of magnitude less than diaphragm displacement at the same frequency. Another benefit of this decoupling system is that, despite the fact that the mounting system is relatively robust and less-compliant than some others, the one decoupling system resonance mode that is excited occurs at the relatively low frequency of 64 Hz (though note that this may not be the frequency in the real-world embodiment.) Furthermore, all decoupling system resonance modes are highly damped.

Simulation Results Explained

A simplified suspension system is a classic single-degree-of-freedom mass-spring-damper system where a force is applied to the mass and the idea is to minimise transfer of force to the base to which the spring and damper are attached. Normally decoupling is achieved in the 'mass-controlled' region which lies above the resonance frequency. Around the resonance frequency (the damping-controlled region) and below resonance (the stiffness controlled region) the decoupling system is typically ineffective.

Moving to a generalised three-dimensional transducer on a decoupling system, there are now six degrees of freedom of the transducer moving on the decoupling system (plus a seventh degree of freedom occurring at low frequencies associated with the fundamental diaphragm resonance frequency). The six degrees of freedom are three translational along three orthogonal planes, and three rotational about three orthogonal axes of rotation. In the case of embodiment A six associated transducer resonance modes are shown in FIGS. 14C/14D, 14G/14H, 14I/14J, 14K/14L, 14M/14N and 14O/14P. The seventh fundamental diaphragm resonance frequency is shown in 14E/14F.

As with the single-degree-of-freedom system, in a generalised three-dimensional transducer plus decoupling system, decoupling is typically only achieved in the mass-controlled region, which lies beyond the highest-frequency transducer resonance. In the case of embodiment A transducer, the highest-frequency resonance mode when the transducer is mounted using a decoupling system is shown in FIG. 14O/14P, and occurs at around 479 Hz in the simulation. This would normally imply that the decoupling system only starts to become effective at higher frequencies such as, perhaps, above 958 Hz (twice the highest resonance frequency). However, as described in section 4.7 above, in addition to this, the decoupling system described in section 4.2 and simulated is effective down to frequencies close to the lowest resonance mode, shown in FIG. 14C/14D occurring at approximately 64 Hz.

This shows that this decoupling system is novel in that decoupling performance is maintained at frequencies below the highest resonance mode of the other transducer-on-decoupling-mounts resonance modes, including all other five resonance modes down towards the mass-controlled region with respect to the lowest 64 Hz mode. This is evident from the relatively low levels of displacements observed at the resonant frequencies relative to the intended displacement of the diaphragm during operation.

This is essentially because location of the relatively less compliant node axis decoupling mounts A504, A505 at the transducer's node axis location A506 of approximately zero translation (in the hypothetical unsupported state) allows it to move effectively the same way as if it were in zero gravity without compressing the rigid mounts. This decoupling design can be seen as an alignment of the behaviour of the decoupling system with the transducer's 'zero-gravity' behaviour so that at frequencies in the overall transducer/decoupling-system's stiffness and resonance-controlled regions (a 'first operative state') where displacement is affected by the transducer mounts, and also at frequencies in the transducer's mass-controlled region (the 'second operative state', which is like 'zero-gravity') where displacement is not or less affected by the transducer mounts, the transducer's displacement comprises a rotation about substantially the same axis. This alignment means that it is only the more compliant distal mounts A501 located away from the axis A506, which are being utilised to significantly decouple translational movements and improve decoupling performance during operation (while the node axis mounts cause the device to operate as if in the 'zero gravity' state). These distal mounts A501 are sufficiently compliant such that, in the case of embodiment A transducer, the associated resonance mode occurs at the low frequency of 64 Hz.

Frequency Range of Operation (FRO)

The computer model of the simulated driver discussed earlier with respect to FIG. 14A, may have a frequency range of operation that extends as low as 20 Hz, although with a fundamental frequency of 111 Hz, the volume will be dropping off rapidly. The lower limit of this driver will vary depending on the final configuration in which it is deployed.

When implemented as a personal audio driver a "proximity effect" due to close proximity to the ear may boost the volume of the bass frequencies. If the ear drum side of the diaphragm is somewhat sealed then bass response can be further enhanced.

Note that there is potential to tailor the fundamental resonance frequency and the damping of the fundamental mode by controlling the sealing between the ear-drum side of positive air pressure side of the transducer and the other, negative air pressure, side.

The upper end of the frequency response of this driver could extend close to what is normally considered the limit of human hearing (20 kHz). The first diaphragm breakup mode is at 18.2 kHz, and is a twisting mode. This peak A1417 can clearly be seen in the displacement plot A1407 (in FIG. 14S) by the sensor A1401 at the side tip of the diaphragm. If this mode was to be measured with an on-axis microphone, it would be hard to discern as the mode is not strongly excited, and because positive sound pressure created on the left side of the diaphragm is cancelled by negative sound pressure on the right side of the diaphragm. In the real-world waterfall plot in FIG. 49 this mode, at location H203, barely shows, so the FRO can be extended higher still.

The second diaphragm breakup mode in the computer simulation, occurring at 19.4 kHz, is also balanced and does not move a significant amount of air so is actually not able to be seen in the displacement plot of FIG. 14S.

The third diaphragm breakup mode in the computer simulation, occurring at 19.9 kHz, corresponding to peak A1418 in the displacement plot of FIG. 14S, is a bending mode of the diaphragm, and is a mode that is susceptible to excitation. This mode will create a noticeable peak both in a waterfall plot and also in a frequency response plot. It is preferable that the FRO is below the frequency of this mode as it results in significant audio distortion, although in this case the distortion is at the fringe of the audible bandwidth.

4.2.2 Embodiment E Transducer—Decoupling System

Referring to FIGS. 34A-34M and 35A-35H, an embodiment of an audio transducer device E200 (herein referred to as the embodiment E audio transducer) is shown comprising a diaphragm assembly E101 that is pivotally coupled to a transducer base structure E118 via a suitable hinge assembly. As shown in FIGS. 35A-35H the transducer assembly E200 is accommodated within a transducer housing E118*b*. The transducer housing comprises decoupling pins E208 that are similar to the decoupling pins described in the decoupling system of section 4.2 on the base structure. The location of the decoupling pins was determined by modelling every part of the assembly E200 shown in FIGS. 35A-35H to determine the node axis location for the transducer base structure including the transducer housing E118*b* and the base structure E118*a* and diaphragm assembly E101 accommodated therein. This helps identify the preferred location for decoupling the assembly from another part of the audio device as previously described in section 4.6. This other part could be, for example, another baffle, an enclosure, a housing, or a headband of a headphone. The decoupling pins E208 have been located at or close to this node axis.

A preferred decoupling mounting system for this embodiment would comprise flexible mounts, such as those made from an elastomer, to provide most of the support to the assembly shown in FIGS. 35A-35H located at the decoupling pins E208. The system would also include additional distal mounts located away from the node axis, as described under section 4.2, to provide light support preventing the assembly from rotating too far with respect to the part of the audio device to which the assembly is decoupled, and to prevent the two parts from touching during operation. The decoupling mounting system described is not shown fully in the drawings, but it is similar to the system for decoupling the embodiment A transducer as shown in FIGS. 2A-2I and described under section 4.2.

4.2.3 Embodiment U Transducer—Decoupling System Construction

Referring to FIGS. 71A-71F an audio device having an audio transducer U101 that is mounted on a housing (or part of a housing) or surround U102 via a decoupling system U103 of the invention is shown. The decoupling system U103 comprises multiple flexible and compliant mounts U103*a-c* located about the periphery of the transducer U101. The decoupling mounting system is configured to maintain a small gap U104 about a substantial portion of the periphery, and preferably the entire periphery apart from the mount locations, of the transducer U101, between the transducer U101 and the housing U102. Referring also to FIGS. 72A-72M, the transducer U101 is a linear action transducer comprising a transducer base structure U202 and a diaphragm assembly U201 moveably coupled to the base structure. The base structure U202 comprises a substantially thick rigid and squat geometry and includes a substantially hollow and open chamber U215 on one side for accommodating the moveable diaphragm assembly U201. It should be noted that the transducer base structure assembly comprises the part U202, and also the magnet assembly consisting of magnet U205 and pole pieces U206*a-c*. In this embodiment, the diaphragm assembly U201 is supported in position relative to the chamber U215 by ferromagnetic fluid. It will be appreciated that other mechanical mechanisms may be used to support the diaphragm assembly within the chamber U215 in alternative embodiments as would be apparent to those skilled in the art. The diaphragm assembly is reciprocally moveable within the chamber U215 to transduce sound. In particular, the transducing mechanism comprises an electromagnetic mechanism including a coil U209 extending laterally from the diaphragm structure U212, into a magnetic field generated by magnet U205 and associated pole pieces U206*a-c*. The diaphragm assembly U201 is aligned and does not connect to the chamber such that a substantially uniform gap U203 is maintained between the outer periphery of the diaphragm structure U212 and the inner periphery of the chamber U215. As such, the audio transducer of this embodiment comprises a diaphragm structure that is substantially free from physical connection with a surrounding structure as defined for the configuration R5-R7 audio transducers under section 2.3 of this specification. The diaphragm structure however may or may not comprise inner and/or outer reinforcement in this embodiment.

Referring back to FIGS. 71A-71F, the decoupling system U103 comprises a plurality of mounts that are distributed about the periphery of the audio transducer, and in particular the transducer base structure U202. In this embodiment, a pair of decoupling mounts U103*b* and 103*c* are located and distributed about a cavity U105 and a third mount is located at the opposing end/side of the base structure U202. It will be appreciated a different number of mounts may be used in alternative embodiments. The mounts U103*b* and U103*c* couple between the outer peripheral wall of the cavity U105 adjacent the diaphragm structure and the inner peripheral wall of the housing U102. The inner wall of the housing comprises a recess that corresponds and is configured to accommodate the associated mount U103*b*, U103*c*. Each mount comprises a curved inner end face to correspond with the curved outer peripheral wall of the cavity U105. An opposing end face of the mount U103*b*, 103*c* is also curved to correspond with the inner wall of the associated housing recess. A third decoupling mount U103*a* locates on an opposing side of the transducer base structure U202 to the cavity U105, between an end face of the base structure and the inner wall of the housing. The mount U103*a* locates within a corresponding recess in the inner wall of the housing. This mount U103*a* comprises substantially planar opposing end faces to correspond with the substantially planar end face of the base structure and planar face of the recess. One end of each mount U103*a*-103*c* is flanged to reside within a corresponding groove (not shown) in the corresponding recess in situ. Each mount U103*a-c* comprises a substantially larger thickness than the depth of the corresponding housing recess, to thereby create a substantially uniform gap U104 about the transducer base structure between the outer peripheral wall of the base structure and the inner peripheral wall of the housing. Each mount U103*a-c* is preferably formed from a suitably flexible and compliant material such as a soft plastics material, e.g. a rubber or silicone material. Furthermore, the mounts are preferably rigidly coupled at either side to the base structure and housing via any suitable method, such as an adhesive agent as would be apparent to those skilled in the art.

The mount U103*a* locates at or near the node axis of the transducer U101, being the axis about which the audio transducer would pivot in a hypothetical unsupported state during oscillation of the diaphragm assembly. FIG. 72H shows the location of the node axis U214 for the audio transducer of this embodiment. In this example, the node axis mount U103*a* locates within a distance of approximately 10% of the longitudinal length of the transducer assembly/base structure from the node axis. It will be appreciated that in alternative forms the mount may be located less than a distance of 25%, or 20%, or 15% of the largest dimension of the base structure assembly as previously described. This mount may be relatively less compliant than the distal mounts U103*b* and 103*c* in some configurations. The distal mounts U103*b* and U103*c* are distal from the node axis. They are located a distance of approximately 80-90% of the length of base structure from the node axis, but it will be appreciated they may be located a distance greater than 25% or 40% in alternative embodiments. The distal mounts U103*b* and U103*c* may be relatively more compliant than the node axis mount U103*a* as previously described.

Performance

The decoupling system of Embodiment U was designed to have a compliance profile that meets the performance criteria and design considerations set out in section 4.4 of this specification. This performance of this audio transducer was simulated and the results are explained below.

FIGS. 72G-72M are FEM modal analysis depictions of the fundamental diaphragm resonance frequency, which occurs at approximately 41 Hz when the audio transducer of this embodiment is simulated in a hypothetical unsupported state. Note that for the purposes of this analysis the diaphragm suspension is modelled as thin silicon as opposed to as ferromagnetic fluid, to make analysis easier to set up.

As can be seen in FIGS. 72I and 72J, the audio transducer has a node axis U214 about which the base structure U202 rotates when in the hypothetical unsupported state. This despite the fact that the diaphragm moves with a substantially linear action, due to the asymmetrical profile of the audio transducer and the location of the diaphragm assembly and chamber U215 on one side of the base structure.

FIGS. 73C and 73D illustrate results of a FEM modal analysis of the driver mounted on decoupling mounts U103*a-c*. These figures illustrate the highest-frequency resonance mode involving movement of the driver base structure on the decoupling mounts. In simulation this resonance mode occurred at approximately 173 Hz. Note that in this case the mounts are asymmetrical which generally, as is the case here, results in all resonance modes being excited when the diaphragm assembly is operated. Note also that the outer faces of mounts N103*a-c* are fixed in space in the simulation, and this assumption is valid if the driver surround and/or enclosure are relatively rigid and heavy.

The level of compliance provided by the decoupling mounts 103*a-c* means that this audio transducer is sufficient to be operated as a mid-range audio transducer, for example having an FRO of approximately 100 Hz-1600 Hz. The octave value equivalent of this FRO is 4 octaves. Taking case b) of the compliance criteria outlined in section 4.3.1 below, then the lower limit of the FRO (100 Hz)×2^(4/4)=100 Hz×2^1=200 Hz. 200 Hz is more than the highest resonance mode frequency of 173 Hz of this audio transducer. Since the 173 Hz mode is the highest-frequency resonance of the base structure on the decoupling mounts, this means that the decoupling mounting system is sufficiently compliant such that all modes of vibration of the base structure on the decoupling mounts occur at frequencies lower than 200 Hz. In other words the resonances of this audio transducer are confined to the lower ¼ of the FRO, making it suitable as a mid-range transducer according to this criterion.

4.3 General Decoupling—Design Considerations

The above described simulation leads to some principles of operation and design considerations that will be described below to help design effective decoupling systems as per the decoupling systems described in sections 4.2.1-4.2.3 of this specification. It will be apparent to those skilled in the art that these principles and considerations may be used to design an alternative decoupling system to those described in sections 4.2.1-4.2.3 and such alternative designs based on these principles and considerations are not intended to be excluded from the scope of this invention. Unless otherwise specified, reference to a decoupling system of this invention shall be interpreted to include not only the embodiments described in section 4.2 but also to decoupling systems that can be designed in accordance with the following considerations.

4.3.1 Exciting Modes Outside or Close to the FRO Limits

To achieve reasonable performance, the decoupling system can be designed such that all modes of vibration of the base structure that are significantly excited during operation of the diaphragm structure that cause significant movement (of the base structure) occur at frequencies that are either outside of the FRO of the transducer or at least close within a lower frequency range of the FRO.

The primary considerations are the compliance and/or compliance profile of the decoupling system, and the location of the decoupling system relative to the associated base structure assembly (or other component it is decoupling). The phrase “compliance profile” in relation to the decoupling system is intended to comprise the overall degree of compliance associated with all decoupling mounts and/or the relative degrees of compliance amongst the decoupling mounts distributed at the different locations on the transducer assembly.

In some embodiments for instance, for effective decoupling, the compliance and/or compliance profile of the decoupling mounting system and the location of the decoupling mounting system relative to the associated base structure assembly, is such that all modes of vibration that are significantly excited during operation of the diaphragm of the associated audio transducer to cause significant movement of the base structure assembly, relative to at least one other part of the audio device that is not the diaphragm, occur at frequencies lower than:

a) the FRO of the audio transducer;
b) the lower limit of the FRO×2^((an octave value equivalent of the FRO)/4);
c) the lower limit of the FRO×2^((an octave value equivalent of the FRO)/2);

For example, if the FRO is from 150 Hz to 9600 Hz, then the FRO is exactly 6 octaves (9600=150×2^6). So the octave value equivalent of the FRO is 6.

As described above, the only resonance mode that is significantly excited during operation of the diaphragm of the associated audio transducer to cause significant movement of the base structure assembly, relative to at least one other part of the audio device that is not the diaphragm, is that occurring at 64 Hz. This means that case a) applies because 64 Hz<the FRO of the audio transducer (i.e. is <150 Hz.) In this case decoupling performance is great because no decoupling modes are excited during normal operation (150 Hz-9600 Hz.)

If the transducer was being used from 20 Hz to 10,240 Hz then the octave value equivalent of the FRO is 9 octaves. This means that case b) above applies because 64 Hz<the lower limit of the FRO×2^((an octave value equivalent of the FRO)/4)=20 Hz×2^(9/4)=95 Hz. The frequency band from 95 Hz to 10,240 Hz comprises ¾ of the FRO, so the transducer is still decoupled over the majority of the FRO meaning that performance is still quite good.

4.3.2 Minimising Shift of Node Axis Location

In practice, a transducer mounted in a high quality decoupling mounting system may have a transducer node axis location that moves during operation. At a relatively low frequency range (with respect to the FRO) the movement of the transducer base structure, and a node axis location if one exists, is primarily defined by the mechanical constraints of the decoupling mounting system (such as the relative compliance at the mounts A504, A505 and A501)—herein referred to as the “first operative state.” In general, the movement of the transducer base structure will be different, and if there is a node axis then it will be shifted, compared to movement in the hypothetical unsupported state of the transducer.

At frequencies outside this lower frequency range, the movement of the transducer base structure, and the node axis location if one exists, becomes primarily defined by the location and direction of the forces applied to the transducer base structure (such as the reaction forces from diaphragm oscillation and/or resonance forces) and by the base structure assembly’s mass distribution—herein referred to as the “second operative state” (which is typically the same as the node axis location in the hypothetical unsupported state).

The decoupling system described in section 4.2.1 above resists or at least significantly reduces such change in movement, including the aspect of the shift in the node axis location. The decoupling system is designed such that there is very minimal or no movement of the node axis location within the FRO to minimise or prevent translational movement at the less compliant decoupling locations.

Not all transducers mounted in a decoupling mounting system will have a node axis in both first and second operative states, as it is possible that the resonance modes associated are purely translational in either or both states. The second operative state is the preferable mode of operation for the majority bandwidth of the FRO, and particularly at frequencies where a housing or baffle or enclosure etc. from which the transducer is decoupled has resonances that may be excited if the decoupling is ineffective. If a transducer node axis exists for the second operative state, then it is preferable to design the decoupling mounting system such that the location of this axis does not shift far in the first operative state, or at least that any such shift in axis should occur at a relatively low frequency (with respect to the FRO).

As has been described in the case of the embodiment A audio transducer of this invention, this is achieved when the majority of support provided by the node axis mounts A504, A505, i.e. the relatively less compliant mounts, are located at, or at least close to, the transducer's axis of zero translation in the hypothetical unsupported state (this state being equivalent to the 'second operative state').

If the embodiment A audio transducer used a decoupling mounting system that did not have the majority of support provided close to the second operative state transducer node axis location, then one or more of the higher-frequency transducer/decoupling system resonance modes would be strongly excited and, furthermore, such excitation would result in a shift in the node axis location during a shift from the second operative state to the first operative state. Provided that rotational compliance at the node axis mounts remains relatively small, a sufficient increase in the translational compliance of the decoupling system at the node axis mounts A504 and A505, relative to compliance the distal mounts A501, will cause this location to become a node axis in the first operative state as well as in the second operative state, which means that the shift from the second to first operative state (and vice versa) will occur at a lower frequency (with respect to the FRO) as governed primarily by compliance of the softer distal mounts.

For example, a sub-optimal decoupling configuration may be a standard cone-diaphragm driver having translational diaphragm operation and exhibiting rotational symmetry, but having asymmetrical decoupling mount compliance. This system may exhibit a second operative state having no transducer node axis, and a first operative state where there is a transducer node axis, and the transition from the second state to the first may occur at relatively high frequency. In this case the decoupling system creates one or more strongly excited modes occurring at relatively high frequency, and may fail to effectively prevent vibration from passing into a housing or baffle or enclosure etc. other than well beyond this frequency.

The effectiveness of the decoupling system is related to the degree to which it transmits vibrations. Vibration transmission may be high, and may even increase beyond levels in a non-decoupled system, around frequencies at which decoupling system compliance creates resonance modes. It is best if the device is operated above such frequencies, however this is not always practical. Around and below such frequencies the location of the transducer node axis is either defined or partially influenced by mechanical constraints of the decoupling mounting system.

In some embodiments, the compliance and/or compliance profile of the decoupling mounting system and location of the decoupling mounting system relative to the associated base structure assembly is such that the audio transducer operates in the second operative state when the base structure assembly is subjected to an operating frequency higher than approximately any one or more of:

a) the lower limit of the FRO of the audio transducer;
b) the lower limit of the FRO×2^((an octave value equivalent of the FRO)/4);
c) the lower limit of the FRO×2^((an octave value equivalent of the FRO)/2);

This is because sound quality is improved if the decoupling mounting system is sufficiently compliant such that decoupling system resonances, and frequencies at which the mounting system does not effectively decouple, occur at low frequencies compared to the FRO, and preferably also compared to the frequency band where the human ear is most sensitive to, being 400 to 4 kHz.

The simulated embodiment A audio transducer operates in the second operative state at frequencies well above, for example 1 octave higher than, the highest-frequency $6^{th}$ decoupling mode (479 Hz), so is in the second operative state from an octave higher than 479 Hz, i.e. above 958 Hz. This scenario maintains optimum decoupling performance, although as has been shown, in the special case that the mounts are carefully designed such as in FIGS. 14A-14S, good performance can also be achieved at lower frequencies. Specifically, if the system of FIGS. 14A-14S is operated down close to 64 Hz, for example down to 128 Hz, decoupling modes in this bandwidth will be only minimally excited and so will cause only minimal audio degradation, despite the fact that the driver transitions into its $1^{st}$ operative state.

As described, optimal isolation will be provided by the decoupling system if the decoupling mounts and decoupling compliance are configured such that the transducer node axis in the first operative state is the same as the location in the second operative state. In practice tolerances are expected and hence adequate isolations would be provided by a decoupling system if the decoupling mounts and decoupling compliance are configured such that the transducer node axis in the first operative state is very close/proximal to the location in the second operative state.

In some embodiments, the decoupling mounting system has one or more distal mounts which are located beyond a distance of 25%, more preferably 40%, of the largest dimension of the base structure assembly, away from the transducer node axis in the second operative state. As the movement of the base structure assembly, with respect to the component to which it is mounted, is probably significant, it is preferable that distal mounts are compliant and do not provide much of the support to the transducer, compared to the node axis mounts. The purpose of the distal mount is largely to provide some centring ability, preventing the transducer from touching the housing or some other part of the audio device during normal operation. Preferably, the distal mounts are collectively sufficiently compliant such that, if all remaining decoupling mounting system mounts are removed, the frequencies of all base structure assembly resonance modes, involving movement of the base structure assembly relative to the component to which it is mounted, that are significantly excited during the course of operation of the audio transducer are lower than:

a) the FRO of the audio transducer;
b) a lower limit of the FRO×2^((an octave value equivalent of the FRO)/8);
c) a lower limit of the FRO×2^((an octave value equivalent of the FRO)/4);

A suitable method of calculating the frequency of such resonant modes is via a computer model using finite element analysis.

4.4.3 Various Decoupling Materials and Configurations

The decoupling mounting system can comprise a variety of different materials and configurations to provide suitably compliant support from one part of the audio device to another, in order to usefully alleviate mechanical transmission of vibration between the two. For example, the decoupling mounting system may comprise a flexible and/or resilient material such as rubber, silicon or viscoelastic urethane polymer or other member formed from a soft plastics material. It may comprise ferromagnetic fluid and the fluid may be held in place by the application of a magnetic field. The decoupling mounting system may use magnetic repulsion and perhaps a magnetic element on one part repels another magnetic element on another part. In another configuration, the decoupling mounting system may comprise fluid or gel to provide support between the first and second components. The fluid or gel may be contained within a capsule comprising a flexible material. Alternatively, or in addition, at least one of the mounting systems could comprise a flexible and/or resilient member or element such as metal spring or other metallic resilient member.

In some embodiments the decoupling mounting system comprises a flexible material that has a mechanical loss coefficient at 24 degrees Celsius that is greater than 0.2, or greater than 0.4, or greater than 0.8, or most preferably greater than 1. This means that resonance modes involving the driver moving on decoupling mounts may be better controlled.

4.4 Preferred Audio Transducer Features in Combination with Decoupling

As previously mentioned, decoupling mounting systems of this invention as described under the embodiments of section 4.2, for example, and/or any other decoupling system embodiment that can be designed by those skilled in the art in accordance with the considerations outlined in section 4.3 are preferably incorporated in an audio transducer that comprises any combination of one or more (but preferably all) of the following features:

- a thick, rigid diaphragm employing a rigid approach to resonance control as described in the configuration R1-R4 diaphragm structures in section 2.2 of this specification or as in the diaphragm structures described under the configuration R5-R7 audio transducers of section 2.3,
- a base structure with rigid and robust geometry described for the embodiment A audio transducer under section 2.2.1 of this specification, and/or
- a free periphery diaphragm as defined for the audio transducers described under section 2.3 of this specification; and/or
- a rotational action transducer having a hinge system as defined under sections 3.2 or 3.3 of this specification.

The combination of these features with a decoupling system will be described (mainly) with reference to the embodiment A audio transducer which incorporates the decoupling system described in section 4.2.1 of this specification. It will be appreciated however, that the following audio transducer features described can be combined with any other decoupling system as described in section 4.2.2 or 4.2.3 or otherwise as can be designed in accordance with the criteria outlined in section 4.3 without departing from the scope of this invention.

4.4.1 Decoupling in Combination with Rigid Diaphragm

As previously mentioned, if a substantially thick and rigid diaphragm structure employing a rigid approach to resonance control (as defined for the configuration R1-R4 diaphragm structures under section 2.2 for example), is sufficiently decoupled from an enclosure of a driver then neither enclosure resonances nor diaphragm resonances will cloud audio reproduction within the operating bandwidth. The decoupling systems of this invention are therefore preferably incorporated in an audio device having an audio transducer having a rigid diaphragm structure as described in relation to the configuration R1 diaphragm structure of this invention for example. Features and aspects of the configuration R1 diaphragm structure of this audio transducer example are described in detail in the Rigid Diaphragm section of this specification, which is hereby incorporated by reference. Only a brief description of this diaphragm structure will be given below for the sake of conciseness.

Referring to FIGS. 2A-2I, in one embodiment the audio device incorporating one of the above described decoupling systems of this invention further comprises an audio transducer having a diaphragm structure A1300 of configuration R1 comprising a sandwich diaphragm construction. This diaphragm structure A1300 consists of a substantially lightweight core/diaphragm body A208 and outer normal stress reinforcement A206/A207 coupled to the diaphragm body adjacent at least one of the major faces A214/A215 of the diaphragm body for resisting compression-tension stresses experienced at or adjacent the face of the body during operation. The normal stress reinforcement A206/A207 may be coupled external to the body and on at least one major face A214/A215 (as in the illustrated example), or alternatively within the body, directly adjacent and substantially proximal the at least one major face A214/A215 so to sufficiently resist compression-tension stresses during operation. The normal stress reinforcement comprises a reinforcement member A206/A207 on each of the opposing, major front and rear faces A214/A215 of the diaphragm body A208 for resisting compression-tension stresses experienced by the body during operation.

The diaphragm structure A1300 further comprises at least one inner reinforcement member A209 embedded within the core, and oriented at an angle relative to at least one of the major faces A214/A215 for resisting and/or substantially mitigating shear deformation experienced by the body during operation. The inner reinforcement member(s) A209 is/are preferably attached to one or more of the outer normal stress reinforcement member(s) A206/A207 (preferably on both sides—i.e. at each major face). The inner reinforcement member(s) acts to resist and/or mitigate shear deformation experienced by the body during operation. There are preferably a plurality of inner reinforcement members A209 distributed within the core of the diaphragm body.

The core A208 is formed from a material that comprises an interconnected structure that varies in three dimensions. The core material is preferably a foam or an ordered three-dimensional lattice structured material. The core material may comprise a composite material. Preferably the core material is expanded polystyrene foam.

The diaphragm comprises a substantially rigid diaphragm body that maintains a substantially rigid form during operation over the FRO of the transducer.

Preferably the diaphragm body comprises of a maximum thickness that is at least 11% of a greatest length dimension of the body to the axis of rotation. More preferably the maximum thickness is at least 15%, of the greatest length dimension of the body to the axis of rotation.

In some embodiments the thickness of the diaphragm body is tapered to reduce the thickness towards the distal region. In other embodiments the thickness of the diaphragm body is stepped to reduce the thickness towards the region distal to the centre of mass of the diaphragm assembly.

In some embodiments the inner stress reinforcement of the diaphragm structure of this exemplary transducer may be eliminated, as in the diaphragm structures described under the configuration R5-R7 audio transducers.

4.4.2 Decoupling in Combination with Free Periphery Type Audio Transducer

As previously mentioned, if an audio transducer having a diaphragm structure with a periphery at least partially free from physical connection with a surrounding structure, as defined under section 2.3 for example, is sufficiently decoupled from the enclosure of an audio driver, then both enclosure resonances and diaphragm suspension resonances may be reduced or eliminated within the operating bandwidth, helping to prevent clouding of the audio reproduction.

Diaphragm suspensions for at least partially free periphery diaphragm structures can be made to be more geometrically robust against resonances without unduly compromising overall diaphragm compliance and excursion. They also have reduced area so that any resonances that might occur are less audible. In some embodiment, the decoupling systems of this invention are therefore preferably incorporated in an audio transducer with a free periphery type diaphragm as described under section 2.3 of this specification, which is hereby incorporated by reference.

Only a brief description of the preferred structure will be given below for the sake of conciseness. In the preferred configuration, the decoupling system is incorporated in an audio transducer configuration as described under configurations R5-R7 in section 2.3 of this specification.

Referring to FIGS. 2A-2I, the audio transducer of this example is configured to provide improved diaphragm breakup behaviour by simultaneously eliminating the diaphragm surround suspension and reducing outer normal stress reinforcement mass near the diaphragm body edge(s). The audio transducer of this example consists in a diaphragm assembly having a diaphragm structure with a periphery that is at least partially free from physical connection with a surrounding structure. The diaphragm structure preferably also comprises a substantially lightweight diaphragm body with outer normal stress reinforcement that reduces in mass towards one or more peripheral edge regions of the associated major face that are remote from the centre of mass of the diaphragm assembly. In the examples shown, the diaphragm assembly centre of mass is located proximal to a force transferring component, such as a coil winding, but it will be appreciated this may be located elsewhere depending on the design of the assembly.

The diaphragm assembly A101 includes a diaphragm structure A1300 having a body with one or more major faces that are reinforced with outer stress normal stress reinforcement. The normal stress reinforcement of the diaphragm structure comprises a distribution of mass that results in a relatively lower amount of mass at one or more regions distal from a centre of mass location of the diaphragm assembly. In addition to the reduction of mass in the normal stress reinforcement, the diaphragm structure comprises a periphery that is substantially free from physical connection with an interior of the housing A613 in situ. In this example the periphery is approximately entirely free from physical connection with the housing, but in some variations it may also be free from connection along at least 20, 30, 50 or 80 percent of a length of the periphery.

In this example a series of struts are utilised to provide the outer stress reinforcement leaving other parts of the surface unreinforced but it will be appreciated that other forms of reinforcement may be utilised. The struts are wider close to the base region of the diaphragm structure (near the axis of rotation which is proximal to the centre of mass location of the assembly), and intermediate the length of the associated major face of the diaphragm body (for example approximately half way across the major face of the diaphragm body), towards the opposing peripheral edge of the major face tip, the width of the normal stress reinforcement struts reduces to reduce the mass.

This audio transducer also comprises a reduced mass at one or more diaphragm structure peripheral regions (as there is no or very minimal diaphragm suspension connected here), resulting in a cascade of unloading through the rest of the diaphragm, and thereby further addresses internal core shearing issues.

Preferably there is a small air gap between one or more peripheral regions of the diaphragm structure that are free from connection with the enclosure interior, and the enclosure interior. Preferably the size of the air gap is less than $1/20^{th}$ of the diaphragm body length. Preferably the size of the air gap is less than 1 mm.

In one embodiment the diaphragm comprises a diaphragm body having a maximum thickness of at least 11% of a greatest length dimension of the body, more preferably at least 14%.

These features result in a driver that produces minimal resonance within the operating bandwidth and so has exceptionally low energy storage characteristics within the operating bandwidth.

4.4.3 Decoupling in Combination with Compact and Robust Base Structure

As previously mentioned, if a base structure of an audio driver that is relatively resonance-free because it is made from rigid materials and has a compact and robust geometry (as defined in section 2.2.1 of this specification for example), then neither enclosure resonances nor base structure resonances will cloud audio reproduction within the operating bandwidth. Features and aspects of this base structure A115 are described in detail in section 2.2.1 of this specification which is hereby incorporated by reference. The base structure will only be described briefly below for the sake of conciseness.

Referring to FIGS. 1A-1F, in some embodiments, the decoupling systems of this invention are incorporated in an audio device having an audio transducer comprising a transducer base structure A115 that is constructed from one or more components/parts having relatively high specific modulus characteristic. The transducer base structure A115 is designed to be substantially rigid so that any resonant modes that it has will preferably occur outside of the transducer's FRO. An example of this type of design is the main part of the transducer base structure A115 (the majority of the base structure's mass) consists of the magnet A102 and pole pieces A103 and A104. The magnet A102 and the pole pieces A103 and A104 preferably make up a substantially rigid and squat bulk of the transducer base structure A115.

As will be explained in further detail below, the base structure has a mass distribution such that it moves with an action having a significant rotational component when the base structure assembly is effectively unconstrained. For example, the base structure assembly is effectively unconstrained when the transducer is operated at sufficiently high frequencies such that the stiffness of the decoupling mounting system is or becomes negligible.

The base structure A115 comprises part of an electromagnetic actuating mechanism, including a magnet body A102 and opposing and separated pole pieces A103 and A104 at one end of the body A102. The pole pieces are coupled to opposing sides of the magnet body A102. An elongate contact bar A105 extends transversely across the magnet body within the gap formed between the pole pieces. The contact bar A105 is coupled to the magnet body on one side and to the diaphragm assembly A101 at an opposing side. The contact bar A105 is formed to have a larger contact surface area at the side coupling the magnet A102 relative to the side coupling the diaphragm assembly A101. The pair of decoupling pins A107 and A108 of the decoupling system of section 4.2.1 protrude laterally from opposing sides of the magnet body A102 and are configured to pivotally couple the base structure A115 to the associated housing in situ. The base structure A115 may comprise a neodymium (NdFeB) magnet A102, steel pole pieces A103 and A104, a steel contact bar A105 and titanium decoupling pins A107 and A108. All parts of the transducer base structure A115 may be connected using an adhesive agent, for example an epoxy-based adhesive.

In this example, the transducer further comprises a restoring/biasing mechanism operatively coupled to the diaphragm assembly A101 for biasing the diaphragm assembly A101 to a neutral rotational position relative to the base structure A115. Preferably the neural position is a substantially central position of the reciprocating diaphragm assembly A101. In the preferred configuration of this embodiment, a diaphragm centring mechanism in the form of a torsion bar A106 links the transducer base structure A115 to the diaphragm assembly A101 and provides a restoring/biasing force strong enough to centre the diaphragm assembly A101 into an equilibrium position relative to the transducer base structure A115. In this configuration a torsional spring is utilised to provide the restoring force, but it will be appreciated in alternative configuration other biasing components or mechanisms well known in the art may be utilised to provide rotational restoration force.

The contact bar A105 is connected to the torsion bar A106 at an end tab A303 (as seen in FIGS. 3A-3J) and to facilitate this connection in a rigid manner, the contact bar A105 must protrude out and away from the magnet A102 and the outer pole pieces A103 and A104 which make up a rigid and squat bulk of the transducer base structure. The torsion bar A106 extends laterally and substantially orthogonally from a side of the diaphragm assembly A101 and at or adjacent an end of the assembly A101 most proximal to the base structure A115.

The contact bar A105 is comparatively slender and correspondingly prone to resonances. To minimise these the contact bar A105 is tapered to reduce the mass near the end tab A303 where flexing results in maximum displacement, and also increase the relative rigidity of the support provided by the squat bulk towards the base of the protrusion where any deformation would result in the greatest displacement of the end tab area. The contact bar also has a large surface area, oriented in different planes, at its connection to the magnet A102 in order to minimise compliance associated with adhesive, since the adhesive, an epoxy resin, has comparatively low Young's modulus of approximately 3 GPa.

Since the transducer base structure A115 is mounted towards one end of the diaphragm, both front and rear major faces A214, A215 of the diaphragm are free from obstruction, which maximises air flow and minimises air resonances created by volumes of air contained between components such as the transducer base structure, the diaphragm and a housing A613.

4.4.4 Decoupling in Combination with Rotational Action Driver

Rotational Action and Force Transferring Component

When a rotational action transducer is rigidly mounted in an enclosure or other structure having inherent resonances, these resonances may be excited by the driver in much the same way as they would be by a driver having a linear diaphragm action, resulting in unwanted energy storage. In the case of a rotational action driver this stored energy may be passed from the enclosure into the diaphragm via the diaphragm assembly hinge system, since although hinge mechanisms are usually fairly compliant in terms of a single rotational fundamental mode, they transmit energy by virtue of their inherent resistance to translational displacements.

In the process, the amplitude of the vibrations may be mechanically amplified due to the impedance mismatch between the relatively heavy enclosure panels and transducer base structure components versus the lightweight diaphragm.

A benefit therefore exists from constructing a rotational action audio device with a decoupling system that reduces transmission of vibration from resonance-prone structures to the diaphragm structure. For example, a useful embodiment consists in a headphone having a rotational action transducer that is rigidly mounted in a robust and compact enclosure, such that the entire transducer/enclosure is a low-resonance system or is substantially resonance-free, with a decoupling system to decouple the transducer/enclosure system from the large and resonance-prone headband. This configuration prevents vibration from being passed into the headband (which incidentally is remote from the listener's ear and may not directly radiate sound), stored via internal headband resonance modes, and then released into the listener's ear via the diaphragm.

Referring to FIGS. 1A-1F and 2A-2I, in some embodiments, the decoupling systems of the invention are incorporated in an audio device having a rotational action transducer. In an assembled state, the transducer comprises a base structure A115 to which the diaphragm A101 is coupled and rotates relative thereto. The base structure A115 includes at least part of an actuating mechanism for causing the diaphragm to rotate relative to the base structure during operation. In this example of an audio transducer, an electromagnetic actuating mechanism rotates the diaphragm during operation and the base structure A115 comprises a magnet body A102 with opposing and separated pole pieces A103 and A104 at an end of the body A102 adjacent the diaphragm A101. A coil of the electromagnetic mechanism locates between the pole pieces A103 and A104 and is coupled to the actuation end of the diaphragm A101.

Referring to FIGS. 2A-2I, one end of the diaphragm A101, the thicker end, has a force generation component A109 attached thereto. In one preferred form, again, in conjunction with the use of the decoupling mounting systems described herein, a transducing mechanism comprises a force transferring/generation component (for example a motor coil winding A109 or a magnet) that is directly rigidly connected to the diaphragm structure A1300 in order to minimize opportunity for unwanted resonance modes. Alternatively, the force transferring/generation component is rigidly connected to the diaphragm structure A1300 via one or more intermediate components and the distance between the force transferring component and the diaphragm body is less than 75% of the maximum dimension of the diaphragm body. More preferably, the distance is less than 50%, less than 35% or less than 25% of the maximum dimension of the diaphragm body. The close proximity aids the rigidity of the structure, again minimizing opportunity for unwanted resonance modes.

The diaphragm structure A1300 coupled to the force generation component forms a diaphragm assembly A101. In this example, the force generating component is a coil winding A109 that is wound into a roughly rectangular shape consisting of two long sides A204 and two short sides A205. The spacer is of a profile complementary to the thicker, base end of the diaphragm structure A1300 to thereby extend about or adjacent a peripheral edge of the thick end of the diaphragm structure, in an assembled state of the audio transducer/diaphragm assembly. The spacer A110 is attached/fixedly coupled to a steel shaft A111 forming part of the hinge assembly A301. The combination of these three components located at the base/thick end of the diaphragm body A208 forms a rigid diaphragm base structure of the diaphragm assembly having a substantially compact and robust geometry, creating a solid and resonance-resistant platform to which the more lightweight wedge part of the diaphragm assembly is rigidly attached.

In a rotational action audio transducer, optimal efficiency is obtained when the transducing mechanism is located relatively close to the axis of rotation. This works in well with objectives for the present invention around minimisation of unwanted resonance modes, and in particular with the afore-mentioned observation that locating the excitation mechanism close to the axis of rotation permits rigid connection to a hinge mechanism via relatively heavy and compact components without causing too much of an increase rotational inertia of the diaphragm assembly. In this case the coil radius may be about 2 mm, or about 13% of the diaphragm body length A211, but other radii for optimising efficiency are also envisaged.

In order to maximise the ability of the transducer to provide high-fidelity audio reproduction via maximised diaphragm excursion and reduced susceptibility to resonance, the ratio of the radius of attachment location of the force transferring or generating component A109 to the diaphragm body length A211, measured from the axis of rotation, is preferably less than 0.5 and most preferably less than 0.4. This may also help to optimise efficiency.

Rigid Hinge (in at Least One Direction)

Preferably, the diaphragm assembly is supported by a hinge assembly that is rigid in at least one translational direction, with the advantage of this being provision of the rigid support necessary to substantially increase breakup frequencies of the diaphragm. The contact hinge assembly and the flexure hinge assembly described herein in sections 3.2 and 3.3 of this specification are two such hinging mechanisms that may be used in conjunction with the decoupling systems of the invention.

The hinge assembly is preferably substantially rigid in some directions so that it sufficiently prevents relative translation between the diaphragm assembly and associated base structure along at least one axis, or more preferably along at least two substantially orthogonal translational axes, or yet more preferably along three substantially orthogonal translational axes.

The hinge assembly is preferably also substantially rigid in some directions so that it sufficiently prevents relative rotation between the diaphragm assembly and the associated base structure about at least one axis, or more preferably about at least two substantially orthogonal axes, other than the intended axis of rotation of the assembly.

Contact Hinge Form

In one form of this audio device embodiment having a rotational action audio transducer as described in section 4.5.1 above and a decoupling system of the invention, the audio transducer further comprises a contact hinge mechanism as described in section 3.2 that pivotally couples the diaphragm assembly A101 to the transducer base structure A115. A full description of the design principles and considerations associated with the contact hinge system as well as exemplary embodiments are provided in section 3.2 of this specification. It will be appreciated that any contact hinge mechanism designed in accordance with this description may be used in conjunction with this decoupling system as would be apparent to those skilled in the relevant art. For the sake of conciseness this description will not be repeated below and only a brief description of one exemplary contact hinge system shown in the embodiment A audio transducer is provided.

Referring to FIGS. 1A-1F and 2A-2I, in one form the rotational action transducer comprises a diaphragm assembly A101 that is pivotally coupled to a transducer base structure A115 via a hinge system. The hinge system forms a rolling contact between the diaphragm assembly A101 and the transducer base structure A115 such that the diaphragm assembly A101 may rotate or rock/oscillate relative to the base structure A115. In this example, the hinge system comprise a hinge assembly A301 having at least one hinge element, being a longitudinal hinge shaft A111, which rolls against a contact member, being a longitudinal contact bar A105 having a contact surface (best seen in FIG. 1F). In this example, the hinge element A111 comprises a substantially convexly curved contact surface or apex on one side of the hinge element at the contact region A112, and the contact surface on one side of the contact bar A105 at the contact region A112 is substantially planar or flat. It will be appreciated that in alternative configurations, either one of the hinge element A111 or the contact member A105 may comprise a convexly curved contact surface on one side and the other corresponding surface of the contact bar or hinge element may comprise a planar, concave or less convex (of relatively larger curvature radius) surface to enable rolling of one surface relative to the other.

The hinge element A111 and contact member A105 components are held in substantially constant contact by a force applied with a degree of compliance by a biasing mechanism of the hinge system. The biasing mechanism may be part of the hinge element or separate thereto. In the example of the embodiment A audio transducer, the biasing mechanism of the hinging system is a magnet based structure having a magnet A102 with opposing pole pieces A103 and A104 and which acts to force the hinge element against the contact member with a desired level of compliance. The biasing mechanism ensures the hinge element A111 and contact member A105 remain in physical contact during operation of the audio transducer and is preferably also sufficiently compliant to relative movement between the contact member and hinge element such that the hinge assembly, and particularly the moving hinge element, is less susceptible to rolling resistances that may exist during operation due to factors such as manufacturing variances or imperfections in the contact surfaces and/or due to dust or other foreign material that may be inadvertently introduced into the assembly, during manufacture or assembly of the hinge assembly for example. In this manner, the hinge element A111 can continue to roll against the contact member without significantly affecting the rotating motion of the diaphragm during operation, thereby mitigating or at least partially alleviating sound disturbances that can otherwise occur.

The biasing mechanism is configured to apply a force in a direction substantially parallel to the longitudinal axis of the diaphragm structure and/or substantially perpendicular to the plane tangent to the region or line of contact A112 or apex of the hinge element A111 to hold the hinge element A111 against the contact member A105. The biasing mechanism is also sufficiently compliant in at least this direction such that the rolling hinge element can move over imperfections or foreign material that exists between the contact surfaces of the hinge assembly with minimal resistance, thereby allowing a smooth and sufficiently undisturbed rolling action of the hinge element over the contact member during operation. In other words, the increased compliance of the biasing structure allows the hinge to operate similar to a hinge assembly having perfectly smooth and undisturbed contact surfaces.

Referring to FIG. 3A, in this embodiment, the hinge assembly A301 comprises ligaments A306 and A307 that are operative to hold the diaphragm structure A1300 in position in directions substantially perpendicular to the contact plane.

During operation, the hinge element A111 is configured to pivot against the contact member between two maximum rotational positions, located preferably on either side of a central neutral rotational position. In this embodiment, the hinge assembly A301 further comprises a restoring mechanism A106 (shown in FIG. 1A) for restoring the hinge and diaphragm assembly to a desired neutral or equilibrium rotational position, in terms of its fundamental resonance mode, when no excitation force is applied to the diaphragm. The restoring mechanism may comprise any form of resilient means to bias the diaphragm assembly toward the neutral rotational position. In this embodiment, a torsion bar A106 is utilized as the restoring/centering mechanism. In another form, such as described herein in regards to embodiment E, part, or all of the restoring mechanism and force is provided within the hinge joint through the geometry of the contacting surfaces and through the location, direction and strength of the biasing force applied by the biasing mechanism. In the same or an alternative form a significant part of the restoring/centering mechanism and force is provided by a magnetic structure.

Flexible Hinge Form

In another form of this audio device embodiment having a rotational action audio transducer as described in section 4.5.1 above and a decoupling system of the invention, the audio transducer further comprises a flexible hinge mechanism as described in section 3.3 that pivotally couples the diaphragm assembly to the transducer base structure. A full description of the design principles and considerations associated with the flexible hinge system as well as exemplary embodiments are provided in section 3.3 of this specification. It will be appreciated that any contact hinge mechanism designed in accordance with this description may be used in conjunction with the decoupling systems of this invention as would be apparent to those skilled in the relevant art. For the sake of conciseness this description will not be repeated below and only a brief description of one exemplary flexible hinge system shown in the embodiment B audio transducer is provided.

Referring to FIGS. 15A-15F an example rotational action audio transducer of the invention including a diaphragm assembly B101 pivotally coupled to a transducer base structure B120 via an exemplary flexure hinge assembly of the invention is shown. The hinge assembly B107 is rigidly coupled to the transducer base structure B120 at one end and to the diaphragm assembly B101 at an opposing end. The flexure hinge assembly B107 facilitates rotational/pivotal movement/oscillation of the diaphragm assembly B101 about an approximate axis of rotation B116 with respect to the transducer base structure B120 in response to an electrical audio signal played through coil windings B106 attached to the diaphragm assembly.

Figure 16A:
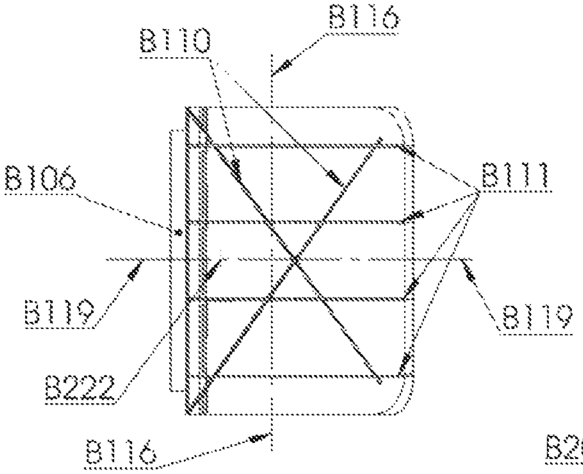
Figure 16B:
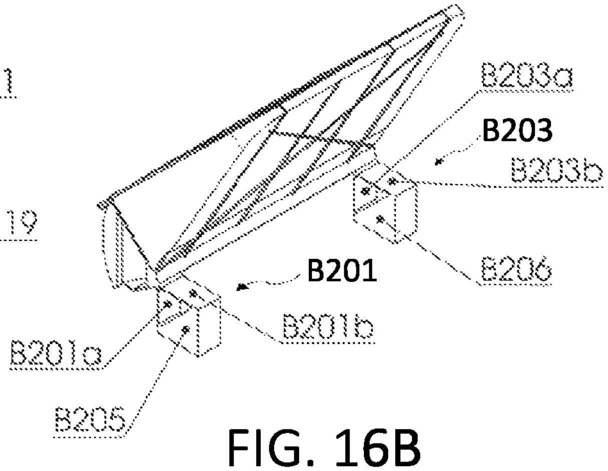
Figure 16C:
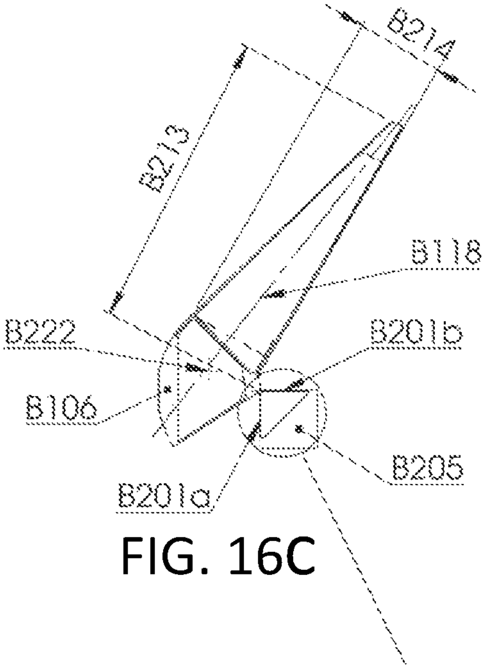
Figure 16D:
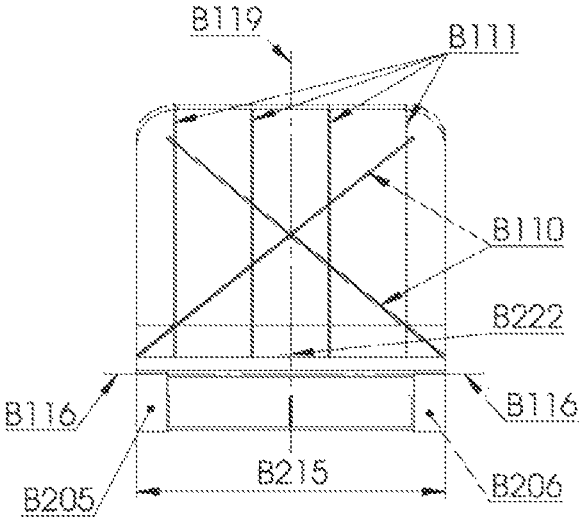
Figure 16E:
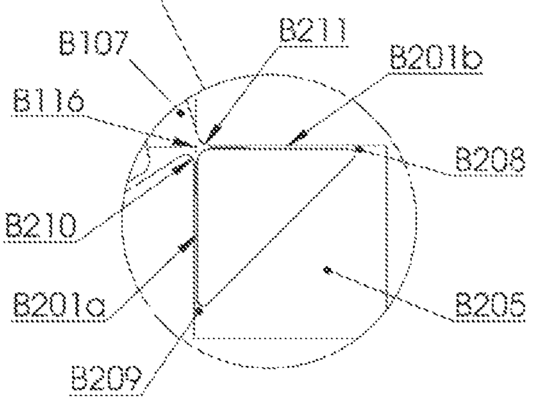
Figure 16F:
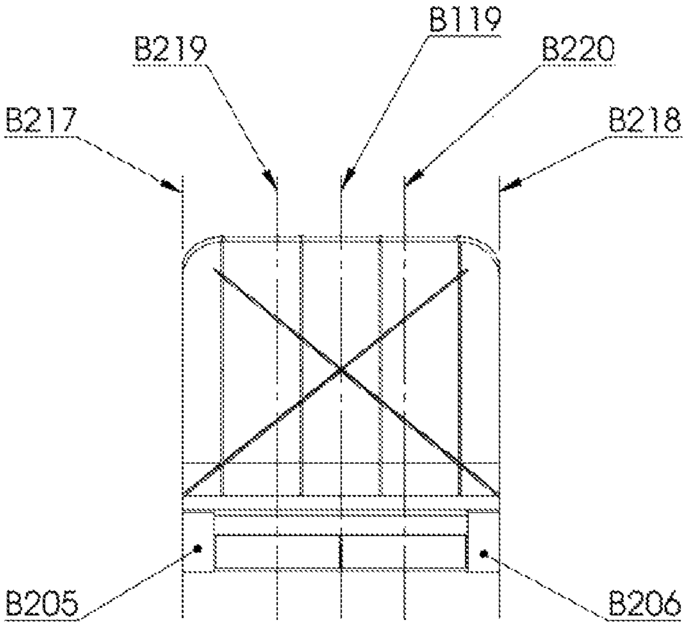
Figure 16G:
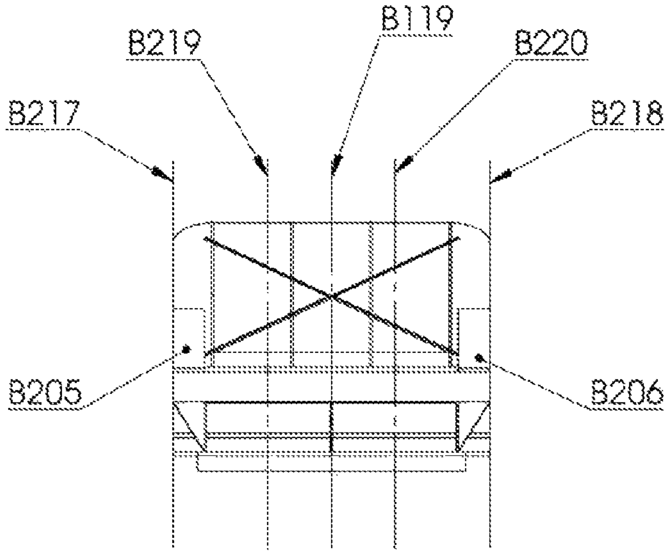
Figure 17A:
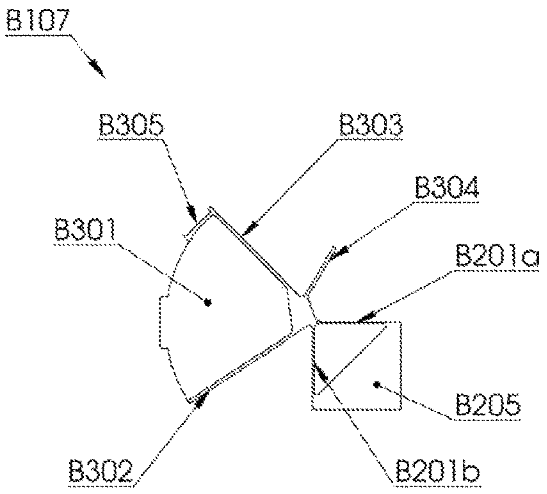
Figure 17B:
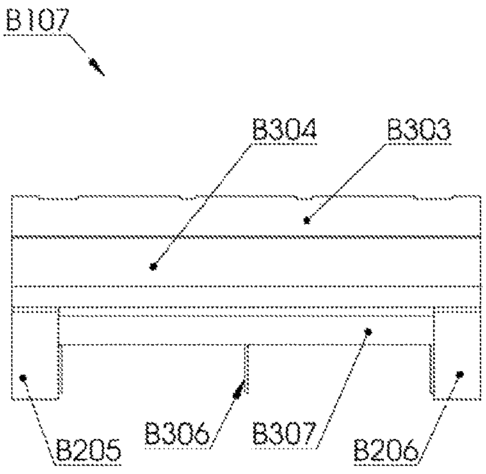
Figure 17C:
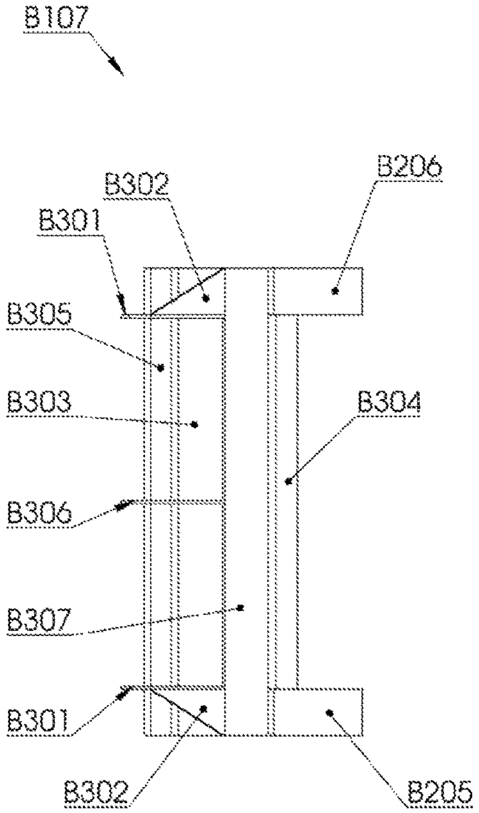
Figure 17D:
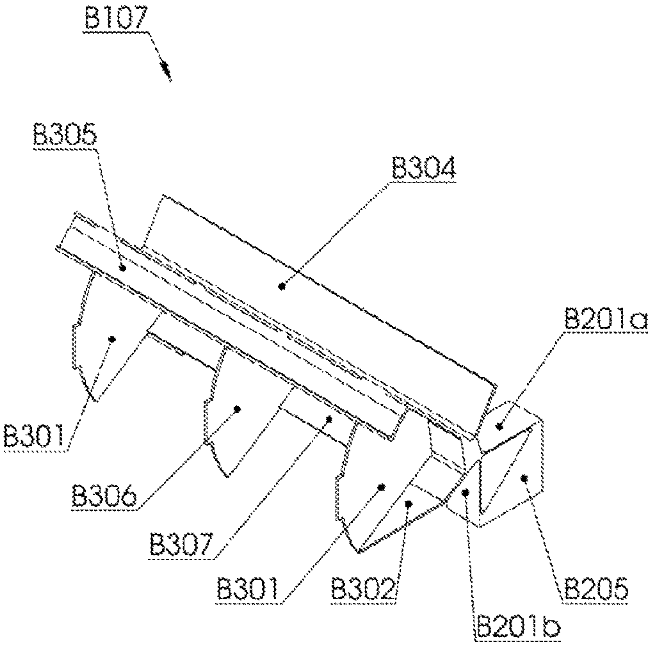

The hinge assembly B107 comprises hinge elements B201*a*, B201*b*, B203*a* and B203*b* as shown in FIG. 16B, that are each configured to be substantially stiff to resist forces of tension and or compression and or shear experienced within their respective planes, but each is sufficiently flexible along a plane substantially orthogonal to the axis of rotation to enable flexure in the direction of rotation.

FIGS. 16A-16G show the hinge assembly B107 connected to the diaphragm assembly B101 and to the coil windings B106. The transducer base structure has been removed from these figures for clarity. As shown in FIGS. 17A-17D the hinge assembly B107 comprises a substantially longitudinal base frame and a pair of equivalent hinge structures extending laterally from either end of the base frame and configured to locate at either side of the diaphragm assembly and transducer base structure in situ. The base frame extends along a substantial portion of the width at the thicker base end of the diaphragm body and is configured to couple the diaphragm body and the coil winding in situ. The structure of the base frame will described in further detail below.

FIGS. 17A-17D show the flexible hinge assembly B107 of this example in detail. Each hinge structure B201/6203 comprises a connection block B205/6206 that is configured to rigidly couple one side of the transducer base structure B120. The transducer base structure B120 may comprise a complementary recess on a surface of the structure to aid with coupling of the parts. The hinge structures further comprise a pair of flexible hinge elements B201 and B203. The hinge elements of each pair B201*a*/B201*b* and B203*a*/B203*b* are angled relative to one another. In this example the hinge elements B201*a* and B201*b* are substantially orthogonal relative to one another, and the hinge elements B203*a* and B203*b* are substantially orthogonal relative to one another. However, other relative angles are envisaged including an acute angle therebetween for each pair of hinge elements for example. Each hinge element is substantially flexible such that it is capable of flexing in response to forces that are substantially normal to the element. In this manner, the hinge elements enable rotational/pivotal movement and oscillation of the diaphragm assembly about the axis of rotation B116. At least one hinge element of each pair (but preferably both) is preferably also resilient such that it is biased towards a neutral position, to thereby bias the diaphragm assembly toward a neutral position in situ and during operation of the transducer. Each element is capable of flexing in a manner that allows the diaphragm assembly to pivot either direction of the neutral position.

In this example, each hinge element B201*a*, B201*b*, B203*a*, B203*b* is a substantially planar section of flexible and resilient material. As will be explained in further detail in section 3.3, other shapes are possible and the invention is not intended to be limited this example.

Other variations of the flexible hinge mechanism are also possible in combination with this decoupling system A500 as described in detail under section 3.3 of this specification.

4.5 Other Preferred Combinations and/or Implementations

As has been described above, low-resonance audio devices of the present invention are particularly useful in high-fidelity audio applications, and this means that a number of resonance-addressing configurations of the present invention, including configurations incorporating decoupling systems that help to address resonance issues, can be usefully deployed in combination with features that assist with deployment of high fidelity audio. Such features include, but are not limited to, stereophonic or multi-channel reproduction, wide or preferably full bandwidth audio reproduction and, in the case of personal audio devices, mounting means to (accurately and repeatedly) locate transducers relative to a user's ear or ears.

Preferably the excitation means is of a type that is highly linear and suitable for high-fidelity audio reproduction, such as an electrodynamic type motor.

In high-fidelity audio transducers of the present invention which have rotational-action diaphragms audio reproduction is improved, via maximised diaphragm excursion and reduced susceptibility to resonance, when the ratio of the radius of attachment location of the force transferring component to the diaphragm body length, measured from the axis of rotation, is preferably less than 0.6, more preferably less than 0.5 and most preferably less than 0.4.

4.5.1 Stereophonic Application

Loudspeaker transducers that use decoupling mounting systems of this invention are particularly useful in high-fidelity audio applications. It is therefore preferable that the decoupling systems described in section 4.2 or systems that can be designed in accordance with section 4.3 are used in an audio device having two or more different audio channels through a configuration of two or more audio transducers (e.g. loudspeaker transducer) for example, as part of a stereophonic or quadraphonic system, as opposed to a monophonic system. The audio transducers in this example are configured to simultaneously reproduce at least two different audio channels that are preferably independent of one another.

In such an application, the decoupling mounting system may be mounted to at least partially alleviate mechanical transmission of vibration between the diaphragm assembly of the first transducer and the second transducer.

4.5.2 Personal Audio

As has previously been discussed, one example of tailoring the audio transducer deployment is using such an audio transducer in personal audio applications, since the undesirable resonances may be pushed outside of the hearing range, potentially resulting in unprecedentedly low energy storage right to the upper limit of the audible bandwidth. Another preferred implementation of the decoupling systems described in section 4.2 is therefore in a personal audio device that is configured to be located at or proximal to the user's ear, such as headphones or earphones.

For example, the embodiment A transducer may be constructed in two forms: a mid-range/treble loudspeaker driver and a bass loudspeaker driver. Both units are implemented in a 2-way circumaural headphone, shown in FIG. 50A, in place on the right side of a human head H304, with circumaural padding H305 extending around the outside of the ear.

FIG. 50B shows the head H304, the ear H303, the bass driver H302 and the treble driver H301, but does not show the rest of the headphone. The positioning of the treble driver H301 is such that the tip of the diaphragm (from which most of the sound pressure is generated) is located close to, and right in front of the ear canal, since the bass frequencies of the other driver are relatively non-directional.

The crossover frequency used in this implementation is 300 Hz, so the treble unit reproduces the bulk of the frequency range (300 Hz to 20 kHz.) The tip of the diaphragm of the bass driver H302 is located in front of the upper part of the ear, close to the ear and to the tip of the treble driver, a location that maximises utilisation of the diaphragm excursion that is achievable with the design, while minimising the overall headphone width for aesthetic reasons.

Both treble driver H301 and bass driver H302 have been measured, uninstalled from the headphone, and cumulative spectral decay (CSD) plots created which illustrate the substantially resonance free performance of the invention.

The treble loudspeaker driver H301 has both a diaphragm body width A219 and diaphragm body length A211 of 15 mm. The maximum designed excursion angle is +/−15 degrees, which corresponds to about a 7.6 mm peak to peak excursion distance at the tip of the diaphragm and a peak to peak volume of air displacement of about 800 mm^3.

The response has been measured, on axis with a microphone in close proximity (about 5 mm distance) from the middle tip of diaphragm assembly A101 and the resulting cumulative spectral decay (CSD) plot is shown in FIG. 49. The y axis corresponds to sound pressure ranging from −60 dB to 0 dB, the x axis corresponds to frequency which ranges from about 100 hz to 20 kHz, and the z axis is time ranging from 0 to 2.07 ms.

The wide peak H201 of the fundamental resonance of the diaphragm at about 170 Hz can be seen with a wide ridge extending forward in time. The first breakup frequency of the diaphragm is located at about 15 kHz, and is a twisting mode similar to that shown in FIG. 13G (and similar to the sensor plot peak A1417 described earlier with regards to the graph shown in FIG. 14S). Because the microphone was positioned near the middle of the diaphragm the net air pressure generated was small and this mode it is hard to identify on the CSD plot of FIG. 49, but a small ridge that extends to location H203 is probably due to this resonance mode.

A ridge corresponding to the first breakup mode that seriously affects the frequency pressure response is located at H204, at approximately 20 kHz. It should be noted that the software creating the CSD plot starts to filter off the part of the graph from approximately 17 kHz.

This waterfall plot response of this transducer is very good. The height of the 'cliff' at about the 5 kHz region is an approximately a 50 dB drop, but the transducer is believed to be substantially resonance-free over the bandwidth indicated by H205, which implies that the cliff would be higher still were it not for experimental and mathematical limitations.

The bass loudspeaker driver H302 has a diaphragm body width of 36 mm and a diaphragm body length of 32 mm. The maximum designed excursion angle is +/−15 degrees, which corresponds to a 16 mm peak to peak excursion distance at the tip of the diaphragm and a peak to peak volume of air displacement of about 8900 mm^3.

The response has been measured, on axis with a microphone in close proximity (about 5 mm distance) from the middle tip of diaphragm, and the resulting CSD plot is shown in FIG. 52. The y axis corresponds to sound pressure ranging from −55 dB to 0 dB, the x axis corresponds to frequency which ranges from about 100 Hz to 20 kHz, and the z axis shows time ranging from 0 to 2.07 ms.

The fundamental resonance of the diaphragm at about 40 Hz is below the range of this chart, and is the cause of the wide ridge extending forward in time, H605 being one side of this ridge. The first breakup H601 frequency of the diaphragm occurs at about 6 kHz, and is a twisting mode similar to that shown in FIG. 13G. A ridge corresponding to a significant breakup mode that seriously affects the sound pressure response, located at H602, occurs at approximately 7 kHz. Possibly the largest break up mode ride on the plot is located at H603, at about 11 kHz.

The performance of the bass transducer is similar to the mid-range/treble transducer. The height of the 'cliff' at about the 4 kHz region is approximately 45 dB.

Embodiments K, W and Y described in sections 5.2.2, 5.2.3 and 5.2.4 are other personal audio device configurations utilising a decoupling system designed in accordance with the principles described herein.

4.5.3 Two Transducers Attached to One Structure

In some embodiments the audio device may comprise two or more audio transducers as described under sections 4.2-4.4 (e.g. an embodiment A audio transducer, an embodiment E audio transducer and/or an embodiment U audio transducer). Preferably in such an example, a decoupling mounting system similar to any one described in section 4.2 or other designed in accordance with the principles identified in section 4.3 is incorporated that partially alleviates mechanical transmission of vibration between the diaphragm of one transducer to the other audio transducer, to help prevent vibrations from the diaphragm exciting the other transducer. The headphone shown in FIG. 50A is an example of such an embodiment. This device incorporates four loudspeaker drivers, two on the left side and two on the right side of the headphone. The right side only is shown in FIG. 50A, incorporating both a treble driver H301 (which is similar to the embodiment A audio transducer) and a bass driver H302 (which is similar to that of embodiment A audio transducer, except larger). Both drivers have decoupling systems (as described under section 4.2.1 above) that help reduce the mechanical transmission of vibration between the diaphragm assemblies of the respective drivers H301 and H302. In this example, both drivers have a separate housing and the decoupling system locates between the audio transducer and the associated housing. One or more other decoupling systems having flexible mounts such as those described in sections 4.2.2 and 4.2.3 or those designed in accordance with the principles described in section 4.3 may also be incorporated between the housings of the respective drivers to further alleviate mechanical transmission of vibration amongst diaphragm assemblies. The left side of the headphone is an opposite version of those on the right side. Any one of the four drivers has a decoupling system that helps reduce the mechanical transmission of vibration between the diaphragm of that driver and the diaphragm of any of the other three drivers.

4.5.4 Multiple Decoupling System Configurations

In some embodiments the audio device may comprise two or more of the decoupling mounting systems. A single audio transducer may comprise multiple layers of decoupling mounting systems. For example, a personal audio headphone device may have a system mounting the transducer to a small baffle, and another system mounting the baffle to the headband. Each system contributes to the alleviation of mechanical transmission of vibration between the parts that each system connects. Each decoupling mounting system may be the same or different to any of the ones described in section 4.2 or designed in accordance with the principles identified in section 4.3 for example.

In the audio device implementation of FIGS. 50A and 50B for example a pair of audio transducers H301 and H302 are provided in the audio device and are to be retained in a single housing H305 as shown in FIG. 50A. In this embodiment, each audio transducer may comprise a decoupling system similar to that described above in section 4.2.1 between the transducer base structure and an associated sub-housing of each transducer. A further decoupling system may exist between the sub-housings of the transducer H301 and H302, and/or between each sub-housing and the headphone housing or some other component configured to dispose the audio transducer at or near a user's ear or ears H303.

In general, the audio device comprising an audio transducer having a diaphragm and a transducing mechanism configured to operatively transduce an electronic audio signal and rotational motion of the diaphragm corresponding to sound pressure, also comprises a decoupling mounting system that is located between at least a first part or assembly incorporating the audio transducer and at least one other part or assembly of the audio device to at least partially alleviate mechanical transmission of vibration between the first part or assembly and the at least one other part or assembly, the decoupling mounting system flexibly mounting the first part or assembly to the second part or assembly of the audio device. The first part may be a housing, such as an enclosure or baffle for accommodating the audio transducer. A decoupling mounting system may exist between the audio transducer and the first part, being the enclosure or baffle, such as described in section 4.2. The second part may be a headband configured to be worn by a user for placing the audio transducer close in proximity to a user's ear or ears in use. In some cases the at least one other part of the audio device has a mass greater than or at least the same as the mass of the first part, or more preferably at least 60%, or 40% or most preferably at least 20% of the mass of the first part. For instance, the housing or surround is preferably of a greater mass than the transducer base structure.

Any one of these decoupling systems may be similar to any one previously described in section 4.2 or otherwise another design that meets the design principles and considerations outlined in section 4.3.

The decoupling systems of such an audio device may be combined with a diaphragm structure that is rigid to improve the performance of the audio device as explained under section 4.4.1. For example the diaphragm may comprise a body having a maximum thickness of at least 11%, or more preferably at least 14% of a greatest length dimension of the body.

The decoupling systems of such an audio device may alternatively or in addition be combined with an audio transducer having an at least partially free periphery diaphragm structure design in terms of the diaphragm assembly to improve the performance of the audio device as explained under section 4.4.2. For example, the diaphragm of the audio transducer comprises a diaphragm body having a periphery that is substantially free from physical connection with an interior of the first part.

Furthermore, the audio device may comprise two or more of such audio transducers and/or two or more of such decoupling mounting systems.

4.5.5 Modularising an Audio Device for Decoupling

In the context of the present invention, decoupling is most often used to divide a large audio device, which is unwieldy in terms of resonance management, into smaller sections one of which contains the driver and is sufficiently small such that resonance management becomes feasible through use of rigid materials and robust geometries.

Often, the transducer will be decoupled from a baffle or enclosure, however other configurations are possible, for example a transducer base structure may be rigidly attached to a sufficiently compact baffle or enclosure to form a 'base structure assembly', which is then decoupled from the remainder of the audio device.

Sometimes two or more transducers may be incorporated into the same mounting structure, for example a headband of a headphone, or the enclosure of a two-way speaker, such as the small personal computer speaker of FIGS. 86A-86D. In these cases, when the driver utilises hinge action drivers, advantages may be provided by decoupling one transducer from the other, including that the vibration of one does not easily transmit to and excite the other, and that there may be reduced Doppler distortion due to, for example, a higher-frequency driver being oscillated by the action of a connected lower frequency driver. In the case of computer speaker Z100, each speaker driver: treble unit Z101, bass-midrange unit Z102 are both decoupled from enclosure Z104. For mechanical vibrations to transmit from one driver to another, they must pass through both decoupling systems associated with the drivers. Additionally, the enclosure Z104 has rubber or other substantially soft feet Z105 which decouple the enclosure from the ground or floor Z106. This means the mechanical vibrations from any of the two drivers of audio transducers Z101 or Z102 must pass through two sets of decoupling systems before reaching the floor, which reduces excitation of resonance modes of the floor and the walls and furnishings attached to the floor.

Greater benefits are exhibited from decoupling heavier parts of the audio device. To provide significant benefit it is preferable that a decoupling system isolates some part of the audio device that has mass greater than that of the base structure assembly, or at least greater than 60%, or 40% or 20% of the mass of the base structure assembly.

In one possible configuration for example, a decoupled audio transducer comprises a diaphragm that is supported by a ferromagnetic fluid. It is preferable that a substantial proportion of support provided to the diaphragm against translations, in a direction substantially parallel to the coronal plane of the diaphragm body, is provided by the ferromagnetic fluid. Since this transducer design can be made to have low levels or even zero resonance within the FRO it is useful in conjunction with transducer decoupling systems which prevent the transducer from becoming combined with an enclosure (or baffle etc.) and thereby comprising a resonance-prone system.

5. Personal Audio Devices 5.1 Introduction

A personal audio device, including for example headphones, earphones, telephones, hearing aids and mobile phones incorporate audio transducers that are designed to be normally located within close proximity of a user's head or in direct association with a user's head to transduce sound directly into or directly from a user. Such devices are typically configured to locate within approximately ten centimetres or less of a user's head, ears or mouth in use, for example. Personal audio devices are typically compact and portable, and thus the audio transducers incorporated therein are also substantially more compact than in other applications such as home audio systems, televisions, and desktop and laptop computers for example. Such size requirements typically limits flexibility for achieving a desired sound quality, as factors such as the number of audio transducers that can be incorporated have to be considered. More often than not, a single audio transducer may be required for providing the full audio range of the device, for example, which could potentially limit the quality of the device.

Also, audio transducers used for personal audio applications are generally limited in the audio bandwidth that they can reproduce effectively due to a compromise whereby increasing diaphragm excursion and reducing the fundamental frequency (Wn) results in a diaphragm flexing zone, or else a diaphragm surround, that is prone to rocking and gong-mode break-up resonances at high frequencies.

Previously described audio transducer designs may be particularly (although not exclusively) advantageous in personal audio applications as they allow for a compact design whilst having potential to achieve a level of performance, in certain key aspects, that is difficult or impossible to achieve in devices designed to be located further away from the ear and in devices that may be comparatively inexpensive to produce. Some personal audio application embodiments will be described below, and reference will be made to particular combinations of features of the previously described audio transducer designs that are particularly advantageous in this application.

5.2 Personal Audio Embodiments 5.2.1 Embodiment P—Earphone

Referring to FIGS. 61A-63, a first embodiment of a personal audio device P100 is shown in the form of an earphone interface device. This device may be part of an earphone apparatus comprising a pair of earphone interface devices for each ear of the user. Although the following description will be with reference to an earphone, it will be appreciated that the same system or assembly described may be implemented in any other personal audio device, including (but not limited to): headphones, mobile phones, hearing aids and the like. The figures shown and the embodiment will be described with reference to a single earphone, however it will be appreciated that the personal audio device may comprise a pair of earphones of the same or similar construction for each one of the user's ears.

Referring to FIGS. 61A-61K in particular, the audio device P100 comprises a substantially hollow base P102 having at least one chamber for accommodating an audio transducer assembly therein. The base P102 is substantially open at one end (facing cavity P120) and substantially closed at an opposing end apart from a small vent or air leak fluid passage P105. A housing or surround part P103, open at both ends couples the base at the open end and creates an air passage from the transducer assembly. The opposing end of the housing part is coupled to an ear mounting system or interface P101, such as an ear plug P101 having a vent P109. An air passage thus extends from the transducer assembly to the vent P109. It will be appreciated that the base P102 and the housing part P103 may be separate components that are coupled via any suitable mechanism (e.g. snap-fit engagement, adhesive, fasteners etc.) or integrally formed. Together, these parts P102 and P103 form a housing for the transducer assembly. Similarly, the housing part P103 and plug P101 may be separate components that are coupled via any suitable mechanism (e.g. snap-fit engagement, adhesive, fasteners etc.) or integrally formed. The device P100 preferably comprises a body shaped to reside within a user's ear, such as the user's concha or ear canal, so that it may locate the audio transducer adjacent or within the user's ear canal. The plug P101 body may be formed or covered in a soft material for comfort, such as a soft plastics material like Silicone or similar. In situ and during use, the ear plug P101 is preferably configured to substantially seal, for example, against or within the ear canal. The base P102 comprises an internal surround within which the transducer base structure of the audio transducer is rigidly coupled and supported.

The base P102 may house electronic components therein and comprise a channel for receiving a connector P124 from another device therein.

Referring now to FIGS. 61*g*-61L and 62A-62D in particular, the audio transducer assembly comprises a diaphragm assembly P110 that is moveably coupled to a base P102 via an excitation/transducing mechanism. In this embodiment, the excitation mechanism is an electromagnetic mechanism, however it will be appreciated that in alternative embodiments other mechanisms may be utilised, such as using motors and the like. In this embodiment, the audio transducer is a linear action transducer wherein the diaphragm assembly is configured to reciprocate/oscillate substantially linearly during operation to transduce sound. It will be appreciated in alternative embodiments, the audio transducer may be a rotational action transducer configured to rotatably oscillate relative to the base structure. The diaphragm assembly P110 comprises a curved or domed diaphragm body P125. The diaphragm body is preferably formed from a suitably rigid material, such titanium for example. In this embodiment, the diaphragm body is substantially rigid such that it resists flexing or bending as it reciprocates during operation of the transducer. It will be appreciated however, that in alternative embodiments the diaphragm body may be substantially flexible. The diaphragm body comprises a substantially smooth major surface on either side.

Extending from the periphery of the diaphragm body and rigidly attached thereto is a longitudinal diaphragm base structure which comprises a diaphragm base frame P115 and a force transferring component P114 rigidly coupled thereto. The force transferring component P114 in this embodiment is one or more coil windings P114 that form part of an excitation (or transducing) mechanism. The diaphragm base frame P115 forms a substantially longitudinal former for the coil or coils to be wound about. In this embodiment a first coil P114*a* is wound closer to the dome P125 end of the base frame, and a second coil P114*b* is wound closer to the other end. It will be appreciated that any number and distribution of coil windings may be used and the invention is not intended to be limited to this example. In this embodiment, protruding guide members P116*a*-P116*c* locate on either side of the coil windings to help maintain the windings within in the appropriate location. The base frame P115 and guide members P116*a-c* are formed from different components and coupled to one another via any suitable mechanism (e.g. snap fit, adhesive, fasteners and the like) in this example, however it will be appreciated that these may be formed as a single integral component. The base frame extends from and is rigidly coupled to the periphery of the diaphragm body. In combination with the coil windings and guide members, this forms the diaphragm base structure. The diaphragm base structure in combination with the diaphragm body forms a diaphragm assembly.

A pair of magnetic structures, each comprising a permanent magnet P112, inner pole pieces P111*a* and P111*b*, and outer pole piece P111*c*, are rigidly coupled to the interior surround of the base P102 at either side of a central channel or air chamber P121, located on a side of the diaphragm body facing away from the ear mounting location. The outer pole piece P111*c* is bounded by, and rigidly connected to a surround comprising opposing, substantially upright inner walls of the base P102. The inner pole piece P111*b* is seated on and rigidly connected to lateral inner wall P102*a* of the base part P102. The other inner pole piece P111*a* is seated and attached directly onto the magnet P112. The inner pole pieces P111*a* and P111*b* are spaced to the outer pole pieces P111*c* and, by action of the magnet P112, generate a magnetic field therebetween, concentrating magnetic flux at these two circular ring locations. These gaps match the number of coil windings. It will be appreciated that this number could be different depending on the number of coil windings. In a neutral position, each coil winding P114*a, b*, is aligned with one of the pair of gaps. In some embodiment there may be a mismatched number of gaps and coils, but the gaps are at least distributed such that one or more coils traverse therebetween during operation. In some embodiments the audio signal may be diverted to different coils dependant on, for example, diaphragm excursion.

The inner and outer pole pieces create a channel therebetween for one side of the force transferring component, including the coil former P115 and coil windings P114*a, b*, to extend through in situ and reciprocate within during operation. Recesses P102*c* in the lateral inner walls of the base P102 align with these channels as does a cylindrical spacer ring P122 to allow the force transferring component to extend within during operation.

In this embodiment, support and alignment of the force transferring component of the diaphragm assembly P110 is maintained using ferromagnetic fluid P113*a-d* (herein referred to as ferrofluid). Ferrofluid is retained within each gap formed between the inner and outer pole pieces, by virtue of the fluid being magnetically attracted to the magnetic flux concentrating here, and the diaphragm base structure extends therethrough. In situ, within each gap, inner and outer ferrofluid rings attract towards and locate against to the inner and outer pole pieces respectively. During operation the diaphragm assembly P110 reciprocates within and through the ferrofluid and is maintained in alignment with the gaps formed between the pole pieces by action of the ferrofluid. Preferably the ferrofluid is in close contact and/or substantially seals against the diaphragm such that it substantially prevents the flow of gases such as air therebetween.

A rear vent or air leak fluid passage P105 is formed in the base structure P102 that is on the one side of the diaphragm body. The fluid passage P105 is substantially aligned with the channel extending between the magnets P112. The fluid passage P105 may comprise a permeable or porous element material P123, such as a mesh or open cell foamed material or fabric coupled to the base P102 for allowing the flow of gases, including air, therethrough whilst preventing the entry of other foreign materials into the device. It will be appreciated that this element or material P123 is preferable, but optional. A fluid passage P118 is located on a side of the surround and fluidly connects an air cavity P120 on a side of the diaphragm assembly configured to locate at or adjacent a user's ear with the air cavity P121 located on the opposing side of the diaphragm assembly (facing away from the ear mounting/interface side of the device). The fluid passage P118 may comprise a permeable or porous element or material P126, such as a mesh or foamed fabric or material coupled to the base P102 for allowing the flow of gases, including air, through this passage whilst also damping any unwanted resonances that might occur therewithin. It will be appreciated that this element or material P126 is preferable, but optional.

During operation, as the diaphragm assembly reciprocates by action of the excitation mechanism, sound pressure is generated and traverses through the channel of the upper housing P103 and out the vent P109 of the ear plug P101. In some cases this channel may comprise an elongate throat or conduit leading to the ear mounting P101. Unwanted resonances may occur within this elongate throat or conduit of the housing part P103, and in the air cavity region P121, during operation. A permeable or porous material such as a foamed material P127 may be located within the throat to help dampen unwanted air resonances that might occur during operation within these regions. As will be appreciated, this material P127 is preferable, but optional.

Free Periphery

In personal audio applications, due to the small size, design of the diaphragm assembly suspension system is particularly difficult. In particular, it is difficult to achieve high diaphragm excursion and a low fundamental diaphragm resonance frequency, with a very small and lightweight diaphragm structure, without creating diaphragm and suspension resonances at around the high treble frequency range, and without adding undue mass.

In a conventional linear action type personal audio transducer, where the diaphragm assembly is configured to reciprocate linearly, the relatively wide bandwidth requirement means that, unlike the case of a comparable sized home audio treble driver for example, there is a requirement for significant diaphragm excursion, and a requirement for high suspension compliance. This implies that there must be a significant area of the surround zone that is involved in flexing, in order to achieve high excursion, and that, in the case of a typical headphone or earphone driver, this wide zone must furthermore be approximately 100 times more compliant (e.g. 100 times less stiff to achieve a resonant frequency of Wn=100 Hz for instance) than the surround of a typical treble driver (that achieves a resonant frequency of Wn=1000 Hz for instance), in order to provide a fundamental resonance frequency for the diaphragm that is approximately 10 times lower in frequency.

This is why most headphones and earphones have a fundamental diaphragm resonance frequency far higher than would be acceptable in home audio, with response generally rolling off below about 90 Hz, while also having treble performance that suffers more resonance than an equivalent home audio treble driver.

For example, whereas in home audio stereo systems bass response typically reduces below 35-40 Hz, a flagship model dynamic headphone typically has a fundamental diaphragm resonance frequency of around 100 Hz and the bass response typically reduces below around 80 Hz. Also comparison between waterfall plots of a high end home audio treble driver versus a flagship headphone typically shows that the home audio treble driver suffers significantly less from energy storage distortion issues, particularly at treble frequencies.

Diaphragm suspension is therefore an important design feature in personal audio applications. The use of an at least partially free periphery audio transducer assembly as defined under section 2.3 of this specification for example, can potentially improve the operation of a personal audio device requiring a suspension with relatively high compliance to movement. The personal audio device P100 for example comprises an audio transducer having a diaphragm assembly P110 comprising a diaphragm body and an excitation mechanism configured to act on the diaphragm body to move the body in use in response to an electrical signal to generate sound. The audio device further comprises a housing that is formed in part by the base P102 and also by the housing part P103, which accommodates the audio transducer. As shown in FIG. 61H, the diaphragm body/structure comprises an outer periphery that is free from physical connection with a surrounding structure such as with the interior surround and/or with the base structure P102. In this embodiment the diaphragm body periphery is free from physical connection along approximately the entire periphery. In this embodiment, the diaphragm assembly P110 including the diaphragm body is free from physical connection with the inner and outer pole pieces P111*a-c* of the excitation mechanism. As these parts P111*a-c* are rigidly connected to the interior of the housing (with inner pole piece P111*a* connected via magnet P112 and inner pole piece P111*b*), they form part of the interior to which the diaphragm assembly is physically unconnected.

The diaphragm body/structure and diaphragm assembly P110 are free from physical connection with the housing part P103 interior and the base structure part P102 interior. All moving parts of the diaphragm assembly P110 including the diaphragm body and the diaphragm base structure are entirely free from physical connection with the interior of the housing or base structure. It will be appreciated, entirely free from physical connection as used in this specification is intended to mean at least approximately entirely free from physical connection. In some cases, the wires leading to the coils, for example, may need to rigidly connect to a surrounding structure, however as will be appreciated by those skilled in the art this does not and is not intended to form a support or suspension for the diaphragm assembly to which the phrases entirely or substantially free from physical connection are intended to relate.

Even in the case that a partially-free-periphery design is employed the area of the suspension components involved in flexing is dramatically reduced, and these components are comparatively more geometrically robust against internal resonances, in relation to the compliance and excursion provided. This helps to solve the 3-way compromise between diaphragm excursion, diaphragm fundamental resonance frequency and high-frequency resonances imposed by conventional suspensions. It will be appreciated that in alternative embodiments the diaphragm body/structure and/or the diaphragm assembly may be at least partially and significantly free from physical connection along, for example, at least 20 percent of a length, or at least 30% of the length of the outer periphery. More preferably the diaphragm body/structure and/or assembly is substantially free from physical connection, for example along at least 50 percent of the length and most preferably at least 80 percent of the length.

Also, this embodiment shows an earphone device that comprises an ear plug configured to be located within the concha or ear canal entrance or ear canal of a user's ear. The benefits of an entirely, substantially or partially free periphery diaphragm design as described above and as shown in this embodiment are in some ways exaggerated in earphone applications since, because the transducer part of the device must typically be small enough to fit substantially inside the concha or ear canal of the ear or at least must be small enough that it can be retained without a headband, the low mass of the diaphragm makes it particularly difficult to reduce the fundamental resonance frequency. Also, the requirement for a small diaphragm assembly means that high excursion is particularly useful.

In this case the transducer has no to little unwanted resonances occurring within the audible bandwidth. Yet another advantage of an entirely, substantially or partially free periphery diaphragm in earphone applications is that, by virtue of the small size, relaxation or elimination of the constraints imposed by conventional suspensions leaves a diaphragm assembly, driver, and entire device which can be made to have few or even zero significant unwanted resonance modes. As described above, unwanted resonance modes in a loudspeaker tend to store, and then release after a delay, vibrational energy of the diaphragm, which in turn tends to subjectively blur and muddy the reproduced audio.

Ferrofluid Support

In this embodiment, the diaphragm assembly P110 and/or structure, including all outer peripheral regions that are free from physical connection with the housing, is supported in operative position relative to the excitation mechanism of the base structure and relative to the housing interior by a fluid, and most preferably by a ferrofluid.

A diaphragm assembly and/or structure that is free from physical connection with a surrounding body, but that is supported using ferromagnetic fluids to suspend the diaphragm assembly relative to the excitation mechanism and/or transducer base structure, may also be highly effective in personal audio applications, since suspension resonances are practically eliminated yet high diaphragm excursion and high bandwidth may still be provided. Removal of the flexible diaphragm region and or flexible surround may additionally result in improvements including, but not limited to, increased linearity, reduced harmonic distortion and more linear phase response.

The ferrofluid preferably supports the diaphragm assembly to a degree that prevents contact or rubbing for example at the diaphragm assembly periphery against the transducer base structure or excitation mechanism.

It will be appreciated that in alternative embodiments, the diaphragm body of the audio transducer may comprise an outer periphery that is entirely, substantially or at least partially free from physical connection with an interior of the housing (e.g. along at least 20 percent of the length of the edge for example), and that the sections of the diaphragm body and/or any other section of the diaphragm assembly that is not physically connected to the interior of the housing may be separated from the interior of the housing by a relatively small or narrow air gap.

The diaphragm assembly is of a type having motor coils attached at the perimeter so that the diaphragm assembly is self-supporting and does not rely on any surround to support the diaphragm body. The diaphragm suspension consists of suspension of the motor coil in a magnetic circuit gap via a ferromagnetic fluid contained within said gap. The ferromagnetic fluid imparts a centring force on the motor coil, which in turn suspends the diaphragm in the correct location.

An overhung motor layout is be used whereby the coil windings P114*a* and P114*b* are each wider than their magnetic field gaps adjacent pole pieces P111*a* and P111*b* respectively. But in alternative embodiments an underhung or other motor coil layout may be used. The coil windings P114*a* and P114*b* are extended beyond the magnetic field gap in order to maintain a substantially consistent motor strength over the range of diaphragm excursion, since there will be a substantially constant number of the coil windings located within the magnetic field gaps adjacent pole pieces P111*a* and P111*b* when the diaphragm moves in either direction.

The dome diaphragm form with motor coil at the perimeter provides a geometry three-dimensional which, despite being a membrane, is substantially thick overall, and is comparatively robust against resonances. There is no unsupported membrane edge requiring support from a rubber diaphragm surround as is the case, for example, in a conventional cone-diaphragm speaker driver.

Diaphragm Assembly

The diaphragm body of diaphragm assembly P110 is substantially rigid. The diaphragm body of the diaphragm assembly P110 is formed from a substantially rigid construction, such as from a rigid plastic, a high density foam, a metal material, or a reinforced structure for example. It will be appreciated that in some forms the diaphragm assembly may comprise any one of the configuration R1-R4 diaphragm structures as described in section 2.2 of this specification. It will also be appreciated that any of the configuration R5-R7 audio transducers described in section 2.3 of this specification may be used in some variations of this embodiment. For instance, the diaphragm body may comprise one or more major faces, normal stress reinforcement being coupled adjacent at least one of the major faces for resisting compression-tension stresses experienced at or adjacent the face of the body during operation, and optionally at least one inner reinforcement member embedded within the body and oriented at an angle relative to at least one of the major faces for resisting and/or substantially mitigating shear deformation experienced by the body during operation. It will be appreciated however, that in alternative embodiments the diaphragm body may be substantially flexible In this embodiment, the diaphragm body comprises a thin domed membrane or some other type of relatively thin diaphragm body, but comprising a geometry that is sufficiently rigid against the primary whole-diaphragm bending modes in order that it maintains substantially rigid behaviour over the audio transducer's intended operating bandwidth/FRO. The diaphragm may be thin as well as curved in a manner such that overall dimensions in a direction perpendicular to a major face, excluding components associated with the excitation mechanism (e.g. the depth P204 of the dome P125), are at least 15% of a maximum distance across a major face (e.g. the diameter P203 of the dome P125). This facilitates the possibility of a 3-dimensional geometry, being a three dimensional dome shaped curve in this case, which is relatively self-supporting, at least compared to more planar-type diaphragm designs where the diaphragm is not thick or at least curved. Preferably also, the overall dimension of the entire diaphragm assembly including components associated with the excitation mechanism, is at least 25% of a maximum distance across a major face in a direction perpendicular to a major face. This is because a diaphragm assembly having significant dimensions in three dimensions tends to have increased structural integrity in regards to resonance modes.

The remaining components of the diaphragm assembly, such as the force transferring component, may aid in maintaining rigidity of the diaphragm body during operation.

Decoupling Mounting System

Furthermore, a decoupling mounting system of the invention, as described in section 4 of this specification may be incorporated between the transducer base structure of the audio transducer and at least one other part of the audio device, such as the housing part P103 for at least partially alleviating mechanical transmission of vibration between the diaphragm and the at least one other part of the audio device. The decoupling mounting system acting to flexibly mount a first component to a second component of the audio device as is described in section 4. Any one of the embodiments described in section 4.2 or a decoupling system designed in accordance with the considerations of section 4.3 may be used for example.

Air Leak Fluid Passages

As previously described, the personal audio device P100, comprises an audio transducer having a diaphragm assembly, and an enclosure or baffle for housing the transducer P100. The diaphragm assembly comprises a diaphragm and an excitation mechanism configured to act on the diaphragm assembly in-use in response to an electrical signal to generate sound. The diaphragm comprises an outer periphery that is substantially (or at least partially) free from physical connection with an interior of the enclosure or baffle along, for example along at least 20 percent of a length of the periphery, but most preferably along approximately an entire portion of the periphery.

The ear plug/interface P101 is configured to provide a sufficient seal between a volume of air within a front cavity P120 inside the device, located at or adjacent the user's ear canal or concha in use, and a volume of air external to the device (such as the surrounding atmosphere). The geometry and/or material used for the ear plug may affect the sufficiency of the seal for example. As previously mentioned, the plug P101 may comprise a body shaped to reside snuggly within a user's ear, such as against the user's ear canal entrance, so that it may locate the audio transducer adjacent the user's ear canal and seal against this location. The body may be formed or covered in a soft material for comfort and for sufficient sealing, such as a soft plastics material like Silicone or similar. It will be appreciated that other types of geometries and materials may alternatively be used for sufficient sealing as will be apparent to those skilled in the art.

In the preferred embodiment, the ear plug P101 is configured to sufficiently or substantially seal between the front cavity P120 on the ear canal side of the device and the volume of air external to the device in situ. A substantial seal is one that is configured to enhance the sound pressure at, at least, low bass frequencies (i.e. provide a bass boost) during operation for example. For example, the ear plug may be configured to substantially seal against the user's ear in situ to increase sound pressure generated inside the ear canal (at, at least, low bass frequencies) during operation. In some implementation, sound pressure, for example, may increase by an average of at least 2 dB, or more preferably at least 4 dB, or most preferably at least 6 dB, relative to sound pressure generated when the audio device is not creating a sufficient seal (when the same electrical input is applied) in situ. The volume of air enclosed within front cavity P120 may be substantially small to also aid with providing a bass boost during operation.

The audio device P100 further comprises at least one fluid passage P118 configured to provide a restrictive gases flow path from the first cavity to another volume of air during operation, to help dampen air resonances and/or moderate base boost. For example, the device P100 comprises a first, front air cavity P120 contained within the device housing part P103 and located on a side of the diaphragm assembly that is configured to locate at or adjacent a user's ear canal or concha in use. The device P100 further comprises a second, rear air cavity P121 contained within the device base P102 and located on an opposing side of the diaphragm facing away or distal from the user's ear canal or concha in use. The fluid passage P118 fluidly connects the front and rear air cavities P120 and P121 such that air that is otherwise sealably retained within cavity P120 can restrictively flow into an external volume, to thereby dampen internal resonances and/or moderate bass boost in use. It is not essential that a separate flow restricting element is used for the passage to provide a restrictive gases flow path, and the passage may be substantially open with no obstructive barriers and still be restrictive by having a reduced size, diameter or width. As will be explained in further detail below, the fluid passage P118 is configured to restrict air flow by either having a reduced diameter or width at the junction with the front cavity P120 or other adjacent cavity, or by otherwise incorporating a flow restricting element (sometimes known in the art as a resistive element), or both. In this embodiment, the fluid passage P118 comprises both.

Alternatively, or in addition, a fluid passage P105 of the device may fluidly connect the front air cavity P120 with a volume of air that is external to the device, e.g. with the external environment, via fluid passage P118 and the rear cavity P121. This fluid passage P105 is separate from any leak passage that might exist in practice, in the otherwise substantially sealed periphery of the output vent P109. In this embodiment, an air vent or aperture P105 is provided at an opposing end of the housing to the front cavity P120 (adjacent rear cavity P121) allowing for the passage of air from the front cavity P120 to a volume of air external to the device P100 via fluid passage P118 and rear cavity P121. The fluid passage P105 is configured to restrict air flow by either having a reduced diameter or width at the junction with the front cavity P120 or other adjacent cavity P121, or by otherwise incorporating a flow restricting element, or both. In this embodiment, the fluid passage P105 provides a restrictive flow path from the rear cavity P121 to the external volume of air.

It will be appreciated that in alternative embodiments any number of one or more fluid passages may be incorporated to provide for the leakage of air from the otherwise sealed cavity P120. In this embodiment both passages P118 and P105 are provided and work collectively to achieve this. In alternative variations however, one or more air vents may be located at or adjacent cavity P120 for example, (e.g. on the same side of the diaphragm assembly as cavity P120) and leading to a volume of air external to the device, such as the external environment.

It is generally simpler to make an ear pad or ear plug that consistently seals, across different ear and head shapes and different positioning, than it is to make a pad or plug which provides a consistent degree of air leakage. For this reason, in this embodiment of a personal audio device of the present invention, the ear pad or ear plug is designed to substantially seal, and the air leaks are introduced into the device to allow for resonance damping. The leaks are preferably positioned away from the interface between the user's ear or head and the device so that characteristics such as the location and resistance, as well as any reactance, are substantially independent of variations in ear shape and device positioning.

Each fluid passage allows air to escape from the first cavity P120 adjacent the user's ear or head during operation without passing between the user's head and the audio device, thereby affecting the seal.

Each fluid passage P118 or P105 preferably comprises a fluid flow restrictor. The fluid flow restrictor may comprise, for example, any combination of: an entry or input from the adjacent cavity of reduced size, width or diameter; and/or a fluid flow restricting element or barrier at the entry or within the passage such as a porous or permeable material. For example, the fluid passage may be an entirely open passage having a reduced diameter or width entry. Alternatively, or in addition the fluid passage may comprise a fluid flow restricting element such as a foam barrier or mesh fabric barrier at the entry or within the passage for subjecting gases traversing therethrough to some resistance. The fluid passage may comprise one or more small apertures.

Preferably the fluid passages P118 and P105 are sufficiently nonrestrictive such that they result in a significant reduction in sound pressure within the ear canal during operation. A significant reduction in sound pressure for example may result in at least 10%, or more preferably at least 25%, or most preferably at least 50% reduction in sound pressure during operation of the device over a frequency range of 20 Hz to 80 Hz. This reduction of sound is relative to a similar audio device that does not comprise any fluid passages such that there is negligible leakage in sound pressure generated during operation. The significant reduction in sound pressure is preferably observed at least 50% of the time that the audio device is installed in a standard measurement device. Other reductions in sound pressure are also envisaged however and the invention is not intended to be limited to these examples.

In this embodiment, the fluid passage P118 comprises a reduced diameter at the junction with the front cavity P120 (and also with the rear cavity P121). The diameter is substantially uniform along the length of the passage but it will be appreciated that the diameter may be variable in some alternatives. The fluid passage P118 also comprises a permeable or porous flow restricting element or material P126, such as a mesh or foamed fabric or inside the passage for allowing the flow of gases, including air, through this passage whilst also restricting the pressure or rate of flow therethrough to thereby reduce any unwanted resonances that might otherwise occur within the air cavity system comprising the ear canal, air cavity P120, fluid passage P118, air cavity P121 and fluid passage P105. The flow restricting material is located at an entry/input of the fluid passage P118 in this embodiment but it will be appreciated it may be located at an output and/or within the passage.

The fluid passage P105 also comprises a reduced diameter at the junction with the rear cavity P121. The fluid passage P105 also comprises a flow restricting element in the form of a mesh or foamed material P123 configured to allow the flow of gases, including air, through the passage whilst also restricting the pressure or rate of flow therethrough to thereby reduce any unwanted resonances that might otherwise occur within the air cavity system mentioned above. The flow restricting material is located at an output of the fluid passage P105 in this embodiment but it will be appreciated it may be located at an entry/input and/or within the passage.

Each fluid passage may extend anywhere within the device, such as adjacent the periphery of the diaphragm assembly and/or audio transducer assembly or even through an aperture in the diaphragm assembly and/or audio transducer assembly.

In this embodiment, control of air resonances is improved via damping created by the fluid passage air leaks. Also, resonance control, as well as bass level moderation can be made relatively consistent across different listeners/users and with different device positioning.

In some embodiments, the channel of the audio device configured to locate directly adjacent or inside the user's ear canal and/or concha may comprise an elongate conduit or throat. This design may be also be susceptible to air resonances. Therefore, in some implementations a sound dampener P127 and/or flow restrictor is located within this conduit to further dampen the internal resonances during operation.

For example, a foam insert P127 located in the throat of the vent P109 can achieve damping of resonances involving air moving between the cavity P120 and the ear canal. Foam may also affect the frequency response since the resistance affects high and low frequencies differently. Other porous or permeable elements configured to restrict flow of air may alternatively be used to dampen resonances within the throat of the device.

Earphones may modify the natural resonance characteristics of the ear and this can potentially modify the frequency and/or resonance characteristics of the ear canal plus concha system so that the brain is no longer calibrated to the frequency response of the system. For example, with reference to FIG. 63, in the case of earphones where (after insertion of the earphone) the ear canal P301 becomes substantially sealed off by an ear plug P101 (and the earphone P100) at locations P305 at the entrance to the ear canal, this may cause the ear canal resonance to be altered from an open-ended tube type resonance to a closed tube type resonance. Additionally, resonances store and release energy with a delay, which tends to result in sound blurring. For these reasons it may be advantageous to mitigate resonances of the ear/earphone system, including via damping of such resonances. Therefore, introducing at least one fluid passage for the leakage of air from an air cavity located on a side of the diaphragm assembly adjacent the region configured to mount the user's ear, to another air cavity on an opposing side of the diaphragm assembly and/or to a volume of air external to the device, to damp resonances is particularly advantageous in the application of earphones as in this embodiment. Providing a restrictive flow path through this passage helps achieve resonance damping and/or bass boost moderation. It will be appreciated however, that these advantages can also be observed in a headphone application, as will be explained in further detail in section 5.2.2 below, as well as in a hearing aid application.

Therefore, in this embodiment, the fluid passages P118 and P105 provide advantages including: leakage past the diaphragm assembly and through the vent P105 damps the (modified from natural state) ear canal resonance, and other resonance modes of the air cavity system comprising the ear canal, air cavity P120, fluid passage P118, air cavity P121 and fluid passage P105; and the leakage amount, location and any inherent reactance is consistent between users even if the degree of sealing against the ear varies, since leakage past the ear seal is less than the leakage within the device (i.e. past the diaphragm assembly and through the passages, without reliance on high manufacturing tolerances and across different listeners).

In this embodiment, as described in the previous section, the audio transducer comprises a diaphragm body with a periphery that is substantially free from physical connection with the surround/enclosure P102. This facilitates achievement of a lower diaphragm fundamental resonance frequency for increased low bass extension, while also reducing unwanted high frequency resonance associated with a high-excursion and high-compliance surround as is often required in personal audio applications.

In earphones based on conventional dynamic and armature drivers this trade-off is commonly resolved by the use of multiple drivers, however this introduces distortion associated with crossover networks, and may increase the complexity, cost and size of the device.

A lower fundamental diaphragm resonance frequency, which as described above may be facilitated when the diaphragm periphery is at least partially free from physical connection, may lead to various improvements to bass, including but not limited to an increase in the bass level, potentially improved phase response, increased linearity with regards to changes in volume, and reduced harmonic distortion. However, the improvement in bass response may be observed differently amongst implementations, especially in a personal audio device where factors such as the geometry of the enclosure have the potential of significantly affecting the response. With this in mind, the fluid passages can be used to control, moderate or fine tune the bass response of the device when an audio transducer configuration that is designed to improve the bass response is implemented.

The audio transducer design in which the diaphragm is substantially (or at least partially) free from physical connection, in combination with the at least one fluid passage for air leakage, therefore provides an audio device having reduced energy storage (for example as measured in transient response and cumulative spectral decay plots), since resonances of the driver and air cavity system are addressed, and having improved frequency response characteristics over conventional designs.

As previously described, the audio transducer P100 of this embodiment comprises a diaphragm assembly P110 that is supported in correct alignment by ferrofluid relative to the base structure P102 at the periphery of the assembly. The introduction of an air passage that is located elsewhere other than the periphery of the diaphragm assembly also has advantages, although the invention is not intended to be limited to such an embodiment. In the application of earphones, such as this embodiment small variations in air leaks can have a large effect, partly due to the small size of air cavities and also due to the use of very small transducers that are compact enough to be located within the concha. This means that it can be hard to maintain tolerance and consistency of air leaks. When the diaphragm assembly has an air gap about the periphery that creates a fluid air leak passage between the first cavity P120 and another cavity or the external environment, the gap may be formed to have inconsistencies in size or shape due to manufacturing variations, changes in the diaphragm mounting or movement of the diaphragm in-use, which as mentioned can greatly affect the operation of the device. Such inconsistencies in the size of the air gap can lead to inconsistent and/or too much air leakage for example. This can be disadvantageous in some implementations of personal audio devices, for example when a compact transducer requiring sufficient sealing in order to augment bass response is required but significantly affected by such an oversized or inconsistent air gap. Supporting the periphery with ferrofluid instead of an air gap may mitigate such inconsistencies. A customised air leak fluid passage can instead be incorporated in a location other than the periphery of the diaphragm assembly where it may be easier to control the size of the fluid passage for instance. As shown in this embodiment the fluid passages P118 and P105 are located adjacent the diaphragm assembly and excitation/transducing mechanism but not at the periphery of these assemblies. In alternative embodiments a fluid passage may be provided through the interior of the diaphragm assembly. The size of each fluid passage in this manner can be customised more easily and configured to achieve the desired response.

Frequency Range of Operation

Preferably, the audio device P100 has a FRO that includes the frequency band from 160 Hz to 6 kHz, or more preferably includes the frequency band from 120 Hz to 8 kHz, or more preferably includes the frequency band from 100 Hz to 10 kHz, or even more preferably includes the frequency band from 80 Hz to 12 kHz, or most preferably includes the frequency band from 60 Hz to 14 kHz.

Some Variations

The audio transducer of this embodiment is a linear action transducer. However, it will be appreciated that in alternative embodiments (as will be described for embodiment X for example) a rotational action transducer may alternatively be used in the personal audio device.

It will be appreciated that the internal audio transducer mechanism may alternatively be implemented in a headphone device (as will be described for embodiment Y for example) or other personal audio device such as a mobile phone or a hearing aid for example.

The audio device P100 may comprise multiple transducers as will be explained in further detail below with reference to other embodiments.

The diaphragm assembly of this embodiment may be suspended in a manner other than ferrofluid relative to the transducer base structure and surround, and separated by an air gap (instead of ferrofluid) in regions of the periphery that are not connected to the base structure and/or surround. For example in alternative embodiments the diaphragm periphery may be supported by compact flat springs or by isolated segments of foam.

5.2.2 Embodiment K—Headphone

Referring now to FIGS. 56A-60D, a further embodiment of a personal audio device (herein referred to as the embodiment K audio device) in the form of a headphone apparatus K203 is shown comprising left and right headphone interface devices K204 and K205 (hereinafter also referred to as headphone cups K204 and K205) and a bridging headband K206 (FIG. 57). Each headphone interface device comprises an audio transducer K100 (FIGS. 56A-56O) mounted inside the cup housing K204 (FIGS. 58A-58H and FIG. 59). Although this embodiment shows a headphone configuration, it will be appreciated that the various design features of the audio device may alternatively be incorporated in any other personal audio device, such as an earphone or a mobile phone device for example, without departing from the scope of the invention. The features of the left hand headphone cup K204 will now be described in further detail. It will be appreciated that the right hand headphone cup K205 will be of the same or similar configurations and therefore its features will not be described for the sake of conciseness.

Referring to FIGS. 56A-56O, in this embodiment, the audio transducer is a rotational action transducer comprising a diaphragm assembly K101 that is rotatably coupled to a transducer base structure K118 via a hinge system configured to rotate the diaphragm about an associated axis of rotation K119 during operation. The diaphragm assembly preferably comprises a diaphragm body K120 that is substantially thick, for example where a maximum diaphragm body thickness K127 is at least 15% of a diaphragm body length K126, or at least 20% of the body length K126. In the embodiment shown for example, the maximum diaphragm body thickness K127 may be 5.7 mm which is 30% of the diaphragm body length K126 of 19 mm. This thickness may also be at least approximately 11%, or more preferably at least approximately 14% of a greatest dimension, such as the diagonal length across the diaphragm body. In the embodiment shown for example the maximum diaphragm body thickness K127 may be 5.7 mm which is 21% of the diaphragm body diagonal length K139 of 27.5 mm. In alternative embodiments, however, the diaphragm body may not be substantially thick. The transducer further comprises an excitation mechanism, such as an electromagnetic mechanism for transducing sound by imparting a substantially rotation motion on the diaphragm body in use. Parts of the excitation/transducing mechanism of the audio transducer that are connected to the associated diaphragm body are preferably connected rigidly.

Rigid Diaphragm Assembly

In this embodiment, the diaphragm structure has a geometry suitable for resisting acoustical breakup.

The diaphragm assembly comprises a diaphragm structure that is substantially rigid during operation. The diaphragm structure is preferably any one of the configuration R1-R4 diaphragm structures described under section 2.2 of this specification. In this embodiment, the diaphragm structure is similar in construction to the diaphragm structure A1300 described in relation to the embodiment A audio transducer in section 2.2 and comprises a diaphragm body K120 that is reinforced with outer, normal stress reinforcement K111/K112 on or adjacent the opposing major faces K132 of the body and inner, shear stress reinforcement K121 oriented substantially orthogonally relative to the normal stress reinforcement. The outer stress reinforcement comprises a series of longitudinal struts of which a first group K112 are oriented longitudinally along the associated major face K132, and a second group K111 are oriented at an angle relative to the first group and to each other to thereby form a cross-strut formation. The outer stress reinforcement K111/K112 reduces in mass in regions distal from a centre of mass location of the diaphragm assembly K101 (by reducing the width or thickness of the struts for example).

The diaphragm body K120 also reduces in mass in regions distal from the centre of mass location (by tapering along its length to form a wedge shaped structure). The diaphragm body K120 is substantially thick, for example comprising a maximum diaphragm body thickness K127 of approximately at least 15% of a diaphragm body length K126 or more preferably at least 20% of the length. The diaphragm body length K126 may be defined by a total distance from the axis of rotation K119 to a most distal periphery of the diaphragm structure, in a direction substantially perpendicular to the thickness dimension (or for example, along a direction perpendicular to the axis of rotation K119). Angular connection tabs K122 locate at a base end of the diaphragm body K120 to enable the diaphragm base to rigidly connect to other components of the diaphragm assembly K101. It will be appreciated that any other diaphragm structure constructed in accordance with the configuration R1-R4 as defined under section 2.2 of the description may alternatively be employed in this embodiment.

The diaphragm assembly K101 further comprises a diaphragm base frame K107 which rigidly connects to the base of the diaphragm structure, to part of the hinge assembly and to the force transferring component of the excitation mechanism for moving the diaphragm in use. As shown in FIGS. 56L and 56N the diaphragm base frame K107 comprises a first upright plate K107*a* and a second angled plate K107*b*, that are both substantially planar and angled relative to one another to correspond to the relative angle between one of the major faces K132 of the diaphragm body and the base face of the diaphragm body. These first and second plates are rigidly coupled to the diaphragm body at the base face and the aforementioned major face K132 respectively. The second angled plate K107*b* configured to couple the major face K132 also comprises a pair of spaced apertures K107*e* (as shown in FIGS. 56G, 56N and 56M) that are configured to align with the contact members K138 extending form the base block K105 of the transducer base structure and also with the recesses K120*a* formed at the base end of the diaphragm body. In this manner, in the assembled state of the audio transducer the contact members K138 extend through the corresponding apertures of the base frame K107 and also into the recesses K120*a* of the diaphragm body K120.

The diaphragm base frame K107 further comprises a third arcuate plate K107*c* extending from the first substantially upright plate K107*a* and connecting to a fourth angled and substantially planar plate K107*d* of the base frame that extends in a direction opposing the second plate K107*b*. The arcuate plate K107*c* is configured to couple a force transferring component such as the coils K106 in the assembled state. The coils K106 rigidly couple an outer face of the arcuate plate K107*c*. The arc of the plate is configured to correspond to the arc of a magnetic field gap K140*a* and K140*b* of the transducing mechanism formed by the transducer base structure. One or more arcuate plates K136 may be inserted within the diaphragm base frame cavity formed by the first, third and fourth plates of the frame K107. Preferably three plates are retained in this cavity, forming two inner cavities K107*e* within which the inner poles K113 of the transducing mechanism extend to operatively cooperate with the coils K106.

As shown in FIGS. 56L and 56M, in the assembled state the second K107*b* plate of the base frame K107 extends slightly past the associated major face of the diaphragm body/structure. This provides an edge against which a longitudinal connector K117 rigidly connects. The connector K117 also rigidly connects a corresponding face of the diaphragm body at the base end. The connector comprises recesses that align with the apertures K107*e* of the second plate K107*b* of the base frame K107. An opposing side of the connector (to that which is connected to the diaphragm body) comprises a substantially concavely curved surface (at least in cross-section) in a central region of the connector along its length. The concavely curved surface is configured to receive and accommodate a contact pin of a hinge system biasing mechanism (which is described in further detail below). Extending from the part of the connector that couples the second plate K107*b* of the base frame K107, is an angled part configured to rigidly couple the fourth plate K107*d* of the diaphragm base frame K107. In this manner the connector K117 is rigidly coupled along its length to the base frame K107. This part also comprises a substantially concavely curved surface (at least in cross section) that extends along a substantial portion of the length of the connector K117 and that is configured to contact against and fixedly couple a hinge element K108 of the hinge system (described in further detail below). The hinge element K108 comprises a substantially convexly curved surface (at least in cross section) at least in sections of the hinge element K108 that extend across the recesses of the connector to engage the contact blocks K138 of the hinge system as will be explained in further detail below.

In this manner, in an assembled state, the diaphragm base structure is rigidly coupled to the base frame K107 and to the connector K117. In turn the base frame is also rigidly and fixedly coupled to the coils K106 of the transducing mechanism. The connector K117 is fixedly coupled to the hinge element K108 and to the contact pin K109 of the hinge assembly. These components in combination form the diaphragm assembly K101.

Referring to FIGS. 56F, 56J and 56K, the base frame K107, hinge element K108 and connector K117 preferably extend across the entire width of the diaphragm structure across the base face of the structure. Either end of these components are preferably coupled to the transducer base structure side block K115 via a substantially resilient connection member K125 and spacer disc or washer K135. Each side block K115 may be substantially rigid, for example formed from a substantially rigid plastics material or the like. The connection member K125 and/or washer K135 rigidly coupled to an inner wall of an associated side block K115. This arrangement compliantly positions the diaphragm base frame assembly (including connector K117 and the hinge element K108) to base component K105 of the transducer base structure. This mechanism is contributing to the overall hinge assembly. The two connection members K125 provide a restoring force to the diaphragm assembly that:

contributes to positioning the diaphragm into a neutral or rest position, and as such is a significant determining factor of the final transducer fundamental frequency Wn; and contributes to positioning the hinge element K108 relative to the contact member K138, so that in the unusual case of a bump or knock or other exhibited external force, the parts will re-align into a neutral position where parts of the diaphragm assembly do not contact and rub against the surrounding parts.

As such, this mechanism, as well as contributing to the overall hinging assembly, also acts as a diaphragm restoring mechanism.

Free Periphery

The diaphragm structure comprises an outer periphery that is free from physical connection with a surrounding structure such as the surround K301. A free periphery in relation to a diaphragm structure is described in detail in section 2.3 of this specification which also applies to this embodiment. By way of summary, the diaphragm structure periphery may be at least partially free from physical connection with a surround, for example along at least 20 percent of the periphery in some embodiments. In this embodiment the diaphragm structure is approximately entirely free from physical connection (apart from at the hinge joints) with a surrounding structure including the surround and the transducer base structure. The unconnected, free portions of the periphery of the diaphragm structure are separated from the surround by relatively small air gaps K321 and K320. It will be appreciated that the periphery may otherwise be substantially free from physical connection, along at least 50% or at least 80% of the length or perimeter of the outer periphery for example.

Preferably the width of the air gaps K321 and K320 defined by the distance between the outer periphery of the diaphragm body and the housing/surround K301 is less than $1/10^{th}$, and more preferably less than $1/20^{th}$ of a diaphragm body length K126. For example, a width of each air gap defined by the distance between the outer periphery of the diaphragm body and the surround is less than 1.5 mm, or more preferably is less than 1 mm, or even more preferably is less than 0.5 mm. These values are exemplary and other values outside this range may also be suitable.

Hinge System

Rotational action audio transducers can be well-suited for personal audio devices, since rotational action transducers have the potential to satisfy requirements of extended high-frequency bandwidth as well as extended bass via high diaphragm excursion and low fundamental diaphragm resonance frequency.

In this embodiment, the combination of a rotational action audio transducer with an audio device interface design that fully or at least partially seals off a volume of air between the ear and diaphragm assembly, performance is enhanced since sealing helps to facilitate increased bass extension, which reduces the requirement for audio transducer volume excursion capability and makes it easier to achieve better quality treble reproduction.

Hinge-type diaphragm suspensions help eliminate or at least alleviate low-frequency resonance modes.

The hinge system is a contact hinge system constructed in accordance with the design principles and considerations described in section 3.2.1 of this specification. It will be appreciated therefore that in an alternative embodiment this hinge system may be substituted by any alternative mechanism designed in accordance with the principles described in this section, such as the one described in section 3.2.2 in relation to the embodiment A audio transducer for example. For example, at least one audio transducer may comprise a hinge system, including a hinge assembly having one or more hinge joints, each hinge joint comprising a hinge element and a contact member, the contact member providing a contact surface, and when in use, the hinge joint is configured to allow the hinge element to move relative to the contact member, while maintaining a consistent physical contact with the contact surface. For example the hinge could be similar to that described for the embodiment A audio transducer A100 or the hinge of the embodiment E audio transducer. Furthermore, in yet another alternative configuration, the hinge assembly may be substituted for a flexible hinge assembly as described under section 3.3 of this specification, such as the hinge assemblies of the embodiment B and D audio transducers or in the configurations described with reference to FIGS. 19A-31, for example comprising one or more (preferably thin-walled) flexible elements that operatively support the diaphragm in use. The hinge systems simultaneously provide low fundamental diaphragm resonance modes, low compliance against pure translations to reduce high frequency diaphragm resonance modes, and high diaphragm excursion, which are all requirements of personal audio applications.

A full description of the hinge system associated with this embodiment is provided in section 3.2.5 of this specification. The following is a brief overview of the hinge system of the embodiment K transducer. Referring to FIGS. 56G-56N, in this embodiment, the hinge system comprises a hinge assembly having a pair of hinge joints on either side of the assembly. Each hinge joint comprises a contact member that provides a contact surface and a hinge element configured to abut and roll against the contact surface. Each hinge joint is configured to allow the hinge element to move relative to the contact member, while maintaining a consistent physical contact with the contact surface, and the hinge element is biased towards the contact surface.

A hinge element, in the form of a hinge shaft K108 is rigidly coupled on the diaphragm base frame K107. On an opposing side, the hinge shaft K108 is rollably or pivotally coupled to a contact members K138. As shown in FIG. 56I, each contact member comprises a concavely curved contact surface K137 to enable the free side of the shaft K108 to roll thereagainst. The concave surface K137 comprises a larger curvature radius than that of shaft K108. A pair of contact members K138 extend from either side of the base component K105 to rollably or pivotally couple with either end of the shaft K108 thereby forming two separated hinge joints. The contact hinge joints are preferably closely associate with both the diaphragm structure and the transducer base structure.

Referring to FIGS. 56L-56M, the hinge shaft K108 is resiliently and/or compliantly held in place against the contact surfaces K137 of the base blocks K138 by a biasing mechanism of the hinge system. The biasing mechanism includes a substantially resilient member K110 in the form of a compression spring, and a contact pin K109. The spring K110 is rigidly coupled to the base structure K118 at one end and engages the contact pin K109 at the opposing end at a contact location K116. The resilient contact spring K110 is biased toward the contact pin K109 and is held at least slightly in compression in situ. This arrangement compliantly pulls the diaphragm base structure, including the base frame K107, the connector K117 and the hinge shaft K108 against the contact base blocks K138 of the hinge joints. The degree of compliance and/or resilience is as is described under section 3.2.2 of this specification.

Transducer Base Structure and Transducing Mechanism

Preferably the diaphragm structure is rigidly attached to the force transferring component K106, as opposed to if it is compliantly attached, or if it is attached via another component particularly if the geometry of the other component is slender. The force transferring component is preferably of a type that remains substantially rigid in-use, since this helps to minimize resonance.

Electrodynamic type motors are preferred due to their highly linear behavior over a wide range of diaphragm excursion. The excitation mechanism may comprise a force transferring component in the form of an electrically conducting component, preferably a coil K106, which receives an electrical current representing an audio signal. Preferably the electrically conducting component is located in a magnetic field, which preferably is provided by a permanent magnet.

In this embodiment, the transducer base structure K118 comprises a substantially thick and squat geometry and includes the magnetic assembly of the electromagnetic excitation mechanism. The base structure comprises a base component K105, a permanent magnet K102, outer pole pieces K103 and K104 coupled to the magnet K102 spaced from opposing inner pole pieces K113 located within the cavity of the diaphragm base frame K107 of the diaphragm assembly. The opposing outer and inner pole pieces have opposing surfaces that create a substantially curved or arcuate channel therebetween. An arcuate plate of the diaphragm base frame comprises a surface that corresponds in shape to this arcuate magnetic field channel. One or more coil windings K106 is/are coupled to the diaphragm base frame arcuate plate and extend within the channel in situ. Preferably, in a neutral position the coils are aligned with the location of the corresponding inner and outer poles to enhance cooperation between these components. During operation, each coil winding K106 and part of the base frame K107 reciprocate within this channel, as the remainder of the diaphragm assembly oscillates and pivots about the axis of rotation K119.

Housing

Referring to FIGS. 58A-58H, the audio transducer is shown housed within a surround K301. The surround K301 is enclosed by an outer cap K302. These two parts form the housing K204 for the transducer. The surround and outer cap may be fixedly and rigidly coupled to one another via any suitable method, for example via a snap-fit engagement, adhesive or fasteners K316. The surround K301 includes an inner cap K303 that extends proximal to and over part of the audio transducer to help provide mounting and decoupling of the transducer from the surround K301 (and housing K204). The inner cap K303 may be integrally formed with the surround K301 or otherwise separately formed and fixedly and rigidly coupled to the surround K301 via any suitable method, for example via a snap-fit engagement, adhesive or fasteners K317. The surround comprises a cavity for retaining the transducer therein and is open at both sides of the cavity. On one side, the opening forms an output aperture K325 through which sound propagates from the transducer assembly during operation. Referring to FIG. 59, the output aperture is configured to locate at or adjacent a user's ear K410 when the device is in use. A soft ear pad K309 extends about the periphery of the surround K301 on an opposing side to the outer cap K302 and about the output aperture K325. The soft ear pad K309 comprises a compliant inner K310 that may be formed from any suitable material well known in the art such as a foam material that is comfortable to the user. The inner K310 may be lined with a non-breathable fabric outer layer K311 and also a breathable fabric or mesh inner layer K312. Also, an open meshed fabric K318 may extend over the output aperture K325.

In this embodiment the audio device is configured to apply pressure to the human head K408 and to substantially seal at locations K409 situated beyond the outer part of the ear K410, as is typical for a circumaural headphone. It may also apply pressure to one or more other parts of the head K408 and to the ear K410. Other pad configurations such as but not limited to a supraaural configuration are also possible. The soft ear pad K309 preferably generates a substantial seal about the user's ear to thereby substantially seal a volume of air inside the device from a volume of air K414 external to the device in situ. The ear pad K309 is configured to provide a sufficient seal between a volume of air within a front cavity K406 inside the device, located at or adjacent the user's ear K410 in use, and a volume of air external to the device K414 (such as the surrounding atmosphere). The geometry and/or material used for the pad inner K310 and outer fabric K311 may affect the sufficiency of the seal K409 for example.

A substantial seal is one that is configured to enhance the sound pressure at, at least low bass frequencies (i.e. provide a bass boost) during operation for example. For example, the ear pad may be configured to substantially seal against the user's ear/head in situ to increase sound pressure generated inside the ear (at, at least low bass frequencies) during operation. In some implementation, sound pressure, for example, may increase by an average of at least 2 dB, or more preferably at least 4 dB, or most preferably at least 6 dB, relative to sound pressure generated when the audio device is not creating a sufficient seal in situ. The volume of air enclosed within front cavity K406 may be substantially small to also aid with providing a bass boost during operation.

As mentioned, the device of this embodiment provides a bass boost by substantial sealing of air around the ear from air surrounding the device. In some variations, the ear pad K309 consists of a porous and compressible inner K310 made from a material such as a foam, for example an open-cell foam such as low-resilience polyurethane foam or polyether foam, which is covered by an outer fabric K311 that is substantially non-porous and is located at an exterior periphery of the pad K309 (e.g. facing outward and parts of which are configured to contact the user's head/ears in use). Internal parts of the ear pad K309 that face the interior of the device are either left uncovered or else are covered in an inner fabric K312 that is porous, such that sound waves surrounding the ear are able to propagate inside the porous foam, where their energy may be dissipated to help control internal air resonances.

This also means that air cavity K406 is connected to and thereby extended to comprise the volume of the porous ear pad inner K310. This may result in further benefits including an improvement in passive attenuation of ambient noise, because sound pressure that moves from the surrounding air K414 to air cavity K406, for example via leaks between ear pad K309 and a wearer's head K408 or else via air passages K320, 321, 322 and 324, will take longer to fill a larger air volume K406 that is connected to volume of each pad inner K310.

This variation addresses unwanted mechanical resonances of the transducer, especially of the diaphragm and surround, and provides improved diaphragm excursion and fundamental diaphragm resonance frequency, while simultaneously addressing internal air resonances via damping. Internal air resonances may be addressed in the front cavity K406, the rear cavity K405, and any other cavity contained within or by the device and/or the user's head.

Preferably, the compliant interface/ear pad K309 comprises a permeable fabric K318 covering the output aperture K325. Breathable cotton velour or polyester mesh are examples of suitable materials.

The outer cap K302 is preferably pivotally coupled to a respective end of the headband K206. For example, the outer cap K302 may comprise a pivot screw K308 that is rotatably coupled to a pivot nut K401 of the respective end of the headband K206. This enables the headband position to be adjusted by the user for comfort. Any suitable hinging mechanism may be used. Alternatively, the outer cap K302 may be fixedly coupled to the headband.

Decoupling Mounting System

In this embodiment, the audio transducer is mounted within the surround K301 via a decoupling mounting system. The decoupling mounting system may be any one of the decoupling mounting systems described in section 4 of this specification. For example, the decoupling mounting system may be any one of the systems described in section 4.2 of this specification or it may be another decoupling mounting system designed in accordance with the design principles and considerations set out in section 4.3 of this specification. In this embodiment, a decoupling mounting system similar to that described in section 4.2.1 of this specification in relation to the embodiment A audio transducer is used. The decoupling mounting system is configured to compliantly mount the audio transducer base structure K118 to the surround K301. such that the components are capable of moving relative to one another along at least one translational axis, but preferably along three orthogonal translational axes during operation of the associated transducer. Alternatively, but more preferably in addition to this relative translational movement, the decoupling system compliantly mounts the two components such that they are capable of pivoting relative to one another about at least one rotational axis, but preferably about three orthogonal rotational axes during operation of the associated transducer. In this manner, the decoupling mounting system at least partially alleviates mechanical transmission of vibration between the diaphragm and the surround K301, the inner cap K303 and the outer cap K302.

As shown in FIGS. 58D-58F, the mounting system comprises a pair of decoupling pins K133 extending laterally from either side of the transducer base structure. The decoupling pins K133 are located such that their longitudinal axes substantially coincide with a location of a node axis of the transducer assembly. A node axis is the axis about which the transducer base structure rotates due to reaction and/or resonance forces exhibited during diaphragm oscillation and is described in further detail in section 4 of this specification. In this embodiment the node axis is located at or proximal to the base component K105. The decoupling pins K133 extend substantially orthogonal to a longitudinal axis of the transducer assembly from the sides between the upper and lower major faces of the base structure K118, and are rigidly coupled and/or integral with the base structure K118. A bush K304 is mounted about each pin K133. A washer may also be coupled between the bush and the associated side of the transducer base structure in some configurations. The bushes and washers are herein referred to as "node axis mounts". The node axis mounts are configured to couple corresponding internal sides of the surround K301 via any suitable method, such as the one described under section 4.2.1 or via adhesive for example.

The decoupling mounting system further comprises one or more decoupling pads K305 and K306 located on opposing faces of the transducer base structure K118. The pads K305 and K306 provide an interface between the associate base structure face and a corresponding internal wall/face of the surround K301 (including internal cap K303), to help decouple the components. The decoupling pads are preferably located at a region of the transducer base structure that is distal from the node axis location. For example, they are located at or adjacent an edge, side or end of the base structure K118 that is distal from the diaphragm assembly K101 in this embodiment as the node axis is located close to the diaphragm axis of rotation. Each pad is preferably longitudinal in shape. In the preferred form, each pad K305, K306 comprises a pyramid shaped body having a tapering width along the depth of the body. Preferably the apex of the pyramid is coupled to the associated face of the transducer base structure K118 and the opposing base of the pyramid is configured to couple the associated face of the transducer surround in situ. This orientation may be reversed in some implementations however. It will be appreciated that in alternative embodiments the decoupling mounting system may comprise multiple pads distributed about one or more of the faces of the transducer base structure. Such mounts are herein referred to as "distal mounts".

The node axis mounts and the distal mounts are sufficiently compliant in terms of relative movement between the two components to which they are each attached. For instance, the node axis mounts and the distal mounts may be sufficiently flexible to allow relative movement between the two components they are attached to. They may comprise flexible or resilient members or materials for achieving compliance. The mounts preferably comprise a low Young's modulus relative to at least one but preferably both components they are attached to (for example relative to the transducer base structure and housing of the audio device). The mounts are preferably also sufficiently damped. For instance, the node axis mounts may be made from a substantially flexible plastics material, such as a silicone rubber, and the pads may also be made from a substantially flexible material such as silicone rubber. The pads are preferably formed from a shock and vibration absorbing material, such as a silicone rubber or more preferably a viscoelastic urethane polymer for example. Alternatively, the node axis mounts and/or the distal mounts may be formed from a flexible and/or resilient member such as metal decoupling springs. Other substantially compliant members, elements or mechanisms such as magnetic levitation that comprise a sufficient degree of compliance to movement, to suspend the transducer may also be used in alternative configurations.

In this embodiment, the decoupling system at the node axis mounts has a lower compliance (i.e. is stiffer or forms a stiffer connection between associated parts) relative to the decoupling system at the distal mounts. This may be achieved through the use of different materials, and/or in the case of this embodiment, this is achieved by altering the geometries (such as the shape, form and/or profile) of the node axis mounts relative to the distal mounts. This difference in geometry means that the node axis mounts comprise a larger contact surface area with the base structure and surround relative to the distal mounts, thereby reducing the compliance of the connection between these parts.

A narrow and substantially uniform gap/space K322 is formed between the transducer base structure K118 and the surround/inner cap K301/K303 when the transducer is assembled within the surround. In some embodiments the gap may not be uniform. This narrow gap K322 may extend about at least a substantial portion of the perimeter (and preferably the entire perimeter) of the base structure K118. A width of each air gap defined by the distance between the outer periphery of the transducer base structure K118 and the surround/inner cap K301/K303 is less than 1.5 mm, or more preferably is less than 1 mm, or even more preferably is less than 0.5 mm. These values are exemplary and other values outside this range may also be suitable.

A narrow gap/space K321 exists between a portion or the entire perimeter of the diaphragm assembly K101 and the surround K301.

The audio device further comprises diaphragm excursion stoppers K323 which are also connected to surround K301 or inner cap K303. There may be one or more such stoppers. In situ, there may be one or more (in this example three) stoppers K323 extending longitudinally and substantially uniformly spaced along each face at a region proximal to the diaphragm structure of the surround K301. These stoppers K323 have an angled surface that is positioned to contact the diaphragm in the case of any unusual event, such as if the device is dropped or if a very loud audio signal is presented, that may cause over-excursion of the diaphragm. The angled surface is configured to locate adjacent the diaphragm body in situ, to match the angle of the diaphragm body if the diaphragm is caused to inadvertently rotate to this point. The stoppers K323 are made from a substantially soft material, such as an expanded polystyrene foam, to avoid damaging the diaphragm. The material is preferably relatively softer than that of the diaphragm body for example (e.g. it may be of a relatively lighter density than the polystyrene of which the diaphragm body) to alleviate damage. The stoppers K323 have a large surface area so as to effectively decelerate the diaphragm, but not so large as to block too much air flow and/or create enclosed air cavities that are prone to resonance.

Air Leak Fluid Passages

Each headphone cup K204 may also comprise any form of fluid passage configured to provide a restrictive gases flow path from the first cavity to another volume of air during operation, to help damp resonances and/or moderate base boost. For example, referring to FIGS. 58D, 58E and 59, this device comprises at least one fluid passage that fluidly connects a first, front air cavity K406 configured to locate adjacent a user's ear in situ, with a second, rear air cavity K405 configured to locate distal from the user's ear in situ or with a volume of air K414 that is external to the device. The front air cavity K406 may comprise two cavities K406*a* and K406*b* on either side of the grille mesh/output aperture K318/K325. In this embodiment, the device comprises fluid passages K320, K321 and K322 that fluidly connect the front air cavity K406 on a side of the diaphragm assembly that is configured to locate adjacent and/or to face the output aperture K325 of the surround K301 with the rear cavity K405 on an opposing side of the diaphragm assembly facing away and/or located distal from the output aperture K325 of the surround K301. The surround outer cap K302 has two small holes creating air passages K324 from the rear cavity K405 to the external air K414. These air passages, in combination with the fluid passages K320/K321/K322 fluidly connect the front, rear and external air cavities K406, K405 and K414 such that air that is otherwise sealably retained within front cavity K406 can restrictively flow into the rear cavity K406 cavity and also from the rear cavity to an external volume of air K414, to thereby damp internal air resonances and/or moderate bass boost in use. It is not essential that a separate flow restricting element is used for the passages K320 and K324 to provide a restrictive gases flow path, and the passages may be substantially open with no obstructive barriers and still be restrictive by having a reduced size, diameter and/or width. As will be explained in further detail below, at least one fluid passage K320/K321/K322 is configured to restrict air flow by either having a reduced diameter or width at the junction with the front cavity K406 or by otherwise incorporating a flow restricting element, or both.

In some variations of this embodiment an alternative or additional fluid passage is provided for fluidly connecting the front cavity directly to an external volume of air (similar to passage P105 of embodiment P for example).

At least one fluid passage K320/K321/K322/K324 preferably comprises a fluid flow restrictor. The fluid flow restrictor may comprise, for example, any combination of: an entry or input from the adjacent cavity of reduced size, width or diameter; and/or a fluid flow restricting element or barrier at the entry or within the passage such as a porous or permeable material. For example, the fluid passage may be an entirely open passage having a reduced diameter or width entry. Alternatively, or in addition the fluid passage may comprise a fluid flow restricting element such as a foam barrier or mesh fabric barrier at the entry or within the passage for subjecting gases traversing therethrough to some resistance. The fluid passage may comprise one or more small apertures.

Preferably, the fluid passages K320/K321/K322/K324 also collectively permit the flow of gases therethrough to a sufficient degree such that there is a significant reduction in sound pressure within the ear canal during operation. A significant reduction in sound pressure for example may result in at least 10%, or more preferably at least 25%, or most preferably at least 50% of reduction in sound pressure during operation of the device over a frequency range of 20 Hz to 80 Hz. This reduction of sound is relative to a similar audio device that does not comprise any fluid passages such that there is negligible leakage in sound pressure generated during operation. The significant reduction in sound pressure is preferably observed at least 50% of the time that the audio device is installed in a standard measurement device. Other reductions in sound pressure are also envisaged however and the invention is not intended to be limited to these examples.

In this embodiment, the fluid passages K320, K321 and K322 comprise a reduced width at the junction with the front cavity K406 (and also with the rear cavity K405). The width of the passages may be the same or else different. Each fluid passage K320/K321/K322 is substantially open but is reduced in size relative to the front cavity to thereby reduce any unwanted resonances that might otherwise occur within the air cavity K406 and/or within the air cavity K405.

Each fluid passage may extend anywhere within the device, such as adjacent the periphery of the diaphragm assembly and/or audio transducer assembly or even through an aperture in the diaphragm assembly and/or audio transducer assembly and/or ear pad K309. In this embodiment the passage K321 extends about the periphery of the diaphragm assembly, and in particular the side faces and a terminal face/edge of the diaphragm structure.

In this embodiment, control of air resonances is improved via damping created by the fluid passage air leaks. Also, resonance control, as well as bass level moderation, can be made relatively consistent across different listeners/users and with different device positioning, particularly if the fluid passage leakage provided within the device is significant in comparison to fluid leakage that may occur between the ear pads K309 and the user's head.

In order to damp an air resonance inherent in a cavity such as K405 or K406, an air leak fluid passage should preferably provide sufficient resistance to air flow such as to avoid high air flow rates through the passage which might otherwise effectively connect the cavity to another air cavity or to the surrounding air K414, because this situation is likely to create significant new unwanted resonance modes. If a high air flow does occur then the flow path will preferably contain a resistive element such as a foam plug so that associated resonances decay quickly. An example of such a new resonance mode could be a Helmholtz type resonance involving movement of air within an air fluid passage, which in this scenario constitutes a mass, reciprocating within the passage against a restoring force provided by air contained within a connected cavity, which acts as a compliance.

In order to damp an unwanted air resonance inherent in a cavity such as K405 or K406 an air leak fluid passage preferably also permit sufficient air fluid flow such that there is a significant reduction in the air pressure, at the fluid passage entrance, associated with the mode in question. In general, for this to occur, a passage is preferably not be located at a pressure node associated with the mode in question, otherwise the mode will not drive air through the fluid passage and the resonance will be unaffected. Preferably, for maximum attenuation, an air passage is located at or close to a pressure antinode of an unwanted air resonance mode.

To attenuate a broad spectrum of unwanted air resonance modes within air cavity K406, it is preferable that the air leak fluid passages, such as K320, K321 and K322 are widely distributed across the volume of air cavity K406. This improves the likelihood that, for a given unwanted air resonance within a cavity such as K406, there will be an air leak fluid passage located away from a pressure node and preferably close to a pressure antinode. For example, the air leak fluid passages K320, K321 and K322 collectively extend (and are distributed) across a distance that is close to the maximum dimension across surround component K301. Preferably the air leak fluid passages K320, K321 and K322 collectively extend along a distance greater than a shortest distance across a major face K132 of the diaphragm body, or more preferably along a distance greater than 50% more than the shortest distance across a major face K132 of the diaphragm body, or most preferably along a distance greater than double the shortest distance across a major face K132 of the diaphragm. This helps to achieve more comprehensive damping of more distinct internal air resonances.

In an alternative embodiment air fluid passages are provided from cavity K406 to the outside air K414 via a permeable or porous fabric. An advantage of the configuration of the present invention however, is that fluid passages damping resonance in the cavity K406, which is adjacent to the ear, vent to the rear cavity K405 as opposed to the outside air K414, and this means that passive noise attenuation is improved because ambient noise must pass through the rear cavity K405 in order to move from the outside air K414 to the ear in cavity K406*a*.

Air leak fluid passages K320, K321, K322 and K324 are substantially distributed across the volume of rear air cavity K405. In a manner similar to the case of front cavity K406, this improves the likelihood that, for a given unwanted air resonance within cavity K405, there will be an air leak fluid passage located away from a pressure node and preferably close to a pressure antinode.

5.2.3 Embodiment W

Referring to FIGS. 77A-79, a further embodiment of a personal audio device of the invention (herein referred to as embodiment W), in the form of a headphone apparatus W101 is shown comprising left and right headphone interface devices (hereinafter also referred to as headphone cups) W102 and W103 connected by a headband W104.

Audio Transducer

The audio transducer incorporated in this embodiment is similar to the audio transducer K100 described in section 5.2.2 for the embodiment K device. The description relating to the diaphragm assembly, the hinge assembly, the decoupling mounting system and the transducer base structure and excitation/transducing mechanism in the previous section also apply to this section and embodiment and will not be repeated for the sake of conciseness.

Housing

The audio transducer is shown housed within a surround W201. The surround W201 is substantially enclosed by an outer cap W202. These two parts form the housing for the transducer K100. The surround and outer cap may be fixedly and rigidly coupled to one another via any suitable method, for example via a snap-fit engagement, adhesive or fasteners W216. The surround comprises a cavity W225 for retaining the transducer K100 therein and is open at both sides of the cavity. On one side, the opening forms an output aperture W224 through which sound propagates from the transducer assembly during operation. The output aperture W224 is configured to locate at or adjacent a user's ear W310 when the device is in use. The surround cavity preferably comprises an inner wall that is substantially or approximately complementary to the shape of the outer periphery of the transducer K100. A soft ear pad W210 extends about the periphery of the surround W201 on an opposing side to the outer cap W202 and about the output aperture W224. The soft ear pad may be formed from any suitable material well known in the art such as a foam material that is comfortable to the user. The pad W210 may be lined with a non-breathable fabric layer W211, which faces the ear W310 and outside air W314, and breathable fabric layer W212, which faces the cavity W306. Also, an open meshed fabric may extend over the output aperture W224.

In this embodiment the audio device is configured to apply pressure to the outer part of the ear and/or to one or more parts of the head W308 beyond the ear W310. Additionally, the audio device is configured to apply pressure to one or more parts of the head W308 beyond and/or surrounding the ear W310. The soft ear pad W210 preferably generates a substantial seal about the user's ear to thereby substantially seal a volume of air inside the device from a volume of air W314 external to the device in situ. The ear pad W210 is configured to provide a sufficient seal between a volume of air within a front cavity W306 inside the device, located at or adjacent the user's ear W310 in use, and a volume of air W314 external to the device (such as the surrounding atmosphere). The pad W210 may comprise a body shaped to reside tightly over and about user's ear and seal against this location. In the preferred implementation shown, the device is a circumaural headphone configured to fully surround and enclose the ear in situ.

In the preferred embodiment, the ear pad W210 is configured to sufficiently or substantially seal between the front cavity W306 on the ear side of the device and the volume of air W314 external to the device in situ. As previously mentioned in relation to embodiment k, a substantial seal is one that is configured to enhance the sound pressure at, at least low bass frequencies (i.e. provide a bass boost) during operation for example.

The surround W201 is preferably pivotally coupled to a respective end of the headband W104. For example, the surround W201 of each headphone cup W102 and W103 may be coupled to the respective end of the headband W104 via pivot arms W107. This enables the headband position to be adjusted by the user for comfort. Any suitable hinging mechanism may be used. Alternatively, the headband may be fixedly coupled to the headband. An inner soft pad W108 may be provided on an inner face of the headband W104 for comfort.

In an assembled state, each headphone cup comprises a first, front air cavity W306 located at or adjacent the output aperture W224 on a side of the diaphragm assembly configured to locate adjacent a user's ear W310 in use. The headphone cup further comprises a second, rear cavity W305 configured locate on a side of the diaphragm assembly opposing the output aperture W224 and user's ears in use. The outer cap W202 comprises an opening or grille W226 configured to locate adjacent the audio transducer K100 and rear cavity W305. Preferably, the device further comprises a permeable fabric cover W207 covering the output aperture W224 adjacent the front cavity W306 for allowing sound pressure to traverse from the front cavity toward the user's ear W310 in use and also for protecting the interior of the device from dust and other foreign material. Preferably, the device also comprises a permeable fabric cover W208 covering the rear opening/grille W226 adjacent the rear cavity W305 for allowing sound pressure to traverse from the rear cavity toward to the external air volume W314 in use and also for protecting the interior of the device from dust and other foreign material. Breathable cotton velour or polyester mesh are examples of suitable materials for both fabric covers W208 and W207, but it will be appreciated others may be suitable as is known in the art. In both cases the covers W208 and W207 are preferably highly permeable and provide only minimal resistance to air flow. Cavity W305 is preferably designed to be sufficiently small and compact such that internal resonances occur at high frequencies when said cavity is effectively open to the surrounding outside air W314, so there is minimal benefit to be obtained, in terms of resonance management, from making cover W208 resistive. Cavity W306*b* is effectively combined with cavity W306*a*. These openings W224 and W226 therefore do not form substantially restrictive fluid passages.

The surround W201 has a plurality of radially spaced grille arms W201*a* that form openings in the surround therebetween. The outer cap W202 has a corresponding set of radially spaced grille arms W202*a*, with openings either side of each grille arm that correspond to the openings of the surround. In an assembled state of the cap, the grille arms W201*a* and W202*a* and the openings align to form a grille with multiple openings that are distributed about the housing. In particular the openings are distributed about the periphery of the audio transducer cavity W225. The area and/or volume of these openings is substantially large relative to the size of the size of the cap and/or relative to the volume of air W306*a* contained directly adjacent the ear in situ. The reason for this will be explained in the subsequent section.

A mesh fabric W209 is sandwiched between the outer cap W202 and the surround W201 to cover the openings distributed about the transducer K100. In this embodiment the mesh W209 is a stainless steel cross-weave fabric. The mesh W209 is substantially restrictive and comprises sufficiently low permeability such that it forms a restrictive gases flow path from the front cavity W306 to the air volume W314 external to the device. By adjusting the material properties and geometry of the apertures in the grille and mesh, the restriction to air flow may be altered to optimise the audio performance, for example to optimise the bass response and damp air resonances. Other types of fluid passage restrictions could be substituted, for example breathable cotton velour, paper, polyester mesh, or a solid, perforated sheet of polycarbonate could be used, but it will be appreciated other permeable materials known in the art may also be utilised. As will be described in further detail in the subsequent section, it is preferred that this area of the mesh is relatively large compared to the volume of air W306*a* contained adjacent the ear in situ. The area of the restrictive mesh W209 that divides the front cavity W306*b* from the external volume of air W314 may be approximately 10-20 cm 2 for example, however other sizes are also envisaged depending on the implementation. The area of mesh W209 contributes to the characteristics of the system.

A thin layer of padding W213, located on the opposing side of the surround W201 to the outer cap W202, is configured to locate directly adjacent and/or in contact with the ear W310 in situ. The pad W213 may be formed from any suitable breathable material, such as an open-cell polyurethane foam covered by cotton fabric This helps prevent parts of the plastic surround W201 touching the ear and thereby improves comfort to the user. Again it will be appreciated that other forms and materials for padding may be suitable and utilised in alternative embodiments as is known in the art Air Leak Fluid Passages As mentioned for embodiment K, each headphone cup may also comprise one or more fluid passages configured to provide a restrictive gases flow path from the first cavity W306 to another volume of air during operation, to help damp resonances and/or moderate bass boost. For example, referring to FIGS. 78G and 79, this device comprises at least two fluid passages, at W221 and W209, that fluidly connect a first, front air cavity W306 configured to locate adjacent a user's ear W310 in situ, with a second, rear air cavity W305 configured to locate distal from the user's ear in situ or with a volume of air that is external to the device. In this embodiment, the device comprises a fluid passage W221 about the periphery of the diaphragm assembly that fluidly connects the front air cavity W306 on a side of the diaphragm assembly that is configured to locate adjacent and/or face the output aperture W224 of the surround W201 with the rear cavity W305 on an opposing side of the diaphragm assembly facing away and/or located distal from the output aperture W224 of the surround W201. The fluid passage W221 fluidly connects the front and rear air cavities W306*b* and W305 such that air that is otherwise sealably retained within front cavity W306 can restrictively flow into an external volume, to thereby damp internal resonances and/or moderate bass boost in use.

It is not essential that a separate flow restricting element is used for the passage to provide a restrictive gases flow path, and the passage may be substantially open with no obstructive barriers and still be restrictive by having a reduced size, diameter and/or width.

The fluid flow restrictor may comprise, for example, any combination of: an entry or input from the adjacent cavity of reduced size, width or diameter; and/or a fluid flow restricting element or barrier at the entry or within the passage such as a porous or permeable material. For example, the fluid passage may be an entirely open passage having a reduced diameter or width entry. Alternatively, or in addition the fluid passage may comprise a fluid flow restricting element such as a foam barrier or mesh fabric barrier, such as for example mesh W209 located within grille fluid passage W209, at the entry or within the passage for subjecting gases traversing therethrough to some resistance. The fluid passage may comprise one or more small apertures. In this embodiment, the fluid passage W221 comprises a reduced width at the junction with the front cavity W306*b* (and also with the rear cavity W305). The width of the passages may be the same or as different. The fluid passage W221 is substantially open but is reduced in size relative to the front cavity W306, and it acts to reduce any unwanted resonances that might otherwise occur within this air cavity.

In addition, a fluid passage either side of grille arms W201*a* and W202*a*, covered by mesh W209 of the device may fluidly connect the front air cavity W306*a*/W306*b* with a volume of air that is external to the device W314, e.g. with the external environment. This fluid passage is separate from any leak passage that might exist in practice between ear pad covering W211 and the wearer's head W308 at boundary W309. In this embodiment, a grille or opening is provided at an opposing end of the housing to the front cavity W306*a* (adjacent rear cavity W305) allowing for the passage of air from the front cavity W306*a* to a volume of air external to the device W314. The fluid passage is configured to restrict air flow by the incorporation of a flow restricting element W209. In this embodiment, the fluid passage provides a highly restrictive flow path from the front cavity W306 to the external volume of air. In addition, the cross-sectional area of this gases path is substantially large, especially compared to the size of the diaphragm and/or to the size of the volume of air contained directly adjacent the ear at cavity W306*a*. This configuration allows for a significant improvement in the base response of the device while still allowing for the leakage of air to permit some reduction of sound pressure and damp unwanted resonances. As explained for embodiment K, this area and distribution of restrictive gases flow passages improves the likelihood that, for a given unwanted air resonance within a cavity such as W306, there will be an air leak fluid passage located away from a pressure node and preferably close to a pressure antinode. Preferably, in order to attenuate a broad spectrum of unwanted air resonance modes within air cavity W306, it is preferable that the air leak fluid passages, are widely distributed across the volume of air cavity 306. Fluid passages at W221 and W209 also collectively extend (and are distributed) across a distance that is close to the maximum dimension across surround component W201. This helps to achieve more comprehensive damping of more distinct internal air resonances.

Preferably the air leak fluid passages at W221 and W209 are distributed about the diaphragm body and extend along a substantial distance. For example, the air leak fluid passages W221 and W209 are distributed across a distance greater than a shortest distance across a major face K132 of the diaphragm body, or more preferably along a distance greater than 50% more than the shortest distance across a major face K132 of the diaphragm body, or most preferably along a distance greater than double the shortest distance across a major face K132 of the diaphragm. This wide distribution of fluid passages across the volume of cavity W306 helps to achieve more comprehensive damping of more distinct internal air resonances of cavity W306.

It will be appreciated that in some embodiments either one of the fluid passage W221 or grille fluid passage at W209 may be incorporated to provide for the leakage of air from the otherwise sealed cavity W306.

Preferably, the fluid passages at W208, W209 and W221 also collectively permit the flow of gases therethrough to a sufficient degree that results in a significant reduction in sound pressure within the ear canal cavity during operation. A significant reduction in sound pressure for example may result in an at least 10%, or more preferably at least 25%, or most preferably at least 50% reduction in sound pressure during operation of the device over a frequency range of 20 Hz to 80 Hz. This reduction of sound is relative to a similar audio device that does not comprise any fluid passages such that there is negligible leakage in sound pressure generated during operation. The significant reduction in sound pressure is preferably observed at least 50% of the time that the audio device is installed in a standard measurement device. Other reductions in sound pressure are also envisaged however and the invention is not intended to be limited to these examples.

This embodiment addresses unwanted mechanical resonances of the transducer, especially of the diaphragm and diaphragm suspension, through the use of a substantially unsupported diaphragm periphery and other transducer features. Diaphragm excursion and fundamental diaphragm resonance frequency may also be improved. The high diaphragm excursion and low fundamental diaphragm resonance frequency provided by the unconnected diaphragm periphery design means that a reasonable degree of air leakage can be provided while maintaining sufficient bass response. Resistive air leak fluid passages at W221 and W209 address internal air resonances of the front cavity W306, the rear cavity W305, and any other cavity contained within or by the device and/or the user's head via damping. Also, resonance control, as well as bass level moderation can be made relatively consistent across different listeners/users and with different device positioning. The unconnected diaphragm periphery design also helps to facilitate accurate audio reproduction response due to the absence of a diaphragm surround and associated resonances. Finally, mechanical resonances of the baffle/headphone cup and headband of the headphone are addressed by the decoupling mounting system.

5.2.4 Embodiment X

Referring to FIGS. 80A-80E and 81, a further embodiment of a personal audio device of the invention in the form of an interface device of an earphone apparatus X100 is shown comprising an audio transducer assembly K100 housed within an earphone housing X101-X103. The earphone apparatus may comprise a pair of such interface devices for each ear of the user. The audio transducer K100 is a rotational action transducer the same or similar to that described in relation to embodiment K in section 5.2.2, but may be smaller for example, so will not be described in further detail for the sake of conciseness. The description relating to the diaphragm assembly, the hinge assembly and excitation mechanism in the previous section also apply to this section and embodiment. The description relating to the decoupling mounting system and the transducer base structure may apply in alternative configurations to the X100 configuration. In this embodiment however the transducer base structure is rigidly coupled to the housing/body X101 of the earphone. The body X101 of the earphone therefore forms part of the transducer base structure in this configuration.

This embodiment consists in an earphone based on a rotational action transducer. There is a flexible, for example silicon or rubber or soft foam, plug X104 that is inserted into and seals against the entrance of the ear canal. Air is able to move between the ear canal and the outside air via two paths, firstly being through the diaphragm perimeter air gap X109, and secondly through a dedicated (e.g. 2 mm diameter) vent X114*b*. Behind the driver is a large grill, so there is effectively no or a very small rear chamber and air leaking past the diaphragm goes to the outside. The vent contains a damper, consisting of a small open cell foam slug X107 which provides resistance to air flow within the tube. The presence of the tube and the foam within the tube act to damp acoustic resonance modes of the air cavity system. Preferably, to improve bass performance, the compliant interface creates a seal between the volume of air on the ear canal side of the device and the volume of air on the external side of the device. These features are described in further detail below.

The audio device X100 comprises a surround X102 having a cavity X112 that is substantially complementary in profile to the profile of the audio transducer K100 for retaining the audio transducer therein. The surround X102 is open on both sides of the major faces of the diaphragm assembly. An intermediate cover part X101 of the housing is configured to couple over the surround to substantially enclose the cavity and audio transducer therewithin. The audio transducer may be coupled to the surround cover X101 via a decoupling mounting system similar to that described in section 5.2.2 for example. In this embodiment the audio transducer K100 couples rigidly to both the surround cover X101 and the surround X102.

The surround cover forms part of the transducer base structure. The cover part X101 comprises an opening or grille X115 for allowing sound pressure generated by the transducer to traverse toward an output vent of the device. The device further comprises a third housing part X103 configured to couple over the cover part X101 about or adjacent the opening or grill. The housing part X103 is substantially hollow and comprises a substantially elongate throat cavity X110 leading to a terminal output vent or opening X113. A sound dampener in the form of a porous and/or permeable insert X106 may be located in the throat adjacent the output vent X113 for damping resonances generated within the region during operation. The insert may be made from an open celled foamed material for example. An interface in the form of an ear plug X104 configured to locate within the user's concha X203*b* or against the entrance to the ear canal X201 or inside the ear canal X201 couples the output vent X113 of the housing part X103. The ear plug X104 may comprise a substantially flexible body such that it can sealably fit, for example at locations X204, within a user's ear canal in use as shown in FIG. 81. The plug X104 is preferably also substantially soft to provide the user with comfort. For example, the body may be formed from a soft and flexible plastics material, such as Silicone.

In an assembled state, the device X100 comprises a first, front air cavity X110 on a side of the diaphragm assembly K101 facing the output vent X113, and a second, rear cavity X111 on an opposing side of the diaphragm assembly, facing away from the output vent. An opening X117 in the surround X102 adjacent the rear cavity X111 forms a first fluid passage through which air can leak during operation of the device. The opening X117 may be covered may comprise a porous or permeable cover X105 for restricting the flow/leakage of gases, including air therethrough, but in this embodiment cover X105 is highly permeable so primarily serves as a dust cover and provides little acoustic resistance. The cover X105 may be formed from a highly permeable mesh or foamed material for example. The housing part X103 further comprises a second fluid passage X114 extending adjacent the output opening X113. The plug X104 may couple over the second fluid passage X114. The second fluid passage has two openings X114*a* and X114*b* that connect the ear canal cavity X201 at opening X114*a* to an external volume of air X207 (such as the external environment) at opening X114*b*. The second fluid passage contributes to fluidly connecting the first air cavity X110 with an external volume of air X207, such as the external environment, for providing a second path for the leakage of air. A porous and/or permeable insert X107 may be located within this fluid passage for restricting the flow/leakage therethrough. The insert X107 may be formed from an open celled foamed material for example. This insert X107 preferably comprises relatively low porosity/permeability such that it forms a substantially and sufficiently restrictive gases flow path for damping internal resonances.

As mentioned in section 5.2.2, the audio transducer comprises a diaphragm structure that is substantially free from physical connection with an interior of the surround about a substantial portion of the periphery of the structure. Within this region, there is a gap X109 between the diaphragm assembly K101 and the surround X102. The gap forms a fluid passage between the front cavity X110 and the rear cavity X111 of the device to allow for the leakage of air from the front cavity X110 to the rear cavity X111.

As has been described above, having at least some portion of the diaphragm periphery that is substantially free from physical connection to the housing or baffle or enclosure etc. improves the three-way trade-off between diaphragm excursion, fundamental diaphragm resonance frequency and transducer resonances including diaphragm and suspension resonances.

The presence of the air leak fluid passages X114 and X109 may cause the acoustic resonance behaviour of the ear canal to be more natural, and closer to the open-end tube type of resonance characteristic that occurs when the ear canal is not sealed by an earphone. This may be due to the passages X114 and X109 acting to damp air resonances of the ear canal/transducer acoustic system and/or via a shifting of one or more resonance frequencies exhibited by the system. Changes in the resonance behaviour of the ear canal/transducer acoustic system may adversely and dramatically alter the frequency response of the device and system, as well as the unwanted resonance characteristics as measured in, for example, a waterfall plot. Fluid passages X114 and X109 may also help to mitigate 'occlusion effect'.

Many earphone designs plug and seal the ear canal which boosts volume, particularly at bass frequencies, however the sealing also alters the acoustic characteristics of the ear canal thereby effectively de-calibrating the brain from its ears and adversely affecting subjective audio quality. These designs can also be uncomfortable, may have trouble catering to different ear shapes, block ambient sound, may create new resonances within the ear canal, and act to couple the diaphragm to a volume of internal ear canal air which varies between ears and even between fittings.

The free diaphragm edge of the embodiment shown in FIG. 51B only partially blocks the ear canal, and instead improves the bass response by providing sufficient diaphragm excursion and sufficiently low fundamental diaphragm resonance frequency, which is facilitated by the free-edge diaphragm. This combined with the low-resonance driver characteristics results in a comfortable non-sealing fitting audio device providing wide-bandwidth high-fidelity audio reproduction.

As mentioned for embodiment K, it is preferable that the embodiment X diaphragm assembly comprises a diaphragm structure that is of a substantially thick and rigid configuration as described under section 2.2 for the configuration R1 to R4 diaphragm structures.

The surround X102, surround cover X101 and housing part X103 may all collectively form the housing body. Since there is no driver decoupling mounting system in embodiment X these components also comprise a part of the transducer base structure. It will be appreciated that these parts may be formed separately and rigidly coupled to one another at their peripheries via any suitable fixing mechanism, such as using adhesive, snap-fit engagements and/or fasteners as is well known in the art. Alternatively, some or all of these parts may be formed integrally.

As shown in FIG. 81, the ear plug X104 is configured to reside snuggly within the user's concha X203*b* and/or the entrance to the ear canal X201 and/or within the ear canal X201 to thereby substantially seal against the walls of the concha or ear canal at regions X204 in use. The ear plug X104 is configured to provide a sufficient seal between a volume of air within a front cavity X110 inside the device, located at or adjacent the user's ear canal or concha in use, and a volume of air external to the device (such as the surrounding environment), to substantially prevent the leakage of air from adjacent the walls X204 of the ear canal in situ. The geometry and/or material used for the ear plug X104 may affect the sufficiency of the seal for example.

A substantial seal is one that is configured to enhance the sound pressure at, at least low bass frequencies (i.e. provide a bass boost) during operation for example as previously mentioned in the preceding sections The audio device X100 further comprises at least one fluid passage configured to provide a substantially restrictive gases flow path from the first cavity X110 to another volume of air during operation, to help damp resonances and/or moderate bass boost. In this embodiment, the device comprises two such fluid passages however it will be appreciated that in alternative configurations any one or more of these passages may be incorporated. The fluid passage X109 fluidly connects the front and rear air cavities X110 and X111 such that air that is otherwise sealably retained within cavity X110 can restrictively flow into an external volume, to thereby dampen internal resonances and/or moderate bass boost in use. It is not essential that a separate flow restricting element is used for the passage to provide a restrictive gases flow path, and the passage may be substantially open with no obstructive barriers and still be restrictive by having a reduced size, diameter or width. This fluid passage X109 is configured to restrict air flow by having a reduced width at the junction with the front cavity X110.

The fluid passage X114 fluidly connects the front air cavity X110 with an external volume of air X207 such as the surrounding environment and is located adjacent the output vent X113 of the device. The fluid passage is configured to substantially restrict air flow by having a reduced diameter or width and by incorporating a flow restricting element X107 such as a foam insert for subjecting gases traversing therethrough to some resistance. This insert preferably comprises substantially low permeability.

Each fluid passage allows air to escape from the first cavity X110 adjacent the user's ear or head during operation without passing between the user's ear canal wall X204 and the audio device, thereby affecting the seal. This means that the fluid passage resistance and fluid passage location are relatively consistent compared to the case where there is no fluid passage, or a very small air fluid passage, in which case the degree of sealing of the device at locations X204, and therefore also the performance, may vary greatly between different users and different fittings of the device.

As previously mentioned in the preceding sections, preferably the fluid passages X114, X109 and X105 of the transducer collectively permit the flow of gases therethrough to a sufficient degree such that they result in a significant reduction in sound pressure within the ear canal cavity during operation. A significant reduction in sound pressure for example may result in an at least 10%, or more preferably at least 25%, or most preferably at least 50% reduction in sound pressure during operation of the device over a frequency range of 20 Hz to 80 Hz. This reduction of sound is relative to a similar audio device that does not comprise any fluid passages such that there is negligible leakage in sound pressure generated during operation. The significant reduction in sound pressure is preferably observed at least 50% of the time that the audio device is installed in a standard measurement device. Other reductions in sound pressure are also envisaged however and the invention is not intended to be limited to these examples.

In this embodiment, control of air resonances is improved via damping created by the fluid passage air leaks. Also, resonance control, as well as bass level moderation can be made relatively consistent across different listeners/users and with different device positioning. Edges that move significantly, for example the three sides of the diaphragm structure located away from the hinge mechanism, are unattached to the housing/surround. This diaphragm suspension provides a low fundamental diaphragm resonance frequency and high diaphragm excursion, while the fact that the hinge mechanism is effective at resisting translational displacements helps to facilitate good high frequency performance.

The audio transducer of this embodiment provides low energy storage, resulting in a waterfall plot similar to that described in relation to the embodiment A audio transducer (see FIG. 49 for example).

5.2.5 Embodiment Y

Referring to FIGS. 82A-85, a further embodiment of a personal audio device of the invention (herein referred to as embodiment Y), in the form of a headphone Y101 is shown comprising left and right side interface devices (hereinafter also referred to as headphone cups) Y102 and Y103 connected by a headband Y104.

Audio Transducer

The audio transducer Y200 incorporated in this embodiment is a linear action audio transducer similar to that described in section 5.2.1 in relation to the embodiment P personal audio device. Referring to FIGS. 83E-83H, the audio transducer Y200 comprises a diaphragm assembly Y217 that is the same or similar to the assembly P110 of embodiment P audio device, having a substantially rigid and domed diaphragm body with a diaphragm base frame comprising former Y222 extending from the periphery of the body. The diaphragm base frame also comprises centring guides Y223*a*, Y223*b* and Y223*c* coupled to the former. The diaphragm assembly Y217 is supported in position relative to a magnetic structure by ferromagnetic fluid Y220*a*-*d*. Two force transferring component forms part of the transducing mechanism and comprise coil windings Y221*a* and Y221*b*. Centring guides Y223*a*-*c* couple the former to help maintain the longitudinal position of the coils Y221*a* and Y221*b* in an equivalent manner to that described for embodiment P. The magnetic structure forms the other part of the excitation mechanism and includes a permanent magnet Y219 with inner pole pieces Y218*a* and Y218*b* coupled to either pole of the magnet and outer pole piece Y218*c* spaced therefrom. The force transferring components Y221*a* and Y221*b* of the diaphragm assembly extend through the gaps formed between the outer and inner pole pieces of the magnetic structure and coincide with the gaps when the diaphragm assembly is in the neutral/at-rest position. The gaps or spaces between the outer and inner pole pieces comprises ferromagnetic fluid that supports and centres the force transferring component therewithin. The magnetic structure forms part of the transducer base structure and is rigidly coupled to major body/surround Y224 of the transducer base structure configured to surround the diaphragm assembly and excitation mechanism. The surround Y224 may comprise channels that are aligned with the channel formed between the outer and inner pole pieces for the force transferring component to extend through as it reciprocates during operation. The diaphragm assembly comprises an outer periphery that is substantially free from physical connection with any surrounding structure including the transducer base structure.

Decoupling Mounting System

Each audio transducer Y200 is coupled to a base Y202 of the respective cup Y102/Y103. The audio transducer Y200 may be compliantly coupled and suspended relative to the base Y202 via a decoupling mounting system. It will be appreciated that any decoupling mounting system described under section 4.2 of this specification may be used (such as the one described in relation to the embodiment U audio transducer for example), or otherwise any mounting system designed in accordance with the design considerations and principles of section 4.3 may be used.

For example in this embodiment, the audio transducer Y200 is coupled to the base via a substantially flexible annular decoupling ring Y204 and a decoupling block Y203. An inner wall of the decoupling ring Y204 locates and is rigidly coupled about an outer peripheral wall of the surround Y224 of the transducer Y200, and an outer wall of the decoupling ring Y204 locates and rigidly couples an inner wall of a complementary cavity or aperture Y211 formed in the base Y202. The decoupling ring Y204 is substantially compliant and therefore is formed from a substantially flexible and/or resilient material and/or comprises a substantially flexible and/or resilient geometry. In this embodiment, the inner wall of the ring Y204 comprises a flexible, tapered section configured to couple against the surround of the transducer. It will be appreciated the tapered section may couple the base Y202 instead in alternative embodiments. The decoupling ring Y204 is rigidly coupled to the surround Y224 and base Y202 via any suitable mechanism, such as using adhesive.

The decoupling block Y203 is also compliant and formed from a substantially flexible material. The decoupling block Y203 compliantly couples the surround Y224 to a cap Y201 of the respective cup. The decoupling block Y203 may couple at either end within respective apertures formed in an end, outer face of the surround Y224 and an inner face of the cap Y201. The decoupling block Y203 is rigidly coupled at either end to the surround and cap via any suitable mechanism, for example by using an adhesive.

In this embodiment, the decoupling ring Y204 and block Y203 are made from silicone rubber, with a Young's modulus of approximately 2 MPa for example. Alternative many other materials and geometries are also acceptable, for example resilient steel flat springs, foam and the like.

Housing

The housing of headphone cup comprises the base Y202 and the cap Y201. Together they form a hollow interior within which the transducer Y200 is coupled via the decoupling mounting system described above. The base Y202 and cap Y201 are fixedly coupled at their peripheries via any suitable fixing mechanism, in this case via screw fasteners Y216, but alternatively snap-fit engagements and/or adhesive may be utilised. The base Y202 comprises a central aperture Y211 configured to align with the diaphragm assembly of the audio transducer in the assembled state, and thus provide an output aperture Y226 through which sound propagates from the transducer assembly during operation. A soft ear pad Y109 extends about the periphery of the base Y202 on an opposing side to the outer cap Y201 and about the central output aperture Y226. The soft ear pad may be formed from any suitable material well known in the art such as a foam material that is comfortable to the user. The pad Y109 may be lined with a non-breathable fabric layer Y109*b*. Also, an open meshed fabric Y109*c* may extend over the output aperture. Other layers of material and/or fabric may be applied which increase fluid resistance, for example the inner face of the ear pad Y109 may be lined with a porous or permeable material Y109*c*, and a comfort pad Y213 may be situated facing the ear Y403. It will be appreciated some these may be optional and depend on the desired implementation.

Referring to FIG. 85, in this embodiment headphone cup of the audio device is configured to apply pressure to the outer part of the ear Y403 and/or to one or more parts of the head beyond the ear. The interface, including the soft ear pad inner Y109*a* and surround layer of fabric Y109*b* preferably generates a seal about the user's ear to thereby substantially seal a volume of air inside the device from a volume of air Y408 external to the device in situ. The interface/ear pad Y109 is configured to provide a sufficient seal between a volume of air within a front cavity Y205*a/b* inside the device, located at or adjacent the user's ear in use, and a volume of air Y408 external to the device (such as the surrounding atmosphere). The pad Y109 may comprise a body shaped to reside tightly over and about user's ear or pinna Y403 and seal against this location. For example, the headphone cup and interface pad may be a supra-aural type configured to press against the user's ears in use.

As previously mentioned in relation to embodiment k, a substantial seal is one that is configured to enhance the sound pressure at, at least low bass frequencies (i.e. provide a bass boost) during operation for example.

In an assembled state, each headphone cup comprises a first, front air cavity Y205*a/b* located at or adjacent the output aperture on a side of the diaphragm assembly configured to locate adjacent a user's ear in use. The headphone cup further comprises a second, rear cavity Y206 configured located on a side of the diaphragm assembly opposing the output aperture and user's ears in use. The outer cap Y201 comprises one or more apertures or slits Y215 located adjacent the rear cavity Y206 for air to leak through during operation. Preferably, the device further comprises a porous fabric cover Y207 covering the output aperture adjacent the front cavity Y205*a/b* for allowing sound pressure to traverse from the front cavity toward the user's ear in use. Another porous fabric cover Y209 extends over an annular opening or radially distributed series of openings Y210 surrounding the central output aperture. The porous fabric cover Y207 is preferably comprises a substantially high degree of permeability such that it does not significantly restrict the flow of gases therethrough. On the other hand the fabric cover Y209 preferably comprises a relatively low degree of permeability such that it does sufficiently restrict the flow of gases therethrough. For both cover Y207 and Y209, finely woven steel mesh, breathable cotton velour or polyester mesh are examples of suitable materials with the degree of permeability being chosen or adjusted as necessary. It will be appreciated other materials may alternatively be used as is known in the art.

The area and/or volume of the radially distributed openings Y210 and corresponding mesh Y209, is substantially large relative to the size of the cap and/or relative to the volume of air W306*a* contained directly adjacent the ear in situ.

Referring to FIGS. 82A-82C, the outer cap and/or base of each cup is preferably pivotally coupled to a respective end of the headband Y104. For example, the outer cap Y201 of each cup Y102, Y103 may be coupled to the respective end of the headband Y104 via pivot arms Y107. This enables the headband position to be adjusted by the user for comfort. Any suitable hinging mechanism may be used. Alternatively, the headband may be fixedly coupled to the headband. An inner soft pad may be provided on an inner face of the headband for comfort.

Air Leak Fluid Passages

As mentioned for embodiment K, each headphone cup may also comprise one or more fluid passages configured to provide a restrictive gases flow path from the front air cavity Y205 to another volume of air during operation, to help damp resonances and/or moderate bass boost. For example, referring to FIG. 85, this device comprises at least one fluid passage that fluidly connects a first, front air cavity Y205*a/b* configured to locate adjacent a user's ear in situ, with a volume of air Y408 external to the device. The fluid passage fluidly connects the front cavity Y205*a/b* with the rear cavity Y206 and further fluidly connects the rear cavity Y206 with a volume of air Y408 external to the device via a restrictive flow path. In this embodiment, the device comprises a fluid passage that traverses from the front cavity portion Y205*a*, through a highly porous fabric layer Y207 and the output aperture Y226 to the front cavity portion Y205*b* next to the ear Y403. The front cavity part Y205*b* is fluidly connected with the rear cavity Y206 via a substantially resistive element Y209 at openings Y210. The rear cavity Y206 is also fluidly connected, though the one or more relatively narrow and resistive openings Y215, into the external volume of air Y408. The porous fabric layer Y209 located in large the fluid passage, as well as the narrow openings Y215 act as fluid flow restrictors. It will be appreciated that any one or more of these elements may exist in the fluid passage to provide a restrictive flow path from the front cavity Y205*a/b* to the external volume of air Y408.

Preferably the air leak fluid passage Y210 is distributed about the diaphragm body and extends along a substantial distance. For example, the air leak fluid passage Y210 extends along a distance greater than a shortest distance across a major face of the diaphragm body, or more preferably along a distance greater than 50% more than the shortest distance across a major face of the diaphragm body, or most preferably along a distance greater than double the shortest distance across a major face of the diaphragm. As mentioned earlier, the radially distributed openings Y210 preferably also comprise a cross-sectional area that is substantially large relative to the volume of air in front cavity part Y205*b* adjacent the user's ear, in situ. This helps to achieve more comprehensive damping of more distinct internal air resonances.

In this embodiment, the fluid passages Y215 comprise a reduced width at the junction with the rear cavity Y206. The fluid passage Y210 also comprises a flow restricting element in the form of a finely woven steel mesh Y209, for example configured to permit the flow of gases, including air, through the passage but with a sufficient degree of resistance.

Preferably the fluid passages, including the passage through restrictive element Y209 and the passage through aperture Y215, collectively permit the flow of gases therethrough to a sufficient degree that results in a significant reduction in sound pressure within the ear canal cavity during operation. A significant reduction in sound pressure for example may result in an at least 10%, or more preferably at least 25%, or most preferably at least 50% reduction in sound pressure during operation of the device over a frequency range of 20 Hz to 80 Hz. This reduction of sound is relative to a similar audio device that does not comprise any fluid passages such that there is negligible leakage in sound pressure generated during operation. The significant reduction in sound pressure is preferably observed at least 50% of the time that the audio device is installed in a standard measurement device. Other reductions in sound pressure are also envisaged however and the invention is not intended to be limited to these examples.

This variation addresses unwanted mechanical resonances of the transducer, especially of the diaphragm and diaphragm suspension, through the use of a substantially unsupported diaphragm periphery and other transducer features. Diaphragm excursion and fundamental diaphragm resonance frequency may also be improved. Mechanical resonances of the baffle/ear cup and headband of the headphone are addressed by the decoupling mounting system. Resistive fluid passages address internal air resonances of the front cavity Y205*a/b*, the rear cavity Y206, and any other cavity contained within or by the device and/or the user's head.

Control of air resonances is improved via damping created by the large fluid passage air leaks Y210, in the case of resonances of the front cavity Y205*a/b* and rear cavity Y206, and narrow fluid passages Y215, in the case of rear cavity Y206. The wide dispersion of large fluid passages Y210 across the volumes of both front Y205*a/b* and rear Y206 cavities helps to attenuate a broad range of the various internal air resonance modes of both cavities. Also, resonance control, as well as bass level moderation can be made relatively consistent across different listeners/users and with different device positioning.

Additionally, internal parts of the ear pad Y109*a* that face the interior of the device are either left uncovered or else are covered in an inner fabric 109*c* that is porous, such that sound waves surrounding the ear in cavity Y205*a/b* are able to propagate inside the porous foam, where their energy may be dissipated due to the movement of air through the fine openings within the foam to help attenuate internal air resonances of cavity Y205*a/b*.

This also means that air cavity Y205*a/b* is connected to and thereby extended to comprise the volume of the porous ear pad inner Y109*a*. This may result in further benefits including an improvement in passive attenuation of ambient noise, because sound pressure that moves from the surrounding air Y408 to air cavity Y205*a/b*, for example via fluid leaks between ear pad Y109 and a wearer's ear Y403 at locations Y407, or else via fluid passages Y215 and Y210, will take longer to fill a larger volume Y205*a/b* that is connected to volume Y109*a*.

5.2.6 Embodiment G9

In one embodiment of a personal audio device, such as a headphone system comprising a pair of interface devices, each interface device incorporates an audio transducer as per embodiment G9 described in section 2.3 of this specification. The headphone system may comprise the same or similar construction to embodiments K, W or Y for example but with the audio transducer substituted for that of embodiment G9.

In terms of the mechanical properties of the transducer:

The thick, rigid-design-approach diaphragm is compact and provides excellent high-frequency extension;

The fact that the diaphragm suspension is concentrated into springs rather than distributed around the entire perimeter means the springs are relatively robust against internal resonance without a corresponding sacrifice in either diaphragm fundamental resonance frequency or in diaphragm excursion; and When internal suspension resonances do eventually present the springs have minimal surface area and so distortion does not easily radiate to a listener.

5.2.7 Embodiment H

FIGS. 50A and 50B show a further embodiment of the present invention being treble and bass audio transducers deployed in each side of a compact 2-way circumaural headphone apparatus. FIG. 50B shows both audio transducers H301 and H302, in position in front of the right ear with the rest of the headphone interface device hidden, and FIG. 50A shows the entire headphone interface device.

In this embodiment, the embodiment A audio transducer has been deployed in the headphones. It will be appreciated in alternative configurations any one of the other audio transducer embodiments described herein may be incorporated in the headphones.

In this embodiment air in the vicinity of the ear is not sealed off from the outside air to improve bass, and instead the two drivers are mounted in a small baffle separating "positive" sound pressure emanating directly towards the ear canal from "negative" sound pressure emanating to the outside. The negative air pressure emanating from the side of the baffle facing away from the ear is able to expand into an increasing air volume as it radiates outwards with a somewhat semi-hemispherical pattern. This means that there is a corresponding reduction in sound pressure as the wave propagates. This reduction means that by the time the negative sound pressure travels around the baffle and reaches the ear drum, the pressure is sufficiently reduced such that it does not strongly cancel the "positive" sound pressure emanating from the side of the baffle facing the ear, even at low bass frequencies.

A relatively high bass response is possible despite the lack of a seal around the ear, due to the high diaphragm volume excursion capability of the embodiments of the present invention. For example, in the application of a personal audio device such as a headphone a diaphragm excursion of approximately 15-25 mm peak to peak can be achieved without significantly affecting the size of the device. Also, low fundamental resonance frequencies are also possible as previously described in relation to embodiment A. The waterfall plot measurement of the driver is shown in FIG. 49.

5.2.8 Possible Implementations, Modifications or Variations

Audio Transducer

In each of the audio device embodiments described in sections 5.2.1-5.2.7, any one or more audio transducers may be substituted for any one or more audio transducers described herein, including the audio transducers of embodiments A, B, D, E, G, S, T and U, for example, or any other audio transducer designed in accordance with the features described in this specification.

Mounting System

The low-resonance audio device embodiments of the present invention are useful in high-fidelity audio applications. High fidelity audio delivered in close proximity to a user's ear is preferably delivered from a well-designed and consistent location, and for this reason it is advantageous if the audio device comprises a user interface mounting system, such as the pads and ear plugs described in the above embodiments, that dispose the audio transducer at or close to a user's ear or ears. If the audio device is an earphone apparatus then it is more preferable still that the interface mounting system locates the audio transducer relative to a user's ear canal.

Multiple Channels

For high-fidelity audio reproduction it is also preferable that at least two or more audio channels are reproduced (stereo, or multi-channel) in order to provide the listener with a degree of spatial information representing the original audio. These channels should preferably be reproduced independently via different audio transducers, however there are also other forms of audio reproduction where the channels are not completely independent and yet which provide such spatial information. For example 'cross-talk' may be introduced between channels in any one of the above described embodiments. Preferably, however, the audio devices of embodiments H, P, K, W, Y and X comprise at least two different audio transducers which reproduce different (yet related) audio material, and more preferably the channels are independent. For example, the audio transducer associated with each ear may reproduce a different channel.

FRO and Number of Transducers

Sufficient bandwidth is a perquisite of high-fidelity audio reproduction.

Preferably the audio device of any one of embodiments H3, H4, G9, P, K, W, Y and X comprises at least one audio transducer having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz.

When the audio signal is reproduced by multiple audio transducers operating at different bandwidths then preferably an electrical crossover or equivalent means to separate the audio signal into sub-bands to be reproduced by the different transducers is also incorporated. Such audio separation may be detrimental to the quality of audio reproduction, so preferably the audio device comprises no more than three audio transducers for each ear collectively having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz. More preferably the audio device comprises no more than two audio transducers for each ear collectively having a FRO that includes the frequency band from 160 Hz to 6 kHz, or more preferably including the frequency band from 120 Hz to 8 kHz, or more preferably including the frequency band from 100 Hz to 10 kHz, or even more preferably including the frequency band from 80 Hz to 12 kHz, or most preferably including the frequency band from 60 Hz to 14 kHz. Most preferably the audio device has only one audio transducer for each ear.

As noted above, audio devices incorporating a diaphragm assembly that is significantly or substantially free from physical connection with an interior of a surround are well suited to achieving high quality audio reproduction over such wide bandwidths.

Additionally, to aid the quality of sound reproduction, it is preferable that the FRO is reproduced without a sustained drop in sound pressure greater than 20 dB, or more preferably greater than 14 dB, or even more preferably greater than 10 dB, or most preferably greater than 6 dB, relative to the 'Diffuse Field' reference suggested by Hammershoi and Moller in 2008, other than in the frequency range from 2-4 kHz where many personal audio devices have relatively reduced output compared to this reference.

It is also preferable that the operational frequency bandwidth is reproduced without a drop in sound pressure at the extremities of the bandwidth that is greater than 20 dB, or more preferably greater than 14 dB, or even more preferably greater than 10 dB, or most preferably greater than 6 dB, relative to the 'Diffuse Field' reference suggested by Hammershoi and Moller in 2008.

It will be appreciated that when the audio device comprises multiple audio transducers, preferably at least one transducer, and most preferably all transducers, is/are the same or similar to those described above in relation to the embodiments H3, H4, G9, K, P, W, Y and X audio devices. Other audio transducers herein described may alternatively or in addition be used, including for example any one or more of the audio transducers of embodiments A, B, E, D, G, S, T and U. In other words, any one of the audio devices described in the above embodiments may comprise any other type of audio transducer incorporated therein, in a multiple transducer per ear configuration.

Non-Sealing Variations

In the above described embodiments of sections 5.2.2-5.2.7, the audio devices are designed to substantially seal at or about the user's ear or ears in situ. In some variations of these embodiments, for example in the cases of the embodiments shown in FIGS. 50A-50B and 51A-51B, the audio devices are designed such that they do not substantially seal at or about the user's ear or ears in situ. Designs that do not substantially seal are less likely to alter the ear's acoustic and/or resonance characteristics. Also, non-sealing designs may be more comfortable to the user. This is particularly so for earphone applications, where the interface is configured to reside within or directly adjacent the ear canal, such as the embodiments P and X audio devices.

With non-sealing designs, there is generally an increased requirement for diaphragm excursion and low fundamental resonance frequency which is achieved by the configurations of the above described audio devices.

The audio devices may therefore alternatively comprise a partial seal between air contained within the ear canal and air outside of the ear canal in use, and which does not provide a substantially continuous seal around the periphery of the opening of the user's pinna, head or ear canal in situ. For example, the interface may not impart a substantially continuous pressure against the periphery of the opening of the user's ear canal, or pinna or head in situ.

The degree of sealing is preferably not too small that the bass response is insufficient. For example, at least one interface of the device may partially seal in situ such that passive attenuation of ambient sound at 70 Hertz that is less than 1 decibel (dB), or less than 2 dB, or less than 3 dB or less than 6 dB. Alternatively, or in addition, the at least one interface may partially seal in situ to a degree that causes passive attenuation of ambient sound at 120 Hertz that is less than 1 decibel (dB), or less than 2 dB, or less than 3 dB or less than 6 dB. Alternatively, or in addition at least one interface may partially seal in situ to a degree that causes passive attenuation of ambient sound at 400 Hertz that is less than 1 decibel (dB), or less than 2 dB, or less than 3 dB or less than 6 dB.

Free Periphery Variation

In the personal audio devices of embodiments H3, H4, X, W and K described above, the rotational action audio transducers comprise a diaphragm assembly that is free from physical connection at the periphery with a surround or enclosure. A variation on this configuration that may be incorporated in each of these embodiments is an audio transducer having a diaphragm assembly that is suspended relative to the support via a conventional type suspension (such as a flexible spider or other similar support) attached at the diaphragm assembly periphery, but that is not connected to a terminal region of the diaphragm body where displacements of the diaphragm body are maximal as the diaphragm oscillates during operation. The length of the terminal region may still be for example at least 20% of the total combined length of the outer periphery of the diaphragm assembly (or it may be less in some implementations).

Although it somewhat limits diaphragm excursion and fundamental resonance frequency, the conventional suspension may improve the degree of sealing in order to enhance bass response.

The fact that the suspension is missing from the terminal edge region that undergoes maximal displacement permits some degree of air leakage that provides optimal bass response for the particular configuration. Preferably the conventional surround is only present at an absolute minimum length of the diaphragm periphery subject to provision of sufficient bass response, with surround suspension being attached at periphery regions of the diaphragm assembly that move the least during operation.

The fact that the suspension is missing from a portion of the moving periphery, and especially from the portion that undergoes maximal displacement, permits an increase in the stiffness of the remaining suspension located at the periphery, which in turn permits an improvement in the other three-way compromise elements of diaphragm excursion and surround resonances.

Cellular Phone Implementation

The above described personal audio device embodiments may be implemented in a mobile phone or other personal digital assistant type device.

In this type of implementation, extended bandwidth capability in the bass region provided by the audio transducer configurations also means that the same audio transducer may be able to be used for other device functions other than audio reproduction, for example for vibration alert.

6. Preferred Transducer Base Structure Design

In each of the audio transducer embodiments described in this specification, in order for them to provide relatively low-energy-storage performance the transducer base structure, being the component or assembly from which the diaphragm assembly is supported and excited, preferably itself has few resonance modes, or more preferably no-resonance modes, within the transducer's FRO.

The transducer base structure is preferably constructed from rigid materials that have a relatively squat and compact geometry, meaning that no dimension is significantly larger than any other dimension of the structure. Slender geometries are more compact, however they are also more prone to resonance so they are not preferred for the embodiments of this invention, although not excluded from the scope of the invention.

If the transducer base structure is rigidly attached to other components, for example a baffle, enclosure, housing or any other surround, then preferably the entire structure (herein referred to as the "transducer base structure assembly") should also be constructed from rigid materials and have a squat and compact geometry.

It is also preferable that, so far as is possible, the base structure assembly does not obstruct the air flow on either side of the diaphragm and does not contribute to containment of an air volume which may in turn result in an air resonance mode.

The transducer base structure preferably also has a high mass compared to the diaphragm assembly, so that diaphragm displacement is large compared to that of the transducer base structure. Preferably the mass of the transducer base structure is greater than 10 times, or more preferably greater than 20 times the mass of the diaphragm assembly.

Preferably, at least one key structural component of the base structure assembly, other than any magnets, is made from a material having high specific modulus, for example from a metal such as, but not limited to, aluminium or magnesium, or from a ceramic such as glass, in order to minimise susceptibility to resonance.

The components of which the base structure assembly is comprised may be connected together by an adhering agent such as epoxy, or by welding, or by clamping using fasteners, or by a number of other methods. Welding and soldering provides a strong and rigid connection over a wide area and hence is preferable, particularly if the geometries are more slender and therefore prone to resonance.

FIGS. 1A-1F for example show an audio transducer embodiment, herein referred to as embodiment A, having a rigid and relatively light weight composite diaphragm assembly A101 rotatably coupled to a rigid transducer base structure A115.

The transducer base structure A115 comprises a permanent magnet A102, pole pieces A103 and A104, a contact bar A105 and decoupling pins A107 and A108. All parts of the transducer base structure A115 may be connected using an adhesive agent, for example epoxy adhesive, or alternatively via any rigid coupling mechanism such as via welding, clamping and/or fasteners.

The transducer base structure A115 is designed to be rigid so that any resonant modes that it has preferably occur outside of the transducer's FRO. The thick, squat and compact geometry of the transducer base structure A115 provides this embodiment with an advantage over conventional transducers having a transducer base structure consisting of a basket attached to a magnet and pole pieces.

In a conventional audio transducer, such as the one shown in FIGS. 55A and 55B, the basket J113 has to link the relatively heavy mass of the magnet J116, top pole piece J118 and T-yoke J117 to the part of the basket that supports the flexible diaphragm suspension—the surround J105. The geometry of the transducer is restricted by the fact that the surround must be located a significant distance away from the magnet J116 and spider J119, This makes it difficult to provide a compact and squat geometry of transducer base structure, for a given size of the diaphragm cone J101. The thin, non-compact, non-squat geometry and location of conventional basket designs makes them prone to resonance.

Conventional surrounds often also contain one or more air pockets between the diaphragm and the enclosure or baffle thereby creating air resonance modes.

The same or similar transducer base structures or base structure assemblies are utilised in the other audio transducer embodiments of this invention.

7. Transducing Mechanism

In each of the audio transducer embodiments described in this specification, the audio transducer incorporates a transducing mechanism. In the case of the preferred electroacoustic implementation (e.g. loudspeaker), the associated transducing mechanism of each embodiment is configured to receive an electrical audio signal and by action of a force transferring component applies an excitation action force on the diaphragm assembly in response to the signal. During operation, an associated reaction force is typically also exhibited by the associated transducer base structure. In the case of the alternative acoustoelectric implementation (e.g. microphone) the transducing mechanism of each embodiment is configured to receive a force generated by the diaphragm assembly moving in response to sound waves, and by action of the force transferring component the movement is converted into an electrical audio signal.

The transducing mechanism thus comprises a force transferring component. Most preferably this part of the transducer is rigidly connected to the diaphragm structure or assembly, since this configuration tends to be more optimal for creation of a more accurately single-degree-of-freedom system thereby minimising unwanted resonance modes.

Alternatively the force transferring component is rigidly connected to the diaphragm via one or more intermediate components, and the force transferring component is in close proximity to the diaphragm body or structure in order to improve the rigidity of the combined structure and so that adverse resonance modes associated with those couplings are pushed higher in frequency. Preferably the distance between the force transferring component and the diaphragm structure or body in any one of the above embodiments is less than 75% of the maximum dimension of a major face (such as the length, but could alternatively be the width) of the diaphragm structure or body. More preferably the distance is less than 50%, even more preferably less than 35% or yet more preferably less than 25% of the maximum dimension of the diaphragm body or structure.

Preferably the connecting structure has a Young's modulus of greater than 8 GPa, or more preferably higher than approximately 20 GPa, again, to help ensure rigidity of the structure.

Electromagnetic excitation mechanisms comprising a magnetic field generating structure and an electrically conductive coil or element are highly linear. They are therefore a preferred form of transducing/excitation mechanism to be used with each of the above described embodiments of the present invention. They provide an advantage when used in combination with resonance-control features of the present invention, being that the quality of audio reproduction is maximised via a linear motor combined with a substantially resonance-free structure. Preferably the coil is fixed on the diaphragm side, since coils can be made to be lightweight and hence can less detrimental to diaphragm break-up resonances. Coil and magnet-based motors also provide high power handling, and they can be made to be robust.

Other excitation mechanisms may work well, depending upon the application, for example, a piezoelectric or a magnetostrictive transducing mechanism and these could alternatively be incorporated in any one of the embodiments of the present invention. Piezoelectric motors can be effective when used in combination with pure hinge systems and/or rigid diaphragm features according to the present invention, for example. In rotational action transducers, such as those described in relation to embodiments A, B, D, E, K, S, T, W and X, such transducing mechanisms can be located close to the axis of rotation where the usual low excursion disadvantage of piezoelectric devices is mitigated by the fact that a small excursion near the base causes a large excursion towards the diaphragm distal periphery or tip. Additionally, piezoelectric motors may be inherently resonance-free to a high degree, and lightweight, which means that there is reduced load on the diaphragm which might otherwise accentuate diaphragm resonance modes.

8. Audio Transducer Applications

The audio transducer embodiments described in this specification may be configured for implementation in a large variety of audio devices. Some examples have been given in section 5 for example of implementation of audio transducers of the invention in personal audio devices. Whilst this may be a preferred implementation in relation to some of the embodiments of the invention, it is not the only implementation and many others are also applicable.

Each of the audio transducer embodiments can be scaled to a size that performs the desired function. For example, the audio transducer embodiments of the invention may be incorporated in any one of the following audio devices, without departing from the scope of the invention:

Personal audio devices including headphones, earphones, hearing aids, mobile phones, personal digital assistants and the like;

Computing devices including personal desktop computers, laptop computers, tablets and the like;

Computer interface devices including computer monitors, speakers and the like;

Home audio devices, including floor-standing speakers, television speakers and the like;

Car audio systems; and

Other specialty audio devices.

Furthermore, the frequency range of the audio transducer can be manipulated in accordance with a given design to achieve the desired results. For example, an audio transducer of any one of the above embodiments may be used as a bass driver, a mid-range-treble driver, a tweeter or a full-range driver depending on the desired application.

An brief example of how the embodiment A audio transducer embodiment may be configured for various applications will be give below, however, as will be understood by those skilled in the art this is not intended to be limiting and many other possible configurations, applications and implementations are envisaged for this embodiment as well as every other embodiment described herein.

In one implementation, the audio transducer of embodiment A, for instance, may have a diaphragm body length of approximately 15 mm, for example, and designed to reproduce mid-range and treble frequencies, from 300 Hz to 20 kHz, in the two way headphone illustrated FIG. 50B (loudspeaker audio transducer H301). The same transducer could also be deployed as a mid-range-treble loudspeaker audio transducer for a home audio floor-standing speaker, for example reproducing the band of frequencies between 700 Hz and above, or, it could also be optimised to act as a full-range driver in a 1-way headphone.

The audio transducer of embodiment A can be scaled in size to fit a variety of applications. For example, FIG. 50B shows a bass loudspeaker audio transducer H302, which is an enlarged embodiment A audio transducer (in all dimensions) with respect to the mid-range and treble driver H301. The enlarged audio transducer may have a diaphragm length of about 32 mm, for example. In such a case, the transducer H302 may be capable of moving more air with a lower fundamental frequency of around 40 Hz. The transducer H302 may be suitable for reproducing frequencies up to around 4000 Hz. This driver would also be suitable for a mid-range driver of a home audio floor standing speaker, for example reproducing the band of frequencies between 100 Hz and 4000 Hz. Further approximate scaling (of all dimensions) to a diaphragm length of approximately 200 mm, for example, could result in a driver having substantially resonance-free bandwidth from 20 Hz to around 1000 Hz, or higher in some cases, with high volume excursion capability. This configuration would be suitable for a subwoofer for a home audio floor-stander for example.

If driver dimensions were scaled down such that the diaphragm length of the embodiment A audio transducer was about 8 mm, for example, the transducer may be deployed in a 1-way bud earphone similar to that illustrated in FIGS. 51A-51B.

Referring to FIGS. 86A-86D, yet another implementation of the embodiment A audio transducer, may be a loudspeaker system Z100 which may be a personal computer speaker unit, for example. In this audio device embodiment two or more audio transducer are incorporated in the same enclosure Z104. A first relatively smaller version of the embodiment A transducer Z101 is provided as a treble driver and a second relatively larger audio transducer Z102 is provided as a bass-midrange driver. Both units may be decoupled from the enclosure via a decoupling system as described under section 4.2 of this specification. The enclosure Z104 may comprise a plurality of rubber or other substantially soft feet Z105 distributed about the base of the enclosure to further decouple the enclosure from the supporting surface Z106.

In an alternative configuration of the embodiment Z audio device the larger transducer Z102 is not decoupled, and is comprehensively and rigidly connected to the enclosure Z104. This may be done via any suitable method as discussed in the specification including for example via adhesive on one or more (preferably multiple) sides of the heavier transducer base structure. Additionally the enclosure wall Z104 is made from a sufficiently thick and rigid material, such as for example a metal material (e.g. aluminium or similar) with a sufficiently large wall thickness of greater than 5 mm or greater than 8 mm for example. This would be an unusually heavy and rigid construction. The soft feet provide a decoupling mounting system between the enclosure and the supporting surface. Also a second decoupling system associated with the smaller driver Z101 is provided as described for embodiment A and may be located between the driver and the enclosure Z104. These decoupling systems in combination with the free periphery type drivers Z101 and Z102 means that the larger rigidly mounted transducer combines with the relatively compact enclosure of the smaller driver to form a single substantially low resonance system, which is isolated from other resonance-prone systems (e.g. the furniture upon which the speaker may sit) close to the unit. This system is also isolated form other systems that are vibration prone (in this case the smaller driver) via the other driver's decoupling system.

Vibration isolation mounting (i.e. the feet) could comprise for example compliant rubber or silicon mounting pads attached underneath, flexible metal springs, a flexible arm, etc.

The above provides examples of the versatility of the embodiments of the invention, and it would be readily apparent to those skilled in the art that other implementations are possible for embodiment A, or any other audio transducer embodiment either described in this specification or derivable from the description provided herewith.

The foregoing description of the invention includes preferred embodiments audio transducer and audio device embodiments. The description also includes various embodiments, examples and principles of design and construction of other systems, assemblies, structures, devices, methods and mechanisms relating to audio transducers. Many modifications to the audio transducer embodiments and to the other related systems, assemblies, structures, devices, methods and mechanisms disclosed herein may be made, as would be apparent to those skilled in the relevant art, without departing from the spirit and scope of the invention as defined by the accompanying claims.

That which is claimed:

1. An audio device comprising:

an audio transducer having a moveable diaphragm and a transducing mechanism operatively coupled to the diaphragm, the diaphragm having a diaphragm body of substantial thickness relative to a length of the diaphragm body; and a decoupling mounting system located between a first part incorporating the audio transducer and at least one other part of the audio device to at least partially alleviate mechanical transmission of vibration between the first part and the at least one other part, the decoupling mounting system compliantly mounting a first component to a second component of the audio device.

2. An audio device as claimed in claim 1 wherein the diaphragm body comprises a maximum thickness dimension that is at least approximately 11 percent of a greatest length dimension of the diaphragm body.

3. An audio device as claimed in claim 2 wherein the diaphragm body comprises a maximum thickness dimension that is at least approximately 14 percent of the greatest length dimension.

4. An audio device as claimed in claim 2 wherein the greatest length dimension of the diaphragm body extends across three orthogonal dimensions of the diaphragm body including a length, thickness and width of the diaphragm body.

5. An audio device as claimed in claim 1 wherein the diaphragm body is substantially rigid during operation.

6. An audio device as claimed in claim 1 wherein the diaphragm comprises a relatively lower mass, per unit area of a major face of the diaphragm body, at one or more peripheral regions of the diaphragm distal from a centre of mass region, relative to a mass per unit area at or adjacent the centre of mass region.

7. An audio device as claimed in claim 1 wherein the diaphragm body comprises a relatively greater thickness at or adjacent a centre of mass region of the diaphragm relative to one or more peripheral regions distal from the centre of mass region.

8. An audio device as claimed in claim 1 wherein the diaphragm comprises a lower mass at one end of the diaphragm relative to an opposing end of the diaphragm.

9. An audio device as claimed in claim 1 wherein the diaphragm further comprises normal stress reinforcement coupled on or adjacent at least one of major face of the diaphragm body for resisting compression-tension stresses experienced at or adjacent the face of the diaphragm body during operation.

10. An audio device as claimed in claim 9 wherein the normal stress reinforcement comprises a normal stress reinforcement plate coupled on or adjacent at least one major face of the diaphragm body.

11. An audio device as claimed in claim 10 wherein each normal stress reinforcement plate comprises a lower mass and/or thickness at one or more peripheral regions of the diaphragm distal from a centre of mass region of the diaphragm relative to a thickness of the normal stress reinforcement plate at or adjacent the centre of mass region.

12. An audio device as claimed in claim 10 wherein each normal stress reinforcement plate comprises one or more recesses at one or more peripheral regions of the diaphragm distal from a centre of mass region of the diaphragm.

13. An audio device as claimed in claim 1 wherein the diaphragm comprises at least one inner reinforcement member embedded within a core material of the diaphragm body and oriented at an angle relative to at least one major face of the diaphragm body for resisting shear deformation experienced by the diaphragm body during operation.

14. An audio device as claimed in claim 1 further comprising a housing closely surrounding the diaphragm, and wherein an outer periphery of the diaphragm comprises one or more peripheral regions unsupported by the surrounding housing and free from physical connection with an interior of the surrounding housing.

15. An audio device as claimed in claim 1 wherein the audio transducer further comprises a diaphragm base frame rigidly coupled to an outer periphery of the diaphragm and wherein the transducing mechanism comprises one or more force transferring components coupled to the diaphragm base frame.

16. An audio device as claimed in claim 1 wherein the diaphragm is rotatable during operation of the transducing mechanism about an axis of rotation.

17. An audio device as claimed in claim 1 wherein:

the audio transducer further comprises a transducer base structure and the diaphragm is moveably coupled to the transducer base structure, and wherein the decoupling mounting system compliantly mounts the base structure to another part of the audio device, wherein the other part of the audio device is not the diaphragm of the audio transducer.

18. An audio device as claimed in claim 17 wherein the decoupling mounting system comprises at least one node axis mount that is configured to locate at or proximal to a node axis location associated with the transducer base structure.

19. An audio device as claimed in claim 17 wherein the decoupling mounting system comprises at least one distal mount configured to locate distal from a node axis location associated with the transducer base structure.

20. An audio device as claimed in claim 1 wherein:

the audio transducer further comprises a transducer base structure and the diaphragm is moveably coupled to the transducer base structure, the audio device further comprises a baffle or enclosure surrounding the audio transducer base structure; and the decoupling mounting system couples and locates between the transducer base structure and an interior of the baffle or enclosure.

21. An audio device as claimed in claim 20 wherein the decoupling mounting system compliantly mounts the transducer base structure to the interior of the baffle or enclosure.

22. An audio device as claimed in claim 1 wherein the audio device further comprises a second audio transducer and the decoupling mounting system compliantly mounts the base structure to a part of the second audio transducer, wherein the part of the second audio transducer is not a diaphragm of the second audio transducer.

23. An audio device as claimed in claim 1 wherein the diaphragm comprises a maximum thickness dimension that is at least approximately 15% of a radius dimension extending from a centre of mass of the diaphragm to a most distal periphery of the diaphragm in a direction substantially perpendicular to the maximum thickness dimension.

24. An audio device as claimed in claim 1 wherein the decoupling mounting system compliantly mounts the audio transducer to another part of the audio device to substantially alleviates mechanical transmission of vibration between the audio transducer and the other part, and to substantially decouple the audio transducer from the other part.

* * * * *